US012649534B2

(12) United States Patent
Zhang et al.

(10) Patent No.: US 12,649,534 B2
(45) Date of Patent: Jun. 9, 2026

(54) ELECTRIC RIDING DEVICE

(71) Applicant: Shenzhen Chitado Technology CO., LTD, Shenzhen (CN)

(72) Inventors: Dianxuan Zhang, Shenzhen (CN); Yang Zhang, Shenzhen (CN); Yiqiang Wang, Shenzhen (CN); Dengbing Zhou, Shenzhen (CN); Fuqi Zhou, Shenzhen (CN)

(73) Assignee: Shenzhen Chitado Technology CO., LTD, Shenzhen (CN)

( * ) Notice: Subject to any disclaimer, the term of this patent is extended or adjusted under 35 U.S.C. 154(b) by 0 days.

(21) Appl. No.: 19/341,002

(22) Filed: Sep. 26, 2025

(65) Prior Publication Data

US 2026/0028081 A1      Jan. 29, 2026

Related U.S. Application Data

(63) Continuation-in-part    of    application    No. PCT/CN2025/106945, filed on Jul. 3, 2025.

(30) Foreign Application Priority Data

Jul. 3, 2024    (CN) ......................... 202410885010.1

(51) Int. Cl.
B62J 9/27            (2020.01)
B62J 7/04            (2006.01)
(Continued)

(52) U.S. Cl.
CPC . B62J 9/27 (2020.02); B62J 7/04 (2013.01); B62J 9/22 (2020.02); B62J 9/23 (2020.02);
(Continued)

(58) Field of Classification Search
CPC ..................................... B62J 9/27; B62J 9/23
(Continued)

(56) References Cited

U.S. PATENT DOCUMENTS 4,830,134 A * 5/1989 Hashimoto .............. B62J 35/00
180/219
5,433,286 A * 7/1995 Kumamaru ............ B62K 11/10
280/833
(Continued)

FOREIGN PATENT DOCUMENTS

CN            88210729 U        9/1988
CN            204452693 U      7/2015
(Continued)

OTHER PUBLICATIONS

Intehnationl Application No. PCT/CN2025/106945 Applicant: Shenzhen Chitado Technology Co., Ltd. Invention Title: Transport Tool International Search Report was mailed on Sep. 18, 2025. Written Opinion of the International Search Authority was mailed on Sep. 18, 2025.
(Continued)

*Primary Examiner* — Nathan J Newhouse
*Assistant Examiner* — Lester L Vanterpool
(74) *Attorney, Agent, or Firm* — IPro, PLLC

(57)            ABSTRACT

Disclosed is an electric riding device. The electric riding device includes: a frame body, a front wheel, a rear wheel, a handlebar assembly, a seat, and a power device. Wherein the frame body includes a substantially flat base portion having a longitudinal dimension and a lateral dimension, a front raised portion extending upwardly from a front end of the base portion, and a rear raised portion extending upwardly from a rear end of the base portion.

15 Claims, 140 Drawing Sheets

(51) Int. Cl.

| | | |
|---|---|---|
| *B62J 9/22* | (2020.01) |
| *B62J 9/23* | (2020.01) |
| *B62J 25/06* | (2020.01) |
| *B62J 43/16* | (2020.01) |
| *B62K 11/10* | (2006.01) |
| *B62K 11/14* | (2006.01) |
| *B62M 7/12* | (2006.01) |

(52) U.S. Cl.

CPC ............... *B62J 25/06* (2020.02); *B62J 43/16* (2020.02); *B62K 11/10* (2013.01); *B62K 11/14* (2013.01); *B62M 7/12* (2013.01)

(58) Field of Classification Search

USPC ........................................ 224/412

See application file for complete search history.

(56) References Cited

U.S. PATENT DOCUMENTS

| | | | | |
|---|---|---|---|---|
| 6,644,693 | B2 * | 11/2003 | Michisaka | ............... B62J 11/19 |
| | | | | 180/219 |
| 7,255,191 | B2 * | 8/2007 | Baldwin | ................ B62K 11/10 |
| | | | | 180/312 |
| 8,316,976 | B2 * | 11/2012 | Johnson | ................... B60K 1/04 |
| | | | | 180/68.5 |
| 8,727,058 | B2 * | 5/2014 | Nakano | ................... B62K 11/10 |
| | | | | 280/281.1 |
| 11,247,549 | B2 * | 2/2022 | Peloquin, Jr. | ............ B60K 1/00 |
| D1,023,835 | S | 4/2024 | Tian | |
| 12,005,983 | B2 | 6/2024 | Rasche et al. | |
| D1,040,701 | S | * | 9/2024 | Wang ........................... D12/110 |
| D1,072,681 | S | * | 4/2025 | Zhu .............................. D12/111 |
| 12,420,886 | B2 * | 9/2025 | Vandenbussche | ..... B62K 11/10 |
| 2004/0129471 | A1 | 7/2004 | Cheng | |

| | | | | |
|---|---|---|---|---|
| 2012/0145759 | A1 * | 6/2012 | Shih | ........................... B62J 7/00 |
| | | | | 224/412 |
| 2013/0063438 | A1 | 3/2013 | Billett et al. | |
| 2016/0347397 | A1 * | 12/2016 | Etzelsberger | .......... B62K 19/02 |
| 2020/0070910 | A1 | 3/2020 | Noguchi et al. | |
| 2021/0235828 | A1 * | 8/2021 | Yeh | ....................... A45C 7/0077 |
| 2022/0161887 | A1 * | 5/2022 | An | .......................... B62K 21/16 |
| 2022/0371680 | A1 * | 11/2022 | Jodha | .................... B62K 3/002 |
| 2023/0125006 | A1 * | 4/2023 | Virant | ................... B62K 23/04 |
| | | | | 180/216 |
| 2023/0218471 | A1 * | 7/2023 | Boyd | ........................ B62L 1/02 |
| | | | | 135/85 |
| 2024/0375739 | A1 * | 11/2024 | Van Heur | ............... E05B 35/00 |
| 2025/0019027 | A1 * | 1/2025 | Hsu | ............................. B62J 1/08 |
| 2025/0100641 | A1 * | 3/2025 | Lepage | ..................... B62J 9/24 |

FOREIGN PATENT DOCUMENTS

| | | | | |
|---|---|---|---|---|
| CN | 106143735 | A | | 11/2016 |
| CN | 206766238 | U | * | 12/2017 |
| CN | 208102225 | U | | 11/2018 |
| CN | 209650433 | U | | 11/2019 |
| CN | 209921500 | U | * | 1/2020 |
| CN | 220682528 | U | | 3/2024 |
| DE | 202017103729 | U1 | | 8/2017 |
| JP | H0911957 | A | | 1/1997 |
| JP | 20001288486 | A | | 10/2001 |
| TW | 200424436 | A | | 11/2004 |

OTHER PUBLICATIONS

U.S. Appl. No. 19/335,083 Applicant: Zhang et al. Non-final Office Action was mailed on Dec. 18, 2025.

U.S. Appl. No. 19/340,910 Applicant: Zhang et al. Non-final Office Action was mailed on Nov. 25, 2025.

* cited by examiner

Plane of symmetry

784A

700A

785A

700A

784A

785A

AI'-AI'

1301A

500A

1302A

01

03

A2

600A

604A

605A

606A

03

02

01

1A

700A

169A

400A

104A

500A

604A

170A

2B

B1'-B1'

100B

B2'-B2'

B3'-B3'

B4'-B4'

B4'

B7'

B5'

153B

2B

B10'

B4'-B4'

B5'-B5'

M2'

715M（717M）

104M 03
02

135M

715M（717M）

M3'

135M

715M（718M）

715M（718M）

M3'

$D_{M4}$ $D_{M4}$ $H_{M5}$

718M $H_{M4}$

717M $H_{M4}$ 03
02

13M

100M

700M 03
02 01

135M

M4'

701M 737M
738M
744M
700M 743M
741M 718M
717M
742M 744M
704M
742M 739M
740M
702M 703M 02 03 01

13M
03 01

100M 700M
H_M15
301M
900M
H_M17
135M 745M

M7'

1511M

1500M

700M

716M

716M

1511M

1500M

1502M

03

02

01

1512M

1512M

1512M

03

01

02

700Q 768Q 769Q 704Q
717Q
701Q
759Q
765Q
758Q
03
01
02
761Q 703Q
764Q
702Q 763Q
767Q
762Q 766Q
745Q 717Q 758Q

700Q

715Q(717Q) 704Q
758Q
02
01
717Q
749Q
758Q
702Q 715Q(717Q)

Q4'-Q4'

Q4'

Q5'-Q5'

ELECTRIC RIDING DEVICE

CROSS-REFERENCES TO RELATED APPLICATIONS

This application is a continuation-in-part of International Application No. PCT/CN2025/106945, filed on Jul. 3, 2025, which claims priority to Chinese Patent Application No. 202410885010.1, titled "Vehicle," filed with the China National Intellectual Property Administration on Jul. 3, 2024. The entire disclosures of the aforementioned applications are incorporated herein by reference.

FIELD OF THE INVENTION

The present disclosure relates to the technical field of transportation, and in particular, to an electric riding device.

BACKGROUND

As society advances, transportation technologies have become more and more mature and are now widely used in various fields, including public transit, cargo logistics, and personal commuting.

Currently, vehicles may at least include bicycles, electric bicycles (e-bikes), and motorcycles. Such vehicles may approximately include a handlebar stem, a frame, a seat, two wheels, and a power mechanism. The handlebar may be mounted to the front portion of the frame, and the seat may be positioned at the rear. The two wheels may be respectively attached to the front and rear of the frame. The power mechanism may serve to drive the vehicle forward.

BRIEF SUMMARY OF THE DISCLOSURE

The present disclosure relates to the technical field of transportation, and in particular, to an electric riding device.

According to a first aspect of the present disclosure, the present disclosure further provides an electric riding device, comprising:

a frame body;

a front wheel coupled to a front portion of the frame body, and a rear wheel coupled to a rear portion of the frame body;

a handlebar assembly coupled to the front portion of the frame body and configured to be contacted by a user's hands;

a seat coupled to the frame body; and a power device coupled to the frame body and configured to supply power to the electric riding device;

wherein the frame body includes a substantially flat base portion having a longitudinal dimension and a lateral dimension, a front raised portion extending upwardly from a front end of the base portion, and a rear raised portion extending upwardly from a rear end of the base portion;

wherein the front raised portion is configured to support a head tube at an end thereof distal to the base portion, the head tube being for coupling the handlebar assembly to the frame body, and at least a part of the rear raised portion is configured to support the seat;

wherein the electric riding device further comprises a storage basket removably mounted on the frame body, at least a portion of the storage basket being configured to be mounted in a substantially horizontal orientation on an upper surface of the base portion, the storage basket having a longitudinal dimension, a lateral dimension, and a height dimension, wherein a ratio of the longitudinal dimension of the storage basket to the lateral dimension of the storage basket is greater than 1.15, and a ratio of the longitudinal dimension of the storage basket to the height dimension of the storage basket is greater than 1.15;

wherein a bottom of the storage basket is configured with an openwork structure to permit paws of an animal loaded in the storage basket to directly contact the upper surface of the base portion;

wherein the storage basket comprises a left sidewall and a right sidewall that are laterally spaced apart and substantially mirror-symmetrical, and wherein, when the storage basket is mounted on the frame body, the left sidewall of the storage basket is positioned at a left end of the base portion and extends substantially vertically upward therefrom, and the right sidewall of the storage basket is positioned at a right end of the base portion and extends substantially vertically upward therefrom;

wherein four top corners of the storage basket are each provided with an outwardly convex arcuate section;

wherein a shape of at least a portion of the storage basket is configured to conform to a shape of the frame body;

wherein the storage basket defines a contact surface configured to engage the upper surface of the base portion and permit the storage basket to be stably placed thereon, such that when the storage basket is placed on the upper surface of the base portion, the contact surface and the upper surface of the base portion are in substantially horizontal contact;

wherein the electric riding device further comprises a left footrest and a right footrest, disposed on opposite sides in the lateral direction, each being rotatable, wherein an installation position of the left footrest is longitudinally nearer a left front end of the base portion rather than at or adjacent to a left rear end of the base portion, and an installation position of the right footrest is longitudinally nearer a right front end of the base portion rather than at or adjacent to a right rear end of the base portion;

wherein the left footrest is configured to rotate about a first axis extending in a height direction, the right footrest is configured to rotate about a second axis extending in the height direction, and a lateral distance between the first axis and the second axis is greater than the lateral dimension of the storage basket;

wherein the power device is mounted beneath the base portion;

wherein each of the left and right sidewalls comprises:

at least two first bars extending along a first direction and spaced apart along a second direction; and at least one second bar extending along the second direction;

wherein the at least one second bar intersects with the at least two first bars substantially perpendicularly.

According to a second aspect of the present disclosure, the present disclosure further provides an electric riding device, comprising:

a frame body defining a substantially flat support plate;

a front wheel coupled to a front portion of the frame body, and a rear wheel coupled to a rear portion of the frame body;

a handlebar assembly coupled to the frame body and configured to be handled by a user's hands;

a seat coupled to the frame body;

a power device coupled to the frame body and configured to supply power to the electric riding device; and a storage basket defining a storage cavity, wherein at least a portion of the storage basket is configured to be removably coupled to an upper surface of the support plate;

wherein at least a portion of the storage basket is configured with an openwork structure to permit paws of an animal loaded therein to directly contact at least a portion of the upper surface of the support plate;

wherein the storage basket comprises a left sidewall and a right sidewall, the left sidewall and the right sidewall are opposed to each other, and wherein, when the storage basket is mounted on the frame body, the left sidewall is positioned proximate a left edge of the support plate and extends substantially vertically upward therefrom, and the right sidewall is positioned proximate a right edge of the support plate that is laterally spaced from the left edge and extends substantially vertically upward therefrom;

wherein four top corners of the storage basket each comprise a rounded portion;

wherein a shape of at least a portion of the storage basket is configured to conform to a shape of at least a portion of the frame body; and wherein the electric riding device further comprises a left footrest and a right footrest, the left footrest and the right footrest are opposed to each other, wherein an installation position of the left footrest is located proximate a left front side of the support plate, and an installation position of the right footrest is located proximate a right front side of the support plate.

According to a third aspect of the present disclosure, the present disclosure further provides an electric riding device, comprising:

a frame body including a substantially flat support plate;

a front wheel coupled to a front portion of the frame body, and a rear wheel coupled to a rear portion of the frame body;

a handlebar assembly coupled to the frame body and configured to be contacted by a user's hands;

a seat coupled to the frame body;

a power device coupled to the frame body and configured to supply power to the electric riding device; and a storage basket defining a storage cavity, a bottom of the storage basket being configured to contact at least a portion of an upper surface of the support plate in a substantially horizontal orientation to stably mount the storage basket to the frame body;

wherein the storage basket comprises a first sidewall and a second sidewall spaced apart from each other in a left-right direction, the first sidewall defining a first plane and the second sidewall defining a second plane, the first plane and the second plane being substantially parallel;

wherein the upper surface of the support plate defines a third plane, the first plane is substantially orthogonal to the third plane proximate a left end of the support plate, and the second plane is substantially orthogonal to the third plane proximate a right end of the support plate;

wherein at least one top corner of the storage basket includes an arcuate section, a center of curvature of the arcuate section being located within at least one of the storage basket and the storage cavity;

wherein each of the first and second sidewalls comprises at least two first rod members extending along a first direction and spaced apart along a second direction, and at least one second rod member extending along the second direction that intersects the at least two first rod members substantially perpendicularly;

wherein the electric riding device further comprises a left footrest and a right footrest, the left footrest and the right footrest are opposed to each other, wherein an installation position of the left footrest is located proximate a left front end of the support plate, and an installation position of the right footrest is located proximate a right front end of the support plate; and wherein the power device is mounted beneath the support plate.

According to a fourth aspect of the present disclosure, the present disclosure further provides an electric riding device, comprising:

a frame body defining a substantially flat support plate located between front and rear ends of the frame body, the support plate having a longitudinal dimension and a lateral dimension;

a front wheel and a rear wheel coupled to front and rear portions of the frame body, respectively;

a handlebar assembly coupled to the frame body and configured to be grasped by a user's hands;

a seat coupled to the frame body; and a power device coupled to the frame body and configured to supply power to the electric riding device;

wherein the frame body comprises a storage cavity having a longitudinal dimension, a lateral dimension, and a height dimension, wherein the longitudinal dimension of the storage cavity is greater than both the lateral dimension and the height dimension thereof;

wherein the storage cavity is at least partially defined by a left sidewall and a right sidewall disposed on the frame body, the left and right sidewalls are opposed to each other, a lower end of the left sidewall being positioned proximate a left edge of the support plate and extending substantially vertically upward therefrom, and a lower end of the right sidewall being positioned proximate a right edge of the support plate and extending substantially vertically upward therefrom;

wherein at least a portion of a space between the left and right sidewalls is configured to permit paws of an animal to directly contact the support plate;

wherein at least a portion of at least one of the left and right sidewalls located at a boundary of the storage cavity includes a rounded contour; and wherein the electric riding device further comprises a left footrest and a right footrest disposed on opposite sides in the lateral direction, wherein an installation position of the left footrest is longitudinally nearer a left front end of the support plate rather than at or adjacent to a left rear end of the support plate, and an installation position of the right footrest is longitudinally nearer a right front end of the support plate rather than at or adjacent to the right rear end of the support plate.

BRIEF DESCRIPTION OF THE DRAWINGS

FIGS. 85A-85E are another set of schematic structural views of the side door;

FIGS. 86A-86C are a set of schematic structural views of the frame;

FIGS. 86D-86F are a set of schematic views illustrating the installation details of the spring shock absorber;

FIGS. 87A-87B are a set of overall schematic structural views of another implementation of the vehicle;

FIGS. 88A-88C are a set of schematic views illustrating the use of the storage mechanism;

FIGS. 89A-89B are a set of overall schematic structural views of another implementation of the vehicle according to an embodiment of the present application.

DETAILED DESCRIPTION OF EMBODIMENTS

Figure 1A:
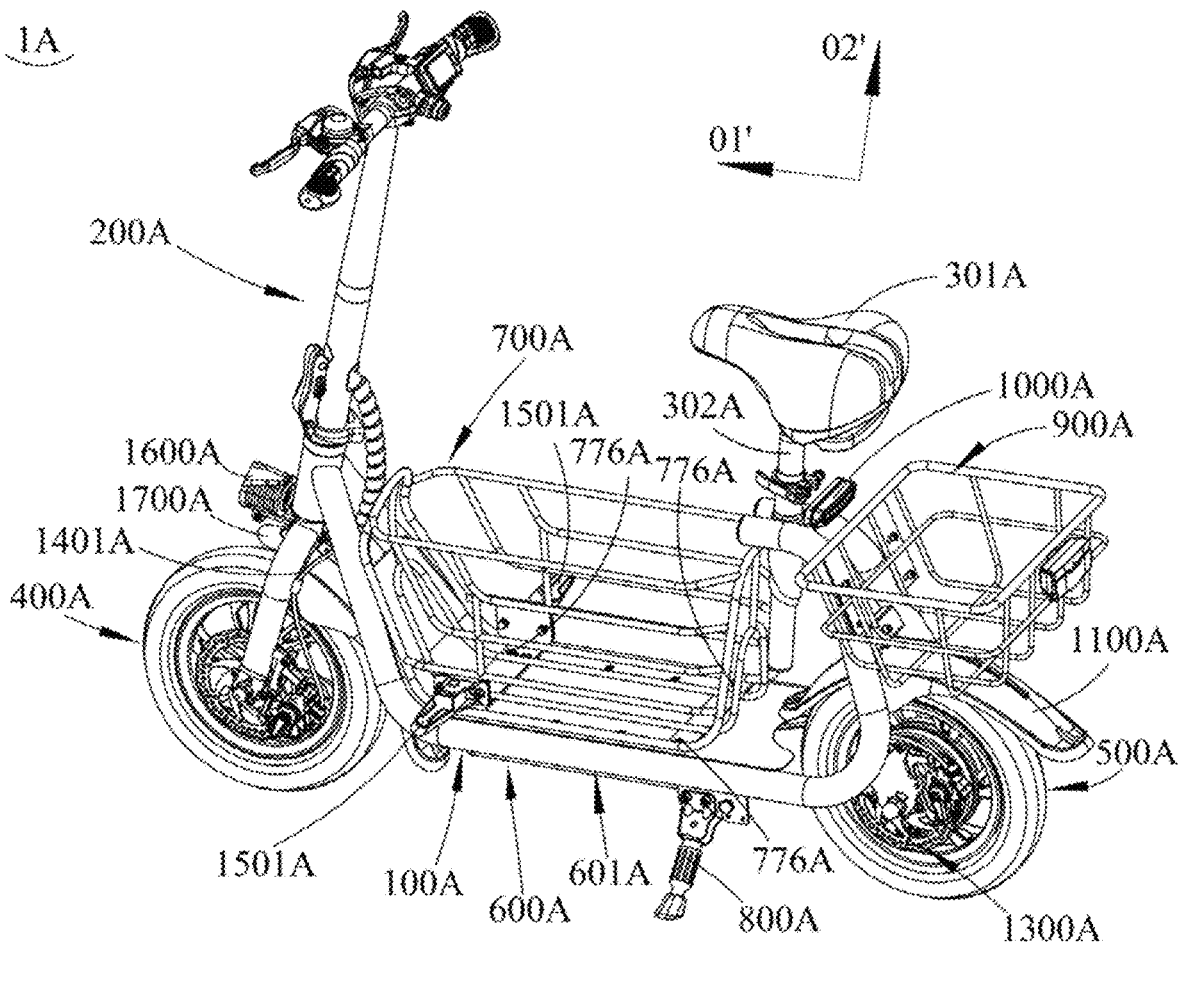
FIG. 1A is a schematic view from one direction of an implementation of the vehicle according to an embodiment of the present application.

Hereinafter, the technical solutions in the embodiments of the present application will be described clearly and completely with reference to the illustrative drawings in the embodiments of the present application. Apparently, the described embodiments are merely a part of the embodiments of the present application, rather than all of the embodiments.

In some embodiments, local features in the drawings may be enlarged or reduced to more clearly illustrate their details.

Unless otherwise specified, all technical and scientific terms used in the present application have the same meaning as commonly understood by one of ordinary skill in the art to which the present application pertains. The terminology used in the present application is for the purpose of describing specific embodiments only and is not intended to limit the scope of the present application. The term "and/or" as used in the present application includes any and all combinations of one or more of the associated listed items. As used in the present application and the appended claims, the singular forms "a," "an," "the," and "said" may also be construed to include the plural forms, unless the context clearly indicates otherwise.

In some embodiments, it can be understood that the terms "first" and "second" may be used for descriptive purposes only, may not be understood as indicating or implying relative importance, and may not be implicitly construed as limiting the number of the technical features indicated. Thus, a feature defined with "first" or "second" may explicitly or implicitly include one or more of said features. In some embodiments, "a plurality of" means two or more, unless otherwise explicitly and specifically defined. In some embodiments, "several" means one or more, unless otherwise explicitly and specifically defined. The articles "a" and "an" may also indicate the plural.

In some embodiments, it can be understood that the terms indicating orientation or positional relationships, such as "center," "longitudinal," "transverse," "lateral," "length," "width," "thickness," "height," "upper," "lower," "front," "rear," "left," "right," "vertical," "horizontal," "top," "bottom," "inner," "outer," "clockwise," "counterclockwise," etc., are based on the orientation or positional relationship shown in the drawings and are only for the purpose of facilitating a simplified description of the present application, and are not intended to indicate that the apparatus or element referred to must have a specific orientation or be constructed and operated in a specific orientation, and thus can't be construed as a limitation on the present application.

In some embodiments, unless otherwise explicitly defined, terms such as "installing," "connecting," "linking," "fixing," "setting," "attaching," "arranging," "supporting," and similar action/operational terms should be understood in a broad sense, and may be understood as being realized directly or indirectly. For example, a "connection" may be a fixed connection, a detachable connection, or integral; it may be a mechanical connection or an electrical connection; it may be a direct connection or an indirect connection through an intermediary, and it may also be the communication within two elements or the interaction between two elements. For a person of ordinary skill in the art, the specific meanings of the above terms in the present application may be understood according to the specific situation. For example, installing component A onto component B may mean installing A directly onto B, or it may mean installing component A indirectly onto component B via a third-party intermediate component, which may be referred to as a carrier component. In addition, the broad understanding of these action/operational terms is also reflected in that the action or operation itself may be fully or partially realized. For example, "component A supports component B" may mean that component B is fully supported by component A, or that component B is partially supported by component A (i.e., component A may support component B together with other components).

In some embodiments, unless otherwise explicitly defined, a first feature being "on," "above," "over," "on top of," "under," "below," "beneath," "underneath," or "inner" a second feature may mean that the first feature and the second feature are in direct contact, or that the first feature and the second feature are in indirect contact through an intermediate medium. Moreover, a first feature being "above," "over," and "on top of" a second feature may mean that the first feature is directly above or diagonally above the second feature, or may simply indicate that the horizontal level of the first feature is higher than the horizontal level of the second feature. A first feature being "under," "below," "beneath," and "underneath" a second feature may mean that the first feature is directly below or diagonally below the second feature, or may simply indicate that the horizontal level of the first feature is lower than the horizontal level of the second feature.

It may be understood that, if component/part names and reference numerals from PCT/CN2025/106945 are adjusted in the present application, such modifications may be editorial in nature, may be intended to improve readability, and do not alter the structure, function, or interrelationship of the relevant components or parts.

In some embodiments, with respect to the component/part names, for example: "First pivot shaft" is uniformly changed to "Pivot shaft"; "Edge-fifth-crossbar" is uniformly changed to "Edge-crossbar"; "Middle-fifth-crossbar" is uniformly changed to "Middle-crossbar"; "First through hole (1517M)" is uniformly changed to "Third through hole"; "First middle horizontal side rod" is uniformly changed to "Horizontal side rod"; "First middle diagonal side rod" is uniformly changed to "Diagonal side rod"; "Second outer side rod" is uniformly changed to "Outer side rod"; "Side door mounting rail" is uniformly changed to "Mounting rail"; "Door frame" is uniformly changed to "Outer frame"; "Door middle side rod" is uniformly changed to "Fourth middle side rod".

In some embodiments, regarding reference numeral adjustments, for example: the reference numeral "5128" for the "First pivot shaft" is uniformly changed to "2108B".

To facilitate understanding of the relative positions of various structures in the specific vehicle 1A, a reference coordinate system specifically applicable to vehicle 1A is shown in some of the drawings. 01' represents the longitudinal axis, with its positive direction pointing in the normal traveling direction of vehicle 1A; 02' represents the vertical axis, with its positive direction opposite to the direction of gravity; and 03' represents the lateral axis, which is orthogonal to both 01' and 02'. Unless otherwise specified: "longitudinal" refers to any direction along the 01' axis; "front/rear" refer to the positive/negative directions of the 01' axis, respectively; "upper/lower" refer to the positive/negative directions of the 02' axis, respectively; and "left/right" refer to the positive/negative directions of the 03' axis, respectively. The arrows in the drawings only indicate the positive direction of each axis and do not limit the specific orientation or direction of movement of the components.

To further facilitate understanding of the relative positions of various structures in vehicle 1A and other vehicles involved in the present application, a more universal three-dimensional coordinate system indicating directional axes is included in some drawings of the specification. This coordinate system includes three mutually orthogonal directions: a first direction 01, a second direction 02, and a third direction 03. It may be understood as that, depending on the viewing angle, only two of the three directions may be shown in certain views. Unless otherwise specified, the directions 01'/02'/03' of the schematic coordinate system specific to vehicle 1A in the drawings of the present application can respectively correspond to the first direction 01/third direction 03/second direction 02 of the universal coordinate system applicable to all vehicles in the present application. Each of the aforementioned directions (01'/02'/03'/01/03/02) may be understood as a directional axis (each including positive/negative extension directions). Furthermore, direction axis 01 can also be referred to as the Y-axis, direction axis 02 can also be referred to as the X-axis, and direction axis 03 can also be referred to as the Z-axis.

Furthermore, in some embodiments, the first direction 01 may be understood as a first direction axis, which is identical or similar to the 01' longitudinal axis in its function as an orientation reference, and thus the first direction 01 can be referred to as the length direction or longitudinal direction of the vehicle (having both forward and rearward extension directions). When the vehicle is a two-wheeled vehicle (i.e., with only one front wheel and one rear wheel), the first direction 01 may be the direction of arrangement of the front and rear wheels (e.g., the direction of the line connecting the centers of the front and rear wheel axles). When the vehicle is a tricycle with one front wheel and two rear wheels, the first direction 01 may be a direction perpendicular to the arrangement of the two rear wheels. When the vehicle is a tricycle with two front wheels and one rear wheel, the first direction 01 may be a direction perpendicular to the arrangement of the two front wheels. When the vehicle is a four-wheeled vehicle with two front wheels and two rear wheels, the first direction 01 may be a direction perpendicular to the arrangement of either the two rear wheels or the two front wheels.

Furthermore, in some embodiments, the third direction 03 may be understood as a third direction axis. The third direction 03 is the height direction/vertical direction of the vehicle when it is upright (having both upward and downward extension directions), i.e., the direction perpendicular to the road surface when the front and rear wheels of the vehicle are perpendicular to the road surface. The third direction 03 may be the height direction of the front or rear wheel when the vehicle is upright. The third direction 03 is perpendicular to the first direction 01.

Furthermore, in some embodiments, the second direction 02 may be understood as a second direction axis. The second direction 02 is perpendicular to both the first direction 01 and the third direction 03, and can therefore be referred to as the lateral direction of the vehicle (including both left and right extension directions). It may be understood as that when the vehicle is moving in a straight line, both the first direction 01 and the second direction 02 are parallel to the road surface (or the first direction 01 and the second direction 02 can define a reference plane parallel to the horizontal road surface), and the third direction 03 is perpendicular to the road surface.

In some embodiments, it may be noted that the first direction 01, second direction 02, and third direction 03 are provided merely to facilitate distinguishing the relative positions of the various structures of the vehicle and may not impose any absolute limitation on the structure of the vehicle. For example, when the vehicle is placed at an inclined angle or is toppled, the corresponding third direction 03 is no longer the direction perpendicular to the road surface, but is instead the direction that results from being tilted at the same angle and in the same direction, corresponding to the vehicle.

Furthermore, in some embodiments, for ease of description, a surface that is parallel to both the first direction 01 and the second direction 02 may be referred to as a "first plane" (X-Y reference plane); a surface that is parallel to both the first direction 01 and the third direction 03 may be referred to as a "second plane" (Y-Z reference plane); and a surface that is parallel to both the second direction 02 and the third direction 03 may be referred to as a "third plane" (X-Z reference plane). It may be understood as that the first plane is perpendicular to the third direction 03, the second plane is perpendicular to the second direction 02, and the third plane is perpendicular to the first direction 01. In some embodiments, the second plane (Y-Z reference plane) may constitute a longitudinal plane of mirror symmetry for the corresponding vehicle as a whole. In some embodiments, the second plane (Y-Z reference plane) may constitute a longitudinal plane of mirror symmetry for a component of the corresponding vehicle (e.g., the main frame). In some embodiments, the second plane (Y-Z reference plane) may coincide with the geometric plane of symmetry of certain components of the corresponding vehicle.

In addition, in some embodiments, the direction from the rear wheel toward the front wheel along the first direction 01 may be defined as the forward traveling direction 04. The "front end" may refer to the terminal end of the structure in the forward traveling direction 04, while the "rear end" may refer to the starting end of the structure in the forward traveling direction 04. For example, the front end of the front wheel may be the end of the front wheel facing away from the rear wheel along the first direction 01, and the rear end of the front wheel may be the end of the front wheel facing toward the rear wheel along the first direction 01. Correspondingly, the "front side" may refer to the front side of a structure along the forward traveling direction 04, and the "rear side" may refer to the rear side of the structure along the forward traveling direction 04. For instance, the front side of the front wheel may be the side facing away from the rear wheel along the first direction 01, and the rear side of the front wheel may be the side of the front wheel that approaches the rear wheel along the first direction 01.

Furthermore, in some embodiments of the present application, "longitudinal," "lateral," and "vertical" may be defined with respect to the reference coordinate system of the vehicle (e.g., 1A, 2B, 17Q): longitudinal may refer to the front-rear/length direction of the vehicle; lateral may refer to the horizontal lateral direction orthogonal to the longitudinal direction; and vertical may refer to the direction orthogonal to both the longitudinal and lateral directions. Unless otherwise specified, all distances may be measured as projected distances in the corresponding direction.

In addition, in some embodiments of the present application, a description such as "component A is laterally spaced from component B" or similar descriptions may mean that the projected separation between A and B in the lateral direction is a positive value. A and B may be aligned or misaligned in the longitudinal and/or vertical directions, and may also be configured in a straight line, a broken line, or an oblique orientation with a predictable offset relative to the lateral direction; as long as the lateral projected separation is not zero, it constitutes a "lateral interval." Similarly, "component A is longitudinally spaced from component B" may refer to a positive projected separation amount in the longitudinal direction, and may allow for arbitrary alignment or misalignment in the lateral/vertical directions. Unless the context indicates otherwise, the "projected separation amount" may be measured based on one of the following: the geometric center of the respective components, a predetermined reference point, the center of a mounting hole, or the relatively closest points. If different datums result in discrepancies, the datum that is commonly used by persons skilled in the art and is more robust shall be taken as the standard, provided it does not affect the achievement of the technical objective. "Spaced" or "interval" may not require that no other structure be interposed between the two; the presence of connecting parts, gaskets, housings, or cavities does not negate the existence of an "interval," as long as the projected separation amount in the corresponding direction is a positive value and does not hinder the intended function.

In some embodiments, the "top end" may refer to the end that is farther from the road surface along the third direction 03 when the vehicle is upright; the "bottom end" may refer to the end that is closer to the road surface along the third direction 03 when the vehicle is upright. For example, the top end of the stem may be the end of the stem closer to the handlebar along the third direction 03, and the bottom end of the stem may be the end of the stem away from the handlebar along the third direction 03. Correspondingly, the "top side" may refer to the side that is farther from the road surface along the third direction 03 when the vehicle is upright; the "bottom side" may refer to the side that is closer to the road surface along the third direction 03 when the vehicle is upright. For example, the top side of the stem may be the side of the stem closer to the handlebar along the third direction 03, and the bottom side of the stem may be the side of the stem away from the handlebar along the third direction 03.

In some embodiments, the "left side" may refer to the side where the user's left hand is located along the second direction 02 when the user is seated on the vehicle; the "right side" may refer to the side where the user's right hand is located along the second direction 02 when the user is seated on the vehicle. For example, the left side of the stem may be the side where the user's left hand is located along the second direction 02, and the right side of the stem may be the side where the user's right hand is located along the second direction 02. Correspondingly, the "left end" may refer to the end where the user's left hand is located along the second direction 02 when the user is seated on the vehicle; the "right end" may refer to the end where the user's right hand is located along the second direction 02 when the user is seated on the vehicle. For example, the left end of the stem may be the end where the user's left hand is located along the second direction 02, and the right end of the stem may be the end where the user's right hand is located along the second direction 02.

In some embodiments, symmetry plane a may refer to the plane that is perpendicular to the first plane and bisects the head tube along the first direction 01. Axis a may be the axis of rotation of the front wheel relative to the front fork, axis b may be the axis of rotation of the rear wheel relative to the frame, and axis c may be the ground. It may be understood that when the vehicle travels in a straight line, the axis of rotation a of the front wheel relative to the front fork and the axis of rotation b of the rear wheel relative to the frame may be parallel.

In some embodiments, unless explicitly stated otherwise, all descriptions involving ranges of values, such as angles or dimensions, may be interpreted as including their endpoints. For example, if an included angle is described as being from 0° to 5°, then the technical features and effects corresponding to both 0° and 5° may be considered within the scope of the embodiments.

In some embodiments, unless expressly specified otherwise or an express limitation is provided, references to the objects or technical features described below (e.g., components, parts, modules, mechanisms, devices, systems/subsystems, parameters/attributes/conditions, and steps) may be construed broadly and may be used interchangeably with synonymous expressions commonly used in the art or terminology that is functionally equivalent. Such references may include, without limitation, statements regarding their function, shape/geometry, and name/nomenclature. For clarity, the inclusion of synonyms, near-synonyms, or translation variants is solely to refer to the same object or technical feature and may not, merely by virtue of the term chosen, be construed to add or exclude technical features not expressly specified or excluded (e.g., additional structures, materials, dimensions, closure types, mounting methods, etc.). The lists, pairings, and examples herein are illustrative and not limiting; absent a separate limitation, conjunctive or disjunctive expressions may be understood in the inclusive sense ("and/or"). (1) With respect to function, the benchmark may be whether the subject is at least capable of achieving the same or substantially the same technical objective and effect, and it may not be limited by the particular working principle, placement/location, whether implemented integrally or in separate pieces, or whether realized through intermediate elements. Unless expressly stated otherwise, the technical effects, functions, or objectives involved in some embodiments may be realized by a single object/technical feature acting alone or by multiple objects/technical features acting in combination. Any object/technical feature may be configured to achieve at least one function or objective and, where not mutually inconsistent, two or more functions or technical objectives. (2) With respect to shape/geometry, interpretation may be based on engineering-acceptable tolerances and approximations, encompassing similar or equivalent geometric variations (including continuous transitions from one shape to another or discrete/stepped transitions), variable cross-sections, and reasonable boundary refinements (e.g., fillets, chamfers, blends); the scope is not narrowed by scale change or proportion adjustment, where scale change may include proportional or non-proportional enlargement or reduction of overall or local dimensions and parameter-linked changes, and proportion adjustment may include changes in relationships among local features/elements such as length-width-height ratios, thickness-to-span ratios, radius-of-curvature to feature-size ratios, and spacing-to-size ratios, so long as the feature is at least capable of achieving its intended technical function. (3) With respect to name/nomenclature, identity may be determined by consistency or substantial similarity of the technical function and structural attributes of the referent; structural attributes may include its structural role and type (e.g., frame, beam, plate, shell, rod, support), relative position and orientation, its connection or load-bearing relationships with other objects/features, and the resulting load paths and stiffness/stability characteristics. A single object or technical feature may simultaneously perform multiple functions (e.g., connecting, supporting, protecting, positioning, guiding, limiting); a name that emphasizes only some of those functions does not affect a person skilled in the art's full understanding and attribution of all such functions; nor do differences in industry terminology systems, region or language, spelling/inflection/hyphenation/spacing, word order, or abbreviations alter the referent.

Figure 1B:
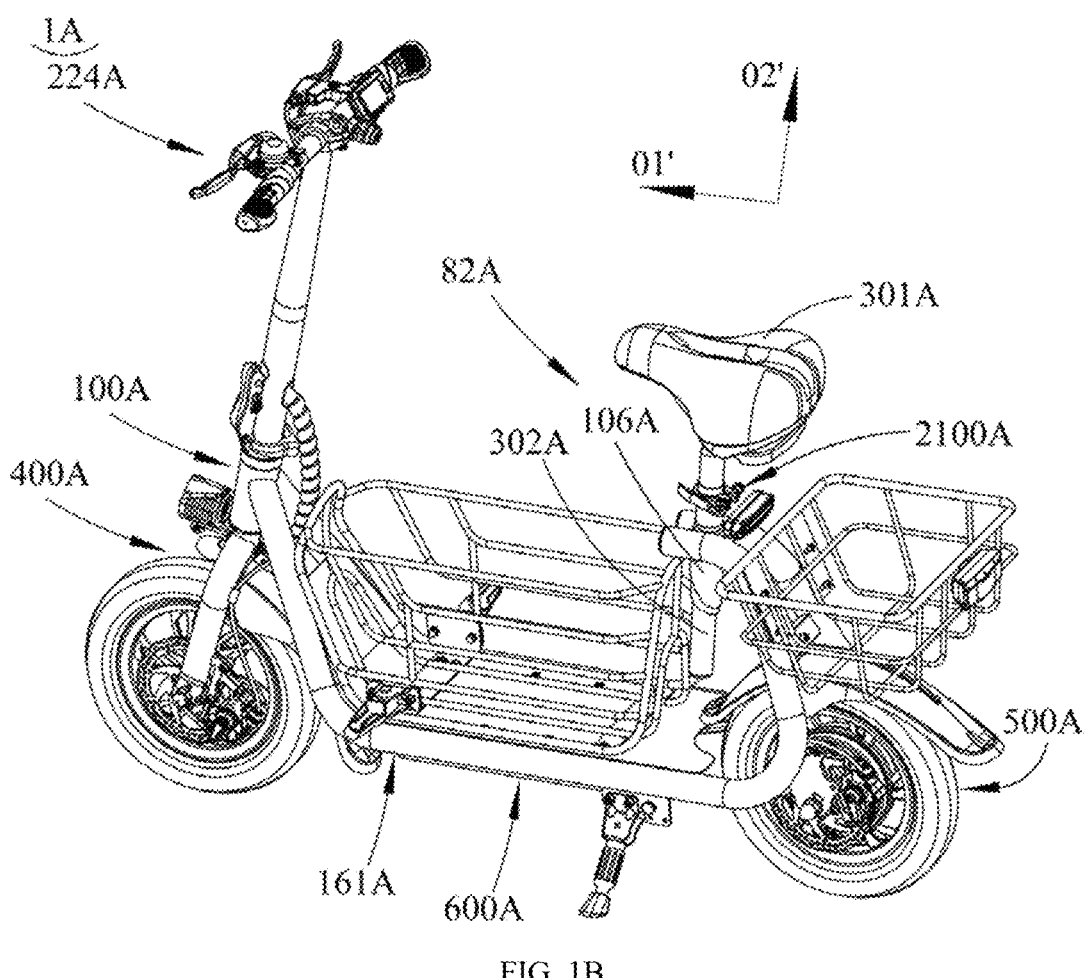
FIG. 1B is another schematic view from one direction of an implementation of the vehicle according to an embodiment of the present application.
Figure 2:
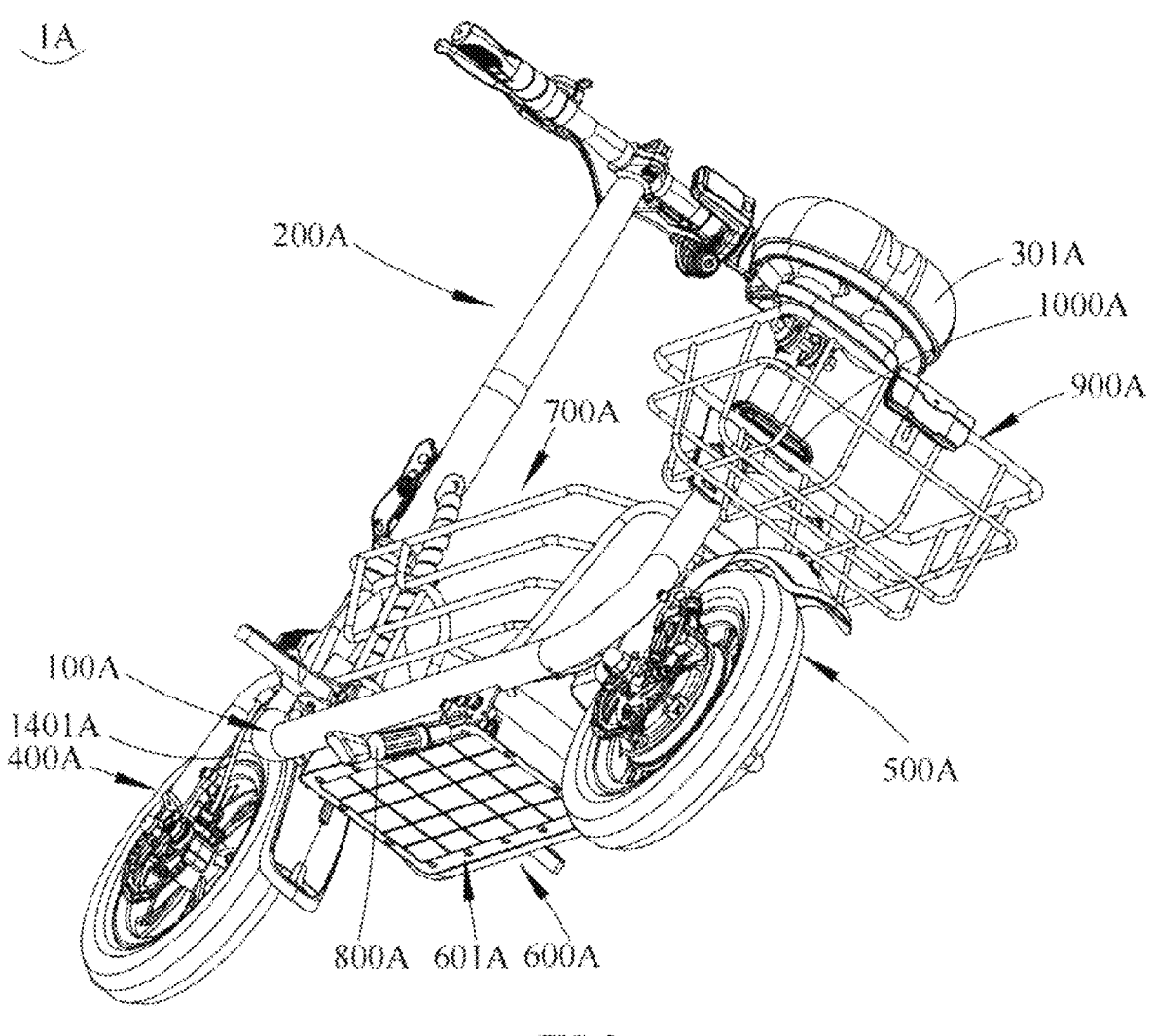
FIG. 2 is a schematic view from another direction of an implementation of the vehicle according to an embodiment of the present application.
Figure 3:
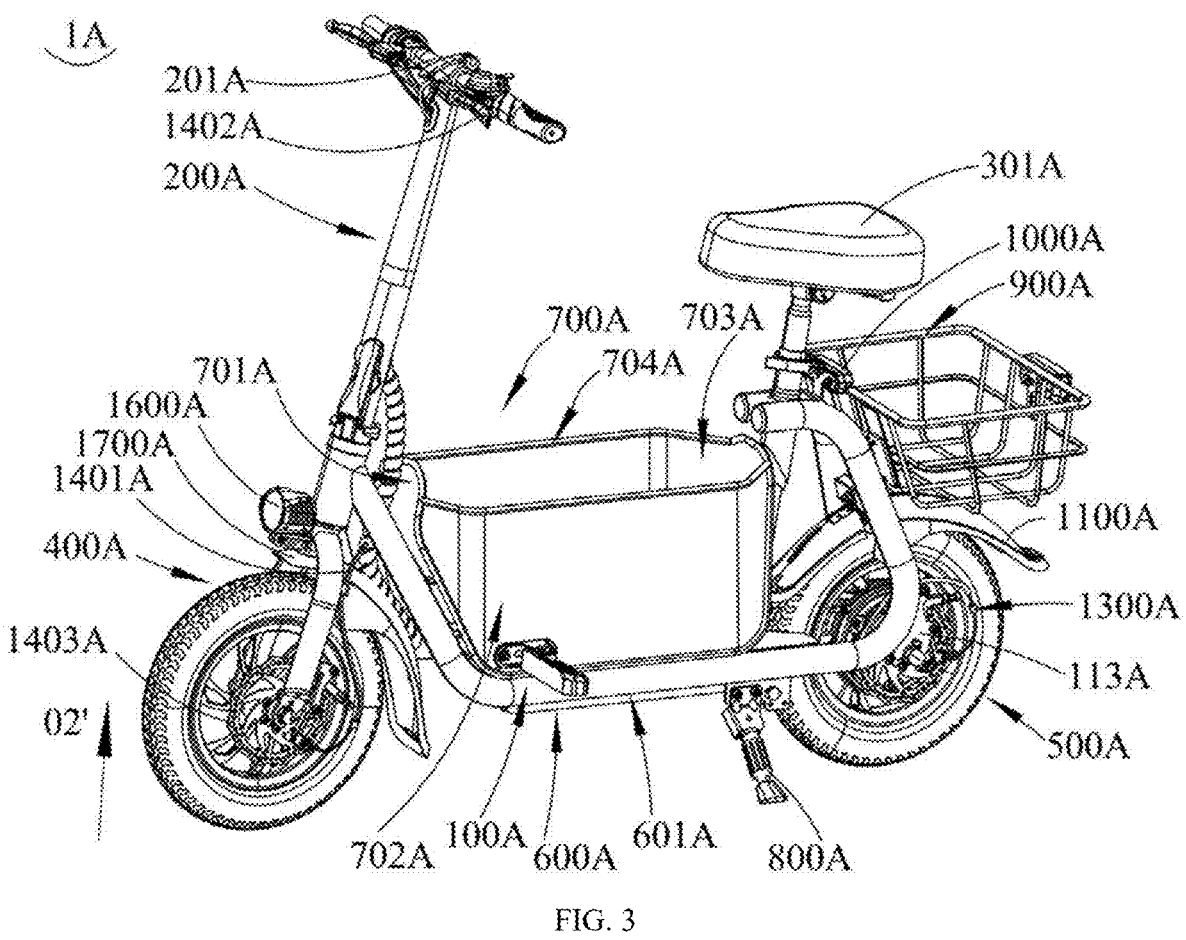
FIG. 3 is a schematic view of another implementation of the vehicle according to an embodiment of the present application.

FIGS. 1A-2 are a set of overall schematic views of the vehicle 1A, and FIG. 3 is a structural schematic view of another implementation of the storage mechanism 700A.

In some embodiments, the terms "frame," "frame assembly," "structural frame," "framework," "support frame," and "mounting frame" may be used interchangeably.

In some embodiments, the terms "front wheel steering mechanism," "front wheel steering assembly," "front steering mechanism," "front steering assembly," "front wheel steering system," "front-wheel steering mechanism," "steering mechanism for the front wheel," "front wheel steering device or apparatus," and "front wheel steering structure or arrangement," as well as "front wheel guiding mechanism," "front wheel guidance mechanism," and "front wheel guide mechanism" may be used interchangeably.

In some embodiments, the terms "seat," "rider seat," "saddle," and "seat assembly" may be used interchangeably.

In some embodiments, the terms "front wheel," "front wheel assembly," "front wheel/tire assembly," and "front wheel and hub assembly" may be used interchangeably.

In some embodiments, the terms "rear wheel," "rear wheel assembly," "rear wheel/tire assembly," and "rear wheel and hub assembly" may be used interchangeably.

In some embodiments, the terms "power mechanism," "power assembly," "power source," "drive assembly," and "power device" may be used interchangeably.

In some embodiments, the terms "storage mechanism," "storage assembly," "storage basket," "basket," "container," "receptacle," "bin," "box," "crate," "cargo rack," and "luggage rack" may be used interchangeably.

As shown in FIGS. 1A, 1B, and 2, or as shown in FIG. 3, the vehicle 1A may include a frame 100A, a front wheel steering mechanism 200A, a seat 301A, a front wheel 400A, a rear wheel 500A, a power mechanism 600A, and at least one storage mechanism 700A. The front wheel steering mechanism 200A may be connected to the front end of the frame 100A, and the seat 301A may be connected to the rear end of the frame 100A. The front wheel 400A may be disposed at the front end of the frame 100A, and the rear wheel 500A may be disposed at the rear end of the frame 100A. The power mechanism 600A may be provided on the frame 100A to supply power for the movement of the vehicle 1A. Additionally, in this embodiment or other embodiments, the storage mechanism may also be referred to as a basket, a storage basket, an organizer basket, and the like.

In some embodiments, the power device 600A may be mounted beneath the base portion 161A.

The storage mechanism 700A may be a multifunctional accessory for carrying various items that a user wishes to transport, such as cargo, children, pets, or groceries. Compared with vehicles in the prior art, the vehicle 1A is capable of accommodating items, thereby facilitating the user's travel.

In some embodiments, the storage mechanism 700A may be a basket (as shown in FIG. 1A), a basket frame (as shown in FIG. 3), a box, or any structure configured to carry items and reduce the risk of items falling. When only one storage mechanism 700A is provided, it may be mounted on the frame 100A and located between the front wheel steering mechanism 200A and the seat 301A. Since the storage mechanism 700A is installed on the frame 100A and positioned between the front wheel steering mechanism 200A and the seat 301A, the user may monitor the items in the storage mechanism 700A even while riding. As such, through the specially designed structure of the vehicle 1A, the safety of the items within the storage mechanism 700A is expected to be enhanced.

When there are two storage mechanisms 700A, one of the storage mechanisms 700A may be mounted on the frame 100A and located between the front wheel steering mechanism 200A and the seat 301A; the other storage mechanism 700A may be located at the front end or the rear end of the frame 100A. By providing two storage mechanisms 700A, the quantity of items that vehicle 1A can carry may be increased. It is also possible to utilize the two storage mechanisms 700A to hold carried items in separate zones, which in turn may prevent the items carried within the two storage mechanisms 700A from contaminating each other. This may also make it easier for the user to find the items carried within the two storage mechanisms 700A, enhancing the user's sense of experience when using vehicle 1A. As an example, dry items may be placed in one storage mechanism 700A, and wet items may be placed in the other storage mechanism 700A. It is understood that both storage mechanisms 700A may be mounted on the frame 100A; for example, the two storage mechanisms 700A may be mounted side-by-side on the frame 100A, thereby allowing for carried items to be held in separate zones and also enhancing the user's sense of experience when using vehicle 1A.

It is worth noting that the number of storage mechanisms 700A may also be multiple. For example, several of the storage mechanisms 700A may be mounted on the frame 100A and located between the front wheel steering mechanism 200A and the seat 301A, and/or one of the storage mechanisms 700A may be located at the front end of the frame 100A, and/or one of the storage mechanisms 700A may be located at the rear end of the frame 100A. It is worth noting that regardless of the number of storage mechanisms 700A, each storage mechanism 700A may be used to carry various items the user wishes to carry, such as cargo, children, pets, or groceries. vehicle 1A may accommodate items, thereby facilitating the user's travel.

Figure 4A:
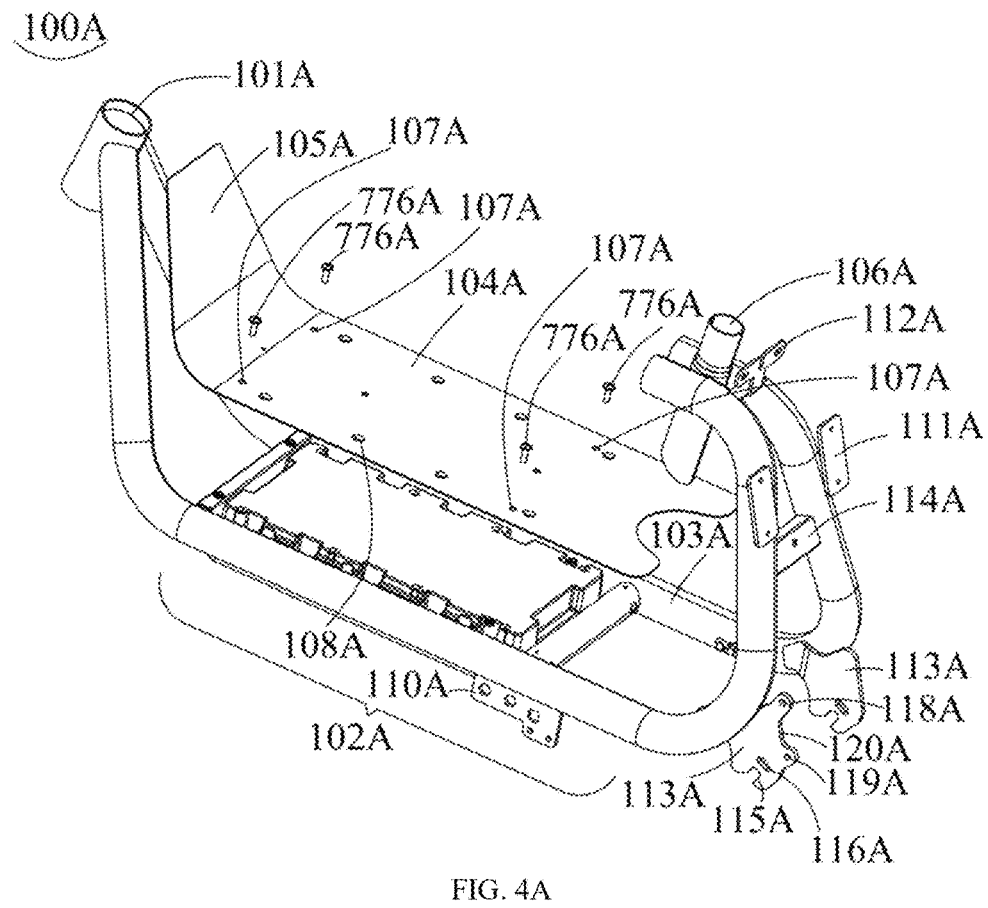
FIG. 4A is an exploded view from one direction of a frame according to an embodiment of the present application.
Figure 5:
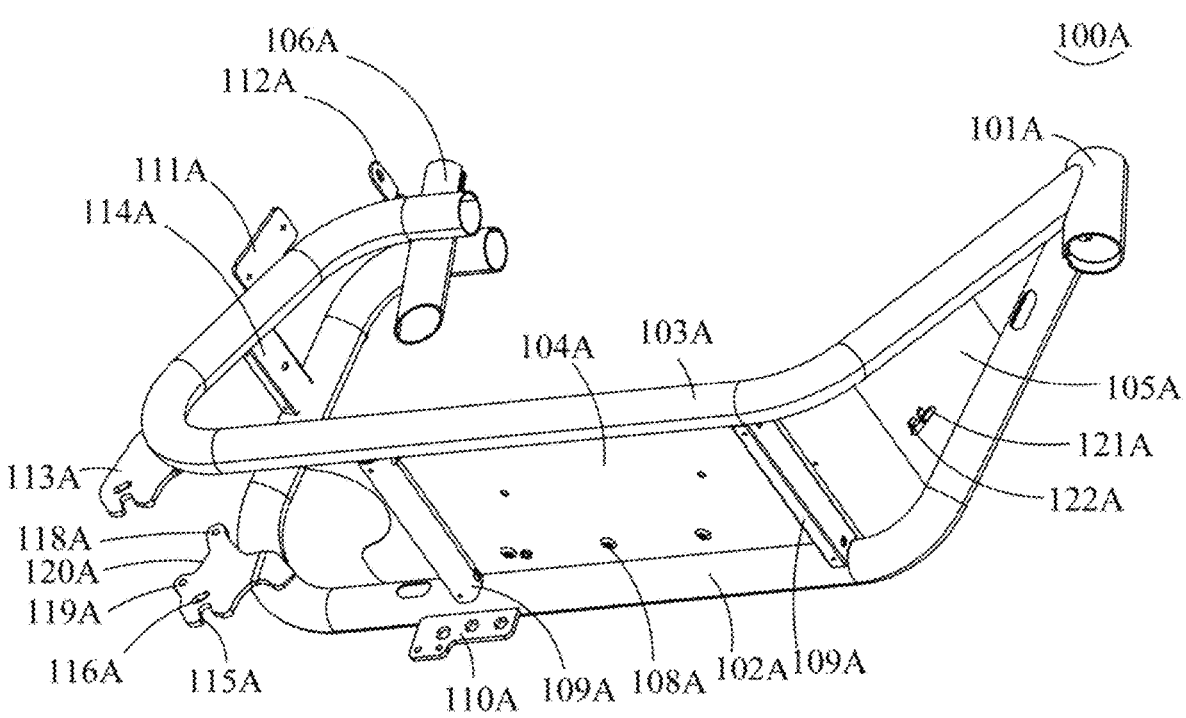
FIG. 5 is a schematic view from another direction of the frame according to an embodiment of the present application.

FIG. 3 is a schematic view of the overall structure of vehicle 1A, and FIGS. 4A and 5 are a set of schematic views of the overall structure of the frame 100A.

In some embodiments, the expressions "extends upward and toward the front," "extends upward in a forward direction," "extends upwardly and forwardly," "rises toward the front," "ascends toward the front," "slopes upward toward the front," "inclines upward toward the front," "projects upward toward the front," "extends forward while rising," and "extends from a lower rear region to a higher front region" may be used interchangeably.

In some embodiments, the expressions "recessed middle section," "recessed central section," "central recess," "recess at a middle portion," "mid-portion recess," "recessed center portion," "depressed central region," "sunken central region," "stepped-down central portion," "lowered center region," "concave central area," and "dished central area" may be used interchangeably.

In some embodiments, the terms "head tube," "steering head," "head pipe," "steering-head tube" may be used interchangeably.

In some embodiments, the terms "first bracket," "first support member," "first frame member," "first structural member," "first frame tube," "first side tube," "first side rail," "first frame rail," "first longitudinal member," "first side member," "first beam," and "first stay" may be used interchangeably.

In some embodiments, the terms "second bracket," "second support member," "second frame member," "second structural member," "second frame tube," "second side tube," "second side rail," "second frame rail," "second longitudinal member," "second side member," "second beam," "second bar," and "second stay" may be used interchangeably.

In some embodiments, the terms "support plate," "supporting plate," "support plate member," "support panel," "support base plate," "support deck," "support deck plate," "load-support plate," and "load-bearing support plate" may be used interchangeably. The terms "reinforcement plate," "cross-member," "crossbeam," "structural member," "reinforcing member," "structural brace," and "frame brace" may be used interchangeably.

In some embodiments, the terms "middle tube," "center tube," "central tube," "socket tube," "receiving tube," "post sleeve" may be used interchangeably.

In some embodiments, the terms "middle portion," "central portion," "central region," "intermediate portion," "intermediate section," "mid-length region," "midspan region," and "central span" may be used interchangeably. The terms "upper surface," "top surface," "upper face," "upper-side surface," "upper-facing surface," "upward-facing surface," "upper side," "upper surface region" and "upwardly facing surface" may be used interchangeably. In some embodiments, references to an "upper surface" of a member may mean the member's upper side with respect to the vehicle coordinate system. The term may encompass one or more upper-surface regions that may be non-coplanar, at different elevations, and/or spaced apart. For example, "mounted on the upper surface of the base portion" may include: (1) fastening a basket to two or more upper-side mounting regions of the base portion may be located at different heights, and (2) fastening the basket to a single, co-planar upper-side mounting region of the base portion that may be located at a common elevation.

Regarding the aforementioned frame 100A, the frame 100A may be used to connect the front wheel steering mechanism 200A and the seat 301A, and the frame 100A may be used for the installation of the storage mechanism 700A. Please refer to FIGS. 3-5. FIGS. 4A and 5 illustrate an implementation of the frame 100A from different perspectives. The overall shape of the frame 100A may approximately present a form with both ends extending upward and forward and a recessed middle section, such that the two ends of the frame 100A may respectively provide support for the front wheel steering mechanism 200A and the seat 301A, and the recessed middle of the frame 100A may thereby accommodate the storage mechanism 700A.

In some embodiments, please refer to FIG. 3 and FIG. 4A. An implementation of the frame 100A may be that the frame 100A includes a head tube 101A, a first bracket 102A (which may also be called a frame tube 102A, and this same structure may also be referred to as, for example, a left frame tube 169A in other views such as FIG. 13J), a second bracket 103A (which may also be called a frame tube 103A, and this same structure may also be referred to as, for example, a right frame tube 170A in other views such as FIG. 13J), a support plate 104A, a reinforcement plate 105A, and a middle tube 106A. The head tube 101A may be used to connect the front wheel steering mechanism 200A to the frame 100A. The middle tube 106A may be used to connect the seat 301A to the frame 100A. The first bracket 102A, the second bracket 103A, and the support plate 104A may be used to support the head tube 101A and the middle tube 106A. Wherein, the front end of the first bracket 102A and the front end of the second bracket 103A may respectively extend forward and upward to connect with the head tube 101A; the rear end of the first bracket 102A and the rear end of the second bracket 103A may respectively extend forward and upward to clamp the middle tube 106A; the middle portion of the first bracket 102A and the middle portion of the second bracket 103A may be spaced apart, and the support plate 104A may be mounted on the middle portion of the first bracket 102A and the middle portion of the second bracket 103A. The support plate 104A may be a flat plate (or planar board), located in the aforementioned recessed middle area (or concave central region) of the frame 100A, and the support plate 104A may be used for mounting the storage mechanism 700A. At least due to the flat plate-like construction of the support plate 104A, the storage mechanism 700A as a whole or in part can be mounted substantially horizontally onto the upper surface of the support plate 104A. The reinforcement plate 105A (this same component may also be referred to as an inclined portion 177A in other examples, see FIG. 13K) may be formed by extending upward and forward from the support plate 104A, and the reinforcement plate 105A may be mounted on the front end of the first bracket 102A and the front end of the second bracket 103A. It is worth noting that the first bracket 102A may include multiple segments, which are clearly shown in FIGS. 1A-9D and are further detailed in, for example, FIG. 13J. These segments of the first bracket 102A may be integrally formed parts or may be separate components connected to each other to form the first bracket 102A. Similarly, the second bracket 103A may include multiple segments, which are clearly shown in FIGS. 1A-9D and are further detailed in, for example, FIG. 13J. These segments of the second bracket 103A may be integrally formed parts or may be separate components connected to each other to form the second bracket 103A.

In some embodiments, the support plate 104A may have a plurality of first threaded holes 107A and a plurality of second threaded holes 108A. The first threaded holes 107A may be used to mount the storage mechanism 700A via fourth bolts 776A, and the second threaded holes 108A may be used for mounting the power mechanism 600A. It is worth noting that, for the threaded holes mentioned in the present application for mounting the storage mechanism 700A, a person of ordinary skill in the art would understand that such threaded holes incidentally and inherently disclose a matching threaded fastener (such as a screw, e.g., bolt 776A, or a threaded connecting post) for threaded engagement to achieve a detachable connection/installation of certain components (e.g., the storage mechanism 700A). Of course, unless the context specifies otherwise, the specific type of fastener does not constitute a limitation. More specifically, the term "threaded hole" itself inherently and definitively indicates to a person of ordinary skill in the art that it is to be used in cooperation with a corresponding threaded fastener (such as a bolt/screw); further combined with the functional statement "for mounting the storage mechanism" and the overall disclosure of the accompanying plate-shaped mounting member (mounting member 705A)/locking structure in the context of the present application, this is sufficient for a person of ordinary skill in the art to clearly understand the inherent cooperative relationship between the threaded hole and the threaded fastener. More generally, it is noted that if certain terms in the claims of the present application, such as technical features, elements, configuration relationships, dimensional relationships, angular relationships, technical effects, etc., lack an initial or surface-level textual description in the specification's written portion, the applicant asserts that these terms may be substantially and inherently disclosed to a person of ordinary skill in the art based on a full understanding of the context of the present application (including the drawings) and common general knowledge in the art. In particular, the drawings of the present application can also provide written descriptive support for these terms, and in some cases, for example, written descriptions of angular relationships are more preferably supported by the drawings. In summary, the technical features, component elements, configuration relationships, dimensional/angular relationships, and technical effects involved in the present application should be understood in conjunction with the drawings and the context; for a person of ordinary skill in the art, anything that can be directly and unambiguously determined from the text and drawings of the present application (for example, that a threaded hole inherently corresponds to a threaded fastener) is considered part of the disclosure of the present application.

Further, in some embodiments, the aforementioned plurality of first threaded holes 107A and the corresponding plurality of inherent threaded fasteners may cooperate to form an installation system. This installation system may perform a first operation to securely fasten the storage basket to the support plate without loosening, and may also perform a second operation to remove the storage basket from the support plate.

Referring to FIGS. 3 and 5, in some embodiments, the frame 100A may include at least one reinforcing rib 109A (also referred to as a structural crossbeam 109A), and the reinforcing rib 109A may be mounted on the side of the support plate 104A facing away from the seat 301A. After installing the reinforcing rib 109A, the load-bearing capacity of the frame 100A may be enhanced. In addition, the storage mechanism 700A may be mounted on the reinforcing rib 109A to increase the stability of the connection between the storage mechanism 700A and the frame 100A. In some embodiments, the number of reinforcing ribs 109A may be two, the two reinforcing ribs 109A are disposed oppositely, and the two reinforcing ribs 109A may be respectively connected to the front end and rear end of the support plate 104A.

In some embodiments, continuing to refer to FIGS. 4A and 5, the frame 100A may include a first weld tab 110A, a second weld tab 111A, a third weld tab 112A, a rear fork web 113A, and a reinforcement rod 114A. Wherein, the first weld tab 110A may be connected to the middle portion of the first bracket 102A or the middle portion of the second bracket 103A, and the first weld tab 110A may be used to connect a kickstand 800A (as shown in FIG. 3). Wherein, the number of second weld tabs 111A may be two; one second weld tab 111A may be connected to the rear end of the first bracket 102A, and the other second weld tab 111A may be connected to the rear end of the second bracket 103A. The second weld tab 111A may be used to mount a rear basket 900A (as shown in FIG. 3). Wherein, one end of the third weld tab 112A may be connected to the rear end of the first bracket 102A and the rear end of the second bracket 103A, and the other end of the third weld tab 112A may extend upward and may be used to connect a tail-light 1000A (as shown in FIG. 3). Wherein, the reinforcement rod 114A may be supported between the rear end of the first bracket 102A and the rear end of the second bracket 103A, and the reinforcement rod 114A may be used to connect a rear fender 1100A (as shown in FIG. 3).

Figure 6A:
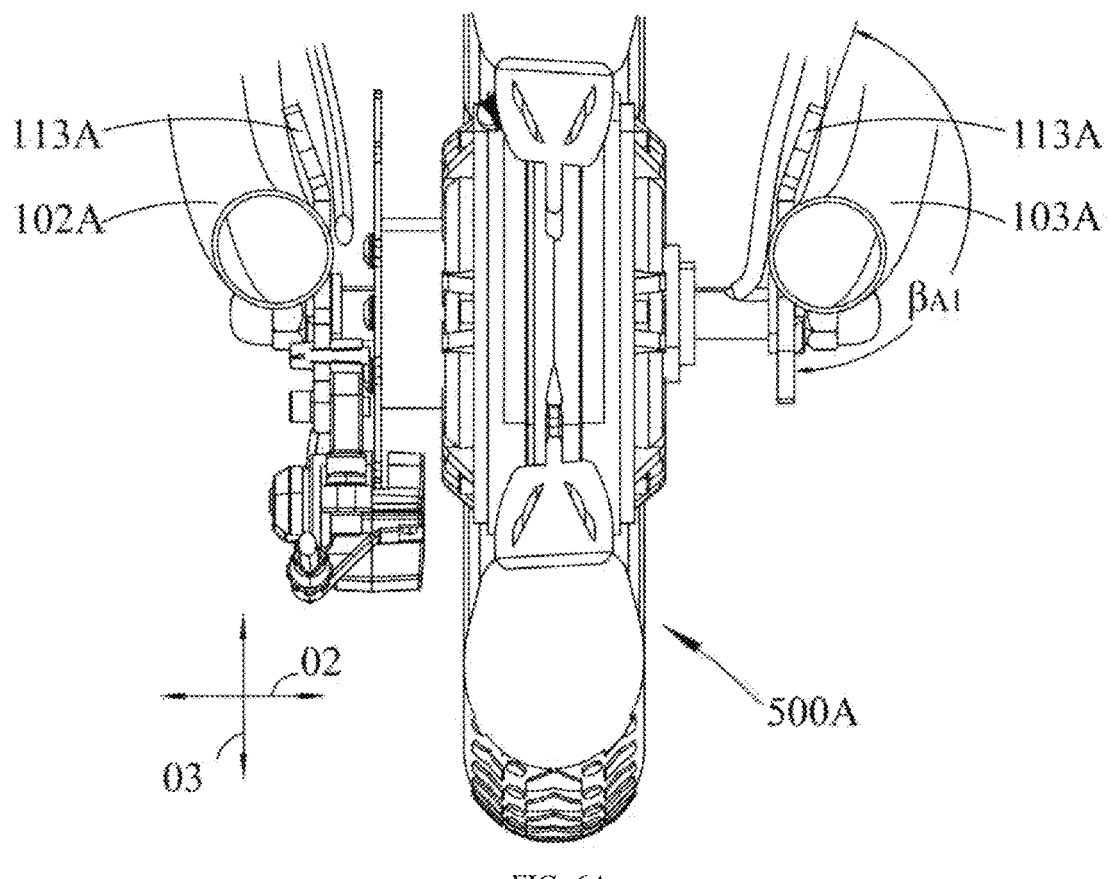
FIGS. 6A-6B are a set of schematic views illustrating the installation details of the rear fork web with the rear wheel according to an embodiment of the present application.
Figure 6B:
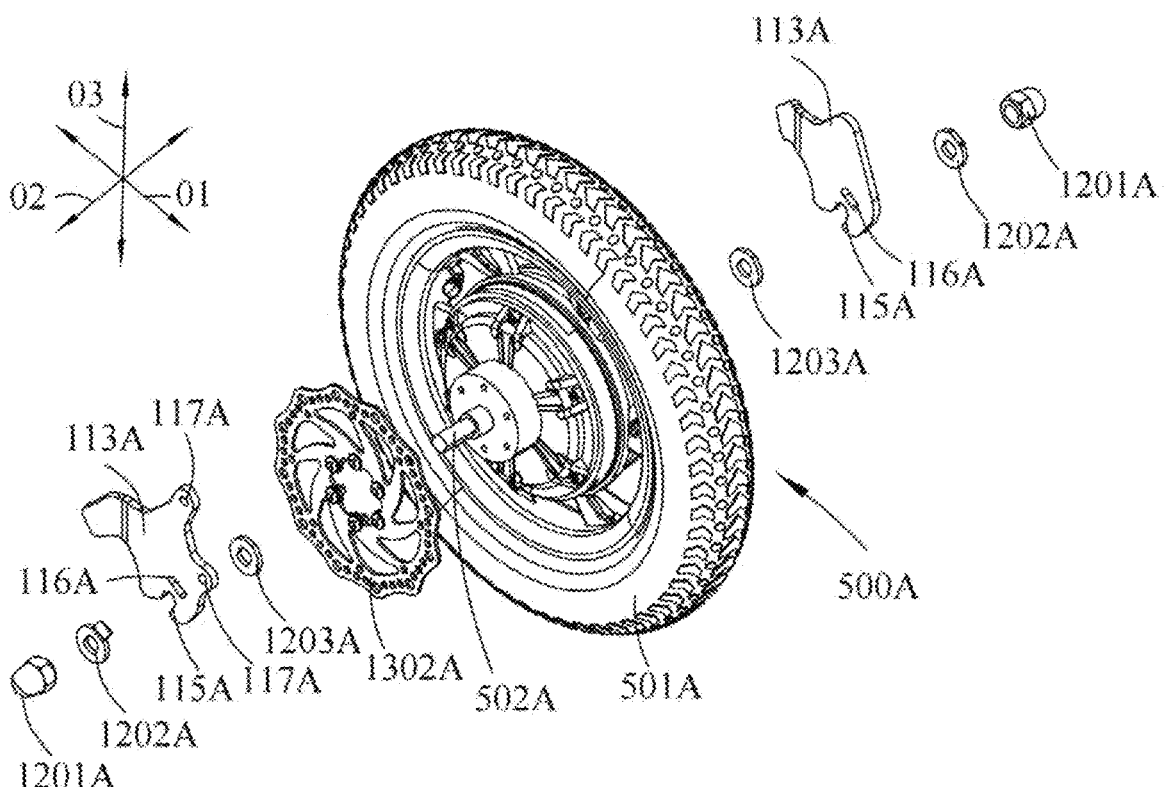

FIGS. 6A-6B are a set of schematic views illustrating the installation details of the rear fork web 113A with the rear wheel 500A, wherein FIG. 6A is a sectional view, and FIG. 6B is an exploded view.

Referring to FIG. 6A, in some embodiments, the rear fork web 113A may be configured to enclose or form a space along the second direction 02 that is located at the bottom end and is for mounting the rear wheel 500A. Additionally, the rear fork web 113A may also be used to connect the rear wheel 500A and other portions of the frame 100A, such as the first bracket 102A or the second bracket 103A.

Referring to FIG. 6B, in some embodiments, the rear fork web 113A may be approximately sheet-like or plate-like, and its thickness may fall within the range of 4 mm to 7 mm. When the thickness of the rear fork web 113A is greater than or equal to 4 mm, it has better structural strength and is expected to support a heavier frame 100A or items, reducing bending or deformation. When the thickness of the rear fork web 113A is less than or equal to 7 mm, it helps to reduce the self-weight of the rear fork web 113A and lower material cost.

In some embodiments, the thickness of the rear fork web 113A may be any value within the range of 4 mm to 7 mm, for example, 4 mm, 4.5 mm, 5 mm, 5.5 mm, 6 mm, 6.5 mm, or 7 mm.

Referring to FIG. 6B, in some embodiments, the rear fork web 113A may be configured such that, along the first direction 01, the front end may extend outward, and the rear end may be approximately flat. In combination with FIG. 6A, the outward extension of the front end is expected to reduce the complexity of fitting with the first bracket 102A or the second bracket 103A, eliminating the need for additional connecting members and facilitating installation. Furthermore, having a contact area after installation may ensure the stability of the connection. The rear end may be approximately flat, which is expected to reduce the complexity of hole formation for mounting the rear wheel 500A.

Referring to FIG. 6B, in some embodiments, the front end of the rear fork web 113A may be arc-shaped and is expected to have a better degree of fit with the first bracket 102A or the second bracket 103A.

Referring to FIG. 6A, in some embodiments, the rear fork web 113A may be a bent member, and the bending angle $\beta_{A1}$ may fall within the range of 150° to 170°. When $\beta_{A1} \geq 150°$, along the first direction 01, it is expected to reduce the fitting difficulty between the front end of the rear fork web 113A and the first bracket 102A (or the second bracket 103A), and helps the front end of the rear fork web 113A to have a larger fitting area with the first bracket 102A (or the second bracket 103A), ensuring connection strength. When $\beta_{A1} \leq 170°$, it is expected to enhance the shape stability of the rear fork web 113A, reduce spring-back effects, and ensure dimensional stability and consistency in mass production.

Specifically, $\beta_{A1}$ may be any value within the range of 150° to 170°, for example, 150°, 154°, 158°, 162°, 166°, or 170°.

Referring to FIG. 6B, in some embodiments, the rear fork web 113A may be configured such that along the first direction 01, its front end is narrow and its rear end is wide. In combination with FIG. 6A, the narrow front end of the rear fork web 113A, when being installed with the first bracket 102A or the second bracket 103A, is expected to reduce the occupation of space around the first bracket 102A or the second bracket 103A, so as to facilitate the installation of other parts or components, such as the rear wheel 500A. At the same time, this is also beneficial for reducing material cost. The wide rear end of the rear fork web 113A is expected to still have good material strength after hole formation, ensuring service life.

Referring to FIG. 6A, in some embodiments, the rear wheel 500A may include a rear tire 501A and a motor shaft 502A. The bottom side of the rear fork web 113A may be provided with a first recess 115A for accommodating the motor shaft 502A. During installation, the motor shaft 502A may be pushed in from the side of the rear fork web 113A, which facilitates easy installation. Additionally, along the second direction 02, the installation method for the left end and right end of the motor shaft 502A may be the same; here, the left end is taken as an example for description. The vehicle 1A may include a first nut 1201A, a first washer 1202A, and a second washer 1203A, sequentially arranged along the second direction 02. The first nut 1201A may be used to connect the portion of the motor shaft 502A that extends out from the rear fork web 113A. The first washer 1202A may be clamped between the first nut 1201A and the rear fork web 113A, and the second washer 1203A may be clamped between the rear fork web 113A and the motor shaft 502A.

Referring to FIG. 6A, in some embodiments, the first nut 1201A may be a round-head nut with no sharp corners on its edges. This is expected to reduce instances of scratching the surfaces of other parts or components during installation and also helps to reduce the risk of scratching or bumping nearby personnel or animals, enhancing safety. Additionally, the rounded appearance is also expected to enhance the aesthetic appeal of vehicle 1A.

In other embodiments, the first nut 1201A may also be other types of nuts, such as a hub nut, a hex nut, or a flange nut.

In some embodiments, the specification of the first nut 1201A may be M12, which is expected to provide good load capacity while also being relatively compact.

In other embodiments, the first nut 1201A may also be of other specifications, such as M8, M10, or M14.

Referring to FIG. 6B, in some embodiments, the first washer 1202A may be a hooked washer, and the rear fork web 113A may be provided with a first mounting hole 116A for the first washer 1202A to be embedded in. During installation, the hook of the hooked washer may be embedded in the first mounting hole 116A, reducing the risk of the first nut 1201A loosening, for example, under bumpy road conditions. Specifically, when the first nut 1201A has a tendency to loosen, it will tend to drive the hooked washer to rotate with it, but the hook of the hooked washer is constrained by the first mounting hole 116A, reducing the chance of rotation. This causes the first nut 1201A to also have a reduced chance of rotating in the loosening direction.

In other embodiments, the first washer 1202A may also be other types of washers, for example, a flat washer with a round hole.

In some embodiments, the specification of the first washer 1202A may be M12, which is expected to provide good load capacity while also being relatively compact.

In other embodiments, the first washer 1202A may also be of other specifications, such as M8, M10, or M14.

Referring to FIG. 6A, in some embodiments, the second washer 1203A may be a square-hole washer, which is expected to allow for the rapid completion of positioning and installation with the motor shaft 502A.

In some embodiments, the first washer 1202A and the second washer 1203A may both be metal washers, which are expected to provide better strength and better rigidity, making them suitable for complex road conditions such as rugged or vibrating environments.

Figure 7A:
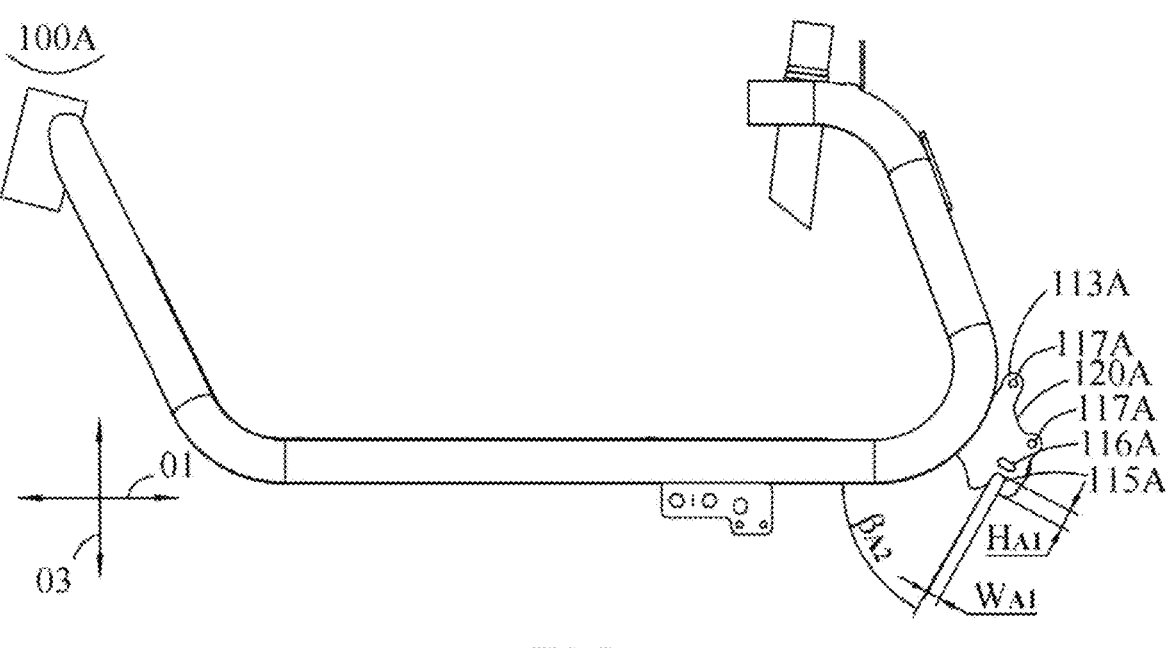
FIGS. 7A-7C are another set of schematic views illustrating the installation details of the rear fork web with the rear wheel according to an embodiment of the present application.
Figure 7B:
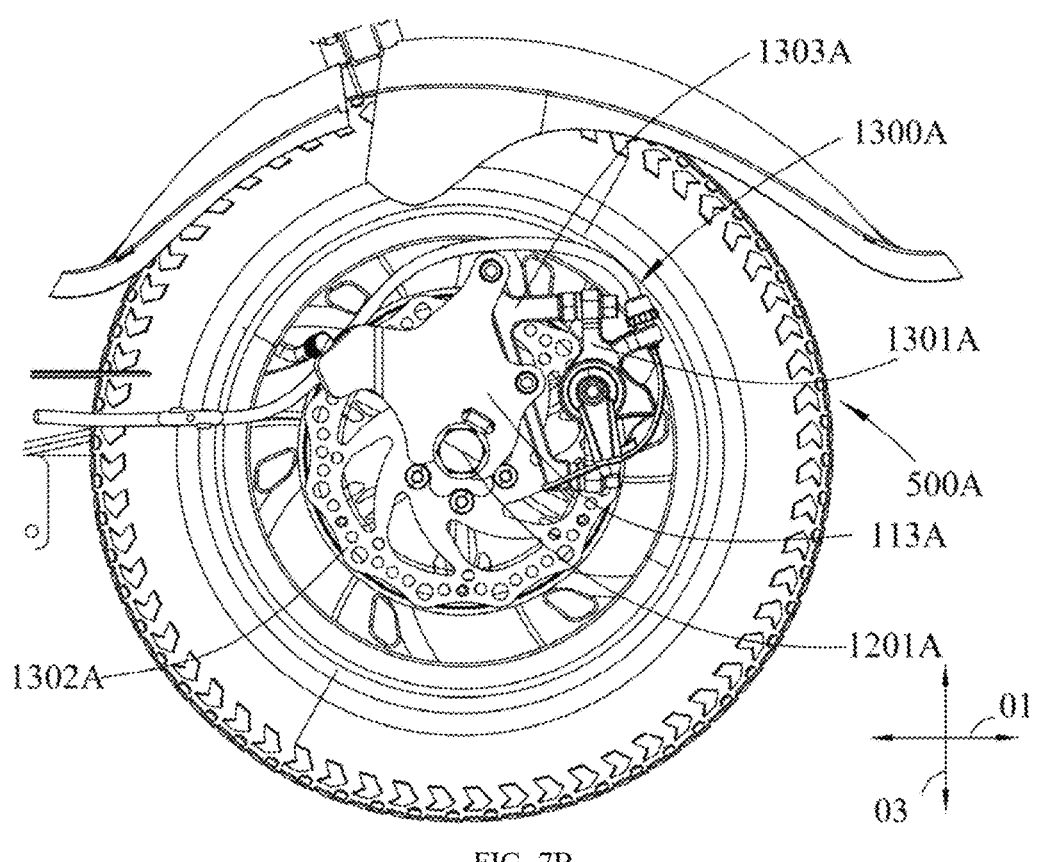
Figure 7C:
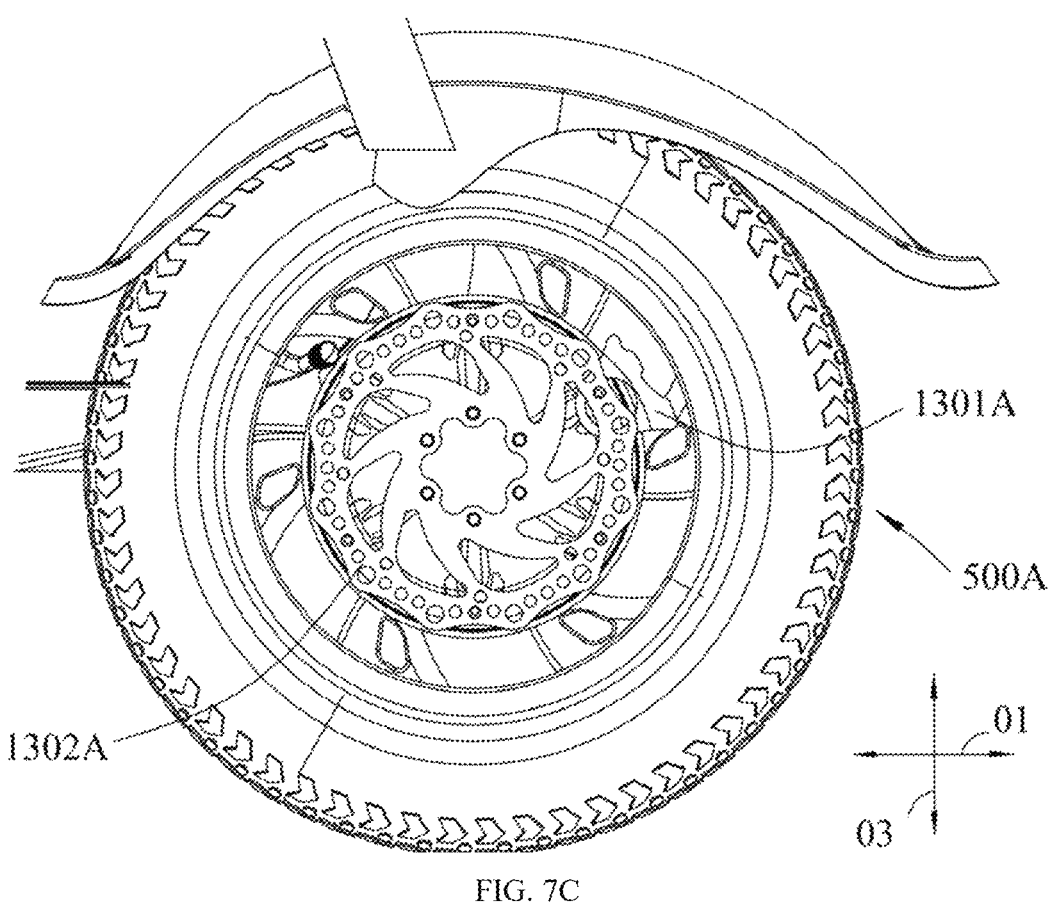

FIGS. 7A-7C are another set of installation schematic views of the rear fork web 113A and the rear wheel 500A, wherein FIG. 7C is a sectional view of FIG. 7B.

Referring to FIG. 7A, in some embodiments, the width $W_{A1}$ of the first recess 115A may fall within the range of 8 mm to 15 mm, and the height $H_{A1}$ may fall within the range of 8 mm to 15 mm. When $W_{A1} \geq 8$ mm, in combination with FIG. 6B, the accommodated motor shaft 502A is expected to have better load capacity. When $W_{A1} \leq 15$ mm, the compatible motor shaft 502A has a smaller shape, which is expected to reduce material cost and assist with miniaturized design. Additionally, it is also expected to ensure that the rear fork web 113A has a strength to meet load requirements. When $H_{A1} \geq 8$ mm, the motor shaft 502A is expected to be better accommodated by the first recess 115A, reducing the risk of the motor shaft 502A being bumped. When $H_{A1} \leq 15$ mm, it is expected to ensure that the rear fork web 113A has a strength, reducing instances of deformation or bending.

Specifically, $W_{A1}$ may be any value within the range of 8 mm to 15 mm, such as 8 mm, 9 mm, 10 mm, 11 mm, 12 mm, 13 mm, 14 mm, or 15 mm. $H_{A1}$ may be any value within the range of 8 mm to 15 mm, including but not limited to 8 mm, 9 mm, 10 mm, 11 mm, 12 mm, 13 mm, 14 mm, or 15 mm.

Referring to FIG. 7B, in some embodiments, the rear brake 1300A may include a brake caliper 1301A and a disk brake rotor 1302A. Along the first direction 01, the brake caliper 1301A may be located on the rear side of the rear fork web 113A and fixed thereto, and the disk brake rotor 1302A may be fixed to the rear wheel 500A.

Referring to FIG. 7A, the included angle $\beta_{42}$ between the first recess 115A and the first plane may fall within the range of 55° to 70°.

Referring to FIGS. 7A and 7C, when $\beta_{42} \leq 70°$, during the process of disassembling the rear wheel 500A, it is expected that as the motor shaft 502A is removed from the first recess 115A, a moderate downward and diagonal offset is produced. This thereby provides a more reasonable clearance space between the disk brake rotor 1302A and the brake caliper 1301A, reducing the risk of interference between the brake caliper 1301A and the disk brake rotor 1302A, and helping to reduce situations where it is necessary to first disassemble the brake caliper 1301A to make way for the rear wheel 500A and the disk brake rotor 1302A. When $\beta_{42} \geq 55°$, it may help to optimize the spatial layout required for disassembling the rear wheel 500A, balance the positional relationship of components on the front side of the rear wheel 500A, and reduce spatial conflicts, thereby helping to maintain the compactness of the frame 100A. Specifically, $B_{42}$ may be any value within the range of 55° to 70°, such as 55°, 57°, 59°, 61°, 63°, 65°, 67°, 69°, or 70°.

Referring to FIG. 7A, in some embodiments, the included angle between the first mounting hole 116A and the first plane may be the same as $\beta_{42}$. This is expected to make the rear fork web 113A more aesthetically pleasing and is also expected to form more regular machining position features, simplifying the machining path and reducing machining difficulty.

Referring to FIG. 7B, in some embodiments, the rear brake 1300A may include a brake caliper bracket 1303A. Referring to FIG. 6B, along the second direction 02, one of the two rear fork webs 113A may be provided with a second mounting hole 117A corresponding to the brake caliper bracket 1303A. This helps to fully utilize the rear fork web 113A, allowing it to have more functions-such as being fixed to the first bracket 102A or the second bracket 103A as shown in FIG. 6A, and mounting the motor shaft 502A as shown in FIG. 6B-which is expected to simplify the structural design.

Referring to FIG. 6A, in some embodiments, the rear fork web 113A may be fixed to the first bracket 102A or the second bracket 103A by welding.

Referring to FIGS. 4A and 5, it is worth noting that the second weld tab 111A, the third weld tab 112A, and the reinforcement rod 114A may all be mounted on the rear end of the first bracket 102A and the rear end of the second bracket 103A. Along the direction of the forward and upward extension of the rear end of the first bracket 102A, the reinforcement rod 114A, the second weld tab 111A, and the third weld tab 112A may be sequentially arranged. Wherein, the number of rear fork webs 113A may be two; one rear fork web 113A is connected at a approximately bendable location, which may specifically refer to the connection point between the middle portion and the rear end of the first bracket 102A, and the other rear fork web 113A is connected at a approximately bendable location, which may specifically refer to the connection point between the middle portion and the rear end of the second bracket 103A. Referring to FIGS. 3-4A, it is worth noting that the rear fork web 113A may be used to connect the frame 100A and the rear wheel 500A. Specifically, the front end of the rear fork web 113A may be connected with the first bracket 102A or the second bracket 103A. The upper part of the rear end of the rear fork web 113A may have a first mounting protrusion 118A and a second mounting protrusion 119A extending therefrom. The first mounting protrusion 118A and the second mounting protrusion 119A may be spaced apart and the first mounting protrusion 118A and the second mounting protrusion 119A may be used to mount the rear brake 1300A (as shown in FIG. 3). The portion between the first mounting protrusion 118A and the second mounting protrusion 119A is recessed to form a second recess 120A, and the second recess 120A may be adapted to the shape of the rear brake 1300A. Additionally, the lower part of the rear end of the rear fork web 113A is recessed upward and backward to form a first recess 115A. The first recess 115A may be used to engage the motor shaft 502A (as shown in FIG. 6B). The rear end of the rear fork web 113A may be provided with a first mounting hole 116A. The first mounting hole 116A may be provided near the first recess 115A and may be used for the installation of parts for the motor shaft 502A.

Referring to FIG. 5, it is worth noting that, in some embodiments, the frame 100A may include a cable retaining structure 121A. In combination with FIG. 3, the cable retaining structure 121A may be provided on the side of the reinforcement plate 105A facing away from the seat 301A, that is, the cable retaining structure 121A is provided on the front of the reinforcement plate 105A. The cable retaining structure 121A may be provided with a retaining hole 122A, and the retaining hole 122A may be used to retain the brake cable 1401A (as shown in FIG. 3), thereby allowing the brake cable 1401A to be as close as possible to the frame 100A, which helps to reduce the risk of the brake cable 1401A being hooked by foreign objects or even being damaged. It should be noted that the user may select the cable retaining structure 121A according to actual needs; in other words, the brake cable 1401A may also be attached to other parts or components of the vehicle 1A. Regarding the aforementioned front wheel steering mechanism 200A, please refer to FIG. 3. The front wheel steering mechanism 200A may be connected to the front end of the frame 100A and is used to guide the direction of the front wheel 400A. In some embodiments, the front wheel steering mechanism may also be referred to as a front wheel steering assembly, having a structure known in the art, which may include but is not limited to: a front fork, a steering shaft, a steering tube connected to the handlebar/grips, and their equivalent structures.

Figure 8:
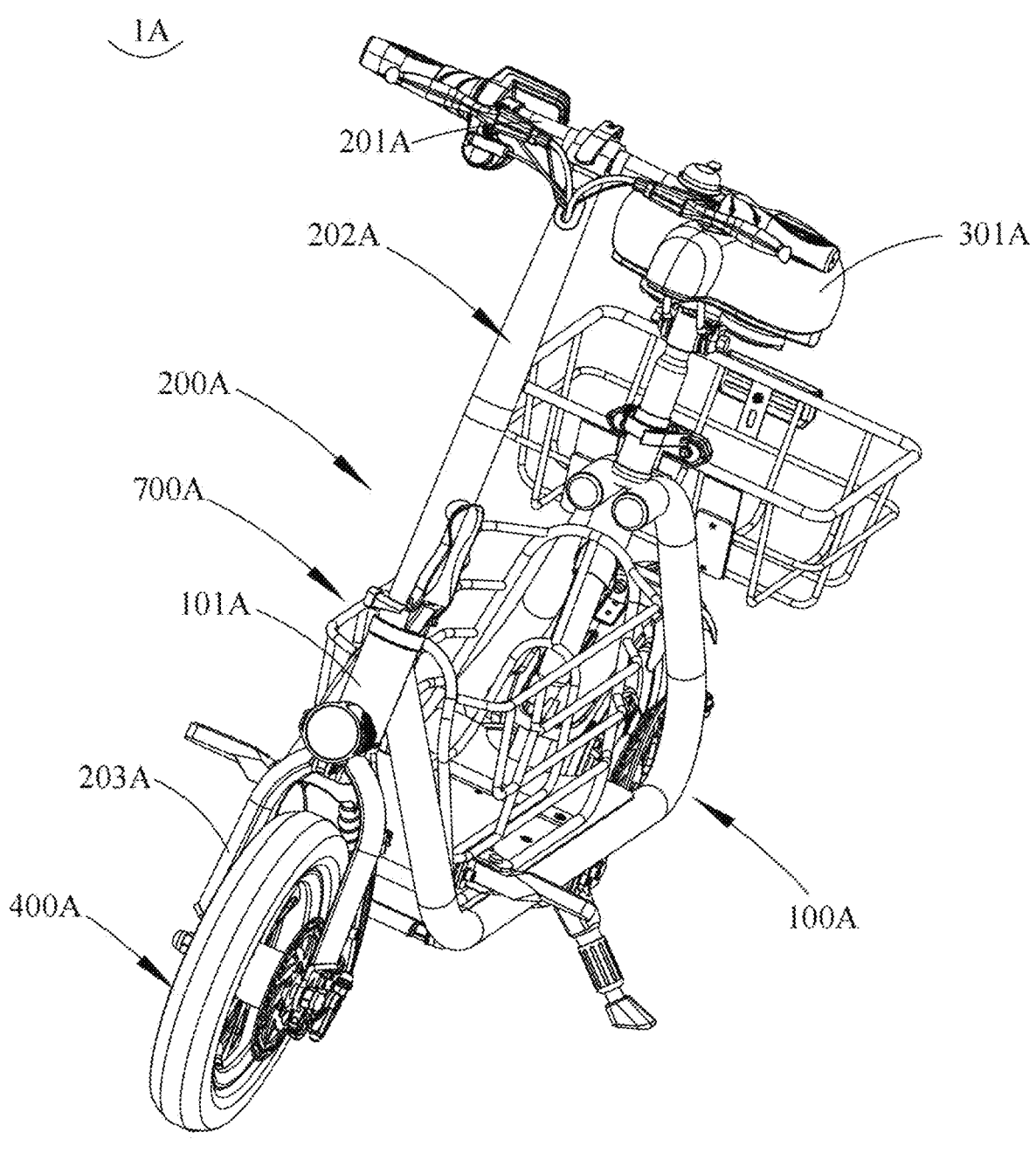
FIG. 8 is a schematic view from another direction of an implementation of the vehicle according to an embodiment of the present application.

FIG. 8 is a schematic view from another direction of an implementation of the vehicle 1A.

Referring to FIG. 8, in some embodiments, the front wheel steering mechanism 200A may include a handlebar 201A, a stem 202A, and a front fork 203A. The handlebar 201A may be mounted on one end of the stem 202A. The other end of the stem 202A may pass through the head tube 101A of the frame 100A (as shown in FIG. 5) and be connected with the front fork 203A. The stem 202A and the front fork 203A may both be rotatably connected to the head tube 101A of the frame 100A. The front wheel 400A may be mounted on the front fork 203A, and through the handlebar 201A, the stem 202A, and the front fork 203A, the direction of the front wheel 400A may be guided.

Figure 9A:
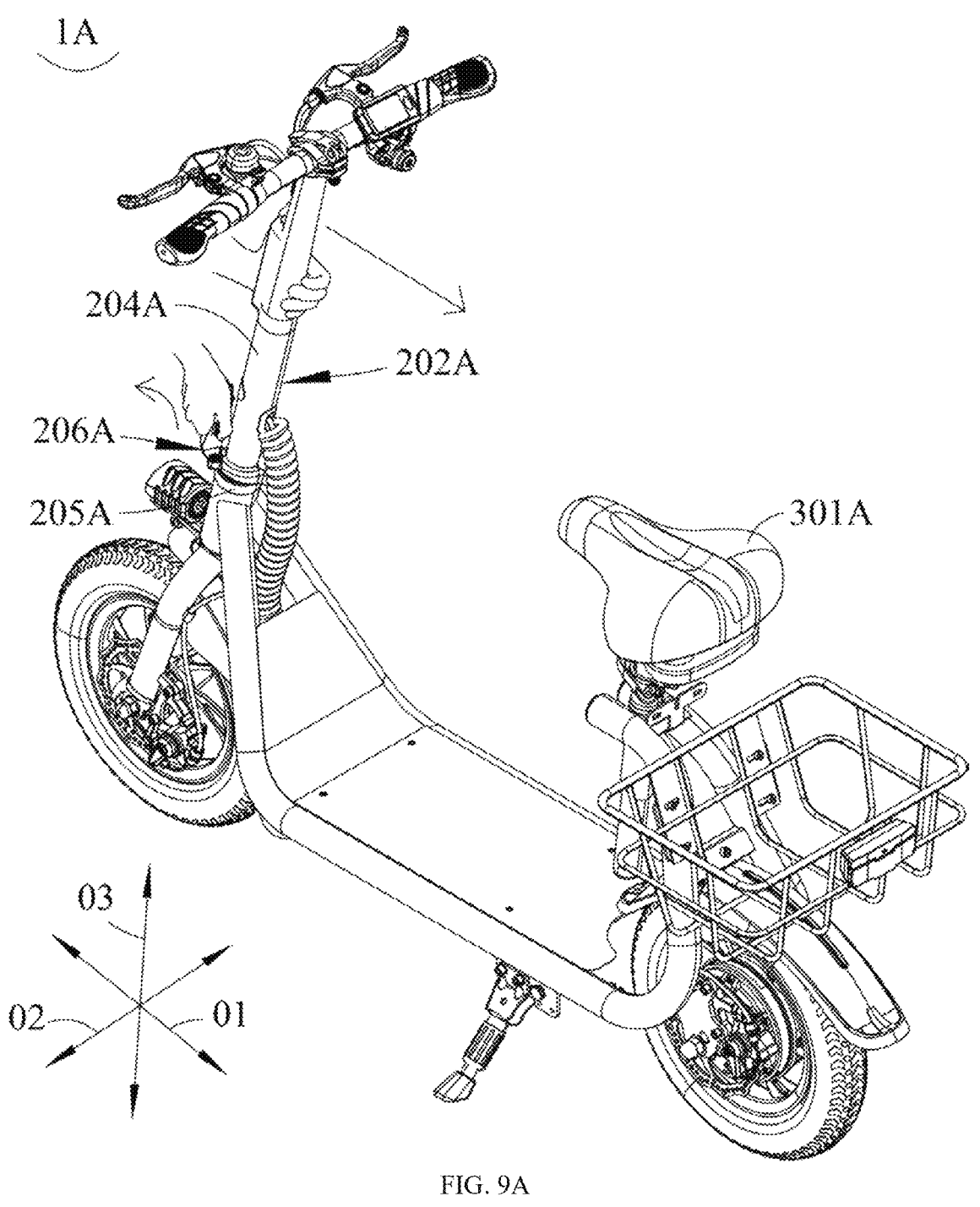
FIGS. 9A-9D are a set of schematic views illustrating folding operations of the stem according to an embodiment of the present application.
Figure 9B:
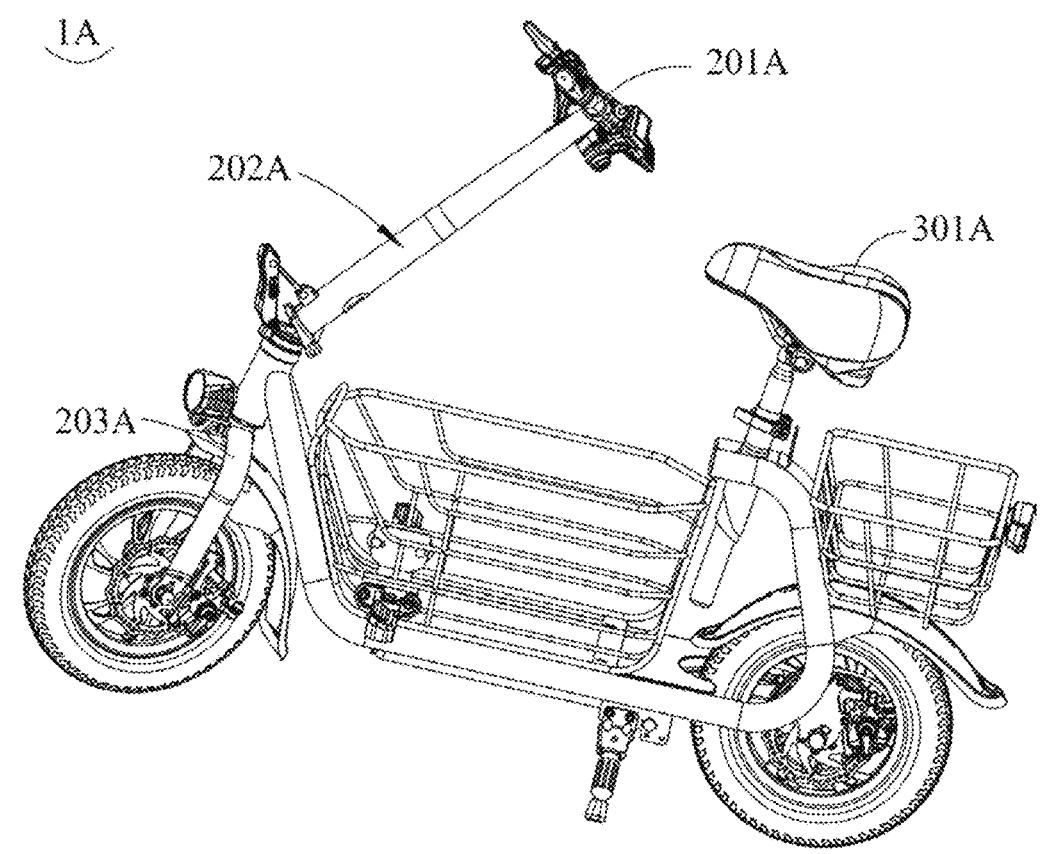
Figure 9C:
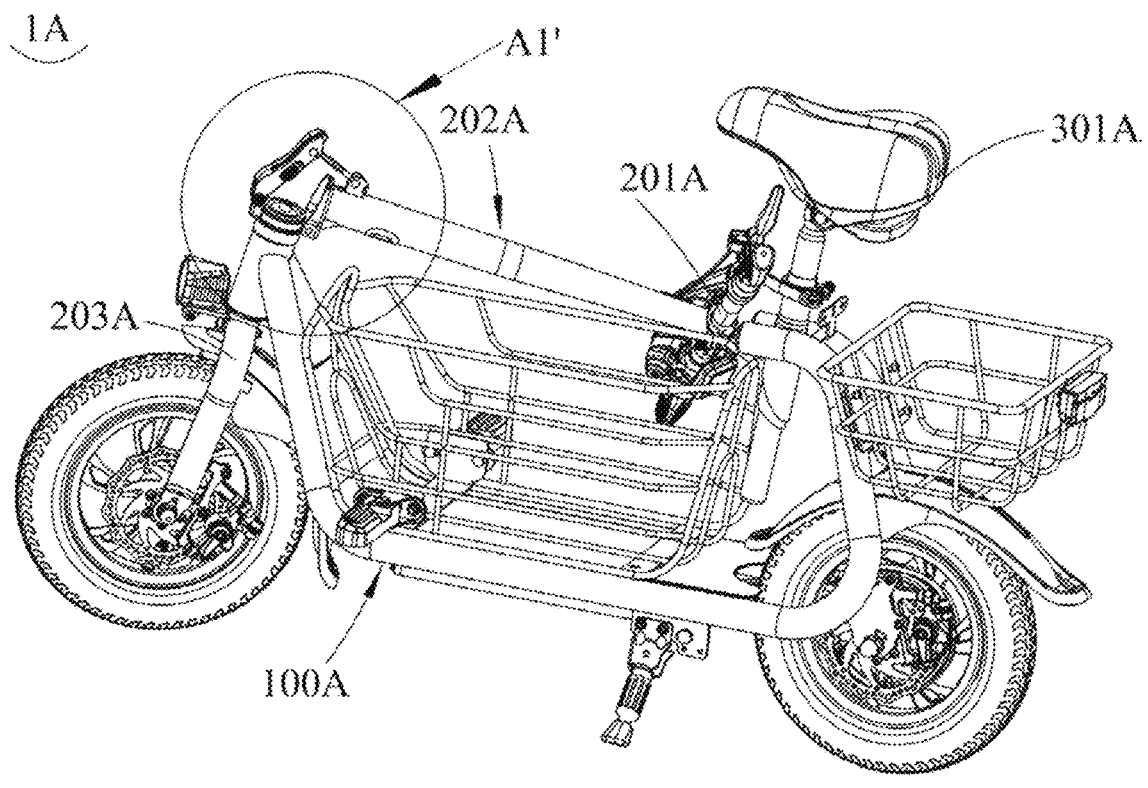
Figure 9D:
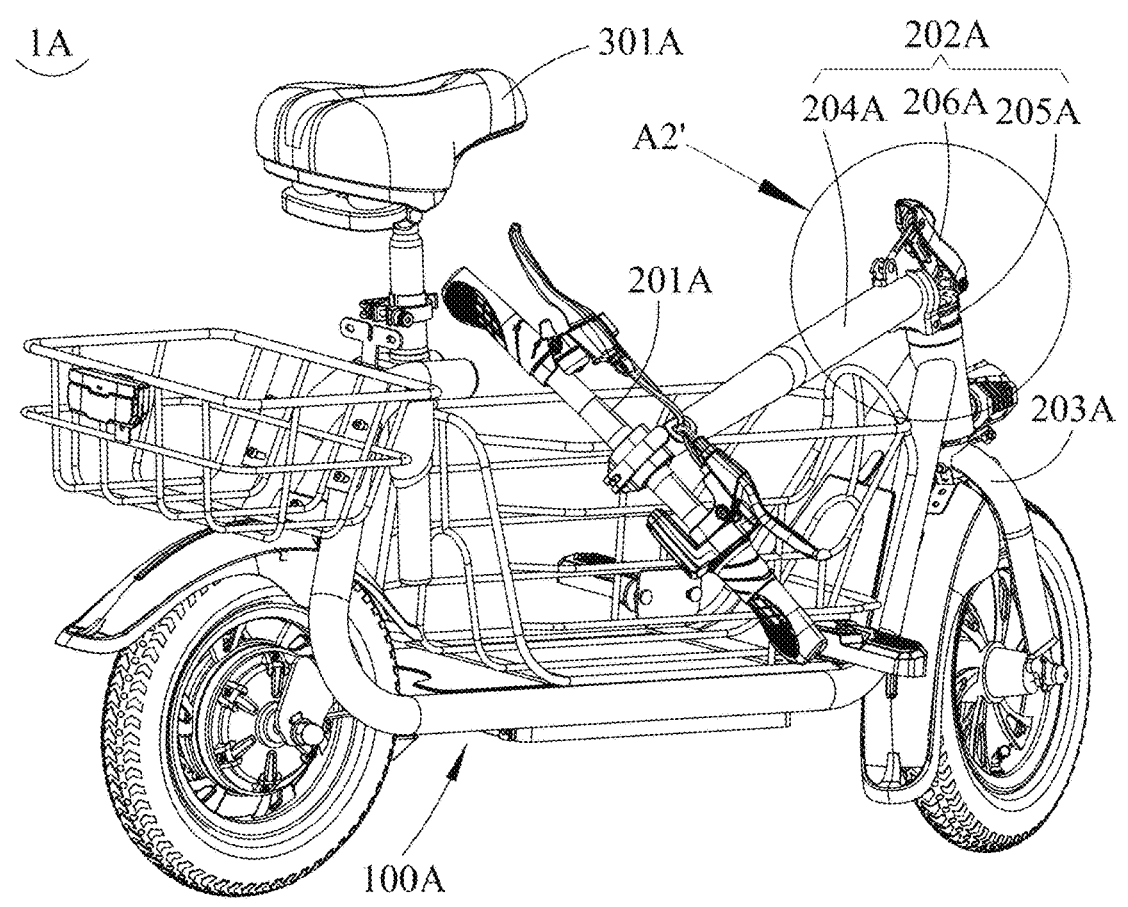

FIGS. 9A-9D illustrate a set of folding views for the stem 202A. Specifically, FIG. 9A is an operational view showing the folding of the stem 202A, FIG. 9B is a view showing the stem 202A in an intermediate state, FIG. 9C is a view showing the stem 202A in a fully folded state, and FIG. 9D is another view of the stem 202A in the fully folded state.

In some embodiments, referring to FIGS. 9A-9B, the stem 202A may be foldable to reduce the overall size of the vehicle 1A, thereby improving portability. In other embodiments, referring to FIGS. 9C-9D, the stem 202A may be folded toward the seat 301A, and the handlebar 201A may be accommodated in a region between the seat 301A and the front end of the frame 100A, which facilitates carrying the vehicle 1A onto subways, city buses, or into the trunk of a car.

Figure 10:
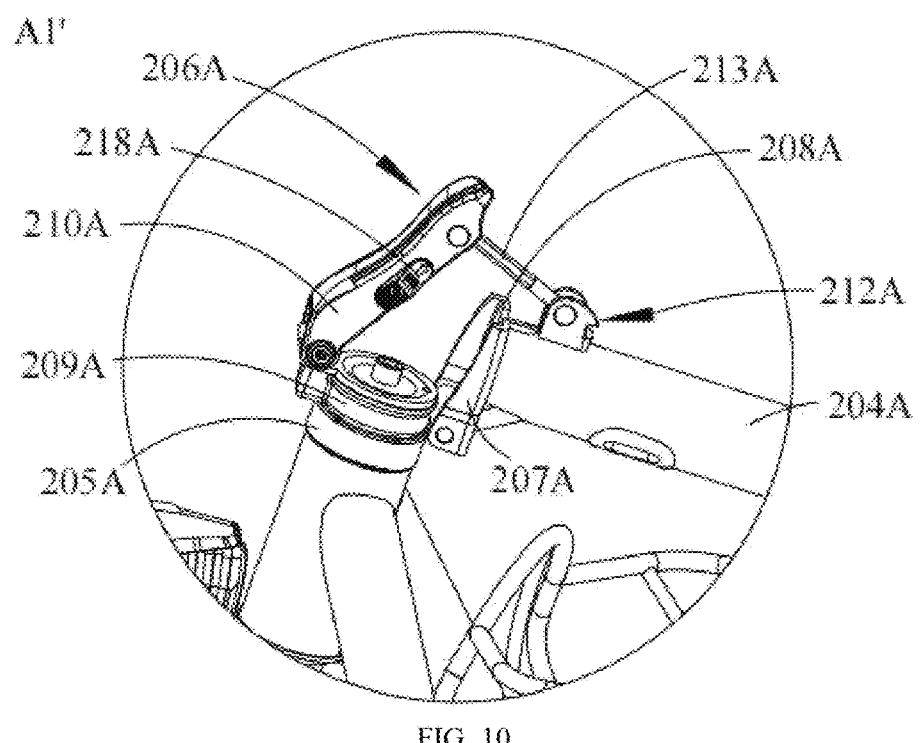
FIG. 10 is an enlarged schematic view of portion A1' in FIG. 9C.
Figure 11:
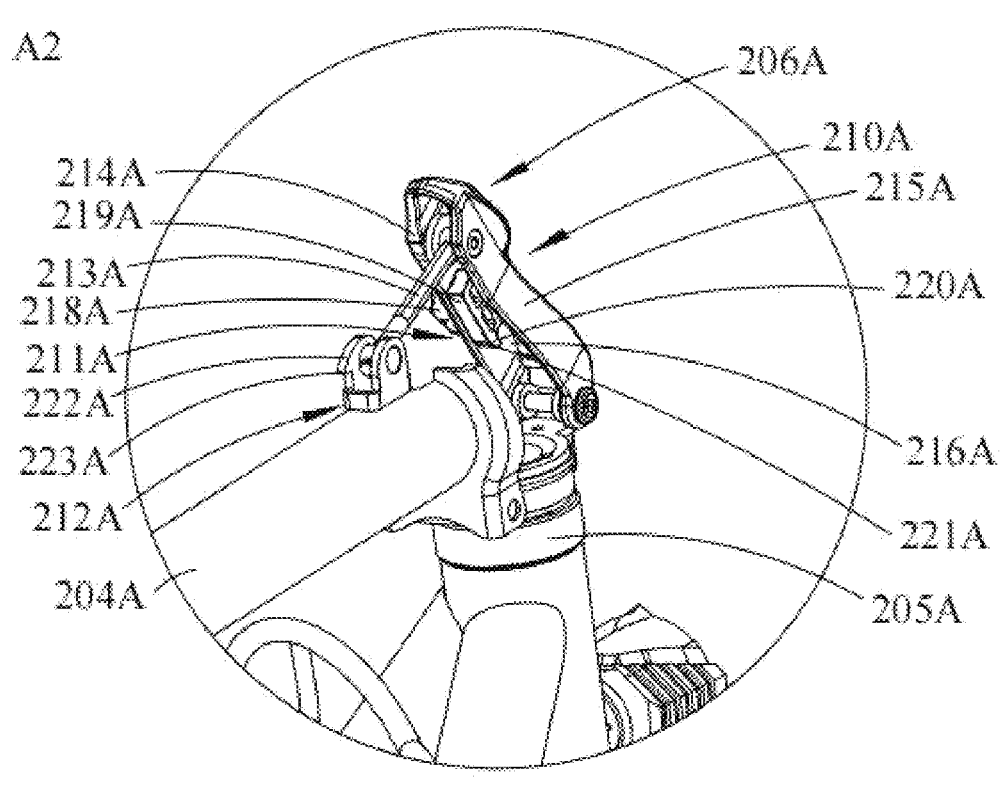
FIG. 11 is an enlarged schematic view of portion A2' in FIG. 9D.
Figure 12:
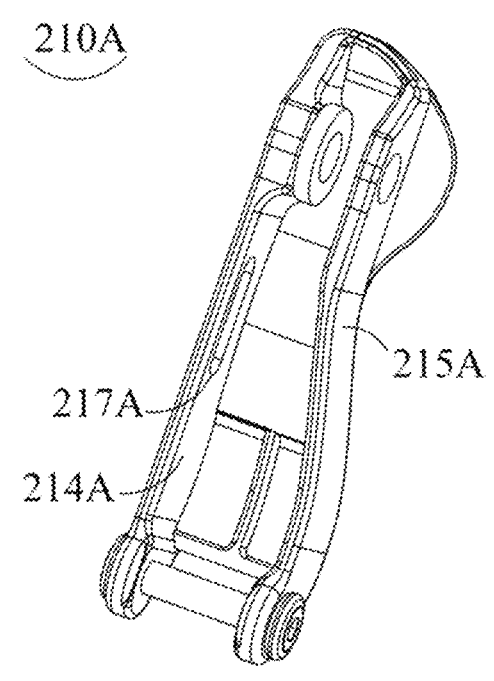
FIG. 12 is a schematic view of the housing in the folding mechanism according to an embodiment of the present application.

FIG. 10 is an enlarged view of region A1' in FIG. 9C, FIG. 11 is an enlarged view of region A2' in FIG. 9D, and FIG. 12 is a structural view of the housing 210A in the folding mechanism 206A.

In some embodiments, referring to FIGS. 9D and 10, the stem 202A may include a first rod 204A, a second rod 205A, and a folding mechanism 206A. One end of the first rod 204A may be connected to the handlebar 201A, and one end of the second rod 205A may be connected to the front fork 203A. The other end of the first rod 204A may be rotatably connected to the other end of the second rod 205A such that when the first rod 204A rotates toward the seat 301A relative to the second rod 205A, the stem 202A may be folded toward the seat 301A. One end of the folding mechanism 206A may be connected to the other end of the first rod 204A, and the other end of the folding mechanism 206A may be connected to the other end of the second rod 205A. When the folding mechanism is in a released state, the first rod 204A may rotate toward the seat 301A relative to the second rod 205A, such that the stem 202A may be folded into a folded state. When the folding mechanism 206A is in a locked state, the other end of the first rod 204A and the other end of the second rod 205A may be snap-fit together so that the stem 202A may be extended into a normal use state.

In some embodiments, referring to FIG. 10, the other end of the first rod 204A may be provided with a collar 207A. The front end of the collar 207A may have an opening 208A. The other end of the second rod 205A may be recessed radially to form a connecting region 209A. The connecting region 209A may be snap-fit into the collar 207A so that the other ends of the first rod 204A and the second rod 205A may be engaged. When the other ends of the first rod 204A and the second rod 205A are engaged, the opening 208A at the front end of the collar 207A may be shaped to accommodate the folding mechanism 206A.

Referring to FIG. 11, the folding mechanism 206A may include a housing 210A, a release member 211A, a snap fit member 212A, and a connecting rod 213A. The housing 210A may be recessed to form a first sidewall 214A, a second sidewall 215A, and an accommodating groove 216A. The first sidewall 214A and the second sidewall 215A may be arranged opposite to each other, and the accommodating groove 216A may be located between the first sidewall 214A and the second sidewall 215A.

Referring to FIG. 12, a slide hole 217A may be provided on the first sidewall 214A (or the second sidewall 215A). The release member 211A may be positioned within the slide hole 217A and be slidable relative to the slide hole 217A. The release member 211A may include a sliding latch 218A and a retaining member 219A, which may be connected and disposed on opposite sides of the first sidewall 214A. The retaining member 219A may be housed in the accommodating groove 216A. The retaining member 219A may extend toward the second rod 205A with a first hook 220A, which may be disposed near the opening of the accommodating groove 216A. A first rolling surface 221A may be provided on the side of the first hook 220A facing the opening of the accommodating groove 216A. The first hook 220A may be rotatable toward the opening of the accommodating groove 216A relative to the first sidewall 214A, and may also be rotatable toward the bottom of the accommodating groove 216A relative to the first sidewall 214A.

Referring to FIGS. 9D and 11, the snap fit member 212A may be mounted at the other end of the first rod 204A. The snap fit member 212A may extend toward the handlebar 201A with a second hook 222A, which may be disposed away from the first rod 204A. A second rolling surface 223A may be provided on the side of the second hook 222A facing away from the first rod 204A. When the folding mechanism 206A is in a locked state, the second rolling surface 223A may roll along the first rolling surface 221A and may drive the first hook 220A to rotate toward the bottom of the accommodating groove 216A relative to the first sidewall 214A.

Referring to FIG. 11, one end of the connecting rod 213A may be rotatably connected to one end of the first sidewall 214A and one end of the second sidewall 215A. The other end of the first sidewall 214A and the second sidewall 215A may both be rotatably connected to the other end of the second rod 205A. The other end of the connecting rod 213A may be rotatably connected to the snap fit member 212A. In conjunction with FIG. 9D, when the folding mechanism 206A is in a released state, that is, when the stem 202A is in a folded state, the first rod 204A may rotate relative to the second rod 205A in a direction away from the seat 301A. One end of the connecting rod 213A may rotate relative to the housing 210A, and the other end of the connecting rod 213A may rotate relative to the snap fit member 212A. When the second rolling surface 223A comes into contact with the first rolling surface 221A, the second rolling surface 223A may roll along the first rolling surface 221A and may drive the first hook 220A to rotate toward the bottom of the accommodating groove 216A relative to the first sidewall 214A. When the second rolling surface 223A separates from the first rolling surface 221A, the first hook 220A may rotate back toward the opening of the accommodating groove 216A relative to the first sidewall 214A, thereby allowing the second hook 222A to abut against the first hook 220A. The snap fit member 212A may then be constrained by the first hook 220A, the folding mechanism 206A may be locked, and the stem 202A may extend into a normal usage state.

Referring to FIG. 9A, when the folding mechanism 206A is in a locked state, i.e., the stem 202A is in a normal usage state, and in conjunction with FIGS. 10 and 11, the sliding latch 218A may be pushed upward, driving the retaining member 219A to follow. The first hook 220A extending from the retaining member 219A may move away from the second hook 222A, thereby releasing the second hook 222A and allowing the folding mechanism 206A to be disengaged. At this point, the first rod 204A may be rotated in the direction of the seat 301A, so that the stem 202A may be folded into the folded state.

It is worth noting that, referring to FIGS. 10 and 11, in some embodiments, the folding mechanism 206A may be connected to the left side of the first rod 204A and the left side of the second rod 205A, thereby enabling the user to push the sliding latch 218A with the left hand to release the folding mechanism 206A, while rotating the first rod 204A toward the seat 301A with the right hand to fold the stem 202A. This configuration may align with the user's operating habits for the vehicle 1A and provide a better user experience.

In some embodiments, with respect to the seat 301A described above, please refer to FIG. 1A. The seat 301A may be connected to the rear end of the frame 100A via a seat tube 302A. Referring to both FIGS. 1A and 4A, one end of the seat tube 30A may support the seat 301A, and the other end of the seat tube 302A may pass through and protrude from the middle tube 106A. In some embodiments, the storage mechanism 700A may be disposed between the front end of the frame 100A and the portion of the seat tube 302A that protrudes from the middle tube 106A, such that the seat tube 302A does not extend into the storage mechanism 700A.

In some embodiments, with respect to the power mechanism 600A described above, please refer to FIG. 1A. The power mechanism 600A may include a battery 601A, which may be disposed on the side of the frame 100A opposite the seat 301A. Referring also to FIGS. 2 and 4A, the battery 601A may specifically be located on the side of the support plate 104A opposite the seat 301A. As for the storage mechanism 700A described above, it may be a basket (as shown in FIG. 1A), a frame basket (as shown in FIG. 3), or any other form. Regardless of whether the storage mechanism 700A is a basket, a frame basket, or another form, the storage mechanism 700A may have a shape and size.

Figure 13A:
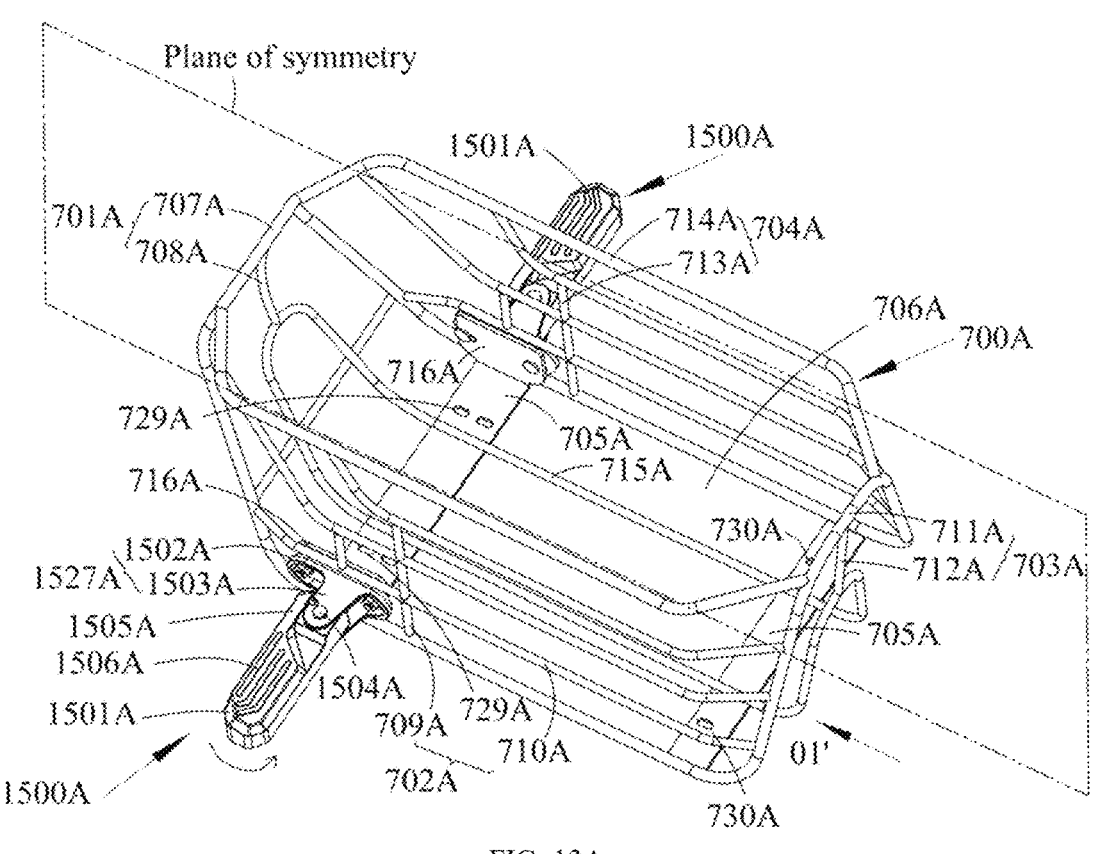
FIG. 13A is a schematic view from one direction illustrating the storage mechanism connected with the pedal according to an embodiment of the present application.

FIG. 13A is a schematic view of the storage mechanism 700A connected with the pedal 1501A.

In some embodiments, a "limiting member" may denote a structure that at least partially bounds the storage space and limits or retains cargo/animals against lateral and/or vertical displacement or ejection. The limiting member may be realized as a wall, rail, rim, flange, lip, parapet, fence-like frame, grid/lattice/mesh, or combinations thereof; it may be continuous or discontinuous, straight or curved, and perforated or solid.

In some embodiments, the second limiting member may correspond to the left sidewall of the basket, and the expressions "second limiting member," and "left sidewall" may be used interchangeably. The terms "left sidewall," "left side wall," "left lateral wall," "left retaining wall," and "left boundary wall" may be used interchangeably.

In some embodiments, the fourth limiting member may correspond to the right sidewall of the basket, and the expressions "fourth limiting member," and "right sidewall" may be used interchangeably. The terms "right sidewall," "right side wall," "right lateral wall," "right retaining wall," and "right boundary wall" may be used interchangeably.

In some embodiments, for the case where the storage mechanism 700A is in the form of a basket, please refer to FIG. 13A. The storage mechanism 700A may include a first limiting member 701A, a second limiting member 702A, a third limiting member 703A, a fourth limiting member 704A, and at least one mounting member 705A (in other schematic views of the same component, also called mounting plate assembly 777A or mounting plate assembly 778A). The first limiting member 701A, second limiting member 702A, third limiting member 703A, and fourth limiting member 704A may be sequentially connected to enclose a storage cavity 706A for placing items. The first limiting member 701A and the third limiting member 703A may be spaced apart, and the second limiting member 702A and the fourth limiting member 704A may also be spaced apart. The mounting member 705A may be clamped between the second limiting member 702A and the fourth limiting member 704A. Please also refer to FIG. 8. The mounting member 705A (see FIG. 13A, one mounting member 705A at the front and one at the rear) may be used to install the storage mechanism 700A onto the frame 100A.

Figure 4B:
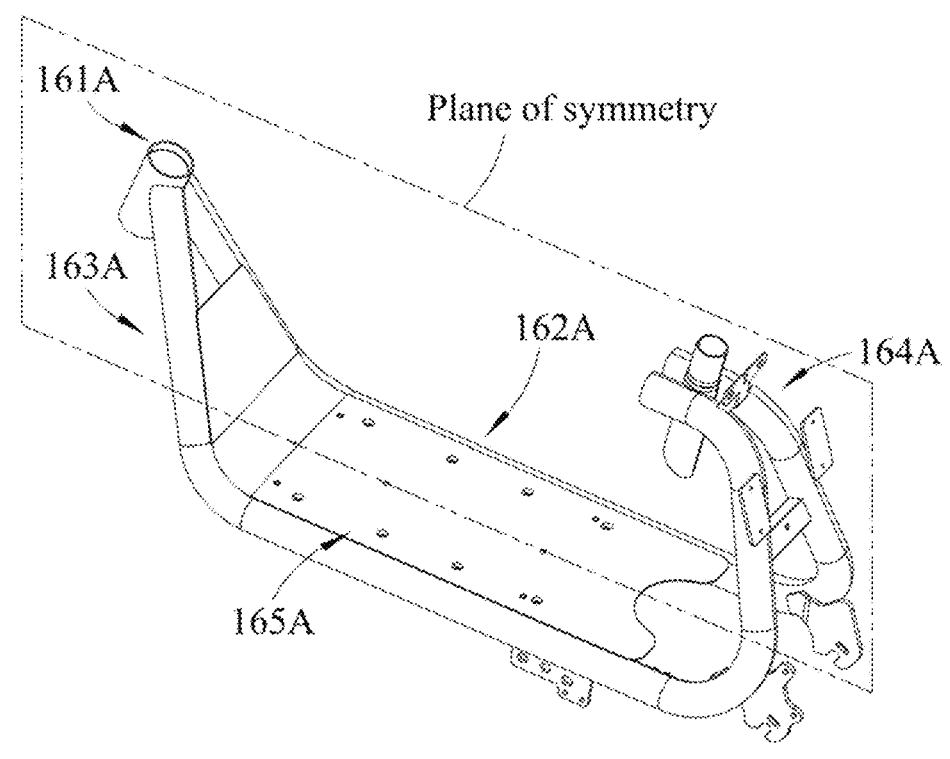
FIGS. 4B-4C are two schematic views from one direction of the frame according to an embodiment of the present application.
Figure 4C:
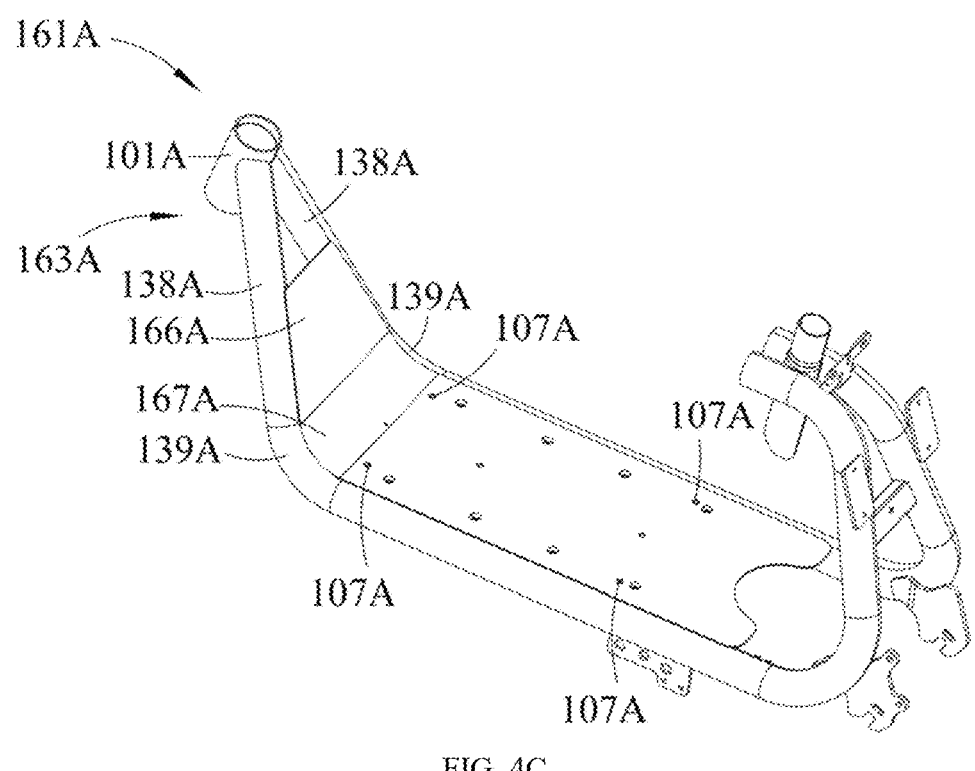
Figure 4D:
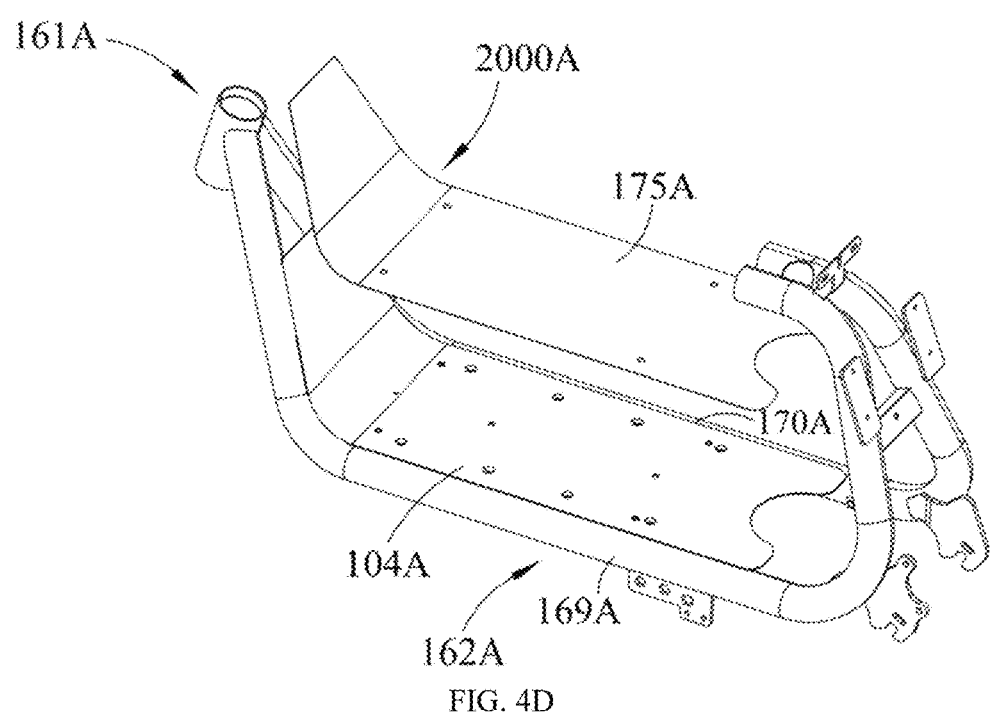
FIG. 4D is another exploded view from one direction of the frame according to an embodiment of the present application.
Figure 4E:
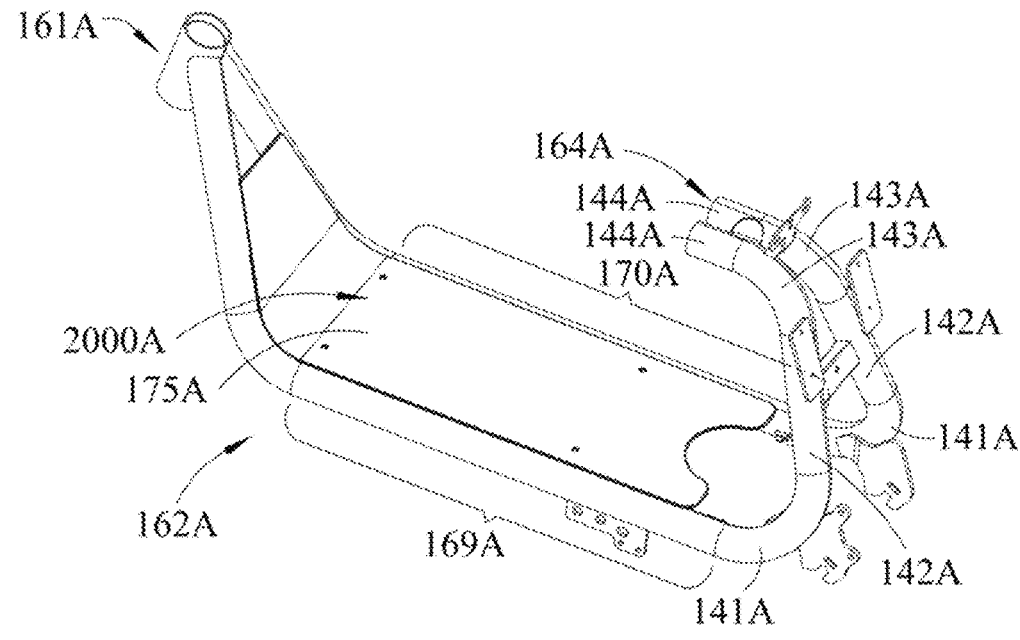
FIG. 4E is another schematic view from one direction of the frame according to an embodiment of the present application.
Figure 4F:
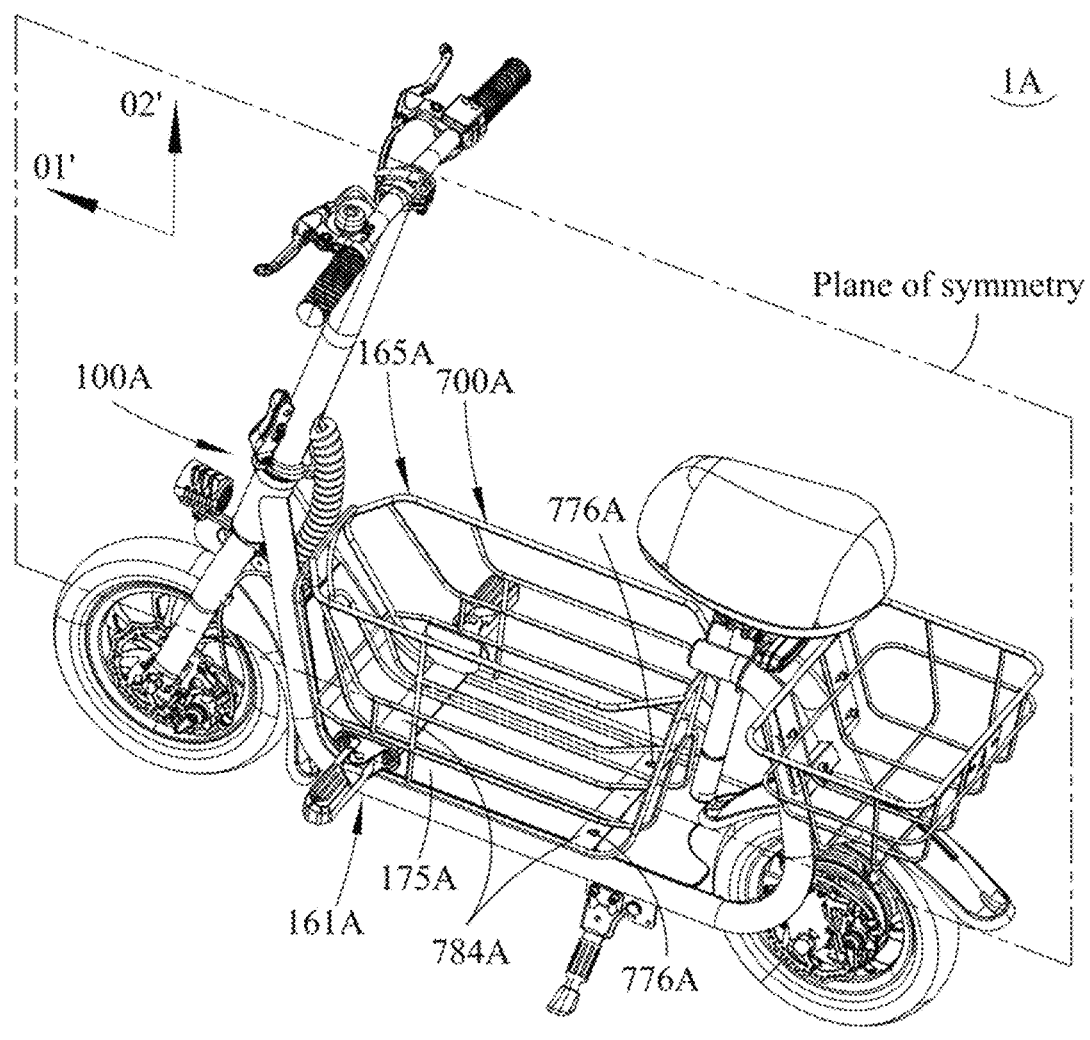
FIG. 4F is another schematic view from another direction of an implementation of the vehicle according to an embodiment of the present application.
Figures 4G, 4H:
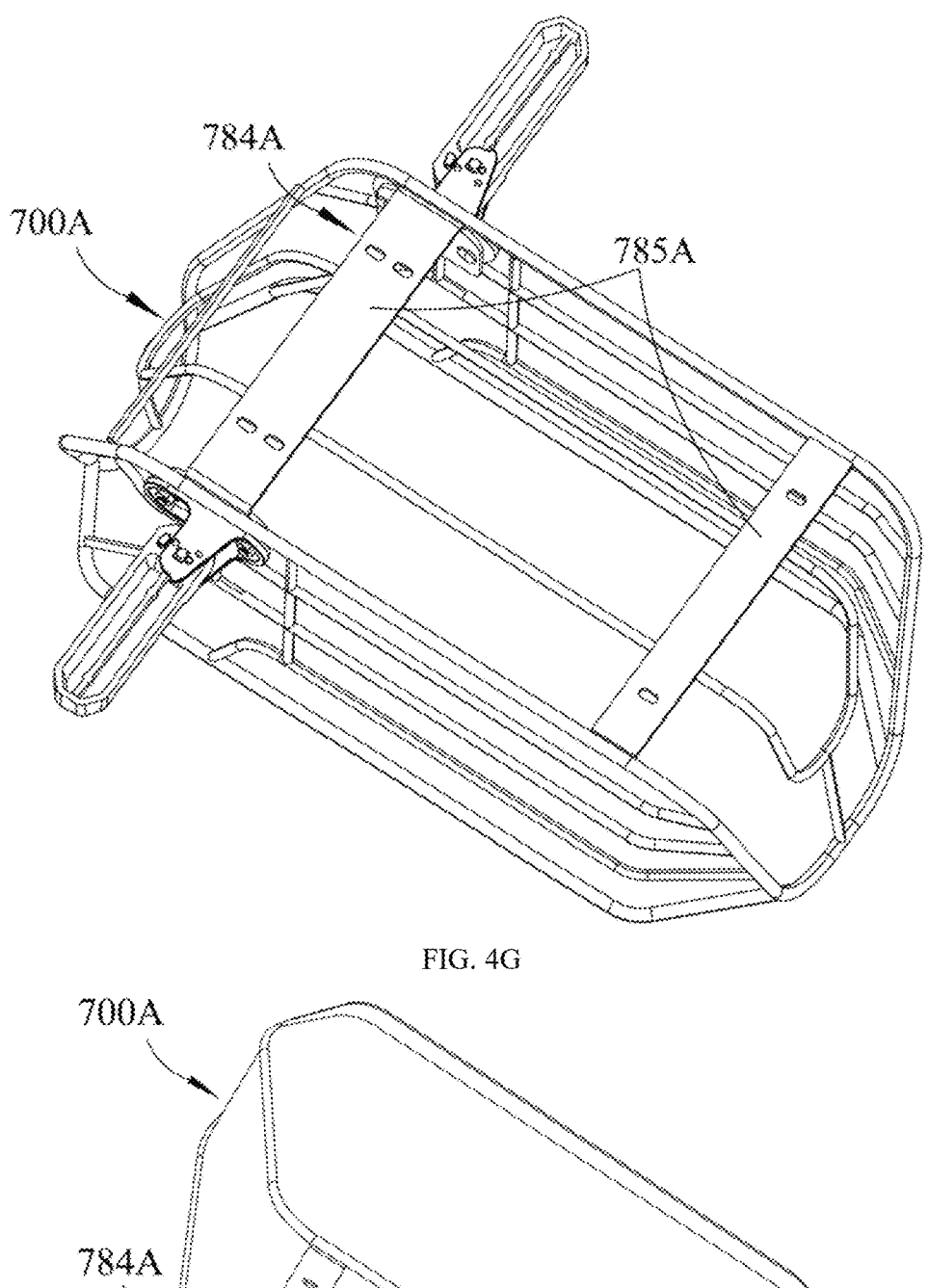
FIG. 4G is a schematic view from one direction of an implementation of the storage mechanism according to an embodiment of the present application.
FIG. 4H is a schematic view from one direction of another implementation of the storage mechanism according to an embodiment of the present application.
Figure 4I:
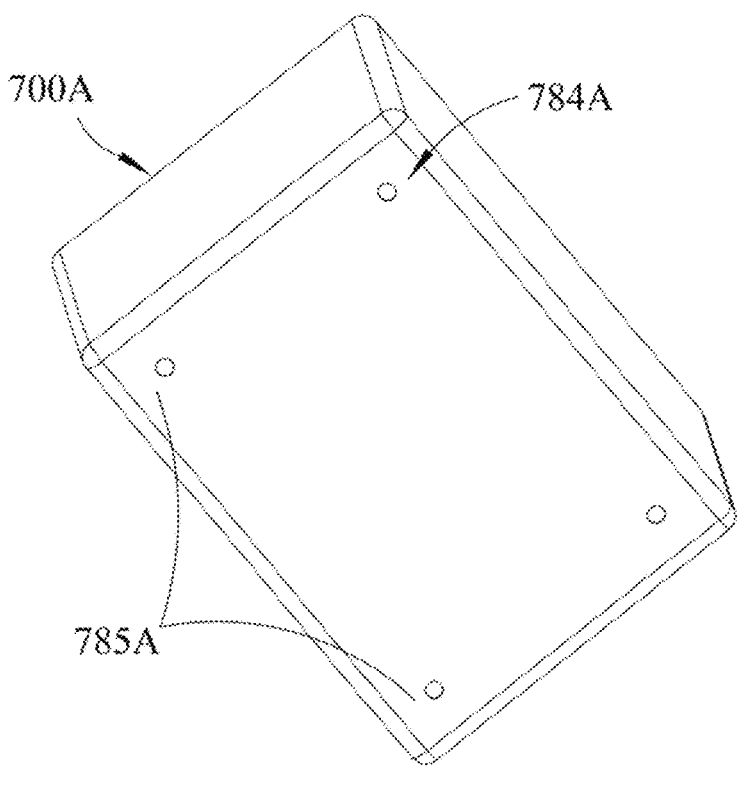
FIG. 4I is a schematic view from one direction of another implementation of the storage mechanism according to an embodiment of the present application.
Figure 4J:
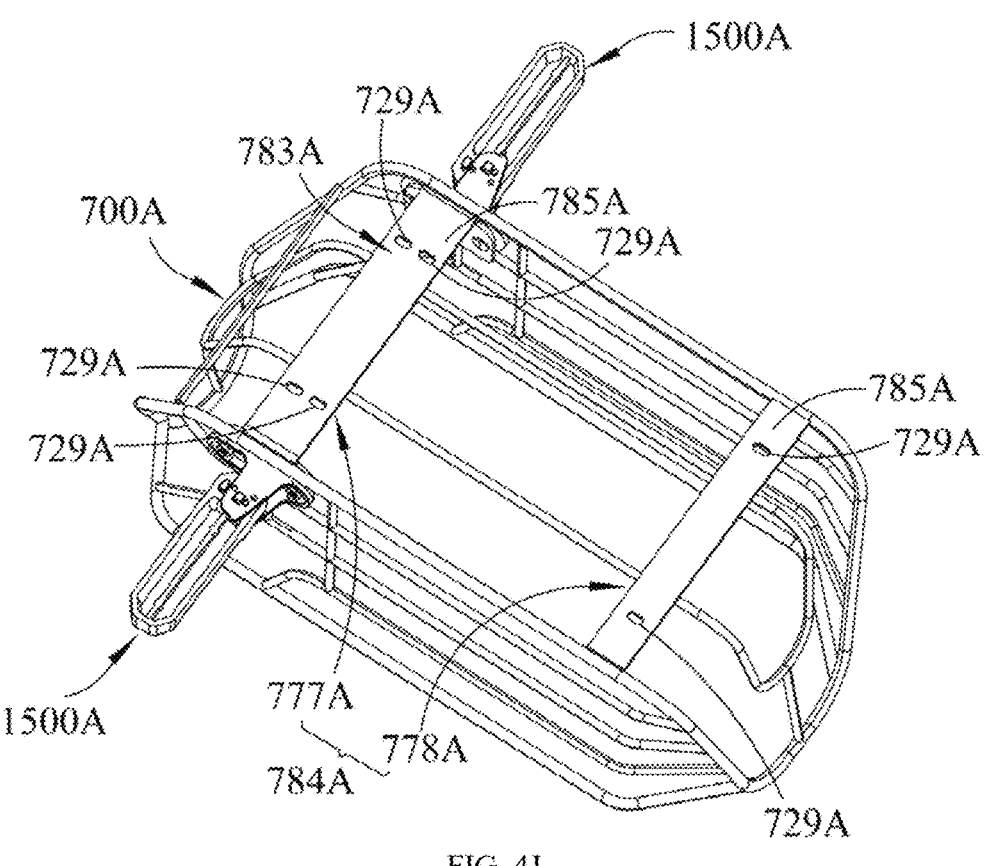
FIG. 4J is another schematic view from one direction of an implementation of the storage mechanism according to an embodiment of the present application.

In addition, in other schematic views of the same component, for example in FIG. 4J, the mounting member 705A may also be called mounting plate assembly 777A or 778A, and mounting plate assembly 777A and mounting plate assembly 778A are two mounting plates distributed one in front of the other. Based at least on the plate-shaped mounting member 705A clearly shown in FIG. 13A and the description of the overall technical principle in the context of the present application of using the mounting member 705A to stably install the storage mechanism 700A onto the flat support plate 104A by means of a surface-to-surface fastening fit, a person of ordinary skill in the art would understand that the plate-shaped mounting member 705A inherently has a flat contact surface located at its bottom, which is also substantially flat to achieve a surface-to-surface fit (e.g., horizontal engagement) with the flat upper surface of the support plate 104A. Further, this inherent contact surface of the mounting member 705A may be embodied as the contact surface 785A shown in FIG. 4J, or at least a portion thereof. Furthermore, the front and rear mounting members 705A also may constitute an interface system for the storage basket 700A to mount the basket substantially horizontally on the support plate 104A of the frame 100A. In addition, the front and rear mounting members 705A may form two longitudinally spaced mounting regions for mounting the storage basket 700A.

In addition, it can be clearly seen from FIG. 13A that the storage mechanism 700A is a basket-like structure that is substantially mirror-symmetrical along a longitudinal (01') plane. For example, the central first vertical bar 708A and third vertical bar 712A can define a longitudinal plane of symmetry that is perpendicular to the plate-shaped mounting member 705A, and consequently, the second limiting member 702A and the fourth limiting member 704A can be mirror-symmetrical with respect to this longitudinal plane of symmetry.

In addition, from the condition shown in figures such as FIGS. 1A-9D where the storage mechanism 700A is mounted on the frame 100A, it can be clearly seen that the left side wall of the storage mechanism 700A (e.g., defined by the second limiting member 702A) is positioned/placed at the left end of the base portion 162A or the support plate 104A and extends substantially vertically upward from that position, while the right side wall of the storage mechanism 700A (e.g., defined by the fourth limiting member 704A) is positioned/placed at the right end of said base portion 162A or support plate 104A and extends substantially vertically upward from that position. Further, it can also be seen from these figures that the left and right sides of the storage mechanism 700A are respectively positioned exactly at the left and right ends of the support plate 104A; in other words, the left and right sides of the storage mechanism 700A are substantially aligned with the left and right ends of the support plate 104A, respectively. The benefit of this is that the area of the support plate 104A can be maximized as much as possible, thereby enhancing the carrying capacity of the entire storage mechanism 700A. Further, it can be clearly determined from FIG. 13A that the first side wall of the storage basket 700A (e.g., defined by the second limiting member 702A) is separated from the second side wall (e.g., defined by the fourth limiting member 704A) in the left-right direction. The first side wall can define a first plane, and the second side wall can define a second plane. The first plane and the second plane are substantially parallel, and both the first and second planes are perpendicular to an X-Y reference plane. In some embodiments, the upper surface of the support plate 104A of the frame 100A can define a third plane (for example, parallel to the X-Y reference plane). Further, continuing to refer to figures such as FIGS. 1A-3, when the storage basket 700A is mounted on the frame 100A, the first plane is substantially orthogonal to the third plane near the left end of the support plate 104A, and the second plane is substantially orthogonal to the third plane near the right end of the support plate 104A.

In addition, various figures—such as FIGS. 4A-4E can clearly show that the frame body 161A or the frame 100A is also a structure that is mirror-symmetrical about a longitudinal plane. This longitudinal plane can be defined, for example, by a geometric plane of symmetry of the head tube 101A that is perpendicular to the lateral direction. In particular, the left frame tube 169A and the right frame tube 170A are structures that are mirror-symmetrical with respect to this plane of symmetry. Furthermore, when the storage mechanism 700A is mounted on the frame 100A, it can be clearly seen from these drawings that the longitudinal plane of symmetry of the frame body 161A and the aforementioned longitudinal plane of symmetry of the storage mechanism 700A coincide, which further allows the storage mechanism 700A to be mounted centrally in the lateral direction on the frame body 161A.

In some embodiments, the expressions "mirror-symmetric," "reflection-symmetric," "bilaterally symmetric," "left-right symmetric," "symmetric about a longitudinal plane," and "symmetric with respect to a longitudinal center plane" may be used interchangeably.

In addition, the implementations of the first limiting member 701A, second limiting member 702A, third limiting member 703A, and fourth limiting member 704A may take various forms. For example, as shown in FIG. 13A, the first limiting member 701A may include a first horizontal bar 707A and a plurality of spaced-apart first vertical bars 708A, each of which may be connected to the first horizontal bar 707A. The second limiting member 702A may include a second vertical bar 709A and a plurality of spaced-apart second horizontal bars 710A, each of which may be connected to the second vertical bar 709A. The second vertical bar 709A may support the plurality of second horizontal bars 710A, one end of which may be connected to the first limiting member 701A and the other end to the third limiting member 703A. The third limiting member 703A may include a third horizontal bar 711A and a plurality of spaced-apart third vertical bars 712A, each of which may be connected to the third horizontal bar 711A. The fourth limiting member 704A may include a fourth vertical bar 713A and a plurality of spaced-apart fourth horizontal bars 714A, each of which may be connected to the fourth vertical bar 713A. The fourth vertical bar 713A may support the plurality of fourth horizontal bars 714A, one end of which may be connected to the first limiting member 701A and the other end to the third limiting member 703A. Additionally, the plurality of first vertical bars 708A may be connected to the plurality of third vertical bars 712A via a plurality of fifth horizontal bars 715A. These fifth horizontal bars 715A may be arranged at intervals and located at the lower end of the storage mechanism 700A. With this arrangement, due to the spaced setting of the plurality of fifth horizontal bars 715A of the storage basket 700A, the bottom of the storage basket 700A is actually configured to be openwork so that when the storage basket 700A is used for carrying an animal, the animal's paws can directly contact the flat upper surface of the base portion 162A or the support plate 104A to enhance comfort.

In some embodiments, it can be clearly seen from FIG. 13A that there may be at least two first bars extending along a first direction and spaced apart along a second direction; and at least one second bar extending along the second direction, In some embodiments the at least one second bar may intersect the at least two first bars substantially perpendicularly.

Figure 13B:
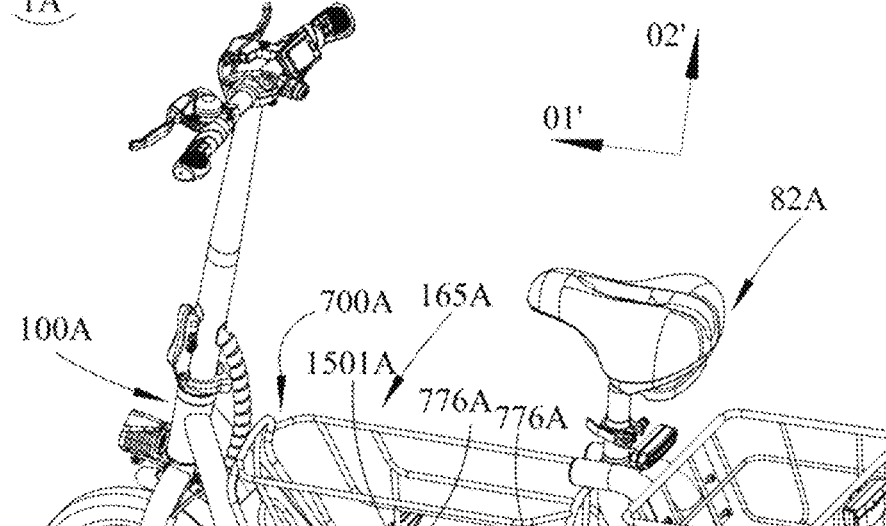
FIG. 13B is a schematic view from one direction of an implementation of the vehicle according to an embodiment of the present application.

In addition, it can be clearly seen from FIG. 13B that the storage basket 700A is removably mounted on the frame body 161A via a threaded mounting mechanism.

In some embodiments, as shown in FIG. 13A, the plurality of first vertical bars 708A and the plurality of fifth horizontal bars 715A are not necessarily arranged in a one-to-one correspondence, and the plurality of third vertical bars 712A and the plurality of fifth horizontal bars 715A are also not necessarily in a one-to-one correspondence. Some of the first vertical bars 708A may be connected to multiple fifth horizontal bars 715A, and some of the third vertical bars 712A may be connected to multiple fifth horizontal bars 715A, thereby forming a configuration in which a first vertical bar 708A is connected to a fifth horizontal bar 715A and then connected to a third vertical bar 712A. Some first vertical bars 708A, located near the second horizontal bars 710A, may be bent to connect with the second horizontal bars 710A. Similarly, some third vertical bars 712A, located near the second horizontal bars 710A, may also be bent to connect with the second horizontal bars 710A. In addition, the first vertical bars 708A near the fourth horizontal bars 714A may be bent to connect with the fourth horizontal bars 714A, and likewise, the third vertical bars 712A near the fourth horizontal bars 714A may also be bent to connect with the fourth horizontal bars 714A. For the case where the storage mechanism 700A is in the form of a basket frame, as shown in FIG. 3, the first limiting member 701A, second limiting member 702A, third limiting member 703A, and fourth limiting member 704A may all be substantially plate-shaped, i.e., not hollowed-out. It can be understood that the connection portions between every two of the first limiting member 701A, second limiting member 702A, third limiting member 703A, and fourth limiting member 704A (e.g., at the four top corners of the storage mechanism 700A shown in FIG. 13A) may have a rounded shape (e.g., an arc or a simple arc segment), thereby reducing the risk of damaging objects and/or animals placed in the storage mechanism 700A, and in particular, reducing the risk of cuts from sharp (non-rounded) edges when an animal enters the storage mechanism 700A. More specifically, FIG. 13A clearly shows that the arc segment at each of the four top corners of the storage mechanism 700A is an outwardly convex arc segment, and the center of the circle of curvature of this outwardly convex arc segment is located in at least one of the storage basket 700A and the storage cavity.

In some embodiments, the terms "rounded shape," "fillet," "edge fillet," "eased edge," and "rounded contour" may be used interchangeably to denote a transition region of continuous curvature between adjacent faces, edges, or surfaces. For the avoidance of doubt, "rounded" does not require a perfect circle or a complete circular profile; a rounded feature may take the form of an arc segment, a blended curve (e.g., a spline or a variable-radius blend), or a compound radius may be formed by two or more radii.

In some embodiments, a "top corner" may denote an upper corner region adjacent to the notional intersection (if extended) of two adjoining upper edges/walls. The term may refer to a finite corner neighborhood, not a point, and may include areas at or near the junction as well as areas that may extend a finite distance along either of the adjoining upper edges and into the adjoining walls; the region may be centered at the junction or biased toward one edge/wall (e.g., positions like A and B in FIG. 13A). The corner may be rounded/filleted, chamfered, blended, stepped, or otherwise curved, and may be formed integrally or by attached parts. In addition, the expressions "top corner," "upper corner," "upper outer corner," "upper edge corner," "upper corner region," and "upper corner portion" may be used interchangeably.

In some embodiments, an "arc segment" may denote a curved portion (in plan or profile) that may round or connect adjoining edges/walls and may subtend a finite angle. The arc segment may be circular (constant-radius) or non-circular (e.g., variable-radius, spline, elliptical), and may be formed as a fillet/round, a curved wall, or a blended surface; unless expressly limited, it is not restricted to a perfect circle. In addition, the expressions "arc segment," "arcuate section," "arced portion," "curved segment," "curved portion," and "curvilinear segment" may be used interchangeably.

In some embodiments, an "outwardly convex arc segment" may denote a curved corner portion which, when viewed in a relevant section (plan or profile), may be convex toward the exterior of the storage mechanism (i.e., its local center of curvature may lie on the interior side or within the basket/cavity). The outward bulge (apex/region of maximum offset) may be located anywhere within the top-corner region—for example approximately centered between the adjoining edges/walls, biased toward the front edge/wall, or biased toward the rear edge/wall—and the curved portion may extend locally along one or both adjoining upper edges. The segment may be circular or non-circular (constant- or variable-radius, spline/elliptical), may be symmetric or asymmetric. In addition the expressions "outwardly convex," "convex outward," "convex toward the exterior," "convex to the outside," and "outwardly bowed/bowing outward" may be used interchangeably.

Alternatively, the four top corners of the storage basket 700A may each include an outwardly convex arcuate section.

As shown in FIG. 13B, a shape of at least a portion of the storage basket 700A may be configured to conform to a shape of the frame body 161A.

In some embodiments, the phrase "configured to conform to a shape of," "conform" is understood broadly to include: (1) Exact or substantial/approximate correspondence of one or more regions (continuous or discrete), including piecewise/segmented or stepwise approximations and variable-radius blends; (2) Complementary or generally matching geometry, such as coplanar/parallel flats, coaxial/collinear features, shared or similar curvature (e.g., similarly sloped or arcuate profiles), or envelope/clearance matching.

In some embodiments, the specific shapes of the first limiting member 701A, second limiting member 702A, third limiting member 703A, and fourth limiting member 704A may also be configured to conform to the shape of the frame 100A, for example, by incorporating some bent portions. Alternatively, from the perspective of fluid dynamics, the exterior shapes at the junctions of every two limiting members may be designed to be streamlined, thereby reducing the resistance of the vehicle 1A during riding.

In some embodiments, the bottom of the storage basket 700A may be substantially flat (particularly, its bottom surface can have a flat contact surface), and thus this flat bottom configuration of basket 700A can precisely conform to the frame body 161A-more specifically, to conform to the flat support plate 104A.

Regarding the mounting member 705A, please also refer to FIGS. 4A and 5. The mounting member 705A may be specifically mounted to the support plate 104A and secured to the reinforcing rib 109A. Referring also to FIG. 13A, in some embodiments, the number of mounting members 705A may be two, and both mounting members 705A may be clamped between the second limiting member 702A and the fourth limiting member 704A. The two mounting members 705A may be spaced apart. It may be noted that when the plurality of first vertical bars 708A are connected to the plurality of third vertical bars 712A via the plurality of fifth horizontal bars 715A, the fifth horizontal bars 715A may also be connected to the mounting members 705A. It is also worth noting that the size of the storage mechanism 700A may be reasonably designed to not only meet the storage needs but also fit the shape of the vehicle 1A, and even, from an ergonomic perspective, be configured such that the presence of the storage mechanism 700A does not compromise the comfort of the user when operating the vehicle 1A.

Figure 14A:
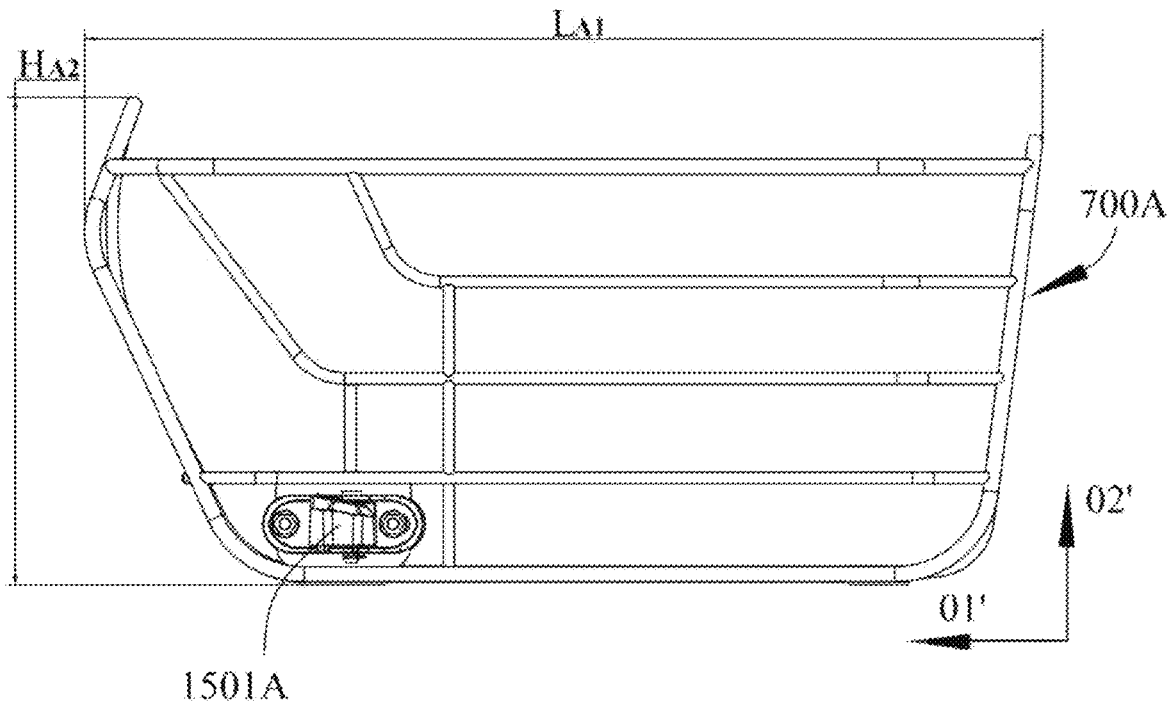
FIGS. 14A-14B are a set of schematic views from other directions illustrating the details of the storage mechanism connected with the pedal according to an embodiment of the present application.
Figure 14B:
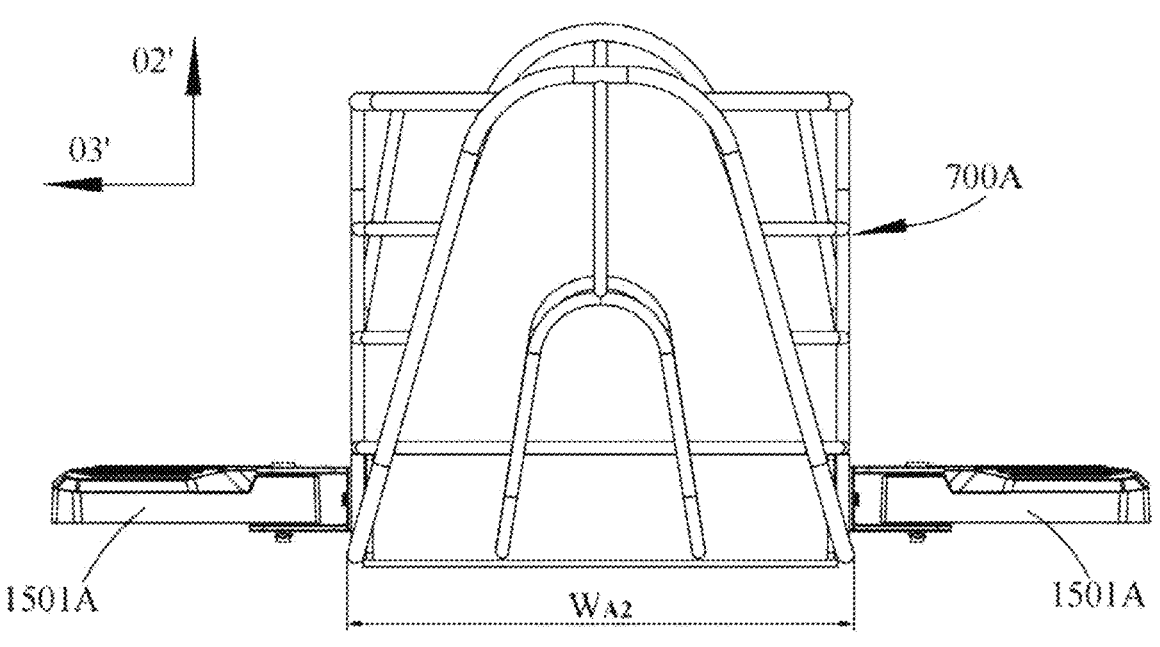

FIGS. 14A-14B illustrate a set of schematic views in which the storage mechanism 700A is connected to the pedals 1501A.

In some embodiments, referring to FIG. 14A, along the normal traveling direction 01' of the vehicle 1A, the length $L_{A1}$ of the storage mechanism 700A may be 50 cm; along the direction opposite to gravity 02', the height $H_{A2}$ of the storage mechanism 700A may be 21 cm. Referring to FIG. 14B, along a direction 03' that is perpendicular to both the normal traveling direction 01' of the vehicle 1A and the direction opposite to gravity 02', the width $W_{A2}$ of the storage mechanism 700A may be 23 cm. It should be understood that, with reference to FIG. 8, the normal traveling direction 01' of the vehicle 1A is also the direction from the seat 301A to the front wheel steering mechanism 200A, and the direction from the seat 301A to the front wheel steering mechanism 200A is opposite to the direction opposite to gravity 02'. In some embodiments, the volume of the storage mechanism 700A may be 0.02415 cubic meters, i.e., 24.15 liters. Referring to FIG. 13A, the volume of the storage mechanism 700A refers to the volume of the storage cavity 706A enclosed and defined by the first limiting member 701A, second limiting member 702A, third limiting member 703A, and fourth limiting member 704A.

It is worth noting that, in some embodiments, referring to FIGS. 1A and 13A, two pedals 1501A may be respectively connected to the two opposite side surfaces of the storage mechanism 700A. The two pedals 1501A may be connected to the storage mechanism 700A via adapters 1502A. When the number of pedals 1501A is two, the number of adapters 1502A may also be two. In addition, from figures such as FIGS. 1A, 13A, and 13K, it can be clearly determined that the mounting positions of the two pedals 1501A may be both near the front end of the storage mechanism 700A. At the same time, when the storage mechanism 700A is mounted on the frame 100A, the two pedals 1501A may be also both near the front end of the base portion 162A (to be introduced later), and also near the front ends of the second left straight pipe section 137A (to be introduced later) and the second right straight pipe section 137A (to be introduced later).

In some embodiments, referring to FIG. 13A, for the connection between one of the pedals 1501A and the storage mechanism 700A, one end of the mounting member 705A of the storage mechanism 700A may extend to form a mounting plate 716A. One end of the adapter 1502A may be connected to the surface of the mounting plate 716A that faces away from the storage cavity 706A. The other end of the adapter 1502A may extend in the direction away from the storage cavity 706A to form two vertically spaced connecting plates 1503A. The other end of the adapter 1502A may further include a connecting post 1504A (also called a pivot pin, connecting pin, rotation shaft, pin shaft, etc.), which defines a central axis of rotation extending in the height direction. The connecting post 1504A may sequentially pass through one of the connecting plates 1503A, one end of the pedal 1501A, and the other connecting plate 1503A.

The connecting post 1504A may be fixedly connected to both connecting plates 1503A. One end of the pedal 1501A may be rotatably connected to the connecting post 1504A (e.g., rotating around the aforementioned central axis of rotation). The front end of the connected end of the pedal 1501A may extend upward and/or downward to form a detent member 1505A. When the other end of the pedal 1501A is rotated away from the storage cavity 706A, the detent member 1505A may abut against the connecting plate 1503A, thereby limiting further forward rotation of the other end of the pedal 1501A. In this way, the pedal 1501A may extend from the storage mechanism 700A to form a region for the user to place their foot. When the pedal 1501A is not in use, the other end of the pedal 1501A may be rotated toward the storage cavity 706A, allowing the pedal 1501A to be folded in. This helps the pedal 1501A stay close to the storage mechanism 700A, thereby potentially enhancing the user experience.

Referring to FIG. 13A, in some embodiments, the upper surface of the pedal 1501A may be provided with a plurality of anti-slip strips 1506A. The anti-slip strips 1506A may be spaced apart along the normal traveling direction 01' of the vehicle 1A. As a result, when the user's foot is placed on the pedal 1501A, the risk of slipping may be reduced, potentially improving the user experience. In some embodiments, the pedals 1501A may be disposed on both sides of the front end of the storage mechanism 700A, so that from an ergonomic perspective, the user's feet may rest on the pedals 1501A, which may provide greater comfort and further enhance the user experience.

Referring to FIG. 13A, in some embodiments, the pedal 1501A may have multiple user-friendly foot placement positions. These positions may differ in angle, thereby accommodating the specific conditions of different riders—for example, differences in leg length, usage habits, and height. Accordingly, the pedal 1501A may be adjusted to determine a suitable usage position, allowing the pedal 1501A to be fully in the deployed position or in any rotational position between the deployed and closed positions.

In some embodiments, referring to FIG. 1A, the pedal 1501A may be rotated from the deployed position to the closed position by rotating either only forward or only backward. When the pedal 1501A is in the open position, it may be perpendicular or substantially perpendicular to the vehicle 1A. When the pedal 1501A is in the closed position, it may be parallel or substantially parallel to the vehicle 1A.

In other embodiments, the pedal 1501A may be rotated upward or downward to move/transition the pedal 1501A from the deployed position to the closed position.

In some embodiments, referring to FIGS. 3 and 4A, the vehicle 1A may further include a variety of accessories. The vehicle 1A may include the kickstand 800A mentioned above, which is mounted on the first weld tab 110A of the frame 100A. The kickstand 800A may provide support for the vehicle 1A when it is in an idle state.

Referring to FIGS. 3 and 4A, the vehicle 1A may include the rear basket 900A, which is mounted on the second weld tab 111A of the frame 100A. The rear basket 900A may be located behind the seat 301A and may be used for carrying items. The storage mechanism 700A may be positioned in front of the seat 301A. By providing both the storage mechanism 700A and the rear basket 900A, the quantity of items that may be carried by the vehicle 1A may be increased. In addition, this configuration may allow users to place more important items in front, within their line of sight, rather than behind them or out of view. For example, a pet or wallet may be placed in the storage mechanism 700A, while groceries such as vegetables and fruits may be placed in the rear basket 900A.

Referring to FIGS. 1A and 2, in some embodiments, the rear basket 900A and the storage mechanism 700A may be made of the same material, both formed of materials with relatively low density, such as aluminum or iron. Alternatively, since the rear basket 900A is approximately suspended—i.e., unsupported at the bottom—in some embodiments, the storage mechanism 700A may be made of a lighter material than the rear basket 900A. For example, the storage mechanism 700A may be made of plastic, while the rear basket 900A may be made of metal, providing the rear basket 900A with better structural strength.

Referring again to FIGS. 3 and 4A, the vehicle 1A may include the tail-light 1000A, which is mounted on the third weld tab 112A of the frame 100A. The tail-light 1000A may be located behind the seat 301A and may be used to illuminate the rear of the vehicle 1A during normal operation, serving to alert approaching vehicles from behind and thereby enhancing the safety of the user. The vehicle 1A may also include the rear fender 1100A, which is mounted on the reinforcement rod 114A of the frame 100A. The rear fender 1100A may be disposed above the rear wheel 500A and spaced apart from it in the direction opposite to gravity 02'. With the rear fender 1100A in place, mud, dust, and other debris thrown up by the rotation of the rear wheel 500A during operation may be blocked, helping to reduce contamination of the user.

Please refer to FIGS. 3 and 4A. The vehicle 1A may include a rear brake 1300A mounted to the rear fork web 113A of the frame 100A, which may be configured to apply braking force to the rear wheel 500A. In conjunction with FIG. 6B, the motor shaft 502A may serve as a rotational shaft or central shaft for driving the rear wheel 500A. The vehicle 1A may also include a brake cable 1401A mounted to the frame 100A. Additionally, the vehicle 1A may include a brake lever 1402A and a front brake 1403A. The brake lever 1402A may be mounted to the handlebar 201A. One end of the brake cable 1401A may be connected to the handlebar 201A, and the other end may be connected to the front brake 1403A. The brake lever 1402A may control the front brake 1403A through the brake cable 1401A, thereby applying braking force to the front wheel 400A.

Please refer to FIG. 3. The vehicle 1A may include a headlight 1600A mounted to the front wheel steering mechanism 200A. The headlight 1600A may be positioned in front of the front wheel steering mechanism 200A and may be configured to illuminate the front area of the vehicle 1A during normal operation, thereby facilitating observation of the driving environment and enhancing safety for the user. The vehicle 1A may also include a front fender 1700A mounted to the front wheel steering mechanism 200A. The front fender 1700A may be positioned above the front wheel 400A and may be spaced from the front wheel 400A in a direction opposite to gravity 02'. The front fender 1700A may block mud, dust, and other debris thrown up by the rotating front wheel 400A during travel, thereby reducing contamination to the user.

FIGS. 15A-15D are a set of schematic views illustrating the use of the vehicle 1A.

Figure 15A:
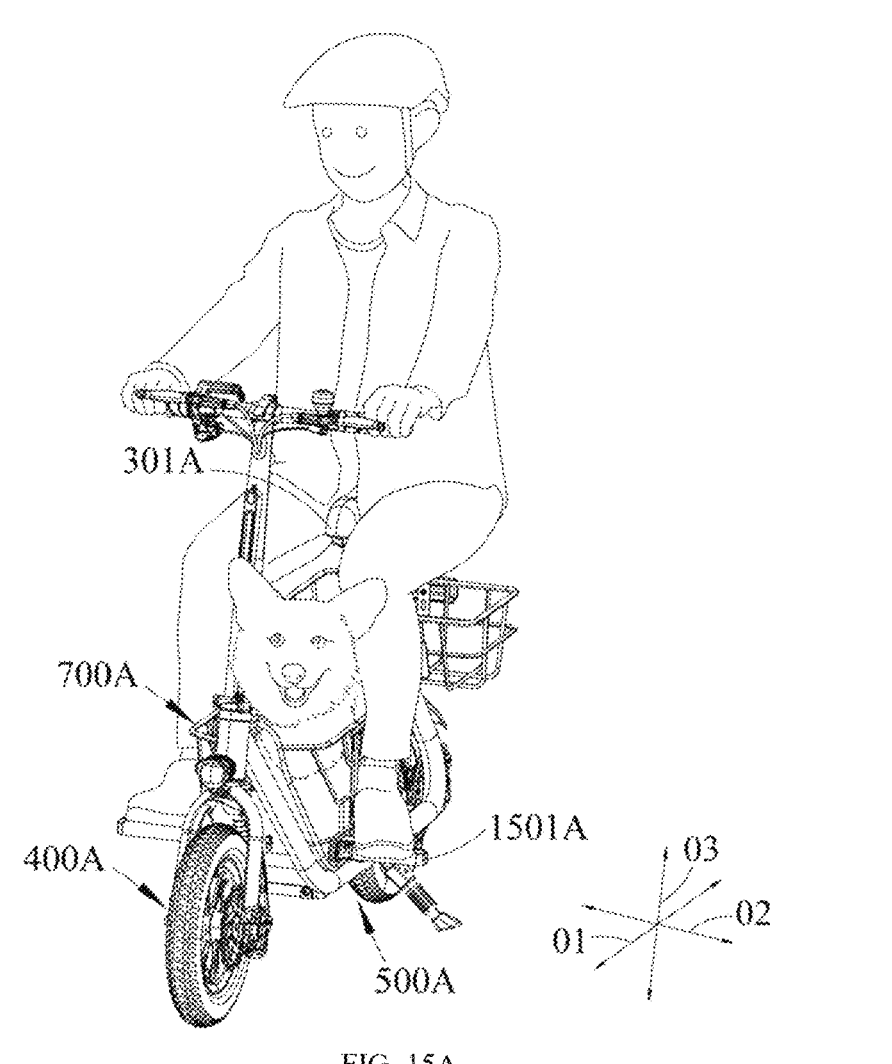
FIGS. 15A-15D are a set of schematic views illustrating the use of the vehicle according to an embodiment of the present application.

Referring to FIG. 15A, in some embodiments, an animal may be placed in the storage mechanism 700A. The storage mechanism 700A may guide the animal into a sitting posture, such that the center of gravity of the animal is located between the front end and the rear end of the storage mechanism 700A. The seat 301A may provide support for the upper body of the user, and along the second direction 02, the pedals 1501A on both sides may provide support for the lower body of the user. When the user rides while carrying the animal, along the first direction 01, the center of gravity of the animal and the center of gravity of the user are both located between the center of the front wheel 400A and the center of the rear wheel 500A. The center of gravity of the animal is located between the center of the front wheel 400A and the center of gravity of the user, and the center of gravity of the user is located between the center of gravity of the animal and the center of the rear wheel 500A, which is beneficial for forming a weight balance with the animal and is expected to reduce the risk of the vehicle 1A tilting forward or backward due to imbalance.

Figure 15B:
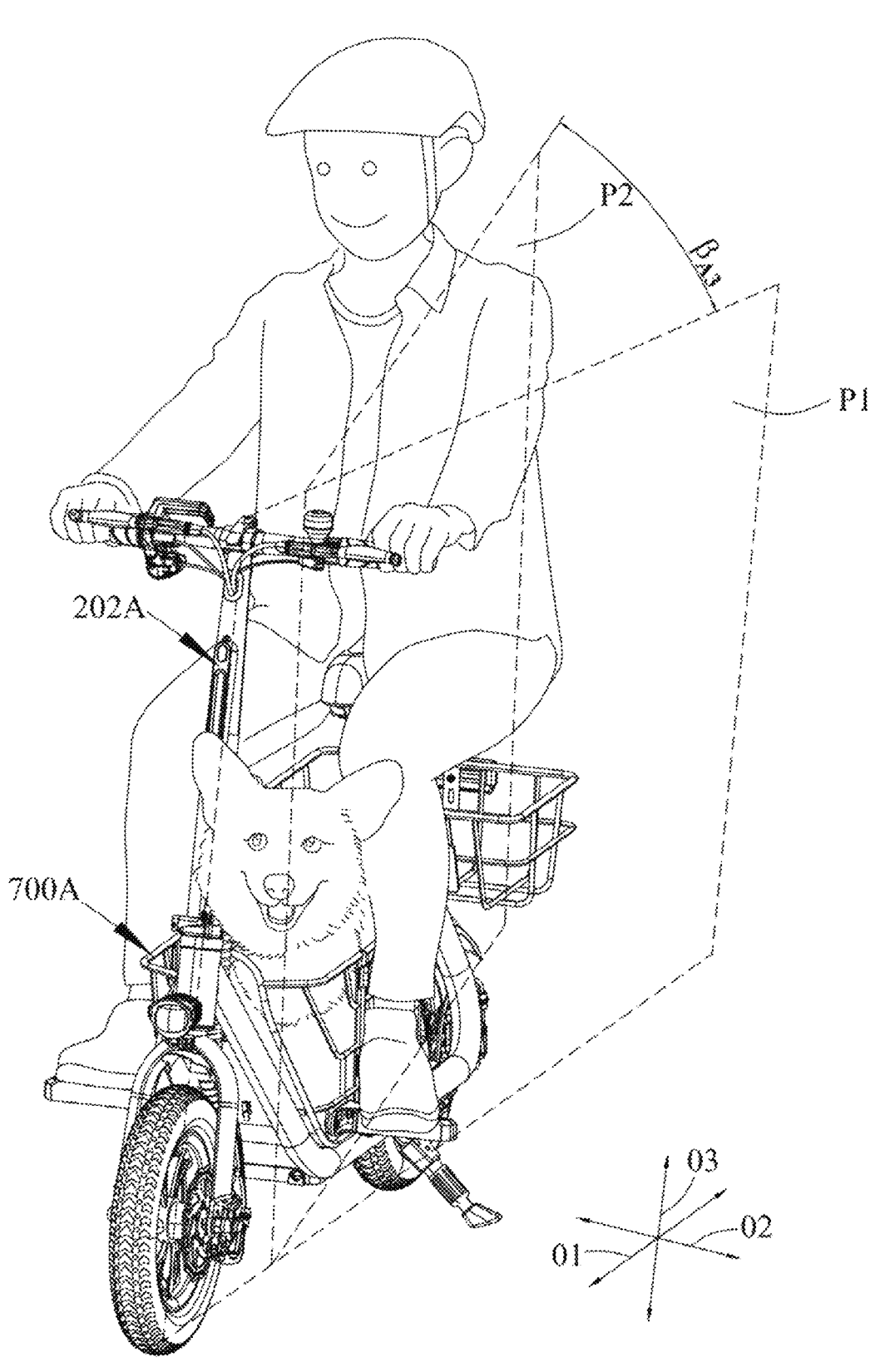
Figure 15C:
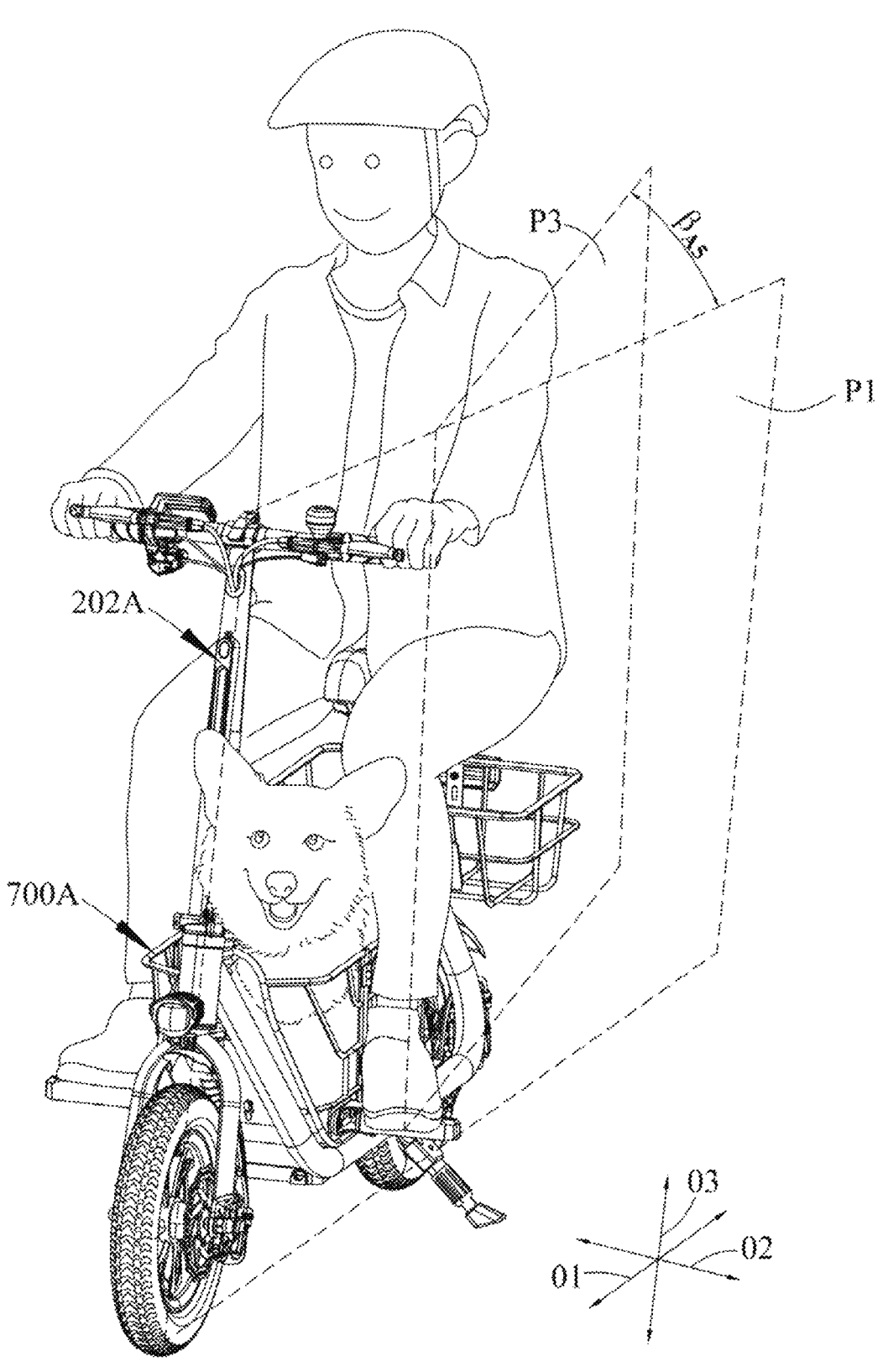

Referring to FIGS. 15B and 15C, in some embodiments, when riding while carrying an animal, the storage mechanism 700A may guide the animal into a sitting posture with its head leaning forward. Under the enclosure of the storage mechanism 700A, the risk of the animal tipping or slanting outward during posture adjustment is expected to be reduced. The stem 202A may be substantially a straight rod, thereby making the design simpler. In addition, the stem 202A may be substantially vertically disposed at the front side of the storage mechanism 700A, which is conducive to guiding the animal sitting in the storage mechanism 700A to adjust its posture by offsetting its face from the front stem 202A. Thus, by utilizing the idle space around the stem 202A, through the storage mechanism 700A and the stem 202A, a broad field of view and a comfortable riding experience are expected to be provided for the animal.

The plane that substantially symmetrically divides the vehicle along the second direction 02 is referred to as P1. The plane that substantially symmetrically divides the head of the animal along the second direction 02 is referred to as P2. The plane that substantially symmetrically divides the user's feet is referred to as P3. The angle between P1 and P2 is defined as $B_{A3}$, and the angle between P1 and P3 is defined as $B_{A5}$. $B_{A3}$ may fall within a range of 0° to 35°, and $\beta_{A5}$ may fall within a range of 18° to 37°.

When $\beta_{A3} \geq 0°$ and $\beta_{A5} \geq 18°$, the user may spread both legs, which is expected to provide a comfortable riding experience and reduce the risk of discomfort caused by inward encroachment into the animal's seating space. In addition, the animal is expected to be guided by the user to face forward, allowing it to observe the front area of the vehicle 1A. For example, in the case of a large animal with greater height, the head may be positioned near the upper end of the stem 202A during riding, and the degree of outward offset relative to the stem 202A may be smaller. When $\beta_{A3 \leq 35}°$ and $\beta_{A5} \leq 37°$, the extent to which the user's legs are spread is appropriate, which is expected to provide a comfortable riding experience and reduce the risk of collision with the animal. In addition, the animal is expected to be guided by the user to observe the left-front or right-front area of the vehicle 1A, and its head may be substantially aligned with the body, allowing the body to be more extended and reducing the degree of torsion, which is expected to improve the stability and comfort of the animal while being carried. For example, in the case of a small animal with shorter height, its head may be located near the lower end of the stem 202A and the head tube 101A while being carried.

When the stem 202A is foldable, the small animal may avoid the folding mechanism 206A, and the degree of outward offset relative to the stem 202A may be greater.

Figure 15D:
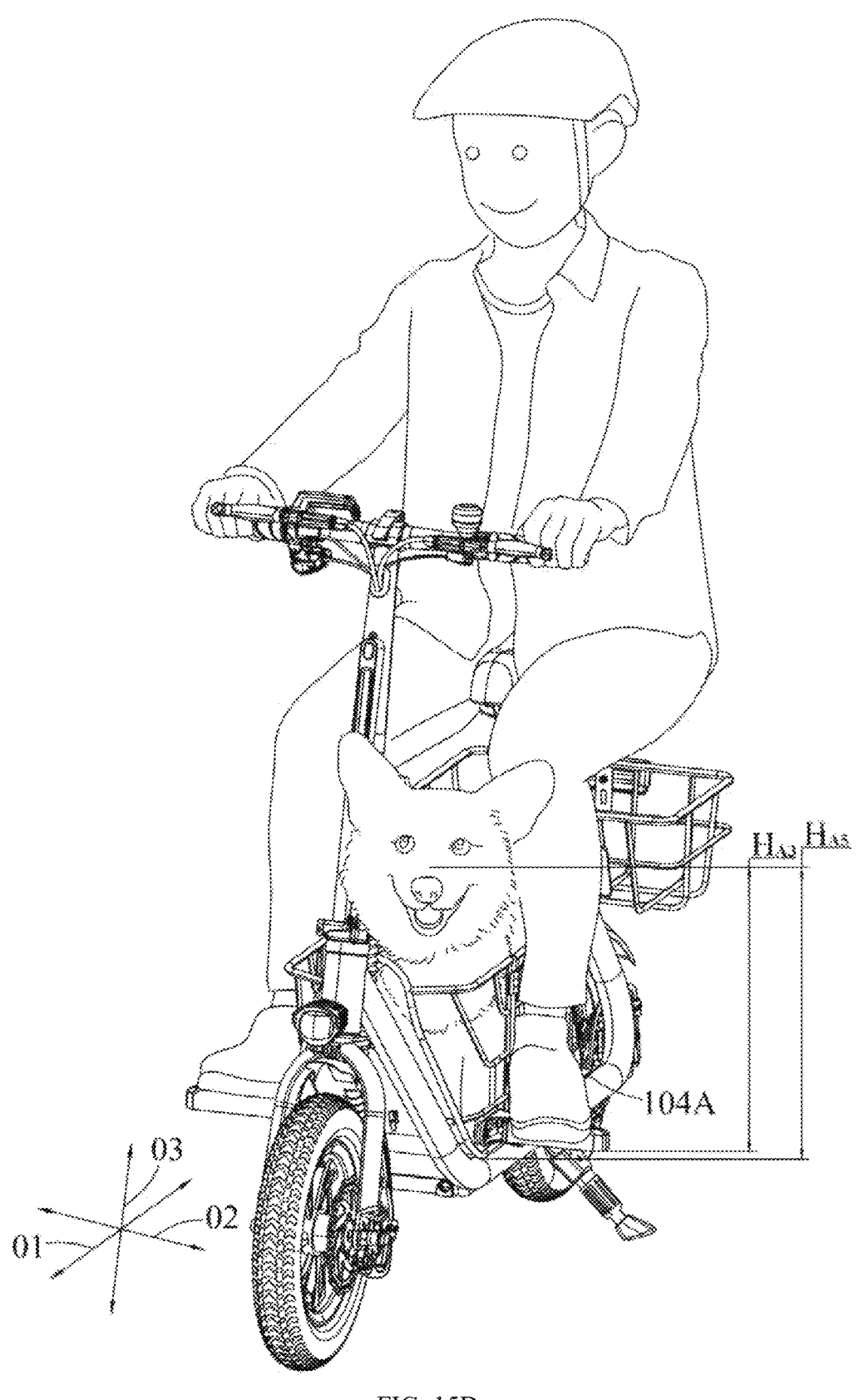

Referring to FIG. 15D, in some embodiments, the distance between the animal's face and the support plate 104A is denoted as $H_{A3}$, and the distance between the animal's face and the user's stepping position is denoted as $H_{A5}$. The ratio of HAS to $H_{A3}$ is defined as KAI, and $K_{A1}$ may fall within a range of 0.8 to 1.2. When $K_{A1} \geq 0.8$, the user's stepping position is at an appropriate distance from the animal's face, which may reduce interference from the user's feet with the movement of the animal's head. In addition, it facilitates the user in extending the legs downward, which is expected to improve riding comfort. In addition, the possibility of collision between the user's feet and the animal's face is reduced. For example, it is expected to avoid the risk where the animal's face and the user's stepping position are approximately at the same height, which may cause the user's feet to easily collide with the animal's face, especially under bumpy road conditions or during turning. When $K_{A1} \leq 1.2$, it reduces the likelihood that the user needs to excessively stretch the legs downward due to an overly large distance, which is expected to enhance riding comfort and allow the user to maintain a stable posture to shield and protect the animal from the outside. Specifically, KAI may be any value within the range of 0.8 to 1.2, for example, 0.8, 0.84, 0.88, 0.92, 0.96, 1, 1.04, 1.08, 1.12, 1.16, 1.2.

The following continues the description of the vehicle 1A (vehicle 1A may correspond to vehicle 100 in CN202410885010.1). The following description may be understood based on the disclosure of the preceding text and/or drawings, and some features may be understood in conjunction with the same or similar drawings (including part numbers).

The disclosure of the preceding text and/or drawings includes, as shown in FIG. 1A, that the power mechanism 600A may be disposed on the frame 100A (frame 100A may correspond to frame 10 in CN202410885010.1), the power mechanism 600A may provide power for the movement of the vehicle 1A, and the user may monitor the items in the storage mechanism 700A while riding. From this, it may be understood as that the vehicle 1A may also be referred to as an electric riding device 1A. FIGS. 1A and 1B are both structural examples of the vehicle/electric riding device 1A in a perspective view, with the main difference between the two figures being the different emphasis of the reference numerals.

In some embodiments, the terms "main frame," "frame body," "main structural frame," "primary frame," "principal frame" may be used interchangeably. The terms "handlebar assembly," "handlebar set," "handlebar-stem assembly," "steering handle assembly," "steering bar assembly," "tiller assembly," "tiller-bar assembly," "control-bar assembly," and "handlebar arrangement" may be used interchangeably.

In some embodiments, as shown in FIG. 1B, the electric riding device 1A may include: a frame body 161A extending from a front portion of the electric riding device 1A to a rear portion of the electric riding device 1A; a front wheel 400A and a rear wheel 500A mounted on the front and rear sides of the frame body 161A, respectively; a handlebar assembly 224A foldably mounted on the front side of the frame body 161A and configured to be in contact with a user's hands; a seat 82A adjustably mounted on the frame body 161A; and a rechargeable power source 600A mounted on the frame body 161A and configured to supply power to the electric riding device 1A.

In some embodiments, the electric riding device 1A may be a device that achieves riding movement through electric assistance or drive, which helps to improve the convenience of travel. The electric riding device 1A may use electricity as a power supplement or drive source for riding, and through signals generated by the user's force or operation, achieve the intervention or assistance of electric power in the riding process.

In some embodiments, the frame body 161A may be the core support structure of the frame 100A. The frame 100A may be the structural assembly in the electric riding device 1A that can carry and provide a mounting and positioning reference for functional components (e.g., front and rear wheels). The frame body 161A may be understood as the "backbone" of the frame 100A, which can roughly determine the overall shape of the frame 100A and the arrangement or layout path of the components carried or mounted thereon. In other examples, the frame 100A may also be referred to as a skeleton, framework, etc. In some cases, the frame body 161A may be structurally and functionally equivalent to the frame 100A.

In some embodiments, solely for ease of understanding, the projections of the frame body 161A and the frame 100A on a horizontal ground plane are defined as both falling in the 01' direction, meaning that the coordinate values of all parts of the frame body 161A and the frame 100A in the 01' direction are positive.

Further, the maximum coordinate value of the projection of the frame body 161A on the horizontal ground plane along the 01' direction may be referred to as a first coordinate value, and the maximum coordinate value of the projection of the frame 100A on the horizontal ground plane along the 01' direction may be referred to as a second coordinate value. "Proximate to the . . . front portion" may be understood as: (1) the first coordinate value is greater than the second coordinate value, and the portion of the frame body 161A corresponding to the first coordinate value is farther from the rear end of the electric riding device 1A than the portion of the frame 100A corresponding to the second coordinate value. Or, (2) the first coordinate value is equal to the second coordinate value, and the portion of the frame body 161A corresponding to the first coordinate value and the portion of the frame 100A corresponding to the second coordinate value are at the same distance from the rear end of the electric riding device 1A. Or, (3) the first coordinate value is less than the second coordinate value, and the portion of the frame body 161A corresponding to the first coordinate value is closer to the rear end of the electric riding device 1A than the portion of the frame 100A corresponding to the second coordinate value. "Proximate to the . . . front portion" can also be understood as the absolute value of the difference between the first coordinate value and the second coordinate value, divided by the absolute value of the second coordinate value, falls within the range of 0-0.5. In some examples, it may be understood as that "component A is proximate to the first end of component B" can be interpreted by component A being far from the second end of component B, where the first and second ends of component B are opposite ends with a certain distance along a certain direction. Therefore, a further understanding of "component A is proximate to the first end of component B" can mean that component A is past the midpoint between the two ends of component B and is located in the half of component B that includes the first end. "Proximate to the . . . front portion," whether it slightly exceeds the front, is exactly aligned with the front, or is slightly recessed within the front, is considered "proximate"; the primary consideration is the relative adjacency relationship in the front-rear direction, not necessarily physical contact or complete overlap. Vertical alignment (up/down/high/low) does not affect the determination of "proximate to the . . . front portion"; "proximate" only compares the longitudinal front-rear position.

In addition, the minimum coordinate value of the projection of the frame body 161A on the horizontal ground plane along the 01' direction may be referred to as a third coordinate value, and the minimum coordinate value of the projection of the frame 100A on the horizontal ground plane along the 01' direction may be referred to as a fourth coordinate value. "Proximate to the . . . rear portion" may be understood as: (1) the third coordinate value is greater than the fourth coordinate value, and the portion of the frame body 161A corresponding to the third coordinate value is closer to the front end of the electric riding device 1A than the portion of the frame 100A corresponding to the fourth coordinate value. Or, (2) the third coordinate value is equal to the fourth coordinate value, and the portion of the frame body 161A corresponding to the third coordinate value and the portion of the frame 100A corresponding to the fourth coordinate value are at the same distance from the front end of the electric riding device 1A. Or, (3) the third coordinate value is less than the fourth coordinate value, and the portion of the frame body 161A corresponding to the third coordinate value is farther from the front end of the electric riding device 1A than the portion of the frame 100A corresponding to the fourth coordinate value. "Proximate to the . . . rear portion" can also be understood as the absolute value of the difference between the third coordinate value and the fourth coordinate value, divided by the absolute value of the fourth coordinate value, falls within the range of 0-0.5. It may be understood as that "proximate to" is the opposite of "remote from." "Proximate to the . . . rear portion," whether it slightly exceeds the rear, is exactly aligned with the rear, or is slightly recessed within the rear, is considered "proximate"; the primary consideration is the relative adjacency relationship in the front-rear direction, not necessarily physical contact or complete overlap. Vertical alignment (up/down/high/low) does not affect the determination of "proximate to the . . . rear portion"; "proximate" only compares the longitudinal front-rear position.

In some embodiments, "extending from . . . , to . . . " may be understood as a continuous structural concept in a certain direction. The frame body 161A may form a continuous structural path along the 01' direction, with the starting point proximate to the front portion of the electric riding device 1A and the endpoint proximate to the rear portion of the electric riding device 1A. This path can be composed of a single piece or multiple interconnected segments (e.g., straight, arc, bent, raised segments), and its continuity is not broken by bends, holes, or grooves.

In some embodiments, the front wheel 400A may be used for rolling contact with the ground at the front end, supporting and distributing the front load, and responding to steering to achieve directional control. The rear wheel 500A may be used for rolling contact with the ground at the rear end, supporting and distributing the rear load, and can also serve as a drive wheel to provide traction or as a driven wheel to roll along.

In some embodiments, "mounted on the . . . front side" may be understood as focusing on the adjacency relationship in the front-rear direction (i.e., the 01' direction). The position of the front wheel 400A may be on the front side, and it may be beyond the front side, exactly aligned with the front side, or located within the front side; all may be considered "on the front side." This determination may be independent of height (02' direction) or lateral position (03' direction) and is not limited by specific connecting parts or shapes; as long as the main functional relationship of the front wheel 400A (positional adjacency, direction from which load is first transmitted) belongs to the adjacent region of the front side of the frame body 161A, it may be considered "mounted on the front side." In particular, "component A is mounted on the front side of component B" may be understood as component A being entirely mounted on the front side of component B, or at least a portion of component A may be mounted on the front side of component B.

In some embodiments, "mounted on the . . . rear side" may be understood as focusing on the adjacency relationship in the front-rear direction (i.e., the 01' direction). The position of the rear wheel 500A may be on the rear side, and it may be beyond the rear side, exactly aligned with the rear side, or located within the rear side; all may be considered "on the rear side." This determination may be independent of height (02' direction) or lateral position (03' direction) and is not limited by specific connecting parts or shapes; as long as the main functional relationship of the rear wheel 500A (positional adjacency, direction from which load is first transmitted) belongs to the adjacent region of the rear side of the frame body 161A, it may be considered "mounted on the rear side." In particular, "component A is mounted on the rear side of component B" may be understood as component A being entirely mounted on the rear side of component B, or at least a portion of component A being mounted on the rear side of component B. Further, other similar technical features in some embodiments such as "component A is mounted on the rear side of component B" may be interpreted in the same or a similar manner.

In some embodiments, the handlebar assembly 224A can be configured to be in contact with a user's hands. The handlebar assembly 224A may be used to receive or bear the force applied by the user, and this applied force can be used to maintain or adjust the riding state (such as direction or route). Further, "foldably" for the handlebar assembly 224A may mean that the entire handlebar assembly 224A can switch between a riding position (or a non-compact state) and a storage position (or a compact state) relative to the frame body 161A. This switch can be achieved by the folding of other parts connected to the handlebar assembly 224A (such as the stem 202A). In other words, it is not required that the handlebar assembly 224A itself have a folding structure; during the folding process, the multiple parts included in the handlebar assembly 224A can remain relatively static, without moving away from or closer to each other.

In some embodiments, "configured to" may be understood as a statement clarifying that a component/object, through its own structural design, mounting method, or cooperative relationship with other components, possesses the design intent and capability to achieve a specific function. It can cooperate with other components to achieve a specific function, with the core emphasis being on the "design goal and functional positioning of the component."

In some embodiments, the seat 82A may be the part of the electric riding device 1A that provides support for the user's sitting posture and assists in maintaining the riding posture. Further, "adjustably" for the seat 82A may mean that at least a part of the seat 82A can switch between different heights relative to the frame body 161A. This switch can be achieved solely through internal adjustments of the seat 82A, or solely through internal adjustments of the frame 100A, or through the cooperative adjustment of the seat 82A and other components on the frame 100A, or a combination of the foregoing methods. In other words, "adjustably" does not require the seat 82A itself to contain a lifting mechanism. It may be noted that "adjustment" here refers to a change in state, such as length or the position where it is combined/placed.

In some embodiments, the power source 600A may be referred to as a power mechanism in other embodiments.

Unless otherwise specified, other occurrences of "configured to," "proximate to the . . . front portion," "proximate to the . . . rear portion," "extending from . . . , to . . . ," "mounted on the . . . front side," "mounted on the . . . rear side" in some embodiments may be understood as according to the above methods/rules. The differences may mainly lie in the different objects being judged, but the basic judgment rules can be the same.

In some embodiments, the terms "flat," "planar," "plate-like," and "deck-like" may be used interchangeably. In some embodiments, the terms "base portion," "base section," "bottom portion," "bottom section," "deck portion," "platform portion," and "platform" may be used interchangeably. In some embodiments, the terms "front raised portion", "front raised section," "front upwardly extending portion/section," "front rising section," "front upturned section," "front ramped section," and "front raised wall" may be used interchangeably. In some embodiments, the terms "rear raised portion", "rear raised section," "rear upwardly extending portion/section," "rear rising section," "rear upturned section," "rear ramped section," and "rear raised wall" may be used interchangeably. In some embodiments, the expressions "at an end distal to . . . ," "at its distal end relative to . . . ," and "at its end remote from . . . " may be used interchangeably to denote the end or end region of the member. In some embodiments, references to an "end" of a member may denote an end region rather than a mathematical point. The end region may be a finite-length portion that may be adjacent to the member's terminal boundary along its length and may include the terminal surface, a fillet/radius/chamfer, or a short adjoining segment.

In some embodiments, as shown in FIG. 4B, the frame body 161A may include a substantially flat base portion 162A and a front raised portion 163A and a rear raised portion 164A extending upwardly from the front and rear ends of the base portion 162A, respectively, in some embodiments the base portion 162A, the front raised portion 163A, and the rear raised portion 164A can collectively define a bottom-enclosed storage space 165A.

In some embodiments, as shown in FIGS. 4B and 4C, it can be seen that the front raised portion 163A is configured to support a head tube 101A at an end thereof distal to the base portion 162A.

In some embodiments, as shown in FIGS. 4E and 4F, it can be seen that a bottom of the storage basket 700A is configured with an openwork structure to permit paws of an animal loaded in the storage basket 700A to directly contact the upper surface of the base portion 162A.

In some embodiments, references to the "bottom" of a member may mean the member's lower side or lower boundary that functionally bounds the member on its lower side and transmits load or positioning to adjacent structure. The bottom may be realized as: (1) one or more discrete base elements that directly underlie the interior, such as a panel/plate/board, slats, or strips; (2) a perimeter or side-rail framework in which lower rails/bars/tubes collectively define the lower boundary and carry loads even when a central area is open; or (3) combinations of the foregoing.

Unless expressly limited otherwise, the bottom is not restricted to the lowest elevation or to a single continuous coplanar surface; it may be continuous or discontinuous, rigid or flexible, and formed integrally or as multiple attached pieces from any suitable material. By way of example, for a basket, the "bottom" may comprise a solid base panel, a mesh or slatted base, or spaced rails collectively defining the basket's lower boundary. In some embodiments, when referring to this concept, terms such as "bottom," "base," "lower side," "bottom region," and "lower boundary" may be used interchangeably.

Furthermore, the definition of the "contact surface" of the basket in some embodiments is to be construed broadly. For example, a flat, plate-like bottom surface of the basket is the most direct type of contact surface. In other embodiments, even if the bottom of the basket is mesh-like or partially hollowed-out, the mesh bottom as a whole can still define or possess a contact surface. More specifically, it can define a substantially flat bottom contact surface, wherein the contact surface in this context represents an average or holistic concept. In some examples, even merely the lowermost edges/ends of the left and right walls (with a gap therebetween) can together form or have a contact surface, which is also based on an average or overall concept.

In some embodiments, an "openwork structure" may mean a structure having through-openings that may pass from one side to the other, including without limitation perforations, holes, slots, grids, lattices, meshes, spaced slats/bars/rods, or webbing. The openwork may cover all or part of the bottom, may be rigid or flexible, integral or attached, and may include removable liners/covers without departing from this definition.

In some embodiments, "configured to permit paws of an animal loaded in the storage basket to directly contact the upper surface of the base portion" may mean the openings and surrounding geometry may allow one or more paws (including pads/toes/claws) to reach and touch that surface whenever the animal chooses during normal use, regardless of its size or posture. Such contact may be brief or occasional—it does not have to be continuous or present at all times. "Directly" may allow no intentional structural layer (e.g., a permanent plate or liner) is placed between the paw and that surface; incidental films, coatings, dust, or transient debris do not negate direct contact.

In some embodiments, as shown in FIG. 4D, the base portion 162A may be the part of the frame body 161A that bears and distributes pressure or weight from above. In some other embodiments, the base portion 162A may be referred to as a second section.

In some embodiments, "substantially flat" may be understood as the overall shape or state may be planar or nearly planar, allowing for local undulations and detailed features introduced for manufacturing/assembly/functional purposes, as long as it can form a stable fit or multi-point coplanar support with other mating parts or objects, it may be considered substantially flat.

In some embodiments, as shown in FIG. 4C, the front raised portion 163A may be the part of the frame body 161A that provides height extension, providing an upwardly tilted or raised shape, which can provide mounting or support functions at the front portion of the frame body 161A. In some embodiments, as shown in FIG. 4C, the front raised portion 163A may include a head tube 101A, two first inclined portions 138A, two first arc-shaped portions 139A, a substantially flat inclined portion 166A, and a curved transition portion 167A. Herein, both the two first inclined portions 138A and the two first arc-shaped portions 139A may be hollow tubes. Herein, both the inclined portion 166A and the transition portion 167A are substantially flat plate structures. In addition, in other examples, the front raised portion 163A may lack one or several of these components and still perform the intended mounting or support function, for example, the front raised portion 163A may only include a head tube 101A, two first inclined portions 138A, and two first arc-shaped portions 139A.

In some embodiments, as shown in FIG. 4E, the rear raised portion 164A may be the part of the frame body 161A that provides height extension, providing an upwardly tilted or raised shape to achieve rear load-bearing and support functions. In some embodiments, as shown in FIG. 4E, the rear raised portion 164A may include two second arc-shaped portions 141A, two second inclined portions 142A, two third arc-shaped portions 143A, and two horizontal sections 144A, all of which are hollow tubes. Herein, each of the aforementioned segments of the rear raised portion 164A may be a hollow tube. In addition, in other examples, the rear raised portion 164A may lack one or several of these components and still perform the intended mounting or support function, for example, the rear raised portion 164A may only include two second arc-shaped portions 141A, two second inclined portions 142A, and two third arc-shaped portions 143A.

In some embodiments, "extending upwardly" may be understood as continuously producing a recognizable height increase in the $02'$ direction and extending a structural path along the $01'$ direction to provide space for the assembly, loading, or envelopment of other components. Its geometry can be a straight line, slope, arc, broken line, step, or a combination thereof, and it can be integrally formed or composed of multiple interconnected segments.

In some embodiments, referring to FIG. 4B, the storage space 165A can be a semi-enclosed area used for placing or supporting items that need to be accommodated, such as an animal or a user's feet. In some embodiments, the storage space 165A can be a space roughly in the shape of a parallelogram.

In some embodiments, "collectively define" may be understood as, through the relative positions and shape cooperation of multiple objects/components (e.g., the base portion 162A, the front raised portion 163A, and the rear raised portion 164A), enclosing or delineating a recognizable space/region in three-dimensional space. This space can be semi-enclosed or partially open, and its boundary can be formed by a combination of the surfaces and/or edges of the various objects.

Unless otherwise specified, other occurrences of "substantially flat," "extending upwardly," and "collectively define" in some embodiments may be understood as according to the above methods/rules. The differences may mainly lie in the different objects being judged, but the basic judgment rules are the same.

In some embodiments, referring to FIG. 4F, the electric riding device 1A may further include a basket 700A for carrying items, which is removably attached to the frame body 161A and is at least partially located within the storage space 165A. The basket 700A can have an operable connection system 784A, which is configured to allow the basket 700A to be fixed to the frame body 161A in a first operating state, and the connection system 784A can be configured to allow the basket 700A to be removed from the frame body 161A in a second operating state.

In some embodiments, "removable" may be understood as to mean that the connection relationship between the two (e.g., the basket 700A and the frame body 161A) is reversible and non-destructive, or it may be understood as being able to be installed intact and removed intact.

In some embodiments, "attached" may be understood as to mean that it can be either a direct connection or an indirect connection achieved through an integral or separate intermediate member, or it may be understood as that contact is not necessary, but the load transfer and positioning relationship must be achieved through the connection.

In some embodiments, the operable connection system 784A may be understood as a collection of structures used to detachably connect the basket 700A to the frame body 161A, which can be switched between a fixed state and a detached state through user-executable actions.

In some embodiments, the first operating state may be understood as the operable connection system 784A being in a locked/fastened configuration, forming a single-point or multi-point constrained connection between the basket 700A and the frame body 161A, remaining stable under normal riding conditions, and not allowing unintended relative detachment. The second operating state may be understood as the operable connection system 784A being in a released/unlocked configuration, thereby allowing the basket 700A to be removed from the frame body 161A along a predetermined removal path.

Unless otherwise specified, other occurrences of "removable" and "attached" in some embodiments may be understood as according to the above methods/rules. The differences may mainly lie in the different objects being judged, but the basic judgment rules are the same.

In some embodiments, as shown in FIG. 13B, the electric riding device 1A may further include a footrest assembly mounted at a position proximate to the front end of the base portion 162A. The footrest assembly may include a first foot pedal 1501A and a second foot pedal 1501A. The first foot pedal 1501A may be detachably mounted on the left side of at least one of the base portion 162A and the basket 700A and be configured to extend laterally outward in a first direction (e.g., extending to the left outward). The second foot pedal 1501A may be detachably mounted on the right side of at least one of the base portion 162A and the basket 700A and be configured to extend laterally outward in a second direction opposite to the first direction (e.g., extending to the right outward). Wherein, when the basket 700A is fixed on the frame body 161A, the user's feet can be placed on the footrest assembly during riding, and when the basket 700A is removed from the frame body 161A, the user's feet can be placed on the base portion 162A during riding. It may be noted that in some other embodiments, the first foot pedal or the second foot pedal may be referred to as a pedal.

In some embodiments, the footrest assembly may be a set of components used to provide foot support and posture stability for the user during riding.

In some embodiments, "proximate to the . . . front end" may be understood as to have the same meaning as "proximate to the . . . front portion." In addition, it may be noted that the object being projected onto the horizontal ground here is the functionally relevant area of the footrest assembly. The functionally relevant area can be the part of the footrest assembly for external connection/installation or the stepping/treading interface provided by the footrest assembly (such as the tread surface of the footplate or the user's foot contact area). Either of these can be taken as the object for projection.

In some embodiments, "detachable" may be understood as to mean that the connection relationship between multiple components/objects (e.g., the first foot pedal 1501A and the base portion 162A and/or the basket 700A) is reversible and non-destructive, or it may be understood as being able to be installed intact and removed intact.

In some embodiments, " . . . on the left side of" may be understood as focusing on the adjacency relationship in the left-right direction (e.g., the 03' direction). For example, the position of the first foot pedal 1501A is on the left side, and it can be beyond the left side, exactly aligned with the left side, or located within the left side; all are considered "on the left side." This determination is independent of height (02' direction) or front-rear position (01' direction) and is not limited by specific connecting parts or shapes; as long as the main functional relationship of the first foot pedal 1501A (positional adjacency, direction from which load is first transmitted) belongs to the adjacent region of the left side of the base portion 162A and/or the basket 700A, it can be considered "mounted on the left side."

In some embodiments, " . . . on the right side of" may be understood as focusing on the adjacency relationship in the left-right direction (e.g., the 03' direction). For example, the position of the second foot pedal 1501A is on the right side, and it can be beyond the right side, exactly aligned with the right side, or located within the right side; all are considered "on the right side." This determination is independent of height (02' direction) or front-rear position (01' direction) and is not limited by specific connecting parts or shapes; as long as the main functional relationship of the second foot pedal 1501A (positional adjacency, direction from which load is first transmitted) belongs to the adjacent region of the right side of the base portion 162A and/or the basket 700A, it can be considered "mounted on the right side."

Unless otherwise specified, other occurrences of "detachable," " . . . on the left side of," and " . . . on the right side of" in some embodiments may be understood as according to the above methods/rules. The differences may mainly lie in the different objects being judged, but the basic judgment rules are the same.

In some embodiments, as shown in FIG. 4D, the base portion 162A may include a hollow left frame tube 169A and a hollow right frame tube 170A, each extending longitudinally and arranged substantially in parallel. The base portion 162A also includes a substantially flat support plate 104A, wherein at least a portion of the left side of the support plate 104A is connected to the left frame tube 169A, and at least a portion of the right side of the support plate 104A is connected to the right frame tube 170A. It may be noted that in some other embodiments, the left frame tube 169A may be referred to as a first flat frame tube portion, and the right frame tube 170A may be referred to as a first flat frame tube portion.

In some embodiments, "respectively extending longitudinally" may be understood as to mean that multiple components/objects (e.g., the left frame tube 169A and the right frame tube 170A) each have the longitudinal direction as their primary direction of extension. For example, the two frame tubes may include local straight, curved, or inclined segments, but their overall structure is still configured to extend along the longitudinal direction. As long as the projection length of the two frame tubes in the 01' direction is dominant compared to their projections in the 02' and 03' directions, they can be considered to "extend longitudinally."

In some embodiments, "arranged substantially in parallel" may be understood as to mean that multiple components/objects (e.g., the two frame tubes) remain substantially parallel and laterally separated from each other in at least one region between their front and rear ends. This does not exclude the possibility of them converging or approaching each other at the end regions, or having local non-parallel segments due to functional structural needs, as long as the parallel spacing relationship in the aforementioned "at least one region" is established.

In some embodiments, "hollow" may be understood as to mean that the component/object (e.g., the left frame tube 169A and the right frame tube 170A) is a tubular/profiled member having one or more internal cavities along at least a portion of its length. The cavities can be continuous or discrete, interconnected or separated from each other; their number, shape, and size (e.g., circular, elliptical, rectangular, polygonal, irregular, or varying cross-section along the length) and their distribution along the length are not limited, and the ends can be open or closed. It can be a single piece or composed of multiple segments.

In some embodiments, "at least a portion of the left side" may be understood as to refer not only to the leftmost "edge line" (physical boundary line) but to a region extending from the left edge (boundary line) towards the right edge, based on the overall contour (e.g., extending from the left edge of the support plate 104A to the right by a distance of, for example, ¼ of its own lateral dimension). Therefore, "at least a portion of the left side" includes the "left edge" and the "adjacent region inside the left edge."

In some embodiments, "at least a portion of the right side" may be understood as to refer not only to the rightmost "edge line" (physical boundary line) but to a region extending from the right edge (boundary line) towards the left edge, based on the overall contour (e.g., extending from the right edge of the support plate 104A to the left by a distance of, for example, ¼ of its own lateral dimension). Therefore, "at least a portion of the right side" includes the "right edge" and the "adjacent region inside the right edge."

Unless otherwise specified, other occurrences of "respectively extending longitudinally," "arranged substantially in parallel," "hollow," "at least a portion of the left side," and "at least a portion of the right side" in some embodiments may be understood as according to the above methods/rules. The differences may mainly lie in the different objects being judged, but the basic judgment rules are the same.

Figure 13C:
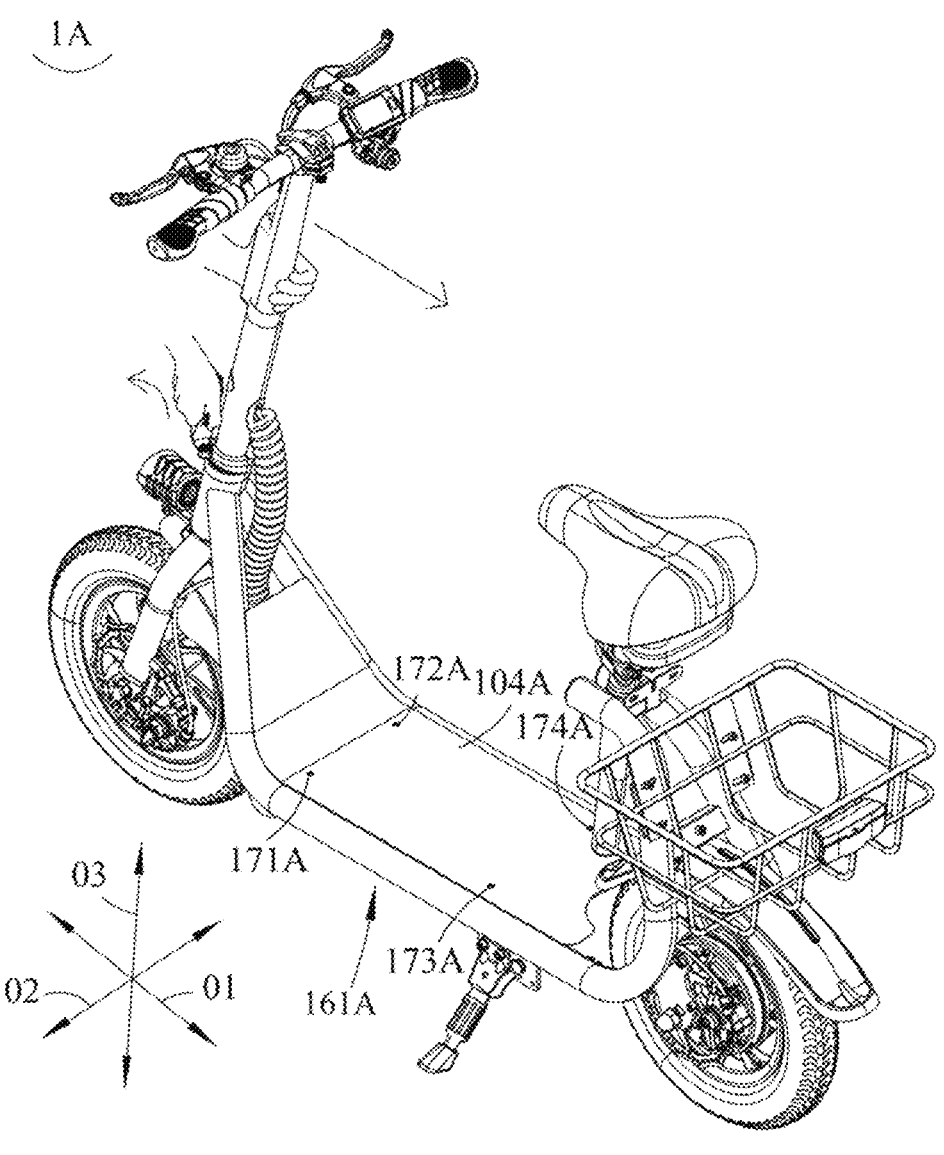
FIG. 13C is a schematic view from another direction of an implementation of the vehicle according to an embodiment of the present application.
Figures 13D, 13E:
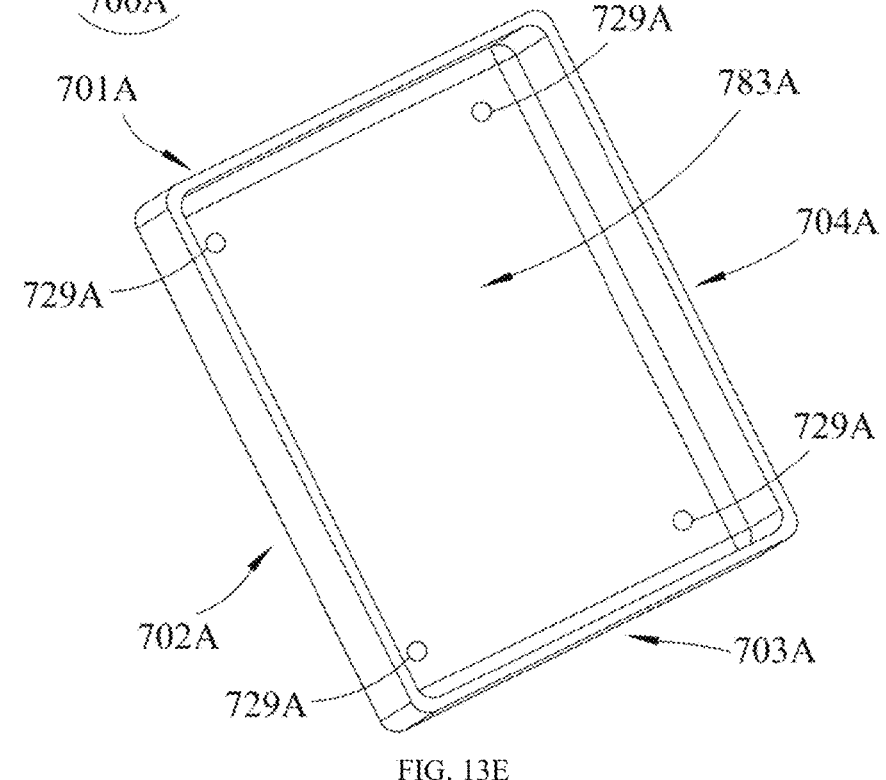
FIG. 13D is a schematic view from one direction illustrating the storage mechanism connected with the pedal according to an embodiment of the present application.
FIG. 13E is a schematic view from one direction of another implementation of the storage mechanism according to an embodiment of the present application.

In some embodiments, as shown in FIG. 13D, the connection system 784A includes a first mounting plate assembly 777A and a second mounting plate assembly 778A, each extending laterally and being longitudinally spaced apart. The first mounting plate assembly 777A is configured to removably fix the basket 700A to the frame body 161A proximate to the front side of the support plate 104A, and the second mounting plate assembly 778A is configured to removably fix the basket 700A to the frame body 161A proximate to the rear side of the support plate 104A. The first mounting plate assembly 777A includes laterally spaced-apart first front mounting hole 779A and second front mounting hole 780A. The second mounting plate assembly 778A includes laterally spaced-apart first rear mounting hole 781A and second rear mounting hole 782A. As shown in FIG. 13C, the frame body 161A has laterally spaced-apart first frame front mounting hole 171A and second frame front mounting hole 172A. The frame body 161A also has laterally spaced-apart first frame rear mounting hole 173A and second frame rear mounting hole 174A. When the basket 700A is fixed on the frame body 161A, the first front mounting hole 779A on the first mounting plate assembly 777A aligns with the first frame front mounting hole 171A on the frame body 161A, the second front mounting hole 780A on the first mounting plate assembly 777A aligns with the second frame front mounting hole 172A on the frame body 161A, the first rear mounting hole 781A on the second mounting plate assembly 778A aligns with the first frame rear mounting hole 173A on the frame body 161A, and the second rear mounting hole 782A on the second mounting plate assembly 778A aligns with the second frame rear mounting hole 174A on the frame body 161A.

In some embodiments, a mounting plate assembly may be understood as a set of plate-shaped or predominantly plate-shaped structural parts used to achieve connection/load-bearing/positioning/force transmission between the basket 700A and the frame body 161A. The mounting plate assembly can be an integral plate part or consist of two or more mutually independent, spaced-apart plate parts on the left and right. The mounting plate assembly can be integrally formed with the basket 700A or fixed to the basket 700A as a separate part.

In some embodiments, "respectively extending laterally" may be understood as to mean that multiple objects/components (e.g., the first mounting plate assembly 777A and the second mounting plate assembly 778A) each have the lateral direction as their primary direction of extension. They may include local straight, curved, inclined, or irregularly shaped structures, but their overall structure is still configured to extend laterally. As long as the projection length in the lateral direction is dominant compared to the projection lengths in the longitudinal and other directions, they can be considered to extend laterally.

In some embodiments, "longitudinally spaced apart" may be understood as to mean that the separation of the projections of multiple objects/components (e.g., the first mounting plate assembly 777A and the second mounting plate assembly 778A) in the longitudinal direction is a positive value, i.e., there is a non-zero distance between them in the front-rear direction. They can be aligned or offset in the lateral or vertical directions without affecting the establishment of "longitudinally spaced." "Spaced" does not require that there be no other structures intervening or connecting between them, as long as the longitudinal projection separation is positive and does not hinder the intended function.

In some embodiments, "proximate to the . . . front side" may be understood as to have the same meaning as "proximate to the . . . front portion." In addition, it may be noted that the object being projected onto the horizontal ground here is the functionally relevant area of the first mounting plate assembly 777A. The functionally relevant area can be the part of the first mounting plate assembly 777A for external connection/installation (e.g., a hole), the left edge (physical boundary line) of the first mounting plate assembly 777A, or the right edge (physical boundary line) of the first mounting plate assembly 777A. Any of these can be taken as the object for projection.

In some embodiments, "proximate to the . . . rear side" may be understood as to have the same meaning as "proximate to the . . . rear portion." In addition, it may be noted that the object being projected onto the horizontal ground here is the functionally relevant area of the second mounting plate assembly 778A. The functionally relevant area can be the part of the second mounting plate assembly 778A for external connection/installation (e.g., a hole), the left edge (physical boundary line) of the second mounting plate assembly 778A, or the right edge (physical boundary line) of the second mounting plate assembly 778A. Any of these can be taken as the object for projection.

In some embodiments, a "front mounting hole" may be understood as an opening provided in the front mounting area (relative to the longitudinal front of the basket 700A/support plate 104A/frame body 161A) for fastening and/or positioning. A "rear mounting hole" may be understood as an opening provided in the rear mounting area (relative to the longitudinal front of the basket 700A/support plate 104A/frame body 161A) for fastening and/or positioning, which provides a rear fastening and positioning point, forming a multi-point front-rear fixation with the front mounting hole.

In some embodiments, "laterally spaced apart" may be understood as to mean that the separation of the projections of multiple objects/components (e.g., the first frame rear mounting hole 173A and the second frame rear mounting hole 174A) in the lateral direction is a positive value, i.e., there is a non-zero distance between them in the left-right direction. They can be aligned or offset in the longitudinal or vertical directions, and can be arranged in a straight line, a broken line, or at an angle, none of which affects the establishment of "laterally spaced." The reference point can be the center/axis of the hole, or a geometric center, a predetermined reference point, or the closest point. Even if there are other structures such as connectors, washers, or casings between the two holes, as long as the lateral projection separation is positive and does not hinder the intended function, it still constitutes being "laterally spaced apart." In addition, the expressions "laterally spaced apart," and "laterally opposed," "laterally spaced apart" may be used interchangeably.

In some embodiments, "aligned" may be understood as to describe the positioning relationship in an assembled state where two cooperating holes (or functional sections of holes) are functionally coaxial/within coaxiality tolerance or their projections in the corresponding direction coincide/overlap sufficiently to allow a predetermined fastener to pass through and cooperate with them (pass through, engage, or press against).

Unless otherwise specified, other occurrences of "respectively extending laterally," "longitudinally spaced apart," "proximate to the . . . front side," "proximate to the . . . rear side," "laterally spaced apart," and "aligned" in some embodiments may be understood as according to the above methods/rules. The differences may mainly lie in the different objects being judged, but the basic judgment rules are the same.

In some embodiments, referring to FIGS. 13B and 13D, the connection system 784A is configured to allow the basket 700A to be fixed to the frame body 161A via bolts (e.g., fourth bolts 776A) in the first operating state.

In some embodiments, as shown in FIG. 13A, the first foot pedal 1501A and the second foot pedal 1501A each have a folded state and a deployed state.

In some embodiments, the first limiting member may be referred to as a front wall, the third limiting member may be referred to as a rear wall, the second limiting member may be referred to as a left side wall, and the fourth limiting member may be referred to as a right side wall. For example, in FIGS. 13D, 13E, and 13F, the basket 700A may have a front wall 701A, a rear wall 703A, a left side wall 702A, a right side wall 704A, and a bottom wall 783A. The left side wall 702A extends substantially vertically upward from the left end of the bottom wall 783A, and the right side wall 704A extends substantially vertically upward from the right end of the bottom wall 783A.

In some embodiments, "substantially vertical" may be understood as to characterize an approximately orthogonal geometric relationship between two parts (such as the left side wall 702A and the bottom wall 783A of the basket 700A), allowing for deviations. Sources of deviation include but are not limited to manufacturing and assembly tolerances, fillets/chamfers, local reinforcing ribs, process draft angles, and slight curvatures, tapers, or mesh weaving.

In some embodiments, "extending upward" may be understood as to have the same meaning as "extending upwardly."

Figure 13F:
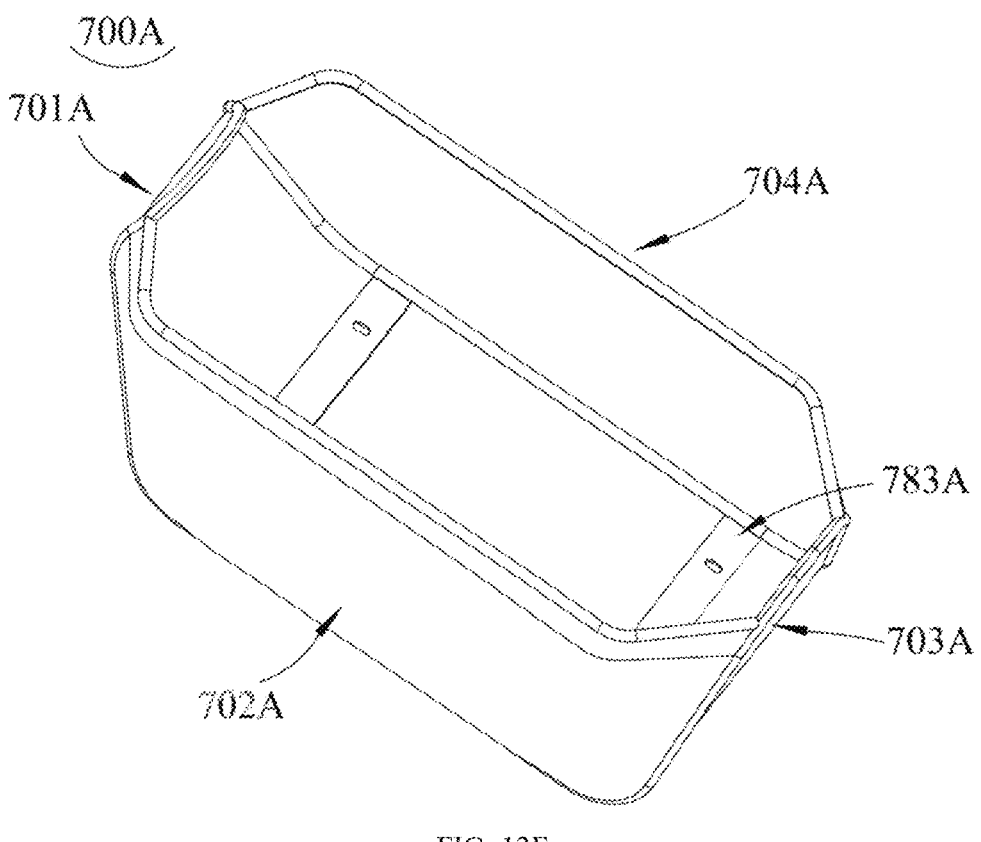
FIG. 13F is a schematic view from one direction of another implementation of the storage mechanism according to an embodiment of the present application.
Figure 13G:
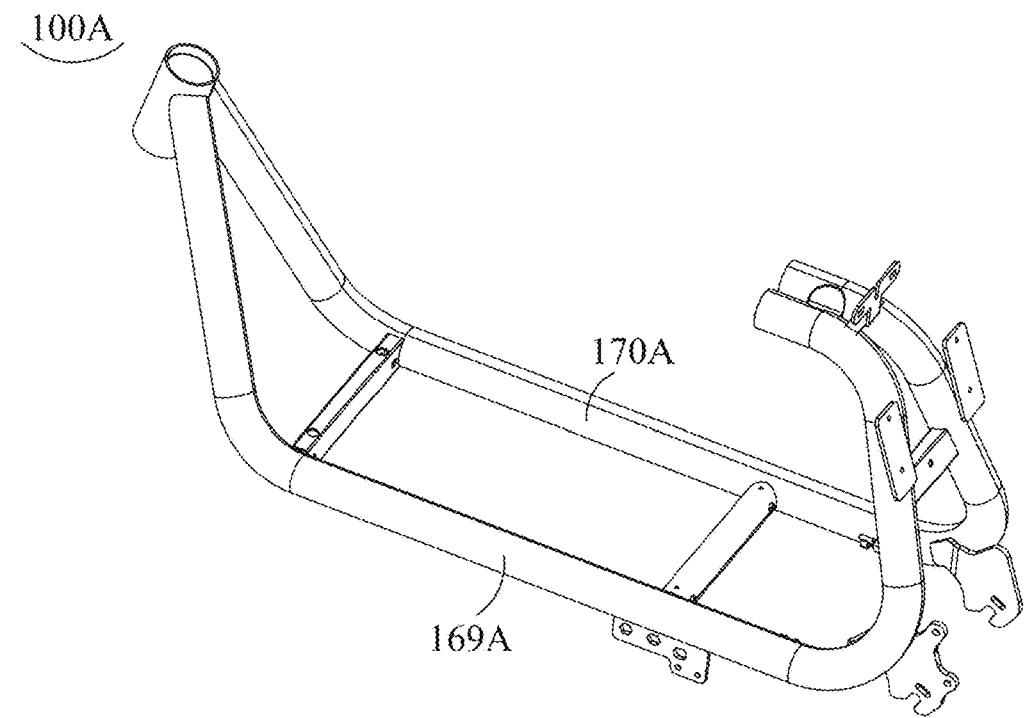
FIG. 13G is a schematic view from one direction of an implementation of the frame according to an embodiment of the present application.
Figure 13H:
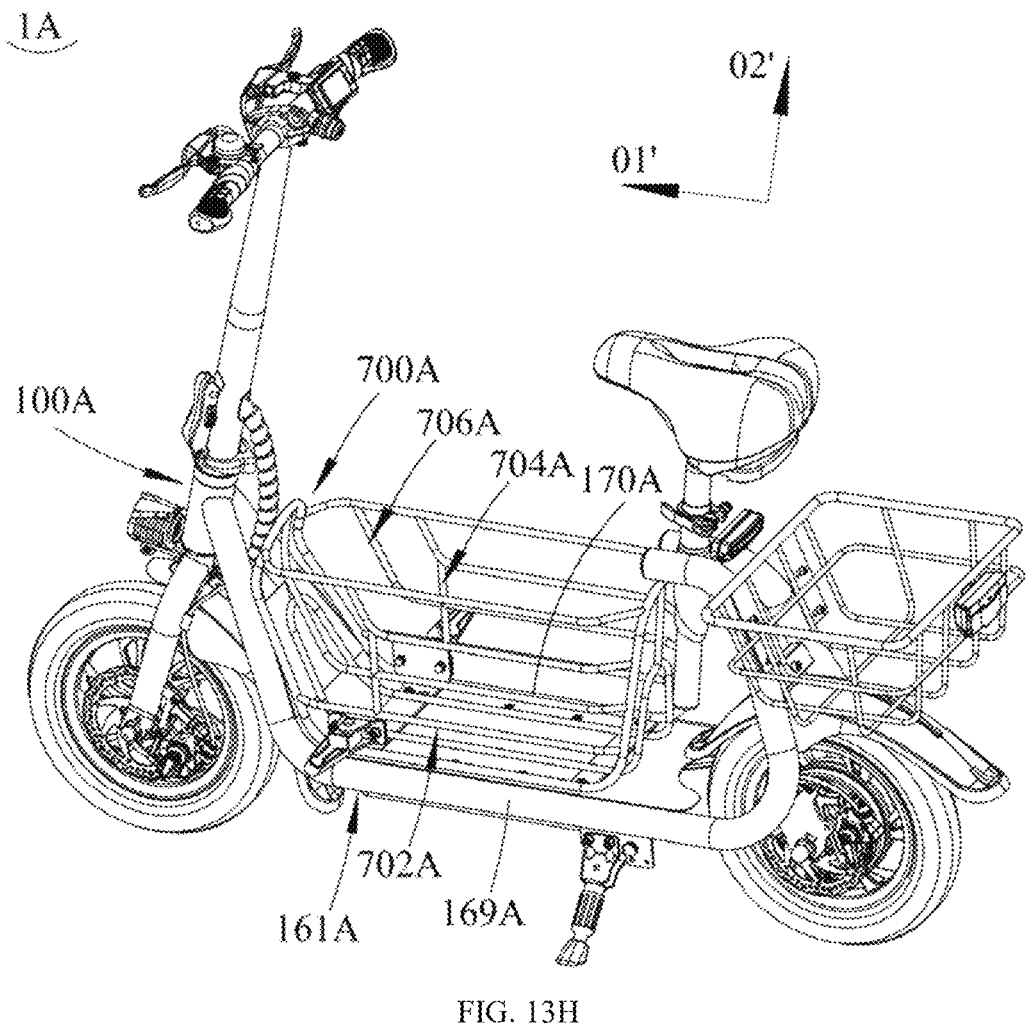
FIG. 13H is a schematic view from one direction of an implementation of the vehicle according to an embodiment of the present application.
Figure 13I:
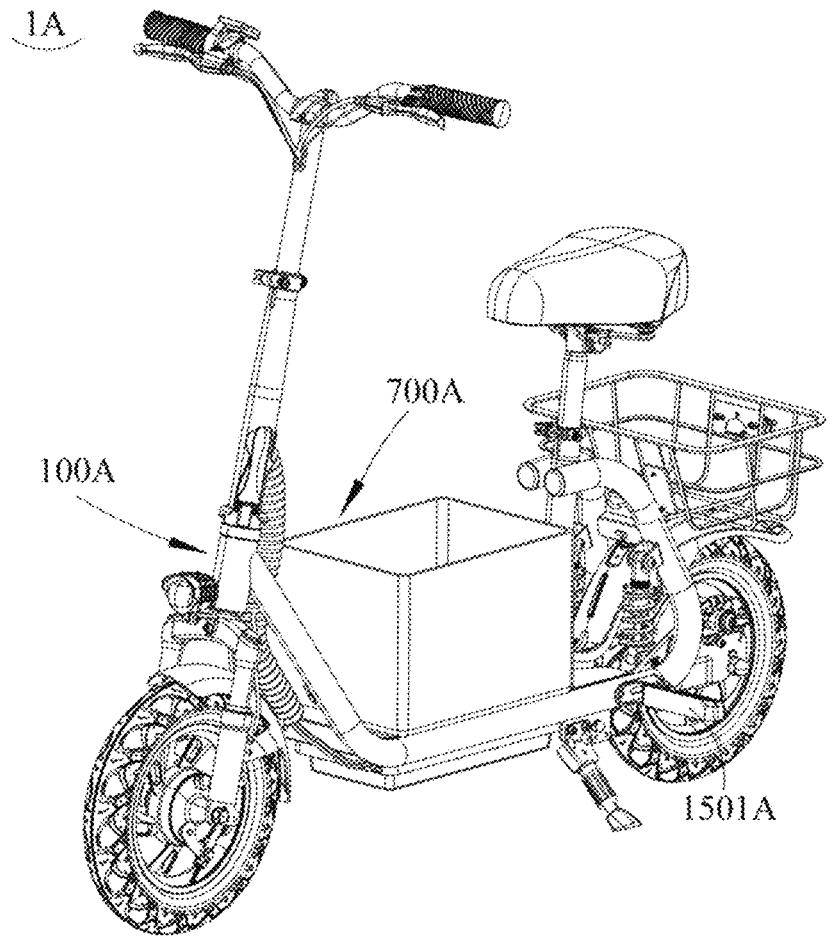
FIG. 13I is a schematic view from one direction of another implementation of the vehicle according to an embodiment of the present application.

In some embodiments, as shown in FIG. 13I, the first foot pedal 1501A and the second foot pedal 1501A may be mounted at a position proximate to the rear end of the frame 100A. Alternatively, it may be understood as that the first foot pedal 1501A and the second foot pedal 1501A may be mounted at a position proximate to the rear end of the basket 700A.

In some embodiments, "proximate to the . . . rear end" may be understood as to have the same meaning as "proximate to the . . . rear portion."

Unless otherwise specified, other occurrences of "substantially vertical," "extending upward," and "proximate to the . . . rear end" in some embodiments may be understood as according to the above methods/rules. The differences may mainly lie in the different objects being judged, but the basic judgment rules are the same.

In some embodiments, as shown in FIG. 13D, at least a portion of the basket 700A may be mesh-like.

In some embodiments, "mesh-like" may be understood as an open-hole structure formed by a plurality of openings and the connecting/load-bearing portions between them. The openings can be through-holes or partially transparent holes, and their size, pitch, and opening ratio can be uniform or non-uniform. Methods of forming the openings may include, but are not limited to: (1) linear members such as strips/rods/wires/tubes being interlaced, crossed, welded, woven, or knitted in a regular or irregular pattern; (2) a perforated plate/grille/grid structure formed from a plate/sheet material through processes such as punching, laser/waterjet cutting, chemical etching, or expanded metal processing; (3) a grille/grid/honeycomb-like structure (including ribs and pores) integrally formed by processes such as injection molding, die casting, or 3D printing. In other words, as long as the structure exhibits the overall characteristics of multiple openings and spaced supports to achieve purposes such as weight reduction, ventilation and heat dissipation, drainage, visibility/view, tying/hanging, or surface protection, it can be considered "mesh-like." The foregoing description is for illustrative rather than limiting purposes.

In some embodiments, as shown in FIG. 13D, the basket 700A may include a plurality of tubular structural members, which are interwoven to form a mesh-like structure.

In some embodiments, a "tubular structural member" may be understood as a member that extends in a longitudinal direction and has a cross-sectional outer profile that forms an annular envelope along at least a portion of its length, creating one or more internal cavities. Its cross-sectional shape is not limited (e.g., circular, elliptical, rectangular, polygonal, or a variable cross-section along the length), the ends may be open or closed, and it allows for local flattening, drilling, reinforcing, inserting, or filling without changing its overall tubular attribute; the material and forming method are also not limited (e.g., metal or plastic, formed by extrusion, drawing, welding, injection molding, casting, 3D printing, etc.).

In some embodiments, "interwoven" may be understood as an arrangement where multiple components/objects (e.g., tubular structural members) interpenetrate/cross each other in space to form a connected mesh-like opening. Adjacent members meet or are relatively staggered at one or more locations and may be fixed by methods such as welding, screwing, riveting, snapping, gluing, or overmolding. It can also be achieved by nodes/ribs on an integrally formed structure to realize an equivalent interwoven topology. Alternatively, it may be understood as an arrangement where multiple components/objects cross or are staggered in space and together form a mesh-like structure, without limitation to a specific weaving pattern, angle, hole shape, number of layers, or method of fixing the intersection points.

In some embodiments, as shown in FIGS. 13G and 13H, the tube diameter of the tubular structural members of the basket 700A may be smaller than the tube diameter of either the left frame tube 169A or the right frame tube 170A.

In some embodiments, the first mounting plate assembly 777A and the second mounting plate assembly 778A may both constitute a part that is integrally formed with the basket 700A. The first mounting plate assembly 777A may include a spaced-apart first left mounting plate and first right mounting plate, and the second mounting plate assembly 778A may include a spaced-apart second left mounting plate and second right mounting plate.

In some embodiments, "integrally formed" may be understood as to mean that the mounting plate assembly and the basket 700A, after manufacturing or subsequent permanent connection, constitute a structure that functions as a single unit for load-bearing and positioning in the in-use state. Methods of integral formation include, but are not limited to: (1) single-piece forming: methods such as casting, injection molding, or stamping, where the mounting plate assembly and the basket 700A are formed as one piece; (2) co-molding/overmolding: insert molding, two-shot molding, rubber overmolding, etc.; (3) integration after permanent connection: the mounting plate assembly and the basket are permanently connected by methods such as welding, structural adhesive bonding, or riveting. Even if there are weld seams/interfaces, it does not prevent it from being considered "integrally formed," as long as it is not intended for disassembly in normal use and its removal would require a destructive operation.

In some embodiments, "spaced-apart" may be understood as to mean that the separation of the projections of multiple objects/components (e.g., the first left mounting plate and the first right mounting plate) in the longitudinal, lateral, or vertical direction is a positive value, i.e., there is a non-zero distance between them in the front-rear, left-right, or up-down direction. They can be aligned or offset in other directions without affecting the establishment of "spaced-apart." "Spaced" does not require that there be no other structures intervening or connecting between them, as long as the projection separation is positive and does not hinder the intended function.

Unless otherwise specified, other occurrences of "interwoven" and "spaced-apart" in some embodiments may be understood as according to the above methods/rules. The differences may mainly lie in the different objects being judged, but the basic judgment rules are the same.

In some embodiments, the first front mounting hole and the second front mounting hole constitute two hole portions of a single hole on the first mounting plate assembly, and the first rear mounting hole and the second rear mounting hole constitute two hole portions of a single hole on the second mounting plate assembly.

In some embodiments, a "single hole" may be understood as a connected open area provided on the mounting plate assembly. The hole may be formed in one or more steps; as long as the open areas are connected to each other in the plane and function as one opening for assembly, it is considered a "single hole." The presence of local narrowing, widening, fillets, or steps does not change its attribute as a "single hole."

In some embodiments, "two hole portions of a single hole" may be understood as to mean two (or more) local cooperating sections within the same single hole that may be distinguished based on assembly/fastening/positioning functions. These sections can be formed naturally by the geometric contour (such as the two arc sections at the ends of an oblong hole, or the two circular sections of a figure-eight hole), or can be divided by function (e.g., two bolt cooperation positions along the length of a slot). Each "hole portion" has its own functional reference point (such as the geometric center of that portion, a positioning point, or the center of a predetermined fastening position); the two hole portions can be of equal or unequal size, symmetrical or asymmetrical, and of the same or different depths (when including countersinks/counterbores/steps).

In some embodiments, the transportation tool may be referred to as an electric vehicle. As shown in FIG. 1B, the electric vehicle 1A may include: a frame body 161A extending between a front portion and a rear portion of the electric vehicle 1A; a front wheel 400A and a rear wheel 500A mounted on the front and rear sides of the frame body 161A, respectively; a handlebar assembly 224A mounted on the front side of the frame body 161A and configured to be in contact with a user's hands; a seat 82A mounted on the frame body 161A; and a power source 600A mounted on the frame body 161A and configured to supply power to the electric vehicle 1A.

In some embodiments, "extending between . . . " may be understood as to mean that a component (e.g., the frame body 161A) exhibits a continuous geometric extension in one direction (e.g., the longitudinal direction) relative to the front and rear portions of a reference object (e.g., the electric vehicle 1A). The projection of the component in that direction falls within the interval defined by the front and rear ends of the reference object and spans at least a part of that interval. It is not required that the projection of the component be in direct contact or coincide with the foremost and/or rearmost ends of the reference object, nor is it limited to a linear form; as long as the component has a continuous distribution of non-zero length in that direction, it can be considered to be "extending between." Furthermore, unless otherwise specified, other occurrences of "extending between" in some embodiments may be understood as according to the above methods/rules. The differences may mainly lie in the different objects being judged, but the basic judgment rules are the same.

In some embodiments, as shown in FIG. 4E, the frame body 161A may include a left frame tube 169A and a right frame tube 170A that extend longitudinally, are arranged substantially in parallel, and are laterally spaced apart. The frame body 161A may also include a substantially flat support surface 175A that extends laterally from the left frame tube 169A to the right frame tube 170A.

In some embodiments, the frame body 161A may also include a support plate assembly. The support plate assembly may be understood as a collection of structures used to provide support/bearing functions for the storage mechanism 700A and/or the rider's feet. The support plate assembly may consist only of the support plate 104A, or, as shown in FIG. 4D, it may include the support plate 104A and a functional thin layer 2000A. In some embodiments, the support plate 104A and the functional thin layer 2000A can be integrally formed or combined as separate parts, and the material, shape, or number of layers of the support plate 104A and the functional thin layer 2000A can be flexibly configured.

In some embodiments, a functional thin layer may be understood as, in addition to having basic support functions, it can also be used to provide or improve surface and environmental adaptation properties. Its functions include but are not limited to: anti-slip and friction coefficient adjustment; surface protection (wear-resistant, scratch-resistant, stain-resistant, easy to clean/self-cleaning); environmental adaptation (waterproof/hydrophobic, water-guiding/draining, sealing/dust-proof, anti-corrosion/chemical resistant, UV-resistant/weather-resistant); safety and marking (anti-glare, reflective/high-visibility, warning/positioning/scale/directional marking, flame retardant/flame-retardant); and decorative aesthetics (color, texture, gloss control), etc.

In some embodiments, the "support surface 175A" may be understood as a mounting surface/load-bearing interface for supporting/positioning/installing the storage mechanism 700A. The support surface 175A is allowed to have structures such as holes, coatings, adhesive layers, or water drainage channels. As long as it can form a support/bearing relationship with the storage mechanism 700A under the assembly reference, it can be considered the support surface 175A. In some embodiments, when the support plate assembly only includes the support plate 104A, the top surface/upper surface of the support plate 104A can directly constitute the support surface 175A. For another example, when the support plate assembly includes the support plate 104A and the functional thin layer 2000A, the top side/top surface of the functional thin layer 2000A can directly constitute the support surface 175A.

In some embodiments, a pedal may be referred to as a left foot pedal or a right foot pedal. As shown in FIGS. 13B and 13G, the electric vehicle 1A may also include oppositely arranged left foot pedal 1501A and right foot pedal 1501A. The installation position of the left foot pedal 1501A may be proximate to the front end of the left frame tube 169A, and the installation position of the right foot pedal 1501A may be proximate to the front end of the right frame tube 170A. Alternatively, it may be understood as that an installation position of the left footrest is longitudinally closer to a left front end of the base portion than to a left rear end thereof, wherein the left footrest is configured to rotate about a first axis extending in a height direction, the right footrest is configured to rotate about a second axis extending in the height direction, and a lateral distance between the first axis and the second axis is greater than the lateral dimension of the storage basket.

In some embodiments, the second limiting member may be referred to as a left guard plate, and the fourth limiting member may be referred to as a right guard plate. For example, in FIGS. 13D, 13E, and 13F, in conjunction with FIGS. 13B and 13G, the electric vehicle 1A also includes a storage mechanism 700A. The storage mechanism 700A includes a left guard plate 702A removably mounted on the frame body 161A at a position proximate to the left frame tube 169A and extending substantially vertically upward, and a right guard plate 704A removably mounted on the frame body 161A at a position proximate to the right frame tube 170A and extending substantially vertically upward. The left guard plate 702A and the right guard plate 704A are oppositely arranged on the frame body 161A and together define a storage area 706A between them.

In some embodiments, the connection system 784A may also be referred to as a mounting interface, the first operating state may also be referred to as a fixing operation, and the second operating state may also be referred to as a removal operation. Referring to FIG. 4F, the storage mechanism 700A may have a mounting interface 784A. The mounting interface 784A may be configured to allow at least a portion of the storage mechanism 700A to be fixed on the support surface 175A when a user performs a fixing operation, and the mounting interface 784A may be configured to allow the storage mechanism 700A to be removed from the support surface 175A when a user performs a removal operation.

In some embodiments, at least a portion of the mounting interface 784A may have a substantially flat contact surface 785A, for example, in FIGS. 4G, 4H, and 4I. In conjunction with FIG. 4F, the contact surface 785A may be configured to engage the support surface 175A under the storage mechanism 700A and enable at least a portion of the storage mechanism 700A to be placed stably on the support surface 175A, so that when at least a portion of the storage mechanism 700A is placed on the support surface 175A, the contact surface 785A and the support surface 175A may be in substantially horizontal contact.

In some embodiments, "engage" (e.g., "the contact surface 785A engages the support surface 175A") may mean to make operative contact or interaction so as to support, locate, constrain, or couple components in normal use. Engagement may occur at one or more points/areas, continuously or intermittently, with or without relative motion. In some embodiments, the expressions "engage," "engage with," "engage against," "contact," "bear against," and "abut" may be used interchangeably.

In some embodiments, "be placed stably" may mean to rest or be supported in a manner that resists unintended tipping, rocking, or sliding under ordinary loads, handling, and vibration, without requiring permanent attachment unless specified. Stable placement may be provided by planar contact, three-point or multi-point support, localized lands/bosses/pads, compliant layers, or frictional/retentive features, and does not demand a single continuous coplanar interface. In some embodiments, the expressions "be placed stably," "rest stably," "rest securely," and "be stably supported" may be used interchangeably.

In some embodiments, "substantially horizontal contact" may be understood as a contact relationship where multiple objects (e.g., the contact surface 785A and the support surface 175A) form an approximately coplanar/parallel contact relationship for support/positioning/fastening in the in-use state (e.g., assembled state). As long as the two surfaces can be stably fitted or achieve stable placement through multi-point approximately coplanar support under a predetermined assembly preload or self-weight, meeting assembly and/or load-bearing requirements, it is considered "substantially horizontal contact," and it is not required that the two surfaces be strictly geometrically coplanar or absolutely horizontal with respect to the ground.

Unless otherwise specified, other occurrences of "substantially horizontal contact" in some embodiments may be understood as according to the above methods/rules. The differences may mainly lie in the different objects being judged, but the basic judgment rules are the same.

In some embodiments, referring to FIG. 4F, the mounting interface 784A may be configured to allow the storage mechanism 700A to be fixed on the support surface 175A via bolts (e.g., fourth bolts 776A) when a user performs a fixing operation. In some embodiments, a bolt 776A can pass from top to bottom through a fastener interface/opening 729A and a first threaded hole 107A to fix the storage mechanism 700A to the support plate 104A. In some embodiments, a bolt 776A can be further threadedly fastened into a corresponding fastening hole on 109A. It can be seen that there are four bolts 776A, distributed at four corners. The method of fixing the storage mechanism 700A with each bolt 776A can be the same, thereby stably mounting the storage mechanism 700A onto the support plate 104A.

In some embodiments, as shown in FIG. 13A, the left foot pedal 1501A and the right foot pedal 1501A may each have a folded state and a deployed state.

In some embodiments, the first limiting member may be referred to as a front portion, the third limiting member may be referred to as a rear portion, the second limiting member may be referred to as a left side portion, the fourth limiting member may be referred to as a right side portion, and the bottom wall may be referred to as a bottom portion. For example, in FIGS. 13D, 13E, and 13F, the storage mechanism 700A may have a front portion 701A, a rear portion 703A, a left side portion 702A, a right side portion 704A, and a bottom portion 783A. The left side portion 702A can be constituted by at least a part of the left guard plate, and the right side portion 704A can be constituted by at least a part of the right guard plate.

In some embodiments, as shown in FIG. 13D, at least a portion of the storage mechanism 700A may be mesh-like.

In some embodiments, as shown in FIG. 13D, the storage mechanism 700A may include a plurality of tubular structural members, and the plurality of tubular structural members may be interwoven into a mesh-like structure in at least one of the front portion 701A, the rear portion 703A, the left side portion 702A, the right side portion 704A, and the bottom portion 783A.

In some embodiments, as shown in FIGS. 13B, 13D, and 13G, the tube diameter of the tubular structural members of the storage mechanism 700A may be smaller than the tube diameter of either the left frame tube 169A or the right frame tube 170A.

In some embodiments, as shown in FIG. 4G, at least a portion of the mounting interface 784A may constitute a part that is integrally formed with the storage mechanism 700A.

In some embodiments, as shown in FIGS. 13B and 13D, the frame body 161A may define a longitudinal plane of symmetry, and the left guard plate 702A and the right guard plate 704A may be arranged mirror-symmetrically on the frame body 161A with respect to the longitudinal plane of symmetry.

In some embodiments, as shown in FIG. 1B, the electric riding device 1A may include: a frame body 161A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a power source 600A mounted on the frame body 161A and configured to supply power to the electric riding device 1A.

In some embodiments, the support plate may be referred to as a support substrate. As shown in FIG. 4D, the frame body 161A may include a substantially flat support substrate 104A, wherein the average dimension of the longitudinal extension of the support substrate 104A is greater than the average dimension of the lateral extension of the support substrate 104A.

In some embodiments, "average dimension" may be understood as a representative numerical value used to characterize the overall scale of a component in a certain direction (e.g., longitudinal). It can be obtained by measuring the local span/outer profile extension of the component in that direction along multiple measurement lines (or equivalent discrete samples) parallel to that direction and taking the arithmetic mean. For components with a relatively regular shape and small variations in width (or thickness), this average dimension can be approximately consistent with the overall projected outer profile dimension in that direction; for cases with fillets, cutouts, tapering curves, or local steps, the value of the average dimension falls between the minimum and maximum outer profile dimensions in that direction. In addition, in some embodiments, a dimension of a component in a certain dimension can refer to the average dimension of the component in that dimension.

In some embodiments, as shown in FIG. 13B, the electric vehicle A may also include an oppositely arranged left foot pedal 1501A and right foot pedal 1501A. The mounting position of the left foot pedal 1501A is proximate to the left front end of the support substrate 104A, and the mounting position of the right foot pedal 1501A is proximate to the right front end of the support substrate 104A.

In some embodiments, " . . . , the left front end of" may be understood as the corner/region of a certain component/object (e.g., the support substrate 104A) that is closest to the vehicle's forward direction and located on the left side.

In some embodiments, " . . . , the right front end of" may be understood as the corner/region of a certain component/object (e.g., the support substrate 104A) that is closest to the vehicle's forward direction and located on the right side.

Unless otherwise specified, other occurrences of "average dimension," "left front end," and "right front end" in some embodiments may be understood as according to the above methods/rules. The differences may mainly lie in the different objects being judged, but the basic judgment rules are the same.

In some embodiments, a storage basket mounting location may be referred to as a first front mounting hole, a second front mounting hole, a first rear mounting hole, or a second rear mounting hole. As shown in FIG. 13B, the electric riding device 1A may also include a storage basket 700A that is positioned at least substantially centrally in the lateral direction on the support substrate 104A. In conjunction with FIG. 13D, the storage basket 700A may have at least three storage basket mounting locations (779A, 780A, 781A, 782A) for fixing at least a portion of the storage basket 700A to the support substrate 104A without looseness.

In some embodiments, "substantially centrally" may be understood as a positioning relationship where one component/object (e.g., the storage basket 700A) is approximately symmetrical with respect to the geometric centerline/longitudinal plane of symmetry of another component/object (e.g., the support substrate 104A), within allowable assembly tolerances.

In some embodiments, "storage basket mounting location (779A, 780A, 781A, 782A)" may be understood as a general term referring to the specific mounting points on the storage basket 700A for positioning/fastening. Different numbers are used to distinguish different positions that are paired front/rear and laterally. Therefore, when understanding a specific storage basket mounting location, the corresponding reference number should be selected from 779A, 780A, 781A, 782A based on its position (e.g., corresponding to 779A or 780A if on the front side; corresponding to 781A or 782A if on the rear side).

In some embodiments, "fixed without looseness" may be understood as to mean that, in the assembled state and under normal operating conditions (e.g., riding vibration, acceleration/deceleration, impacts on conventional road surfaces), multiple components/objects (e.g., the storage basket 700A and the support substrate 104A/frame body 161A)

form a stable support and constraint, with no backlash or sense of looseness beyond the permissible assembly range.

Unless otherwise specified, other occurrences of "substantially centrally" and "fixed without looseness" in some embodiments may be understood as according to the above methods/rules. The differences may mainly lie in the different objects being judged, but the basic judgment rules are the same.

In some embodiments, as shown in FIG. 13D, when two of the at least three storage basket mounting locations (779A, 780A, 781A, 782A) are configured to be laterally spaced apart, the remaining at least one storage basket mounting location among the at least three storage basket mounting locations (779A, 780A, 781A, 782A) can be longitudinally separated.

In some embodiments, "laterally spaced apart distribution" may be understood as to have the same meaning as "laterally spaced apart." In some embodiments, "Longitudinally separated" may be understood as to have the same meaning as "longitudinally spaced apart."

In some embodiments, a frame body mounting location may be referred to as a first frame front mounting hole, a second frame front mounting hole, a first frame rear mounting hole, or a second frame rear mounting hole. As shown in FIGS. 13B-13D, the frame body 161A may have at least three frame body mounting locations (171A, 172A, 173A, 174A) corresponding respectively to the at least three storage basket mounting locations (779A, 780A, 781A, 782A). The at least three frame body mounting locations (171A, 172A, 173A, 174A) may be configured to align respectively with the at least three storage basket mounting locations (779A, 780A, 781A, 782A) when the storage basket 700A is fixed on the frame body 161A.

In some embodiments, as shown in FIG. 13B, the left foot pedal 1501A and the right foot pedal 1501A may be respectively mounted on the left and right sides of the support substrate 104A.

In some embodiments, " . . . , the left and right sides of" may be understood as by using the longitudinal plane of symmetry of a certain component/object (e.g., the support substrate 104A) as a reference. Another component/object (e.g., the left foot pedal 1501A) can be located in the left-side area after being projected onto a horizontal plane, and its lateral outward extension direction is towards the left side. Another component/object (e.g., the right foot pedal 1501A) can be located in the right-side area after being projected onto a horizontal plane, and its lateral outward extension direction is towards the right side. The components/objects on the two sides (e.g., the left foot pedal 1501A and the right foot pedal 1501A) can differ in longitudinal (front/rear) position, height (up/down), and inward/outward extension amount, and are not required to be mirror-symmetrical.

Unless otherwise specified, other occurrences of " . . . , the left and right sides of" in some embodiments may be understood as according to the above methods/rules. The differences may mainly lie in the different objects being judged, but the basic judgment rules are the same.

In some embodiments, as shown in FIG. 13B, the left foot pedal 1501A and the right foot pedal 1501A can be respectively mounted on the left and right sides of the storage basket 700A.

In some embodiments, as shown in FIG. 13D, the left foot pedal 1501A and the right foot pedal 1501A can both be foldable pedals.

In some embodiments, as shown in FIG. 13D, at least a portion of the storage basket 700A may have a mesh-like structure.

In some embodiments, referring to FIG. 13B, the storage basket 700A may be detachably fixed to the support substrate 104A at the at least three mounting locations by bolt fasteners (e.g., fourth bolts 776A).

In some embodiments, as shown in FIG. 13B, the power source 600A may be mounted on the side of the support substrate 104A facing away from the seat 82A.

In some embodiments, "on the side facing away from . . . " may be understood as, taking the referenced component (e.g., the seat 82A) as a directional reference, the side/face of the said object (e.g., the support substrate 104A) and its lateral area that faces in the direction opposite to this reference. In some embodiments, the line connecting the reference component to the object can be taken as the basis for determination: the side whose outer surface normal generally points in the direction opposite to this connecting line is the 'facing away' side. This expression emphasizes the orientation relationship rather than physical contact, so "mounted on the . . . side of" includes both direct mounting on the outer surface of that side and indirect arrangement on that side via brackets, spacers, fasteners, etc.

In some embodiments, as shown in FIG. 13B, the frame body 161A may define a longitudinal plane of symmetry, and the support substrate 104A may be symmetrically distributed with respect to the longitudinal plane of symmetry.

In some embodiments, "symmetrically distributed" may be understood as, with the longitudinal plane of symmetry of a certain component/object (e.g., the frame body 161A) as a reference, the outer contour of another component/object (e.g., the support substrate 104A) is approximately mirrored on the left and right sides with its centerline aligned, allowing for slight asymmetry due to manufacturing/assembly tolerances and local ribs, holes, grooves, etc. Unless otherwise specified, other occurrences of "on the side facing away from . . . " and "symmetrically distributed" in some embodiments may be understood as according to the above methods/rules. The differences may mainly lie in the different objects being judged, but the basic judgment rules are the same.

In some embodiments, the storage basket 700A may include an operable door component mounted on the left or right side.

Figure 13J:
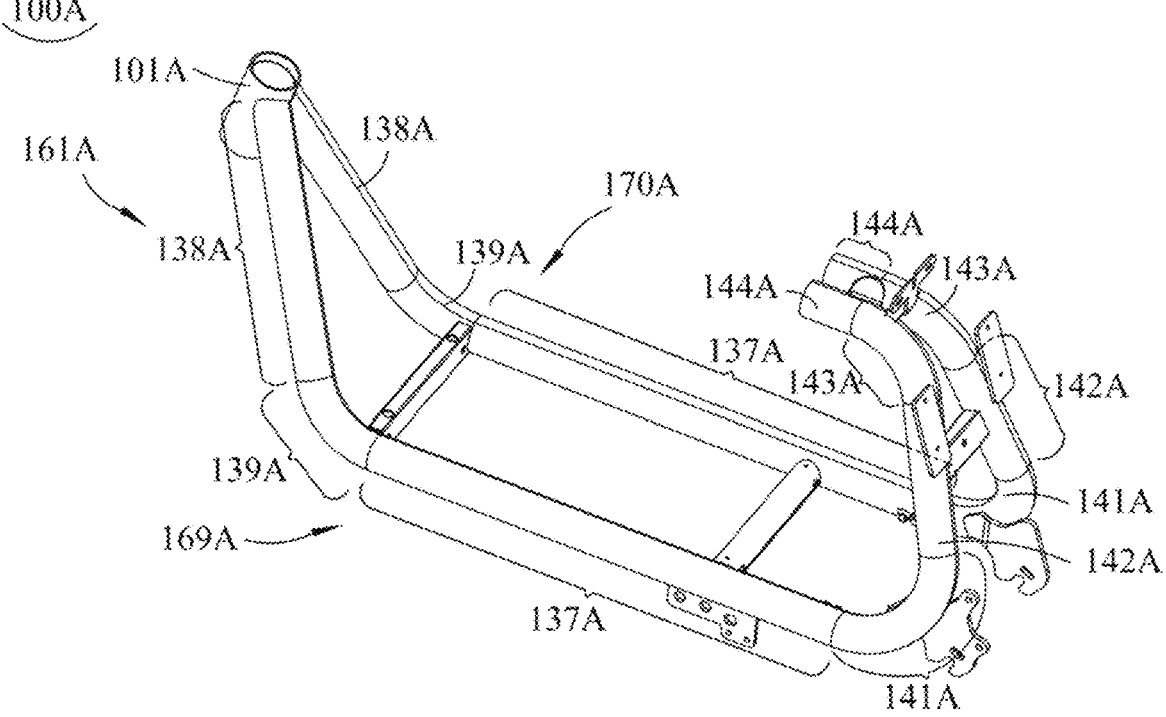
FIG. 13J is another schematic view from one direction of an implementation of the frame according to an embodiment of the present application.

In some embodiments, as shown in FIG. 13J, the electric riding device 1A may include: a frame body 161A, which may include a left frame tube 169A and a right frame tube 170A, both having a circular cross-section and being hollow. A first end of the left frame tube 169A and a first end of the right frame tube 170A are configured to converge at the front end of the frame body 161A. A second end of the left frame tube 169A and a second end of the right frame tube 170A are configured to converge at a position proximate to the rear end of the frame body 161A. The left frame tube 169A and the right frame tube 170A are spaced apart from each other in a substantially parallel manner in at least a portion of the region between the front and rear ends of the frame body 161A.

In some embodiments, "converge" may be understood as to describe a situation where the respective ends of multiple components/objects (e.g., the left frame tube 169A and the right frame tube 170A) tend towards the same connection/node area and form a structural joint in that area. This can be achieved by direct connection (such as welding or as a single bent tube) or by joining through an intermediate piece, i.e., both ends are respectively connected to the same component, for example, the left frame tube 169A and the right frame tube 170A can both be connected to the head tube 101A.

In some embodiments, as shown in FIG. 1B, the electric riding device 1A may also include: a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a power source 600A mounted on the frame body 161A and configured to supply power to the electric riding device 1A.

In some embodiments as shown in FIG. 13J, the left frame tube 169A, in a counter-clockwise direction, may sequentially include: a first left straight tube section 138A, a first left curved tube section 139A, a second left straight tube section 137A, a second left curved tube section 141A, a third left straight tube section 142A, a third left curved tube section 143A, and a fourth left straight tube section 144A. The first left straight tube section 138A and the third left straight tube section 142A are configured to extend upwardly at an incline relative to the second left straight tube section 137A. The second left straight tube section 137A and the fourth left straight tube section 144A are arranged substantially in parallel and are both configured to extend longitudinally. In addition, these segmented components— the first left straight tube section 138A, the first left curved tube section 139A, the second left straight tube section 137A, the second left curved tube section 141A, the third left straight tube section 142A, the third left curved tube section 143A, and the fourth left straight tube section 144A—can be integrally formed to constitute one left frame tube 169A, or they can be separate components connected to each other to form the left frame tube 169A.

In some embodiments, the counter-clockwise direction may be understood as the direction of rotation from the front end to the rear end of the frame body 161A.

In some embodiments, as shown in FIG. 13J, the right frame tube 10A, in a counter-clockwise direction, may sequentially include: a first right straight tube section 138A, a first right curved tube section 139A, a second right straight tube section 137A, a second right curved tube section 141A, a third right straight tube section 142A, a third right curved tube section 143A, and a fourth right straight tube section 144A. The first right straight tube section 138A and the third right straight tube section 142A are configured to extend upwardly at an incline relative to the second right straight tube section 137A. The second right straight tube section 137A and the fourth right straight tube section 144A are arranged substantially in parallel and are both configured to extend longitudinally. In addition, these segmented components—the first right straight tube section 138A, the first right curved tube section 139A, the second right straight tube section 137A, the second right curved tube section 141A, the third right straight tube section 142A, the third right curved tube section 143A, and the fourth right straight tube section 144A—can be integrally formed to constitute one right frame tube 170A, or they can be separate components connected to each other to form the right frame tube 170A.

In some embodiments, as shown in FIG. 13J, the upwardly inclined extension direction of the first left straight tube section 138A may intersect with the upwardly inclined extension direction of the first right straight tube section 138A, causing the front end of the first left straight tube section 138A and the front end of the first right straight tube section 138A to converge, while the rear end of the first left straight tube section 138A and the rear end of the first right straight tube section 138A may be spaced apart.

Figure 13K:
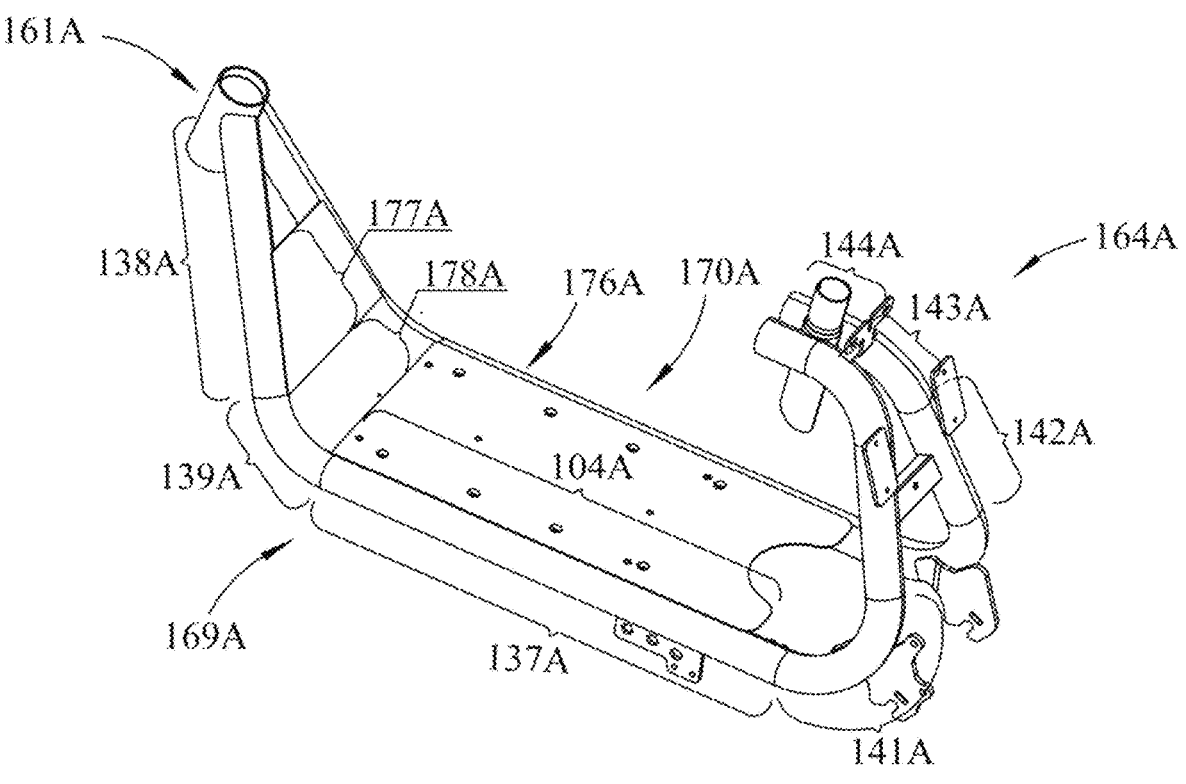
FIG. 13K is yet another schematic view from one direction of an implementation of the frame according to an embodiment of the present application.

In some embodiments, as shown in FIGS. 13J and 13K, the frame body 16A may also include an integrally formed support plate member 176A that extends between the left frame tube 169A and the right frame tube 170A. The support plate member 176A, sequentially from front to back, may include a substantially flat inclined portion 177A, a curved transition portion 178A, and a substantially flat base portion 104A (also referred to as support plate 104A in other embodiments). The left and right ends of the inclined portion 177A of the support plate member 176A are fixedly connected to the first left straight tube section 138A and the first right straight tube section 138A, respectively. The left and right ends of the transition portion 178A of the support plate member 176A may be respectively connected to the first left curved tube section 139A and the first right curved tube section 139A. The left and right ends of the base portion 104A of the support plate member 176A may be respectively connected to the second left straight tube section 137A and the second right straight tube section 137A. In other examples, the inclined portion 177A, the curved transition portion 178A, and the substantially flat base portion 104A may be separate components that are connected to each other to form a support plate member 176A.

In some embodiments, "inclined portion 177A" may be understood as extending at a certain angle of inclination relative to some reference directions (e.g., the Z direction or the 03' direction), rather than being parallel to them.

In some embodiments, "transition portion 178A" may be understood as the part located between two adjacent components/objects (e.g., the inclined portion 177A and the base portion 104A) that geometrically achieves a continuous transition/connection, without being limited to a specific radius of curvature or length.

In some embodiments, regarding " . . . , the left and right ends of," the part concerning " . . . , the left end of" may be understood as to have the same meaning as " . . . on the left side of," and the part concerning " . . . , the right end of" may be understood as to have the same meaning as " . . . on the right side of."

Figure 13L:
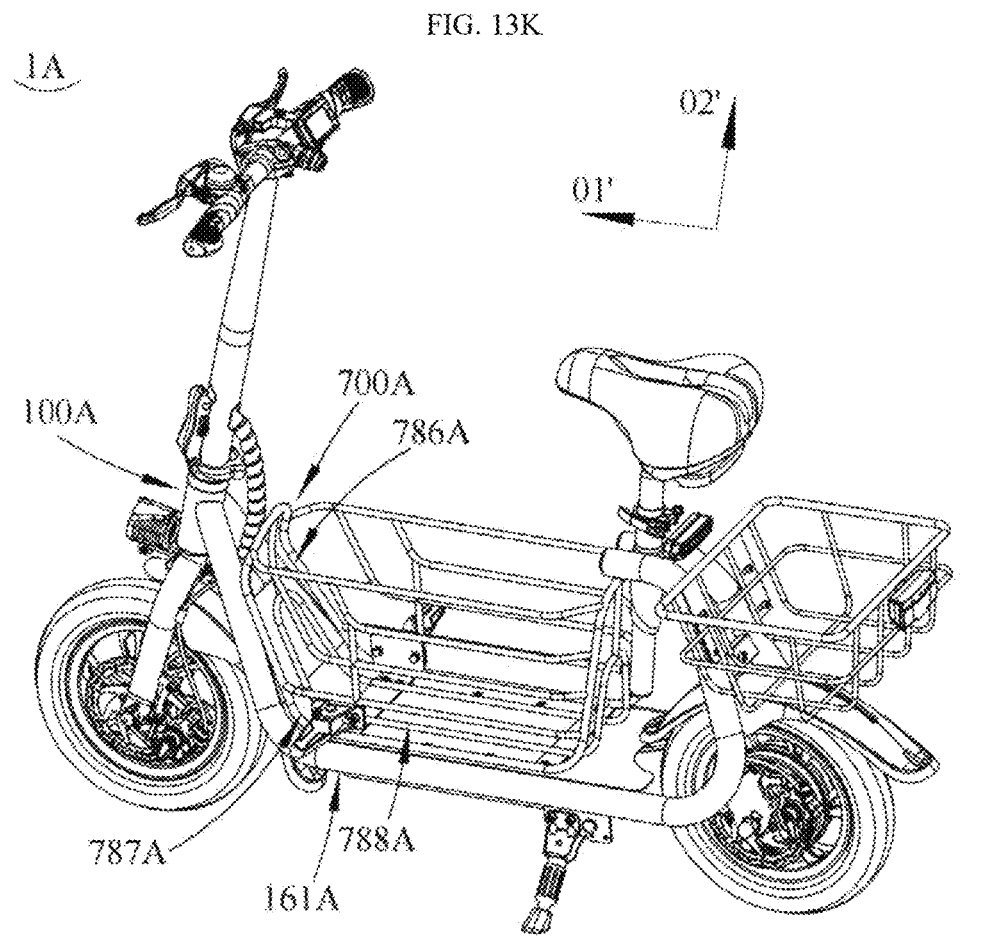
FIG. 13L is a schematic view from one direction of an implementation of the vehicle according to an embodiment of the present application.

In some embodiments, as shown in FIGS. 13K and 13L, the electric riding device 1A may also include a basket 700A detachably mounted on the frame body 161A. The basket 700A, sequentially from front to back, may include a basket inclined portion 786A adapted to the degree of inclination of the inclined portion 177A of the support plate member 176A, a basket curved portion 787A adapted to the degree of curvature of the transition portion 178A of the support plate member 176A, and a basket bottom 788A in substantially horizontal contact with the base portion 104A of the support plate member 176A.

In some embodiments, "sequentially from front to back" may be understood as the arrangement or appearance of multiple components/objects in order from front to back along the longitudinal/forward direction. It does not require a "sharp boundary" (i.e., a geometric discontinuity/angled demarcation) between adjacent parts, nor does it require each part to be an "equal-length segment" (i.e., having equal lengths or set proportions in the longitudinal direction).

In some embodiments, " . . . adapted to the degree of . . . " may be understood as to mean that the morphological parameters of one component (e.g., the inclined portion 177A of the support plate 104A), such as the angle of inclination, curvature/arc, or surface slope, perfectly match or are approximately consistent with the morphological parameters of the corresponding area of another component (e.g., the basket inclined portion 786A), such that the two are "non-conflicting and adaptable" in their spatial layout, without requiring them to be in physical contact.

Unless otherwise specified, other occurrences of " . . . , the left end of," " . . . , the right end of," "sequentially from front to back," and " . . . adapted to the degree of . . . " in some embodiments may be understood as according to the above methods/rules. The differences may mainly lie in the different objects being judged, but the basic judgment rules are the same.

In some embodiments, the basket inclined portion 771A may include a first mounting plate configured to detachably fix the basket 700A to the inclined portion 177A of the support plate member 176A via first bolt fasteners; the basket bottom 788A may include a second mounting plate configured to detachably fix the basket 700A to the base portion 104A of the support plate member 176A via second bolt fasteners.

In some embodiments, as shown in FIG. 1B, the electric riding device 1A may include: a frame body 161A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a power source 600A mounted on the frame body 161A and configured to supply power to the electric riding device 1A.

In some embodiments, the support plate may be referred to as a frame base portion, and the support surface may be referred to as a mounting surface. As shown in FIG. 4E, the frame body 161A may include a frame base portion 162A, and the frame base portion 162A may include a substantially flat mounting surface 175A.

In some embodiments, the frame body 161A may also include a support plate assembly. The support plate assembly may consist only of the support plate 104A, or it may include the support plate 104A and a functional thin layer 2000A. When the support plate assembly only includes the support plate 104A, the top surface/upper surface of the support plate 104A can directly constitute the mounting surface 175A. For another example, as shown in FIG. 4D, when the support plate assembly includes the support plate 104A and the functional thin layer 2000A, the top side/upper surface of the functional thin layer 2000A can directly constitute the mounting surface 175A.

In some embodiments, as shown in FIG. 4F, the electric riding device 1A may also include a basket 700A detachably mounted on the frame body 161A, wherein at least a portion of the basket 700A is configured to be detachably mounted on the mounting surface 175A.

In some embodiments, as shown in FIG. 13B, the electric riding device 1A also includes a first foot pedal 1501A and a second foot pedal 1501A that are oppositely mounted. The first foot pedal 1501A and the second foot pedal 1501A are both mounted on the frame body 161A, or the first foot pedal 1501A and the second foot pedal 1501A are both mounted on the basket 700A.

In some embodiments, "oppositely mounted" may be understood as to mean that two components/objects (e.g., the first foot pedal 1501A and the second foot pedal 1501A) are located on the left and right sides of a reference object (e.g., the electric riding device 1A) and form a relative arrangement in space with the longitudinal center plane/center line of the reference object as a reference, allowing for limited positional/postural deviations arising from structural arrangement, ergonomics, or manufacturing/assembly tolerances. Specific to the first foot pedal 1501A and the second foot pedal 1501A, the limited positional/postural deviation does not affect the functional constitution of the two pedals as left-right corresponding and usable treading areas.

In some embodiments, the part composed of the adapter and the connecting plate can be referred to as a first fixed base or a second fixed base, the first foot pedal can be referred to as a first footplate, and the second foot pedal can be referred to as a second footplate. As shown in FIG. 13A, the first foot pedal assembly 1500A may include a first fixed base 1527A and a first footplate 1501A pivotally connected to the first fixed base 1527A. The first fixed base 1527A can be mounted on the frame base portion 162A or on the basket 700A. The first footplate 1501A can have a folded state and a deployed state, and the rotation angle of the first footplate 1501A from the folded state to the deployed state can be approximately 90 degrees. The first footplate 1501A may be configured to rotate only between the lateral left side and the longitudinal rear side of the electric riding device 1A. Herein, the second foot pedal 1501A may include a second fixed base 1527A and a second footplate 1501A pivotally connected to the second fixed base 1527A. The second fixed base 1527A can be mounted on the frame base portion 162A or on the basket 700A. The second footplate 1501A can have a folded state and a deployed state, and the rotation angle of the second footplate 1501A from the folded state to the deployed state can be approximately 90 degrees. The second footplate 1501A may be configured to rotate only between the lateral right side and the longitudinal rear side of the electric riding device 1A.

In some embodiments, "pivotally connected" may be understood as two components/objects forming a one-degree-of-freedom rotational pair through a shared pivot axis. When used as intended, the two undergo relative angular displacement around the same axis. This definition is based on relative motion. Alternatively, it may be understood as a connection relationship where two components/objects produce relative rotation around the same pivot axis; even if only one component/object actually rotates or the rotation angle is limited in use, it is still considered a "pivotal connection."

In some embodiments, "approximately 90 degrees" may be understood as to allow for slight deviations (within a range of)+5° due to manufacturing tolerances, assembly clearances, or structural design, and is not strictly limited to an absolute 90 degrees, as long as the deviation does not affect the realization of the intended function. For example, if the actual rotation angle is 86° or 94°, both are considered "approximately 90 degrees," as long as it can stably support the foot when deployed and does not interfere with other components when folded.

In some embodiments, "to rotate between the lateral left side and the longitudinal rear side of . . . " may be understood as the range of motion of a rotating part (e.g., the first footplate 1501A) being limited to a sector/quadrant defined by the "lateral left side" and the "longitudinal rear side."

Unless otherwise specified, other occurrences of "oppositely mounted," "pivotally connected," "approximately 90 degrees," and "to rotate between the lateral left side and the longitudinal rear side of . . . " in some embodiments may be understood as according to the above methods/rules. The differences may mainly lie in the different objects being judged, but the basic judgment rules are the same.

Figure 13M:
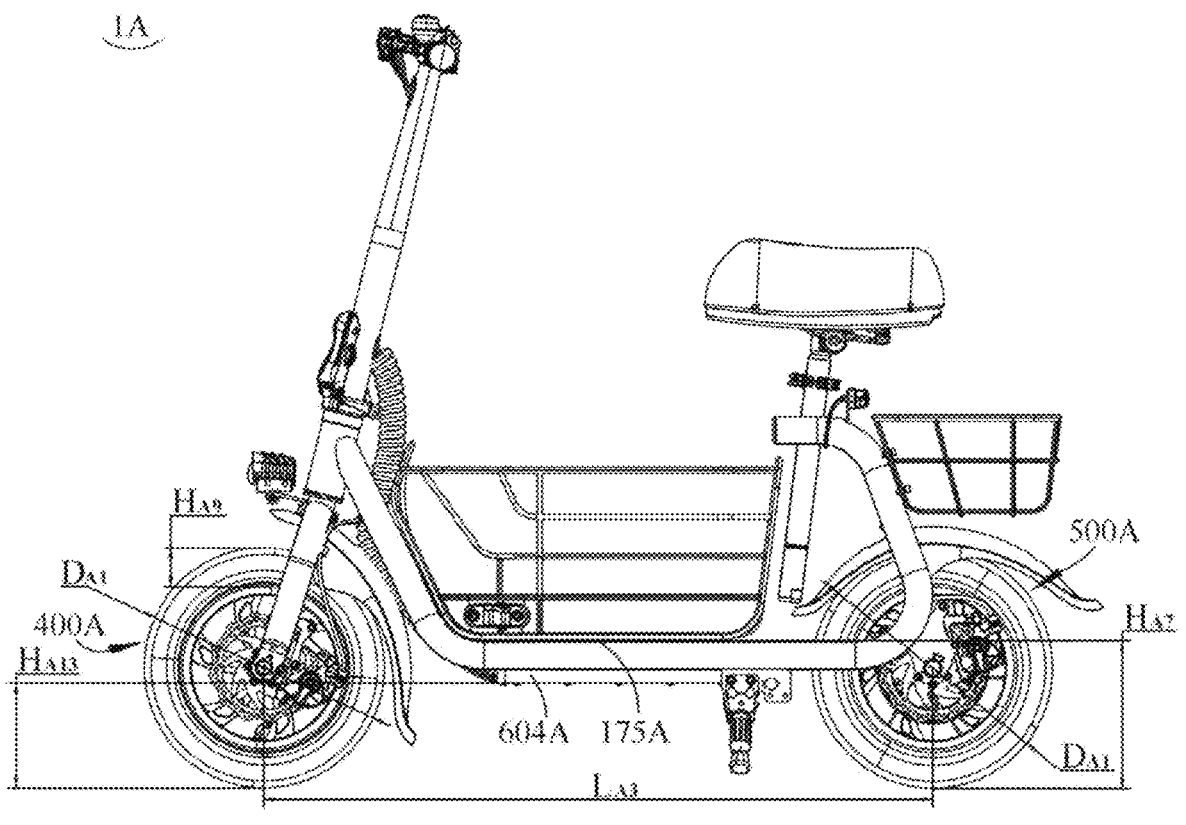
FIG. 13M is a schematic view from one direction of another implementation of the vehicle according to an embodiment of the present application.

In some embodiments, as shown in FIG. 13M, the wheelbase dimension $L_{A3}$ between the front wheel 400A and the rear wheel 500A can be from 600 mm to 1200 mm, and the vertical height $H_{47}$ of the mounting surface 175A from the horizontal ground can be from 80 mm to 400 mm. The wheelbase dimension and the vertical height of the mounting surface 175A from the horizontal ground form a complementary fit in terms of geometric relationship, which helps to achieve geometric coupling optimization: a lower mounting surface 175A brings the load and/or the foot pedal force closer to the ground, correspondingly lowering the vehicle's center of gravity, making the front-rear pitch during braking, starting, and clearing obstacles more controllable. On this basis, a moderate wheelbase dimension allows for a reasonable distribution of the support range of the front and rear wheels and the force lever, further enhancing stability and anti-tipping margin during straight-line travel and load-carrying. In addition, the height of the mounting surface 175A and the wheelbase dimension together determine whether the ground clearance at the bottom is sufficient when the vehicle crosses road bumps (such as speed bumps, thresholds, ditches), and whether it will bottom out/scrape the bottom: when the wheelbase increases, it needs to be matched with an appropriate mounting surface 175A height to reduce the risk of bottoming out; when the mounting surface 175A is set lower to reduce the center of gravity, an appropriate wheelbase is used to maintain passability and avoid bottoming out. The two are mutually constrained and adjusted in pairs, thereby achieving an engineering balance between low center of gravity/stability and passability/not bottoming out. In addition, the complementary fit of the wheelbase dimension and the mounting surface 175A prevents the wheelbase from being too long, which is beneficial for turning and parking, and prevents the mounting surface 175A from being too high, avoiding the instability caused by being top-heavy and having a high stance.

In some embodiments, referring to FIG. 13B, the basket 700A can be configured to be fixed to the frame body 161A via bolts (e.g., fourth bolts 776A).

In some embodiments, for example in FIGS. 13D, 13E, and 13F, the basket 700A may have a front wall 701A, a rear wall 703A, a left side wall 702A, a right side wall 704A, and a bottom wall 783A. The left side wall 702A can extend substantially vertically upward from the left end of the bottom wall 783A, and the right side wall 704A can extend substantially vertically upward from the right end of the bottom wall 783A.

In some embodiments, referring to FIG. 13D, at least a portion of the basket 700A may be mesh-like.

In some embodiments, referring to FIG. 13D, the basket 700A may include a plurality of tubular structural members, which may be interwoven into a mesh-like structure.

In some embodiments, referring to FIG. 13B, the linear density of the tubular structural members of the basket 700A may be less than the linear density of the frame body 161A. Herein, linear density may be understood as the mass per unit length (kg/m).

In some embodiments, referring to FIG. 1B, the electric riding device 1A may include: a frame body 161A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a power source 600A mounted on the frame body 161A and configured to supply power to the electric riding device 1A.

In some embodiments, as shown in FIG. 4E, the frame body 161A may include a frame base portion 162A. The frame base portion 162A may include a left frame tube 169A and a right frame tube 170A arranged substantially in parallel and laterally spaced apart. In conjunction with FIG. 4D, the frame base portion 162A may also include a substantially flat support plate 104A extending laterally between the left frame tube 169A and the right frame tube 170A. It may be noted that, herein, the support plate 104A can be substantially flush with the left frame tube 169A and the right frame tube 170A, or it can be significantly higher than the left frame tube 169A and the right frame tube 170A.

In some embodiments, "substantially flush" may be understood as to mean that, in the assembled/in-use state, the top surfaces of multiple components/objects are substantially at the same horizontal level or are approximately coplanar, enabling a stable fit or support through multi-point approximately coplanar bearing. It does not require strict geometric coplanarity or absolute horizontality with respect to the ground, and allows for reasonable engineering tolerances.

In some embodiments, "significantly higher" may be understood as to mean that the height difference between two components/objects (e.g., the support plate 104A and the left frame tube 169A) exceeds the range explainable by manufacturing tolerances/minor deviations, and is sufficient to change the sequence or path of contact/force application (e.g., the load is primarily borne by the support plate 104A rather than the edge of the frame tube).

In some embodiments, as shown in FIGS. 13B and 13G, the electric riding device 1A may also include a basket 700A detachably mounted on the frame body 161A, wherein at least a portion of the basket 700A is configured to be detachably mounted on the support plate 104A. The electric riding device 1A may also include an oppositely mounted left foot pedal 1501A and right foot pedal 1501A. The left foot pedal 1501A is mounted on the left side of the basket 700A or on the left frame tube 169A. The right foot pedal 1501A is mounted on the left side of the basket 700A or on the right frame tube 170A. The mounting position of the left foot pedal 1501A is proximate to the front end of the left frame tube 169A, and the mounting position of the right foot pedal 1501A is proximate to the front end of the right frame tube 170A.

In some embodiments, the part composed of the adapter and the connecting plate can be referred to as a left fixed portion or a right fixed portion. The first foot pedal can be referred to as a left rotating portion, and the second foot pedal can be referred to as a right rotating portion. The left frame tube can be referred to as a left tube, and the right frame tube can be referred to as a right tube. As shown in FIG. 13A, the left foot pedal assembly 1500A may include a left fixed portion 1527A and a left rotating portion 1501A rotatably connected to the left fixed portion 1527A. In conjunction with FIGS. 13B and 13G, the left fixed portion 1527A can be detachably fixed to the left tube 169A or the left side of the basket 700A. The left rotating portion 1501A can have a storage position and a working position. When the left rotating portion 1501A is in the storage position, the axis of the left rotating portion 1501A can be substantially parallel to the extension direction of the left frame tube 169A. When the left rotating portion 1501A is in the working position, the axis of the left rotating portion 1501A can be substantially perpendicular to the left frame tube 169A. Herein, the right foot pedal assembly 1500A may include a right fixed portion 1527A and a right rotating portion 1501A rotatably connected to the right fixed portion 1527A. The right fixed portion 1527A can be detachably fixed to the right tube 170A or the right side of the basket 700A. The right rotating portion 1501A can have a storage position and a working position. When the right rotating portion 1501A is in the storage position, the axis of the right rotating portion 1501A can be substantially parallel to the extension direction of the right frame tube 170A. When the right rotating portion 1501A is in the working position, the axis of the right rotating portion 1501A can be substantially perpendicular to the right frame tube 170A.

In some embodiments, "rotatably connected" may be understood as to have the same meaning as "pivotally connected."

In some embodiments, " . . . , the axis of . . . " may be understood as to refer to the geometric centerline/principal axis of a component (such as the left rotating portion 1501A, right rotating portion 1501A, etc.) in its primary length direction, used to describe the orientation of the component body. If the cross-section is circular/nearly circular, "axis" may be understood as the centerline; if the cross-section is non-circular, it is the principal direction of the line connecting the centroids (or the neutral layer).

In some embodiments, " . . . , the extension direction of . . . " may be understood as to refer to the direction/ principal orientation in which a component (such as the left frame tube 169A, right frame tube 170A) primarily extends, used to characterize its overall trajectory. It does not require the component to be perfectly straight; the determination is based on the dominant projection/main trend, rather than individual local details.

Unless otherwise specified, other occurrences of " . . . , the axis of . . . " and " . . . , the extension direction of . . . " in some embodiments may be understood as according to the above methods/rules. The differences may mainly lie in the different objects being judged, but the basic judgment rules are the same.

Figure 13N:
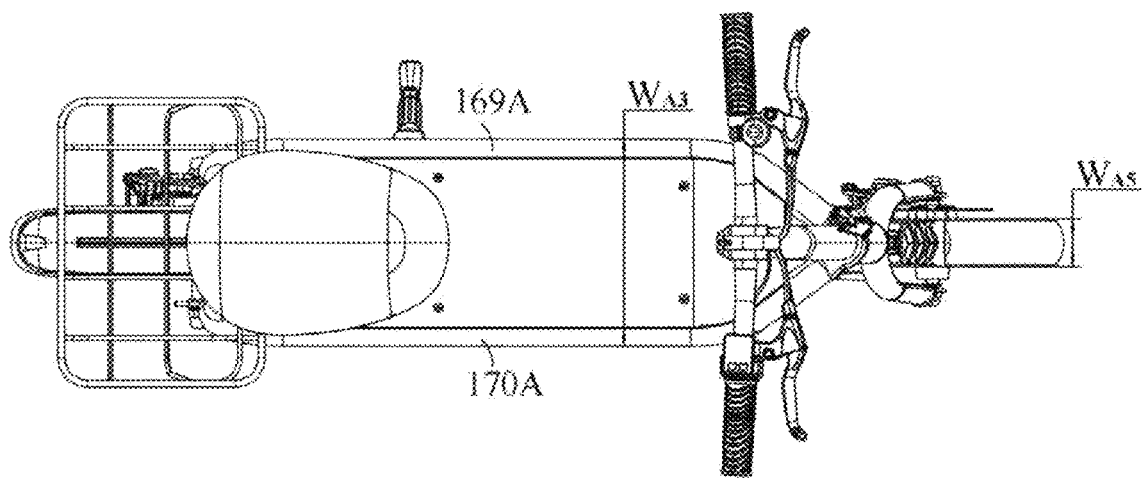
FIG. 13N is a schematic view from another direction of another implementation of the vehicle according to an embodiment of the present application.

In some embodiments, as shown in FIG. 13M, the wheelbase dimension $L_{A3}$ between the front wheel 400A and the rear wheel 500A can be from 600 mm to 1200 mm. As shown in FIG. 13N, the spacing distance $W_{A3}$ between the left frame tube 169A and the right frame tube 170A can be from 100 mm to 400 mm, and the outer diameters of the left frame tube 169A and the right frame tube 170A can both be from 20 mm to 60 mm. By collaboratively setting the wheelbase dimension, frame tube spacing, and frame tube outer diameter, their effectiveness can be mutually locked within the same bottom load-bearing loop: the wheelbase dimension defines the front and rear support boundaries and deformation scale, the frame tube spacing provides a lateral lever arm and can be used to determine the support plate span, and the frame tube outer diameter provides the connection surface and component capability. The combined action of these three makes the frame 110A less prone to left-right twisting and front-rear "nodding" when riding on bumpy roads or stepping on it forcefully, thereby reducing wobbling during cargo carrying and handling. In addition, this helps the basket 700A maintain a snug fit/installation stability even after long-term use.

In some embodiments, referring to FIGS. 13B and 13G, the tube diameter of the tubular structural members of the basket 700A may be smaller than the tube diameter of either the left frame tube 169A or the right frame tube 170A.

In some embodiments, as shown in FIG. 1B, the electric riding device 1A may include: a frame body 161A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a power source 600A mounted on the frame body 161A and configured to supply power to the electric riding device 1A.

In some embodiments, as shown in FIG. 4E, the frame body 161A may include a frame base portion 162A. The frame base portion 162A may include a left frame tube 169A and a right frame tube 170A arranged substantially in parallel and laterally spaced apart. The frame base portion 162A may also include a substantially flat support plate 104A extending laterally between the left frame tube 169A and the right frame tube 170A. Accordingly, the frame base portion 162A may include a plurality of sub-portions, and the respective heights of the sub-portions above the ground or other supporting surface may differ from one another.

In some embodiments, as shown in FIGS. 13B and 13G, the electric riding device 1A may also include a basket 700A detachably mounted on the frame body 161A, wherein at least a portion of the basket 700A is configured to be detachably mounted on the support plate 104A. The electric riding device 1A may also include a footrest assembly. The footrest assembly may include an oppositely mounted and rotatable left foot pedal 1501A and right foot pedal 1501A. The left foot pedal 1501A can be mounted on the left side of the basket 700A or on the left frame tube 169A. The right foot pedal 1501A can be mounted on the right side of the basket 700A or on the right frame tube 170A. The mounting position of the left foot pedal 1501A may be proximate to the front end of the left frame tube 169A, and the mounting position of the right foot pedal 1501A may be proximate to the front end of the right frame tube 170A. Herein, when the basket 700A is mounted on the frame body 161A, the user's feet can be placed on the footrest assembly during riding, and when the basket 700A is removed from the frame body 161A, the user's feet can be placed on the support plate 104A during riding.

In some embodiments, as shown in FIG. 13M, the wheelbase dimension $L_{A3}$ between the front wheel 400A and the rear wheel 500A can be from 600 mm to 1200 mm, and the tire outer diameter $D_{A1}$ of both the front wheel 400A and the rear wheel 500A can be from 254 mm to 454 mm. The tire outer diameter determines the impact sensation when going over speed bumps/potholes and the overall vehicle height (center of gravity), while the wheelbase dimension determines the time and distance interval of forces acting on the front and rear wheels as well as the amplitude of the vehicle's front-rear pitching. When both are defined together, the jolt from the front wheel 400A is no longer amplified and relayed by the rear wheel 500A, and the whole vehicle is less prone to "consecutive bouncing" or "nodding." At the same time, the wheelbase dimension is not so long as to make steering sluggish, nor are the wheels so small as to make the road feel too harsh. When the wheels are made slightly larger, a wheelbase dimension within the appropriate range mentioned above can suppress front-rear pitching, avoiding the "raised and wobbly" effect of larger wheels. When the wheels are made smaller for agility, a wheelbase within the appropriate range can still provide sufficient front-rear support, preventing it from being "too bouncy."

In some embodiments, as shown in FIG. 1B, the electric riding device 1A may include: a frame body 161A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a power source 600A mounted on the frame body 161A and configured to supply power to the electric riding device 1A.

Figures 13O, 13P:
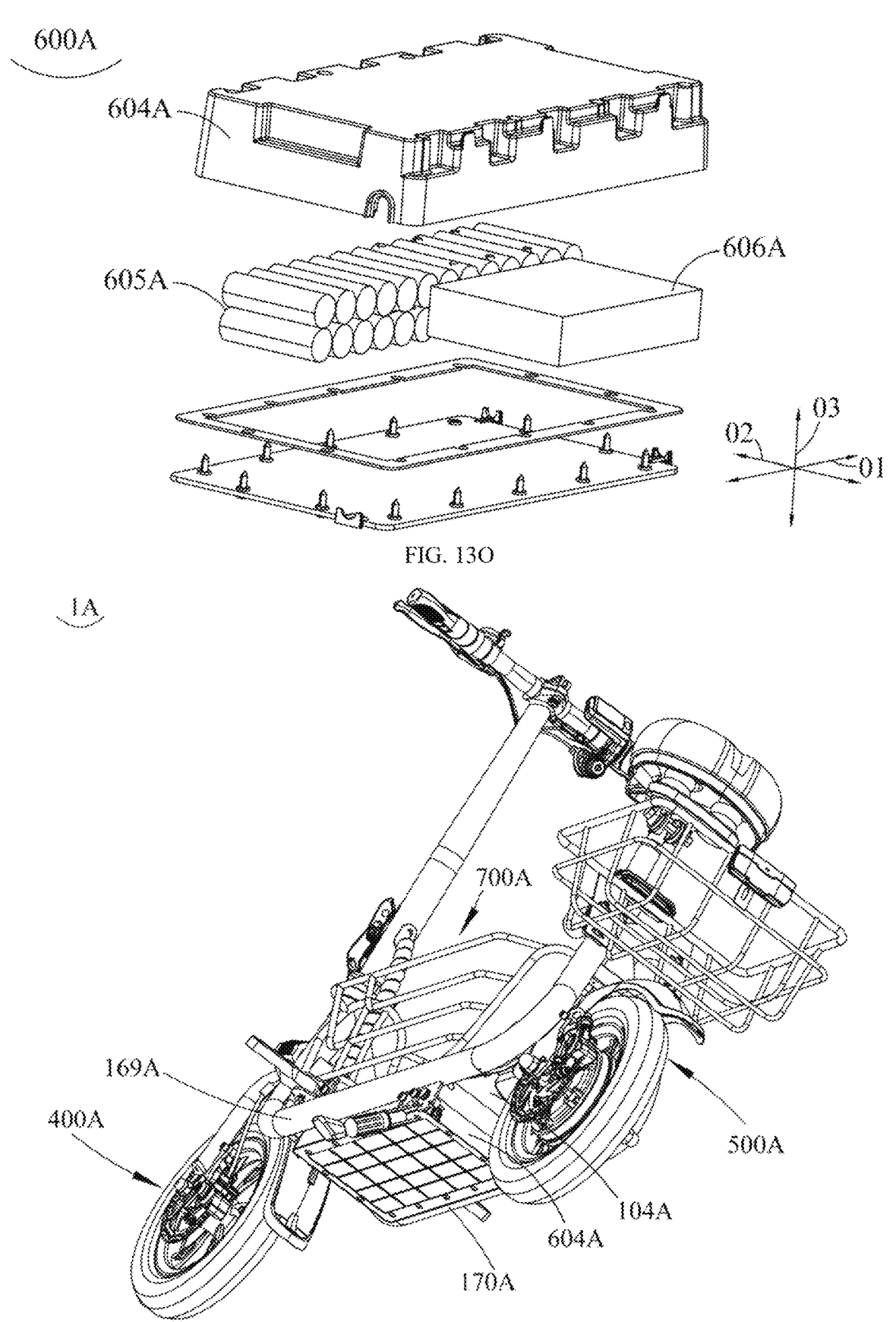
FIG. 13O is an exploded view of an implementation of the power source according to an embodiment of the present application.
FIG. 13P is a schematic view from another direction of an implementation of the vehicle according to an embodiment of the present application.

In some embodiments, as shown in FIGS. 1B and 13O, the power source 600A may include a battery pack 605A and a control circuit 606A. The control circuit 606A is electrically connected to the battery pack 605A and configured to control the electric drive of at least one of the front wheel 400A and the rear wheel 500A based on user operation. Herein, as shown in FIG. 4E, the frame body 161A may include a frame base portion 162A. The frame base portion 162A may include a left frame tube 169A and a right frame tube 170A arranged substantially in parallel and laterally spaced apart. In conjunction with FIG. 4D, the frame base portion 162A may also include a substantially flat support plate 104A extending laterally between the left frame tube 169A and the right frame tube 170A.

In some embodiments, "electrically connected" may be understood as to mean that, when assembled and used as intended, there is a conductive relationship between the relevant components for the transmission of electrical energy/signals, to achieve power supply, detection, or control data exchange. It can be a direct connection (such as welding, plugging, terminal crimping, PCB traces) or an indirect connection through intermediate components (such as wiring harnesses, connectors, relays, BMS/control boards, etc.), detachable or permanent, and can be unidirectional or bidirectional.

In some embodiments, "electric drive" may be understood as achieving the function of driving by converting electrical energy into mechanical output (e.g., torque) and applying it to a target component/subsystem (e.g., a wheel) either directly or through a transmission mechanism.

In some embodiments, as shown in FIGS. 13B and 13G, the electric riding device 1A may also include a basket 700A detachably mounted on the frame body 161A, wherein at least a portion of the basket 700A is configured to be detachably and substantially horizontally mounted on the support plate 104A. Herein, the electric riding device 1A may also include a footrest assembly. The footrest assembly may include an oppositely mounted and rotatable left foot pedal 1501A and right foot pedal 1501A. The left foot pedal 1501A can be mounted on the left side of the basket 700A or on the left frame tube 169A. The right foot pedal 1501A can be mounted on the right side of the basket 700A or on the right frame tube 170A. The mounting position of the left foot pedal 1501A may be proximate to the front end of the left frame tube 169A, and the mounting position of the right foot pedal 1501A may be proximate to the front end of the right frame tube 170A. Herein, when the basket 700A is mounted on the frame body 161A, the user's feet can be placed on the footrest assembly during riding, and when the basket 700A is removed from the frame body 161A, the user's feet can be placed on the support plate 104A during riding.

In some embodiments, "substantially horizontally mounted" (or "mounted in a substantially horizontal orientation") may mean the component is mounted so that its relevant reference surface or axis (e.g., the basket's bottom/contact surface) lies generally parallel to a reference horizontal plane of the vehicle—for example, the plane defined by the upper surface of the support plate 104A-within normal engineering tolerances. The phrase denotes capability and attitude, not mathematical flatness or perfect zero slope, and it permits slight inclinations (e.g., for drainage or fit), local crown/camber, and three-point or multi-point support, and does not require a single common coplanar interface or continuous flush contact.

In some embodiments, as shown in FIG. 13M, the tire outer diameter $D_{41}$ of both the front wheel 400A and the rear wheel 500A can be from 254 mm to 454 mm; as shown in FIG. 13N, the tire width $W_{45}$ of both the front wheel 400A and the rear wheel 500A can be from 35 mm to 80 mm. As shown in FIG. 13O, the distance between the rim and the tire tread of the front wheel 400A or the rear wheel 500A can be $H_{49}$, and the aspect ratio can be $K_{43}$, where $K_{43}=H_{49}/W_{45}$. The aspect ratio $K_{43}$ of both the front wheel 400A and the rear wheel 500A can be from 65 to 95. The tire outer diameter determines the "step sensation" over speed bumps/potholes and the vehicle height (thus affecting the center of gravity), the aspect ratio determines the "cushioning amount" of the sidewall, and the width determines grip and rolling resistance/passability. When all three fall within the above ranges, a jolt encountered by the front wheel 400A is less likely to be amplified again by the rear wheel 500A, and the whole vehicle is less prone to "bouncing twice in a row" or significant "nodding." When the tire outer diameter is made slightly larger, an appropriate aspect ratio and width can suppress the side effects of being "higher" (harsher ride, more prone to wobbling). When the outer diameter is made smaller for miniaturization, an appropriate aspect ratio and width can still maintain comfort and grip, preventing it from being "too bouncy or too slippery." At the same time, during turns and lane changes, the risk of left-right swaying is reduced. During braking and climbing, the tire sidewall has enough deformation space to maintain contact with the ground, reducing slipping and juddering.

Unless otherwise specified, other occurrences of "electrically connected" and "electric drive" in some embodiments may be understood as according to the above methods/rules. The differences may mainly lie in the different objects being judged, but the basic judgment rules are the same.

In some embodiments, the power mechanism may be referred to as a battery device. As shown in FIG. 1B, the electric riding device 1A may include: a frame body 161A extending between a front portion and a rear portion of the electric riding device 1A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a battery device 600A mounted on the frame body 161A and configured to supply power to the electric riding device 1A.

In some embodiments, as shown in FIGS. 1B and 13O, the battery device 600A may include a battery pack 605A and a control circuit 606A. The control circuit 606A may be electrically connected to the battery pack 605A and configured to control the electric rotation of at least one of the front wheel 400A and the rear wheel 500A based on user operation. Herein, as shown in FIG. 4E, the frame body 161A may include a frame base portion 162A. The frame base portion 162A may include a left frame tube 169A and a right frame tube 170A arranged substantially in parallel and laterally spaced apart. In conjunction with FIG. 4D, the frame body 161A also includes a support plate assembly, and the frame base portion 162A may also include a substantially flat support plate 104A extending laterally between the left frame tube 169A and the right frame tube 170A. The left and right ends of the support plate 104A are fixedly connected to the left frame tube 169A and the right frame tube 170A, respectively, and the longitudinally extending dimension of the support plate 104A is greater than the laterally extending dimension of the support plate 104A.

In some embodiments, the frame body 161A may include a support plate assembly. The support plate assembly may be understood as a collection of structures used to provide support/bearing functions for the basket 700A and/or the rider's feet. The support plate assembly may consist only of the support plate 104A, or it may include the support plate 104A and a functional thin layer 2000A. As shown in FIG. 4E and FIG. 4F, the electric riding device 1A may also include a basket 700A detachably mounted to the frame body 161A, wherein at least a portion of the bottom of the basket 700A is configured to be in substantially horizontal contact with the upper surface 175A of the support plate assembly.

In some embodiments, as shown in FIGS. 13A and 13G, the electric riding device 1A may also include a footrest assembly. The footrest assembly may include an oppositely mounted and rotatable left foot pedal 1501A and right foot pedal 1501A. The left foot pedal 1501A is mounted on the left side of the basket 700A or on the left frame tube 169A. The right foot pedal 1501A is mounted on the right side of the basket 700A or on the right frame tube 170A. The mounting position of the left foot pedal 1501A is proximate to the front end of the left frame tube 169A, and the mounting position of the right foot pedal 1501A is proximate to the front end of the right frame tube 170A.

In some embodiments, the battery pack may be referred to as a cell array, and the battery box may be referred to as a battery housing. As shown in FIG. 13O, the battery device 600A may include a battery housing 604A fixedly connected to the frame body 161A and a cell array 605A housed within the battery housing 604A. In conjunction with FIG. 13P, the battery housing 604A is disposed substantially centrally in at least the lateral direction between the outer side of the left frame tube 169A and the outer side of the right frame tube 170A.

Figure 13Q:
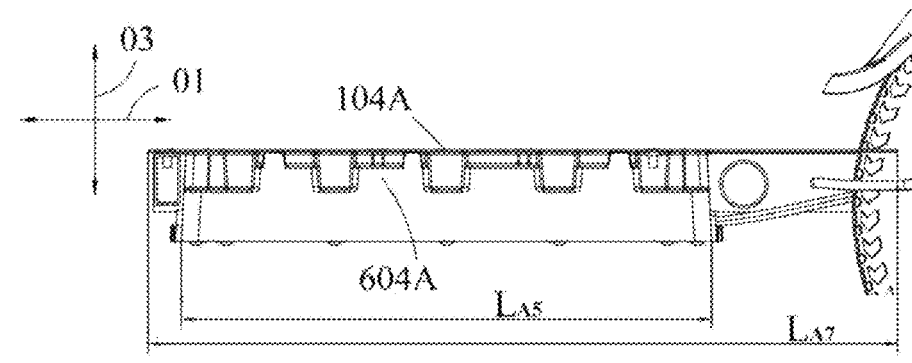
FIG. 13Q is a schematic installation view from one direction of the power source according to an embodiment of the present application.

In some embodiments, as shown in FIG. 13O, the longitudinally extending dimension of the battery housing 604A is greater than the laterally extending dimension of the battery housing 604A. In conjunction with FIG. 13P, the front end of the battery housing 60A is proximate to the front end of the support plate 104A, and the rear end of the battery housing 604A is proximate to the rear end of the support plate 104A. In conjunction with FIG. 13Q, the ratio of the longitudinally extending dimension $L_{A5}$ of the battery housing 604A between its front and rear ends to the longitudinally extending dimension $L_{A7}$ of the support plate 104A is 0.5-1. Herein, in conjunction with FIG. 13R, the left end of the battery housing 604A is proximate to the left end of the support plate 104A, and the right end of the battery housing 604A is proximate to the right end of the support plate 104A. The ratio of the laterally extending dimension $L_{A9}$ of the battery housing 604A between its left and right ends to the laterally extending dimension $L_{A11}$ of the support plate 104A is 0.5-1.

Figure 13R:
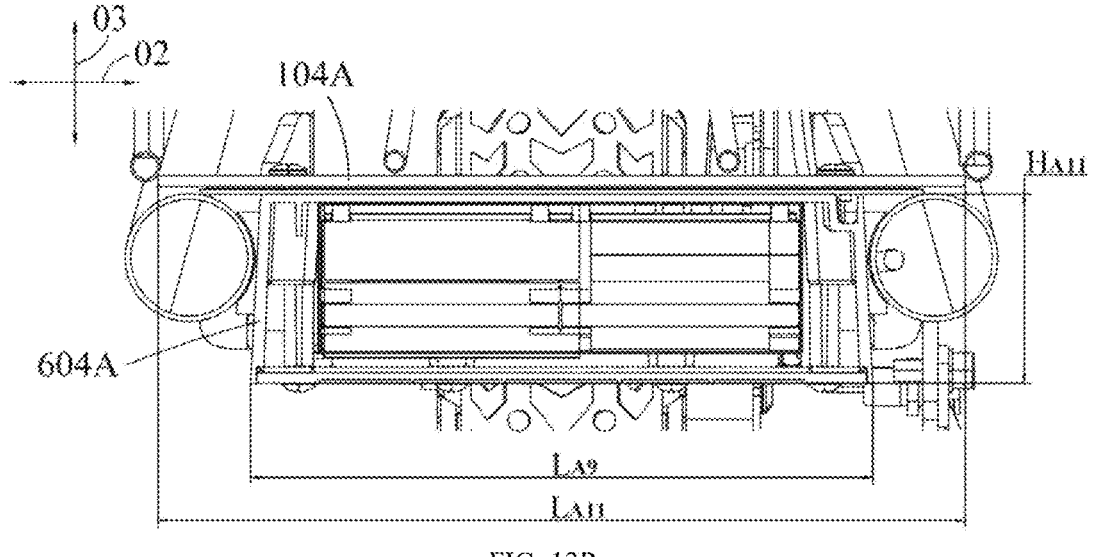
FIG. 13R is a schematic installation view from another direction of the power source according to an embodiment of the present application.

In some embodiments, in conjunction with FIGS. 13M and 13R, the thickness dimension $H_{A11}$ of the battery housing 604A is 50 mm-120 mm; wherein, the tire outer diameter of both the front wheel 400A and the rear wheel 500A is 254 mm-454 mm.

In some embodiments, as shown in FIG. 1B, the electric riding device 1A may include: a frame body 161A extending between a front portion and a rear portion of the electric riding device 1A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a battery device 600A mounted on the frame body 161A and configured to supply power to the electric riding device 1A.

In some embodiments, as shown in FIGS. 1B and 13O, the power source 600A may include a battery pack 605A and a control circuit 606A, and the control circuit 606A is electrically connected to the battery pack 605A and is configured to control the electric rotation of at least one of the front wheel 400A and the rear wheel 500A based on user operation.

In some embodiments, as shown in FIG. 4E, the frame body 16A may include a frame base portion 162A. The frame base portion 162A may include a left frame tube 169A and a right frame tube 170A arranged substantially in parallel and laterally spaced apart. In conjunction with FIG. 4D, the frame base portion 162A may also include a substantially flat support plate 104A extending laterally between the left frame tube 169A and the right frame tube 170A. The left and right ends of the support plate 104A are fixedly connected to the left frame tube 169A and the right frame tube 170A, respectively, and the longitudinally extending dimension of the support plate 104A is greater than the laterally extending dimension of the support plate 104A.

In some embodiments, as shown in FIGS. 4E and 4F, the electric riding device 1A also includes a basket 700A detachably mounted to the frame body 161A. The frame body 161A includes a support plate assembly, and at least a portion of the bottom of the basket 700A is configured to be in substantially horizontal contact with the upper surface 175A of the support plate assembly.

In some embodiments, as shown in FIGS. 13A and 13G, the electric riding device 1A may also include a footrest assembly. The footrest assembly may include an oppositely mounted and rotatable left foot pedal 1501A and right foot pedal 1501A. The left foot pedal 1501A is mounted on the left side of the basket 700A or on the left frame tube 169A. The right foot pedal 1501A is mounted on the right side of the basket 700A or on the right frame tube 170A. The mounting position of the left foot pedal 1501A is proximate to the front end of the left frame tube 169A, and the mounting position of the right foot pedal 1501A is proximate to the front end of the right frame tube 170A.

In some embodiments, as shown in FIG. 13O, the battery device 600A may include a battery housing 604A fixedly connected to the frame body 161A and a cell array 605A housed within the battery housing 604A. In conjunction with FIG. 13P, the battery housing 604A is disposed substantially centrally in at least the lateral direction between the left frame tube 169A and the right frame tube 170A.

Figure 13S:
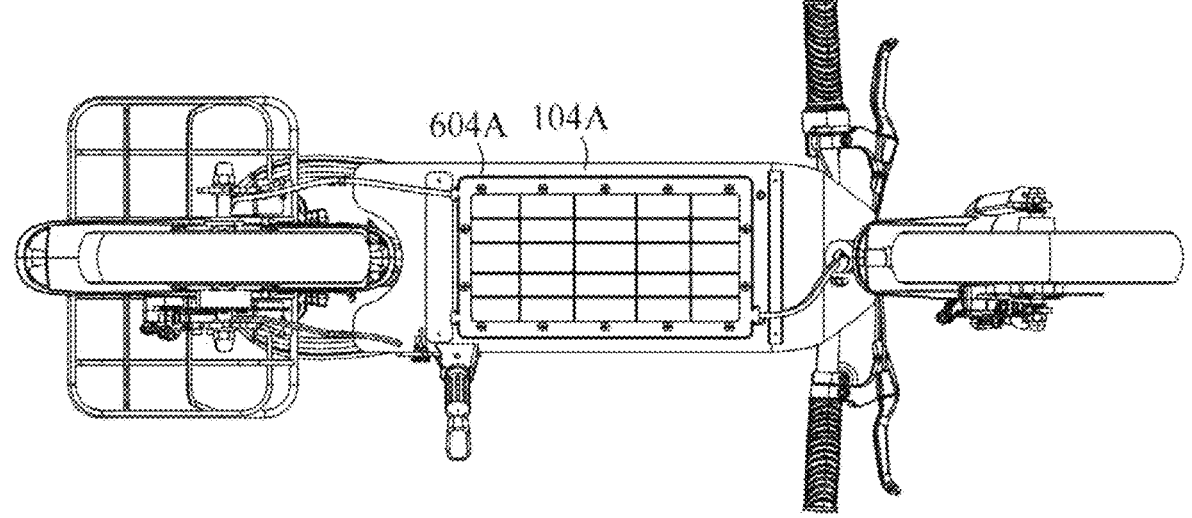
FIG. 13S is another schematic installation view from yet another direction of the power source according to an embodiment of the present application.

In some embodiments, as shown in FIG. 13S, the projection of the battery housing 604A on the horizontal ground in the vertical direction substantially falls within the projection of the support plate 104A on the horizontal ground in the vertical direction.

In some embodiments, as shown in FIG. 1B, the electric riding device 1A may include: a frame body 161A extending between a front portion and a rear portion of the electric riding device 1A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a battery device 600A mounted on the frame body 161A and configured to supply power to the electric riding device 1A.

In some embodiments, as shown in FIGS. 1B and 13O, the power source 600A may include a battery pack 605A and a control circuit 606A, and the control circuit 606A is electrically connected to the battery pack 605A and is configured to control the electric rotation of at least one of the front wheel 400A and the rear wheel 500A based on user operation. Herein, as shown in FIGS. 4D, 13J, and 13K, the frame body 161A may include a substantially flat frame base portion 162A. The frame base portion 162A may include the second left straight tube section 137A of the left frame tube 169A and the second right straight tube section 137A of the right frame tube 170A, which are arranged substantially in parallel and are laterally spaced apart. In other examples, in conjunction with FIG. 4D, the frame base portion 162A may further include a substantially flat support plate 104A extending laterally between the second left straight tube section 137A and the second right straight tube section 137A (the support plate 104A serves as a substantially flat base portion of the support plate member 176A). The left and right ends of the support plate 104A are fixedly connected to the second left straight tube section 137A of the left frame tube 169A and the second right straight tube section 137A of the right frame tube 170A, respectively, and the longitudinally extending dimension of the support plate 104A is greater than the laterally extending dimension of the support plate 104A. In addition, since the second left straight tube section 137A and the second right straight tube section 137A are essentially components with a certain extension dimension in the lateral direction (they are tubular), in the lateral direction, both the second left straight tube section 137A and the second right straight tube section 137A have an inner end/inner side (e.g., defined by their inner semicircle) and an outer end/outer side (e.g., defined by their outer semicircle). Therefore, the support plate 104A extending between the second left straight tube section 137A and the second right straight tube section 137A can mean that the support plate 104A extends between the inner end of the second left straight tube section 137A and the inner end of the second right straight tube section 137A; it can also mean that the support plate 104A extends between the outer end of the second left straight tube section 137A and the outer end of the second right straight tube section 137A; it can also mean that the support plate 104A extends between the inner end of the second left straight tube section 137A and the outer end of the second right straight tube section 137A, etc. More generally, a support plate extending between the left tube and the right tube can mean that the support plate spans between the left frame tube and the right frame tube, meaning that the two ends of the lateral width of the support plate establish a structural connection with the left frame tube and the right frame tube, respectively. This structural connection can occur on the inner surface, outer surface, or any side surface of the two frame tubes, and can be a direct connection (welding, screwing, riveting, bonding, etc.) or an indirect connection achieved through intermediate connecting members. In this sense, "between" is not solely defined by the outermost, innermost, or centerline of the two frame tubes; any of the above criteria can apply. Herein, as shown in FIGS. 4E and 4F, the electric riding device 1A also includes a basket 700A detachably mounted to the frame body 161A. The frame body 161A includes a support plate assembly, and at least a portion of the bottom of the basket 700A is configured to be in substantially horizontal contact with the upper surface 175A of the support plate assembly.

In some embodiments, as shown in FIGS. 13A and 13G, the electric riding device 1A may also include a footrest assembly. The footrest assembly may include an oppositely mounted and rotatable left foot pedal 1501A and right foot pedal 1501A. The left foot pedal 1501A is mounted on the left side of the basket 700A or on the left frame tube 169A. The right foot pedal 1501A is mounted on the right side of the basket 700A or on the right frame tube 170A. The mounting position of the left foot pedal 1501A is proximate to the front end of the left frame tube 169A, and the mounting position of the right foot pedal 1501A is proximate to the front end of the right frame tube 170A.

In some embodiments, as shown in FIG. 13O, the battery device 600A may include a battery housing 604A fixedly connected to the frame body 161A and a cell array 605A housed within the battery housing 604A. In conjunction with FIG. 13P, the battery housing 604A is disposed substantially centrally in at least the lateral direction between the left frame tube 169A and the right frame tube 170A.

In some embodiments, as shown in FIG. 13M, the ratio of the height $H_{A13}$ of the lower surface of the battery housing 604A from the horizontal ground to the tire outer diameter $D_{A1}$ of the front and rear wheels is 0.3-0.7.

In some embodiments, as shown in FIG. 1B, the electric riding device 1A may include: a frame body 161A extending between a front portion and a rear portion of the electric riding device 1A; a front wheel 400A and a rear wheel 500A mounted on the front and rear sides of the frame body 161A, respectively; a handlebar assembly 224A mounted on the frame body 161A and configured to be in contact with a user's hands; a seat 82A mounted on the frame body 161A; and a battery device 600A mounted on the frame body 161A and configured to supply power to the electric riding device 1A.

In some embodiments, as shown in FIGS. 1B and 13O, the power source 600A may include a battery pack 605A and a control circuit 606A, and the control circuit 606A is electrically connected to the battery pack 605A and is configured to control the electric rotation of at least one of the front wheel 400A and the rear wheel 500A based on user operation.

In some embodiments, as shown in FIG. 4E, the frame body 161A may include a frame base portion 162A. The frame base portion 162A may include a left frame tube 169A and a right frame tube 170A arranged substantially in parallel and laterally spaced apart. In conjunction with FIG. 4D, the frame base portion 162A may also include a substantially flat support plate 104A extending laterally between the left frame tube 169A and the right frame tube 170A. The left and right ends of the support plate 104A are fixedly connected to the left frame tube 169A and the right frame tube 170A, respectively, and the longitudinally extending dimension of the support plate 104A is greater than the laterally extending dimension of the support plate 104A.

In some embodiments, as shown in FIGS. 4E and 4F, the electric riding device 1A also includes a basket 700A detachably mounted to the frame body 161A.

In some embodiments, as shown in FIGS. 13A and 13G, the electric riding device 1A may also include a footrest assembly. The footrest assembly may include an oppositely mounted and rotatable left foot pedal 1501A and right foot pedal 1501A. The left foot pedal 1501A is mounted on the left side of the basket 700A or on the left frame tube 169A. The right foot pedal 1501A is mounted on the right side of the basket 700A or on the right frame tube 170A. The mounting position of the left foot pedal 1501A is proximate to the front end of the left frame tube 169A, and the mounting position of the right foot pedal 1501A is proximate to the front end of the right frame tube 170A.

In some embodiments, as shown in FIG. 13O, the battery device 600A may include a battery housing 604A fixedly connected to the frame body 161A and a cell array 605A housed within the battery housing 604A. In conjunction with FIG. 13P, the battery housing 604A is disposed substantially centrally in at least the lateral direction between the left frame tube 169A and the right frame tube 170A.

Figure 13T:
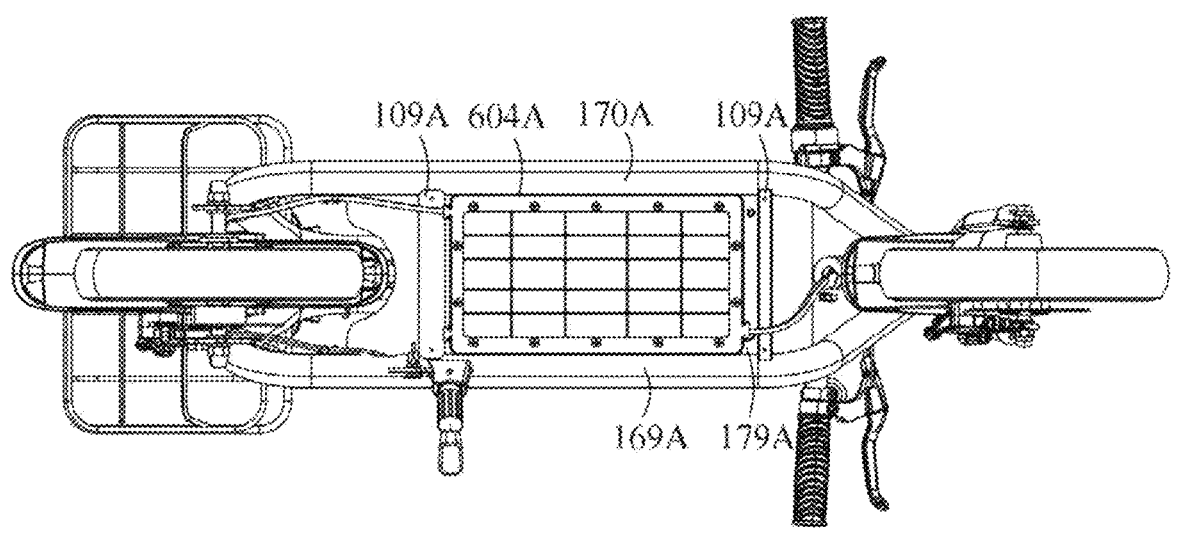
FIG. 13T is another schematic installation view from yet another direction of the power source according to an embodiment of the present application.

In some embodiments, the reinforcing rib may also be referred to as a first crossbeam or a second crossbeam. As shown in FIG. 13T, the frame base portion 162A may also include a first crossbeam 109A and a second crossbeam 109A that are arranged substantially in parallel and are longitudinally spaced apart. The two ends of the first crossbeam 109A are respectively fixed to the left frame tube 169A and the right frame tube 170A. The two ends of the second crossbeam 109A are respectively fixed to the left frame tube 169A and the right frame tube 170A. The first crossbeam 109A is proximate to the front end of the frame base portion 162A, and the second crossbeam 109A is proximate to the rear end of the frame base portion 162A. Herein, the first crossbeam 109A, the second crossbeam 109A, the left frame tube 169A, and the right frame tube 170A together enclose a storage region 179A, and the battery housing 604A is disposed within the storage region 179A.

In some embodiments, the first limiting member can be referred to as a front wall, the third limiting member can be referred to as a rear wall, the second limiting member can be referred to as a left wall, and the fourth limiting member can be referred to as a right wall. As shown in FIG. 13D, a detachable mesh-like basket 700A for carrying items, adapted to be placed between the front and rear wheel systems of an electric vehicle, may include: a substantially flat bottom wall 783A; a left wall 702A extending substantially vertically upward from the left end of the bottom wall 783A; a right wall 704A extending substantially vertically upward from the right end of the bottom wall 783A; a front wall 701A extending upward from the front end of the bottom wall 783A, with the left and right ends of the front wall 701A connected to the front ends of the left wall 702A and the right wall 704A, respectively; and a rear wall 703A extending upward from the rear end of the bottom wall 783A, with the left and right ends of the rear wall 703A connected to the rear ends of the left wall 702A and the right wall 704A, respectively.

In some embodiments, "adapted to" may be understood as to have the same meaning as " . . . adapted to the degree of . . . "

In some embodiments, "front and rear wheel system" may be understood as to include at least the front wheel 400A and the rear wheel 500A, which are longitudinally spaced apart on the frame 100A and can together define the front and rear support lines and wheelbase of the vehicle. This serves as the spatial reference for geometric/directional expressions such as "located between the front and rear wheels." This term is not limited to a specific motor/brake/suspension/drive type, nor does it require both wheels to be driven.

In some embodiments, the connection system can also be referred to as an interface system, the first mounting plate assembly can be referred to as a front interface plate, the second mounting plate assembly can be referred to as a rear interface plate, and the contact surface can be referred to as an interface surface. As shown in FIG. 4J, the basket 700A may also include an interface system 784A. The interface system 784A may include a longitudinally spaced front interface plate 777A and rear interface plate 778A. At least a portion of at least one of the front interface plate 777A and the rear interface plate 778A may have a substantially flat interface surface 785A and be disposed on the bottom side of the bottom wall 783A or constitute a part of the bottom wall 783A. Herein, one of the front interface plate 777A and the rear interface plate 778A may include two laterally spaced fastener mounting holes 729A, and the other of the front interface plate 777A and the rear interface plate 778A may include at least one fastener mounting hole 729A.

In some embodiments, "longitudinally spaced" may be understood as to have the same meaning as "longitudinally spaced apart."

In some embodiments, "laterally spaced" may be understood as to have the same meaning as "laterally spaced apart."

Unless otherwise specified, other occurrences of "adapted to" and "front and rear wheel system" in some embodiments may be understood as according to the above methods/rules. The differences may mainly lie in the different objects being judged, but the basic judgment rules are the same.

In some embodiments, the material of the basket 700A can be metal or plastic. It may be noted that this refers to the material of the structural body of the basket 700A, not to surface auxiliary layers or local decorative materials. In some embodiments, the "structural body" may be understood as the key part that constitutes the load-bearing frame of the basket 700A and realizes its core functions (such as supporting loads, maintaining shape, and connecting for installation). Therefore, process treatment layers on the outer surface of the basket 700A, such as dip coating, spray coating, plating, or laminating, are not included in the category of "body material." Unless otherwise specified, other occurrences of "the material can be metal or plastic" in some embodiments may be understood as to have the same meaning as here.

In some embodiments, as shown in FIG. 4J, the bottom wall 783A, left wall 702A, right wall 704A, front wall 701A, and rear wall 703A may be integrally formed or can be respectively separate components.

In some embodiments, "respectively separate components" may be understood as to mean that multiple components/objects (e.g., the bottom wall 783A, left wall 702A) are not integrally formed as a single piece, but are manufactured/formed as their own independent components, which are then assembled into the overall basket 700A. The term "separate" emphasizes the independence of the manufacturing/structural unit and does not require them to be freely movable or individually usable after assembly.

In some embodiments, as shown in FIG. 4J, detachable foot pedals 1500A can be provided on the left and right sides of the basket 700A, respectively.

In some embodiments, as shown in FIG. 4J, the front interface plate 777A and the rear interface plate 778A may both be integrally formed with the basket 700A or be separate components relative to the basket 700A.

In some embodiments, "separate components" may be understood as to mean that a certain component/object (e.g., the bottom wall 783A) is not integrally formed as a single piece with another component/object, but can be an independently manufactured/formed component that is then assembled with the other component/object to form the overall basket 700A. The term "separate" emphasizes the independence of the manufacturing/structural unit and does not require them to be freely movable or individually usable after assembly.

In some embodiments, as shown in FIG. 4F, the fastener may be a bolt, such as the fourth bolt 776A.

In some embodiments, as shown in FIG. 13A, a storage basket 700A for being removably mounted on a vehicle may include: a bottom portion 783A, at least a part of which may be substantially flat; a left wall 702A, at least a part of which may extend upward from the left side of the bottom portion 783A; and a right wall 704A, at least a part of which can extend upward from the right side of the bottom portion 783A; wherein the bottom portion 783A, the left wall 702A, and the right wall 704A together define a storage area 706A.

In some embodiments, "together define" may be understood as to have the same meaning as "collectively define."

In some embodiments, as shown in FIG. 13D, the storage basket 700A can include a first mounting area 789A and a second mounting area 790A that are longitudinally spaced apart. At least one of the first mounting area 789A and the second mounting area 790A is located on the bottom side of the bottom portion 783A. Both the first mounting area 789A and the second mounting area 790A are configured to mount the storage basket 700A onto the vehicle via fasteners.

In some embodiments, "mounting area" may be understood as to refer to a local area on the storage basket 700A provided or adapted for mechanical fixation to the vehicle. It is used to form a stable fit with the corresponding vehicle body interface and to accommodate/bear the clamping or preload force of the fasteners, thereby transferring the weight and load of the storage basket 700A to the vehicle body. This area can be one or more continuous or discrete local surfaces/ribs/plates/seats. Alternatively, it may be understood as a local area specifically designed for fastener connection and load transfer.

In some embodiments, the front mounting hole or rear mounting hole can also be referred to as a fastener interface. As shown in FIG. 13D, the first mounting area 789A may include two laterally spaced fastener interfaces 729A, and the second mounting area 790A may correspondingly include at least one fastener interface 729A. Alternatively, the second mounting area 790A may include two laterally spaced fastener interfaces 729A, and the first mounting area may correspondingly include at least one fastener interface 729A.

In some embodiments, the material of the storage basket 700A can be metal or plastic. And, as shown in FIG. 13D, at least a portion of the storage basket 700A is mesh-like.

In some embodiments, as shown in FIG. 13D, at least a portion of the bottom portion 783A can be integrally formed with or separate from the left wall 702A, and at the same time, at least another portion of the bottom portion 783A can be integrally formed with or separate from the right wall 704A.

In some embodiments, as shown in FIG. 13D, detachable foot pedals 1500A are provided on the left and right sides of the storage basket 700A, respectively.

In some embodiments, the frame body can also be referred to as a framework body, and the connection system can also be referred to as an attachment system. As shown in FIG. 4F, the storage basket 700A can be configured to be detachably attached to the framework body 161A of the electric riding device 1A, and the framework body 161A can include a substantially flat support plate assembly.

In some embodiments, as shown in FIG. 13D, the storage basket 700A may include a storage body portion 791A, which can define a storage area 792A. The storage body portion 791A can have at least an oppositely arranged left wall 702A and right wall 704A; and an attachment system 784A. The attachment system 784A can include at least three fastener interfaces 729A in a mutually triangular distribution. At least one of the at least three fastener interfaces 729A in a mutually triangular distribution can be arranged on the bottom portion 783A of the storage body portion 791A.

In some embodiments, "storage body portion 791A" may be understood as to refer to the main enclosing structure that defines the storage area 792A. The components it contains can be integrally formed or assembled from multiple components, and are allowed to have reinforcing ribs, flanges, covering layers, etc. It may be understood as in contrast to the "attachment system 784A": the storage body portion 791A is primarily responsible for enclosing items, while the attachment system 784A is primarily responsible for connecting the storage body portion 791A and the framework body 161A. However, it may be noted that the functions mentioned here are not mutually exclusive; for example, the storage body portion 791A can also have the function of connecting the storage body portion 791A and the framework body 161A.

In some embodiments, "oppositely arranged" may be understood as to mean that two components/objects (e.g., the left wall 702A and the right wall 704A) are located on the left and right sides of a reference object (e.g., the storage body portion 791A) and form a relative arrangement in space with the longitudinal center plane/center line of the reference object as a reference, allowing for limited positional/postural deviations arising from structural arrangement, ergonomics, or manufacturing/assembly tolerances. Specific to the left wall 702A and the right wall 704A, this limited positional/postural deviation does not affect their functional constitution as left-right corresponding and usable storage areas.

In some embodiments, "triangular distribution" may be understood as to mean that the projected positions of three components/objects (e.g., three fastener interfaces) are not collinear and can serve as the three vertices of a triangle, thereby performing a preset function (e.g., providing stable constraint against translation and rotation) under normal use conditions (e.g., during riding). The three components/objects are not required to be equilateral/equidistant, and the triangle formed can be scalene/irregular.

In some embodiments, the contact surface can be referred to as an abutment surface. As shown in FIG. 4F and FIG. 4J, each of the at least three fastener interfaces 729A in a mutually triangular distribution may have a substantially flat abutment surface 785A for fitting against the upper surface 175A of the support plate assembly.

In some embodiments, "to fit against" may be understood as to mean that, under normal use conditions (e.g., after assembly and application of fastener preload), multiple components/objects (e.g., the abutment surface 785A and the upper surface 175A) form a stable surface-to-surface (or multi-point approximately coplanar) pressure-bearing contact in order to transfer working loads. It does not require 100% full-surface contact, and allows for minor undulations caused by manufacturing/coating. Alternatively, it may be understood as that being able to stably bear/transfer force or load constitutes fitting against.

Unless otherwise specified, other occurrences of "oppositely arranged," "triangular distribution," and "to fit against" in some embodiments may be understood as according to the above methods/rules. The differences may mainly lie in the different objects being judged, but the basic judgment rules are the same.

In some embodiments, the storage area may be referred to as a cargo space. As shown in FIG. 13D, a basket 700A for carrying items may include: a substantially flat bottom portion 783A; a left wall 702A extending substantially vertically upward from the left end of the bottom portion 783A; a right wall 704A extending substantially vertically upward from the right end of the bottom portion 783A; a front wall 701A extending upward from the front end of the bottom portion 783A; and a rear wall 703A extending upward from the rear end of the bottom portion 783A; wherein the bottom portion 783A, the left wall 702A, the right wall 704A, the front wall 701A, and the rear wall 703A can together define a cargo space 792A.

Figure 4K:
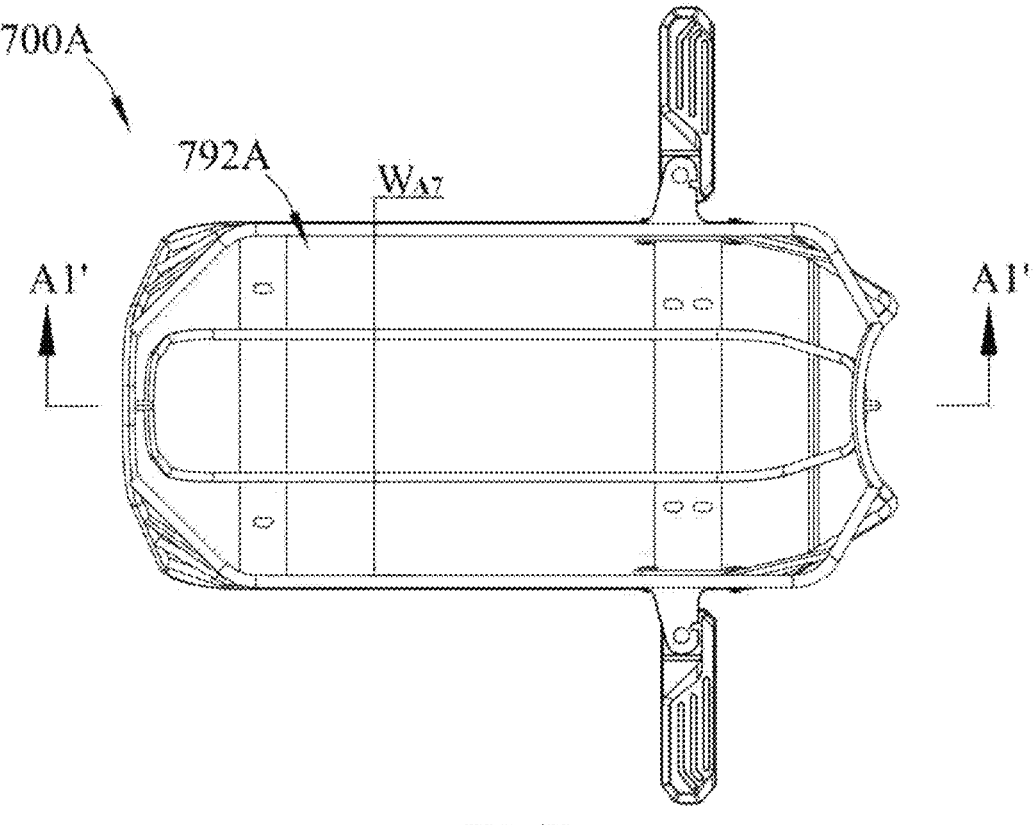
FIG. 4K is another schematic view from another direction of an implementation of the storage mechanism according to an embodiment of the present application.
Figure 4L:
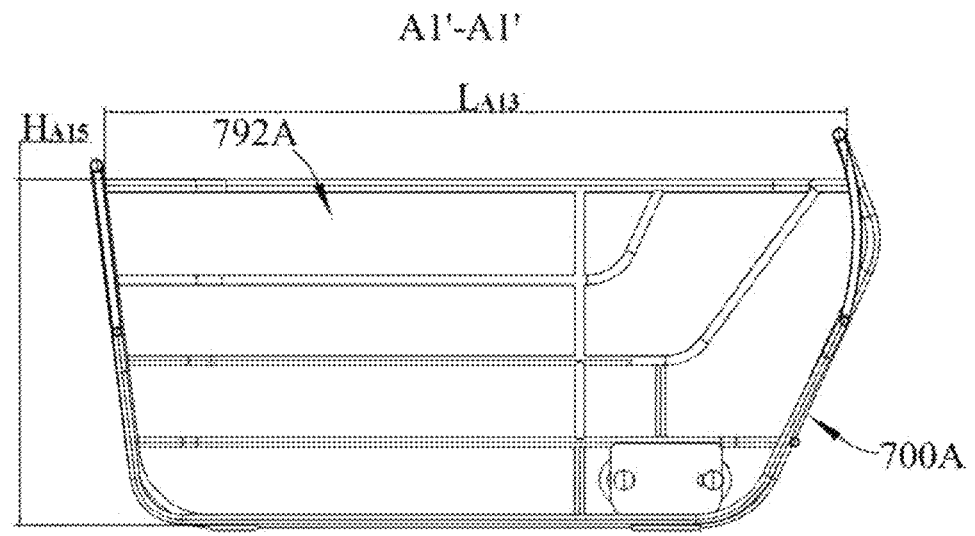
FIG. 4L is a sectional view of an implementation of the storage mechanism according to an embodiment of the present application.

In some embodiments, as shown in FIGS. 4K and 4L, the cargo space 792A may have a longitudinal extension dimension $L_{A13}$, a lateral extension dimension $W_{A7}$, and a vertical extension dimension $H_{A15}$. The longitudinal extension dimension $L_{A13}$ can be greater than either the lateral extension dimension $W_{A7}$ or the vertical extension dimension $H_{A15}$. The ratio of the lateral extension dimension $W_{A7}$ to the longitudinal extension dimension $L_{A13}$ can be between 0.25-0.75. The ratio of the vertical extension dimension $H_{A15}$ to the longitudinal extension dimension $L_{A13}$ can be between 0.25-0.75. The longitudinal extension dimension $L_{A13}$ can be from 10 inches to 35 inches.

Oriented with the longitudinal extension dimension as the primary direction, it can accommodate relatively long objects (e.g., pets, umbrellas). The coordinated lateral extension dimension helps control the width, ensuring passability, and can reduce the chance of items rolling. The coordinated vertical extension dimension helps control the height, which is beneficial for lowering the center of gravity and reducing obstruction of view. When all three fall within the above ranges, it results in an overall performance of "fits, doesn't wobble, clear view, and easy passage."

In some embodiments, the overall slender shape of the basket 700A provides a good basis for adapting to small e-bikes or two-wheeled mini e-bikes (hereinafter referred to as small e-bikes). The basket 700A can fully utilize the lowered longitudinal space of a small e-bike to expand its cargo capacity, while at the same time, by controlling the lateral extension dimension and the vertical extension dimension $H_{A15}$, it reduces the interference of the basket 700A with the overall vehicle dimensions, providing a good riding experience. The e-bike gains expanded cargo volume while still maintaining a slim profile.

In some embodiments, "longitudinal extension dimension" may be understood as to default to the horizontal projected distance in the longitudinal direction between the two extreme points, the foremost and rearmost, selected on the theoretical inner envelope. That is, by default, it is the maximum inner length of the entire cavity. It may be noted that indications take precedence, i.e., if there is an illustration, it should be determined specifically according to the illustration.

In some embodiments, "lateral extension dimension" may be understood as to default to the horizontal projected distance in the lateral direction between the two extreme points, the leftmost and rightmost, selected on the theoretical inner envelope. That is, by default, it is the maximum inner width of the entire cavity. It may be noted that indications take precedence, i.e., if there is an illustration, it should be determined specifically according to the illustration.

In some embodiments, "vertical extension dimension" may be understood as to default to the height difference between the two extreme points, the highest and lowest, selected on the theoretical inner envelope in the vertical direction. That is, by default, it is the maximum inner height of the entire cavity. It may be noted that indications take precedence, i.e., if there is an illustration, it should be determined specifically according to the illustration.

Unless otherwise specified and/or indicated, other occurrences of "longitudinal extension dimension," "lateral extension dimension," and "vertical extension dimension" in some embodiments may be understood as according to the above methods/rules. The differences may mainly lie in the different objects being judged, but the basic judgment rules are the same.

In some embodiments, as shown in FIG. 4J, the basket 700A may also include an interface system 784A. At least a portion of the interface system 784A may have a substantially flat interface surface 785A, and the interface surface 785A is located below the lower surface of the bottom portion 783A or constitutes at least a portion of the lower surface of the bottom portion 783A.

In some embodiments, "below the lower surface" may be understood as to mean that a certain component/object (e.g., the interface surface 785A), under normal use conditions, is at a lower geometric position in the vertical direction (up/down) relative to the lower surface of another component/object (e.g., the bottom portion 783A). Alternatively, it may be understood as that, using the lower surface of the other component/object as a reference, a "reference plane" is established, and the entire component/object or at least its effective pressure-bearing area is located below this reference plane.

In some embodiments, as shown in FIG. 4J, the interface system 784A may include at least three fastener interfaces 729A. Any two of the at least three fastener interfaces 729A can have at least one of a laterally spaced configuration and a longitudinally spaced configuration; wherein, at least two of the at least three fastener interfaces 729A can be laterally spaced from each other, and the remaining at least one of the at least three fastener interfaces can be longitudinally separated from the at least two laterally spaced fastener interfaces.

Figure 4M:
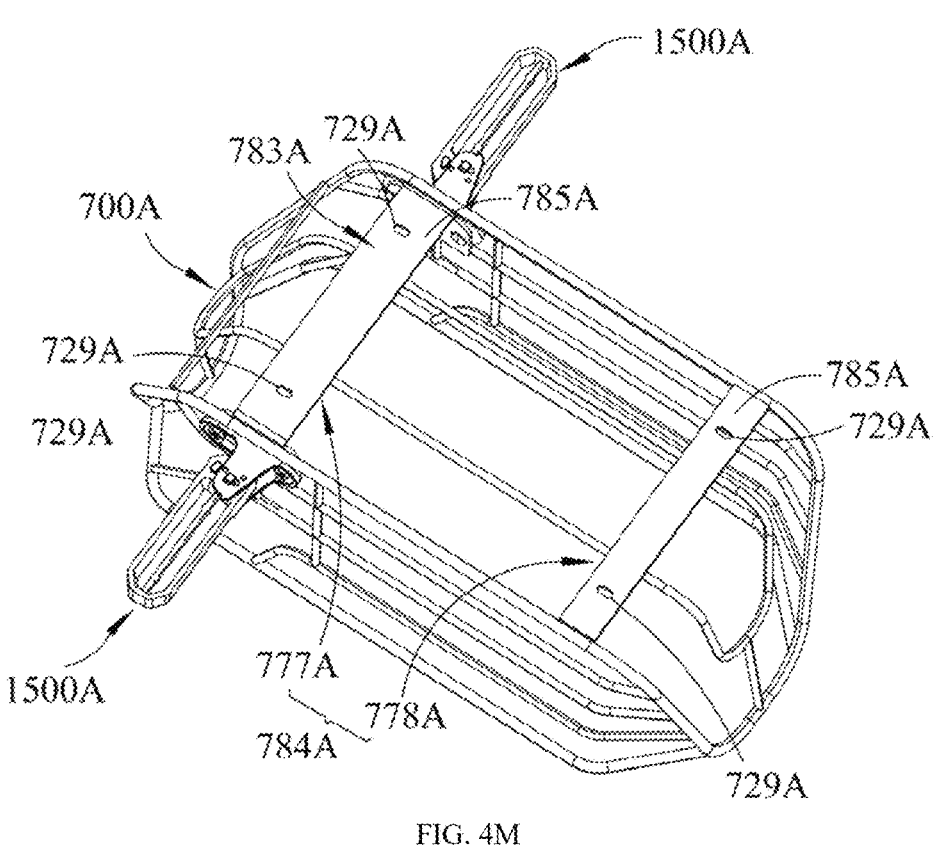
FIG. 4M is yet another schematic view from one direction of an implementation of the storage mechanism according to an embodiment of the present application.

In some embodiments, as shown in FIG. 4M, the interface system 784A may include four fastener interfaces 729A, forming a substantially rectangular arrangement in a planar projection in the vertical direction, wherein: a first pair of fastener interfaces 729A is located at a relatively forward position of the basket 700A and are laterally spaced from each other, and a second pair of fastener interfaces 729A is located at a relatively rearward position and are laterally spaced from each other, and the first and second pairs are longitudinally separated from each other.

In some embodiments, "substantially rectangular arrangement" may be understood as, when the spatial positions of four components/objects (e.g., four fastener interfaces 729A) are projected vertically onto a horizontal plane, if their projected points can be identified as two pairs that are "left/right" laterally spaced, and the front pair and rear pair are clearly separated longitudinally, and the four points as a whole present an approximately rectangular shape (adjacent sides substantially parallel, adjacent angles approximately right angles, allowing for engineering tolerances/slight asymmetry/chamfers), then it constitutes a "substantially rectangular arrangement." Alternatively, it may be understood as being able to form a functionally equivalent four-corner support in a horizontal projection.

In some embodiments, "relatively forward position" may be understood as to have the same meaning as "proximate to the . . . front portion."

In some embodiments, "relatively rearward position" may be understood as to have the same meaning as "proximate to the . . . rear portion."

Unless otherwise specified and/or indicated, other occurrences of "below the lower surface" and "substantially rectangular arrangement" in some embodiments may be understood as according to the above methods/rules. The differences may mainly lie in the different objects being judged, but the basic judgment rules are the same.

Figure 16A:
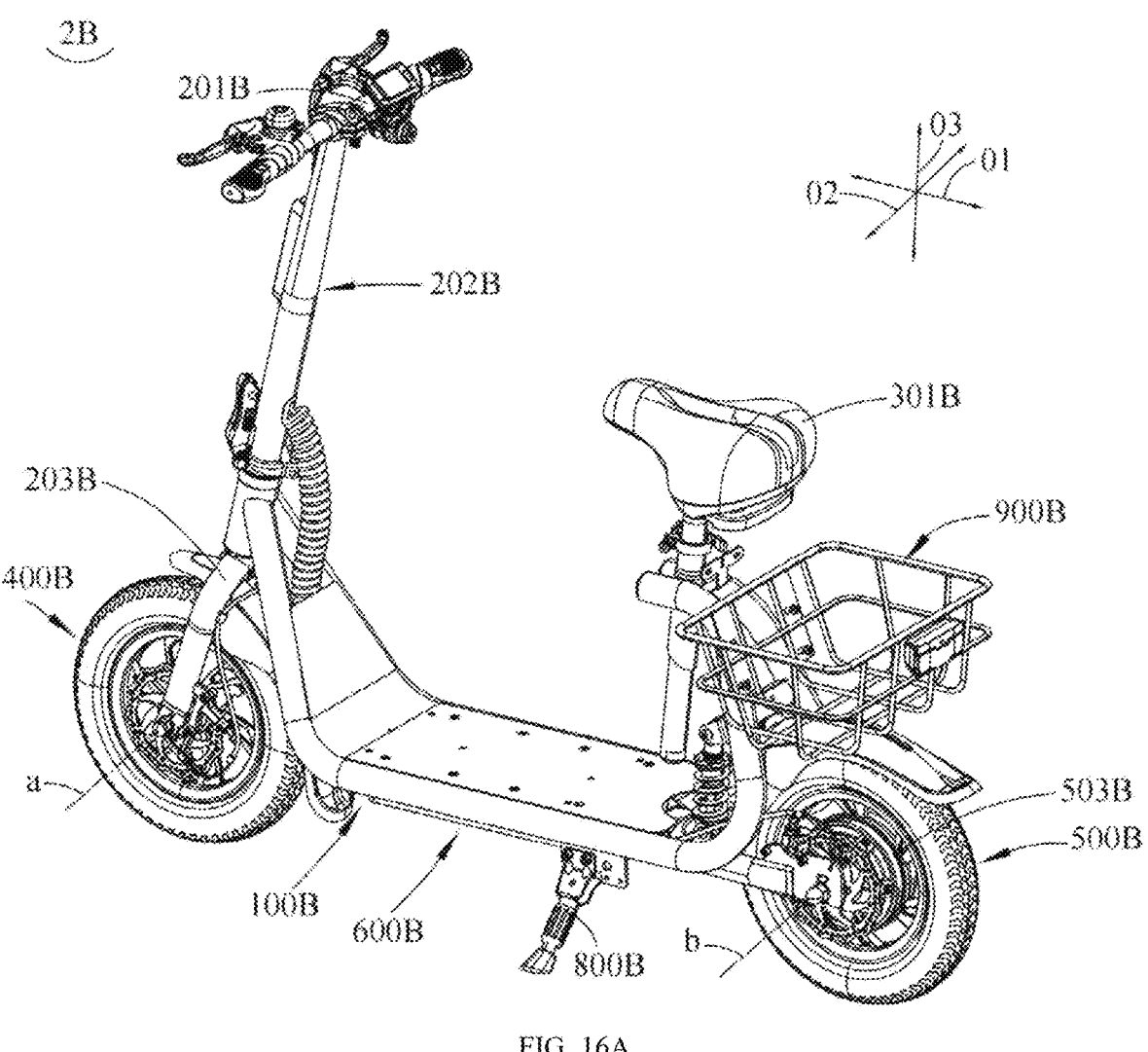
FIGS. 16A-16B are a set of overall schematic views of another implementation of the vehicle according to an embodiment of the present application.
Figure 16B:
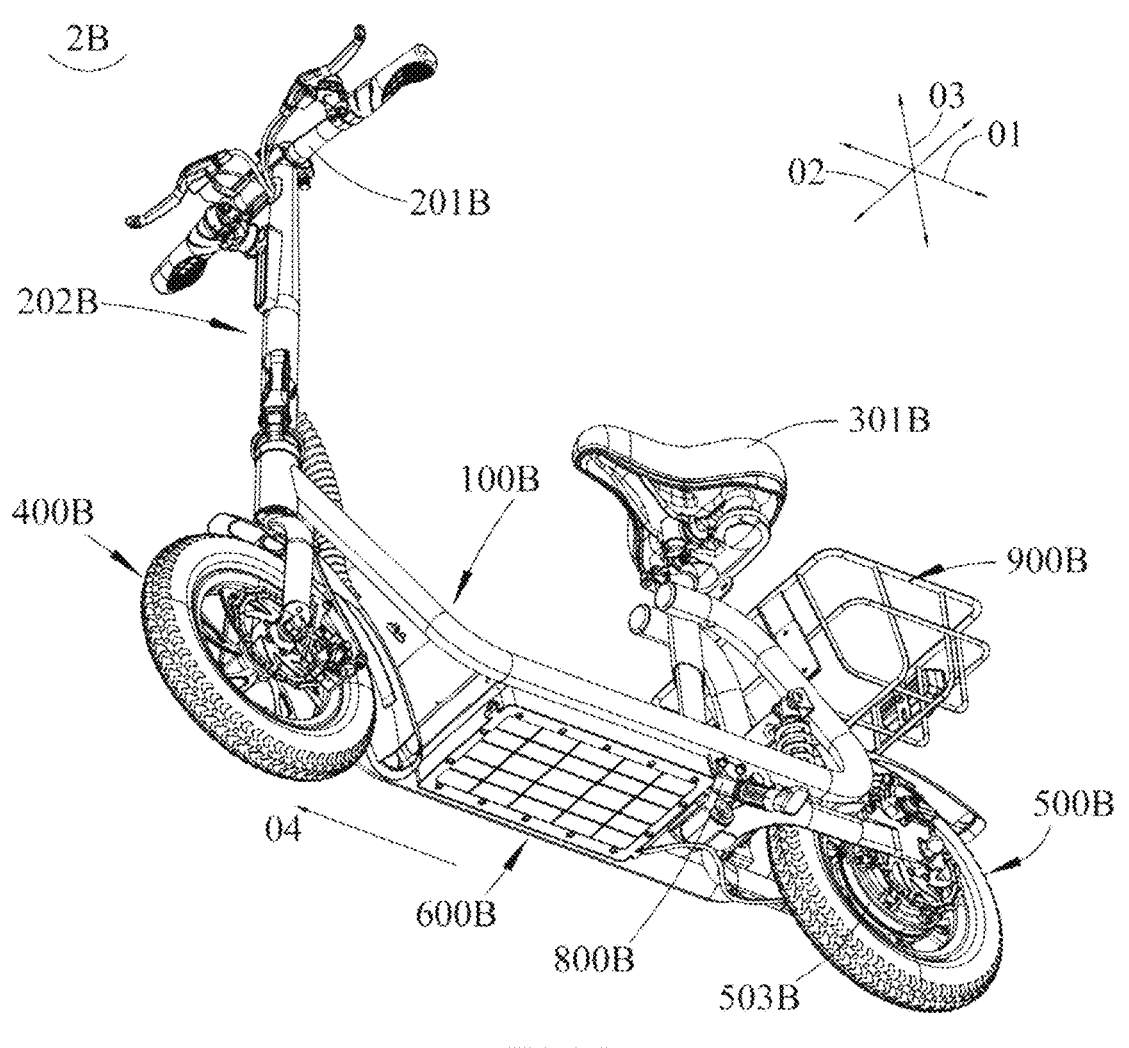

FIGS. 16A-16B are a set of overall schematic views of the vehicle 2B.

The vehicle 2B may be referred to as an electric scooter, electric mobility vehicle, or similar. In some embodiments, the vehicle 2B may provide a passenger-carrying function, allowing the user to operate the vehicle 2B for personal mobility or short-distance travel. In addition, the vehicle 2B may provide a cargo-carrying function, whereby one or more objects, or at least one animal, may be placed on the vehicle 2B and accompany the user during travel.

As shown in FIGS. 16A and 16B, in some embodiments, the vehicle 2B may include a handlebar 201B, a stem 202B, a front fork 203B, a frame 100B, a front wheel 400B, a rear wheel 500B, a rear basket 900B, a seat 301B, a power mechanism 600B, a driving mechanism 503B, and a kickstand 800B.

The stem 202B and the front fork 203B may both be rotatably mounted to the front end of the frame 100B, and the stem 202B may be located at the top end of the front fork 203B. The stem 202B and the front fork 203B may rotate together. The handlebar 201B may be fixedly mounted to the top end of the stem 202B. The front wheel 400B may be rotatably mounted to the front fork 203B. Accordingly, by rotating the handlebar 201B, the stem 202B and the front fork 203B may be driven to rotate, thereby causing the front wheel 400B to turn, so as to change the traveling direction of the vehicle 2B. When the vehicle 2B moves upright and forward, the rotational direction of the front wheel 400B relative to the front fork 203B is substantially perpendicular to the second direction 02. The rear wheel 500B may be rotatably mounted to the rear end of the frame 100B, and when the vehicle 2B moves upright and forward, the rotational direction of the rear wheel 500B relative to the frame 100B is substantially perpendicular to the second direction 02. The rear basket 900B may be fixedly mounted to the rear end of the frame 100B and located above the rear wheel 500B. The seat 301B may be fixedly mounted to the top end of the frame 100B and positioned near the rear end. The power mechanism 600B may be fixedly mounted to the frame 100B and located at the bottom end of the frame 100B. The driving mechanism 503B may be mounted to the rear wheel 500B.

Figure 17A:
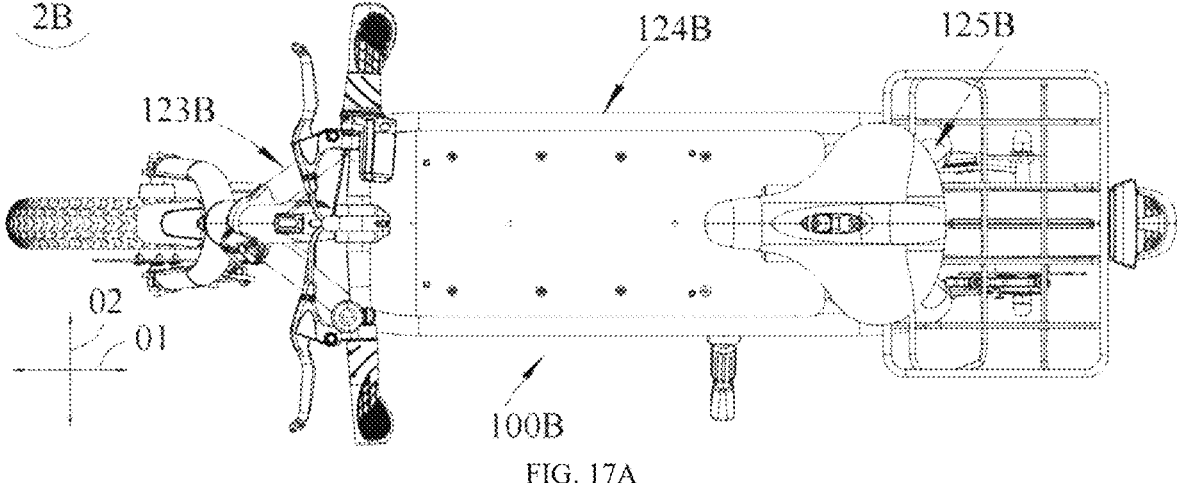
FIGS. 17A-17C are another set of overall schematic views of another implementation of the frame according to an embodiment of the present application.
Figure 17B:
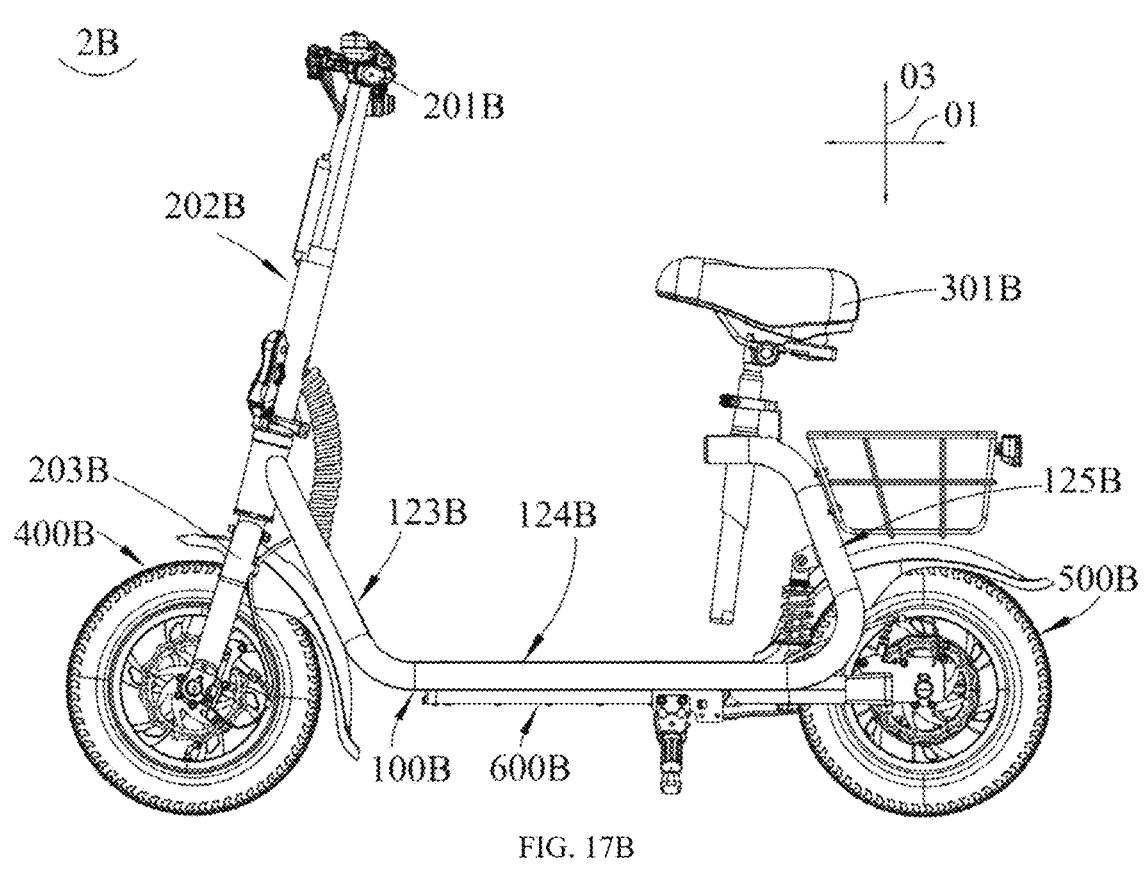
Figure 17C:
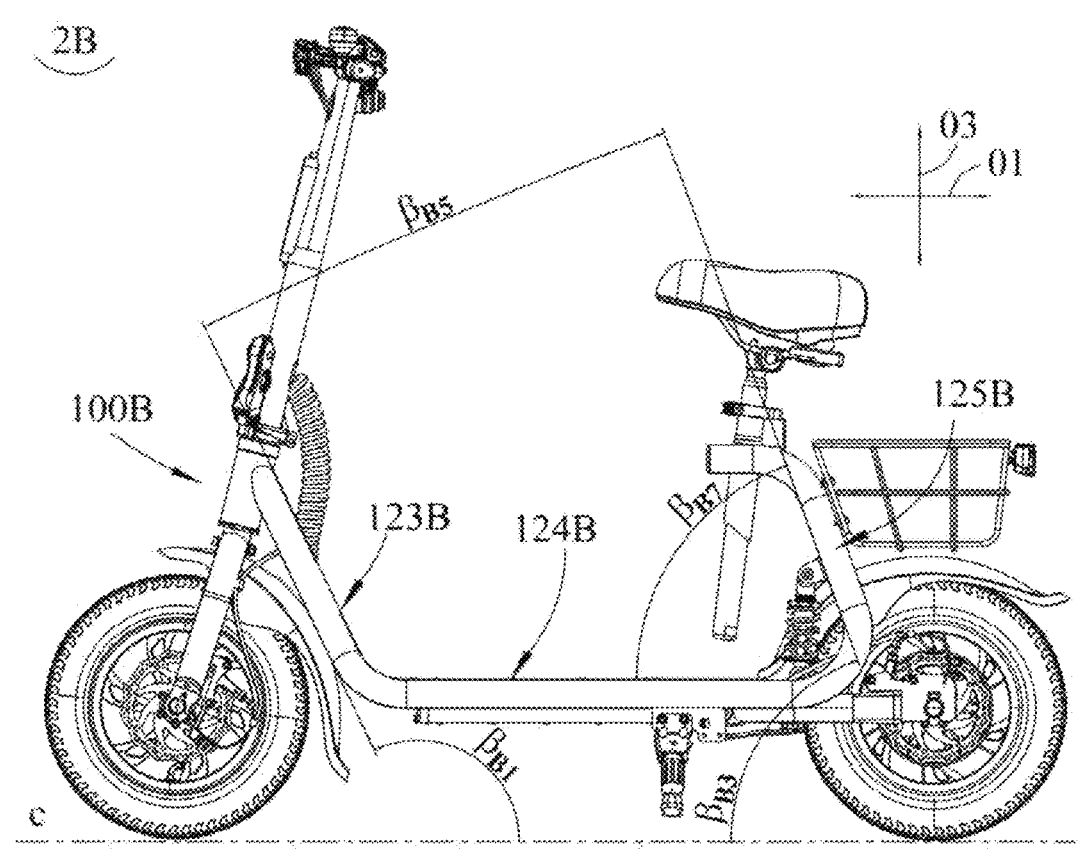

FIGS. 17A-17C illustrate a set of structural schematic views of the frame 100B, wherein FIG. 17C shows the parameter schematic view of frame 100B.

As shown in FIGS. 17A-17B, in some embodiments, frame 100B may include a first section 123B, a second section 124B, and a third section 125B sequentially arranged along the first direction 01. The first section 123B and the third section 125B may both be located at the top end of the second section 124B.

As shown in FIG. 17B, the first section 123B may be configured to, along the first direction 01, define a front region located on the front side to avoid interference with the front wheel 400B, and a rear region located on the rear side for user use. Separating the two regions is beneficial for improving operational safety, for example, when the front wheel 400B rotates or changes its traveling direction. It may also be understood that the first section 123B may be configured such that, along the first direction 01, the top end is located on the front side of the bottom end, that is, the projections of the top end and the bottom end on the first plane do not overlap, so as to form a space for accommodating other parts or components of the vehicle 2B, such as the front wheel 400B, the space having a length in the first direction 01 and a height in the third direction 03.

As shown in FIG. 17B, in some embodiments, the first section 12B may incline forward to provide a larger space. When a user wishes to stretch a foot or feet forward, they may step on or rest on the first section 123B, that is, the forward inclination of the first section 123B is favorable for providing leg-stretching space and is expected to improve user comfort. In addition, when an item needs to be placed at an angle or has a corresponding leaning position, the first section 123B may provide supporting force for the item. When it is desired to place more or larger items, it is expected that the space generated by the forward inclination of the first section 123B may be further utilized. The forward inclination of the first section 123B may offer users diverse and flexible storage options. In addition, the forward inclination of the first section 123B may also cause rainwater or dust splashed onto it to bounce away, thereby improving the cleanliness of the user and/or the items or animals placed on the second section 124B.

As shown in FIG. 17B, in some embodiments, both the stem 202B and the front fork 203B may be inclined rearward to facilitate the operation of the handlebar 201B during riding. In addition, the stem 202B may be inclined rearward to facilitate lowering the height of the connection position between the stem 202B and the frame 100B; likewise, the front fork 203B may be inclined rearward to facilitate lowering the height of the connection position between the front fork 203B and the frame 100B. In this way, the stability of the vehicle 2B is expected to be improved.

In some embodiments, the stem 202B and the front fork 203B may both be inclined rearward, and the first section 123B may be inclined forward, which lowers the height of the connection position between the first section 123B and the stem 202B, potentially improving the stability of the vehicle 2B.

Referring to FIG. 17A, the second section 124B may be configured to provide an accommodating space along the second direction 02, the accommodating space being capable of at least accommodating a user's foot for stepping or stretching, or at least accommodating an item or an animal, such that the item or animal may travel with the user. It may also be understood that, referring to FIG. 17B, the second section 124B may be configured to define, along the third direction 03, a bottom region located on the bottom side and a top region located on the top side. The bottom region may be used to accommodate other parts or components, such as the power mechanism 600B, and the top region may be used to accommodate the user or a carried item, such as an object or an animal.

Referring to FIG. 17A, in some embodiments, the second section 124B may be configured to have an overall substantially rectangular shape, and a middle region that does not have outwardly extending portions along the second direction 02. This configuration is expected to enable a more compact design, making it easier to maneuver and park in narrow spaces, as well as to transport and carry.

Referring to FIGS. 17A and 17B, in some embodiments, the second section 124B may be used by the user for stepping, or for placing items or animals. The second section 124B may be substantially parallel to the first plane. When the vehicle 2B is in an upright state, the second section 124B may be substantially horizontally arranged. When the second section 124B is used for stepping, it may provide better stability and comfort for the user; when it is used for placing items, it is expected to improve the stability of item placement; and when it is used for placing animals, it is expected to improve the stability and comfort of the animals placed on the second section 124B. In addition, the second section 124B may be substantially parallel to the first plane, such that the force applied to the second section 124B along the second direction 02 is balanced, which may reduce the risk of tilting of the vehicle 2B along the second direction 02, thereby improving riding safety.

Referring to FIG. 17A, the third section 125B may be configured to define, along the third direction 03, a top region located on the top side and a bottom region located on the bottom side. The top region may be configured to at least accommodate user seating, and the bottom region may be configured to at least accommodate installation of the rear wheel 500B. Separating the two regions may help improve operational safety, for example, when the rear wheel 500B is rotating. It may also be understood that the third section 125B may be configured such that, along the first direction 01, the top end and the bottom end do not overlap in projection on the first plane, thereby defining a front space located on the front side and a rear space located on the rear side, along the first direction 01. The front space may be used to accommodate an item carried by the user or at least a portion of the seat 301A, and the rear space may be used for installing the rear wheel 500B. Separating the two regions may help improve operational safety, for example, when the rear wheel 500B is rotating.

Referring to FIG. 17B, in some embodiments, the third section 125B may be configured to incline forward along the first direction 01, such that the corresponding top region, which is at least configured to accommodate user seating, also shifts forward accordingly. That is, the projection of the top region falls onto the second section 124B, so that when the user is seated on the vehicle 2B, the center of gravity is shifted forward, which may help improve stability.

Referring to FIG. 17C, in some embodiments, an angle $\beta_{B1}$ formed between the first section 123B and the first plane may fall within the range of 110° to 121°. When $\beta_{B1} \geq 110°$, it is expected that the first section 123B has an appropriate inclination, that is, the first section 123B has a suitable projected length on the first plane, which may provide space for the rider or a carried item, thereby allowing more flexible use of the space. In addition, when $\beta_{B1} \leq 121°$, it is also expected that the first section 123B has an appropriate inclination, that is, the first section 123B has a suitable projected length on the first plane. As part of the frame 100A, the length of the first section 123B may thus be appropriate, which may help ensure that the frame 100A also has a suitable overall length, thereby facilitating transportation or storage.

Specifically, $\beta_{B1}$ may be any value within the range of 110° to 121°, for example, 110°, 112°, 114°, 116°, 118°, 120°, or 121°.

Referring to FIG. 17C, in some embodiments, the second section 124B may be substantially parallel to the first plane, meaning that an angle formed between the second section 124B and the first plane may fall within the range of 0° to 5°. When the angle between the second section 124B and the first plane falls within the range of 0° to 5°, and the user places both feet on the second section 124B, the feet may feel more level, thereby providing better comfort. Under bumpy road conditions or during turning, this may help reduce the likelihood of the feet slipping outward, which may help ensure riding safety. In addition, when the angle between the second section 124B and the first plane falls within 0° to 5°, and items are placed on the second section 124B, the center of gravity of the items may be more stable. During vibrations or turning, this may help reduce shifting of the center of gravity, which could otherwise lead to sliding or even falling off, and may help ensure riding safety. In addition, when the angle between the second section 124B and the first plane falls within 0° to 5°, and an animal is placed on the second section 124B, the animal may feel more stable when sitting or standing. This may help reduce postural adjustments or struggling caused by restlessness, which may help ensure normal riding by the user. During vibrations or turning, it may also help reduce sliding or falling due to shifting of the center of gravity.

Specifically, the angle between the second section 124B and the first plane may be any value within the range of 0° to 5°, for example, 0°, 1°, 2°, 3°, 4°, or 5°.

Referring to FIG. 17C, in some embodiments, the third section 125B may be configured to incline forward along the first direction 01, with an included angle $\beta_{B3}$ between the third section 125B and the first plane in the range of 65°-75°. When $\beta_{B3} \geq 65°$, the forward inclination of the third section 125B is appropriate, reducing the partitioning effect on the accommodating space corresponding to the second section 124B, which may allow the user to make better use of the space. In addition, when $\beta_{B3} \leq 75°$, the forward inclination of the third section 125B is appropriate so that the corresponding top-side region—at least one that may accommodate a user—may also be suitably positioned forward, which may cause the center of gravity, when the user is seated on vehicle 2B, to shift forward, reducing the sensation of leaning back or tipping backward.

Specifically, $\beta_{B3}$ may be any value within the range of 65°-75°, for example, 65°, 67°, 69°, 70°, 72°, 74°, or 75°.

Referring to FIG. 17C, in some embodiments, both the first section 123B and the third section 125B may be configured to incline forward along the first direction 01, and the included angle $\beta_{B5}$ between the first section 123B and the third section 125B may be in the range of 0°-10°. The inclination angles of the two may be identical or relatively close, which may provide a more consistent visual impression, making the frame 20B more aesthetically appealing. In addition, this may be beneficial for achieving a structural transition in both the first direction 01 and the third direction 03 within a smaller space, i.e., the projection of the third section 125B on the first plane may be relatively short, and the projection of the third section 125B on the third plane may also be relatively short, enabling a compact design.

Specifically, $\beta_{B5}$ may be any value within the range of 0°-10°, for example, 0°, 2°, 4°, 5°, 6°, 8°, or 10°.

Referring to FIG. 17C, in some embodiments, the included angle $\beta_{B7}$ between the third section 125B and the second section 124B may be in the range of 65°-75°. When $\beta_{B7} \geq 65°$, the forward inclination of the third section 125B may be appropriate, reducing the partitioning effect on the accommodating space corresponding to the second section 124B, which may allow the user to make better use of the space. In addition, when $\beta_{B7} \leq 75°$, the forward inclination of the third section 125B may be appropriate so that the corresponding top-side region—at least one that may accommodate a user—may also be suitably positioned forward, which may cause the center of gravity, when the user is seated on vehicle 2B, to shift forward, reducing the sensation of leaning back or tipping backward.

Specifically, $\beta_{B7}$ may be any value within the range of 65°-75°, for example, 65°, 67°, 69°, 70°, 72°, 74°, or 75°.

Figure 18:
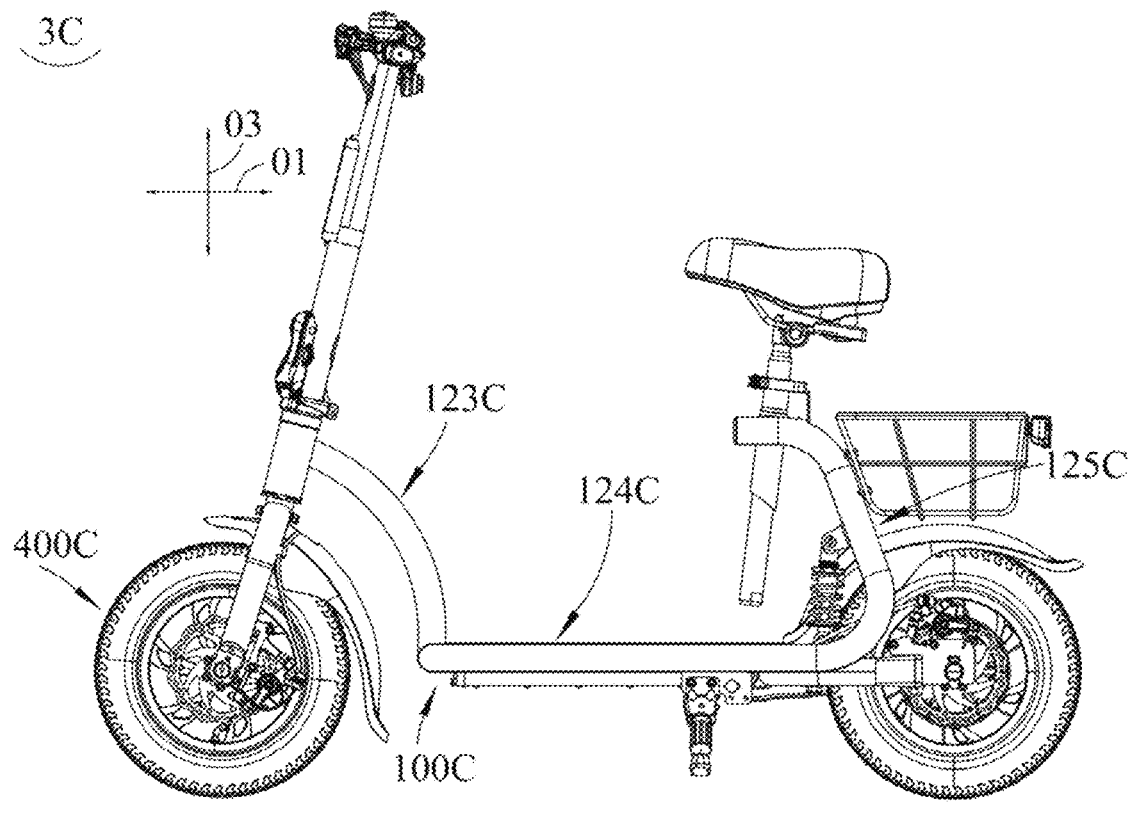
FIG. 18 is a schematic structural view of another implementation of the vehicle according to an embodiment of the present application.
Figure 19:
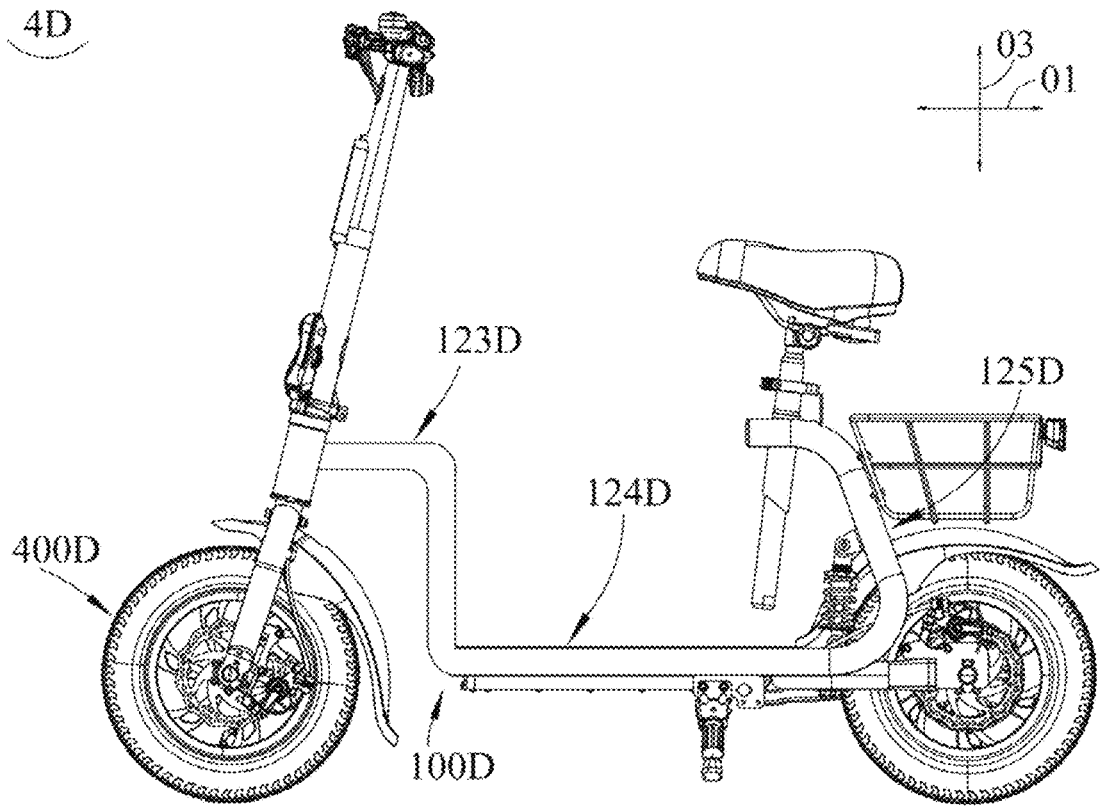
FIG. 19 is a schematic structural view of another implementation of the vehicle according to an embodiment of the present application.
Figure 20:
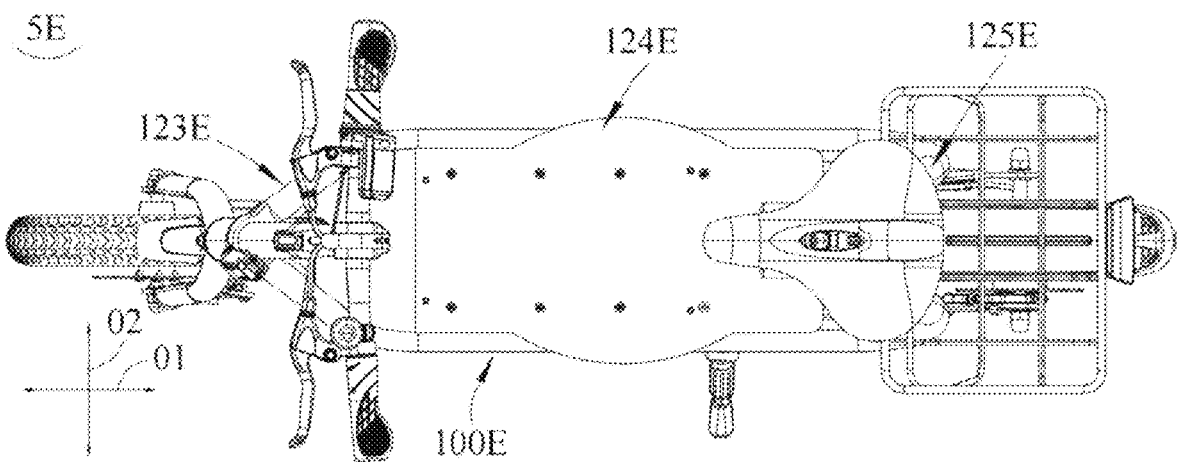
FIG. 20 is a schematic structural view of another implementation of the vehicle according to an embodiment of the present application.

FIGS. 18-20 are structural schematic views of other implementations of vehicles, such as vehicle 3C, vehicle 4D, and vehicle 5E.

As shown in FIG. 18, in some other embodiments, vehicle 3C may include a frame 100C. The frame 100C may include, in sequence along the first direction 01, a first section 123C, a second section 124C, and a third section 125C. Both the first section 123C and the third section 125C may be located at the top of the second section 124C. The first section 123C may be configured to bend forward along the first direction 01. The first section 123C may provide more space for other parts or components of vehicle 3C. For example, it may provide more operating space for installation, adjustment, or maintenance of the front wheel 400C, potentially reducing operational difficulty.

As shown in FIG. 19, in some other embodiments, vehicle 4D may include a frame 100D. The frame 100D may include, in sequence along the first direction 01, a first section 123D, a second section 124D, and a third section 125D. Both the first section 123D and the third section 125D may be located at the top of the second section 124D. The first section 123D may be configured to have a approximately stepped shape. The first section 123D may facilitate the user in picking up or placing objects. When the user needs to take or place an object on the first section 123D, the step may have a height along the third direction 03, which may reduce the degree to which the user needs to bend over. Additionally, the three-dimensional shape of the step may form a distinct boundary, so that when the user's foot moves, the risk of kicking an object placed on the first section 123D and causing it to fall may be reduced, potentially ensuring safety during riding.

Referring to FIG. 20, in some other embodiments, the frame 100E of vehicle 5E may include, in sequence along the first direction 01, a first section 123E, a second section 124E, and a third section 125E. Both the first section 123E and the third section 125E may be located at the top of the second section 124E. The second section 124E may be configured to have an overall substantially rectangular shape, and its central region may have a portion extending outward along the second direction 02. This may indicate the boarding position to the user. The outwardly extending portion may form a shape contrast with surrounding areas, serving as a visual guiding mark, enabling the user to quickly identify and standardize the boarding and stepping position, potentially providing a better riding experience and riding safety. In addition, it may provide a wider foot placement space, accommodating different foot sizes and allowing the user to flexibly adjust foot spacing and posture, potentially improving foot placement comfort.

Figure 21:
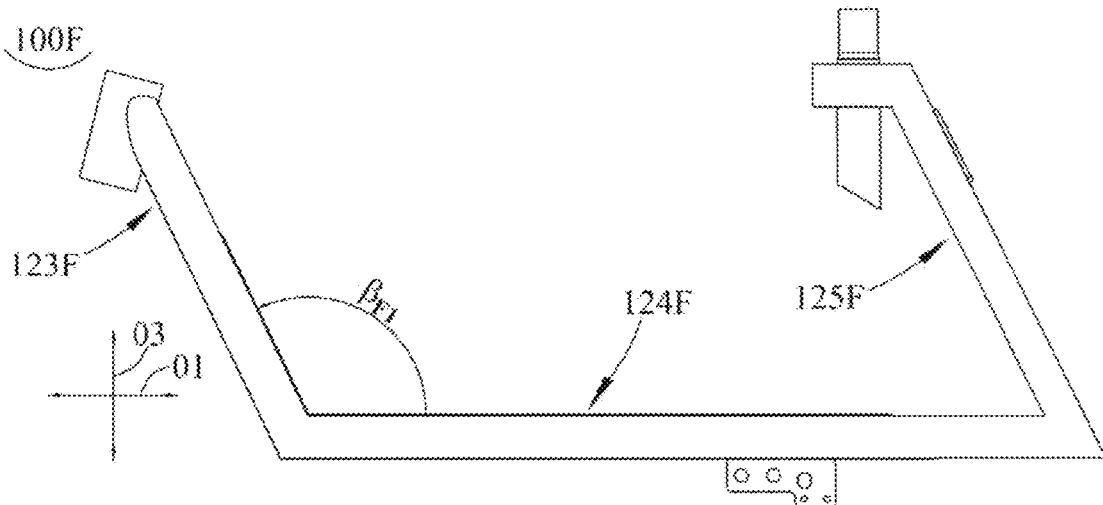
FIG. 21 is a schematic structural view of another implementation of the frame involved in an embodiment of the present application.
Figure 22:
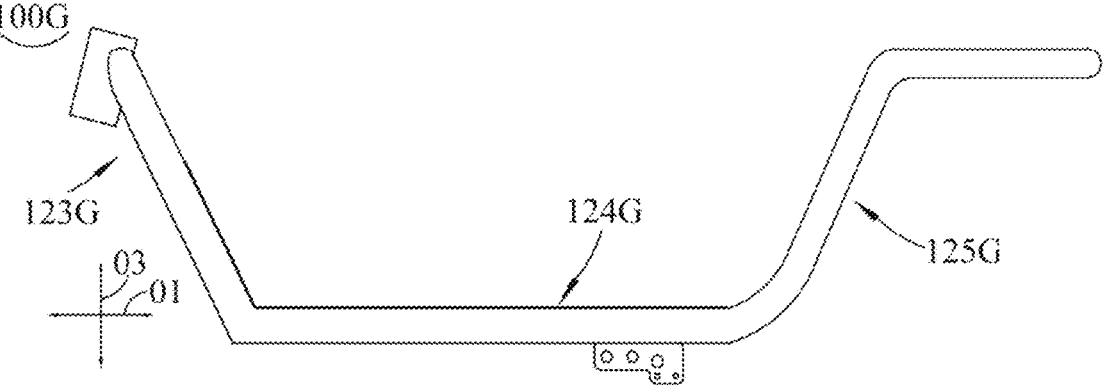
FIG. 22 is a schematic structural view of another implementation of the frame involved in an embodiment of the present application.

FIGS. 21-22 are structural schematic views of other implementations of frames, such as frame 100F and frame 100G.

Referring to FIG. 21, in some other embodiments, a vehicle may include a frame 100F. The frame 100F may include a first section 123F, a second section 124F, and a third section 125F. The first section 123F may be connected to the second section 124F, i.e., along the first direction 01, the front end of the second section 124F may be in contact with and fixed to the bottom end of the first section 123F. In addition, the second section 124F may be parallel to the first plane, and the included angle $\beta_{F1}$ between the first section 123F and the second section 124F may be in the range of 110°-121°. During riding, the second section 124F may bear vertically downward forces such as the user's weight, and the first section 123F may generate a resultant force composed of a component force along its own axis and a component force perpendicular to its own axis, which may balance the vertically downward force on the second section 124F. When $\beta_{F1} \geq 110°$, the component force of the first section 123F along its own axis may be appropriate, reducing shear or torsional stress, thereby, during travel-such as when passing over uneven road surfaces-reducing fatigue damage at the connection between the first section 123F and the second section 124F, potentially ensuring the overall strength and service life of the frame 100F. When $\beta_{F1} \leq 121°$, the first section 123F may have an appropriate length along the first direction 01, which, when bearing the vertically downward force from the second section 124F, may reduce the likelihood of downward deformation at the connection between the first section 123F and the second section 124F, helping to ensure the overall strength and service life of the frame 100F.

Specifically, Bri may be any value within the range of 110°-121°, for example, 110°, 112°, 114°, 116°, 118°, 120°, or 121°.

Referring to FIG. 22, in some other embodiments, a vehicle may include a frame 100G. The frame 100G may include a first section 123G, a second section 124G, and a third section 125G. The third section 125G may be configured to incline rearward along the first direction 01, which may provide more space for accommodating more items, or may provide more ample space for installation or for placing and retrieving items, potentially reducing operational difficulty.

Figure 23A:
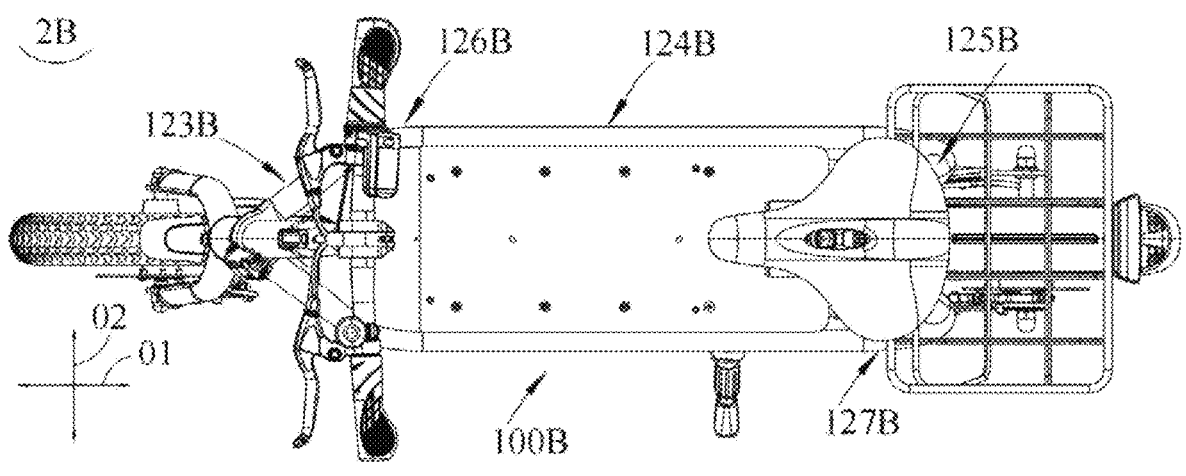
FIGS. 23A-23B are another set of overall schematic views of the vehicle according to an embodiment of the present application.
Figure 23B:
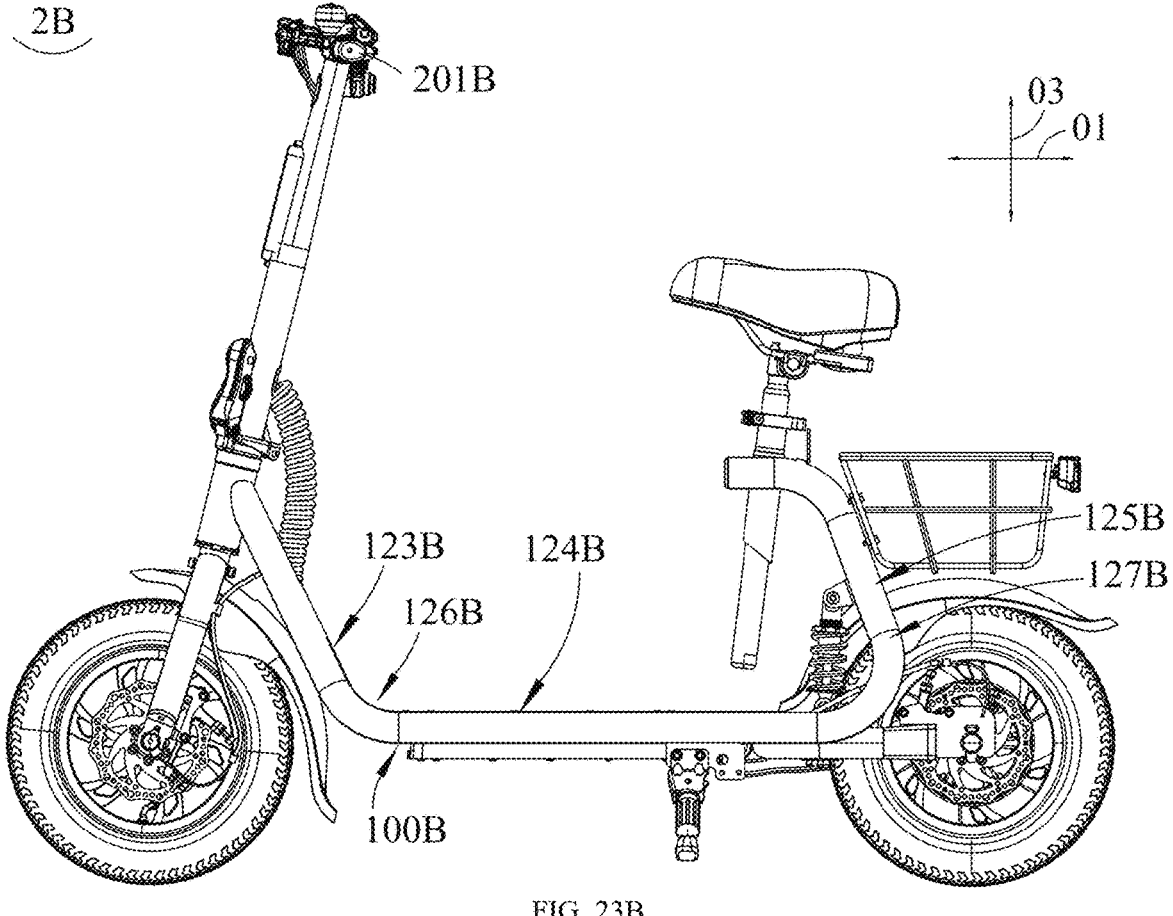

FIGS. 23A-23B are another set of overall schematic views of vehicle 2B.

Referring to FIGS. 23A-23B, in some embodiments, the frame 100B may include a first transition section 126B disposed between the first section 123B and the second section 124B, so that the transition between the first section 123B and the second section 124B may be smoother. On one hand, the provision of the first transition section 126B may reduce the risk of the user or people around vehicle 2B being injured by sharp edges; on the other hand, it may alleviate stress concentration between the first section 123B and the second section 124B, potentially improving the supporting strength of the frame 100B, thereby enhancing the reliability and service life of the frame 100B. In addition, during travel of vehicle 2B, the airflow passing over the junction between the first section 123B and the second section 124B may be smoother, potentially reducing drag on vehicle 2B.

Referring to FIGS. 23A-23B, in some embodiments, from the front end of the second section 124B to the bottom end of the first section 123B, the extension line of the first transition section 126B may be curved, so that the transition between the first section 123B and the second section 124B may be smoother and more streamlined, and the appearance may be more aesthetically pleasing.

Referring to FIG. 23B, in some embodiments, from the front end of the second section 124B to the bottom end of the first section 123B, the extension line of the first transition section 126B may be arc-shaped, making the shape of the first transition section 126B simpler and more standardized, which may facilitate manufacturing.

Referring to FIG. 23B, in some embodiments, the first transition section 126B may be tangent to both the first section 123B and the second section 124B, so that the transition between the first section 123B and the second section 124B may be smoother and may facilitate securely fixing the first transition section 126B to both the first section 123B and the second section 124B, potentially making the connection more robust.

In addition, referring to FIG. 23B, in some embodiments, the first section 123B may incline forward. From the front end of the second section 124B to the bottom end of the first section 123B, the extension direction of the first transition section 126B may gradually change forward in a regular manner, so that during travel of vehicle 2B, airflow flowing over the first transition section 126B may be smoother, and the appearance may be more aesthetically pleasing.

Referring to FIG. 23A, in some embodiments, from the front end of the second section 12B to the bottom end of the first section 123B, the width of the first transition section 126B along the second direction 02 may gradually decrease. On one hand, this may allow the width of the bottom end of the first section 123B along the second direction 02 to be relatively small, which, while meeting the need to block rainwater and dust, may reduce drag during travel of vehicle 2B. On the other hand, it may also allow the front end of the second section 124B to be relatively wide, potentially improving pedaling comfort or stability when placing items.

Referring to FIGS. 23A-23B, in some embodiments, the frame 100B may include a second transition section 127B disposed between the second section 124B and the third section 125B, so that the transition between the second section 124B and the third section 125B may be smoother. On one hand, the provision of the second transition section 127B may reduce the risk of the user or people or animals around vehicle 2B being injured by sharp edges; on the other hand, it may alleviate stress concentration between the second section 124B and the third section 125B, potentially improving the supporting strength of the frame 100B, thereby enhancing the reliability and service life of the frame 100B. In addition, during travel of vehicle 2B, the airflow passing over the junction between the second section 124B and the third section 125B may be smoother, potentially reducing drag on vehicle 2B.

Referring to FIG. 23B, in some embodiments, from the rear end of the second section 124B to the bottom end of the third section 125B, the extension line of the second transition section 127B may be curved, so that the transition between the second section 124B and the third section 125B may be smoother and more streamlined, and the appearance may be more aesthetically pleasing.

Referring to FIG. 23B, in some embodiments, from the rear end of the second section 124B to the bottom end of the third section 125B, the extension line of the second transition section 127B may be arc-shaped, making the shape of the second transition section 127B simpler and more standardized, which may facilitate manufacturing.

Referring to FIG. 23B, in some embodiments, the second transition section 127B may be tangent to both the second section 124B and the third section 125B, so that the transition between the second section 124B and the third section 125B may be smoother and may facilitate securely fixing both ends of the second transition section 127B to the second section 124B and the third section 125B, potentially making the connection more robust.

Referring to FIG. 23B, in addition, along the first direction 01, the bottom end of the third section 125B may be located at the rear side of the second section 124B, and the corresponding central angle of the second transition section 127B may be greater than or equal to 180°, potentially reducing the risk of bending deformation of the second transition section 127B.

Referring to FIG. 23A, in some embodiments, from the rear end of the second section 124B to the bottom end of the third section 125B, the width of the second transition section 127B along the second direction 02 may gradually decrease. On one hand, this may allow the width of the bottom end of the third section 125B along the second direction 02 to be relatively small, potentially enabling a compact design. On the other hand, it may also allow the rear end of the second section 124B to be relatively wide, potentially improving pedaling comfort or stability when placing items.

Referring to FIG. 21, in some other embodiments, the third section 125F of the frame 100F may be connected to the second section 124F, i.e., along the first direction 01, the rear end of the second section 124F may be in contact with and fixed to the bottom end of the third section 125F.

Figure 24A:
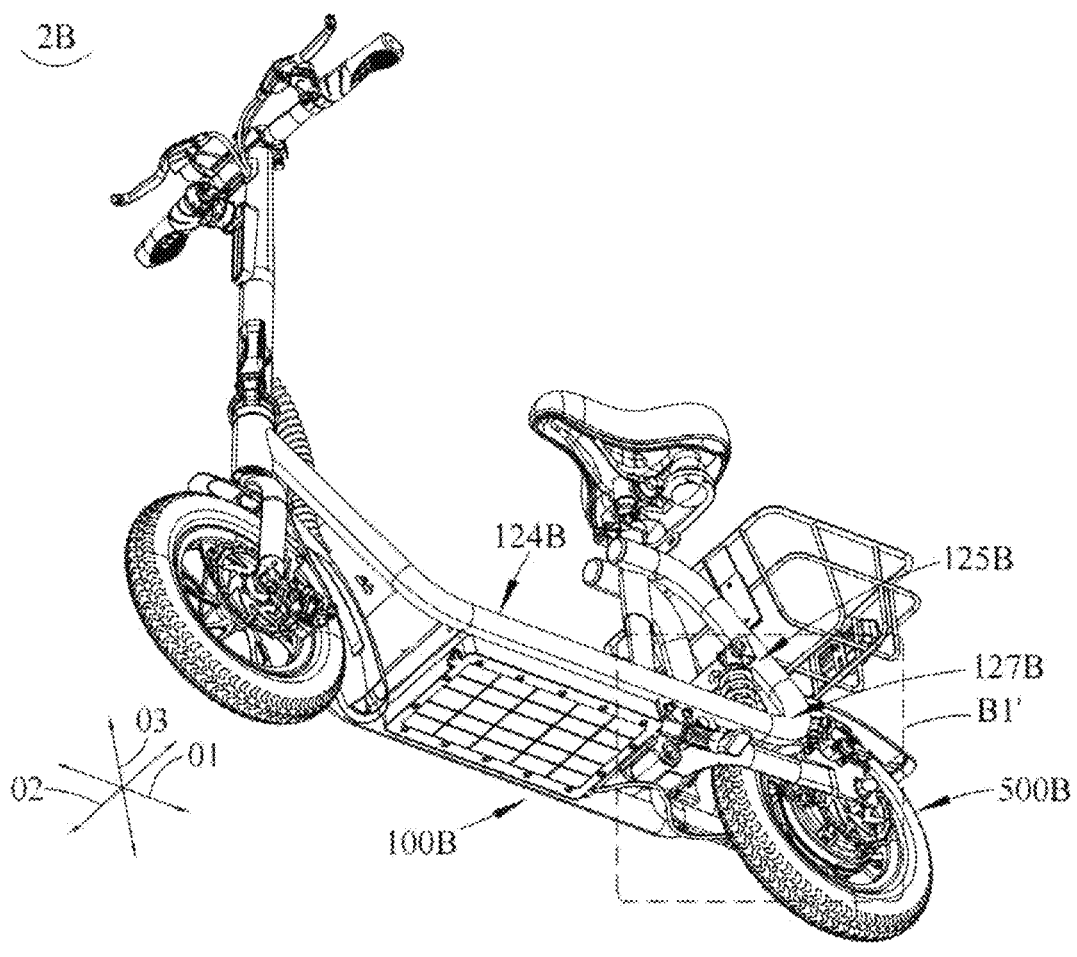
FIGS. 24A-24C are a set of schematic views illustrating the installation details of the spring shock absorber.
Figure 24B:
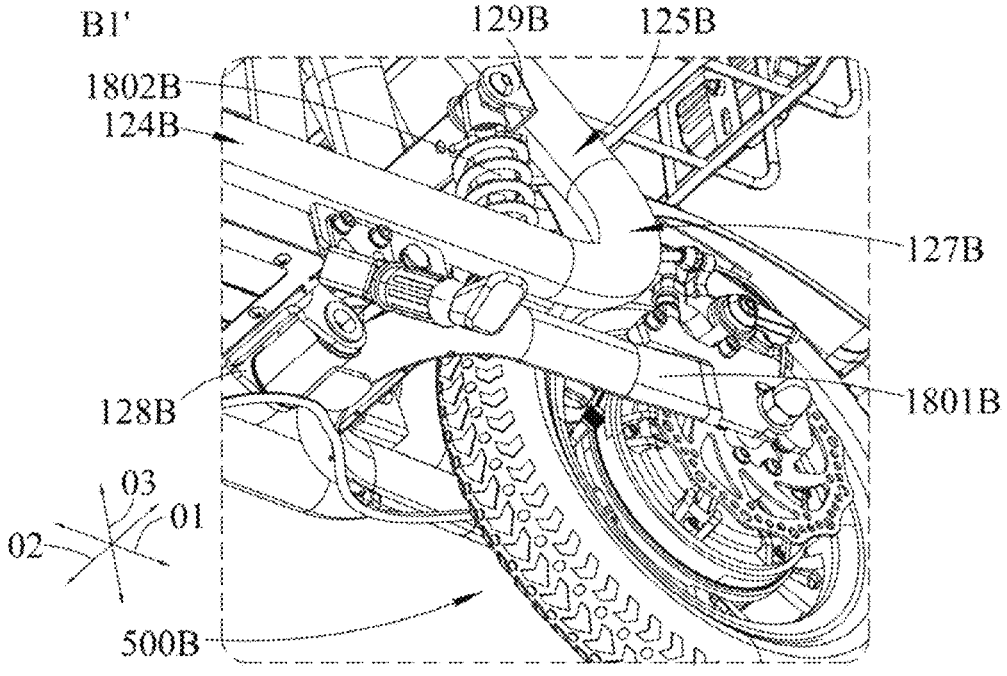
Figure 24C:
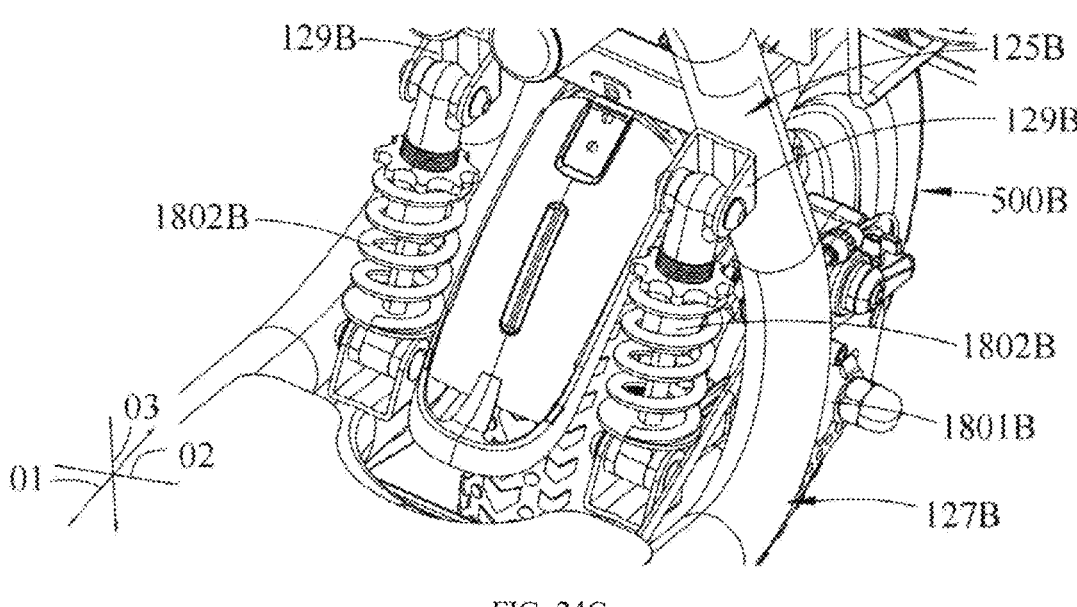

FIGS. 24A-24C are a set of schematic views illustrating the installation details of the spring shock absorber 1802B, where FIG. 24B is an enlarged view of region B1' in FIG. 24A, and FIG. 24C shows the installation state of the spring shock absorbers 1802B from another direction.

Referring to FIGS. 24A-24B, in some embodiments, the vehicle 2B may include a rear fork 1801B and two spring shock absorbers 1802B sequentially arranged along the second direction 02. The frame 100B may include a first connecting portion 128B and a second connecting portion 129B, the first connecting portion 128B may be fixed to the second section 124B, and the second connecting portion 129B may be fixed to the third section 125B. Along the first direction 01, the front end of the rear fork 1801B may be rotatably connected to the first connecting portion 128B, and the rear end of the rear fork 1801B may be configured to mount the rear wheel 500B. Two ends of each spring shock absorber 1802B may be pivotally connected to the rear fork 1801B and the second connecting portion 129B, respectively. When the vehicle 2B is traveling, the two spring shock absorbers 1802B may primarily serve to absorb vibrations and impacts encountered during riding, thereby potentially improving riding comfort and stability, and may also help extend the service life of the vehicle 2B.

Referring to FIG. 24C, it may be understood that, along the first direction 01, the spring shock absorbers 1802B may be located at the front side of the third section 125B; along the third direction, the spring shock absorbers 1802B may be on the top side of the second transition section 127B and on the bottom side of the third section 125B. The third section 125B may be inclined forward and may tend to tilt forward under an external force. The spring shock absorbers 1802B may prevent such tilting tendency of the third section 125B and provide a cushioning effect. In some embodiments, when the third section 125B is subjected to an external force, a moment amplification effect may occur between it and the second transition section 127B. At this time, the spring shock absorbers 1802B may mitigate the impact at the junction of the second transition section 127B and the third section 125B. The spring shock absorbers 1802B may convert the impact energy into elastic potential energy through their own deformation, reduce instantaneous peak stress caused by rigid connections, and reduce damage to the second transition section 127B and the third section 125B. Referring to FIG. 24A, this may help extend the service life of the frame 100B and the vehicle 2B.

Figure 25A:
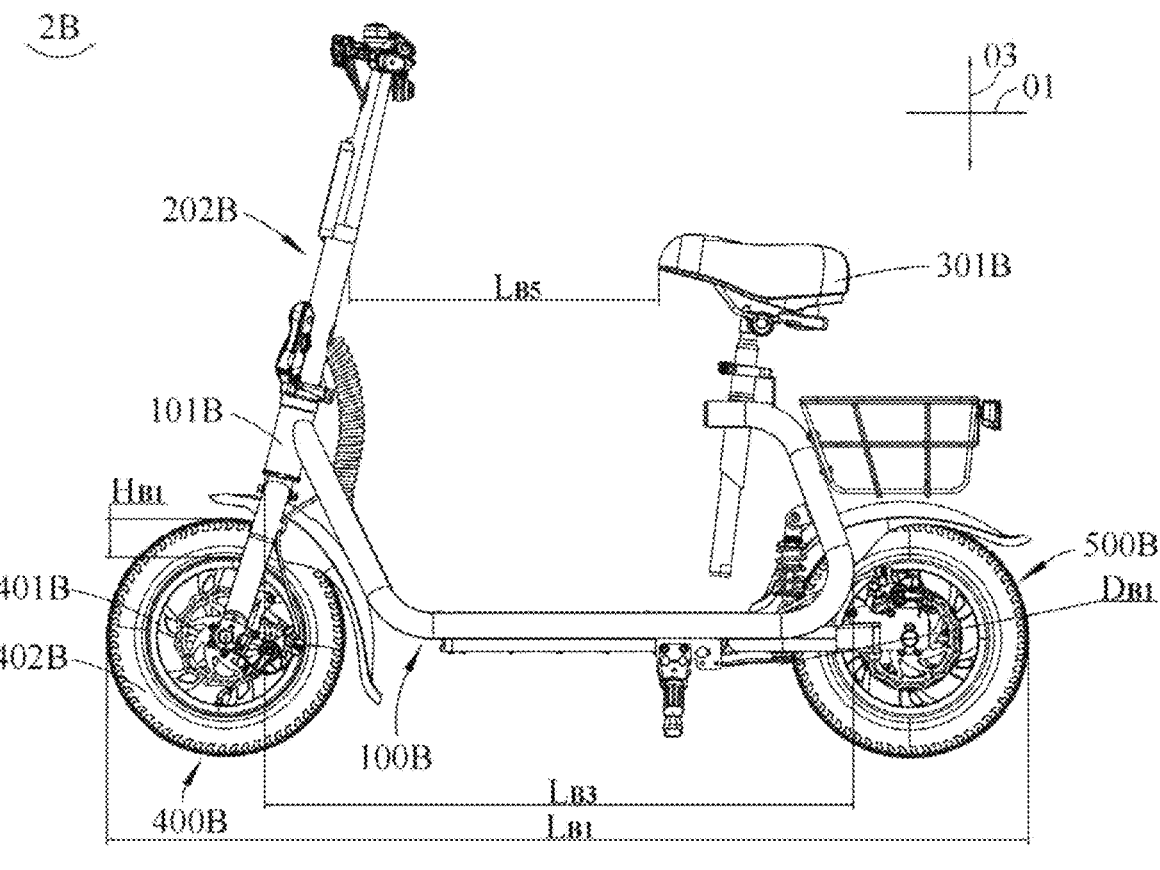
FIGS. 25A-25B are a set of schematic parameter views of the vehicle according to an embodiment of the present application.
Figure 25B:
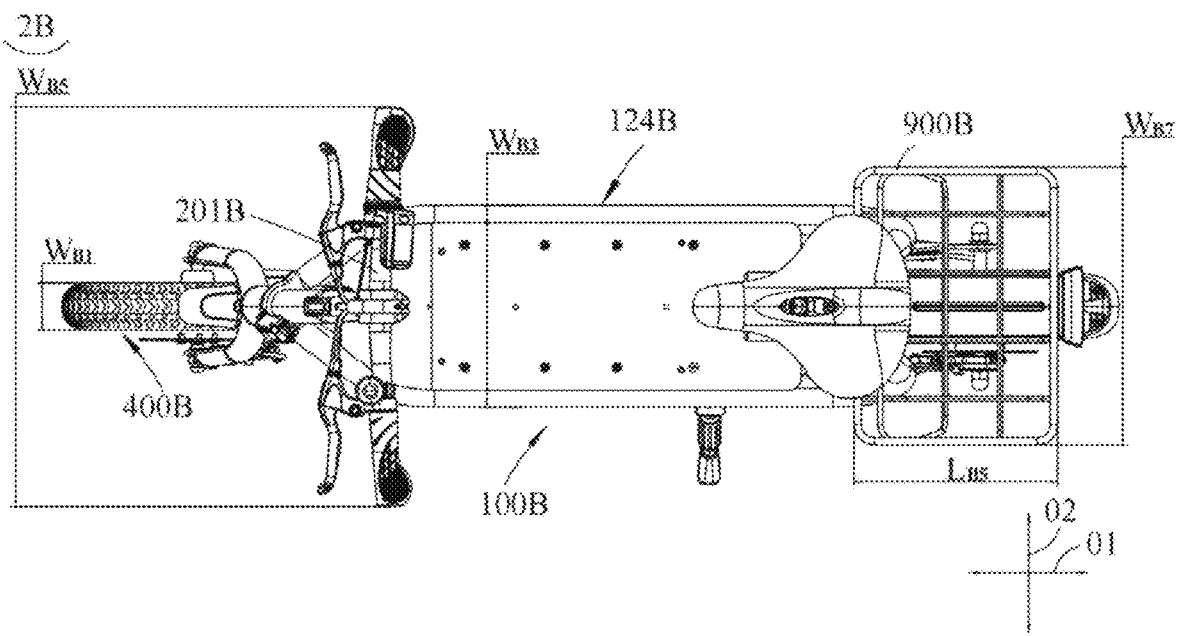

FIGS. 25A-25B are a set of schematic parameter views of the vehicle 2B.

Referring to FIG. 25A, in some embodiments, the distance $L_{B1}$ between the front end of the front wheel 400B and the rear end of the rear wheel 500B along the first direction 01 may fall within the range of 950 mm to 1400 mm. When $L_{B1} \geq 950$ mm, the length of the vehicle 2B along the first direction 01 may be suitable to provide sufficient activity space or cargo space, enabling flexibility in movement or carrying loads and optimizing user experience. When $L_{B1} \leq 1400$ mm, the length of the vehicle 2B along the first direction 01 may be suitable to achieve a compact design.

Specifically, $L_{B1}$ may be any value within the range of 950 mm to 1400 mm, such as 950 mm, 1100 mm, 1175 mm, 1250 mm, or 1400 mm.

Referring to FIG. 25A, in some embodiments, the outer diameters $D_{B1}$ of the front wheel 400B and the rear wheel 500B may both fall within the range of 280 mm to 340 mm. On the one hand, this may help achieve a compact design of the vehicle 2B; on the other hand, it may lower the center of gravity of the frame 100B, thereby improving the stability of the vehicle 2B and enhancing riding safety.

Specifically, $D_{B1}$ may be any value within the range of 280 mm to 340 mm, such as 280 mm, 285 mm, 290 mm, 295 mm, 300 mm, 305 mm, 310 mm, 315 mm, 320 mm, 325 mm, 330 mm, 335 mm, or 340 mm.

Referring to FIG. 25B, in some embodiments, the width $W_{B1}$ of the front wheel 400B and the rear wheel 500B along the second direction 02 may fall within the range of 45 mm to 70 mm. When $W_{B1} \geq 45$ mm, greater traction may be provided to meet vehicle stability requirements and improve riding safety. When $W_{B1} \leq 70$ mm, the friction between the front and rear wheels and the ground may be relatively low, and due to the smaller contact area, good passability may be ensured, for example, on loose terrains such as muddy or sandy ground.

Specifically, $W_{B1}$ may be any value within the range of 45 mm to 70 mm, such as 45 mm, 47 mm, 50 mm, 52 mm, 54 mm, 56 mm, 58 mm, 60 mm, 62 mm, 64 mm, or 70 mm.

Referring to FIG. 25A, in some embodiments, the front wheel 400B may include a front rim 401B and a front tire 402B. Along the third direction 03, the distance between the front rim 401B and the tread of the front tire 402B may be $H_{B1}$. In combination with FIG. 25B, $K_{B1}=H_{B1}/W_{B1} \times 100$, and $K_{B1}$ may fall within the range of 75 to 95. The front wheel 400B may, while providing good maneuverability, also balance wear resistance, and the front tire 402B may be relatively flat, which may facilitate a compact design.

Specifically, $K_{B1}$ may be any value within the range of 75 to 95, such as 70, 74, 78, 82, 86, 90, 94 or 95.

In some embodiments, the vehicle 2B may include a storage mechanism, and $K_{B1}$ within 30 to 60 may be suitable for providing better shock absorption when the storage mechanism carries heavy loads (e.g., pets or cargo), potentially making riding smoother; in addition, a narrower tread may help reduce rolling resistance and maintain agile handling.

Referring to FIG. 25A, in some embodiments, the front wheel 400B and the rear wheel 500B may have the same shape and size, which may make the vehicle 2B more aesthetically coordinated.

It may be understood that, in other embodiments, the outer diameters of the front wheel 400B and the rear wheel 500B may be different.

Referring to FIG. 25A, in some embodiments, the length $L_{B3}$ of the frame 100B along the first direction 01 may be defined as the distance between the front end of the head tube 101B and the rear end of the second transition section 127B. $L_{B3}$ may fall within the range of 700 mm to 880 mm. When $L_{B3} \geq 700$ mm, the frame 100B may provide sufficient space for user activity or cargo. When $L_{B3} \leq 880$ mm, the frame 100B may be relatively compact, which may facilitate a compact and lightweight design of the vehicle 2B.

Specifically, $L_{B3}$ may be any value within the range of 700 mm to 880 mm, such as 700 mm, 710 mm, 780 mm, 790 mm, 800 mm, or 880 mm.

Referring to FIG. 25A, in some embodiments, the ratio $K_{B3}$ of $L_{B3}$ to $L_{B1}$ may fall within the range of 0.5 to 0.8, which may enable the frame 100B to provide stable support while remaining relatively compact, potentially facilitating a compact and lightweight design of the vehicle 2B.

Specifically, $K_{B3}$ may be any value within the range of 0.5 to 0.8, such as 0.5, 0.55, 0.6, 0.65, 0.7, 0.75, or 0.8.

Referring to FIG. 25B, in some embodiments, the width $W_{B3}$ of the frame 100B along the second direction 02 may fall within the range of 210 mm to 230 mm. When $W_{B3} \geq 210$ mm, the supporting surface provided by the frame 100B may be suitable for enhancing stability, for example, when carrying heavier loads or traveling on bumpy roads. When $W_{B3} \leq 230$ mm, the width of the frame 100B may be suitable for reducing the overall weight of the vehicle 2B, facilitating a compact and lightweight design, and potentially reducing packaging space during shipment.

Specifically, $W_{B3}$ may be any value within the range of 210 mm to 230 mm, such as 210 mm, 215 mm, 220 mm, 225 mm, or 230 mm.

Referring to FIG. 25B, in some embodiments, the width $W_{B3}$ of the frame 100B along the second direction 02 may be equal to the width of the second section 124B. The width of the second section 124B may fall within the range of 210 mm to 230 mm. When the second section 124B is used for foot placement, it may provide ample space for users to rest both feet, potentially enhancing stability and comfort. When the second section 124B is used to hold items, it may provide a larger storage surface, potentially increasing contact area and improving stability of items placed on it. When the second section 124B is used to accommodate animals, it may provide more seating space, potentially improving stability and comfort for the animals.

Referring to FIG. 25B, in some embodiments, the ratio $K_{B2}$ of $L_{B3}$ to $W_{B3}$ may fall within the range of 2.8 to 3.8, where $L_{B3}$ is the length of the frame 100B along the first direction 01 and $W_{B3}$ is the width of the frame 100B along the second direction 02. When $K_{B2} \geq 2.8$, the frame 100B may have a suitable width to achieve a compact and light-weight design, and may also provide a better visual length-to-width proportion. When $K_{B2} \leq 3.8$, the frame 100B may have a suitable width to offer more foot space or cargo space, potentially improving riding comfort and safety.

Specifically, $K_{B2}$ may be any value within the range of 2.8 to 3.8, such as 2.8, 2.9, 3.0, 3.1, 3.2, 3.3, 3.4, 3.5, 3.6, 3.7, or 3.8.

Referring to FIG. 25B, in some embodiments, the width WBs of the handlebar 201B along the second direction 02 may fall within the range of 480 mm to 600 mm, which may also be understood as the distance between the left and right sides of the handlebar 201B. On one hand, this may allow users to extend their arms comfortably when operating the handlebar 201B. On the other hand, it may be suitable for a compact design of the vehicle 2B, enabling good passability in narrow spaces such as alleys or crowded parking areas.

Specifically, WBs may be any value within the range of 480 mm to 600 mm, such as 475 mm, 495 mm, 515 mm, 535 mm, 555 mm, 575 mm, or 600 mm.

Referring to FIG. 25B, in some embodiments, the length $L_{B5}$ of the rear basket 900B along the first direction 01 may fall within the range of 230 mm to 250 mm, and the width $W_{B7}$ along the second direction 02 may fall within the range of 320 mm to 340 mm. When $L_{B5} \geq 230$ mm and $W_{B7} \geq 320$ mm, the rear basket 900B may have a relatively large cross section perpendicular to the third direction 03, which may be convenient for placing items. When $L_{B5} \leq 250$ mm and $W_{B7} \leq 340$ mm, the rear basket 900B may not excessively increase the overall length and width of the vehicle 2B, thereby reducing situations in which the passability of the vehicle 2B is hindered due to the length and width of the rear basket 900B.

Specifically, $L_{B5}$ may be any value within the range of 230 mm to 250 mm, such as 230 mm, 235 mm, 240 mm, 245 mm, or 250 mm; $W_{B7}$ may be any value within the range of 320 mm to 340 mm, such as 320 mm, 325 mm, 330 mm, 335 mm, or 340 mm.

Referring to FIG. 25A, in some embodiments, along the third direction 03, when the highest point of the seat 301B is substantially flush with the midsection or central area of the stem 202B, the distance $L_{B7}$ between the seat 301B and the stem 202B along the first direction 01 may fall within the range of 314 mm to 515 mm. When $L_{B7} \geq 314$ mm, sufficient operating space may be provided for the user, for example, during mounting or dismounting the vehicle. When $L_{B7} \leq 515$ mm, the arrangement may be suitable for a compact design of the vehicle 2B.

Specifically, $L_{B7}$ may be any value within the range of 314 mm to 515 mm, such as 314 mm, 374 mm, 394 mm, 414 mm, 434 mm, 454 mm, or 515 mm.

Figure 26A:
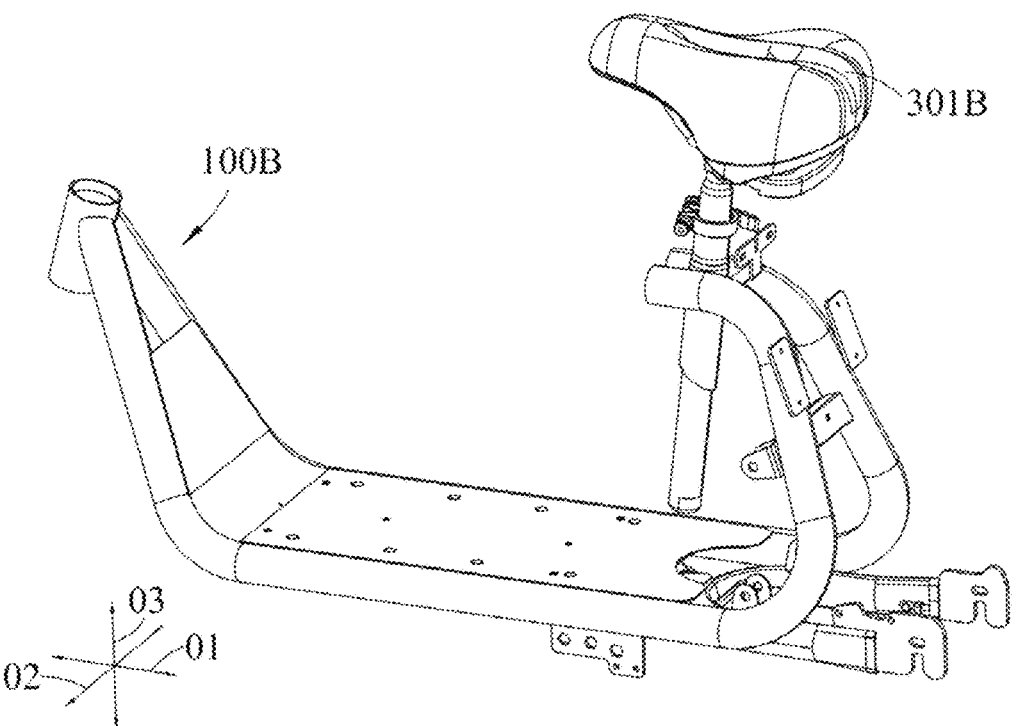
FIGS. 26A-26C are a set of schematic views illustrating the use of the seat according to an embodiment of the present application.
Figure 26B:
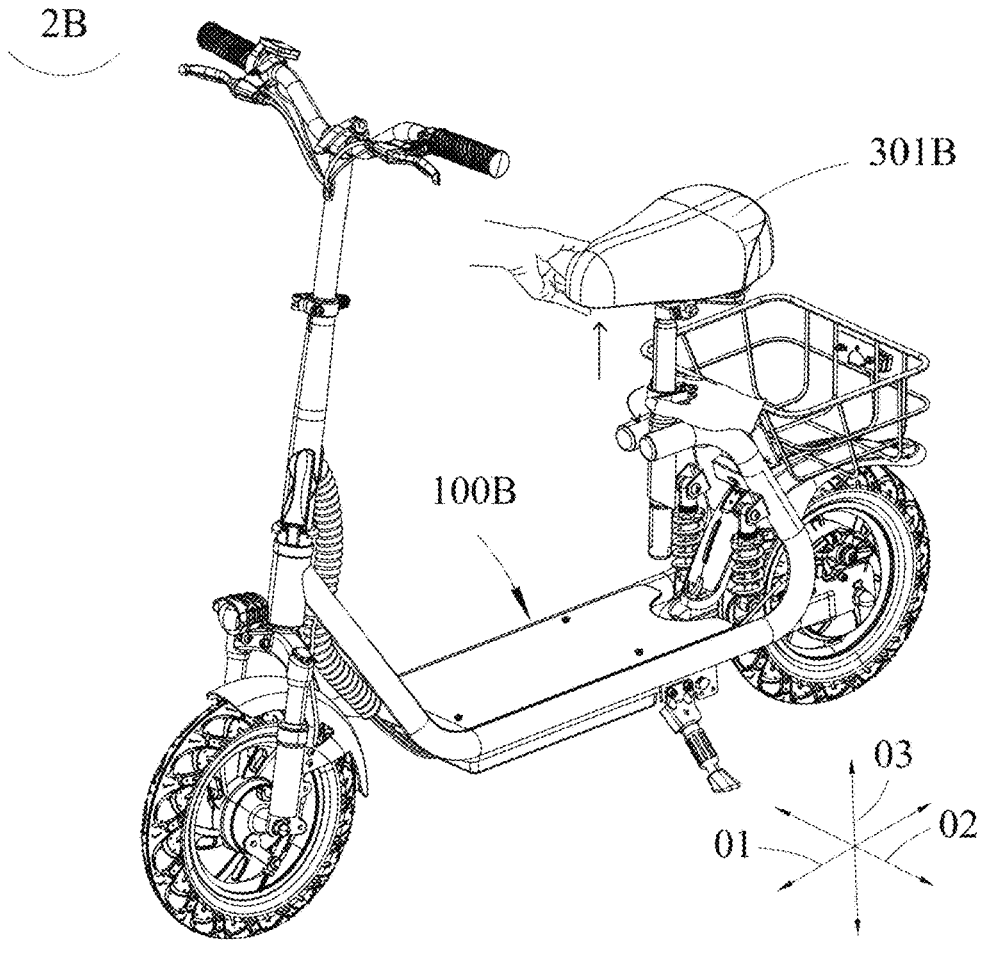
Figure 26C:
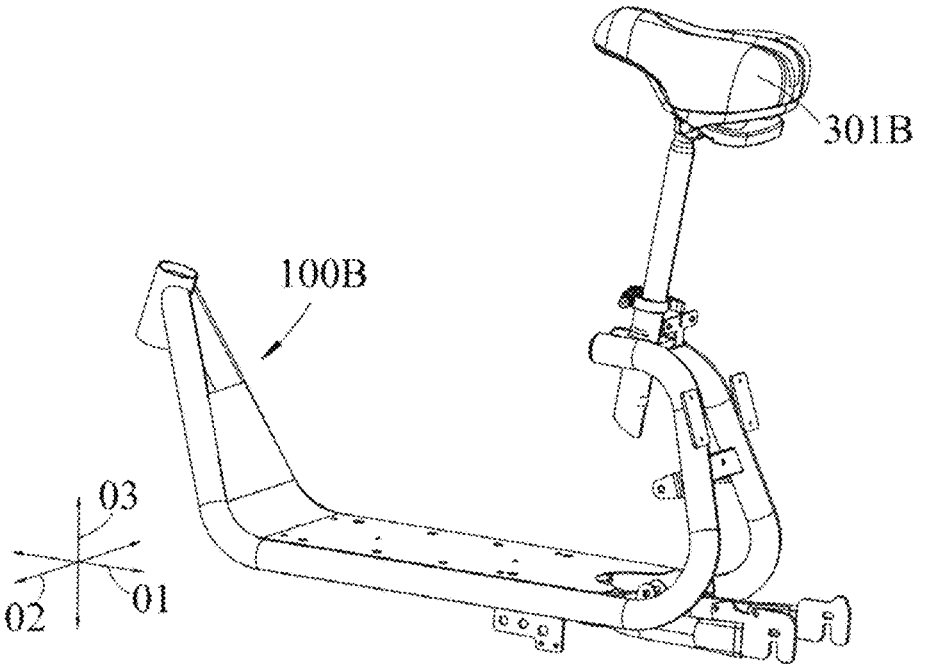

FIGS. 26A-26C are a set of schematic views illustrating the use of the seat in some embodiments, wherein FIG. 26A shows the seat 301B in a lower height position, FIG. 26B is a height adjustment view of the seat 301B, and FIG. 26C shows the seat 301B in a higher height position.

Referring to FIG. 26B, in some embodiments, the height of the seat 301B may be adjustable to meet different users' height requirements. In this embodiment, the height of the seat 301B is adjustable in that the user may adjust it before riding as needed.

In addition, the adjustability of the seat height may allow, during storage or transportation, for adjusting the height of the seat 301B to reduce the space occupied by the vehicle 2B, thereby facilitating transport and storage. When the available transportation space is fixed, the number of vehicles 2B transported may be increased by adjusting the occupied space; when the number of vehicles 2B is fixed, the required transportation space may be reduced, making it easier for transportation equipment to move. Similarly, when storage space is fixed, more vehicles 2B may be stored; when the number of stored vehicles 2B is fixed, storage space may be reduced.

In some embodiments, the adjustment stroke of the seat 301B may fall within the range of 150 mm to 350 mm, meeting the adjustment needs of most people while reducing wasted stroke. "Wasted stroke" refers to a situation where, if the adjustment range is large, but most people only need to use a small segment of it, the remaining range is left in an idle or unused state.

Specifically, the adjustment stroke of the seat 301B may be any value within the range of 150 mm to 300 mm, such as 150 mm, 160 mm, 170 mm, 180 mm, 190 mm, 200 mm, 210 mm, 220 mm, 230 mm, 240 mm, 250 mm, 260 mm, 270 mm, 280 mm, 290 mm, or 300 mm.

Figure 27A:
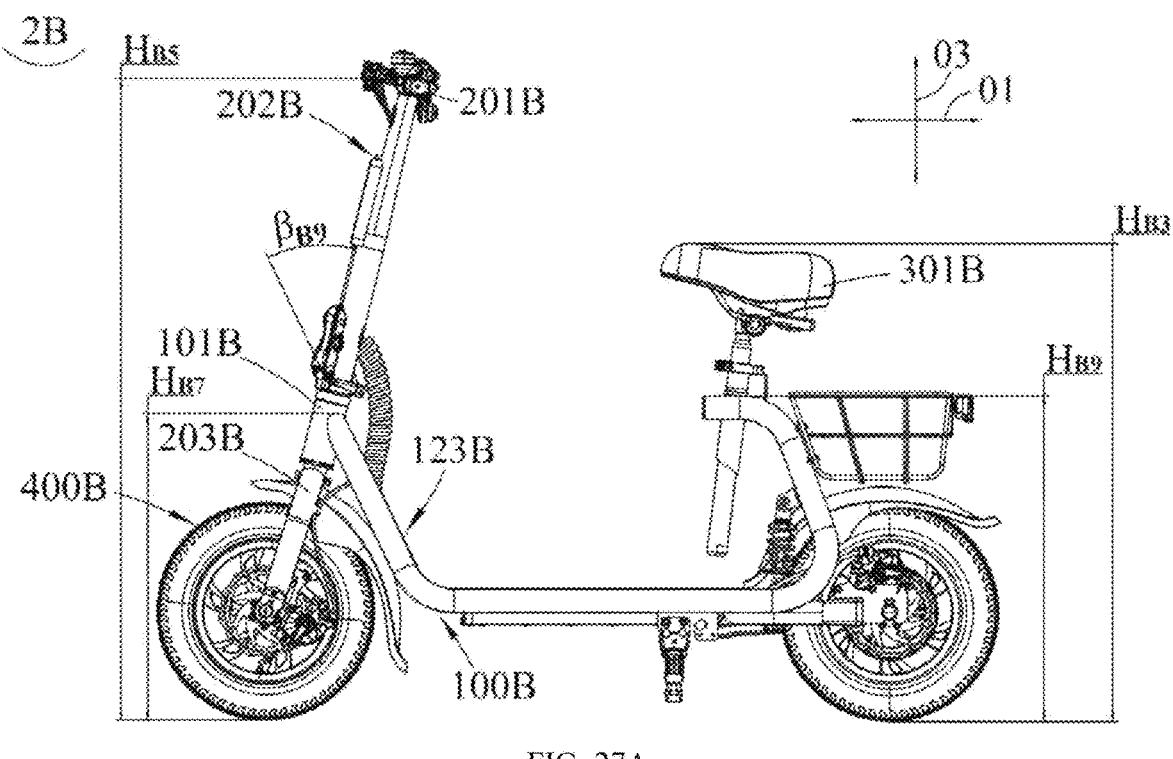
FIGS. 27A-27B are another set of schematic parameter views of the vehicle.
Figure 27B:
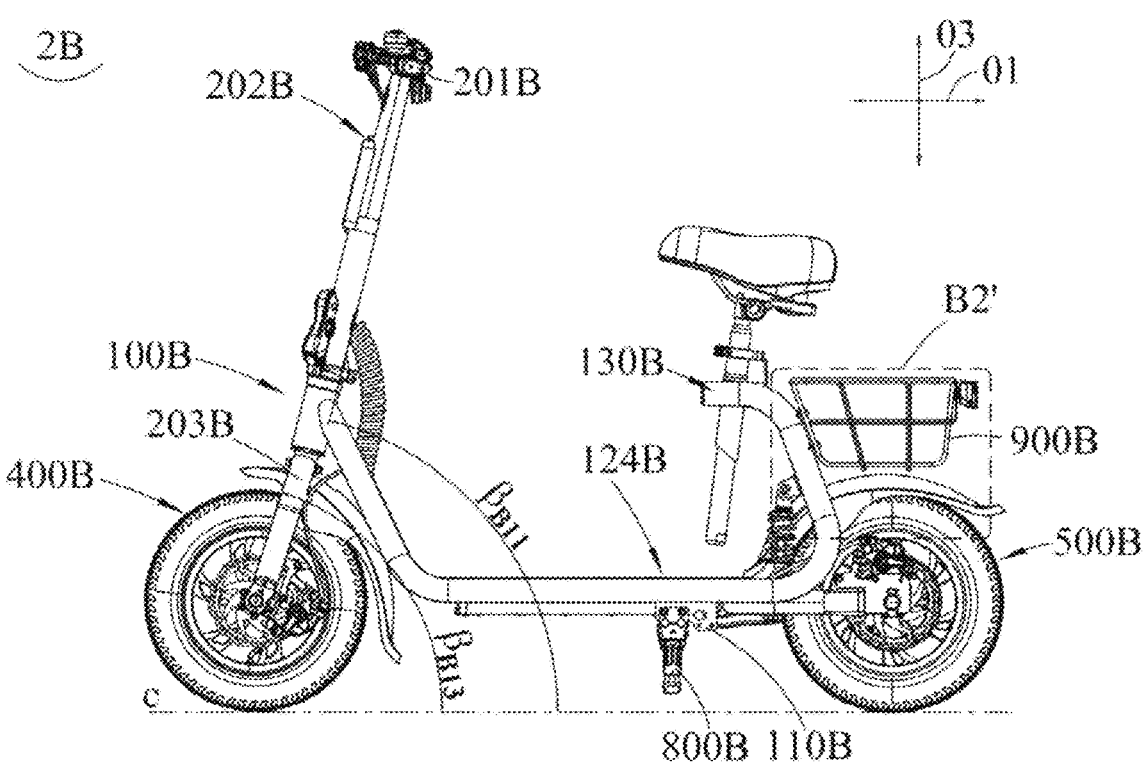

FIGS. 27A-27B are another set of schematic parameter views of the vehicle 2B.

It may be noted that, referring to FIG. 27A, the height $H_{B3}$ of the seat 301B may refer to the height of a plane parallel to the first plane and tangent to the highest point of the seat 301B.

Referring to FIG. 27A, in some embodiments, along the third direction 03, the height from the ground HBs of the handlebar 201B may fall within the range of 850 mm-1050 mm. When HBs 850 mm, it may be adapted to the height of the seat 301B, facilitating user operation. In addition, when $H_{B5}$-1050 mm, it may be suitable for the miniaturized design of the vehicle 2B.

Specifically, HBs may be any value within the 850 mm-1050 mm range, for example, 850 mm, 890 mm, 930 mm, 970 mm, 1010 mm, or 1050 mm.

Referring to FIG. 27A, in some embodiments, along the third direction 03, the height from the ground of the first section 123B is $H_{B7}$, and the height from the ground of the handlebar 201B is HBs. The ratio KBs of $H_{B7}$ to HBs may fall within the range of 0.45-0.55. When $K_{B5} \geq 0.45$, the height difference between the handlebar 201B and the head tube 101B is suitable, reducing the possibility of shaking or swinging when operating the handlebar 201B for directional control; this is expected to provide a good operating experience, that is, a suitable height difference between the handlebar 201B and the head tube 101B is expected to improve operational precision. When $K_{B5} \leq 0.55$, the height difference between the handlebar 201B and the head tube 101B is suitable, and the length and height of the first section 123B that adapts to the head tube 101B are appropriate, which is expected to reduce material costs.

Specifically, KBs may be any value within the 0.45-0.55 range, for example, 0.45, 0.46, 0.47, 0.48, 0.49, 0.5, 0.51, 0.52, 0.53, 0.54, or 0.55.

Referring to FIG. 27A, in some embodiments, the seat 301B may be fixedly disposed on the frame 100B. It is to be understood that the smaller the height difference between the seat 301B and the frame 100B, the higher the stability of the seat 301B may be. In some embodiments, the difference between the maximum height $H_{B3max}$ of the seat 301B and the height $H_{B9}$ of the connection position between the seat 301B and the frame 100B may be less than or equal to 300 mm, which may provide the seat 301B with high stability, thus providing the vehicle 2B with high stability.

Referring to FIG. 27A, in some embodiments, the difference between the minimum height $H_{B3}$ min of the seat 301B and the height $H_{B9}$ of the connection position between the seat 301B and the frame 100B may be greater than or equal to 100 mm. It is to be understood that, for a given height of the seat 301B, the smaller the height difference between the seat 301B and the frame 100B, the higher the center of gravity of the frame 100B may be, leading to an increase in the height of the frame 100B along the third direction 03. An increase in the height of the center of gravity of the frame 100B may lead to an increase in the center of gravity of the vehicle 2B, which may reduce the stability of the vehicle 2B.

Referring to FIG. 27A, in some embodiments, the frame 100B may include a head tube 101B fixed at the front end. Along the first direction 01, the head tube 101B may be located on the front side of the first section 123B and may be located on the top side of the first section 123B. The head tube 101B may be configured to, along the first direction 01, define an inner region on the inner side and an outer region on the outer side, wherein the inner region may be located at the front of the outer region. The inner region may be the internal space of the head tube 101B itself, and the inner region may allow the bottom end of the stem 202B and the top end of the front fork 203B to pass through, or in other words, the inner region may provide an installation space for the bottom end of the stem 202B and the top end of the front fork 203B. The outer region may provide a connection position for at least the first section 123B.

Referring to FIG. 27A, in some embodiments, the head tube 101B may be configured to be inclined backward along the first direction 01. The stem 20B that adapts to the head tube 101B may be inclined backward, reducing the height of the stem 202B along the third direction 03, that is, reducing its height from the ground, which may be beneficial for the miniaturized design of the vehicle 2B. In addition, the top end of the front fork 203B that adapts to the head tube 101B may be inclined backward, and the position of the front wheel 400B that adapts to the front end of the front fork 203B may be moved forward, which is expected to provide a more stable supporting effect.

Referring to FIG. 27A, in some embodiments, the head tube 101B may be configured to be inclined backward along the first direction 01, the first section 123B may be configured to be inclined forward along the first direction 01, and the angle $\beta_{B9}$ between the head tube 101B and the first section 123B may fall within the range of 35°–45°. When $\beta_{B9} \geq 35°$, it helps to form a suitable trail distance, reducing the degree of shaking during travel, and is expected to reduce the difficulty for the user to operate the handlebar 201B. When $\beta_{B9} \leq 45°$, the front fork 203B that adapts to the head tube 101B has a suitable degree of backward inclination, the projected length of the front fork 203B on the first plane is relatively appropriate, and as a part of the vehicle 2B, the length of the front fork 203B is relatively compact, which is expected to make the vehicle 2B also relatively compact, contributing to a miniaturized design.

Specifically, $\beta_{B9}$ may be any value within the 35°–45° range, for example, 35°, 37°, 39°, 41°, 43°, or 45°.

Referring to FIG. 27A, in some embodiments, the head tube 101B may be approximately cylindrical, and its thickness may fall within the range of 1.5 mm-2.5 mm. When the thickness is greater than or equal to 1.5 mm, the head tube 101B has good structural strength, reducing the chance of bending or deformation when the road surface is relatively bumpy causing a large impact, or when the user is heavier and/or the carried items are heavier. When the thickness is less than or equal to 2.5 mm, the self-weight of the head tube 101B is small, which is expected to reduce material costs.

Specifically, the thickness of the head tube 101B may be any value within the 1.5 mm-2.5 mm range, for example, 1.5 mm, 1.6 mm, 1.7 mm, 1.8 mm, 1.9 mm, 2.0 mm, 2.1 mm, 2.2 mm, 2.3 mm, 2.4 mm, or 2.5 mm.

Referring to FIG. 27B, in some embodiments, the angle $\beta_{B11}$ between the stem 202B and the first direction 01, and the angle $\beta_{B13}$ between the front fork 203B and the first direction 01, may be the same or different. The absolute value of the difference between $\beta_{B11}$ and $\beta_{B13}$ may fall within the range of 0°-5°, which is expected to provide high steering operation accuracy.

Specifically, the angular difference between $\beta_{B11}$ and $\beta_{B13}$ may be any value within the 0°-5° range, for example, 0°, 0.5°, 1°, 1.5°, 2°, 2.5°, 3°, 3.5°, 4°, 4.5°, or 5°.

Referring to FIG. 27B, in some embodiments, the frame 100B may include a first weld tab 110B fixedly disposed near the rear end. The first weld tab 110B may be configured to be fixedly connected with the kickstand 800B.

In some embodiments, the first weld tab 110B may be perpendicular to the second section 124B. When the kickstand 800B is deployed, that is, when the vehicle 2B is in a parked state, the first weld tab 110B may more efficiently convert the thrust from the kickstand 800B into an axial force and transmit it to the second section 124B.

Based on this, referring to FIG. 27B, the front wheel 400B, stem 202B, front fork 203B, rear basket 900B, rear wheel 500B, and kickstand 800B, may all be directly or indirectly connected to the frame 100B, which may allow the various structures of the vehicle 2B to remain relatively fixed or fixed in relative position.

Figure 28:
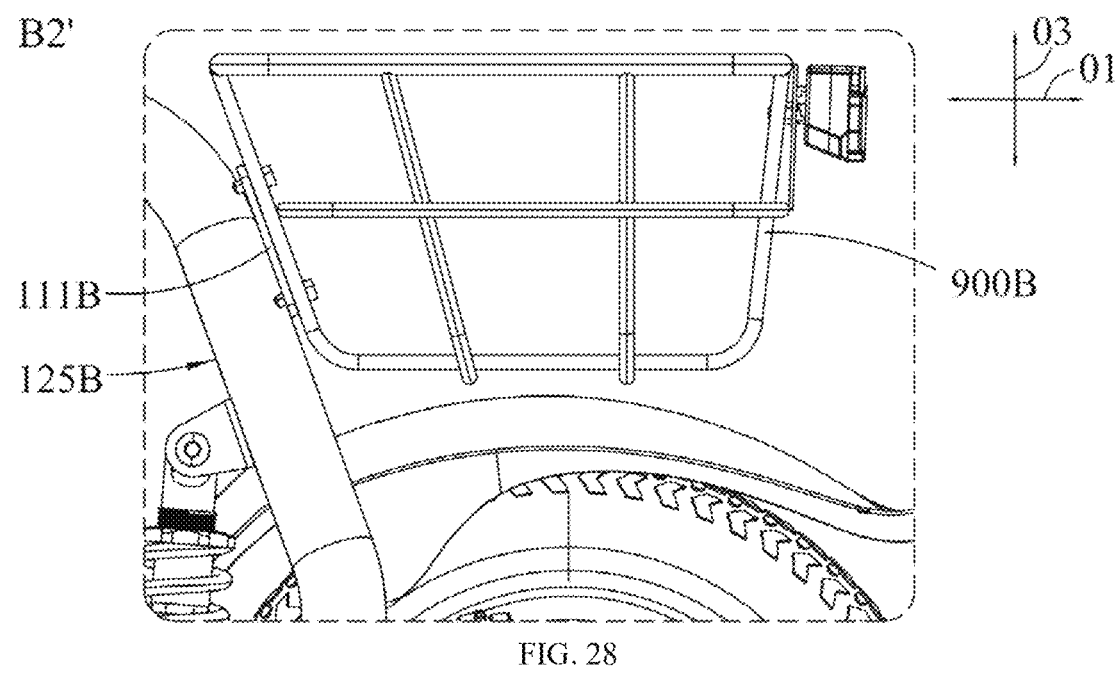
FIG. 28 is an enlarged schematic view of portion B2' in FIG. 27B.

FIG. 28 is an enlarged schematic view of the B2' position in FIG. 27B, showing the structural details of the second weld tab 111B.

Referring to FIG. 28, in some embodiments, the frame 100B may include a second weld tab 111B fixed at the rear end. The second weld tab 111B may be configured to, along the first direction 01, define a front region on the front side and a rear region on the rear side. The front region may be used to connect the third section 125B, and the rear region may be used to install the rear basket 900B.

Referring to FIG. 28, in some embodiments, the second weld tab 111B may be fixed on the third section 125B. The third section 125B may be configured to be inclined forward along the first direction 01, and the second weld tab 111B may be configured to be inclined forward along the first direction 01. The angle between the second weld tab 111B and the third section 125B may fall within the range of 0°-5°. When the angle is less than or equal to 5°, it is expected that the second weld tab 111B and the third section 125B will have a larger connection area, which helps to improve the connection stability of the second weld tab 111B. For example, when the rear basket 900B has a heavy load or on bumpy roads, it is expected to reduce the probability of the connection between the second weld tab 111B and the third section 125B breaking or loosening, which may help to improve the service life and ensure riding safety.

Specifically, the angle between the second weld tab 111B and the third section 125B may be any value within the 0°-5° range, for example, 0°, 1°, 2°, 3°, 4°, or 5°.

Figure 29:
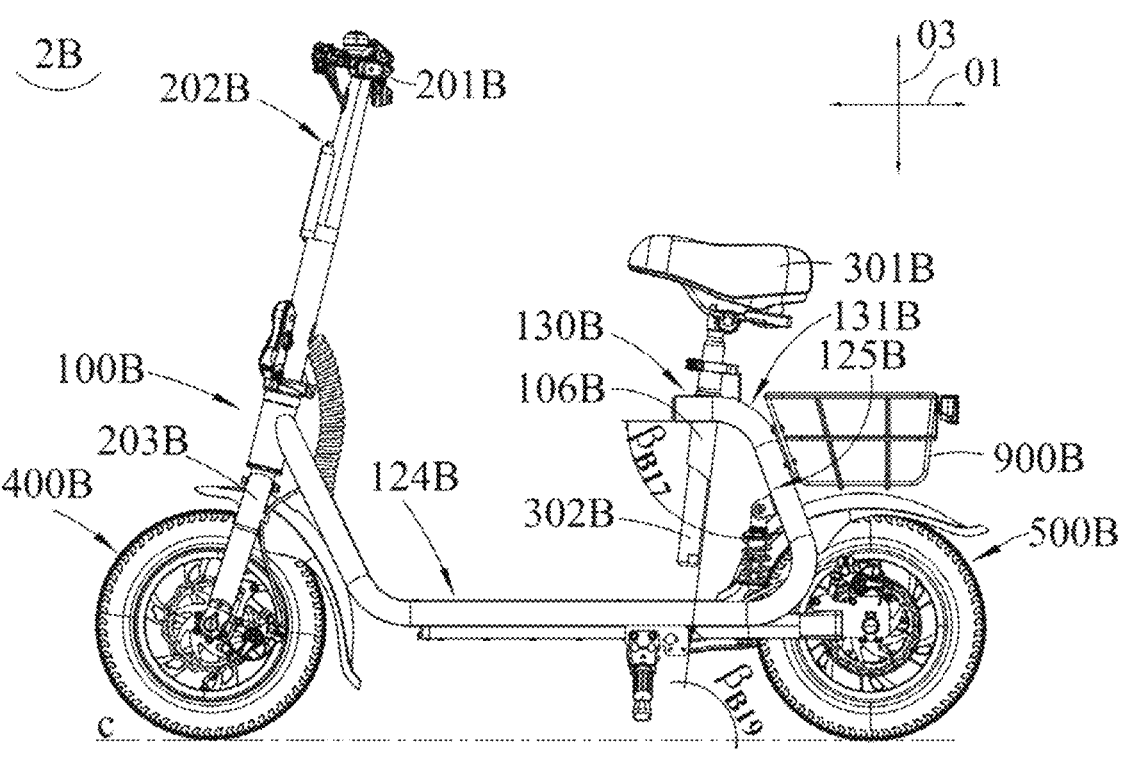
FIG. 29 is an overall schematic view of another implementation of the vehicle according to an embodiment of the present application.
Figure 30A:
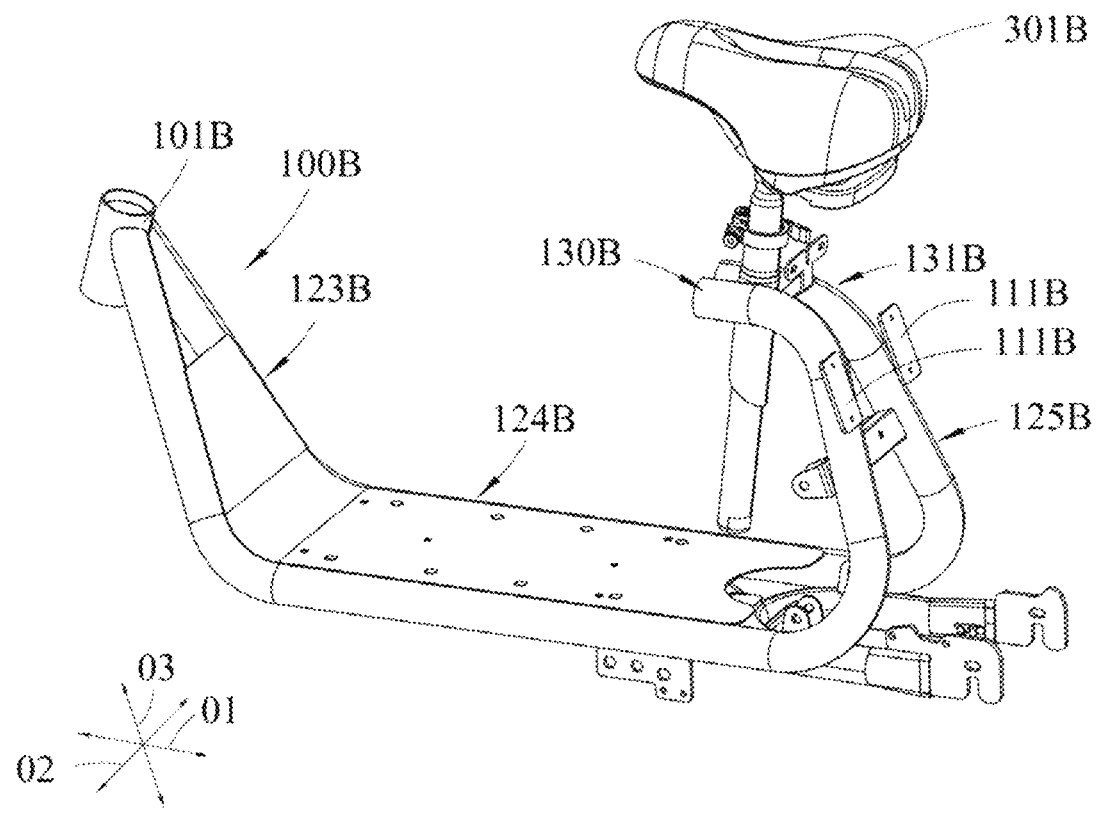
FIGS. 30A-30D are a set of schematic structural views of the frame.
Figure 30B:
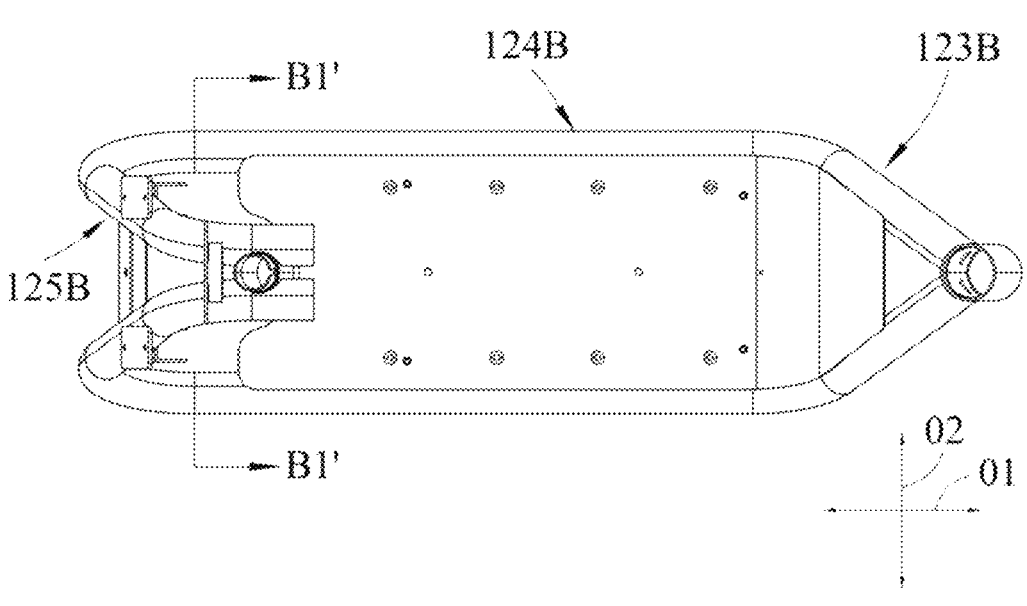
Figure 30C:
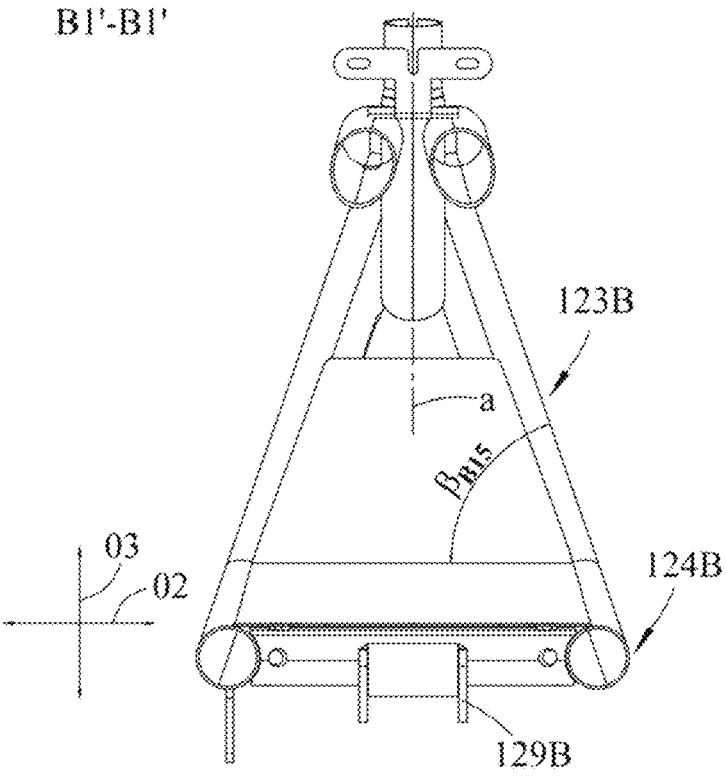
Figure 30D:
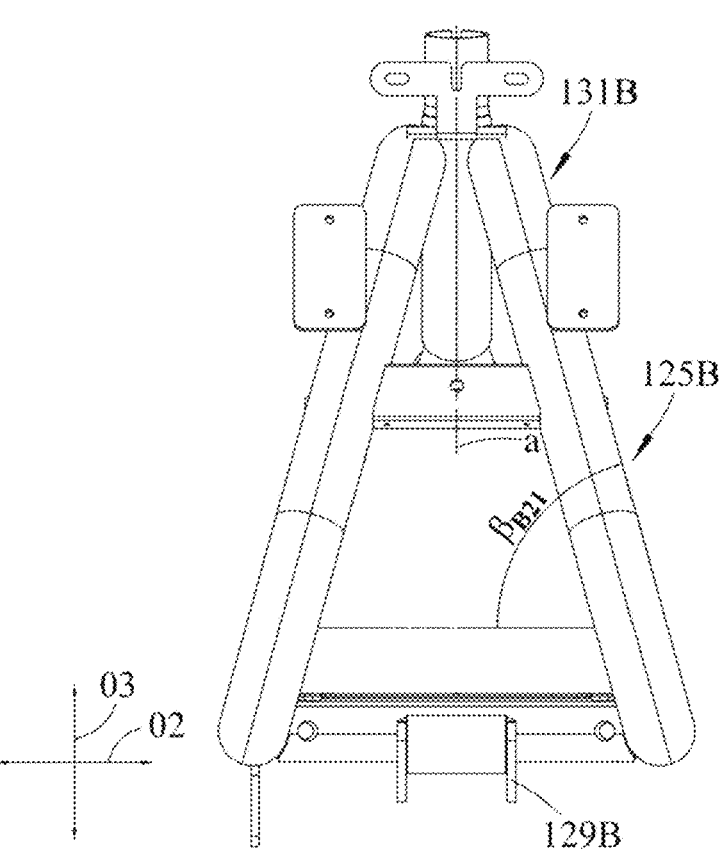

FIG. 29 is an overall schematic view of the vehicle 2B, and FIGS. 30A-30D are a set of structural schematic views of the frame 100B, wherein FIG. 30C is a cross-sectional view along B1'-B1' in FIG. 30B, and FIG. 30D is a rear view.

Referring to FIG. 30A, in some embodiments, the second weld tab 111B may be approximately sheet-like or plate-like, and its thickness may fall within the range of 2 mm-5 mm. When the thickness is greater than or equal to 2 mm, it has good structural strength. In conjunction with FIG. 29, when the road surface is relatively bumpy causing a large impact, or when the items carried in the rear basket 900B are heavy, it reduces the occurrence of bending or deformation. When the thickness is less than or equal to 5 mm, the self-weight of the second weld tab 111B is small, which is expected to reduce material costs.

Specifically, the thickness of the second weld tab 111B may be any value within the 2 mm-5 mm range, for example, 2 mm, 2.2 mm, 2.7 mm, 2.9 mm, 3.1 mm, 3.3 mm, 3.5 mm, 3.7 mm, 3.9 mm, 4.1 mm, 4.3 mm, 4.5 mm, or 5 mm.

Referring to FIG. 30A, in some embodiments, from the bottom end to the top end of the first section 123B, the width of the first section 123B along the second direction 02 may gradually decrease. The width of the bottom end of the first section 123B along the second direction 02 may be larger, which is expected to provide more legroom for the user, possibly improving the comfort of riding. At the same time, in conjunction with FIG. 29, it may also better separate the user's feet from other parts on the front side, such as the front wheel 400B, which is expected to achieve better safety. From the bottom end to the top end of the first section 123B, the width of the first section 123B along the second direction 02 may gradually decrease, which may reduce the resistance experienced by the vehicle 2B during travel, and is expected to improve the flexibility of the vehicle 2B during transport and travel. It is to be understood that although the width of the top end of the first section 123B along the second direction 02 is reduced, its width may still meet the requirements for fixed connection with the head tube 101B.

Referring to FIG. 30A, in some embodiments, from the bottom end to the top end of the first section 123B, the width of the first section 123B along the second direction 02 may change linearly, making the change process smoother and possibly facilitating processing.

Referring to FIG. 30A, in some embodiments, the first section 123B may be approximately triangular in shape, which may have strong stability. In some embodiments, the first section 123B may be in the shape of an isosceles triangle; and the two sides of the first section 123B along the second direction 02 may be arranged symmetrically. On the one hand, this is expected to improve the aesthetics; on the other hand, it may improve the weight balance on both sides of the first section 123B. In conjunction with FIG. 29, this helps to improve the balance of the vehicle 2B along the second direction 02, which may improve safety during riding.

Referring to FIG. 30C, in some embodiments, the angle $\beta_{B15}$ between the side of the first section 123B along the second direction 02 and the second direction 02 may fall within the range of 67°–77°. When $\beta_{B15} \geq 67°$, it may have high support strength, which is expected to reduce the risk of deformation. In addition, in conjunction with FIG. 29, it may also block rain, water, dust, etc., kicked up by the front wheel 400B during rotation. When $\beta_{B15} \leq 77°$, it is expected to result in less resistance generated by the vehicle 2B during travel and reduce the average width of the first section 123B along the second direction 02, which is expected to improve the flexibility of the vehicle 2B during travel and transport.

Specifically, $\beta_{B15}$ may be any value within the 67°-77° range, for example, 67°, 69°, 71°, 73°, 75°, or 77°.

Referring to FIG. 30A, in some embodiments, the side of the first section 123B along the second direction 02 and the side of the second section 124B along the second direction 02 may have a smooth transition. In conjunction with FIG. 29, this is expected to reduce the risk of a user or a person or animal near the vehicle 2B colliding with the connection position of the first section 123B and the second section 124B and even causing injury.

Referring to FIG. 30A, in some embodiments, the second section 124B may be rectangular in shape. Referring to FIG. 30C, and it may be arranged symmetrically with respect to the symmetry plane a, which may balance the weight of the second section 124B on both sides of the symmetry plane a. In conjunction with FIG. 29, this is expected to improve the balance performance of the vehicle 2B along the second direction 02, improving safety during riding. The symmetrical arrangement of the second section 124B with respect to the symmetry plane a may also improve its aesthetic effect.

Referring to FIG. 30A, in some embodiments, the frame 100B may include an extension section 130B disposed at the top end of the third section 125B. The extension section 130B may be configured to, along the first direction 01, define a front region on the front side and a rear region on the rear side. The front region may provide space for the user to get on or off the vehicle, and the rear region may be used to connect the seat 301B, or it may be understood that the rear region may be used to provide installation space for the seat 301B. It may also be understood that the extension section 130B may be configured to, along the third direction 03, define a top region on the top side, which may be used to install the seat 301B.

Referring to FIG. 29, in some embodiments, the extension section 130B may be approximately parallel to the first plane. When the vehicle 2B is upright, the extension section 130B may be arranged approximately horizontally, which may reduce the risk of the user and/or items carried by the user being poked or hit by the front end of the extension section 130B.

In some embodiments, that the extension section 130B is approximately parallel to the first plane means that the angle between the extension section 130B and the first plane may be in the range of 0°-5°. On the one hand, a suitable downward angle of the front end of the extension section 130B may reduce the encroachment on the space provided by the second section 124B, that is, it is expected to ensure that the space provided by the second section 124B has more available height along the third direction 03. In addition, it is also expected to reduce the risk of the user or items carried by the user being poked or hit by the front end of the extension section 130B. On the other hand, a suitable upward angle of the front end of the extension section 130B is expected to reduce the risk of the user being poked or hit by the front end of the extension section 130B during the process of getting on or off the vehicle 2B.

Specifically, the angle between the extension section 130B and the first plane may be any value within the 0°-5° range, for example, 0°, 1°, 2°, 3°, 4°, or 5°.

Referring to FIG. 29, in some embodiments, the extension section 130B may be approximately parallel to the second section 124B. Their inclination angles may be the same or very close, which may provide a more consistent visual appearance, making the overall frame 100B more aesthetic. Moreover, it may be beneficial to complete the structural transition through a smaller space in the third direction 03, that is, the projection on the third plane may be shorter, which is expected to achieve a miniaturized design.

Specifically, the angle between the extension section 130B and the second section 124B may be any value within the 0°-5° range, for example, 0°, 1°, 2°, 3°, 4°, or 5°.

Referring to FIG. 29, in some embodiments, the extension section 130B may be approximately parallel to the first plane, and the angle $\beta_{B17}$ between the extension section 130B and the third section 125B may fall within the range of 100°-120°. When $\beta_{B17} \geq 100°$, the third section 125B is relatively gentle, which is expected to make the connection between the extension section 130B and the third section 125B more gradual, requiring less transition space along the third direction 03, which is beneficial to the miniaturized design of the frame 100B. When $\beta_{B17} \leq 120°$, the projected length of the third section 125B on the first plane is shorter, and the length of the third section 125B is shorter, which is expected to make the frame 100B also have a shorter length, which is beneficial to the miniaturized design.

Specifically, $\beta_{B17}$ may be any value within the 100°-120° range, for example, 100°, 102°, 104°, 106°, 108°, 110°, 112°, 114°, 116°, 118°, or 120°.

Referring to FIG. 29, in some embodiments, the frame 100B may include a middle tube 106B installed on the extension section 130B. The middle tube 106B may be configured to, along the second direction 02, define a first outer region on the outer side, an inner region on the inner side, and a second outer region on the outer side. The inner region may be the internal space of the middle tube 106B itself, and the seat tube 302B connected to the seat 301B may pass into the inner region. In other words, the inner region may provide installation space for the seat tube 302B, and the first and second outer regions may provide a connection position for at least the extension section 130B.

Referring to FIG. 29, in some embodiments, the middle tube 106B may be configured to be inclined backward along the first direction 01. The seat 301B that adapts to the middle tube 106B may be inclined backward, so that the distance between the rear side of the stem 202B and the front side of the seat 301B in the first direction 01 may become larger, which may provide more space for the user to get on and off the vehicle 2B.

Referring to FIG. 29, in some embodiments, the middle tube 106B may be configured to be inclined backward along the first direction 01, and the angle $\beta_{B19}$ between the middle tube 106B and the first plane may fall within the range of 78°-88°. When $\beta_{B19} \geq 78°$, the seat 301B adapted to the middle tube 106B has a suitable degree of inclination along the first direction 01. When the user sits on the seat 301B, the feeling of tilting or sliding backward may be weakened, which helps to optimize the experience and reduce interference with the user's riding. When $\beta_{B19} \leq 88°$, the seat 301B adapted to the middle tube 106B has a suitable degree of inclination along the first direction 01, so that there is a larger distance between the rear side of the stem 202B and the front side of the seat 301B in the first direction 01, reducing the occupation of the user's activity space.

Specifically, $\beta_{B19}$ may be any value within the 78°–88° range, for example, 78°, 80°, 82°, 84°, 85°, 86°, or 88°.

Referring to FIG. 30A, in some embodiments, from the bottom end to the top end of the third section 125B, the width of the third section 125B along the second direction 02 may gradually decrease. The width of the bottom end of the third section 125B along the second direction 02 may be larger. In conjunction with FIG. 29, this may facilitate providing space for the installation of the rear wheel 500B, which is expected to reduce the difficulty of installing the rear wheel 500B. From the bottom end to the top end of the third section 125B, the width of the third section 125B along the second direction 02 may gradually decrease, which may improve the flexibility of the vehicle 2B during transport and travel. It is to be understood that although the width of the top end of the third section 125B along the second direction 02 is reduced, its width may still meet the requirements for fixed connection with the middle tube 106B.

Referring to FIG. 30A, in some embodiments, from the bottom end to the top end of the third section 125B, the width of the third section 125B along the second direction 02 may change linearly, making the change process smoother and possibly facilitating processing.

Referring to FIG. 30A, in some embodiments, the third section 125B may be trapezoidal in shape, which may have strong stability. In some embodiments, the third section 125B may be in the shape of an isosceles trapezoid; in conjunction with FIG. 30D, the side edges of the third section 125B along the second direction 02 may be arranged symmetrically with respect to the symmetry plane a. On the one hand, this may improve the aesthetics; on the other hand, it may improve the weight balance of the third section 125B on both sides of the symmetry plane a. In conjunction with FIG. 29, this may help to improve the balance performance of the vehicle 2B along the second direction 02, which is expected to improve safety during riding.

Referring to FIG. 30D, in some embodiments, the angle $\beta_{B21}$ between the side of the third section 125B along the second direction 02 and the second direction 02 may fall within the range of 70°-80°. When $\beta_{B21} \geq 70°$, it may have high support strength, which is expected to reduce the risk of the third section 125B deforming. In addition, in conjunction with FIG. 29, it may provide a larger installation space for the rear wheel 500B, and the rear wheel 500B is expected to be installed further forward, which may make the vehicle 2B shorter, and is expected to achieve a miniaturized design. When $\beta_{B21} \leq 80°$, it may reduce the average width of the third section 125B along the second direction 02, making the third section 125B more compact, which is expected to improve the flexibility of the vehicle 2B during travel and transport. In addition, when $\beta_{B21}$ falls within the range of 70°-80°, it may also allow the connection between the second section 124B and the third section 125B to have high rigidity and strength, which is expected to improve the support performance and service life of the frame 100B.

Specifically, $\beta_{B21}$ may be any value within the 70°-80° range, for example, 70°, 72°, 74°, 76°, 78°, or 80°.

Referring to FIG. 30A, in some embodiments, the side of the third section 125B along the second direction 02 may have a smooth transition with the side of the second section 124B along the second direction 02. In conjunction with FIG. 29, this is expected to reduce the risk of a user or a person or animal near the vehicle 2B colliding with the connection position of the third section 125B and the second section 124B and even causing injury.

Referring to FIG. 30A, the seat 301B may be fixedly disposed on the extension section 130B of the frame 100B. In other words, the middle tube 106B may be fixedly disposed on the extension section 130B, and the seat 301B may be indirectly disposed at the top end of the third section 125B through the extension section 130B. On the one hand, with a distance between the seat 301B and the stem 202B, it may increase the length of the frame 100B along the first direction 01, which is expected to improve the support effect of the frame 100B, thereby improving the stability of the vehicle 2B. On the other hand, the extension section 130B may extend forward, and the extension direction of the extension section 130B may be parallel to the first plane; the seat 301B may be fixedly disposed on the extension section 130B, and the force exerted by the extension section 130B on the seat 301B may be substantially along the third direction 03, and may be substantially perpendicular to the extension direction of the extension section 130B, which may reduce the risk of the seat 301B moving along the first direction 01, making the fixation of the seat 301B more stable and expected to improve riding safety.

Referring to FIG. 30A, in some embodiments, the frame 100B may include a third transition section 131B disposed between the third section 125B and the extension section 130B. On the one hand, this may make the transition between the third section 125B and the extension section 130B smoother. On the other hand, in conjunction with FIG. 29, the provision of the third transition section 131B may reduce the risk of users or people or animals around the vehicle 2B being injured by sharp corners. In addition, the provision of the third transition section 131B may alleviate the stress concentration phenomenon between the third section 125B and the extension section 130B, which is expected to improve the support strength of the frame 100B and the reliability and service life of the frame 100B. In addition, when the vehicle 2B is in motion, the airflow at the junction of the third section 125B and the extension section 130B may flow more smoothly, which may reduce the resistance experienced by the vehicle 2B.

Referring to FIG. 30A, in some embodiments, from the top end of the third section 125B to the rear end of the extension section 130B, the extension line of the third transition section 131B may be a curve, which may make the transition between the third section 125B and the extension section 130B smoother and more fluid, and may also make the appearance more aesthetic.

Referring to FIG. 30A, in some embodiments, from the top end of the third section 125B to the rear end of the extension section 130B, the extension line of the third transition section 131B may be in the shape of a circular arc, which may make the shape of the third transition section 131B simpler and more regular, and may facilitate processing.

Referring to FIG. 30A, in some embodiments, the third transition section 131B may be tangent to both the third section 125B and the extension section 130B, which may make the transition between the third section 125B and the extension section 130B smoother. It may also facilitate the fixed connection between the two ends of the third transition section 131B and the second section 124B and the third section 125B, respectively, and is expected to make the connection more stable.

Referring to FIG. 30A, in some embodiments, along the first direction 01, the third section 125B may be inclined forward, and the top end of the third section 125B may be located at the rear of the extension section 130B. Therefore, the corresponding central angle of the third transition section 131B is greater than or equal to 180°, which may reduce the risk of the third transition section 131B bending and deforming.

Referring to FIG. 30A, in some embodiments, from the top end of the third section 125B to the rear end of the extension section 130B, the width of the third transition section 131B along the second direction 02 may gradually decrease. On the one hand, this may allow the width of the rear end of the extension section 130B along the second direction 02 to be set smaller, which is expected to achieve a miniaturized design; on the other hand, it may also allow the top end of the third section 125B to be set wider, which may allow the third section 125B to have high support strength.

Figure 31A:
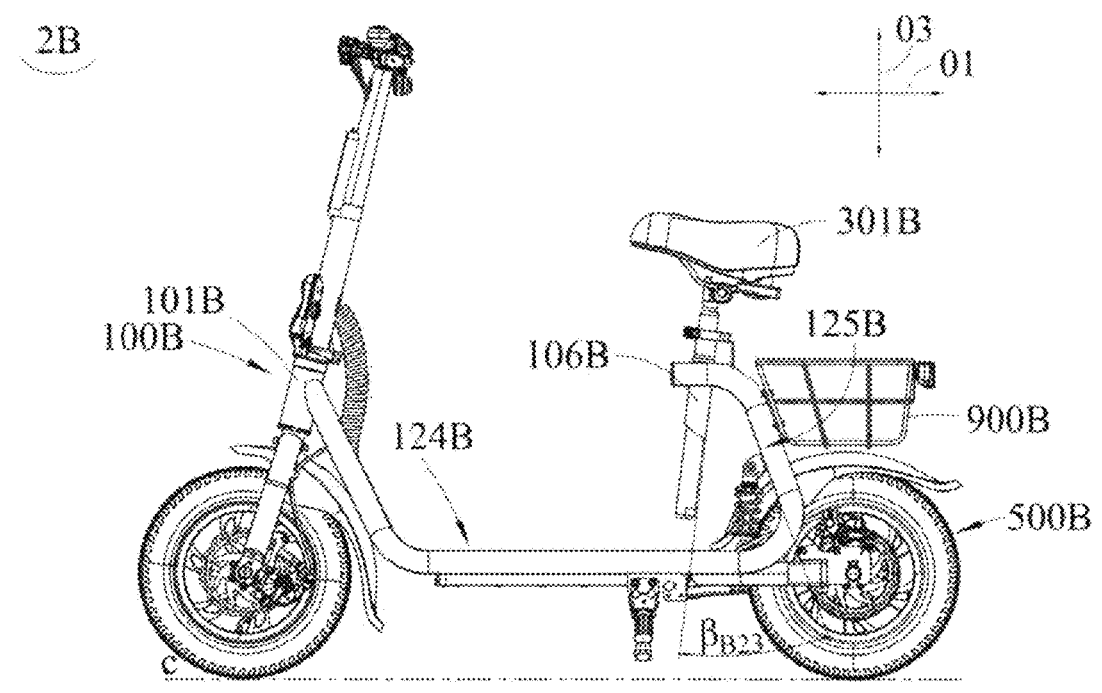
FIGS. 31A-31B are a set of comparative views of the frame heights of the vehicle.
Figure 31B:
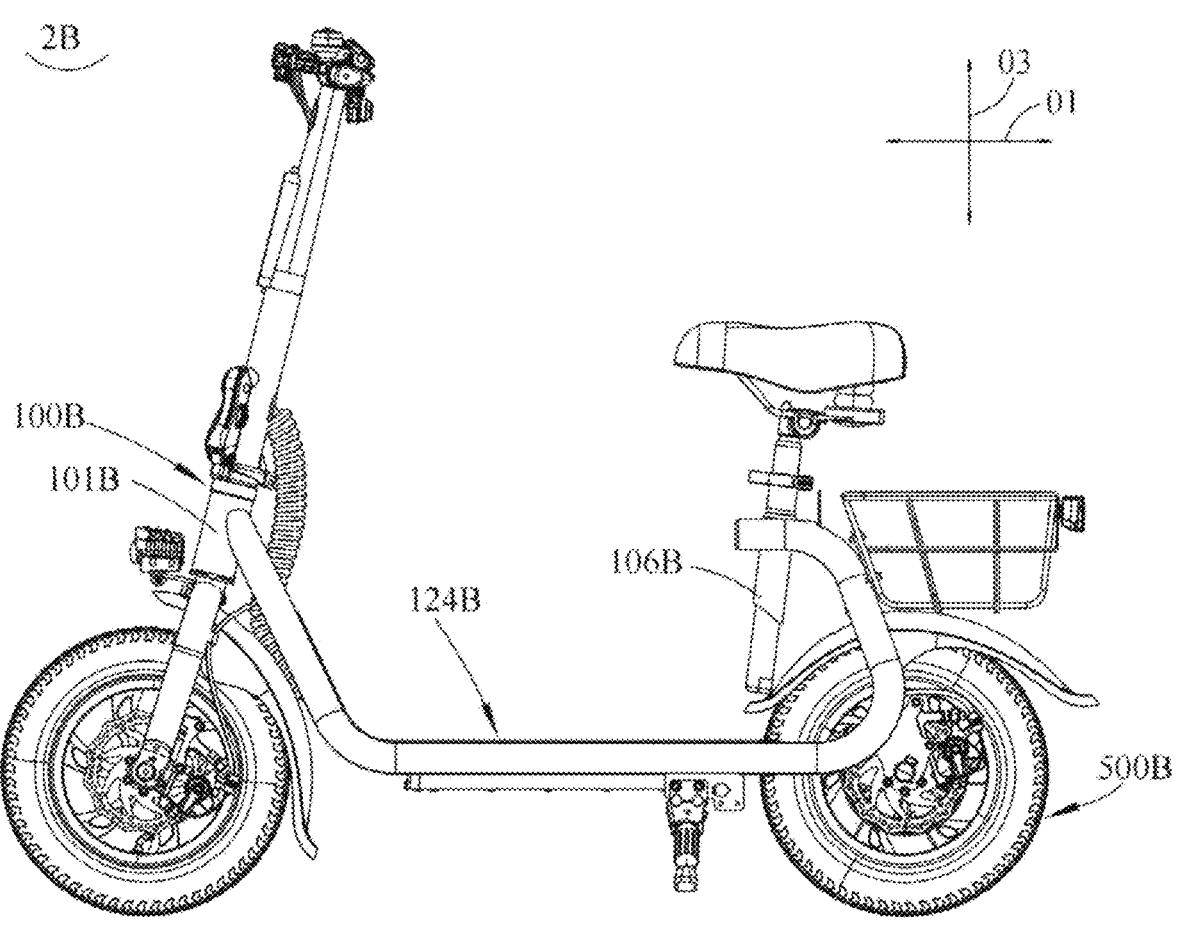

FIGS. 31A-31B are a set of comparative views of the frame 100B heights of the vehicle 2B. The frame 100B in FIG. 31A has a higher height, and the frame 100B in FIG. 31B has a lower height.

Referring to FIG. 31A, in some embodiments, the middle tube 106B may be configured to be inclined backward along the first direction 01, and the third section 125B may be configured to be inclined forward along the first direction 01. The angle $\beta_{B23}$ between the middle tube 106B and the third section 125B may fall within the range of 22°-32°. When $\beta_{B23} \geq 22°$, the middle tube 106B and the third section 125B are separated by an appropriate distance, reducing encroachment on the space corresponding to the third section 125B for installing the rear wheel 500B, which is expected to reduce the difficulty of installing the rear wheel 500B. When $\beta_{B23} \leq 32°$, the seat 301B adapted to the middle tube 106B has a suitable degree of inclination along the first direction 01. When the user sits on the seat 301B, the feeling of tilting or sliding backward is weakened, which is expected to improve the experience and reduce interference with the user's riding.

Specifically, $\beta_{B23}$ may be any value within the 22°-32° range, for example, 22°, 24°, 26°, 27°, 28°, 30°, or 32°.

Referring to FIG. 31A, in some embodiments, the middle tube 106B may be substantially cylindrical, and its thickness may fall within the range of 1.5 mm-2.5 mm. When the thickness is greater than or equal to 1.5 mm, it has good structural strength, reducing the occurrence of bending or deformation when the road surface is relatively bumpy causing a large impact, or when the user is heavier and/or the carried items are heavy. When the thickness is less than or equal to 2.5 mm, the self-weight of the middle tube 106B is small, which is expected to reduce material costs.

Specifically, the thickness of the middle tube 106B may be any value within the 1.5 mm-2.5 mm range, for example, 1.5 mm, 1.6 mm, 1.7 mm, 1.8 mm, 1.9 mm, 2 mm, 2.1 mm, 2.2 mm, 2.3 mm, 2.4 mm, or 2.5 mm.

Referring to FIG. 31A, in some embodiments, along the third direction 03, the top side of the middle tube 106B may be higher than the top side of the head tube 101B, which is expected to provide stable support when the seat 301A is adjusted to a higher position, meeting the needs of taller users.

Referring to FIG. 31B, in other embodiments, along the third direction 03, the top end of the middle tube 106B may be substantially flush with the top end of the head tube 101B, which may reduce the distance from the top side of the middle tube 106B to the bottom side of the second section 124B, possibly saving more space during packaging and expected to reduce transportation costs.

Figure 32:
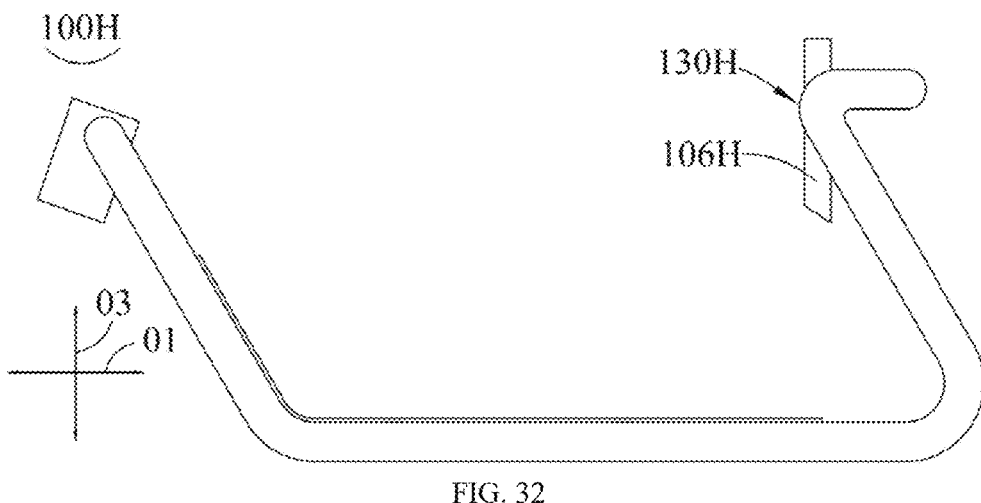
FIG. 32 is a schematic structural view of another implementation of the frame according to an embodiment of the present application.
Figure 33:
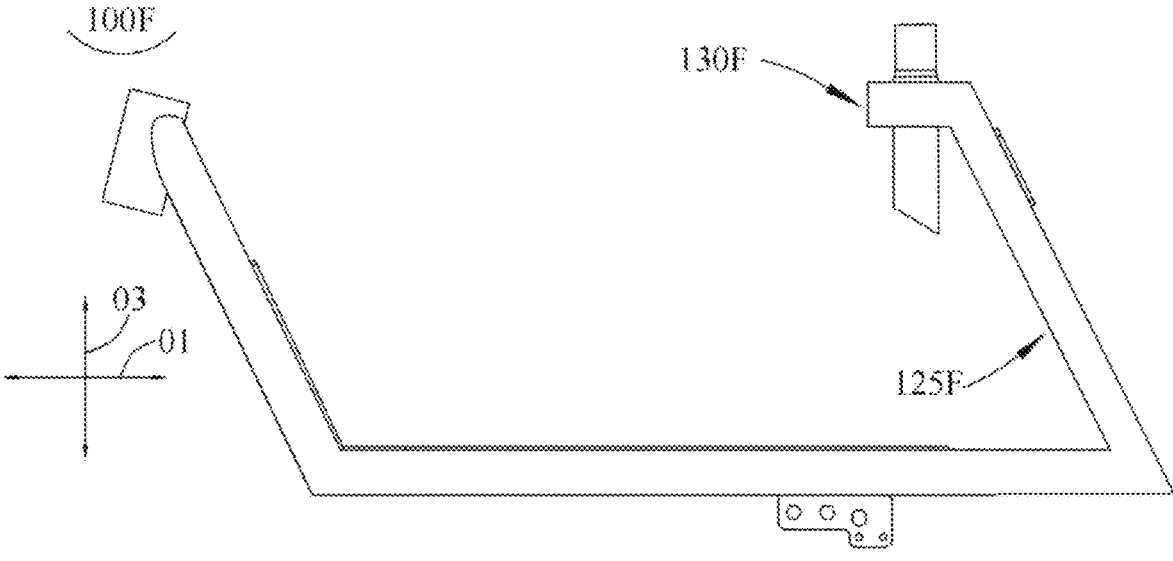
FIG. 33 is a schematic structural view of another implementation of the frame according to an embodiment of the present application.

FIGS. 32-33 are structural schematic views of some other implementations of the frame, for example, frame 100H and frame 100F.

Referring to FIG. 32, in some other embodiments, the vehicle may include a frame 100H. The frame 100H may include an extension section 130H. Along the first direction 01, the bottom end of the extension section 130H may be located at the front, and the top end may be located at the rear, and the extension line of the extension section 130H may be a curve, which is expected to reduce the risk of the user or items or animals carried by the user being bumped (for example, during acceleration or on bumpy roads). In addition, it is also expected to make the appearance more aesthetic.

Referring to FIG. 32, in some other embodiments, the middle tube 106H of the frame 100H may be configured to be perpendicular to the first plane.

Referring to FIG. 33, in some embodiments, the extension section 130F of the frame 100F may be connected to the third section 125F, that is, along the first direction 01, the rear end of the extension section 130F may contact and be fixed to the top end of the third section 125F.

Figure 34A:
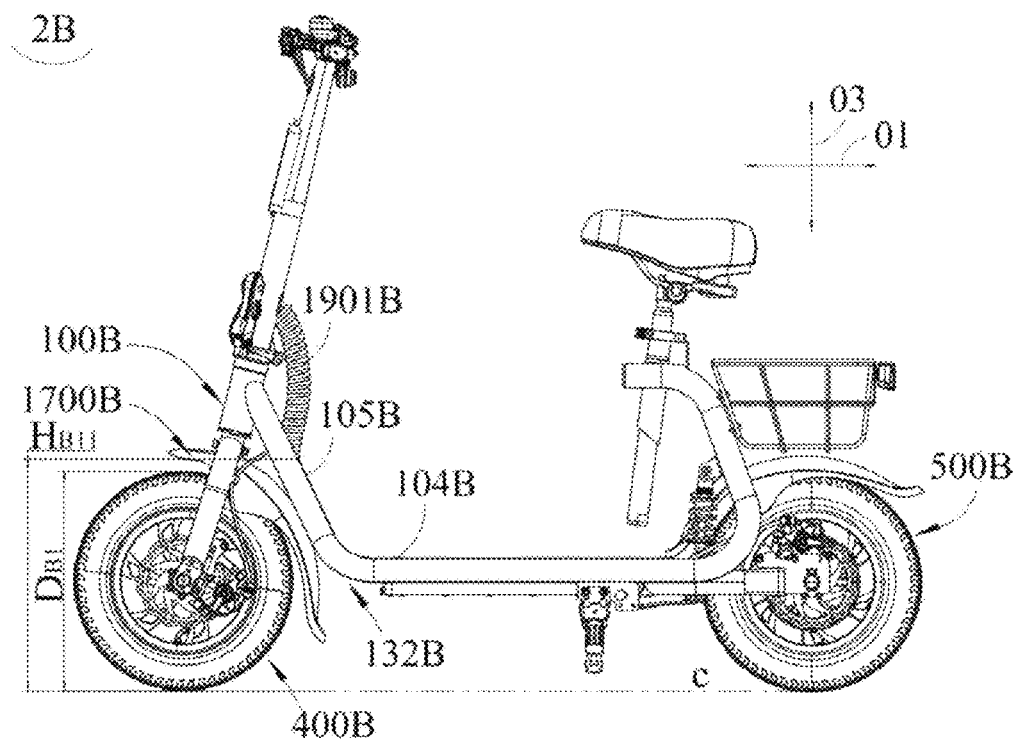
FIGS. 34A-34B are another set of overall schematic views of the vehicle according to an embodiment of the present application.
Figure 34B:
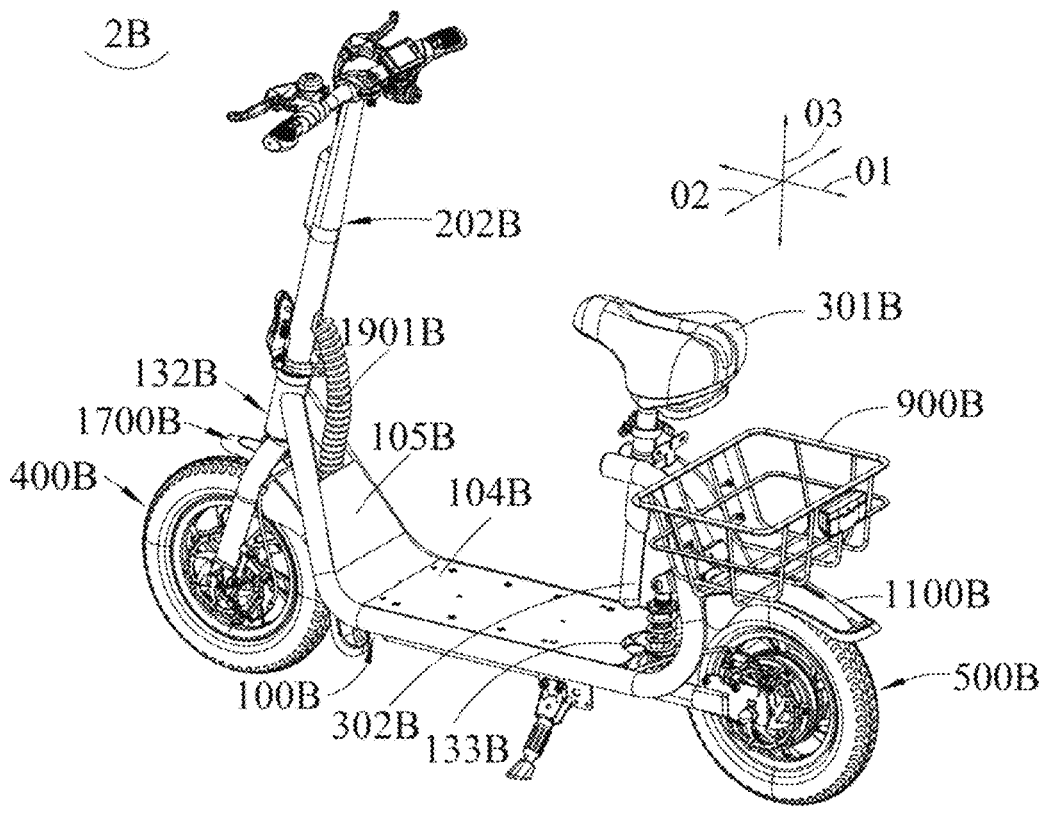
Figure 35:
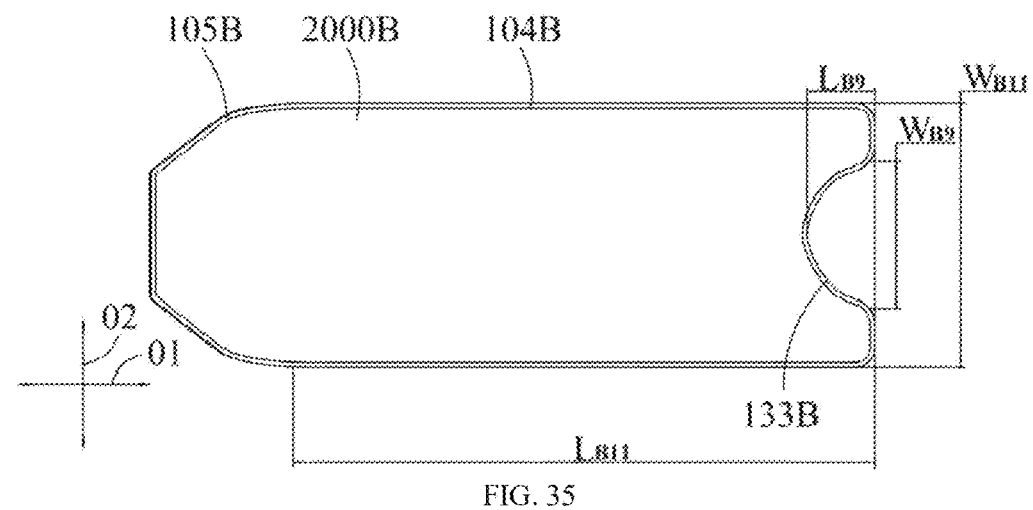
FIG. 35 is a schematic structural view of the support plate according to an embodiment of the present application.

FIGS. 34A-34B are another set of overall schematic views of the vehicle 2B, and FIG. 35 is a structural schematic view of the support plate 104B.

Referring to FIG. 34A, in some embodiments, the frame 100B may include a mounting frame 132B and a support plate 104B fixedly disposed on the mounting frame 132B.

The support plate 104B may be configured to provide a flat area along the first direction 01, which may be used by the user for stepping on, placing items, or placing animals. In addition, the support plate 104B may also transmit the applied force downward to the mounting frame 132B, which is expected to improve the support strength of the frame 100B. In conjunction with FIG. 31B, it may be understood that the flat area of the support plate 104B may be the top side of the second section 124B.

Referring to FIG. 34B, in some embodiments, the support plate 104B may be integrally formed.

In some embodiments, the material of the support plate 104B may be carbon structural steel, which may have both good support strength and be easy to shape.

In other embodiments, the material of the support plate 104B may also be other metal materials or plastics. Other metal materials include but are not limited to stainless steel, and aluminum alloy, and plastics include but are not limited to polypropylene (PP), polyethylene (PE), and ABS plastic.

In some embodiments, the thickness of the support plate 104B may fall within the range of 1 mm-2.5 mm, so that while meeting the support strength requirements, it may have a lower weight and also be convenient for production.

Specifically, the thickness of the support plate 104B may be any value within the 1 mm-2.5 mm range, for example, 1 mm, 1.2 mm, 1.4 mm, 1.6 mm, 1.8 mm, 2 mm, 2.2 mm, or 2.4 mm.

Referring to FIG. 34A, in some embodiments, the support plate 104B may be configured to provide a flat area along a first direction 01, which may be used by a user for stepping, placing items, or placing animals.

Referring to FIG. 34B, in some embodiments, the support plate 104B may be configured to be approximately rectangular as a whole, and the middle region has no outwardly extending portion in a second direction 02. This is expected to achieve a compact design for the vehicle 2B, facilitating flexible passage and parking in narrow spaces, and may also be easier to transport and carry.

Referring to FIG. 34B, in some embodiments, the rear end of the support plate 104B along the first direction 01 may be provided with an avoidance groove 133B. The avoidance groove 133B may be configured to avoid at least one of the bottom end of the seat tube 302B, the rear wheel 500B, and the rear fender 1100B, which may reduce the weight of the support plate 104B and is also expected to allow the mounting positions of other components to be relatively forward, which is conducive to making the vehicle 2B shorter and achieving a miniaturized design.

In some other embodiments, the avoidance groove 133B may be used to avoid the bottom end of the seat tube 302B.

Referring to FIG. 34B, in some embodiments, the avoidance groove 133B may be used to avoid the rear wheel 500B.

In some other embodiments, the avoidance groove 133B may be used to avoid the rear wheel 500B and the rear fender 1100B.

Referring to FIG. 34B, in some embodiments, along the second direction 02, the extension line of the avoidance groove 133B may be curved. This is expected to reduce the risk of scratching or scuffing other components (such as the rear fender 1100B and the rear wheel 500B) during the installation process, and may also make the appearance more aesthetically pleasing.

Referring to FIG. 35, in some embodiments, the bottom of the avoidance groove 133B may be a curved bottom, that is, along the first direction 01, the more forward it is, the narrower the opening of the avoidance groove 133B may be, which may make the appearance more aesthetically pleasing.

Referring to FIG. 35, in some embodiments, the opening of the avoidance groove 133B may be a curved opening, that is, along the first direction 01, the more rearward it is, the wider the opening of the avoidance groove 133B may be, and in combination with FIG. 34B, it is expected to facilitate the entry of other components (such as the rear fender 1100B and the rear wheel 500B), which may reduce the installation difficulty. In addition, it may reduce the risk of installation or maintenance personnel being injured by sharp corners.

Referring to FIG. 35, in some embodiments, the groove width of the avoidance groove 133B along the second direction may be greater than the groove depth of the avoidance groove 133B along the first direction, so that the avoidance groove 133B may be configured as a wide and shallow notch, and in combination with FIG. 34B, it is expected to facilitate the entry of other components (such as the rear fender 1100B and the rear wheel 500B), which may reduce the installation difficulty.

Referring to FIG. 35, in some embodiments, the groove width $W_{B9}$ of the avoidance groove 133B may be in the range of 125 mm-145 mm, and the groove depth $L_{B9}$ may be in the range of 40 mm-50 mm. This is expected to provide the avoidance groove 133B with good structural strength, reducing instances of cracking or deformation due to stress concentration when under force, and is also expected to provide sufficient space to facilitate the entry of other components.

Specifically, $W_{B9}$ may be any value within the range of 125 mm-145 mm, for example, 125 mm, 127 mm, 129 mm, 131 mm, 133 mm, 135 mm, 137 mm, 139 mm, 141 mm, 143 mm, 145 mm. $L_{B9}$ may be any value within the range of 40 mm-50 mm, for example, 40 mm, 42 mm, 44 mm, 46 mm, 48 mm, 50 mm.

Referring to FIG. 35, in some embodiments, along the first direction 01, the length $L_{B11}$ of the support plate 104B may be in the range of 385 mm-485 mm. This is expected to allow the support plate 104B to provide sufficient space for the user to meet stepping or cargo-carrying needs, optimizing the experience. In combination with FIG. 34B, it may also reduce instances of the support plate 104B being too long, which contributes to the miniaturized design of the vehicle 2B.

Specifically, $L_{B11}$ may be any value within the range of 385 mm-485 mm, for example, 385 mm, 390 mm, 395 mm, 400 mm, 405 mm, 410 mm, 415 mm, 420 mm, 425 mm, 430 mm, 435 mm, 440 mm, 445 mm, 450 mm, 455 mm, 460 mm, 465 mm, 470 mm, 475 mm, 480 mm, 485 mm.

Referring to FIG. 35, in some embodiments, along a second direction 02, the width $W_{B11}$ of the support plate 104B may be in the range of 150 mm-245 mm. This is expected to allow the support plate 104B to provide sufficient space for the user to meet stepping or cargo-carrying needs, optimizing the experience, and may also reduce instances of the support plate 104B being too wide, which contributes to a lightweight design and ensures passability.

Specifically, $W_{B11}$ may be any value within the range of 150 mm-245 mm, for example, 150 mm, 155 mm, 160 mm, 165 mm, 170 mm, 175 mm, 180 mm, 185 mm, 190 mm, 195 mm, 200 mm, 205 mm, 210 mm, 215 mm, 220 mm, 225 mm, 230 mm, 235 mm, 240 mm, 245 mm.

Referring to FIG. 34B, in some embodiments, along a first direction 01, the reinforcement plate 105B may be located on the front side of the support plate 104B. The reinforcement plate 105B may be configured to extend upward from its bottom end along the first direction 01, and the bottom end may be fixed to the support plate 104B. The reinforcement plate 105B may be configured to, along the first direction 01, divide a front area on the front side for avoiding the front wheel 400B and a rear area on the rear side for user use. Separating the two areas is expected to improve the safety of use; for example, when the front wheel 400B is turning, when placing items or animals, it is expected to block items or animals from moving forward to a position of contact with the front wheel 400B under the effect of inertia, which may improve riding safety and reduce the risk of damage to items or injury to animals.

Referring to FIG. 34B, in some embodiments, from the bottom end to the top end of the reinforcement plate 105B, the width of the reinforcement plate 105B along a second direction 02 may gradually decrease. The width of the bottom end of the reinforcement plate 105B along the second direction 02 may be larger, which is expected to provide more foot space for the user and is expected to improve the user's riding comfort. In addition, it is also expected to better separate the user's feet from other parts or components on the front side, such as the front wheel 400B and the front fender 1700B, which may provide better safety. As the width of the reinforcement plate 105B along the second direction 02 gradually decreases from its bottom end to its top end, it is expected to reduce the resistance encountered by the vehicle 2B during travel.

Referring to FIG. 34B, in some embodiments, from the bottom end to the top end of the reinforcement plate 105B, the width of the reinforcement plate 105B along the second direction 02 may change linearly, making the transition process smoother, which may facilitate processing.

Referring to FIG. 34B, in some embodiments, the reinforcement plate 105B may be approximately trapezoidal in shape, which may have strong stability. In some specific embodiments, the reinforcement plate 105B may be in the shape of an isosceles trapezoid. On the one hand, this may improve the aesthetic appearance; on the other hand, it may improve the weight balance on both sides of the reinforcement plate 105B, which is expected to improve the balance of the vehicle 2B along the second direction 02 and may improve safety during riding.

Referring to FIG. 34A, in some embodiments, along the third direction 03, the height difference between the ground clearance $H_{B11}$ of the reinforcement plate 105B and the outer diameter $D_{B1}$ of the front wheel 400B may be in the range of 0 mm-10 mm. A height difference greater than or equal to 0 mm may allow the reinforcement plate 105B to have sufficient height to provide adequate coverage, reducing instances of dirt (such as rainwater and dust) kicked up by the front wheel 400B during rolling from splashing backward onto the user or carried items. A height difference less than or equal to 10 mm means the reinforcement plate 105B has a suitable height, which helps to reduce material costs and its own weight. In addition, it is expected that space may be reserved at the top end of the reinforcement plate 105B for the winding tube 1901B to pass through, allowing the winding tube 1901B to be guided below the reinforcement plate 105B. This may not only make the overall vehicle 2B more aesthetically pleasing but may also protect the winding tube 1901B, and is expected to reduce the risk of the user or carried items getting entangled with or pulling on the winding tube 1901B.

Specifically, the height difference between $H_{B11}$ and $D_{B1}$ may be any value within the range of 0 mm-10 mm, for example, 0 mm, 1 mm, 2 mm, 3 mm, 4 mm, 5 mm, 6 mm, 7 mm, 8 mm, 9 mm, 10 mm.

Referring to FIG. 35, in some embodiments, the vehicle 2B may include a first anti-slip mechanism 2000B. Along the third direction 03, the first anti-slip mechanism 2000B may be configured to at least partially cover the top side of the support plate 104B. When a user steps on the support plate 104B, this may reduce instances of the user's feet slipping, for example, when getting on or off the vehicle 2B, thereby improving riding safety. In addition, when items are placed on the support plate 104B, it may reduce instances of items sliding due to inertia during acceleration or deceleration, improving the stability of placed items. In addition, when an animal travels with the user, it may reduce instances of the animal's paws slipping, for example, when getting on or off, ensuring the animal's safety.

In some embodiments, the first anti-slip mechanism 2000B may include, but is not limited to, sandpaper, rubber, or an anti-slip coating.

Figure 36A:
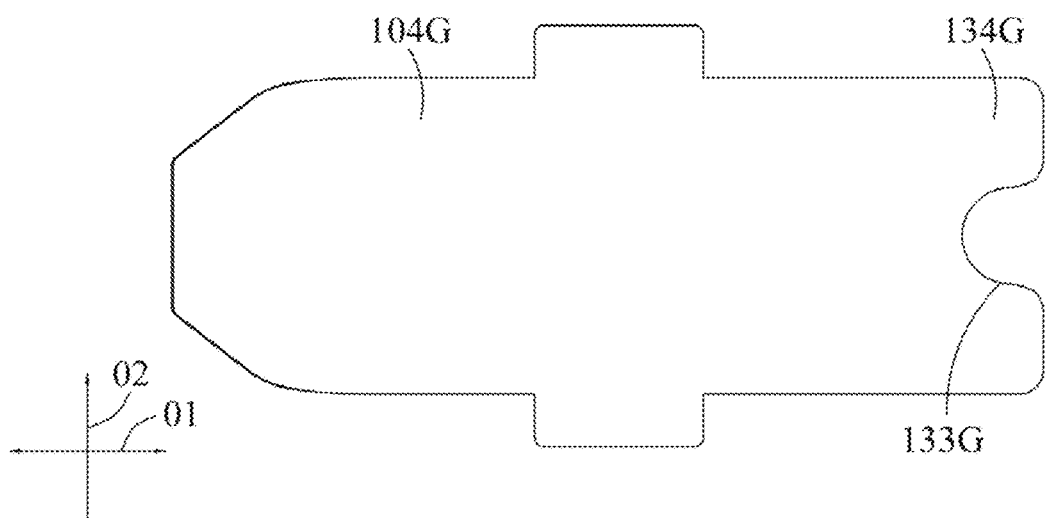
FIGS. 36A-36B are a set of overall schematic views of another implementation of the support plate.
Figure 36B:
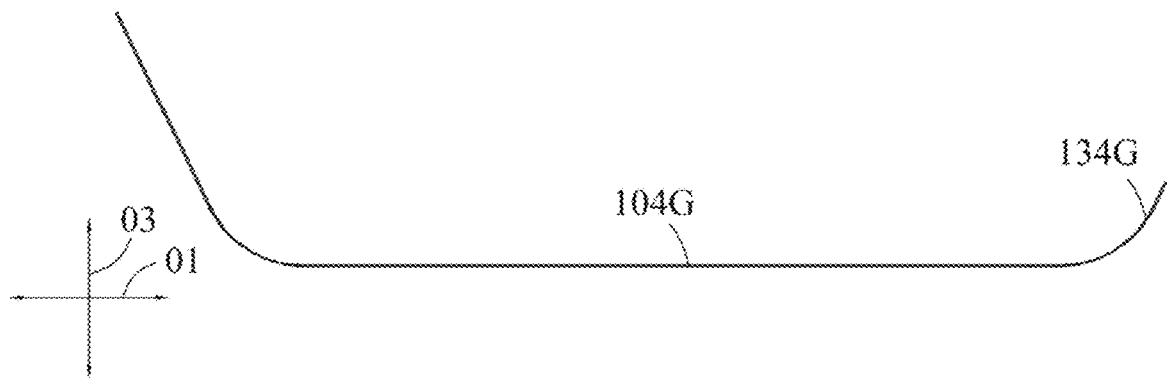

FIGS. 36A-36B are a set of overall schematic views of some other implementations of the support plate, for example, the support plate 104G.

Referring to FIG. 36A, in some embodiments, the support plate 104G of the frame 100G may be configured to be approximately rectangular as a whole, and the middle region may have an outwardly extending portion in the second direction 02. This is expected to indicate the boarding position to the user, as the outwardly extending portion may form a significant morphological difference with the surrounding area, potentially serving as a visual guide mark. This is expected to allow the user to quickly identify and standardize the stepping position for boarding, potentially providing a better riding experience and safety. In addition, it is expected to provide wider foot space, which may accommodate different foot sizes and may also allow the user to flexibly adjust the distance and posture between their feet, which is expected to improve the comfort of foot placement.

Referring to FIGS. 36A-36B, in some embodiments, the frame may include a first upwardly extending portion 134G, and the first upwardly extending portion 134G may be located on the rear side of the support plate 104G. The first upwardly extending portion 134G may be configured to extend upward from its bottom end along the first direction 01. The first upwardly extending portion 134G may be configured to, along the first direction 01, divide a front area on the front side for user use and a rear area on the rear side where the rear wheel may be installed. Separating the two areas is expected to improve the safety of use, for example, when the rear wheel is rotating.

Referring to FIG. 36A, in some embodiments, the rear end of the first upwardly extending portion 134G along the first direction 01 may be provided with an avoidance groove 133G. The avoidance groove 133G may be configured to avoid at least one of the bottom end of the seat tube, the rear wheel, and the rear fender, which is expected to reduce the weight of the first upwardly extending portion 134G, and may also make the vehicle shorter, potentially achieving a miniaturized design.

In some embodiments, the avoidance groove 133G may be used to avoid the bottom end of the seat tube.

In some embodiments, the avoidance groove 133G may be used to avoid the middle tube and the rear fender.

In some embodiments, the avoidance groove 133G may be used to avoid the middle tube, the rear wheel, and the rear fender.

In some embodiments, the avoidance groove 133G may be used to avoid the middle tube and the rear wheel.

In some embodiments, the avoidance groove 133G may be used to avoid the rear wheel.

Figure 37:
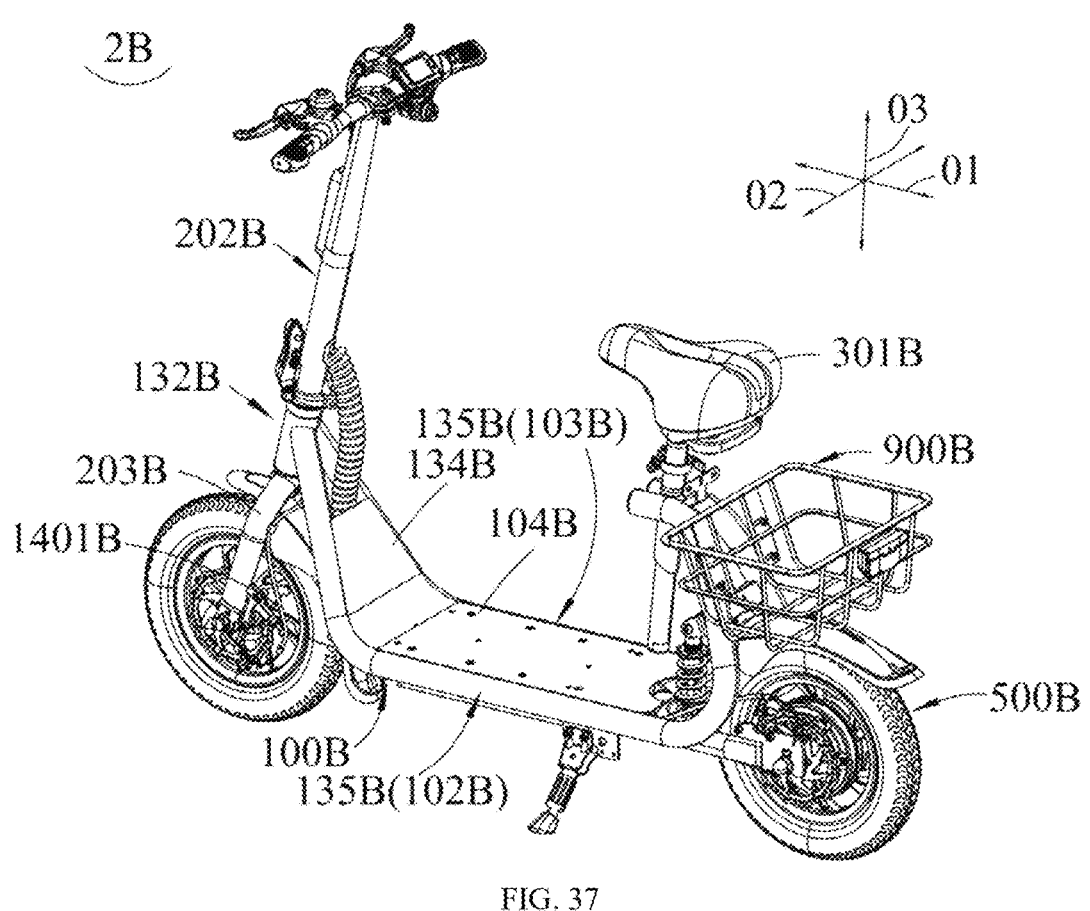
FIG. 37 is another overall schematic view of the vehicle according to an embodiment of the present application.
Figure 38A:
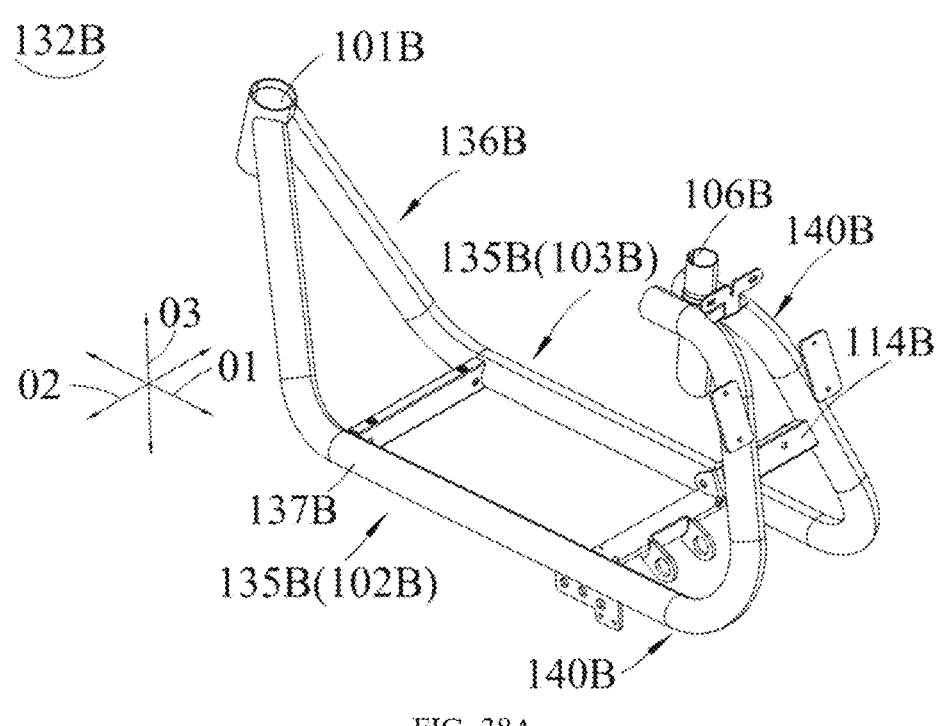
FIGS. 38A-38B are a set of overall schematic views of the mounting frame according to an embodiment of the present application.
Figure 38B:
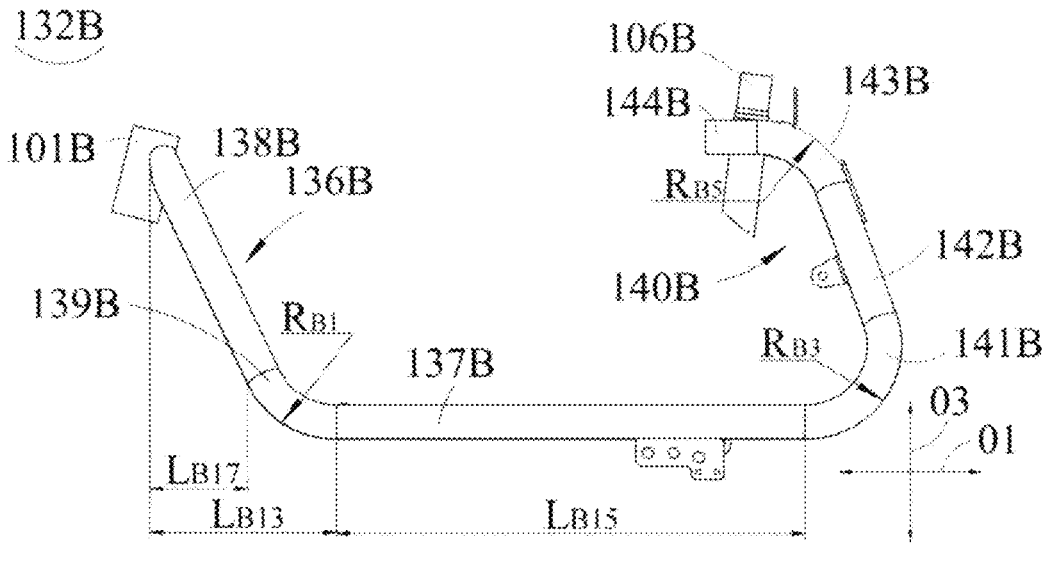

FIG. 37 is another overall schematic view of the vehicle 2B, and FIGS. 38A-38B are a set of overall schematic views of the mounting frame 132B.

Referring to FIG. 37, the mounting frame 132B may be configured such that along the first direction 01, its front end may connect to components located at the front side of the vehicle 2B, for example, the front fork 203B and the stem 202B, and its rear end may connect to components located at the rear side of the vehicle 2B, for example, the seat 301B and the rear wheel 500B. It may also be understood that the mounting frame 132B may be the skeleton of the vehicle 2B, so that the components on the front and rear sides of the vehicle 2B may maintain a stable relative position.

Referring to FIG. 38A, in some embodiments, the mounting frame 132B may include two brackets 135B arranged symmetrically with respect to the plane of symmetry a, and the two brackets may include a first bracket 102B and a second bracket 103B. In combination with FIG. 37, this may improve the gravitational balance of the frame 100B, which is expected to improve the balancing performance of the vehicle 2B and may improve riding safety.

Referring to FIG. 38A, the bracket 135B may be configured to extend along the first direction 01 from the front side of the mounting frame 132B to the rear side of the mounting frame 132B. In other words, along the second direction 02, the two brackets 135B may determine the left-side position and the right-side position of the mounting frame 132B, that is, the width of the two brackets 135B may be the width of the mounting frame 132B. In combination with FIG. 37, the two brackets 135B may be arranged symmetrically, which may facilitate the frame 100B to maintain gravity balance, may improve the balance performance of the vehicle 2B, may ensure riding safety, and may also enhance aesthetics.

Referring to FIG. 38A, in some embodiments, the bracket 135B may be integrally formed.

In some other embodiments, the bracket 135B may be assembled in segments, that is, the bracket 135B may include multiple segments and be in a separated state before assembly.

In some embodiments, the bracket 135B may be hollow, which may reduce the weight of the frame 100B and make it lighter and less laborious when the user needs to move or lift the frame 100B. In addition, in combination with FIG. 37, the hollow bracket 135B may provide wiring space, for example, to accommodate electric wires or brake cable 1401B, which may not only make the overall appearance of the vehicle 2B more aesthetically pleasing but also protect the cables, and may have the effect of being waterproof and impact-resistant.

In some embodiments, the bracket 135B may be tubular, which may reduce the weight of the bracket 135B and facilitate the lightweight design of the vehicle 2B.

In some embodiments, the bracket 135B may be made of carbon structural steel, which has high strength and is not easily deformed. In addition, a bracket 135B made of carbon structural steel may be easy to shape and process, thereby reducing production costs.

In some other embodiments, the bracket 135B may also be made of other metallic materials or plastics. The other metallic materials may include, but are not limited to, stainless steel and aluminum alloy, and the plastics may include, but are not limited to, polypropylene (PP), polyethylene (PE), and ABS plastic.

Referring to FIG. 37, in some embodiments, the bracket 135B may be circular. A circular cross section has the same moment of inertia in the 360° direction, and may have a uniform stress distribution when subjected to lateral or longitudinal impacts, thereby reducing the likelihood of deformation or bending. In addition, the rounded shape of the bracket 135B may ensure that it has no sharp edges or ridgelines, allowing powder coating or electrophoretic paint to flow evenly, with a thick film free from paint accumulation or sagging, resulting in a smoother coating appearance and more stable corrosion resistance performance. In addition, the rounded shape of the bracket 135B, that is, without sharp edges or sharp corners, may make it easier for a user or an animal to step onto or into the vehicle 2B without being caught or scratched. In addition, when the user or animal adjusts position or moves on the vehicle 2B, if they contact or bump into the bracket 135B, the arcuate surface and uniform pressure distribution may result in a weaker foreign-object sensation, which may improve comfort during movement or adjustment. In addition, when the user or animal dismounts, the tip of the foot may naturally slide outward, which may make landing more convenient and stable.

Referring to FIG. 37, in some embodiments, the outer diameter of the bracket 135B may fall within a range of 30 mm to 40 mm. When the outer diameter is greater than or equal to 30 mm, the bracket 135B may provide a more suitable connection or assembly area for other components, for example, when the bracket 135B is welded to other components, there may be a relatively sufficient welding area, which may ensure good connection strength and may reduce the likelihood of instantaneous tearing or shearing under impact or overload conditions. When the outer diameter is less than or equal to 40 mm, the stepping area provided by the bracket 135B may have a more suitable height, which may allow the user or animal to get on the vehicle with a comfortable or relatively small stepping motion.

In some embodiments, the outer diameter of the bracket 135B may be any value within the range of 30 mm to 40 mm, such as 30 mm, 33 mm, 35 mm, 37 mm, or 40 mm.

Referring to FIG. 37, in some embodiments, the cross section of the bracket 135B may be annular, and the outer surface may be smooth, which may reduce the risk of injury to the user or to people or animals around the vehicle 2B from bumping into the bracket 135B. In addition, the cross section of the bracket 135B may be annular, which may have a simple structure and be easy to process. In addition, the cross section of the bracket 135B may be annular and may also provide an aesthetic effect.

It should be understood that the wall thickness of the bracket 135B may refer to the thickness of the tube wall of the bracket 135B, which is equal to half of the difference between the outer diameter and the inner diameter. In the present application, the wall thickness of a tubular structure may refer to the thickness of the tube wall, which will not be described again hereafter.

Specifically, the wall thickness of the bracket 135B may fall within a range of 1 mm to 2.5 mm so as to have lower weight while meeting support strength requirements and being easy to manufacture.

Specifically, the wall thickness of the bracket 135B may be any value within the range of 1 mm to 2.5 mm, such as 1 mm, 1.2 mm, 1.4 mm, 1.6 mm, 1.8 mm, 2.0 mm, 2.2 mm, or 2.4 mm, or 2.5 mm.

Referring to FIG. 38B, in some embodiments, the mounting frame 132B may include the head tube 101B.

Referring to FIG. 38B, in some embodiments, the bracket 135B may include, in sequence along the first direction 01, a second upwardly extending portion 136B and a first flat portion 137B.

Referring to FIG. 38B, the second upwardly extending portion 136B may be configured to extend upward from a bottom end along the first direction 01, and a top end of the second upwardly extending portion 136B may be fixed to the head tube 101B. The first flat portion 137B may be configured such that, along the first direction 01, a front end is fixed to the bottom end of the second upwardly extending portion 136B, and, along the third direction 03, may provide upward support when the user pedals or when loads are placed thereon so as to ensure stability during riding or loading.

Referring to FIG. 38B, in some embodiments, the projection length of the second upwardly extending portion 136B on the first plane may be $L_{B13}$, which may be understood as the distance between the front end and the rear end of the second upwardly extending portion 136B. The projection length of the first flat portion 137B on the first plane may be $L_{B15}$, which may be understood as the distance between the front end and the rear end of the first flat portion 137B. A ratio $K_{B7}$ of $L_{B15}$ to $L_{B13}$ may fall within a range of 2 to 3. This may allow the first flat portion 137B to have a suitable length to provide the user with sufficient stepping space or placing space, while also being relatively compact with less space occupation, which may facilitate a miniaturized design of the vehicle.

Specifically, $K_{B7}$ may be any value within the range of 2 to 3, such as 2.0, 2.1, 2.2, 2.3, 2.4, 2.5, 2.6, 2.7, 2.8, 2.9, or 3.0.

Referring to FIG. 38B, in some embodiments, the second upwardly extending portion 136B may include a first inclined portion 138B and a first arc-shaped portion 139B. The first inclined portion 138B may be configured such that, along the first direction 01, a top end is fixed to the head tube 101B and a bottom end is fixed to a front end of the first arc-shaped portion 139B. The first arc-shaped portion 139B may be configured such that it is fixed to a front end of the first flat portion 137B.

An angle between the first inclined portion 138B and the head tube 101B may have the same range and the same effect as $\beta_{B9}$, which will not be described again here. $\beta_{B9}$ refers to the angle between the head tube 101B and the first section 123B (see FIG. 27A).

Referring to FIG. 38B, in some embodiments, the top end of the first inclined portion 138B may be fixed to the head tube 101B, and a projection length $L_{B17}$ of the first inclined portion 138B on the first plane may fall within a range of 30 mm to 70 mm. When $L_{B17} \geq 30$ mm, the first inclined portion 138B may be relatively gentle, which may help provide more space for the user or for objects carried by the user, thereby making the use of space more flexible. In addition, when $L_{B17} \leq 70$ mm, the first inclined portion 138B may have a more suitable length, which, as part of the mounting frame 132B, may also allow the mounting frame 132B to have a suitable length, thereby facilitating transportation or storage.

Specifically, $L_{B17}$ may be any value within the range of 30 mm to 70 mm, such as 30 mm, 35 mm, 40 mm, 45 mm, 50 mm, 55 mm, 60 mm, 65 mm, or 70 mm.

Referring to FIG. 38B, in some embodiments, a curvature radius $R_{B1}$ of the first arc-shaped portion 139B may fall within a range of 88 mm to 108 mm. When $R_{B1} \geq 88$ mm, the stress concentration of the first arc-shaped portion 139B may be reduced, which may decrease the occurrence of fatigue cracks at stress concentration points when subjected to long-term vibrations, thereby potentially increasing service life. When $R_{B1} \leq 108$ mm, the space occupied may be reduced, which may facilitate a miniaturized design of the vehicle 2B.

Specifically, $R_{B1}$ may be any value within the range of 88 mm to 108 mm, such as 88 mm, 90 mm, 92 mm, 94 mm, 96 mm, 98 mm, 100 mm, 102 mm, 104 mm, 106 mm, or 108 mm.

Referring to FIG. 38A, in some embodiments, the bracket 135B may include a third upwardly extending portion 140B. The first flat portion 137B may be located between the second upwardly extending portion 136B and the third upwardly extending portion 140B. The third upwardly extending portion 140B may be configured to extend upward from a bottom end along the first direction 01, and a bottom end of the third upwardly extending portion 140B may be fixed to a rear end of the first flat portion 137B. In combination with FIG. 37, the third upwardly extending portion 140B may be configured to extend upward along the first direction 01 to provide support for the seat 301B and/or the rear basket 900B, which may ensure stability of the seat 301B and/or the rear basket 900B.

Referring to FIG. 38A, in some embodiments, the third upwardly extending portion 140B may have two bends. Along the third direction 03, a first bend may be located at a bottom end of the third upwardly extending portion 140B, and a second bend may be located at a top end of the third upwardly extending portion 140B. In combination with FIG. 37, along the first direction 01, the first bend may be located between the second bend and a center of the rear wheel 500B, and the third upwardly extending portion 140B may be approximately C-shaped. Therefore, along the first direction 01, the space occupied by the third upwardly extending portion 140B may be relatively small, which may allow the bracket 135B to have a shorter length and achieve a miniaturized design.

Referring to FIG. 38A, in some embodiments, along the second direction 02, the third upwardly extending portion 140B on the left side and the third upwardly extending portion 140B on the right side may be non-contacting, that is, a space may be left for installation of the middle tube 106B.

Referring to FIG. 38B, in some embodiments, the third upwardly extending portion 140B may include, in sequence along the third direction 03, a second arc-shaped portion 141B, a second inclined portion 142B, a third arc-shaped portion 143B, and a horizontal section 144B. The second arc-shaped portion 141B may be configured such that, along the first direction 01, a front end is fixed to the first flat portion 137B and a rear end is fixed to a bottom end of the second inclined portion 142B. The third arc-shaped portion 143B may be configured such that, along the third direction 03, a bottom end is fixed to a top end of the second inclined portion 142B and a top end is fixed to a rear end of the horizontal section 144B.

Referring to FIG. 38B, in some embodiments, a curvature radius $R_{B3}$ of the second arc-shaped portion 141B may fall within a range of 88 mm to 108 mm. When $R_{B3} \geq 88$ mm, the stress concentration of the second arc-shaped portion 141B may be reduced, which may decrease the occurrence of fatigue cracks at stress concentration points when subjected to long-term vibrations, thereby potentially increasing service life. When $R_{B3} \leq 108$ mm, the space occupied may be reduced, which may facilitate a miniaturized design of the vehicle 2B.

Specifically, $R_{B3}$ may be any value within the range of 88 mm to 108 mm, such as 88 mm, 90 mm, 92 mm, 94 mm, 96 mm, 98 mm, 100 mm, 102 mm, 104 mm, 106 mm, or 108 mm.

Referring to FIG. 38B, in some embodiments, a curvature radius $R_{B5}$ of the third arc-shaped portion 143B may fall within a range of 88 mm to 108 mm. When $R_{B5} \geq 88$ mm, the stress concentration of the third arc-shaped portion 143B may be reduced, which may decrease the occurrence of fatigue cracks at stress concentration points when subjected to long-term vibrations, thereby potentially increasing service life. When $R_{B5} \leq 108$ mm, the space occupied may be reduced, which may facilitate a miniaturized design of the vehicle 2B.

Specifically, $R_{B5}$ may be any value within the range of 88 mm to 108 mm, such as 88 mm, 90 mm, 92 mm, 94 mm, 96 mm, 98 mm, 100 mm, 102 mm, 104 mm, 106 mm, or 108 mm.

Referring to FIG. 38B, in some embodiments, $R_{B1}$, $R_{B3}$, and $R_{B5}$ may be partially or entirely the same. Using the same curvature radius may enhance mold versatility, reduce tooling replacement, shorten processing cycles, standardize processing procedures, simplify process parameters, and reduce operational difficulty.

Referring to FIG. 38B, in some embodiments, an angle between the first flat portion 137B and the second inclined portion 142B may have the same range and the same effect as $\beta_{B7}$, which will not be described again here. $\beta_{B7}$ refers to the angle between the third section 125B and the second section 124B (see FIG. 17C).

Referring to FIG. 38A, in some embodiments, the mounting frame 132B may include a reinforcement rod 114B. Two ends of the reinforcement rod 114B may be respectively fixedly connected to the two brackets 135B so as to better maintain a spacing between the two brackets 135B.

In some embodiments, the reinforcement rod 114B may be fixedly welded to the two brackets 135B.

FIGS. 39-43 are schematic structural views of some other implementations of the mounting frame, such as the mounting frame 132G, mounting frame 132H, mounting frame 132I, mounting frame 132J, and mounting frame 132K.

Figure 39:
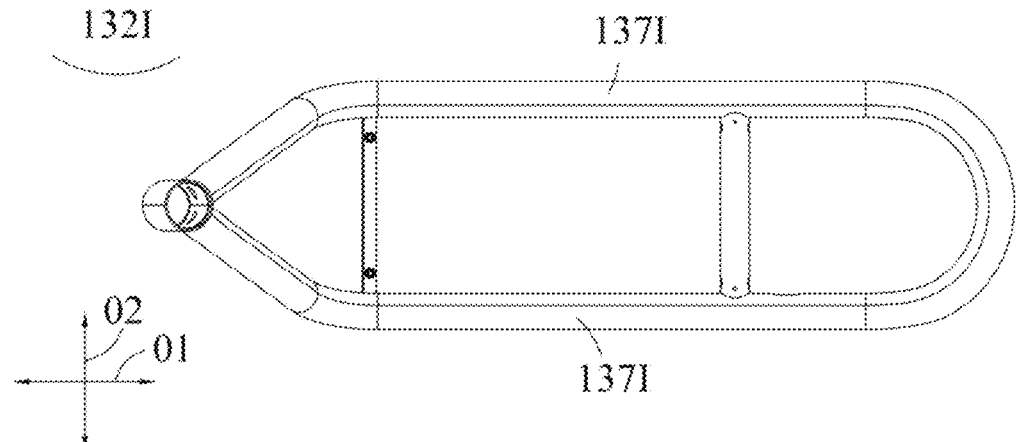
FIG. 39 is a schematic structural view of another implementation of the mounting frame.

Referring to FIG. 39, in some embodiments, the vehicle may include the mounting frame 132I. Along the first direction 01, a rear end of the first flat portion 1371 on the left side may be bent to the right, and a rear end of the first flat portion 1371 on the right side may be bent to the left, such that the rear ends of the two first flat portions 1371 may be joined and secured.

Figure 40:
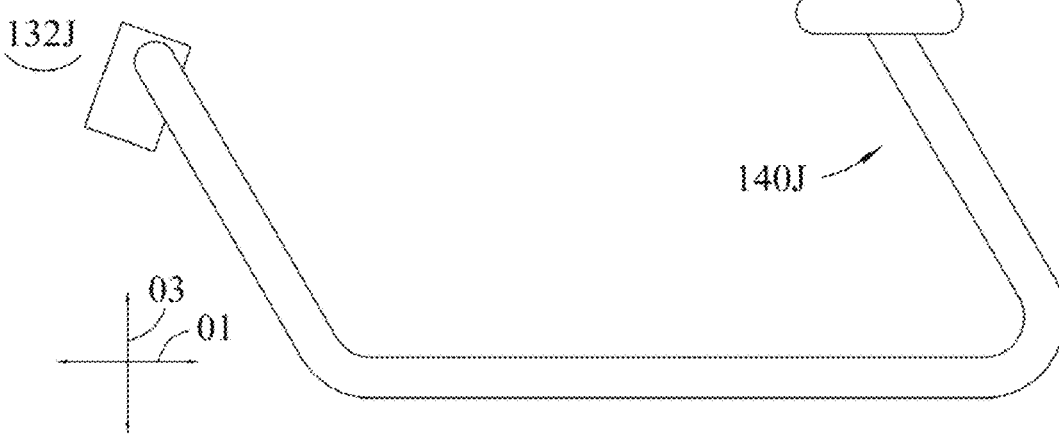
FIG. 40 is a schematic structural view of another implementation of the mounting frame.

Referring to FIG. 40, in some embodiments, the vehicle may include the mounting frame 132J. The third upwardly extending portion 140J may have only one bend, which is located at the bottom, and may be bent only once, which may facilitate manufacturing.

Figure 41:
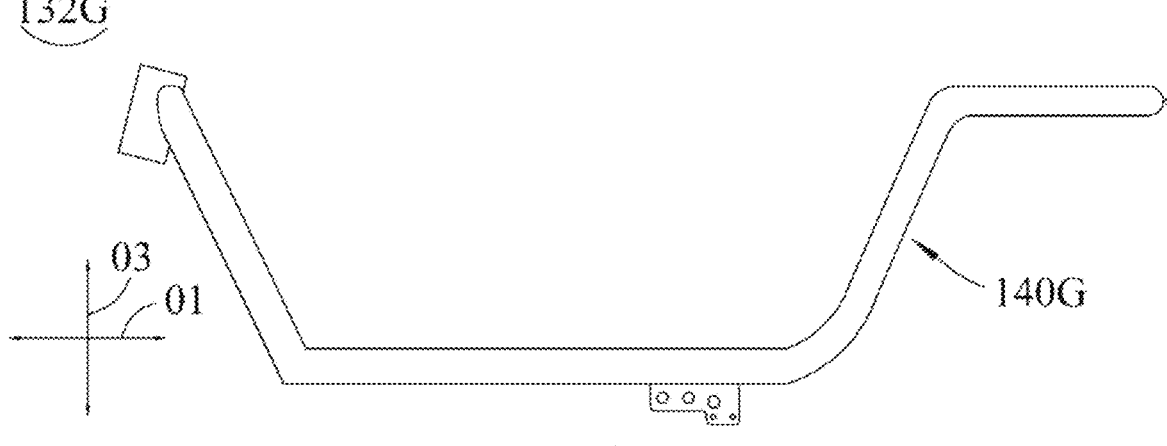
FIG. 41 is a schematic structural view of another implementation of the mounting frame.

Referring to FIG. 41, in some embodiments, the vehicle may include the mounting frame 132G. The third upwardly extending portion 140G may have two bends. Along the first direction 01, a first bend may be located at a front end of the third upwardly extending portion 140G, and a second bend may be located at a middle portion of the third upwardly extending portion 140G. In addition, along the first direction 01, a rear end of the third upwardly extending portion 140G may be located at a rear side of a center of the rear wheel. The third upwardly extending portion 140G may be configured to extend along a periphery of the rear wheel and to avoid interference therewith. For example, a portion between the first bend and the second bend may be located at a front side of the rear wheel, and a portion between the second bend and the rear end of the third upwardly extending portion 140G may be located at a top side of the rear wheel. Therefore, along the first direction 01, the third upwardly extending portion 140G may provide support over a wider range, such as providing support at a bottom of the rear basket, thereby helping to ensure stability of the rear basket, for example, when carrying a relatively heavy load. In addition, along the second direction 02, a rear end of the third upwardly extending portion 140G on the left side may be bent to the right, and a rear end of the third upwardly extending portion 140G on the right side may be bent to the left, such that the rear ends of the two third upwardly extending portions 140G may be joined and secured.

Figure 42:
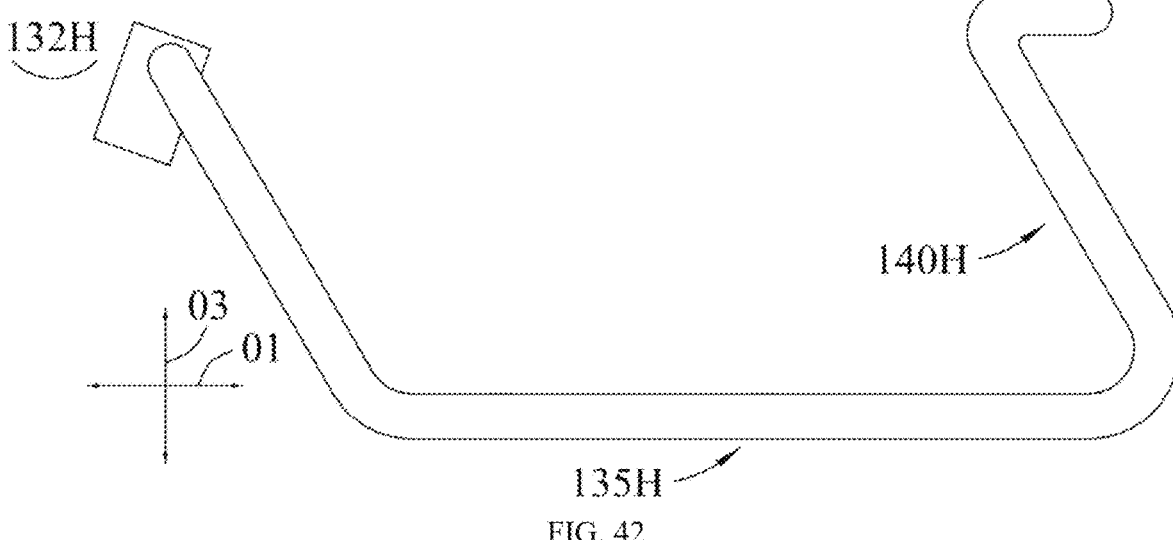
FIG. 42 is a schematic structural view of another implementation of the mounting frame.

Referring to FIG. 42, in some embodiments, the frame 100H may include the mounting frame 132H. The third upwardly extending portion 140H may have two bends. Along the third direction 03, a first bend may be located at a bottom end of the third upwardly extending portion 140H, and a second bend may be located at a top end of the third upwardly extending portion 140H. In addition, along the first direction 01, the first bend may be located between the second bend and a center of the rear wheel. The third upwardly extending portion 140H may be approximately S-shaped. Therefore, along the first direction 01, the space occupied by the third upwardly extending portion 140H may be smaller, which may allow a length of the bracket 135H to be shorter, thereby achieving a miniaturized design.

Figure 43:
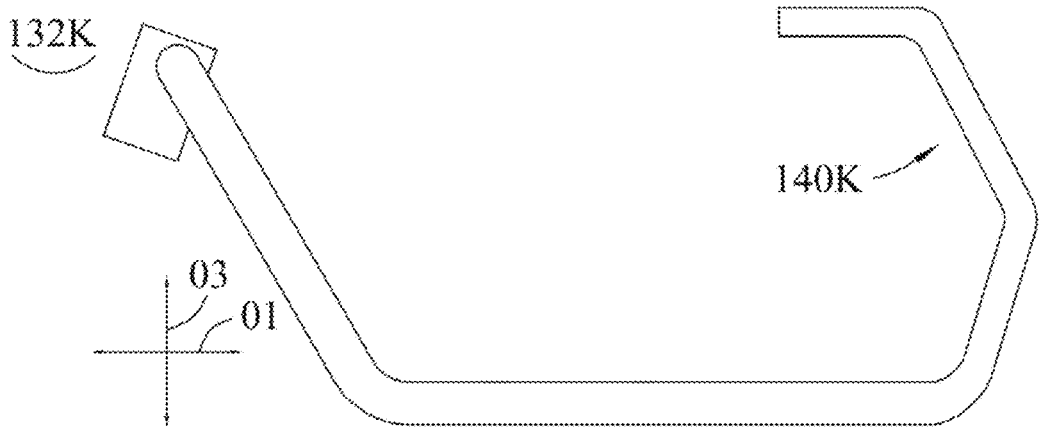
FIG. 43 is a schematic structural view of another implementation of the mounting frame.

Referring to FIG. 43, in some embodiments, the vehicle may include the mounting frame 132K. The third upwardly extending portion 140K may have three bends. Along the third direction 03, a first bend may be located at a bottom end of the third upwardly extending portion 140K, a second bend may be located approximately at a middle portion of the third upwardly extending portion 140K, and a third bend may be located at a top end of the third upwardly extending portion 140K. In addition, along the first direction 01, the third bend may be located between the first bend and the second bend, and the second bend may be located at a front side of a center of the rear wheel. The third upwardly extending portion 140K may be more aesthetically pleasing and may also provide more ample space for a user to step on or to place items.

Figures 44A, 44B:
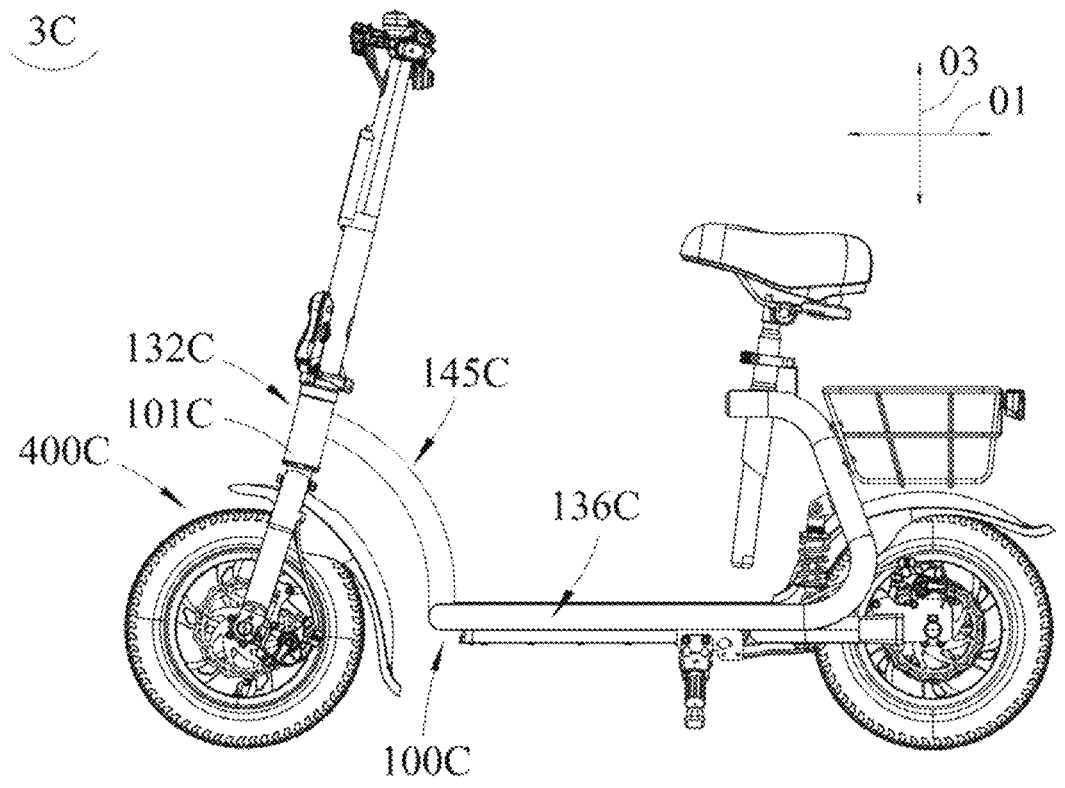
FIGS. 44A-44B are a set of overall schematic structural views of another implementation of the mounting frame.

FIGS. 44A-44B are schematic structural views of some other implementations of the vehicle, such as the vehicle 3C.

Referring to FIGS. 44A and 44B, in some embodiments, the vehicle 3C may include the frame 100C. The frame 100C may include the mounting frame 132C. The mounting frame 132C may include, along the first direction 01, an intermediate section 145C disposed between the head tube 101C and the bracket 136C. The intermediate section 145C may be configured to connect to the head tube 101C at a front side and to connect to the two brackets 136C at a rear side. The two brackets 136C may be symmetrically disposed relative to the intermediate section 145C. A top end of the intermediate section 145C may be fixed to the head tube 101C, and a bottom end of the intermediate section 145C may be fixed to a front end of the bracket 136C. Since the intermediate section 145C may be approximately located at a middle region of the mounting frame 132C, along the second direction 02, a width of the intermediate section 145C may be relatively small, which may reduce resistance encountered by the vehicle 3C during travel, and may also facilitate a miniaturized design. In addition, the intermediate section 145C and the bracket 136C may be relatively independent, which may allow their external shapes to be designed separately, providing greater flexibility in shape selection.

Referring to FIG. 44A, in some embodiments, the intermediate section 145C may be configured to bend forward along the first direction 01, which may provide more space for other parts or components. For example, it may provide more operating space for mounting, adjustment, or maintenance of the front wheel 400C, thereby reducing operational difficulty.

Figure 45:
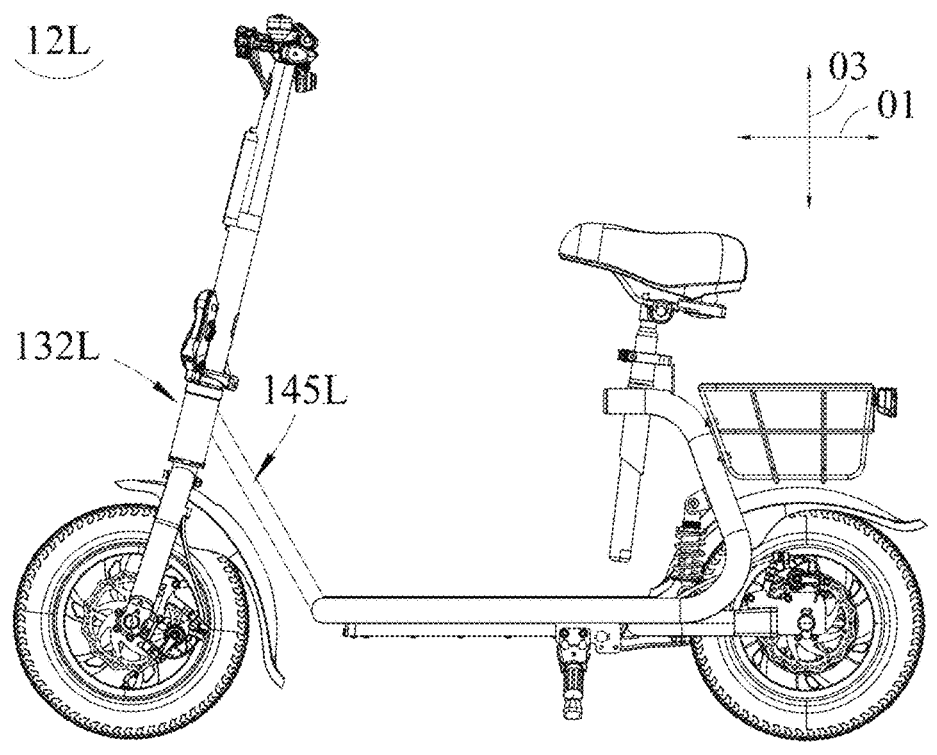
FIG. 45 is an overall schematic structural view of another implementation of the mounting frame.

FIG. 45 is a schematic structural view of some other implementations of the vehicle, such as the vehicle 12L.

Referring to FIG. 45, in some embodiments, the vehicle 12L may include the mounting frame 132L. The intermediate section 145L may be configured to incline forward along the first direction 01, with a regular shape, which may facilitate manufacturing. In addition, when an item needs to be placed in an inclined position or has a corresponding leaning position, the intermediate section 145L may provide supporting force for the item. When it is desired to place more or larger items, the space created by the forward inclination of the intermediate section 145L may be further utilized. The forward inclination of the intermediate section 145L may provide the user with diverse and flexible storage options.

Figure 46A:
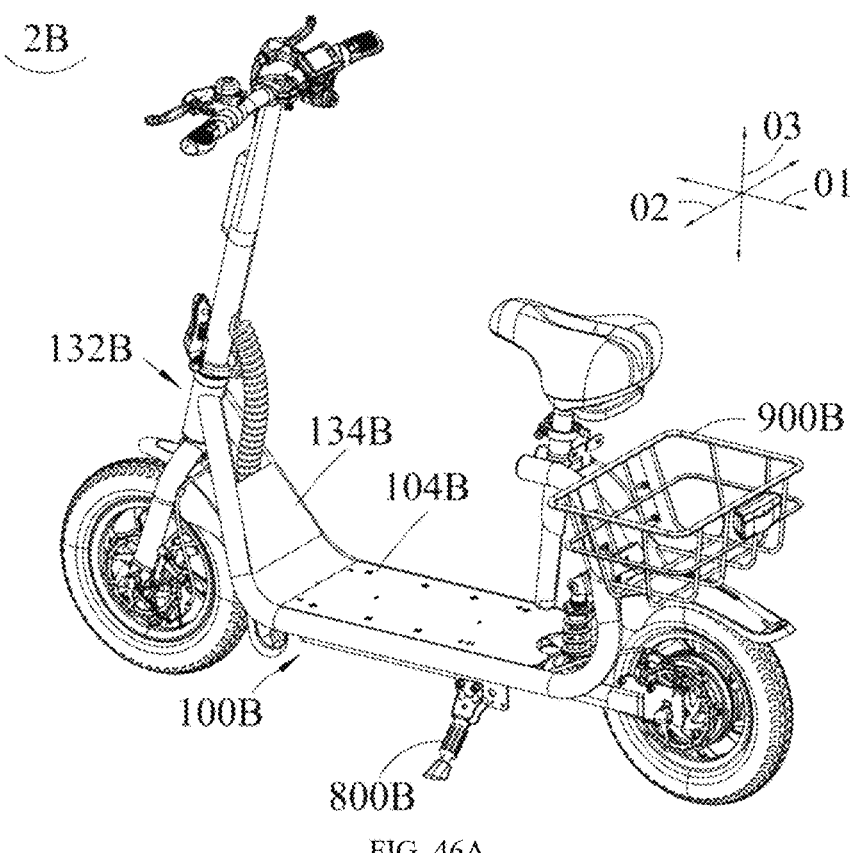
FIGS. 46A-46D are a set of overall schematic structural views of the mounting frame.
Figure 46B:
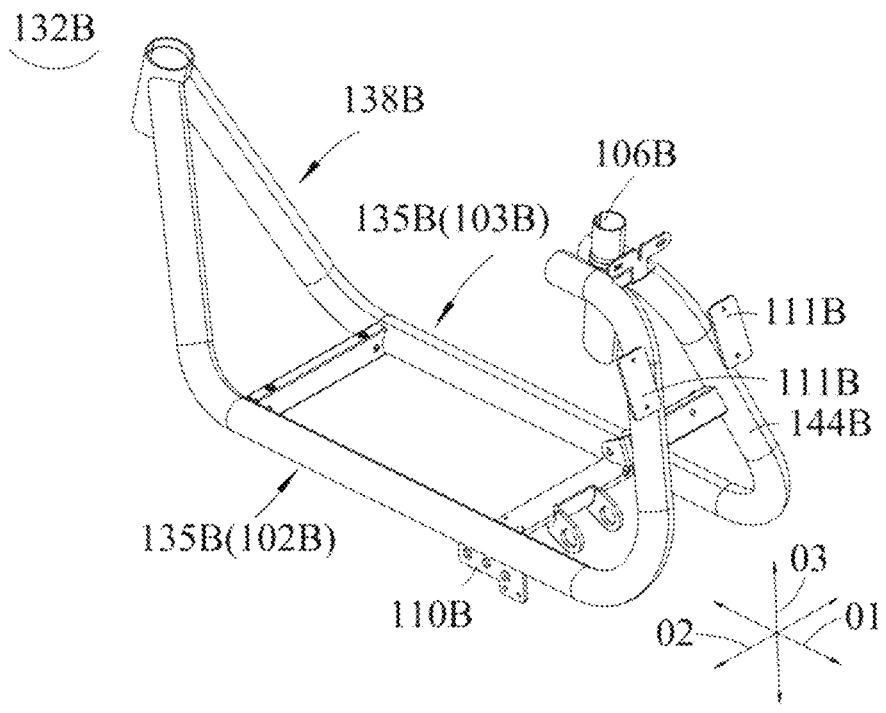
Figure 46C:
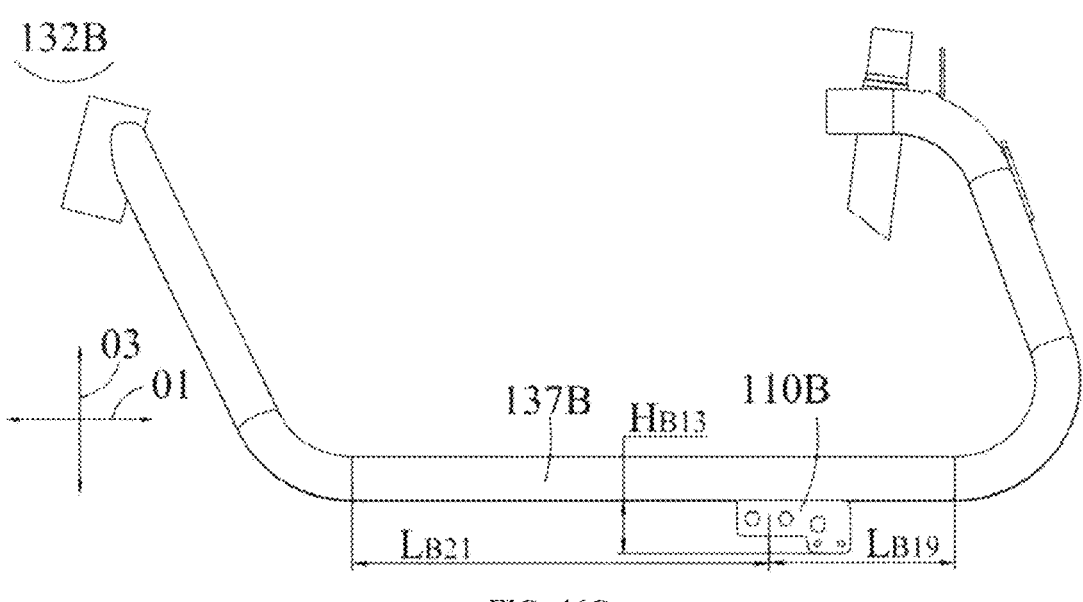
Figure 46D:
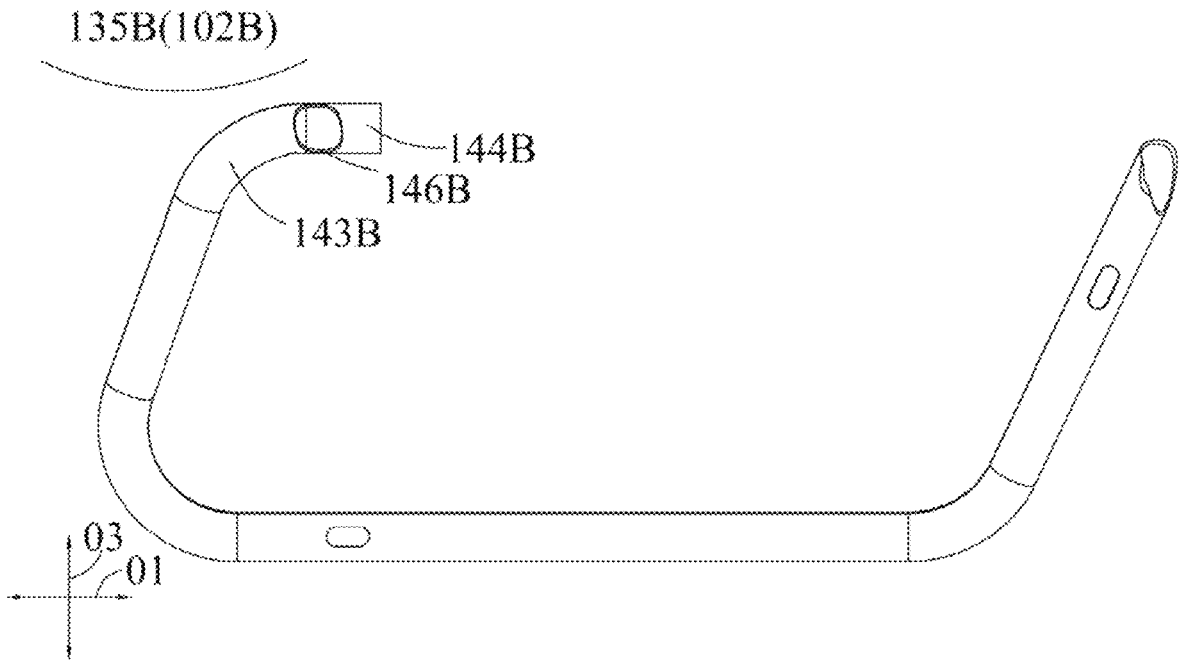

FIGS. 46A-46D are a set of overall schematic structural views of the mounting frame 132B. FIG. 46C is a schematic parameter view illustrating of the mounting frame 132B.

Referring to FIG. 46B, in some embodiments, the mounting frame 132B may include the middle tube 106B. In combination with FIG. 46D, along the second direction 02, a third arc-shaped portion 143B and a horizontal section 144B on the left side may be provided with a first mounting groove 146B for mounting the middle tube 106B, and a third arc-shaped portion 143B and a horizontal section 144B on the right side may also be provided with a first mounting groove 146B for mounting the middle tube 106B. Through the two first mounting grooves 146B, positioning and mounting of the middle tube 106B may be quickly completed. In addition, the internal spaces of the third arc-shaped portion 143B and the horizontal section 144B may be utilized, so that the mounting frame 132B may be more compact, which may facilitate achieving a miniaturized design.

In some embodiments, the middle tube 106B, the third arc-shaped portion 143B, and the horizontal section 144B may be welded and fixed.

Referring to FIG. 46B, in some embodiments, the mounting frame 132B may include the first weld tab 110B.

Referring to FIG. 46C, in some embodiments, along the first direction 01, a kickstand supporting position provided by the first weld tab 110B may be spaced from a rear end of the first flat portion 137B by a distance $L_{B19}$, and the kickstand supporting position provided by the first weld tab 110B may be spaced from a front end of the first flat portion 137B by a distance $L_{B21}$. A ratio of $L_{B21}$ to $L_{B19}$ may be $K_{B9}$, and $K_{B9}$ may fall within a range of 2 to 2.6. In combination with FIG. 46A, when $K_{B9} \geq 2$, along the first direction 01, the kickstand 800B may have a suitable distance from the front end of the first flat portion 137B, which may reduce the likelihood of interference with foot operations (such as pedaling or placing the foot) during starting or stopping of riding, thereby reducing disturbance to normal riding actions. When $K_{B9} \leq 2.6$, the kickstand 800B may have a suitable distance from the rear end of the first flat portion 137B, such that a center of gravity of the vehicle 2B is relatively rearward when parked, which may help reduce a risk of the vehicle 2B tipping over and may enhance reliability of use.

Specifically, $K_{B9}$ may be any value within the range of 2 to 2.6, such as 2, 2.1, 2.2, 2.3, 2.4, 2.5, or 2.6.

Referring to FIG. 46C, in some embodiments, along the third direction 03, a height $H_{B13}$ of the first weld tab 110B may fall within a range of 20 mm to 55 mm. When $H_{B13} \geq 20$ mm, the first weld tab 110B may provide more mounting positions for the kickstand 800B, which may reduce installation difficulty, and may also help ensure that the first weld tab 110B has a sufficient force-bearing area, thereby reducing the likelihood of bending or deformation of the first weld tab 110B, for example, when the vehicle 2B is relatively heavy or carries a large load. When $H_{B13} \leq 55$ mm, the first weld tab 110B may have a suitable distance from the ground, which may reduce a risk of collision with the ground or objects on the ground during riding, thereby helping to ensure passability and riding safety.

Specifically, $H_{B13}$ may be any value within the range of 20 mm to 55 mm, such as 20 mm, 25 mm, 30 mm, 35 mm, 40 mm, 45 mm, 50 mm, or 55 mm.

In some embodiments, the first weld tab 110B and the first flat portion 137B may be welded and fixed.

Referring to FIG. 46B, in some embodiments, the mounting frame 132B may include the second weld tab 111B.

Referring to FIG. 46B, in some embodiments, the second weld tab 111B may be distributed on both sides on the two brackets 13B along the second direction 02 to define a front region and a rear region. It may also be understood that the bracket 135B located on the left side may be provided with the second weld tab 111B, and the bracket 135B located on the right side may also be provided with the second weld tab 111B, to divide the front region and the rear region in a discrete form, which may free up the space between the two brackets 135B, and in conjunction with FIG. 46A, the rear basket 900B may be installed.

Referring to FIG. 46B, in some embodiments, the included angle between the second inclined portion 142B and the second weld tab 111B, and the included angle between the second weld tab 111B and the third section 125B may be the same, and the effects may also be the same, which will not be repeated here.

In some embodiments, the second weld tab 111B may be welded and fixed to the second inclined portion 142B.

Figure 47:
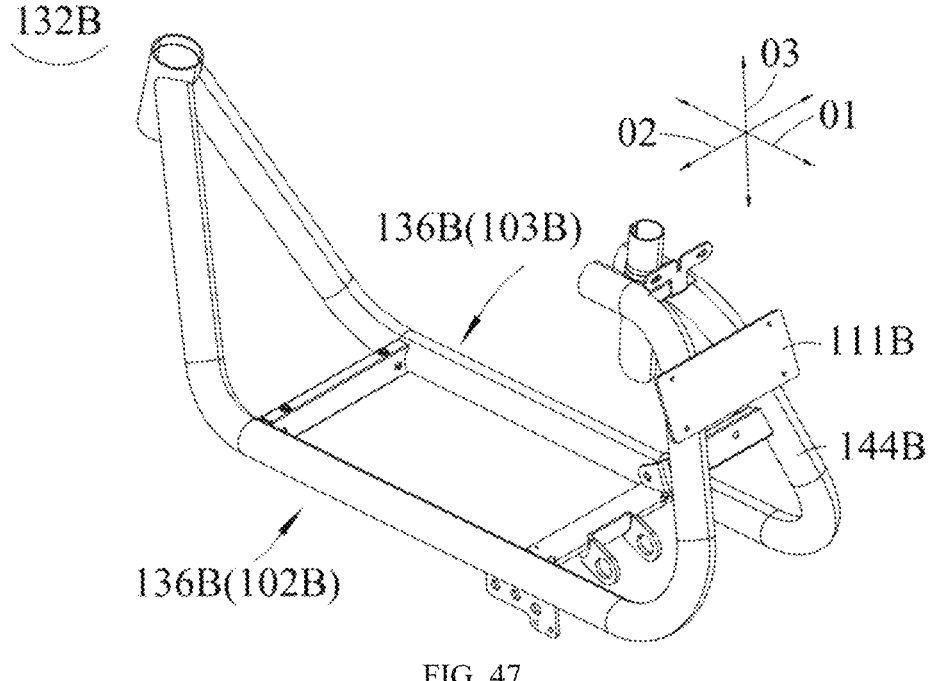
FIG. 47 is a schematic structural view of another implementation of the second weld tab.

FIG. 47 is a schematic structural view of some other implementations of the second weld tab 111B.

Referring to FIG. 47, in some other embodiments, the second weld tab 111B may divide a front region and a rear region on the two brackets 135B in a spanning manner along the second direction 02. It may also be understood that the second weld tab 111B may extend from the bracket 135B located on the left side to the bracket 135B located on the right side along the second direction 02 to divide the front region and the rear region in a linearly extending manner. The space between the two brackets 135B may be utilized to install the rear basket, which is expected to make the mounting frame 132B as a whole more compact. In addition, it helps the two brackets 135B to maintain a stable spacing, which may improve the stability of the mounting frame 132B.

Figure 48A:
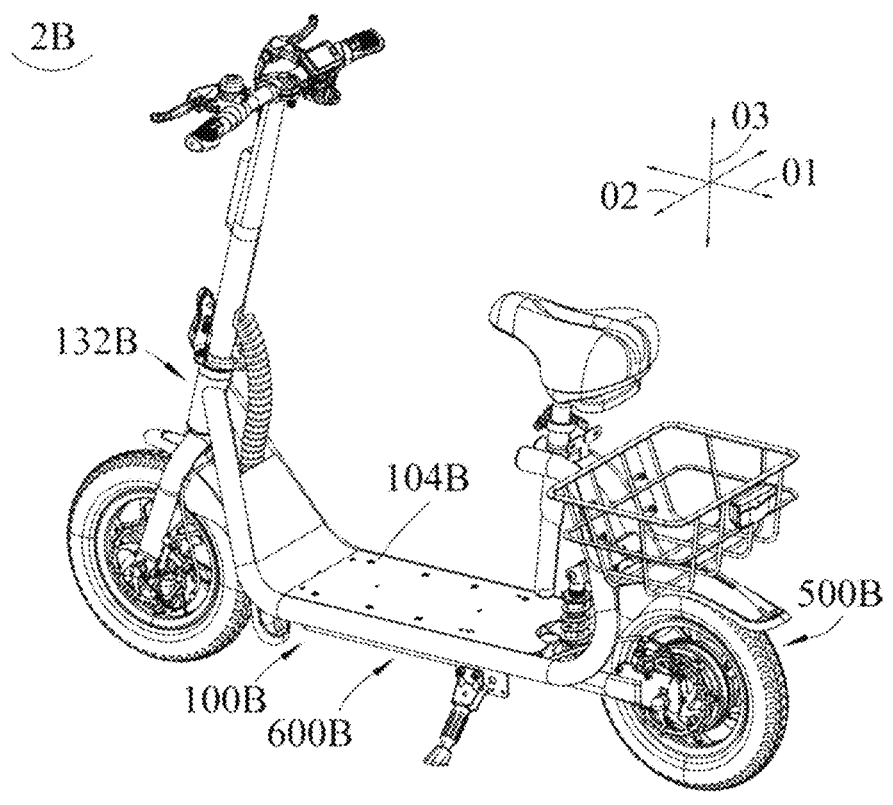
FIGS. 48A-48B are another set of overall schematic structural views of the mounting frame.
Figure 48B:
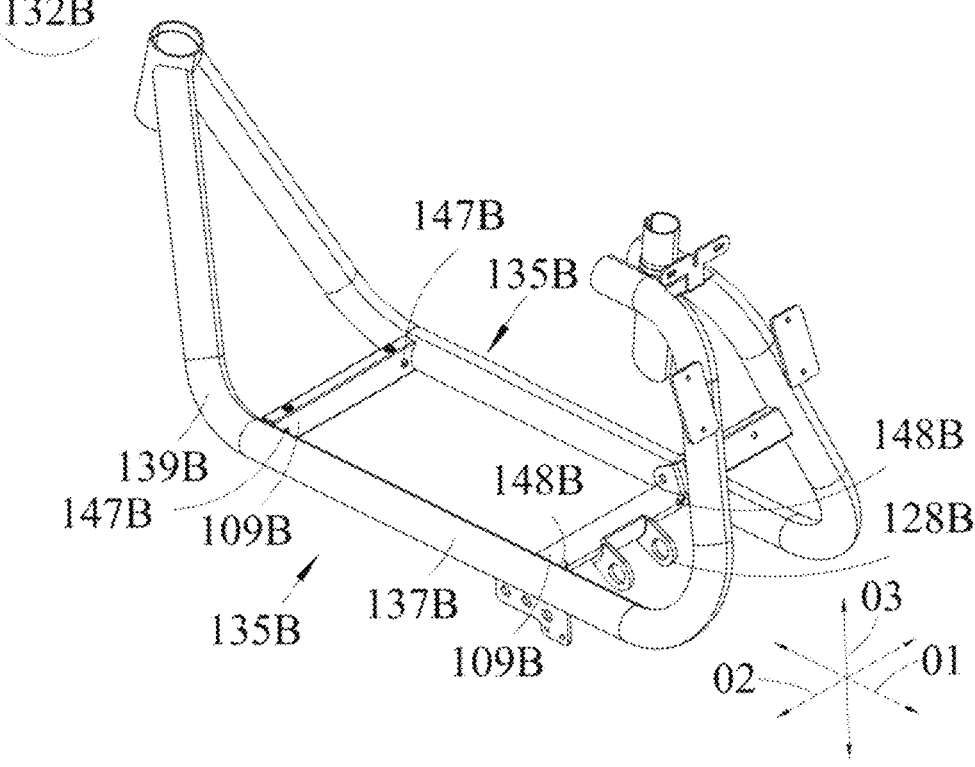

FIGS. 48A-48B are another set of overall schematic structural views of the mounting frame 132B.

Referring to FIG. 48B, in some embodiments, the mounting frame 132B may include a reinforcing rib 109B located on the front side and a reinforcing rib 109B located on the rear side. Two ends of the reinforcing rib 109B located on the front side may be respectively fixedly connected to the two brackets 135B. Two ends of the reinforcing rib 109B located on the rear side may also be respectively fixedly connected to the two brackets 135B. The provision of the reinforcing rib 109B located on the front side and the reinforcing rib 109B located on the rear side helps to keep the spacing of the two brackets 135B stable, and in conjunction with FIG. 48A, helps to improve the structural stability of the frame 100B.

Referring to FIG. 48B, in some embodiments, a reinforcing rib 109B located on the front side and a reinforcing rib 109B located on the rear side may be disposed on the brackets 135B, totaling two reinforcing ribs, and it may be understood that, in some other embodiments, only one reinforcing rib 135B, or more than two reinforcing ribs 135B, may be disposed on the brackets 135B.

Referring to FIG. 48B, in some embodiments, the reinforcing rib 109B located on the front side may extend along the second direction 02 and may be perpendicular to the brackets 135B to have higher stability when supporting the two brackets 135B, and in conjunction with FIG. 48A, it is expected to improve the durability of the frame 100B. In addition, the reinforcing rib 109B located on the front side may also be shorter, which may reduce the weight and is expected to reduce material costs.

Referring to FIG. 48B, in some embodiments, the reinforcing rib 109B located on the front side may be located at the rear end of the first arc-shaped portion 139B, so that the overall geometric stability of the structure may be better, the reinforcing rib 109B located on the front side is not prone to bending or deformation, which is beneficial to improving the overall stability of the mounting frame 132B. In addition, in conjunction with FIG. 48A, along the first direction 01, the space on the rear side may also be freed up, which is expected to allow for the installation of other parts or components, such as the power mechanism 600B.

Referring to FIG. 48B, in some embodiments, the reinforcing rib 109B located on the front side may be located at the front end of the first flat portion 137B, the overall geometric stability of the structure is good, the reinforcing rib 109B located on the front side is not prone to bending or deformation, which is beneficial to improving the overall stability of the mounting frame 132B.

Referring to FIG. 48B, in some embodiments, the reinforcing rib 109B located on the rear side may extend along the second direction 02 and may be perpendicular to the brackets 135B to better improve the stability of the fixed spacing between the two brackets 135B, and in conjunction with FIG. 48A, the structural stability of the frame 100B may be improved. In addition, the reinforcing rib 109B located on the rear side may also be shorter, which may reduce the weight and may reduce material costs.

Referring to FIG. 48B, in some embodiments, the reinforcing rib 109B located on the rear side may be located at a position on the first flat portion 137B close to the rear end, that is, the reinforcing rib 109B located on the rear side may be located between the middle portion and the rear end of the first flat portion 137B, so that when the reinforcing rib 109B located on the rear side supports the first flat portion 137B, the stability is better; at the same time, in conjunction with FIG. 48A, along the first direction 01, the space on the rear side may also be freed up, which is expected to allow for the installation of other parts or components, such as the rear wheel 500B, which is beneficial to realizing a miniaturized design of the vehicle 2B. In addition, the space on the front side may also be freed up, which is expected to allow for the installation of other parts or components, such as the power mechanism 600B.

Referring to FIG. 48B, in some embodiments, the first connecting portion 128B may be fixedly disposed on the reinforcing rib 109B located on the rear side, and therefore, the installation positions of the reinforcing rib 109B located on the front side and the reinforcing rib 109B located on the rear side may not be swapped. Perpendicular to the second direction 02, the cross-sectional shape of the reinforcing rib 109B located on the front side and the cross-sectional shape of the reinforcing rib 109B located on the rear side may be different to have a mistake-proofing effect during installation; that is, the risk of swapping the reinforcing rib 109B located on the front side and the reinforcing rib 109B located on the rear side during installation may be reduced, which is expected to improve the operator's operating efficiency and improve the qualification rate.

Figure 49:
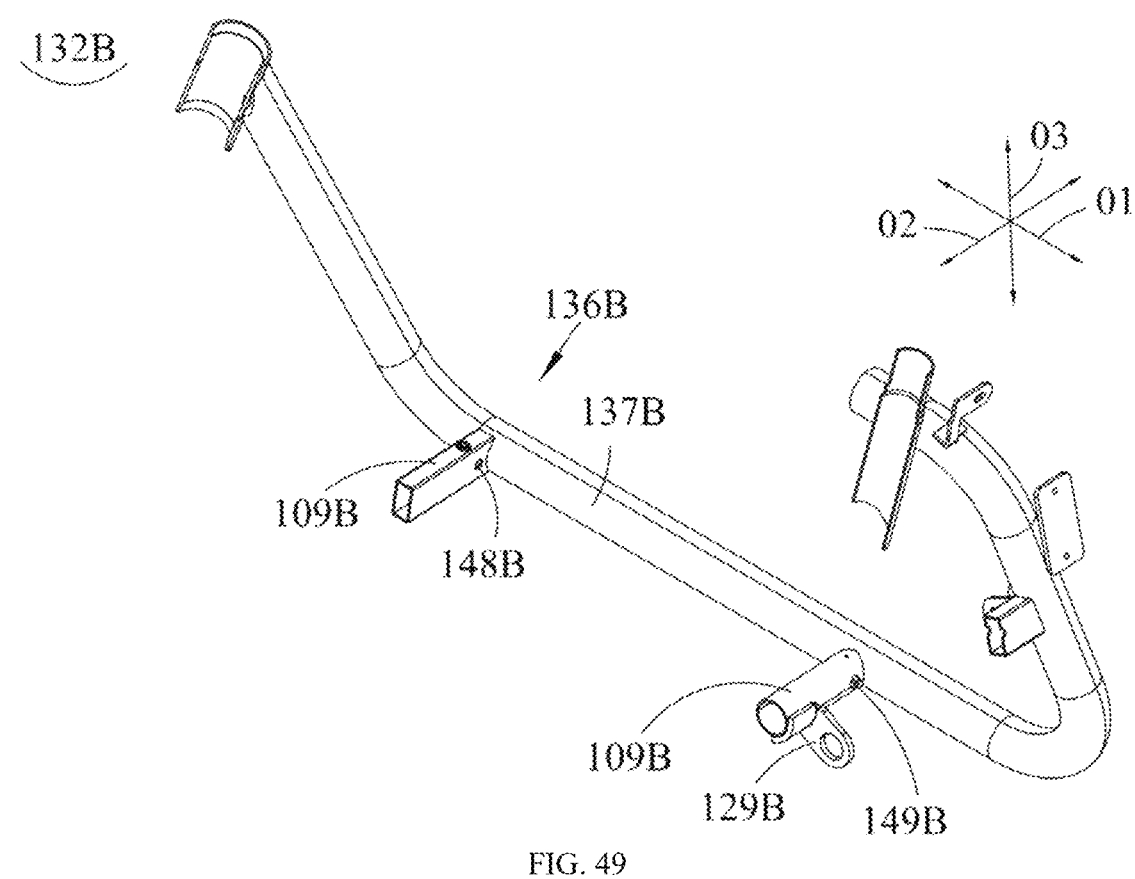
FIG. 49 is a sectional view of the mounting frame.
Figure 50A:
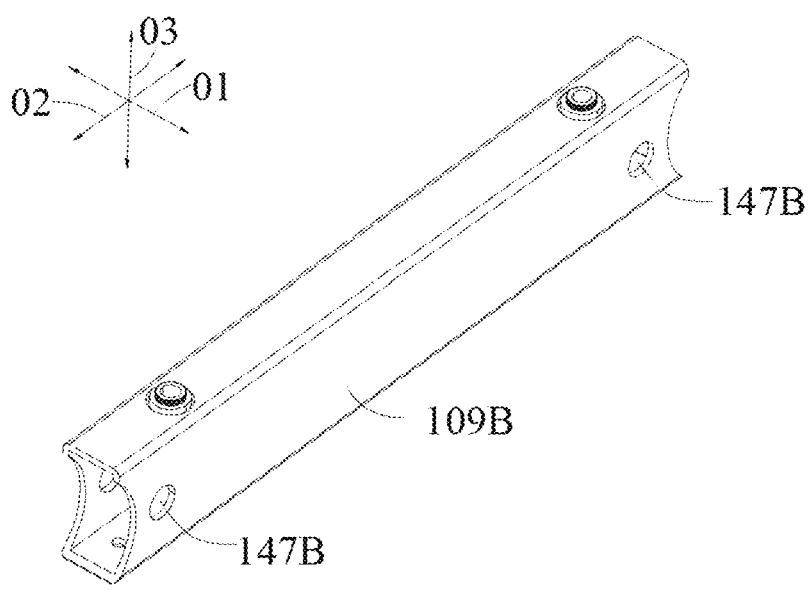
FIGS. 50A-50F are a set of schematic structural views of the reinforcing rib located on the front side.
Figure 50B:
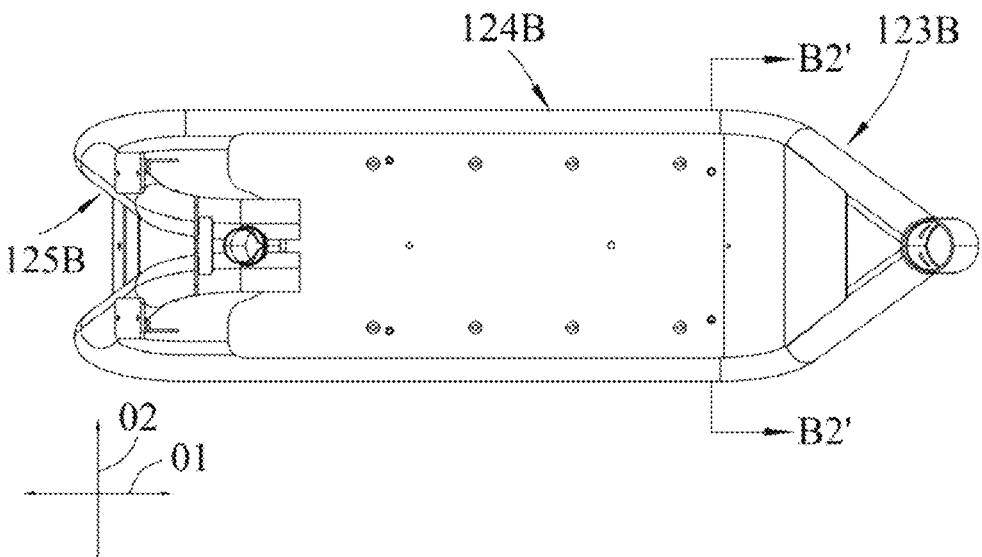
Figure 50C:
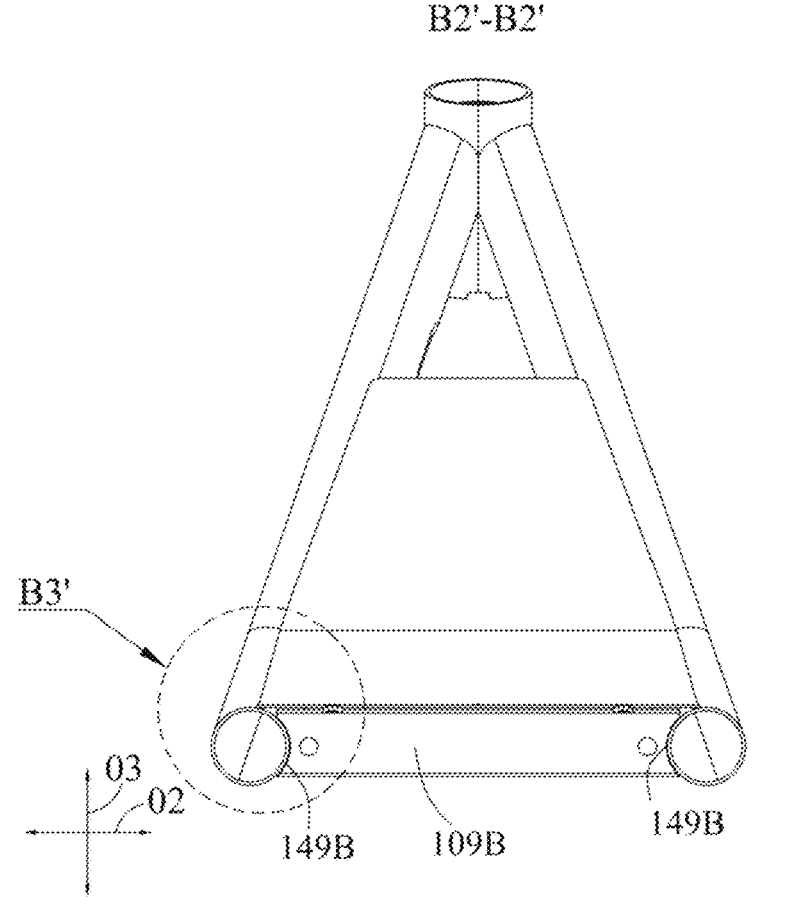
Figure 50D:
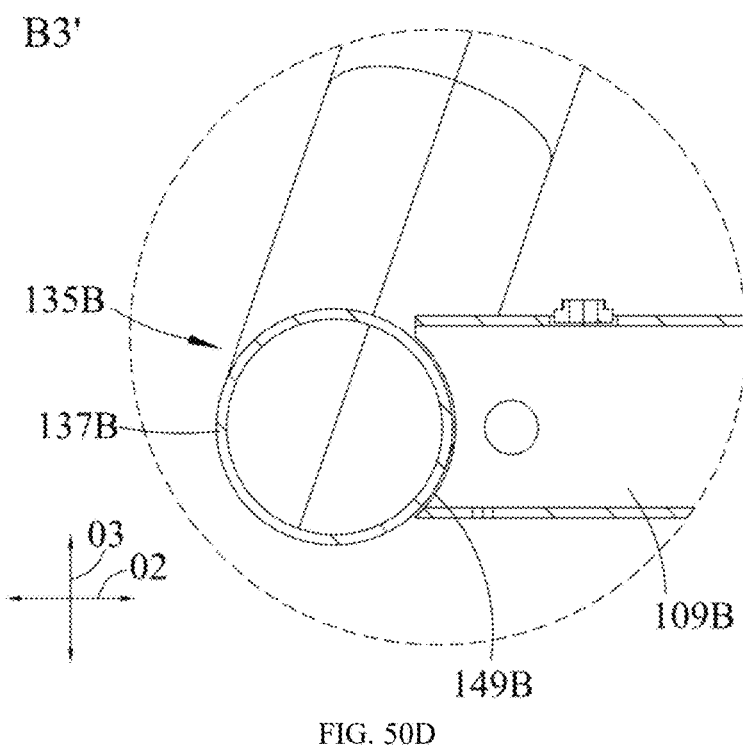
Figure 50E:
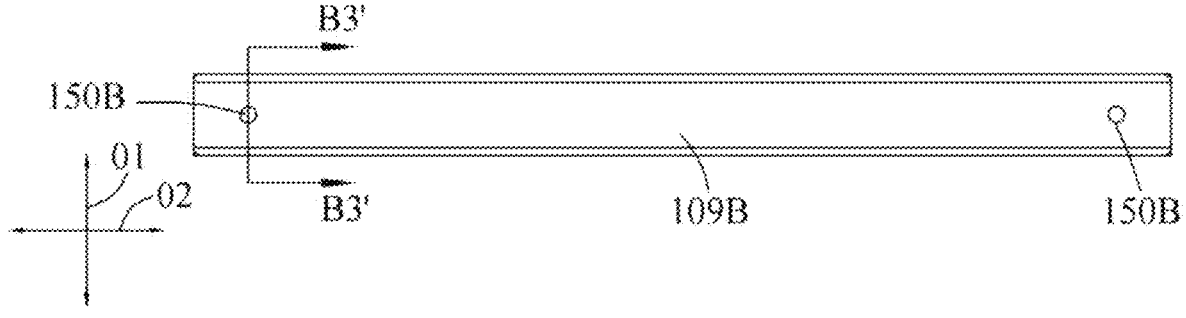
Figure 50F:
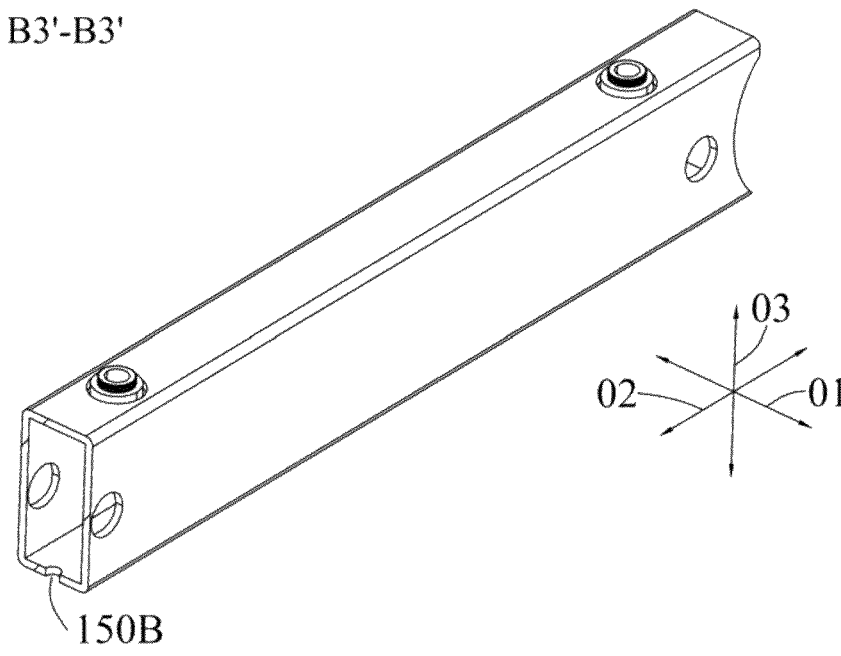

FIG. 49 is a cross-sectional view of the mounting frame 132B, and FIGS. 50A-50F are a set of schematic structural views of the reinforcing rib 109B located on the front side. Wherein, FIG. 50C is a cross-sectional view taken along line B2'-B2' in FIG. 50B, FIG. 50D is an enlarged schematic view of the portion B3' in FIG. 50C, and FIG. 50F is a cross-sectional view taken along line B3'-B3' in FIG. 50E.

Referring to FIG. 49, in some embodiments, the cross-section of the reinforcing rib 109B located on the front side, perpendicular to the second direction 02, may be in a rectangular ring shape, which, while satisfying the support strength, reduces the weight of the reinforcing rib 109B located on the front side, contributing to the lightweight design of the vehicle 2B; in addition, it may also save the material used for preparing the reinforcing rib 109B located on the front side, which is expected to reduce production costs; in addition, the rectangular ring shape is a regular shape with a simple and regular structure, which is easy to process, and is expected to reduce the processing difficulty and cost.

It may be understood that, in some other embodiments, the cross-section of the reinforcing rib 109B located on the front side, perpendicular to the second direction 02, is not limited to a rectangular ring shape, and may also have other regular or irregular shapes, such as a circular ring shape, an elliptical ring shape, etc.

Referring to FIG. 50A, in some embodiments, the reinforcing rib 109B located on the front side may be hollow, which saves the material used for preparing the reinforcing rib 109B located on the front side and is expected to reduce production costs.

Referring to FIG. 50A, in some embodiments, the reinforcing rib 109B located on the front side may be tubular, which may reduce the weight and contribute to the lightweight design of the vehicle 2B.

In some embodiments, the material of the reinforcing rib 109B located on the front side may be carbon structural steel, which has high strength and is not easily deformed. In addition, it is easy to shape and process, reducing production costs.

In some other embodiments, the material of the reinforcing rib 109B located on the front side may also be other metal materials or plastics. The other metal materials include, but are not limited to, stainless steel and aluminum alloy, and the plastics include, but are not limited to, polypropylene (PP), polyethylene (PE), and ABS plastic.

In some embodiments, the thickness of the reinforcing rib 109B located on the front side may fall within a range of 1 mm to 2.5 mm. When the thickness is greater than or equal to 1.5 mm, it has good structural strength, reducing the occurrence of bending or deformation when the road surface is relatively bumpy, causing greater impact, or when the user is heavier and/or is carrying heavier items. When the thickness is less than or equal to 2.5 mm, the self-weight of the reinforcing rib 109B located on the front side is smaller, and it is expected to reduce material costs.

Specifically, the thickness of the reinforcing rib 109B located on the front side may be any value within the range of 1.5 mm to 2.5 mm, for example, 1.5 mm, 1.6 mm, 1.7 mm, 1.8 mm, 1.9 mm, 2 mm, 2.1 mm, 2.2 mm, 2.3 mm, 2.4 mm, or 2.5 mm.

Referring to FIG. 50A, in some embodiments, the reinforcing rib 109B located on the front side may have a first through hole 147B penetrating the reinforcing rib 109B located on the front side along the first direction 01.

In some embodiments, the first through hole 147B may be for power cables or signal cables to pass through, which is expected to avoid messy wiring and even wear and tear on the cables caused by friction with the ground. Of course, this may be selected according to the wiring situation of the vehicle 2B, that is, the cables may also pass through other spaces.

Referring to FIG. 50A, in some embodiments, the first through hole 147B may reduce the weight of the reinforcing rib 109B located on the front side, which is expected to reduce costs.

Referring to FIG. 50A, in some embodiments, the reinforcing rib 109B located on the front side may have a plurality of first through holes 147B sequentially disposed along the second direction 02, which may facilitate the positioning of the reinforcing rib 109B located on the front side through the combined action of the plurality of first through holes 147B during the production process (such as when assembling the reinforcing rib 109B located on the front side and the first flat portion 137B), and is expected to reduce production difficulty.

It may be understood that, in some other embodiments, the number of the first through holes 147B may not be limited to two, and may also be one or more than two. Similarly, in some other embodiments, the number of the second through holes 148B may also not be limited to two, and may also be one or more than two.

Referring to FIG. 48B, in some embodiments, two first through holes 14B may be disposed on the reinforcing rib 109B located on the front side, and two second through holes 148B may be disposed on the reinforcing rib 109B located on the rear side. The two first through holes 147B may be disposed corresponding to the two second through holes 148B, respectively. The corresponding first through holes 147B and second through holes 148B may be arranged along the first direction 01. The first through hole 147B and the corresponding second through hole 148B may be used in combination, which is expected to better avoid messy wiring.

Referring to FIG. 50C, a first avoidance recess 149B matching the bracket 13B on the corresponding side may be disposed on both ends of the reinforcing rib 109B located on the front side along the second direction 02. The inner surface of the first avoidance recess 149B may fit against the bracket 135B on the corresponding side, which is expected to improve the stability of the fixed connection between the reinforcing rib 109B located on the front side and the bracket 135B.

Referring to FIG. 50C, in some embodiments, along the second direction 02, the first avoidance recess 149B and the first flat portion 137B may be approximately centrally symmetrical; it may also be understood that, the symmetry line of the first avoidance recess 149B and the symmetry line of the first flat portion 137B may be approximately coincident, so that the force on the first flat portion 137B is more uniform.

Referring to FIG. 50C, the top end of the first avoidance recess 149B may be lower than the top end of the bracket 135B, so as to facilitate distinguishing between the top end and the bottom end of the bracket 135B during installation, which has a mistake-proofing effect. In addition, in conjunction with FIG. 48A, the height of the support plate 104B may also be lowered as much as possible, which is expected to lower the center of gravity of the vehicle 2B, making it more stable when riding.

To match the structure of the bracket 135B, the first avoidance recess 149B may be an arc-shaped surface. It may be understood that, in some other embodiments, if the shape of the bracket 135B changes, the structure of the first avoidance recess 149B may also change accordingly.

In addition, it may be understood that, in some other embodiments, both ends of the reinforcing rib 109B located on the front side along the second direction 02 may not be provided with a recess structure, as long as a fixed connection with the bracket 135B may be achieved.

Referring to FIGS. 50E and 50F, in some embodiments, a first drainage hole 150B may be disposed on the bottom side of the reinforcing rib 109B located on the front side, so that when water enters the reinforcing rib 109B located on the front side, the water inside it may be drained, which is expected to keep the inner cavity of the reinforcing rib 109B located on the front side dry, reducing the risk of rusting caused by prolonged humidity. In conjunction with FIG. 50C, it may be understood that, if the reinforcing rib 109B located on the front side is fixedly connected to the bracket 135B by welding, cleaning water may enter the reinforcing rib 109B located on the front side when cleaning it after welding; in addition, water from the environment may also enter the reinforcing rib 109B located on the front side.

Figure 51:
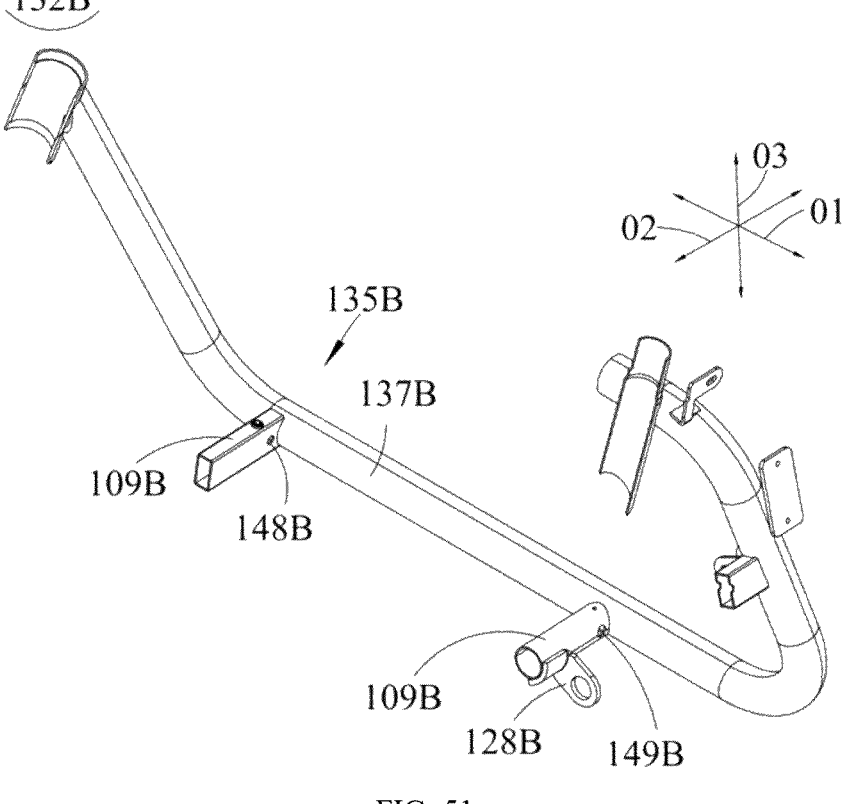
FIG. 51 is another sectional view of the mounting frame.

FIG. 51 is a cross-sectional view of the mounting frame 132B, and FIGS. 52A-52F are a set of schematic structural views of the reinforcing rib 109B located on the rear side.

Figure 52A:
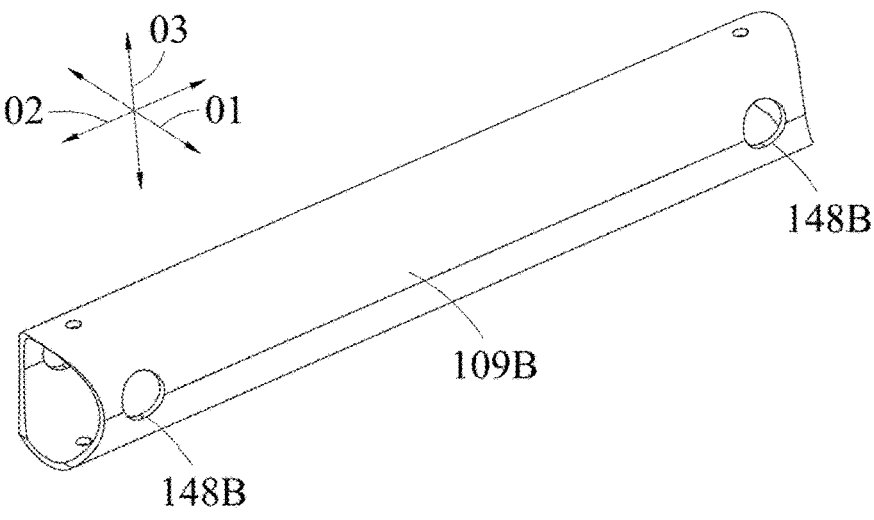
FIGS. 52A-52F are a set of schematic structural views of the reinforcing rib located on the rear side.
Figure 52B:
Figure 52C:
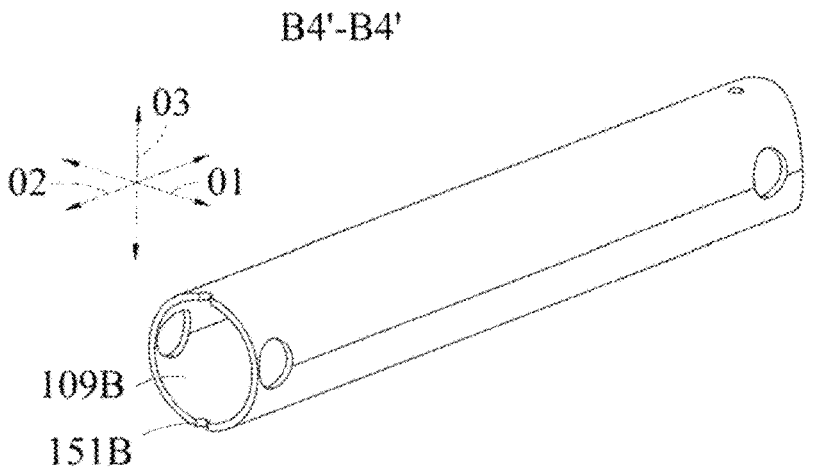
Figure 52D:
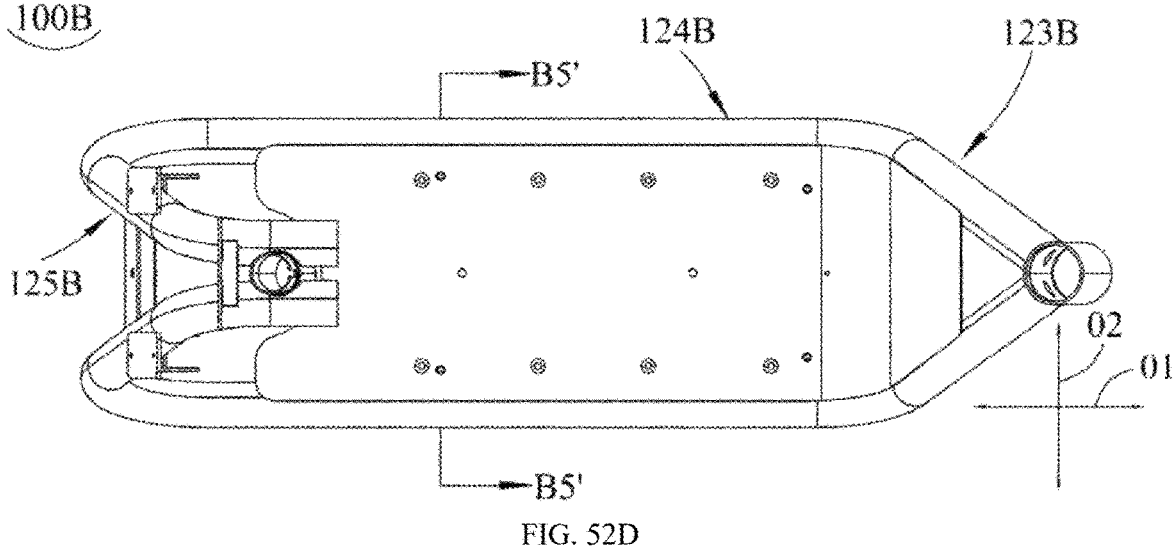
Figure 52E:
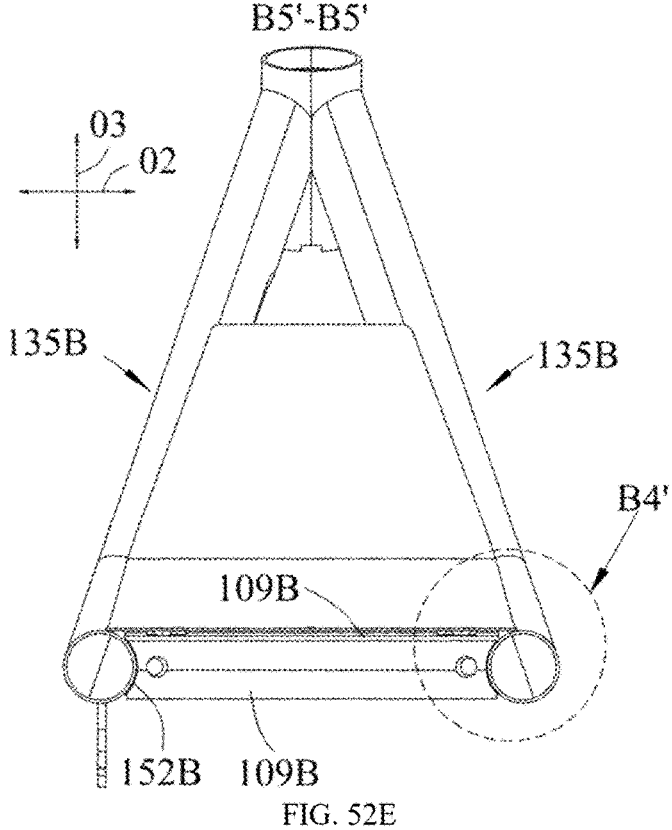
Figure 52F:
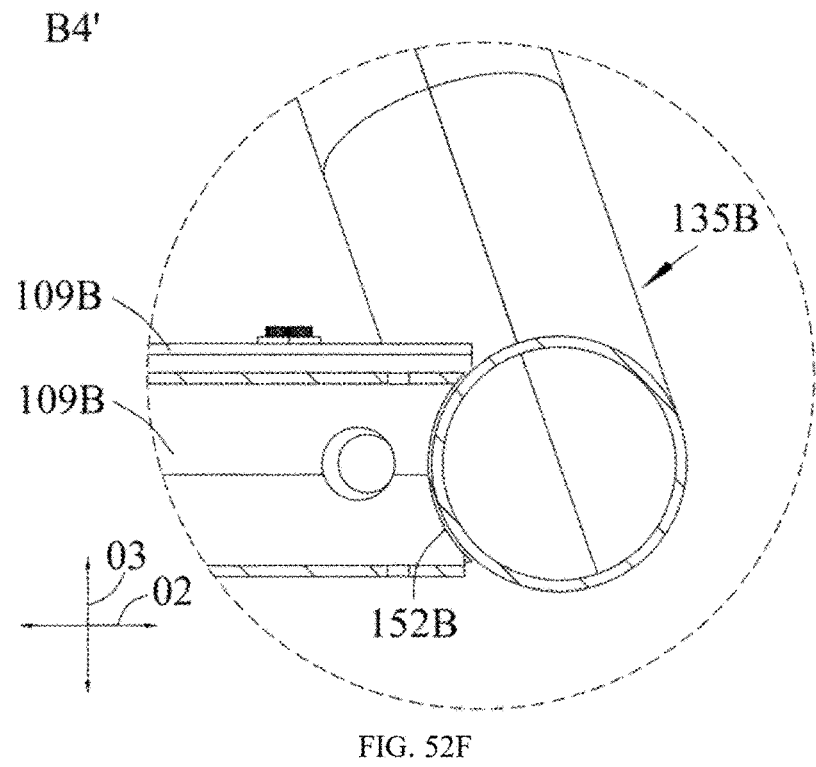

Wherein, FIG. 52C is a cross-sectional view taken along line B4'-B4' in FIG. 52B, FIG. 52E is a cross-sectional view taken along line B5'-B5' in FIG. 52D, and FIG. 52F is an enlarged schematic view of the portion B4' in FIG. 52E.

Referring to FIG. 52A, in some embodiments, the cross-section of the reinforcing rib 109B located on the rear side, perpendicular to the second direction 02, may be in a circular ring shape, which, while satisfying the support strength, is expected to reduce the weight of the reinforcing rib 109B located on the rear side, facilitating the lightweight design of the vehicle 2B; in addition, it may also save the material used for preparing the reinforcing rib 109B located on the rear side, which is expected to reduce production costs; in addition, the circular ring shape may be a regular shape with a simple and regular structure, which is easy to process, reducing the processing difficulty and cost.

It may be understood that, in some other embodiments, the cross-section of the reinforcing rib 109B located on the rear side, perpendicular to the second direction 02, is not limited to a circular ring shape, and may also have other regular or irregular shapes, such as a square ring shape, an elliptical ring shape, etc.

In some embodiments, the material of the reinforcing rib 109B located on the rear side may be carbon structural steel, which has high strength and is not easily deformed. In addition, it is easy to shape and process, reducing production costs.

In some other embodiments, the material of the reinforcing rib 109B located on the rear side may also be other metal materials or plastics. The other metal materials include, but are not limited to, stainless steel and aluminum alloy, and the plastics include, but are not limited to, polypropylene (PP), polyethylene (PE), and ABS plastic.

In some embodiments, the wall thickness of the reinforcing rib 109B located on the rear side may fall within a range of 1 mm to 2.5 mm. When the wall thickness is greater than or equal to 1.5 mm, it has good structural strength, reducing the occurrence of bending or deformation when the road surface is relatively bumpy causing greater impact, or when the user is heavier and/or is carrying heavier items. When the wall thickness is less than or equal to 2.5 mm, the self-weight of the reinforcing rib 109B located on the rear side is smaller, and it is expected to reduce material costs.

Specifically, the wall thickness of the reinforcing rib 109B located on the rear side may be any value within the range of 1.5 mm to 2.5 mm, for example, 1.5 mm, 1.6 mm, 1.7 mm, 1.8 mm, 1.9 mm, 2 mm, 2.1 mm, 2.2 mm, 2.3 mm, 2.4 mm, or 2.5 mm.

Referring to FIG. 52A, in some embodiments, the reinforcing rib 109B located on the rear side may have a second through hole 148B penetrating the reinforcing rib 109B located on the rear side along the first direction 01.

In some embodiments, the second through hole 148B may be for power cables or signal cables to pass through, which avoids messy wiring and even wear and tear on the cables caused by friction with the ground. Of course, this may be selected according to the wiring situation of the vehicle 2B, that is, the cables may also pass through other spaces.

Referring to FIG. 52A, in some embodiments, the second through hole 148B may reduce the weight of the reinforcing rib 109B located on the rear side, which is expected to reduce costs.

Referring to FIG. 52A, in some embodiments, the reinforcing rib 109B located on the rear side may have a plurality of second through holes 148B sequentially disposed along the second direction 02, and in conjunction with FIG. 51, this may facilitate the positioning of the reinforcing rib 109B located on the rear side through the combined action of the plurality of second through holes 148B during the production process (such as when assembling the reinforcing rib 109B located on the rear side and the first flat portion 137B), and is expected to reduce production difficulty.

Referring to FIGS. 52B and 52C, in some embodiments, a second drainage hole 151B may be disposed on the bottom side of the reinforcing rib 109B located on the rear side, so that when water enters the reinforcing rib 109B located on the rear side, the water inside it may be drained, which is expected to keep the inner cavity of the reinforcing rib 109B located on the rear side dry, reducing the risk of rusting caused by prolonged humidity. In conjunction with FIG. 51, it may be understood that, if the reinforcing rib 109B located on the rear side is fixedly connected to the bracket 135B by welding, cleaning water may enter the reinforcing rib 109B located on the rear side when cleaning it after welding; in addition, water from the environment may also enter the reinforcing rib 109B located on the rear side.

Referring to FIGS. 52D and 52E, a second avoidance recess 152B matching the bracket 135B on the corresponding side may be disposed on both ends of the reinforcing rib 109B located on the rear side along the second direction 02. The inner surface of the second avoidance recess 152B may fit against the bracket 135B on the corresponding side, which is expected to improve the stability of the fixed connection between the reinforcing rib 109B located on the rear side and the bracket 135B.

To match the structure of the bracket 135B, the second avoidance recess 152B may be an arc-shaped surface. It may be understood that, in some other embodiments, if the shape of the bracket 135B changes, the structure of the second avoidance recess 152B may also change accordingly.

In addition, it may be understood that, both ends of the reinforcing rib 109B located on the rear side along the second direction 02 may not be provided with a recess structure, as long as a fixed connection with the bracket 135B may be achieved.

Referring to FIG. 52E, along the third direction 03, the height of the top end of the reinforcing rib 109B located on the front side may be greater than the height of the top end of the reinforcing rib 109B located on the rear side, thereby making it possible to install other parts or components (in conjunction with FIG. 51, for example, the first connecting portion 128B) on the reinforcing rib 109B located on the rear side, which is expected to make the overall structure more compact and is beneficial to a miniaturized design.

Referring to FIG. 51, in some embodiments, the cross-section of the reinforcing rib 109B located on the front side, perpendicular to the second direction 02, may be approximately in a rectangular ring shape, and the cross-section of the reinforcing rib 109B located on the rear side, perpendicular to the second direction 02, may be approximately in a circular ring shape. Along the first direction 01, the width of the reinforcing rib 109B located on the rear side may be greater than the width of the reinforcing rib 109B located on the front side, so that the support strength of the reinforcing rib 109B located on the rear side is expected to be greater than the support strength of the reinforcing rib 109B located on the front side. This is to adapt to the distribution characteristics of the reinforcing rib 109B located on the front side and the reinforcing rib 109B located on the rear side, and is expected to provide good support for both the front end and the rear end of the bracket 135B, improving the overall stability of the mounting frame 132B. In addition, since the shapes of the reinforcing rib 109B located on the front side and the reinforcing rib 109B located on the rear side may be different, this has a mistake-proofing effect during installation, that is, it reduces the risk of incorrect installation caused by swapping the reinforcing rib 109B located on the front side and the reinforcing rib 109B located on the rear side, and is expected to improve the operator's operating efficiency and improve the qualification rate.

Figure 53A:
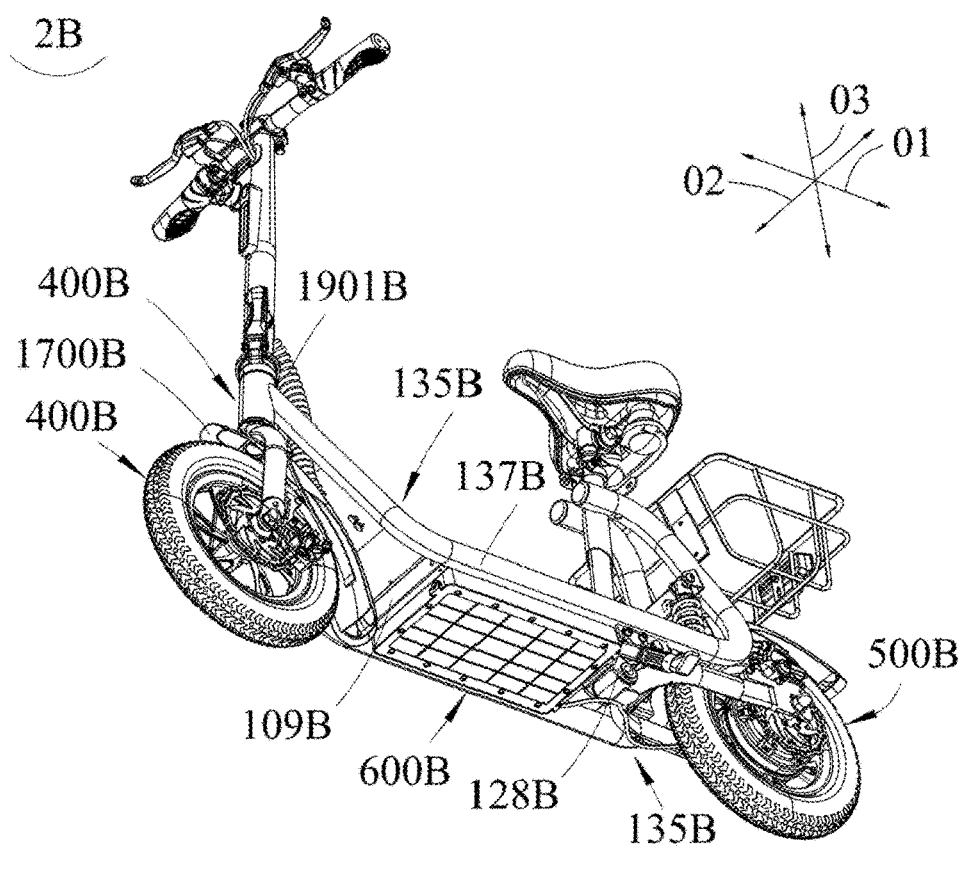
FIGS. 53A-53C are a set of schematic parameter views of the mounting frame.
Figure 53B:
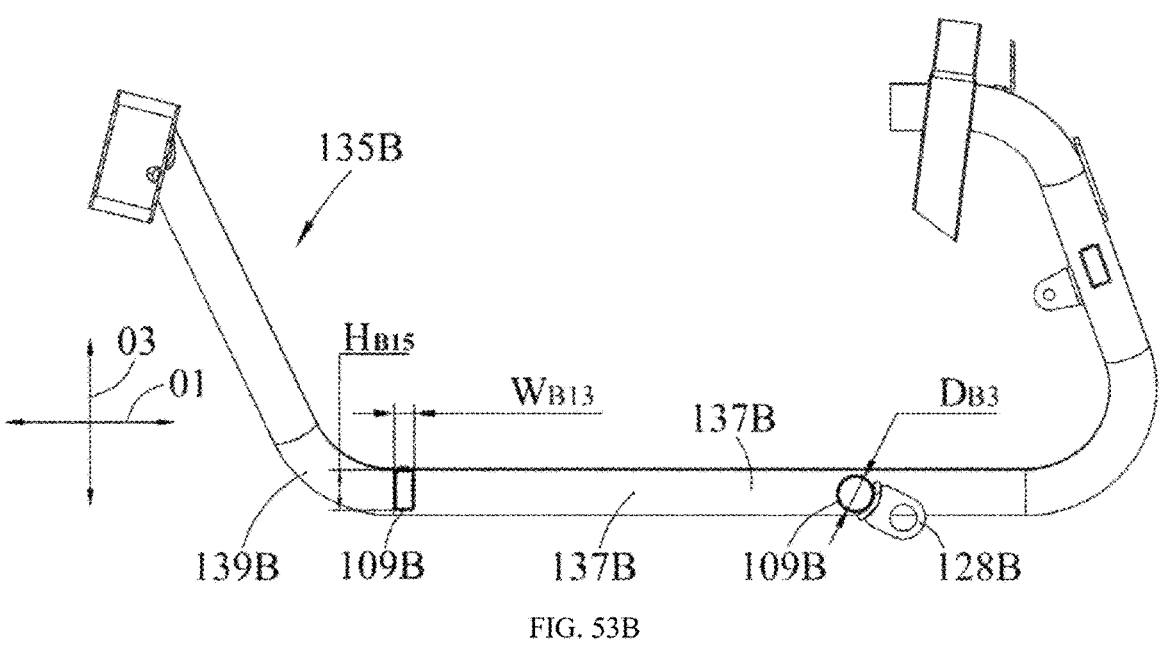
Figure 53C:
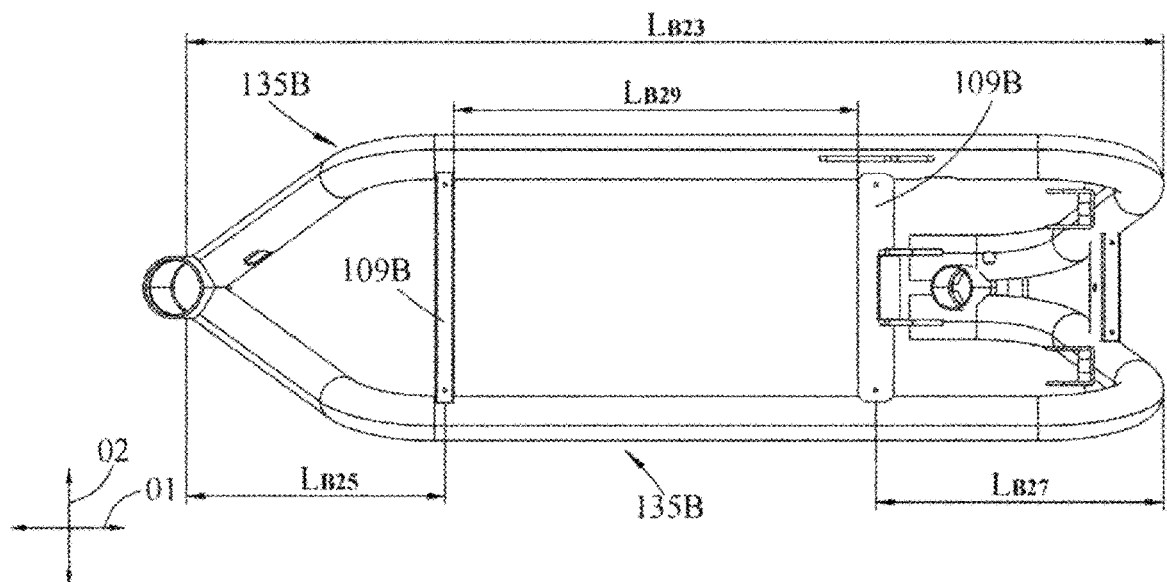

FIGS. 53A-53C are a set of parameter schematic views of the mounting frame 132B.

Referring to FIG. 53B, in some embodiments, the width $W_{B13}$ of the reinforcing rib 109B located on the front side along the first direction 01 may fall within a range of 10 mm to 20 mm, and the height $H_{B15}$ along the third direction 03 may fall within a range of 25 mm to 35 mm. This is to have a lower weight and occupy a smaller space while meeting the support strength requirements, and in conjunction with FIG. 53A, it is expected to reduce the encroachment or compression of the surrounding space, facilitating the installation of other parts or components, such as the power mechanism 600B.

Specifically, $W_{B13}$ may be any value within the range of 10 mm to 20 mm, for example, 10 mm, 11 mm, 12 mm, 13 mm, 14 mm, 15 mm, 16 mm, 17 mm, 18 mm, 19 mm, or 20 mm. $H_{B15}$ may be any value within the range of 25 mm to 35 mm, for example, 25 mm, 26 mm, 27 mm, 28 mm, 29 mm, 30 mm, 31 mm, 32 mm, 33 mm, 34 mm, or 35 mm.

Referring to FIG. 53B, in some embodiments, the reinforcing rib 109B located on the rear side may be a circular beam, and the outer diameter $D_{B3}$ of the reinforcing rib 109B located on the rear side may fall within a range of 24 mm to 32 mm, so as to have a lower weight and occupy a smaller space while meeting the support strength requirements, and in conjunction with FIG. 53A, it is expected to reduce the encroachment or compression of the surrounding space, facilitating the installation of other parts or components, such as the power mechanism 600B.

Specifically, $D_{B3}$ may be any value within the range of 24 mm to 32 mm, for example, 24 mm, 25 mm, 26 mm, 27 mm, 28 mm, 29 mm, 30 mm, 31 mm, or 32 mm.

Referring to FIG. 53B, in some embodiments, along the first direction 01, the reinforcing rib 109B located on the front side may be located at the rear end of the first arc-shaped portion 139B, and the reinforcing rib 109B located on the rear side may be located at a position on the first flat portion 137B close to the rear end. The space formed by the reinforcing rib 109B located on the front side, the reinforcing rib 109B located on the rear side, and the two first flat portions 137B may be approximately rectangular, characterized by being long and wide. In conjunction with FIG. 53A, this space may be adapted to the shape of the power mechanism 600B and may be used to install the power mechanism 600B, which is expected to make full use of the space and is beneficial to realizing a miniaturized design of the vehicle 2B. In addition, through the front and rear support, the support structure may be simplified while effectively ensuring the stability of the mounting frame 132B, which is expected to save materials and costs and is beneficial to realizing a miniaturized design.

Referring to FIG. 53C, in some embodiments, along the first direction 01, the length of the bracket 135B is $L_{B23}$, the distance between the reinforcing rib 109B located on the front side and the front end of the bracket 135B is $L_{B25}$, and the ratio $K_{B11}$ of $L_{B23}$ to $L_{B25}$ may fall within a range of 3.5 to 4.3. The distance between the reinforcing rib 109B located on the rear side and the rear end of the bracket 135B is $L_{B27}$, and the ratio $K_{B13}$ of $L_{B23}$ to $L_{B27}$ may fall within a range of 3.1 to 3.9.

When $K_{B11}$ is greater than or equal to 3.5 and $K_{B13}$ is less than or equal to 3.9, it helps the reinforcing rib 109B located on the front side and the reinforcing rib 109B located on the rear side to have a suitable spacing, so that the middle area of the two brackets 135B has corresponding support points, reducing the risk of deformation or bending. In addition, referring to FIG. 53A, this is also beneficial for reducing the occupation of the front installation space, and is expected to reduce installation interference with other parts or components, such as the front fender 1700B and the winding tube 1901B; in addition, it is also beneficial for reducing the occupation of the rear installation space, and is expected to reduce installation interference with other parts or components, such as the rear wheel 500B. This ensures normal installation and reduces the need for corresponding avoidance by other parts or components on the front and rear sides, which is expected to realize a miniaturized design of the vehicle 2B. When $K_{B11}$ is less than or equal to 4.3 and $K_{B13}$ is greater than or equal to 3.1, it helps the reinforcing rib 109B located on the front side and the reinforcing rib 109B located on the rear side to have a suitable spacing, so that both sides of the two brackets 135B have support points, reducing the risk of deformation or bending.

Specifically, $K_{B11}$ may be any value within the range of 3.5 to 4.3, for example, 3.5, 3.6, 3.7, 3.8, 3.9, 4, 4.1, 4.2, or 4.3. $K_{B13}$ may be any value within the range of 3.1 to 3.9, for example, 3.1, 3.2, 3.3, 3.4, 3.5, 3.6, 3.7, 3.8, or 3.9.

Referring to FIGS. 53A and 53C, in some embodiments, along the first direction 01, the power mechanism 600B may be located between the reinforcing rib 109B on the front side and the reinforcing rib 109B on the rear side. On the one hand, the reinforcing rib 109B located on the front side and the reinforcing rib 109B located on the rear side may provide protection for the power mechanism 600B in the first direction 01. That is, the reinforcing rib 109B located on the front side may block or shield the power mechanism 600B from impacts or dirt from the front side, such as rainwater and dust, and the reinforcing rib 109B located on the rear side may block or shield the power mechanism 600B from impacts or dirt from the rear side. On the other hand, when installing the power mechanism 600B, the reinforcing rib 109B located on the front side and the reinforcing rib 109B located on the rear side may serve as positioning structures, which is expected to allow for a more rapid determination of the installation position of the power mechanism 600B along the first direction 01, that is, they may have an installation position indication function, improving operating efficiency.

Referring to FIG. 53C, in some embodiments, the distance $L_{B29}$ between the reinforcing rib 109B located on the front side and the reinforcing rib 109B located on the rear side may fall within a range of 335 mm to 385 mm. When $L_{B29}$ is greater than or equal to 335 mm, it helps to ensure that both sides of the two brackets 135B have support points, reducing the risk of deformation or bending. When $L_{B29}$ is less than or equal to 385 mm, it helps the reinforcing rib 109B located on the front side and the reinforcing rib 109B located on the rear side to have a suitable spacing, so that the middle area of the two brackets 135B has corresponding support points, reducing the risk of deformation or bending. In addition, referring to FIG. 53A, this is also beneficial for reducing the occupation of the front installation space, and is expected to reduce installation interference with other parts or components, such as the front fender 1700B and the winding tube 1901B; in addition, it is also beneficial for reducing the occupation of the rear installation space, and is expected to reduce installation interference with other parts or components, such as the rear wheel 500B. This ensures normal installation and reduces the need for corresponding avoidance by other parts or components on the front and rear sides, which is expected to realize a miniaturized design of the vehicle 2B.

Specifically, $L_{B29}$ may be any value within the range of 335 mm to 385 mm, for example, 335 mm, 340 mm, 345 mm, 350 mm, 355 mm, 360 mm, 365 mm, 370 mm, 375 mm, 380 mm, or 385 mm.

Referring to FIG. 53A, in some embodiments, along the second direction 02, the power mechanism 600B may be located between the two brackets 13B. On the one hand, when installing the power mechanism 600B, the two brackets 135B may serve as positioning structures, which is expected to allow for a more rapid determination of the installation position of the power mechanism 600B along the second direction 02, that is, they may have an installation position indication function, which may improve operating efficiency; on the other hand, both sides of the power mechanism 600B along the second direction 02 may be shielded by the two brackets 135B, which may reduce the risk of the power mechanism 600B being impacted by external forces, and is expected to improve the service life of the power mechanism 600B.

Referring to FIG. 53A, in some embodiments, along the first direction 01, the power mechanism 600B may be approximately flat, so that the height of the power mechanism 600B along the third direction 03 may be smaller, which is expected to make full use of the space formed by the first flat portion 137B, the reinforcing rib 109B located on the front side, and the reinforcing rib 109B located on the rear side. In addition, this may reduce the risk of the power mechanism 600B colliding with the ground or obstacles on the ground during travel.

Referring to FIG. 53A, in some embodiments, the power mechanism 600B may be approximately square. Its shape is regular, which is expected to provide the power mechanism 600B with a larger internal space for arranging more battery cells, providing better endurance.

Referring to FIG. 53A, in some embodiments, along the third direction 03, the bottom side of the power mechanism 600B may be lower than the reinforcing rib 109B located on the front side and the reinforcing rib 109B located on the rear side. That is, the bottom side of the power mechanism 600B protrudes downward, which may make it easier for installation or maintenance personnel to insert or remove the power mechanism 600B.

Figure 54A:
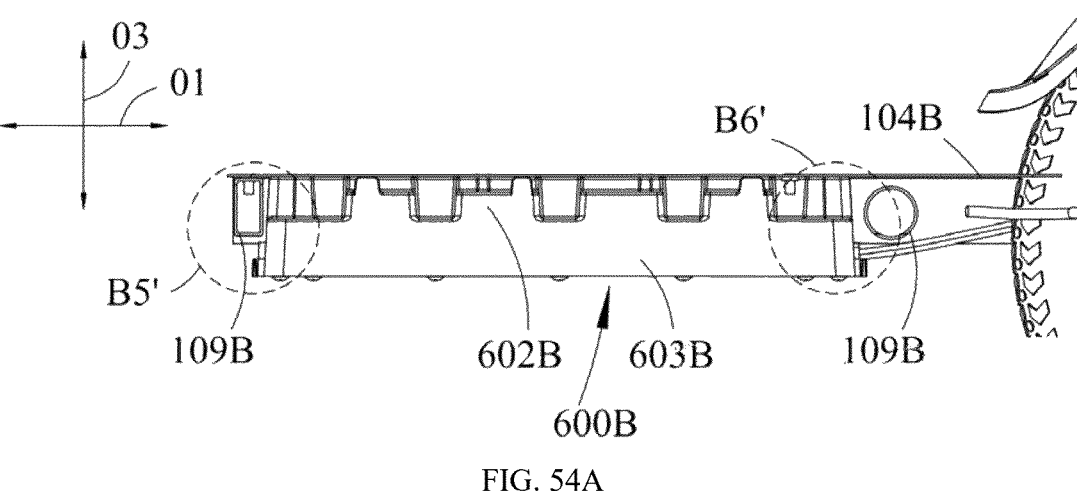
FIGS. 54A-54E are a set of schematic parameter views of the power mechanism.
Figure 54B:
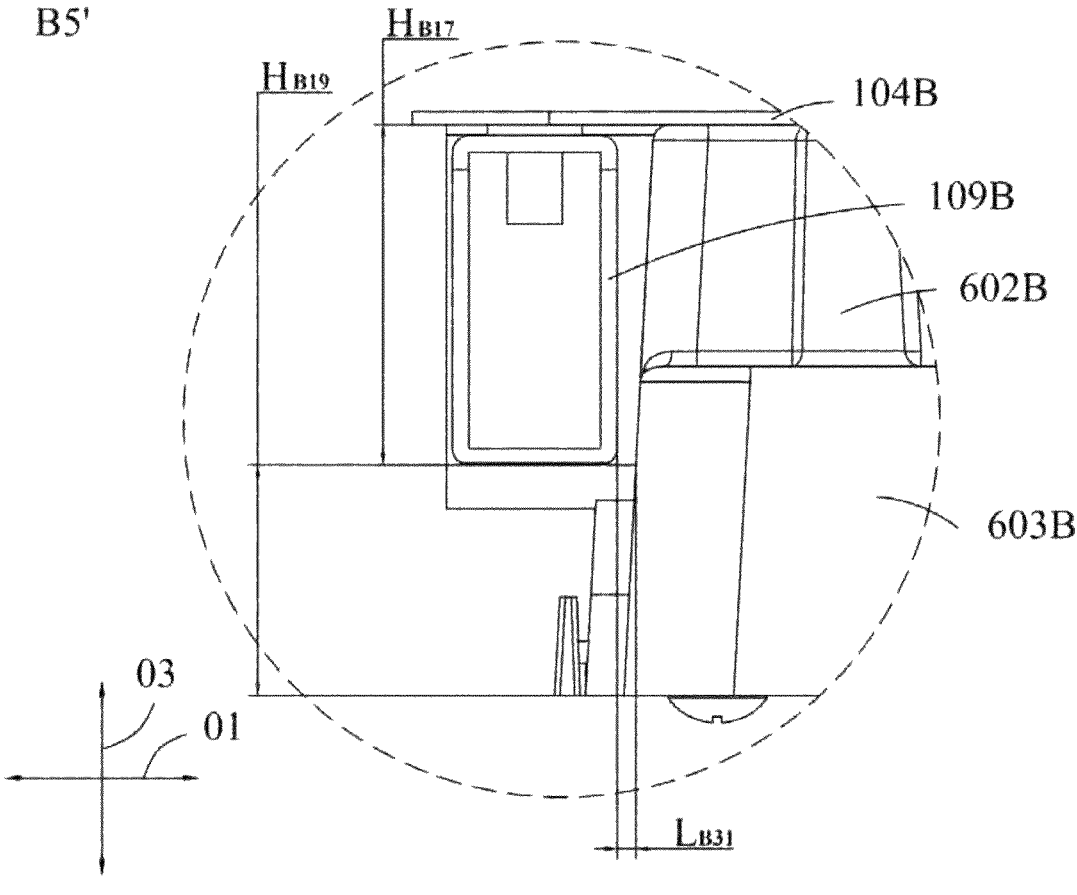
Figure 54C:
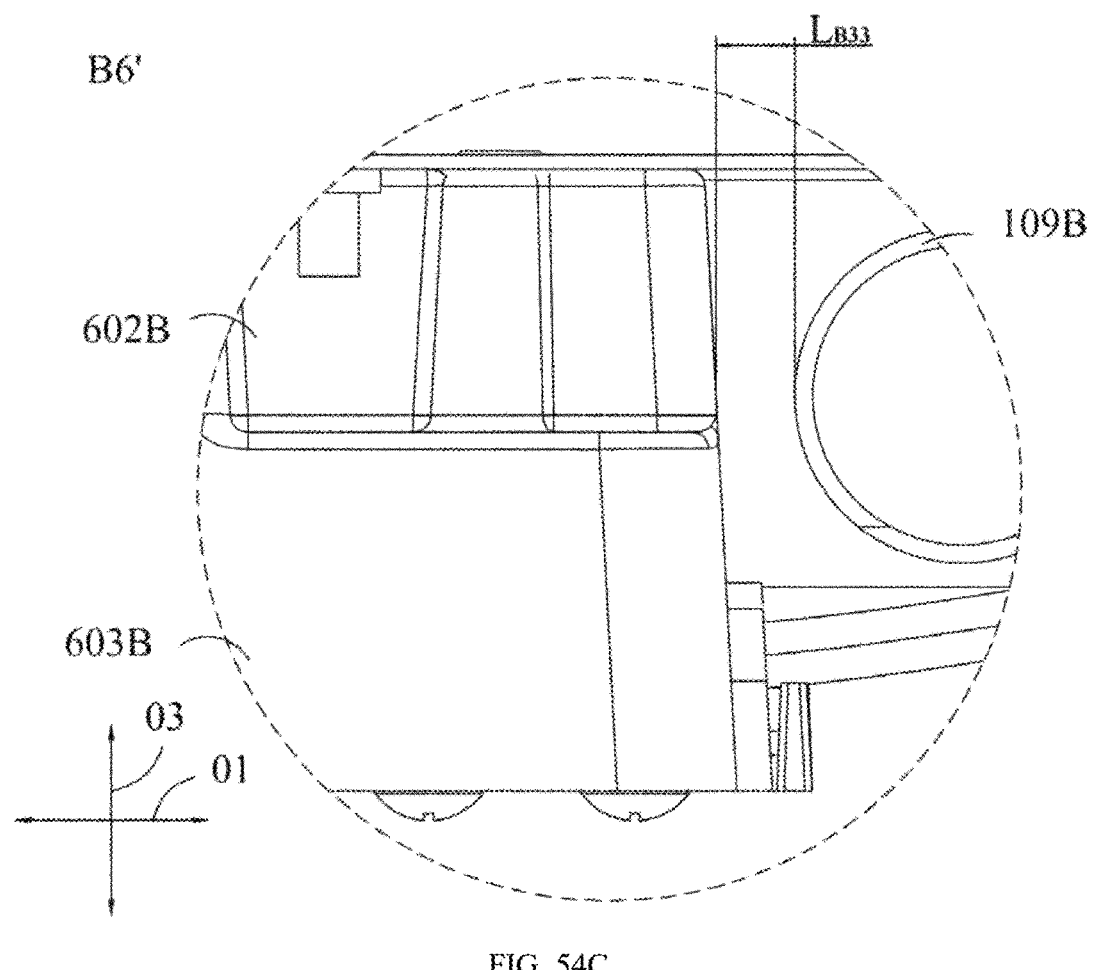
Figure 54D:
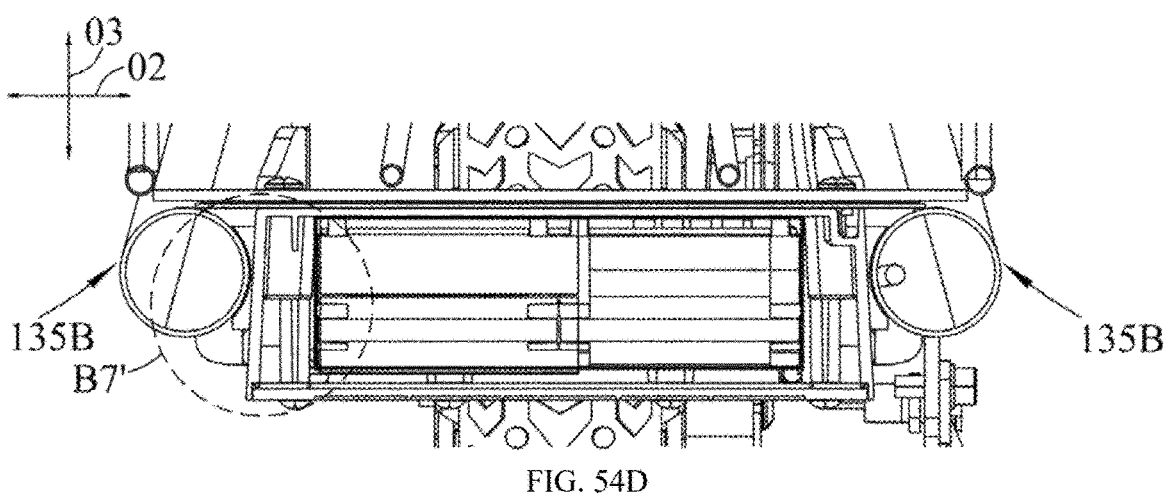
Figure 54E:
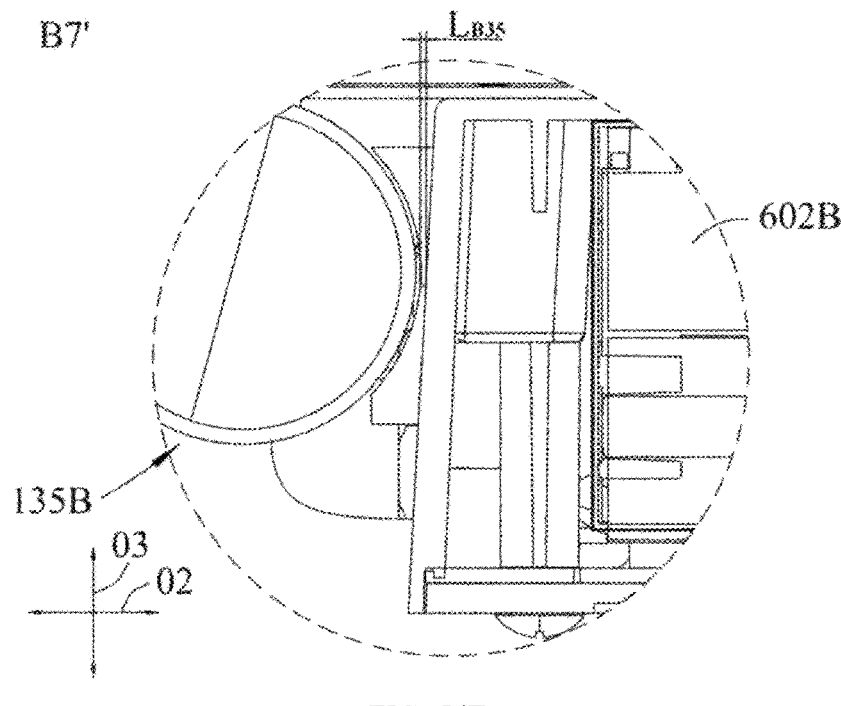

FIGS. 54A-54E are a set of parameter schematic views of the power mechanism 600B. Wherein, FIG. 54B is an enlarged schematic view of the portion B5' in FIG. 54A, FIG. 54C is an enlarged schematic view of the portion B6' in FIG. 54A, and FIG. 54E is an enlarged schematic view of the portion B7' in FIG. 54D.

Referring to FIG. 54A, in some embodiments, the power mechanism 600B may include an inserted section 60B and an exposed section 603B sequentially disposed along the third direction 03. The inserted section 602B may be located between the reinforcing rib 109B on the front side and the reinforcing rib 109B on the rear side. When the reinforcing rib 109B located on the front side is closer to the ground than the reinforcing rib 109B located on the rear side, the bottom side of the inserted section 602B may be flush with the bottom side of the reinforcing rib 109B located on the front side; when the reinforcing rib 109B located on the rear side is closer to the ground than the reinforcing rib 109B located on the front side, the bottom side of the inserted section 602B may be flush with the bottom side of the reinforcing rib 109B located on the rear side; when the bottom sides of the reinforcing rib 109B located on the front side and the reinforcing rib 109B located on the rear side are flush, then the bottom sides of the inserted section 602B, the reinforcing rib 109B located on the front side, and the reinforcing rib 109B located on the rear side are flush. The exposed section 603B may be located at the bottom of the reinforcing rib 109B on the front side and the reinforcing rib 109B on the rear side. When the reinforcing rib 109B located on the front side is closer to the ground than the reinforcing rib 109B located on the rear side, the top side of the exposed section 603B may be flush with the bottom side of the reinforcing rib 109B located on the front side; when the reinforcing rib 109B located on the rear side is closer to the ground than the reinforcing rib 109B located on the front side, the top side of the exposed section 603B may be flush with the bottom side of the reinforcing rib 109B located on the rear side; when the bottom sides of the reinforcing rib 109B located on the front side and the reinforcing rib 109B located on the rear side are flush, then the top side of the exposed section 603B may be flush with the bottom sides of the reinforcing rib 109B located on the front side and the reinforcing rib 109B located on the rear side.

Referring to FIG. 54B, in some embodiments, along the third direction 03, the height of the inserted section 602B is $H_{B17}$, the height of the exposed section 603B is $H_{B19}$, and the ratio $K_{B15}$ of $H_{B17}$ to $H_{B19}$ may fall within a range of 1 to 2. In conjunction with FIG. 54A, when $K_{B15}$ is greater than or equal to 1, this reduces the risk of the exposed portion being too large and being hit by the ground or foreign objects during riding, which would occur if most of the power mechanism 600B were not between the front and rear reinforcing ribs 109B, and is expected to extend the service life of the power mechanism 600B. In addition, the resistance encountered during riding may be reduced. When $K_{B15}$ is less than or equal to 2, this reduces the risk of the support plate 104B needing to be raised to make way and becoming too high, which would occur if most of the power mechanism 600B were between the front and rear reinforcing ribs 109B, and is expected to allow the user to have a lower center of gravity when riding, ensuring the safety of the vehicle 2B.

Specifically, $K_{B15}$ may be any value within the range of 1 to 2, for example, 1, 1.1, 1.2, 1.3, 1.4, 1.5, 1.6, 1.7, 1.8, 1.9, or 2.

Referring to FIG. 54B, in some embodiments, along the first direction 01, the distance between the rear side of the reinforcing rib 109B located on the front side and the front side of the inserted section 602B is $L_{B31}$, and $L_{B31}$ may fall within a range of 1 mm to 5 mm. In conjunction with FIG. 54A, when $L_{B31}$ is greater than or equal to 1 mm, during the process of placing the power mechanism 600B between the front and rear reinforcing ribs 109B, the risk of friction or collision with the reinforcing rib 109B located on the front side is expected to be reduced, which may reduce installation difficulty. When $L_{B31}$ is less than or equal to 5 mm, it allows for a suitable spacing between the reinforcing rib 109B and the power mechanism 600B, reducing wasted space and reducing the limitations on the size of the power mechanism 600B, which is expected to improve the endurance of the power mechanism 600B.

Specifically, $L_{B31}$ may be any value within the range of 1 mm to 5 mm, for example, 1 mm, 1.5 mm, 2 mm, 2.5 mm, 3 mm, 3.5 mm, 4 mm, 4.5 mm, or 5 mm.

Referring to FIG. 54C, in some embodiments, along the first direction 01, the distance between the rear side of the inserted section 602B and the front side of the reinforcing rib 109B located on the rear side is $L_{B33}$, and $L_{B33}$ may fall within a range of 1 mm to 12 mm. In conjunction with FIG. 54A, when $L_{B33}$ is greater than or equal to 1 mm, during the process of placing the power mechanism 600B between the front and rear reinforcing ribs 109B, the risk of friction or collision with the reinforcing rib 109B located on the rear side is expected to be reduced, which may reduce installation difficulty. When $L_{B33}$ is less than or equal to 12 mm, it allows for a suitable spacing between the reinforcing rib 109B and the power mechanism 600B, reducing wasted space and reducing the limitations on the size of the power mechanism 600B, which is expected to improve the endurance of the power mechanism 600B.

Specifically, $L_{B33}$ may be any value within the range of 1 mm to 12 mm, for example, 1 mm, 2 mm, 3 mm, 4 mm, 5 mm, 6 mm, 7 mm, 8 mm, 9 mm, 10 mm, 11 mm, or 12 mm.

Referring to FIGS. 54D and 54E, in some embodiments, along the second direction 02, the distance between the right side of the bracket 135B and the left side of the inserted section 602B is $L_{B35}$, and $L_{B35}$ may fall within a range of 1 mm to 10 mm. In conjunction with FIG. 54D, when $L_{B35}$ is greater than or equal to 1 mm, during the process of placing the power mechanism 600B between the two brackets 135B, the risk of friction or collision with the bracket 135B is expected to be reduced, which may reduce installation difficulty. When $L_{B35}$ is less than or equal to 10 mm, it allows for a suitable spacing between the right side of the bracket 135B and the left side of the inserted section 602B, reducing wasted space and reducing the limitations on the size of the power mechanism 600B, which is expected to improve the battery life of the power mechanism 600B.

Specifically, $L_{B35}$ may be any value within the range of 1 mm to 10 mm, for example, 1 mm, 2 mm, 3 mm, 4 mm, 5 mm, 6 mm, 7 mm, 8 mm, 9 mm, or 10 mm.

Figure 55A:
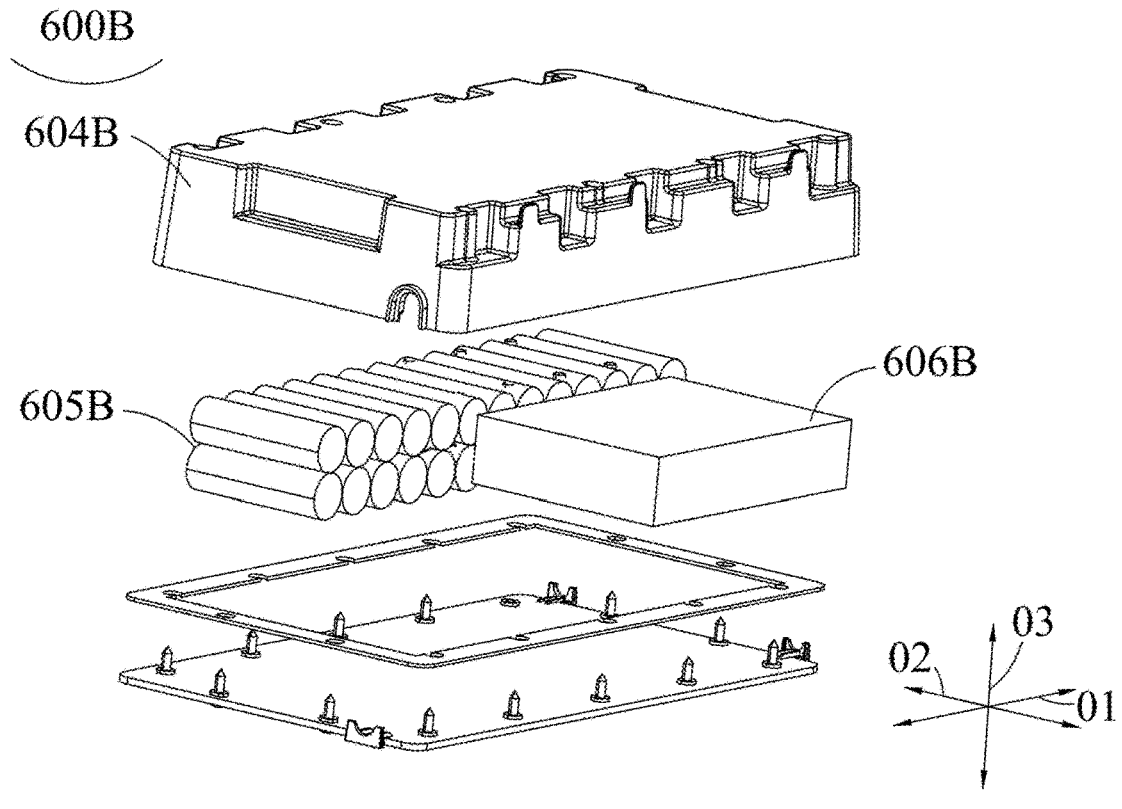
FIGS. 55A-55C are another set of schematic parameter views of the power mechanism.
Figure 55B:
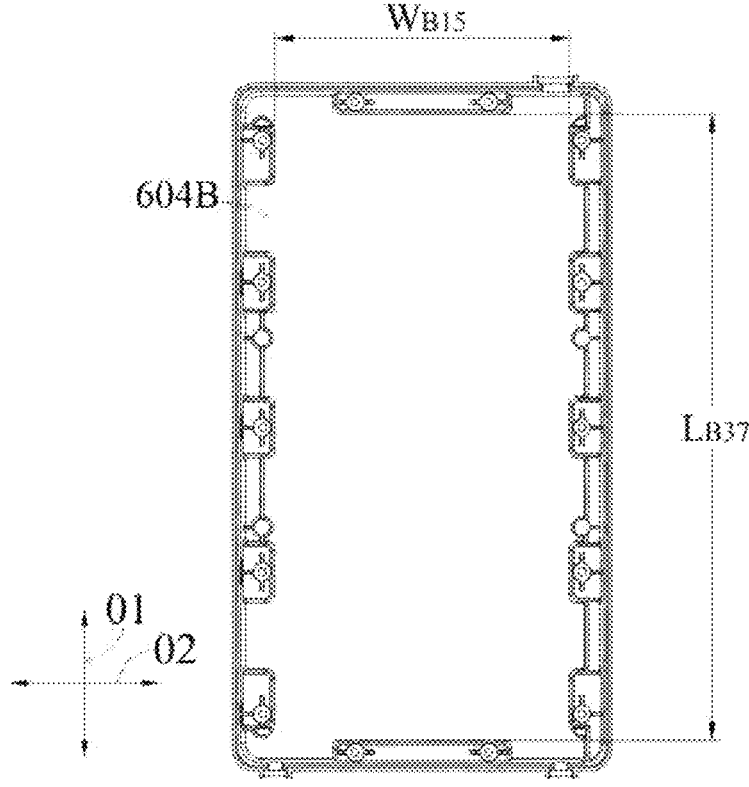
Figure 55C:
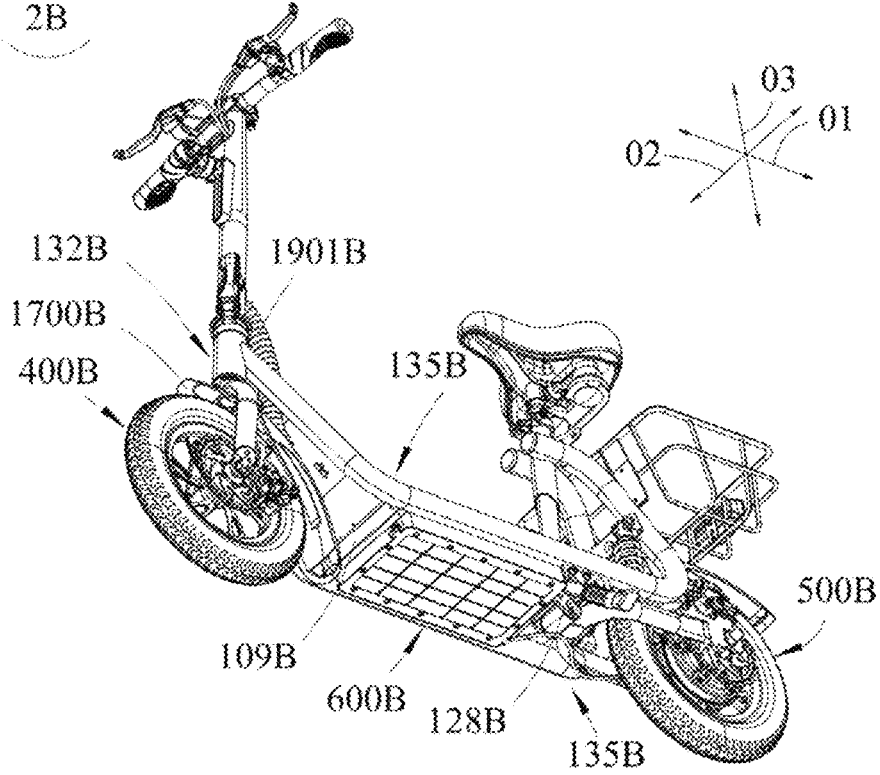

FIGS. 55A-55C are another set of parameter schematic views of the power mechanism 600B. Wherein, FIG. 55A is an exploded view.

Referring to FIG. 55A, in some embodiments, the power mechanism 600B may include a battery box 604B, a battery pack 605B, and a controller 606B, and the battery pack 605B and the controller 606B may both be placed in the inner cavity of the battery box 604B.

Referring to FIGS. 55A and 55B, along the third direction 03, the top side of the battery box 604B may be a closed side, and the bottom side may be an open side. Along the first direction 01, the length $L_{B37}$ of the inner cavity of the battery box 604B may fall within a range of 260 mm to 300 mm. When $L_{B37}$ is greater than or equal to 260 mm, it allows the battery box 604B to have a suitable length, so that a longer battery pack 605B may be placed inside, which is expected to improve the operating range of the vehicle 2B. Referring to FIG. 55C, when $L_{B37}$ is less than or equal to 300 mm, the reinforcing rib 109B located on the front side and the reinforcing rib 109B located on the rear side, which accommodate the battery box 604B, have a suitable spacing, which is expected to allow the mounting frame 132B to also have a suitable length, which is beneficial to the miniaturized design of the vehicle 2B.

Specifically, $L_{B37}$ may be any value within the range of 260 mm to 300 mm, for example, 260 mm, 265 mm, 270 mm, 275 mm, 280 mm, 285 mm, 290 mm, 295 mm, or 300 mm.

Referring to FIG. 55B, in some embodiments, along the second direction 02, the width $W_{B15}$ of the inner cavity of the battery box 604B may fall within a range of 120 mm to 150 mm. In conjunction with FIG. 55A, when $W_{B15}$ is greater than or equal to 120 mm, it allows the battery box 604B to have a suitable width, facilitating the horizontal placement of the controller 606B, and the battery box 604B adapted to the controller 606B may be made flatter, which is expected to realize a miniaturized design of the vehicle 2B. In conjunction with FIG. 55C, when $W_{B15}$ is less than or equal to 150 mm, the two brackets 135B that accommodate the battery box 604B have a suitable spacing, which is expected to allow the mounting frame 132B to also have a suitable width, which is beneficial to the miniaturized design of the vehicle 2B.

Specifically, $W_{B15}$ may be any value within the range of 120 mm to 150 mm, for example, 120 mm, 125 mm, 130 mm, 135 mm, 140 mm, 145 mm, or 150 mm.

FIGS. 56A-56F are another set of schematic parameter views of the power mechanism 600B.

Figure 56A:
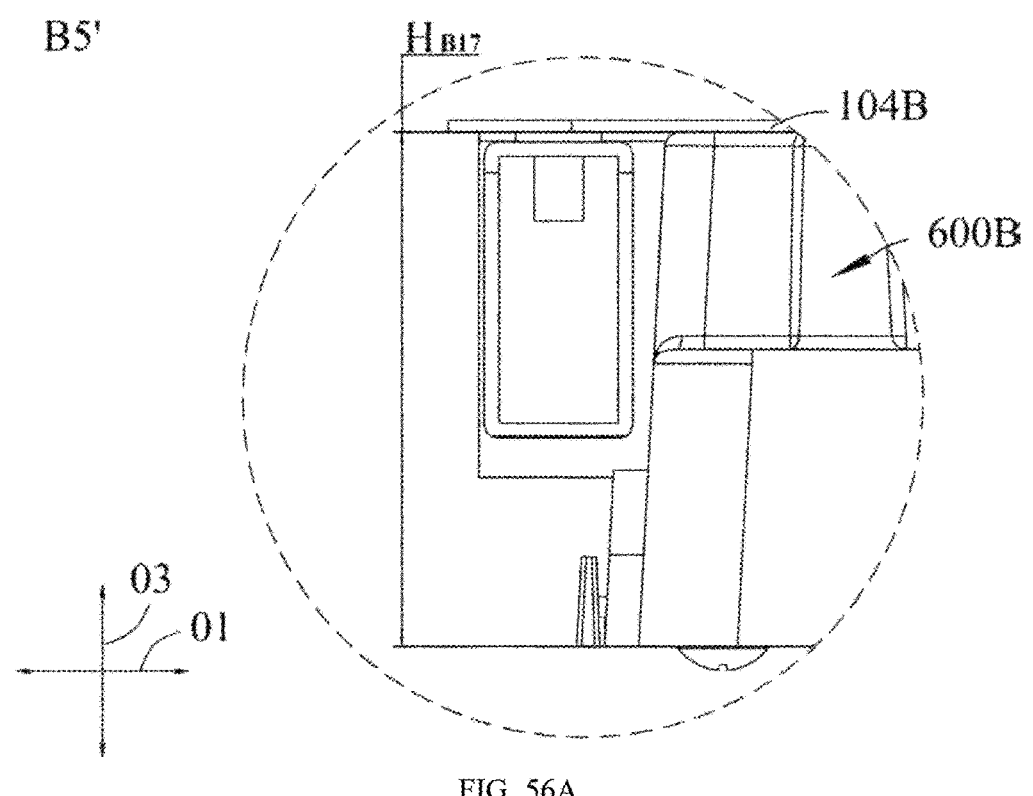
FIGS. 56A-56F are another set of schematic parameter views of the power mechanism.
Figure 56B:
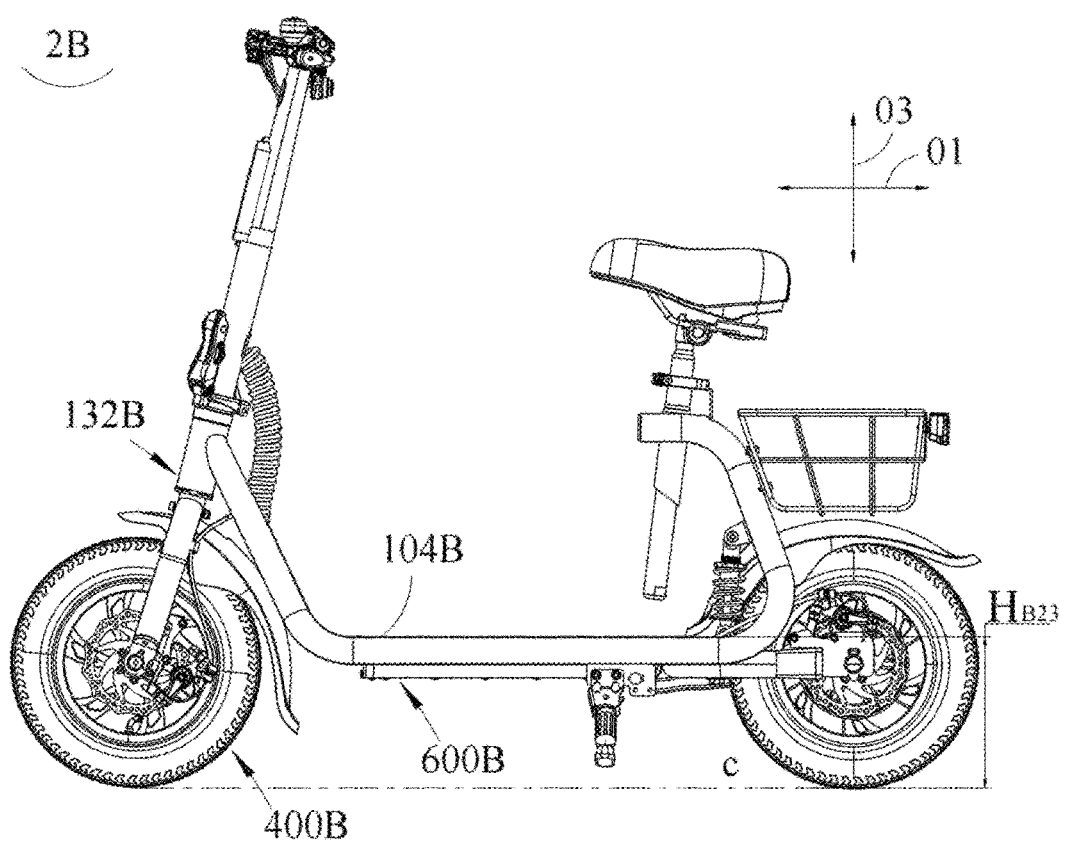

Referring to FIG. 56B, in some embodiments, along the third direction 03, the power mechanism 600B may be located at a bottom side of the support plate 104B, and the support plate 104B may isolate a user/animal/object from the power mechanism 600B, without needing to add other structures, which is expected to make the structure of the vehicle 2B simpler, reduce costs, and facilitate the miniaturized design of the vehicle 2B. In addition, the power mechanism 600B may be located at the bottom side of the support plate 104B, such that the height of the power mechanism 600B relative to a road surface is lower, reducing the overall center of gravity of the vehicle 2B, which is expected to improve the stability of the vehicle 2B and improve riding safety.

Referring to FIGS. 56A and 56B, in some embodiments, along the third direction 03, the height of the power mechanism 600B is $H_{B21}$, the height of the support plate 104B from the ground is $H_{B23}$, and a ratio $K_{B17}$ of $H_{B23}$ to $H_{B21}$ may fall within a range of 3-4.5. When $K_{B17} \geq 3$, it allows for a suitable distance between the power mechanism 600B and the ground, reducing the risk of the power mechanism 600B colliding with the ground or objects on the ground during travel, which is expected to ensure passability while reducing safety risks. When $K_{B17} \leq 4.5$, it allows for the power mechanism 600B to have a suitable height, which is expected to provide sufficient accommodation space for the battery pack 605B, potentially improving the endurance of the vehicle 2B.

Specifically, $K_{B17}$ may be any value within the range of 3-4.5, for example, 3, 3.2, 3.4, 3.6, 3.8, 4, 4.2, 4.4, or 4.5.

Referring to FIG. 56B, in some embodiments, along the first direction 01, the power mechanism 600B may be located at a front side of the support plate 104B, such that the weight of the power mechanism 600B is relatively forward, and a user's riding position is relatively rearward, which is conducive to balancing the force-bearing condition of the mounting frame 132B, and is expected to improve the driving stability of the vehicle 2B.

Figure 56C:
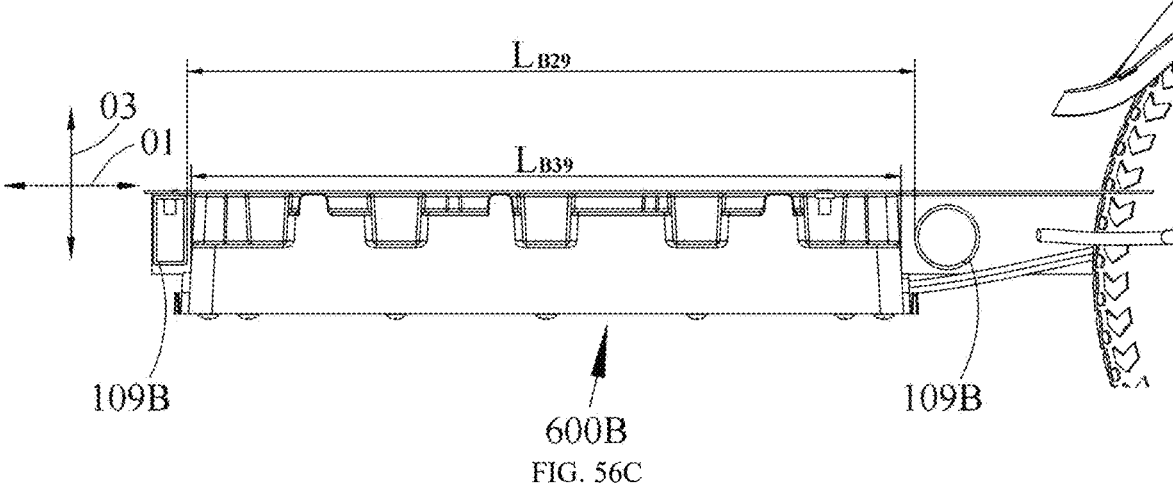

Referring to FIG. 56C, in some embodiments, along the first direction 01, the length of the power mechanism 600B is $L_{B39}$, a ratio of $L_{B29}$ to $L_{B39}$ is $K_{B19}$, where $L_{B29}$ is the distance between the reinforcing rib 109B located at a front side and the reinforcing rib 109B located at a rear side, and $K_{B19}$ may fall within a range of 1.01-1.05. When $K_{B19 \geq 1.01}$, in the process of placing the power mechanism 600B between the reinforcing rib 109B at the front side and the reinforcing rib 109B at the rear side, the risk of mutual friction or collision is expected to be reduced, potentially reducing installation difficulty. When $K_{B19} \leq 1.05$, it may reduce wasted space, reduce limitations on the size of the power mechanism 600B, and is expected to improve the endurance of the power mechanism 600B.

Specifically, $K_{B19}$ may be any value within the range of 1.01-1.05, for example, 1.01, 1.02, 1.03, 1.04, or 1.05.

Figure 56D:
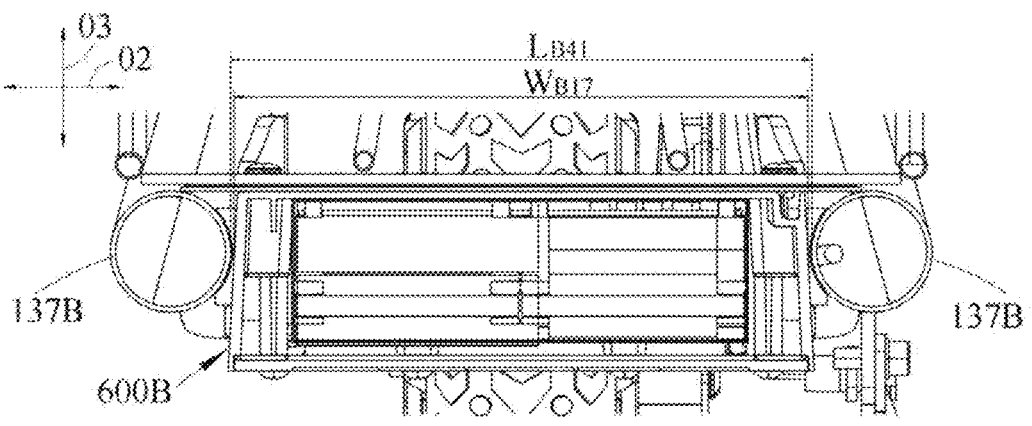

Referring to FIG. 56D, in some embodiments, along the second direction 02, the width of the power mechanism 600B is $W_{B17}$, the spacing between two first flat portions 13B is $L_{B41}$, a ratio of $L_{B41}$ to $W_{B17}$ is $K_{B21}$, and $K_{B21}$ may fall within a range of 1.01-1.05. When $K_{B21} \geq 1.01$, in the process of placing the power mechanism 600B between the two first flat portions 137B, the risk of mutual friction or collision is expected to be reduced, potentially reducing installation difficulty. When $K_{B21} \leq 1.05$, it may reduce wasted space, reduce limitations on the size of the power mechanism 600B, and is expected to improve the endurance of the power mechanism 600B.

Specifically, $K_{B21}$ may be any value within the range of 1.01-1.05, for example, 1.01, 1.02, 1.03, 1.04, or 1.05.

Figure 56E:
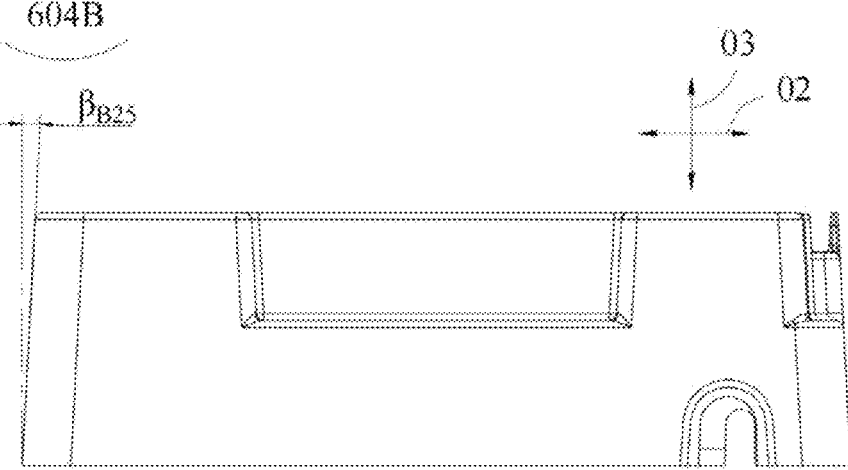

Referring to FIG. 56E, in some embodiments, along the second direction 02, the left and right sides of the battery box 604B may both be inclined inward by a angle. In conjunction with FIG. 56D, during the process of placing the battery box 604B between the two first flat portions 137B, it is possible to avoid the first flat portions 137B, reducing the risk of mutual friction or collision. At the same time, it may be more convenient and stable for an installer or maintenance personnel when holding the battery box 604B with one hand.

Referring to FIG. 56E, in some embodiments, taking the left side of the battery box 604B as an example for description, an angle between the left side of the battery box 604B and a second plane is $\beta_{B25}$, and $\beta_{B25}$ may fall within a range of 2° to 8°. When $\beta_{B25} \geq 2°$, it helps to ensure the avoidance effect with respect to the first flat portion 137B, and is expected to reduce the risk of collision. When $\beta_{B25} \leq 8°$, it allows for the battery box 604B to have a suitable inner cavity size, reducing limitations on the size of the placed battery pack 605B, and is expected to improve the endurance of the power mechanism 600B.

Specifically, $\beta_{B25}$ may be any value within the range of 2° to 8°, for example, 2°, 3°, 4°, 5°, 6°, 7°, or 8°.

Figure 56F:
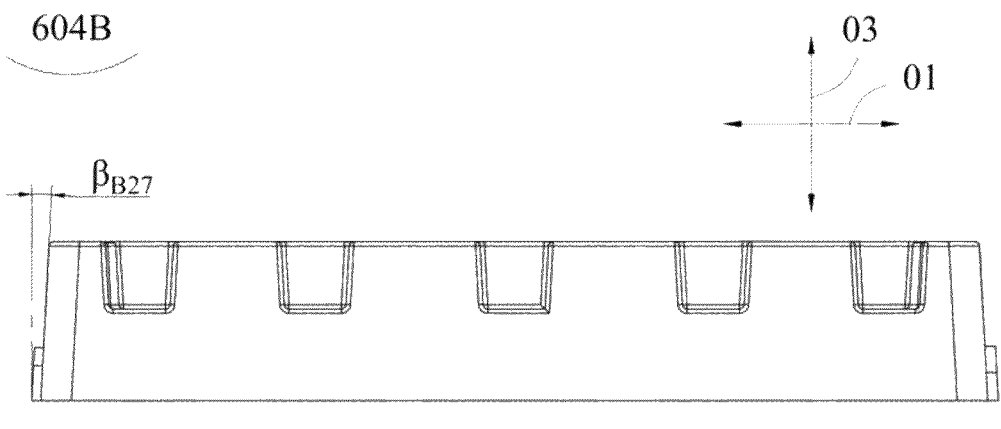

Referring to FIG. 56F, in some embodiments, along the first direction 01, the front and rear sides of the battery box 604B may both be inclined inward by a angle. In conjunction with FIG. 56C, during the process of placing the battery box 604B between the reinforcing rib 109B at the front side and the reinforcing rib 109B at the rear side, it is possible to avoid the reinforcing rib 109B at the front side and the reinforcing rib 109B at the rear side, reducing the risk of mutual friction or collision.

Referring to FIG. 56F, in some embodiments, taking the front side of the battery box 604B as an example for description, an angle between the front side of the battery box 604B and a third plane is $\beta_{B27}$, and $\beta_{B27}$ may fall within a range of 2° to 8°. When $\beta_{B27 \geq 2}°$, it helps to ensure the avoidance effect with respect to the reinforcing rib 109B at the front side and the reinforcing rib 109B at the rear side, and is expected to reduce the risk of collision. When $\beta_{B27 \leq 8}°$, it allows for the battery box 604B to have a suitable inner cavity size, reducing limitations on the size of the placed battery pack 605B, and is expected to improve the endurance of the power mechanism 600B.

Specifically, $\beta_{B27}$ may be any value within the range of 2° to 8°, for example, 2°, 3°, 4°, 5°, 6°, 7°, or 8°.

In some embodiments, $\beta_{B25}$ and $\beta_{B27}$ may be the same, which facilitates forming and improves processing efficiency.

Figure 57A:
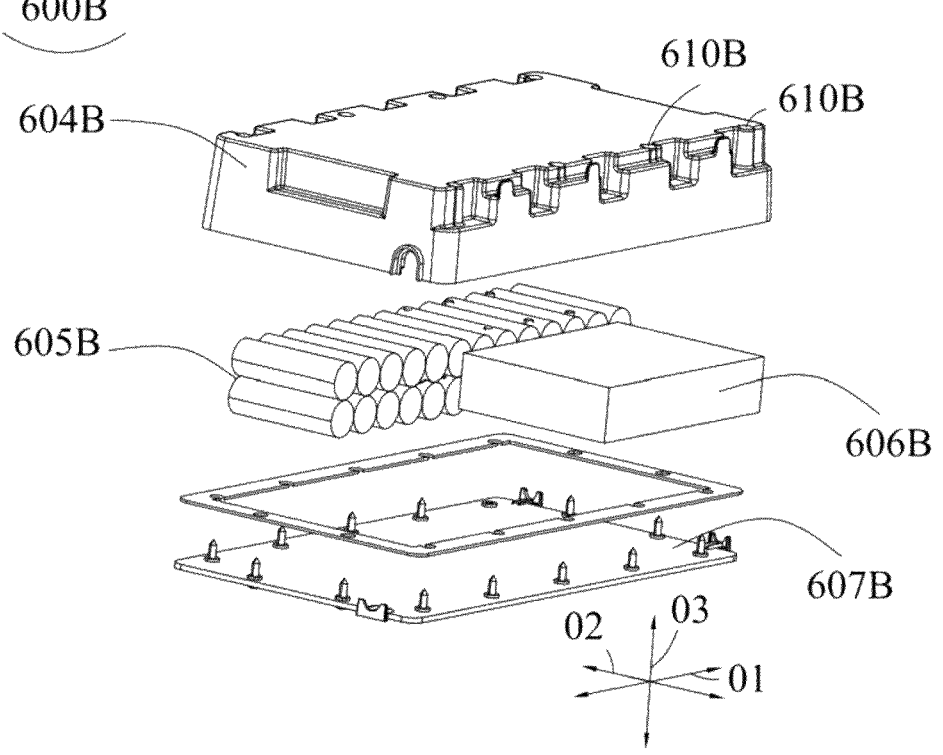
FIGS. 57A-57G are a set of schematic structural views of the power mechanism.
Figure 57B:
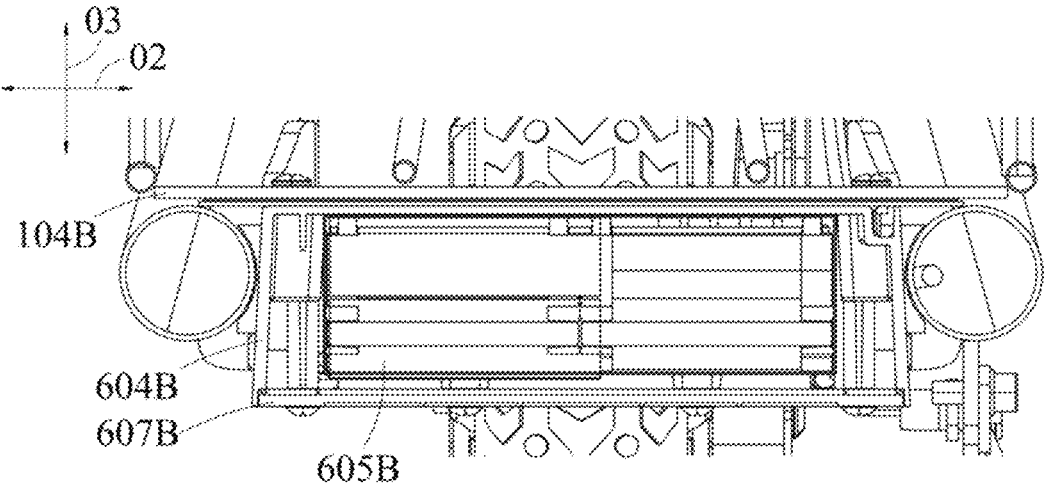
Figure 57C:
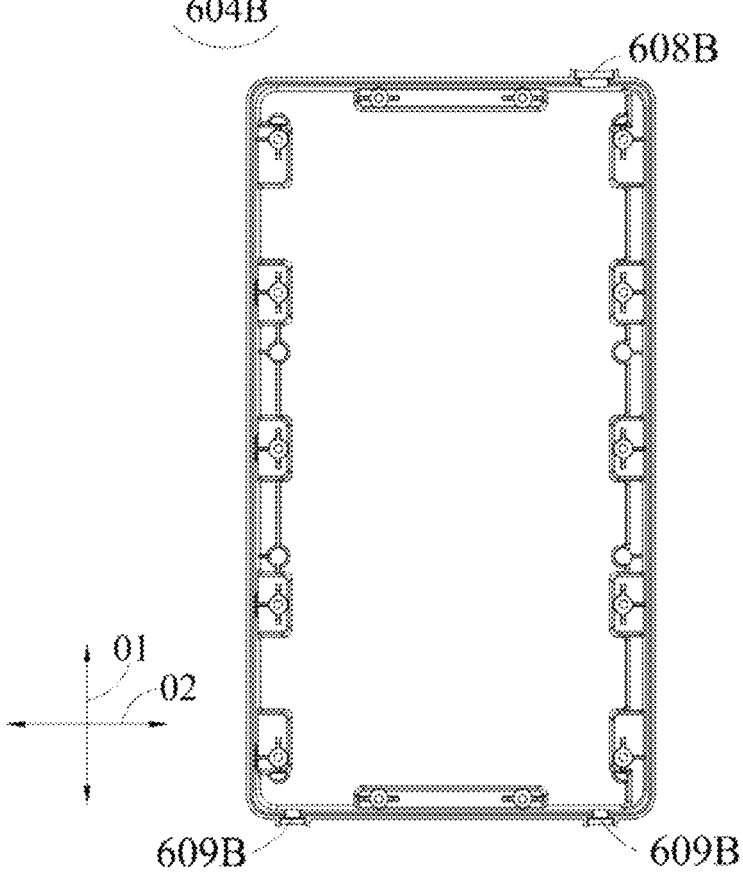
Figure 57D:
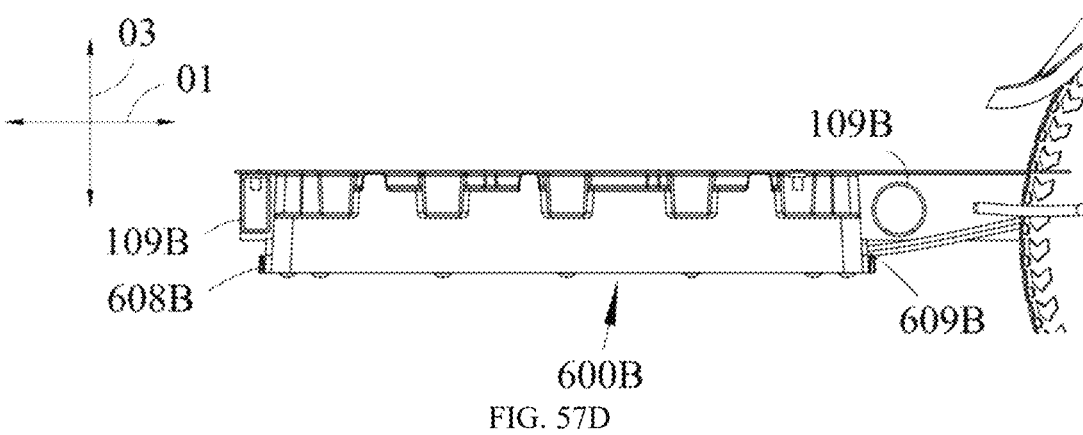
Figure 57E:
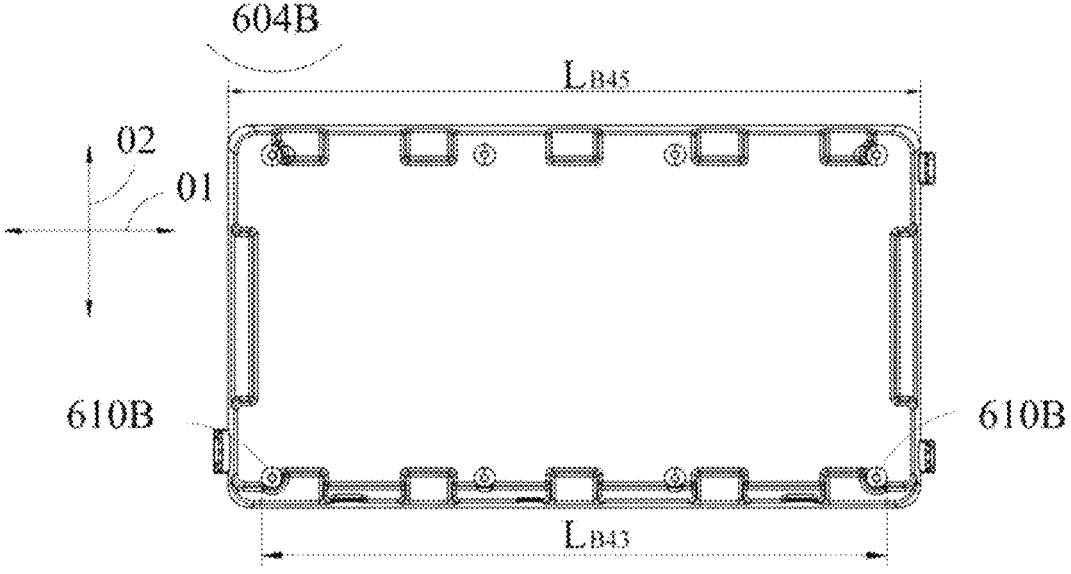
Figure 57F:
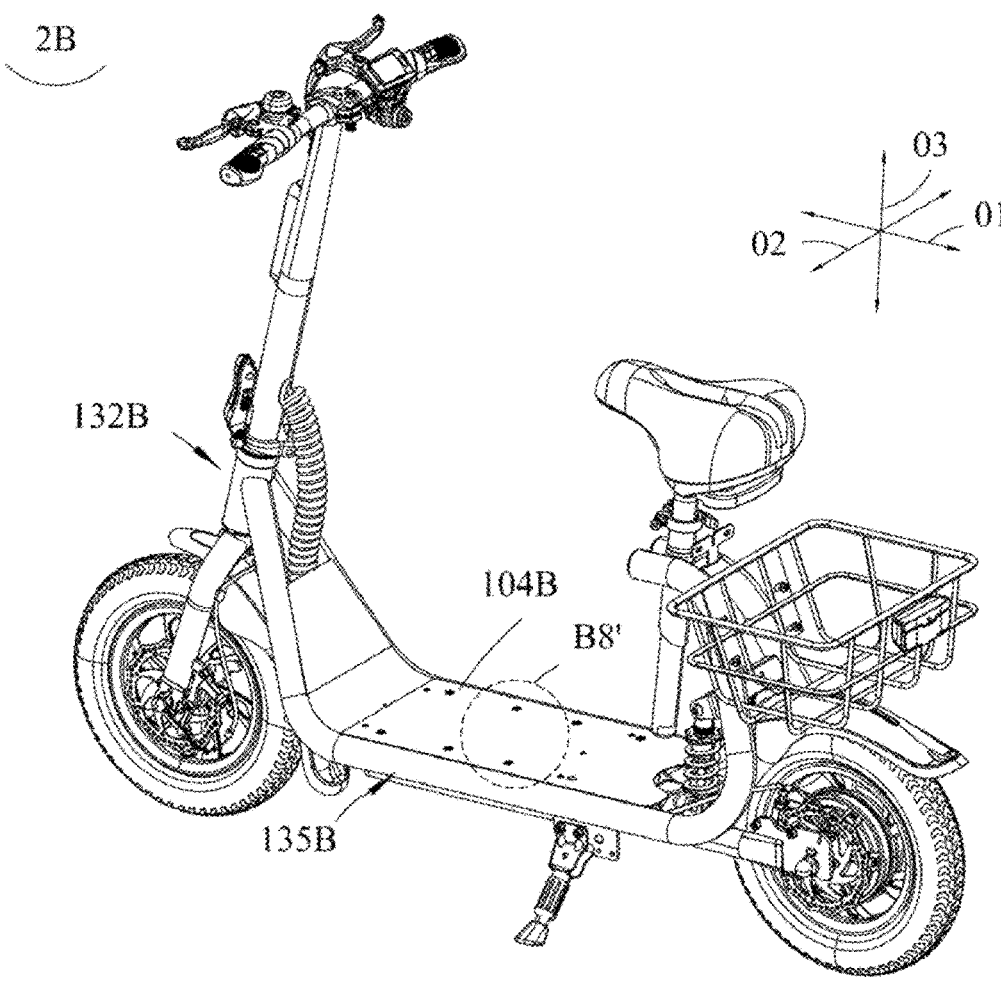
Figure 57G:
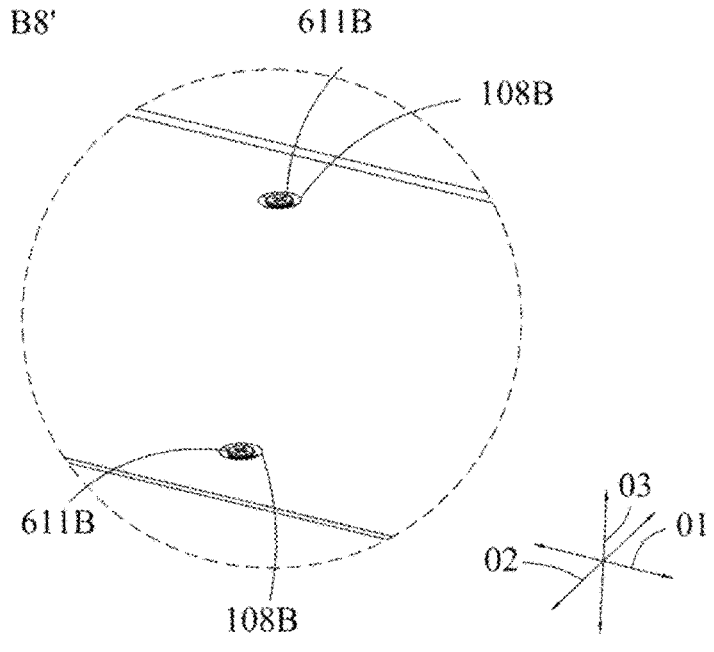

FIGS. 57A-57G are a set of schematic structural views of the power mechanism 600B. Wherein, FIG. 57G is an enlarged schematic view at B8' in FIG. 57F.

Referring to FIG. 57A, in some embodiments, the power mechanism 600B may include a battery cover 607B. In conjunction with FIG. 57B, along the third direction 03, the battery box 604B may be installed in an inverted manner on the support plate 104B, and the battery cover 607B may be located below the battery box 604B, that is, the battery cover 607B may face the ground. In addition, the battery box 604B may be made of plastic, and the battery cover 607B may be made of metal. Since the battery cover 607B is made of metal and faces the ground, it is susceptible to impacts from foreign objects such as sand, dust, and stones, and is also prone to scraping from the road surface. The high strength of metal is expected to withstand external impacts, preventing the battery cover 607B from deforming or breaking, which is beneficial for protecting the battery pack 605B, which is located internally. In addition, the power mechanism 600B generates heat during charging and discharging processes. The thermal conductivity of metal is higher than that of plastic, which is expected to quickly conduct heat to the outside, reducing the risk of the power mechanism 600B overheating. The use of plastic for the battery box 604B results in low cost and light weight, which is beneficial for reducing the overall vehicle weight, and is expected to improve endurance and achieve a lightweight design of the vehicle 2B.

In some embodiments, the material of the battery box 604B may be ABS312C, PC, or PBT. ABS312C is acrylonitrile-butadiene-styrene copolymer, PC is polycarbonate, and PBT is polybutylene terephthalate.

In some other embodiments, the material of the battery box 604B may also be other plastic or metal materials, where the metal materials include but are not limited to stainless steel and aluminum alloy.

In some embodiments, the material of the battery cover 607B may be SPCC, Q195, Q235, SECC, or SGCC. SPCC is a cold-rolled carbon steel sheet, Q195 and Q235 are both carbon structural steels, SECC is an electro-galvanized steel sheet, and SGCC is a hot-dip galvanized steel sheet.

In some other embodiments, the material of the battery cover 607B may also be other metal or plastic materials, where the plastics include but are not limited to polypropylene (PP), polyethylene (PE), and ABS plastic.

Referring to FIG. 57C, in some embodiments, along the first direction 01, a front side of the battery box 604B may be provided with a first cable hole 608B. In conjunction with FIG. 57D, along the third direction 03, a top side of the first cable hole 608B may be lower than a bottom side of the reinforcing rib 109B located at the front side, reducing the difficulty of passing a cable through the first cable hole 608B, and allowing the cable to have a more natural extension shape, which is beneficial for protecting the cable.

Referring to FIG. 57C, in some embodiments, along the first direction 01, a rear side of the battery box 604B may be provided with a second cable hole 609B. In conjunction with FIG. 57D, along the third direction 03, a top side of the second cable hole 609B may be lower than a bottom side of the reinforcing rib 109B located at the rear side, reducing wiring difficulty after a cable passes out of the first cable hole 608B, and allowing the cable to have a more natural extension shape, which is beneficial for protecting the cable.

Referring to FIG. 57A, in some embodiments, along the second direction 02, the left and right sides of the battery box 604B may each be provided with a screw boss 610B. The vehicle 2B may include a first screw 611B corresponding to the screw boss 610B, and the first flat portion 137B may be provided with a second threaded hole 108B corresponding to the first screw 611B. The battery box 604B and the support plate 104B are fixed by the first screw 611B and the screw boss 610B, which may provide a stable connection at a low cost.

Referring to FIG. 57A, in some embodiments, the battery box 604B may be provided with multiple rows of screw bosses 610B along the first direction 01. Through the multiple rows of screw bosses 610B and multiple rows of first screws 611B, the connection is strong and stable, and may be suitable for bumpy road conditions.

In some embodiments, the number of rows of the screw bosses 610B may include, but is not limited to, two, three, or four rows.

Referring to FIG. 57G, in some embodiments, along the third direction 03, the second threaded hole 108B may be wide at a top side and narrow at a bottom side, and the first screw 611B may be a flat-head screw, which facilitates a countersunk installation of the first screw 611B. That is, a top side of the first screw 611B may be flush with a top side of the first flat portion 137B. When a user steps on the support plate 104B, there may be no foreign body sensation, providing good comfort. In addition, when getting on or off the vehicle, there is no obstruction, which is expected to allow smooth movement of the feet. When an animal is seated on the support plate 104B, there may be no foreign body sensation, providing good comfort, and when getting on or off the vehicle, there is no obstruction, providing good safety.

Referring to FIG. 57E, in some embodiments, along the first direction 01, a distance between the first row of screw bosses 610B and the last row of screw bosses 610B is $L_{B43}$, a length of a top side of the battery box 604B is $L_{B45}$, and a ratio of $L_{B43}$ to $L_{B45}$ is $K_{B23}$, where $K_{B23}$ may fall within a range of 0.8-1. When $K_{B23} \geq 0.8$, both ends of the battery box 604B have support points, which is expected to improve the stability of the overall support for the power mechanism 600B.

Specifically, $K_{B23}$ may be any value within the range of 0.8-1, for example, 0.8, 0.82, 0.84, 0.86, 0.88, 0.9, 0.92, 0.94, 0.96, 0.98, or 1.

Figure 57H:
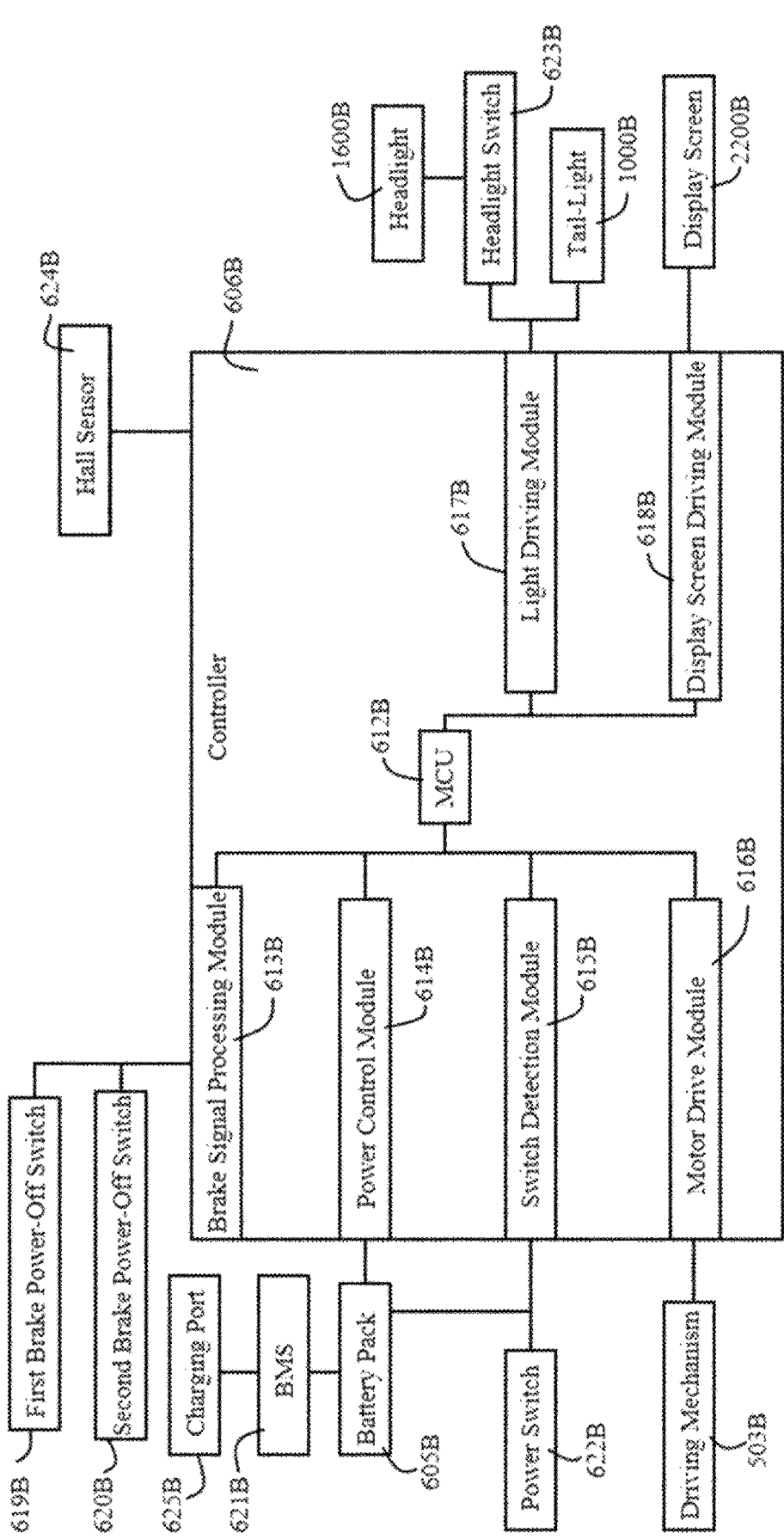
FIG. 57H is a schematic diagram illustrating the composition of the electrical components of the vehicle according to an embodiment of the present application.

Referring to FIG. 57H, in some embodiments, the vehicle 2B may include some electrical components. The core of these electrical components is a controller 606B, and the controller 606B (which may also be referred to as a control circuit) is responsible for coordinating various functions of the vehicle 2B.

One or more electrical components inside the controller 606B may include an MCU (Microcontroller Unit) 612B, a brake signal processing module 613B, a power control module 614B, a switch detection module 615B, a motor drive module 616B, a light driving module 617B, and a display screen driving module 618B.

In some embodiments, the controller 606B is used to receive signals from one or more input components and send control commands to one or more output components. The input components may include, but are not limited to: a first brake power-off switch 619B, a second brake power-off switch 620B, a BMS (Battery Management System) 621B, a power switch 622B, a headlight switch 623B, and a Hall sensor 624B. The output components may include, but are not limited to: a driving mechanism 508B, a headlight 1600B, a tail-light 1000B, and a display screen 2200B.

The type of MCU 612B is not particularly limited. Since the MCU 612B may integrate an arithmetic logic unit, memory, and input/output interfaces on a single chip, it may serve as the computing and control core of the controller 606B.

In some embodiments, regarding the power-on and initialization process, the power for the vehicle 2B comes from a battery pack 605B. The battery pack 605B may be one or more rechargeable batteries, such as lithium batteries, which are relatively lightweight and have high power density. For example, the battery pack 605B may include one or more lithium iron phosphate batteries, one or more lithium polymer batteries, one or more lithium cobalt oxide batteries, one or more lithium manganese oxide batteries, or a combination thereof. The battery pack 605B is managed by a BMS 621B for charge/discharge protection and status monitoring. A user may charge the battery pack 605B through a charging port 625B.

When the user closes the power switch 622B, the switch detection module 615B detects the closed state of the switch and sends a power-on command to the MCU 612B. At the same time, the power control module 614B is electrically connected to the battery pack 605B and is used to regulate and convert the electrical energy from the battery pack 605B (for example, through a DC-DC conversion circuit) to generate one or more stable operating voltages that meet preset specifications, and to distribute the operating voltages to the MCU 612B and other electrical components within the controller 606B. After receiving the power-on command and obtaining a stable power supply, the MCU 612B begins to execute a firmware program, perform system initialization, and light up the display screen 2200B through the display screen driving module 618B, causing the vehicle 2B to enter a standby state.

In some embodiments, regarding motor drive and control, the drive control function of the driving mechanism 503B (for example, a hub motor) may be as follows: the user inputs an acceleration command by operating/rotating the vehicle's speed-regulating device (for example, a throttle twist grip) by hand. The throttle twist grip has a Hall sensor 624B built-in, which is used to detect the amount of operation (for example, the rotation angle of the twist grip) and generate an electrical signal proportional to the amount of operation, which is sent to the MCU 612B as an acceleration command. In some embodiments, the aforementioned speed-regulating device may employ equivalent rotational displacement sensors that output an electrical signal proportional to the amount of operation, such as a potentiometer-type angle sensor, a magneto-sensitive angle sensor (e.g., AMR/TMR/GMR), an optical angle sensor/encoder, or a capacitive angle sensor. A person of ordinary skill in the art would understand that the speed-regulating device (throttle twist grip) herein may essentially be an electronic throttle as found on electric vehicles or common e-bikes-when the user twists the grip, the system sends an electrical signal proportional to the angle of rotation to the MCU of the control system/circuit as an acceleration command.

While receiving the acceleration command, the MCU 612B also needs to obtain rotor position information of the driving mechanism 503B to achieve precise control. The rotor position information may be obtained through a position sensor installed inside the driving mechanism 503B (for example, another set of Hall sensors, not separately labeled in the drawings), or estimated through a sensorless control algorithm that detects the back electromotive force of the motor.

The MCU 612B performs calculations based on the received acceleration command and the acquired rotor position information through a preset control algorithm, thereby generating a drive signal for controlling the driving mechanism 503B. The preset control algorithms include, but are not limited to, Field-Oriented Control (FOC) algorithm, square wave control algorithm, or a combination thereof.

The drive signal is sent to the motor drive module 616B, which may be a BLDC (Brushless Direct Current) driver logic interpreter. The BLDC driver logic interpreter may decode the signal from the MCU 612B and drive the driving mechanism 503B accordingly.

In some embodiments, one or more feedback sensors may also be included. For example, a motor temperature sensor (not shown) may be configured to measure the temperature of the driving mechanism 503B and send the measured temperature to the MCU 612B. The MCU 612B may limit the amount of power supplied to the driving mechanism 503B based on the measured temperature to prevent it from overheating. This not only protects the motor but also helps to improve the reliability and service life of the vehicle 2B.

In some embodiments, regarding the brake power-off safety protection, a first brake power-off switch 619B may be installed on the brake lever 1402B on the left side, and a second brake power-off switch 620B may be installed on the brake lever 1402B on the right side, along the second direction D2. These two switches may be mechanical, magnetic induction, or photoelectric switches. Their working principle is as follows: when the user is not operating the brake lever, the switch is closed (or open); when the user pulls either brake lever, the on-off state of the switch changes, and the brake signal processing module 613B monitors the status of these two switches in real time. Once a state change is detected, it is determined that the user has performed a braking operation, and a high-priority brake interrupt signal is sent to the MCU 612B. By setting up power-off switches on the brake levers on the left and right sides respectively, a redundant safety system is formed. Even if one of the power-off switches fails for some reason (for example, mechanical jamming or a line failure), the other switch may still work normally, ensuring that the motor power-off command may be reliably triggered when the user brakes. This dual-insurance design improves the safety and reliability of the braking system. When the MCU 612B receives the brake interrupt signal, it will prioritize the execution of the braking logic. The braking logic is used to suppress or stop sending drive signals to the motor drive module 616B, even when an acceleration command is being received. This ensures that the execution priority of the braking command is higher than that of the acceleration command, thus causing the motor drive module 616B to stop supplying power to the driving mechanism 503B.

In some embodiments, regarding lighting and display control, the user may operate a headlight switch 623B, and the MCU 612B controls the turning on or off of the headlight 1600B through the light driving module 617B based on the received switch signal. After the system is powered on, the tail-light 1000B remains constantly on under the control of the light driving module 617B. When the MCU 612B receives a brake signal from the brake signal processing module 613B, it will control the light driving module 617B to increase the power supplied to the tail-light 1000B, causing it to enter a high-brightness state to serve as a warning. In addition, the MCU 612B may process battery level data from the BMS 621B, speed data calculated based on the motor's operating status, and system status data, and present this information on the display screen 2200B through the display screen driving module 618B. By centrally displaying status information such as vehicle speed and battery level on the display screen 2200B, it allows the user to quickly grasp the real-time status of the vehicle 2B without distracting too much attention, thus focusing more on the road conditions, which improves the driving experience and active safety.

In some embodiments, the workflow of the vehicle 2B may include the following steps.

Power-on and reset: When the power switch 622B is activated and turned on, the power control module 614B provides operating voltage to the MCU 612B and some other electronic and electrical components. The MCU 612B may perform a reset operation upon power-on to ensure that all registers and memory units are in a known initial state.

Firmware startup and hardware interface configuration: After the reset, the MCU 612B begins to execute pre-programmed startup code. At this stage, the MCU 612B will configure the hardware interfaces with related electrical components, for example, by establishing communication with the BMS 621B, display screen 2200B, etc., through serial communication buses such as I2C (Inter-Integrated Circuit), SPI (Serial Peripheral Interface), or UART (Universal Asynchronous Receiver-Transmitter).

Sensor calibration: To ensure accurate and reliable data, the MCU 612B will calibrate the sensors before using them. For example, for the Hall sensor 624B used to detect acceleration commands, the MCU 612B may record during the initialization phase its output signal values at the two extreme positions of the throttle twist grip-fully released and fully twisted. Through this calibration process, an accurate signal-to-operation-amount mapping relationship may be established, thereby ensuring the linearity and accuracy of the acceleration response.

System self-check and standby: During the initialization process, the MCU 612B will perform a check on electrical components (such as the first brake power-off switch 619B, the second brake power-off switch 620B, and the motor drive module 616B) to confirm whether they are in a normal working state. After the self-check is passed, the vehicle 2B enters a standby state, waiting for user input commands.

Dynamic control algorithm startup: When all initialization steps are completed, the MCU 612B may start the pre-programmed main control algorithm to achieve motion control of the vehicle 2B. In some embodiments, the main control algorithm may include a Proportional-Integral-Derivative (PID) control algorithm for speed loop or current loop control, to ensure that the vehicle 2B responds to the user's operating commands smoothly and efficiently. Thereafter, the vehicle 2B enters a continuous real-time control loop of "signal input-computation and processing-command output."

Figure 58A:
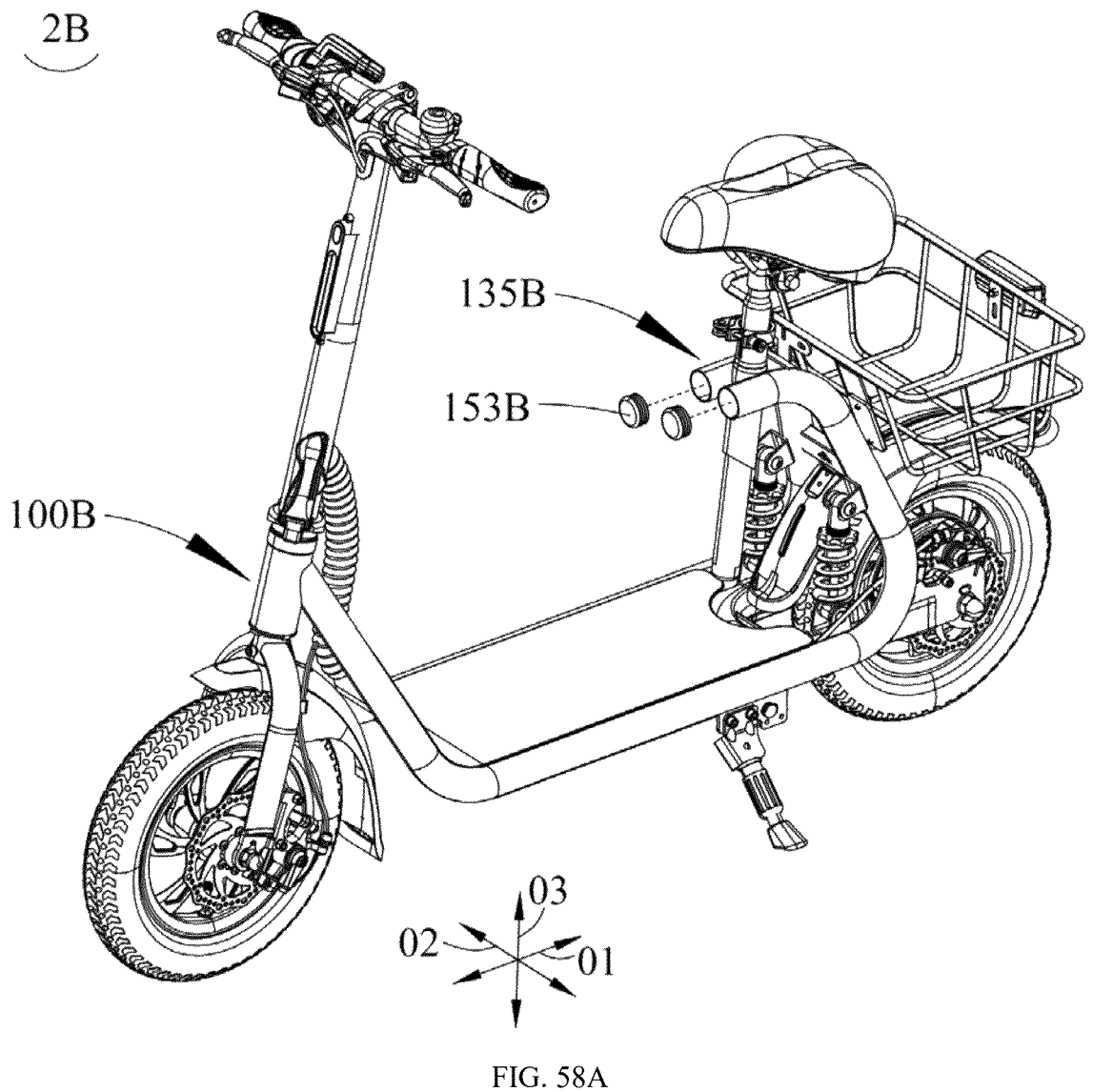
FIGS. 58A-58D are a set of schematic structural views of the plug.
Figure 58B:
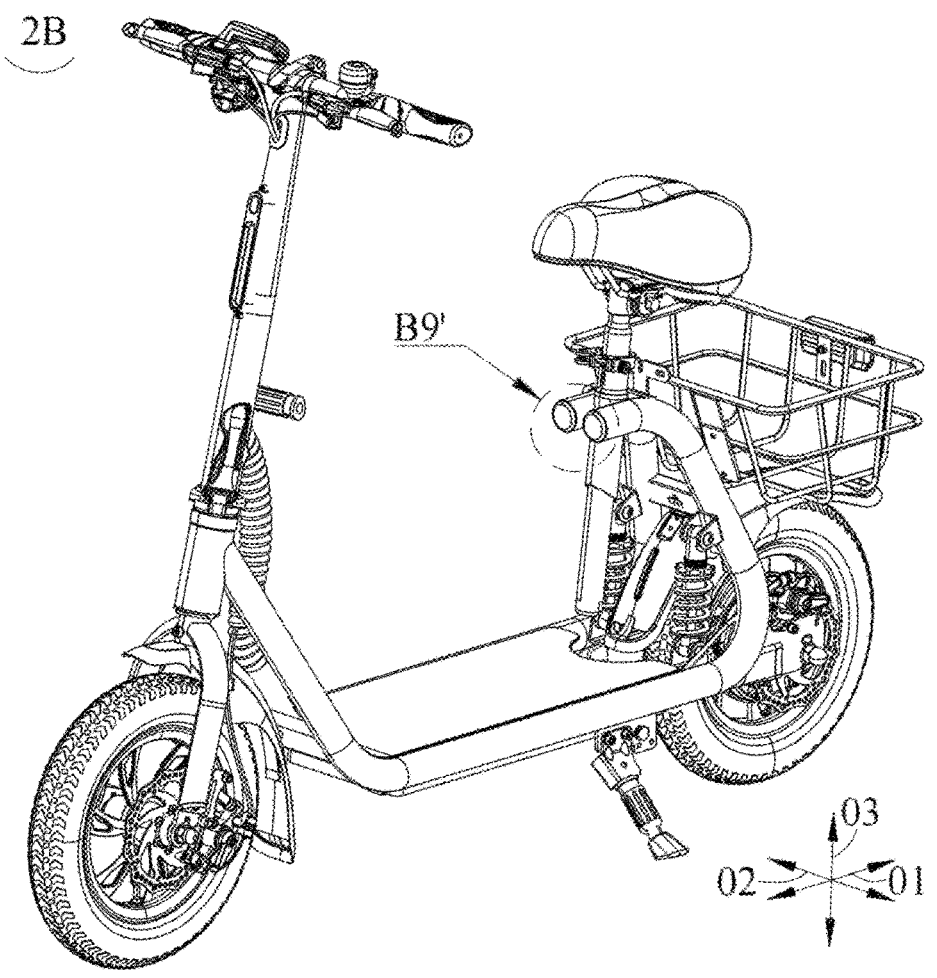
Figure 58C:
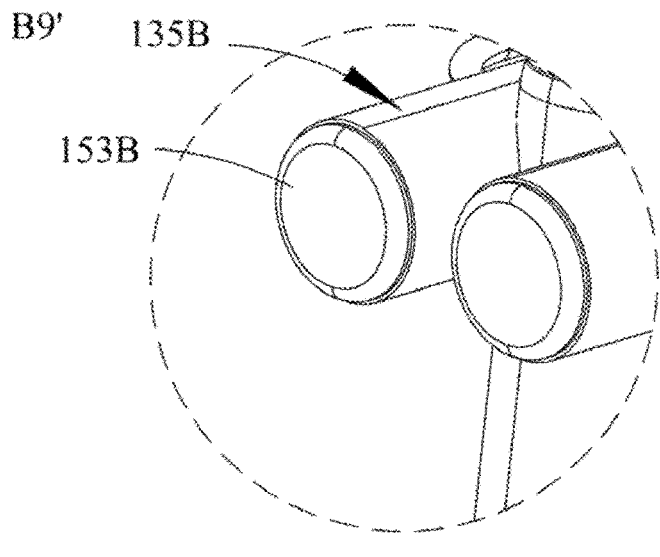

FIGS. 58A-58D are a set of schematic structural views of the plug 153B. Wherein, FIG. 58C is an enlarged schematic view at B9' in FIG. 58B.

Referring to FIG. 58A, in some embodiments, the bracket 135B may be tubular. The frame 100B may include a plug 153B matching an open end of the bracket 135B to plug the end of the bracket 135B, reducing the entry of dust or water vapor from the environment into the bracket 135B, reducing the risk of the bracket 135B being eroded, and is expected to reduce the risk of the weight of the vehicle 2B increasing as a result, while improving the cleanliness of the vehicle 2B. In addition, in conjunction with FIGS. 58B and 58C, the provision of the plug 153B is also expected to reduce the risk of a user or people around the vehicle 2B directly colliding with the end of the bracket 135B.

In some embodiments, the material of the plug 153B may be rubber or plastic, which has a elasticity, facilitating insertion into the bracket 135B through deformation. In addition, under the effect of the elastic deformation of the plug 153B itself, the plug 153B and the inner wall of the bracket 135B may press against each other, which is expected to reduce the risk of the plug 153B slipping off.

In addition, referring to FIG. 58A, in some embodiments, the bracket 135B may be in the shape of a circular tube. During the specific process of installing the plug 153B, the plug 153B may be inserted into the bracket 135B while rotating the plug 153B, reducing the operational difficulty.

Figure 58D:
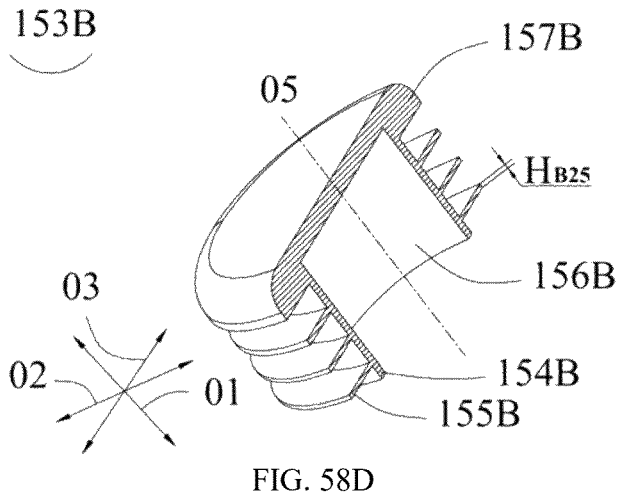

Referring to FIG. 58D, in some embodiments, the plug 153B may include a plug body 154B and a plurality of sealing rings 155B. The sealing rings 155B may be sleeved on the plug body 154B. In conjunction with FIG. 58C, after the plug 153B is installed, they may abut against an inner side wall of the bracket 135B to achieve sealing. Along an axial direction of the plug 153B, the plurality of sealing rings 155B may be sequentially arranged at intervals. It may be understood that the axial direction of the plug 153B refers to the direction in which an axis 05 of the plug 153B lies, that is, the extension direction of the bracket 135B at this position. It may be understood that, in some embodiments, the axial direction of the plug 153B may be along the first direction 01. It may be understood that, in some other embodiments, as the shape of the bracket 135B is adjusted, the axis of the plug 153B is adjusted accordingly, and its axial direction is also adjusted accordingly.

The provision of the plurality of sealing rings 155B is expected to improve the sealing effect of the end of the bracket 135B. In addition, the provision of the plurality of sealing rings 155B may also increase the frictional force between the plug 153B and the inner side wall of the bracket 135B, reducing the risk of the plug 153B slipping off. In addition, the plurality of sealing rings 155B may be sequentially arranged at intervals to reserve space for the deformation of the sealing rings 155B along the axial direction of the plug 153B, facilitating the insertion of the plug 153B into the bracket 135B.

Referring to FIG. 58D, in some embodiments, along the axial direction of the plug 153B, a thickness $H_{B25}$ of the sealing ring 155B may fall within a range of 0.2 mm-1 mm. When $H_{B25} \geq 0.2$ mm, the sealing ring 155B has good strength, reducing the risk of plastic deformation, tearing, or damage. When $H_{B25} \leq 1$ mm, the sealing ring 155B has a suitable contact surface with the bracket 135B, which helps to reduce friction during the process of inserting the plug 153B into the bracket 135B and is expected to reduce assembly difficulty. Specifically, $H_{B25}$ may be any value within the range of 0.2 mm-1 mm, for example, 0.2 mm, 0.3 mm, 0.4 mm, 0.5 mm, 0.6 mm, 0.7 mm, 0.8 mm, 0.9 mm, or 1 mm.

Referring to FIG. 58D, in some embodiments, the spacing between adjacent sealing rings 155B may be uniform, which facilitates production and improves aesthetics. It may be understood that, in some other embodiments, the spacing between adjacent sealing rings 155B may also not be completely identical.

Referring to FIG. 58D, in some embodiments, the sealing ring 155B and the plug body 154B may be integrally formed. It may be understood that, in some other embodiments, the sealing ring 155B and the plug body 154B may also be provided as separate parts, with the sealing ring 155B being sealingly sleeved on the plug body 154B.

Referring to FIG. 58D, in some embodiments, a side of the plug body 154B facing the bracket 135B along the axial direction may be provided with a first weight-reducing groove 156B, which is beneficial for reducing the weight of the plug 153B and reducing the material cost of the plug 153B. In addition, the plug 153B has elasticity, and the provision of the first weight-reducing groove 156B helps the plug body 154B to elastically deform along a radial direction, facilitating insertion into the bracket 135B.

Referring to FIG. 58D, in some embodiments, the first weight-reducing groove 156B may be a circular groove, which is simple in structure and easy to process. It may be understood that, in some other embodiments, the first weight-reducing groove 156B is not limited to a circular groove and may also be any other regular or irregular shape.

Referring to FIG. 58D, in some embodiments, an axis of the first weight-reducing groove 156B may be collinear with the axis of the plug body 154B, such that the ability of the plug body 154B to elastically deform along the axial direction is uniform, reducing the phenomenon of local stress concentration in the plug 153B, which is expected to reduce the risk of deformation of the plug 153B and ensure the service life of the plug 153B. Referring to FIG. 58D, in some embodiments, the number of the first weight-reducing grooves 156B may be one. It may be understood that, in some other embodiments, the size and position of the first weight-reducing groove 156B may be adjusted so that a plurality of first weight-reducing grooves 156B may be provided.

Referring to FIG. 58D, in some embodiments, a side of the plug body 154B facing the bracket 135B along the axial direction may be provided with a rim 157B. In conjunction with FIG. 58C, the rim 157B may match an end face of the bracket 135B. After the plug 153B is installed, the rim 157B abuts against the end face of the bracket 135B, preventing the plug 153B from being fully inserted into the bracket 135B, which facilitates the disassembly and replacement of the plug 153B.

Referring to FIG. 58D, in some embodiments, the rim 157B may be annular. It may be understood that, in some other embodiments, the rim 157B is not limited to being annular and may also have other regular or irregular shapes. In addition, when the rim 157B may be non-annular, it may also refer to a plurality of rims 157B, and the plurality of rims 157B may be arranged around the plug body 154B.

Referring to FIG. 58D, in some embodiments, the rim 157B and the plug body 154B may be integrally formed. It may be understood that, in some other embodiments, the rim 157B and the plug body 154B may also be provided as separate parts and may be fixedly connected.

Figure 59A:
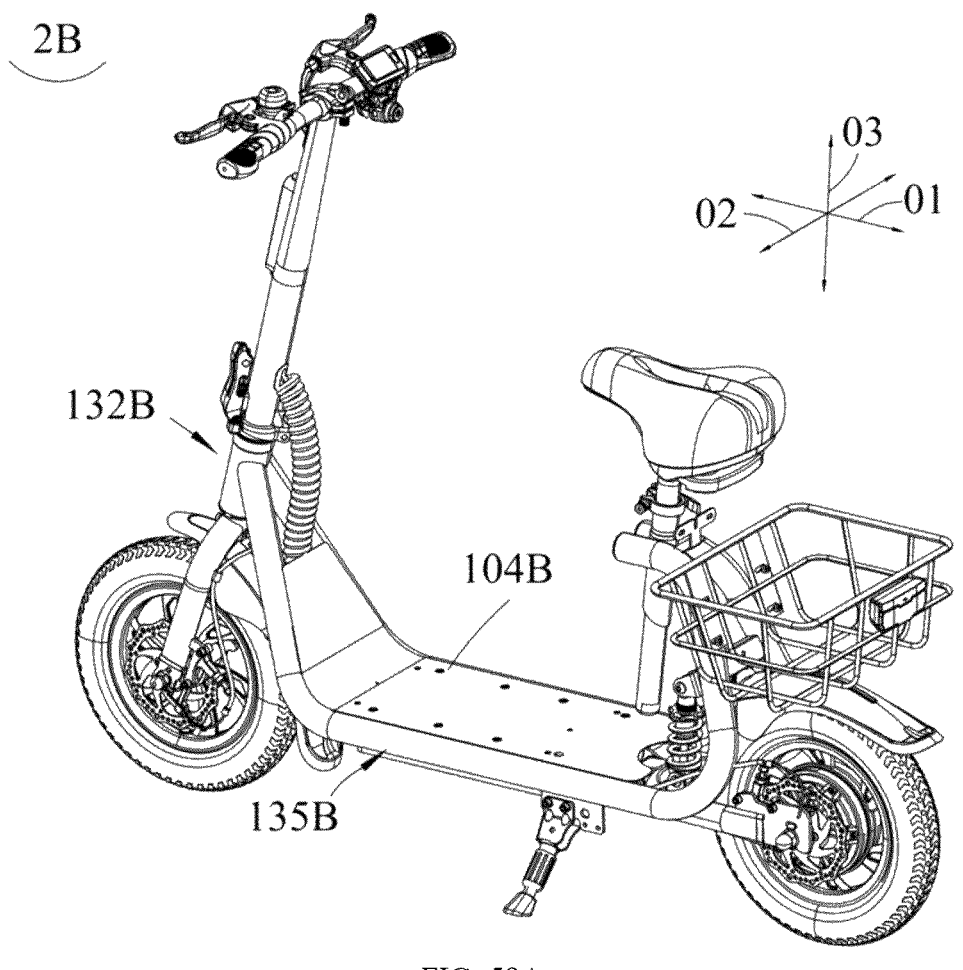
FIGS. 59A-59D are a set of schematic views illustrating the installation details of the support plate and the bracket.
Figure 59B:
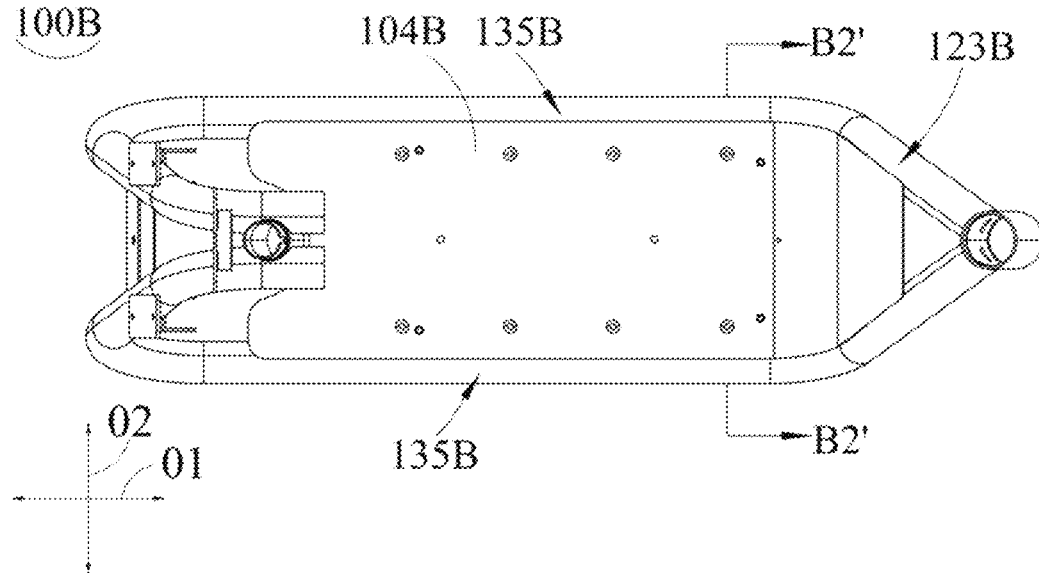
Figure 59C:
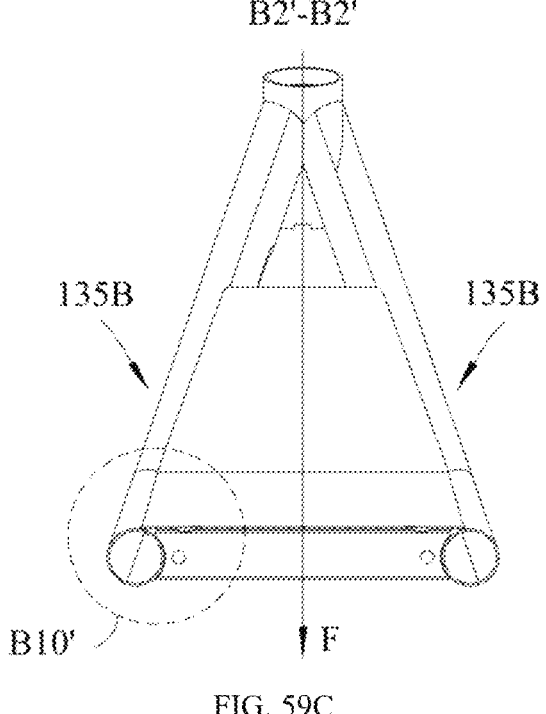
Figure 59D:
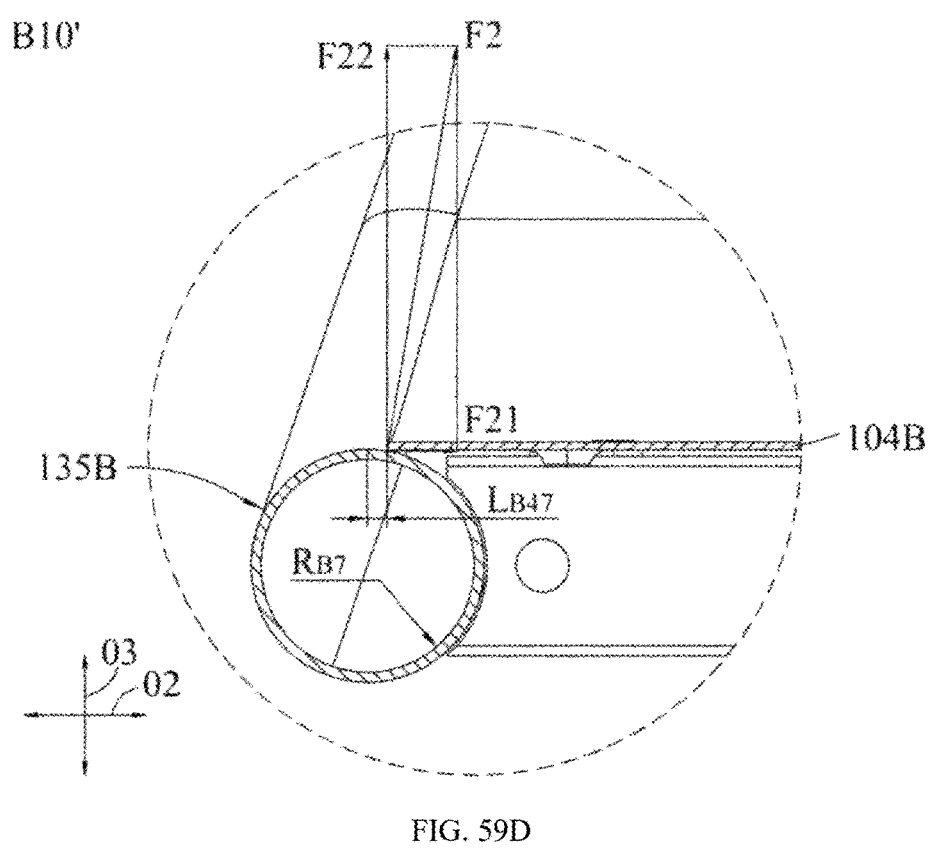

FIGS. 59A-59D are a set of schematic views illustrating the installation details of the support plate 104B and the bracket 135B. Wherein, FIG. 59C is a cross-sectional view along B2'-B2' in FIG. 59B, and FIG. 59D is an enlarged schematic view at B10' in FIG. 59C.

Referring to FIG. 59A, in some embodiments, the support plate 10B and the bracket 135B may be fixed by welding, without needing to provide additional fixing structures on the support plate 104B and the bracket 135B, which makes the structures of the support plate 104B and the bracket 135B simpler and facilitates processing.

Referring to FIG. 59D, in some embodiments, an edge of the support plate 104B near the bracket 135B may be fixedly connected to the bracket 135B, and the position of the fixed connection may be located at a top end or an inner side of the bracket 135B. It may also be understood that a bottom end of the support plate 104B is flush with the top end of the bracket 135B, or is lower than the top end of the bracket 135B. Through the foregoing arrangement, in conjunction with FIG. 59A, the risk of a user, or a person or animal around the vehicle 2B, being accidentally injured by colliding with the support plate 104B may be reduced. In addition, the edge of the support plate 104B may be fixedly connected to the bracket 135B, and the bracket 135B may provide a supporting force and constraining force to the edge of the support plate 104B, and facilitate the sharing of stress on the edge of the support plate 104B through force transmission, which is expected to reduce the risk of the edge of the support plate 104B deforming.

Referring to FIG. 59D, in some embodiments, the position where the support plate 104B is fixedly connected to the bracket 135B may be lower than the top end of the bracket 135B. The bracket 135B provides an inward supporting force to the support plate 104B, which may reduce the risk of the support plate 104B moving toward an outer side of the bracket 135B under the action of external pressure. In some embodiments, taking the support plate 104B and the left bracket 135B in FIG. 59B as an example, the interaction force between the support plate 104B and the left bracket 135B is analyzed in detail: referring to FIGS. 59C and 59D, the right side of the bracket 135B is its inner side, and the left side of the bracket 135B is its outer side; the support plate 104B may be located on the inner side of the bracket 135B, that is, it may be located on the right side of the bracket 135B; the position of the connection with the bracket 135B may be located in an upper-inner region of the bracket 135B, that is, the upper-right region of the bracket 135B. When the support plate 104B is subjected to a downward pressure F1, a supporting force F2 exerted by the bracket 135B on the support plate 104B is directed upward and to the right. According to the parallelogram rule, the supporting force F2 may be decomposed into a component force F21 along the second direction 02 and a component force F22 along the third direction 03. The component force F21 along the second direction 02 points toward the inner side of the bracket 135B, that is, the right side of the bracket 135B, thereby reducing the risk of the support plate 104B moving toward the outer side of the bracket 135B under the action of external pressure. In addition, the bracket 135B may shield the bottom end of the support plate 104B. Visually, the transition between the bracket 135B and the support plate 104B is smoother, which is expected to make the vehicle 2B more aesthetically pleasing.

In some other embodiments, a top surface of the support plate 104B may be coplanar with the top end of the bracket 135B, making the transition between the top end of the bracket 135B and the top surface of the support plate 104B smoother. When the second section 124B is used for stepping, even if a user steps on an edge position of the second section 124B, there may be no foreign body sensation underfoot, which is expected to improve stepping comfort. When the second section 124B is used for placing items, the placement surface is relatively smooth, which is beneficial for reducing the risk of damaging the items. When the second section 124B is used for placing an animal, even if the animal moves to the edge of the second section 124B, the risk of the animal being harmed by the edge of the support plate 104B is expected to be reduced, and the comfort of the animal may be improved.

It may be understood that, in some other embodiments, the top surface of the support plate 104B may also be lower than the top end of the bracket 135B, which is beneficial for reducing the width of the support plate 104B along the second direction 02 to achieve a miniaturized design.

It may be understood that, in some other embodiments, the top surface of the support plate 104B may also be higher than the top end of the bracket 135B to reduce the phenomenon of the bracket 135B being directly subjected to local force. In other words, whether the second section 124B is used for stepping, placing items, or placing an animal, the force acting on the second section 124B first acts on the support plate 104B, and the support plate 104B is then balanced by the supporting force of the entire mounting frame 132B, which reduces the risk of local stress concentration in the mounting frame 132B and is expected to improve the service life of the mounting frame 132B.

It may be understood that, in some other embodiments, the position where the support plate 104B is fixedly connected to the bracket 135B may also be located at the top end of the bracket 135B. At this time, the force exerted by the bracket 135B on the support plate 104B is along the third direction 03, opposite to the direction of the gravity of and the pressure on the support plate 104B, so the force exerted by the bracket 135B on the support plate 104B becomes smaller. Correspondingly, the pressure exerted by the support plate 104B on the bracket 135B also becomes smaller, reducing the risk of deformation of the bracket 135B and is expected to improve the service life of the bracket 135B.

It may be understood that, in some other embodiments, the position where the support plate 104B is fixedly connected to the bracket 135B may also be located at other positions on the bracket 135B, as long as the fixed connection between the support plate 104B and the bracket 135B is achieved.

Referring to FIG. 59D, in some embodiments, along the second direction 02, a distance between a side edge of the support plate 104B and the top end of the bracket 135B is $L_{B47}$, a radius of the bracket 135B is $R_{B7}$, and a ratio $K_{B25}$ of $L_{B47}$ to $R_{B7}$ may fall within a range of 0-0.5. When $K_{B25} \leq 0.5$, the height difference between the support plate 104B and the bracket 135B is suitable. When a user gets off, it is expected that their foot may slide straight out smoothly without needing to lift their leg to step over the bracket 135B, which is beneficial for reducing the difficulty of getting off.

Specifically, $K_{B25}$ may be any value within the range of 0-0.5, for example, 0, 0.05, 0.1, 0.15, 0.2, 0.25, 0.3, 0.35, 0.4, 0.45, or 0.5.

Of course, it may be understood that, in some other embodiments, the support plate 104B and the bracket 135B are not limited to being fixed by welding, and may also be fixedly connected by riveting or other methods.

Figure 60A:
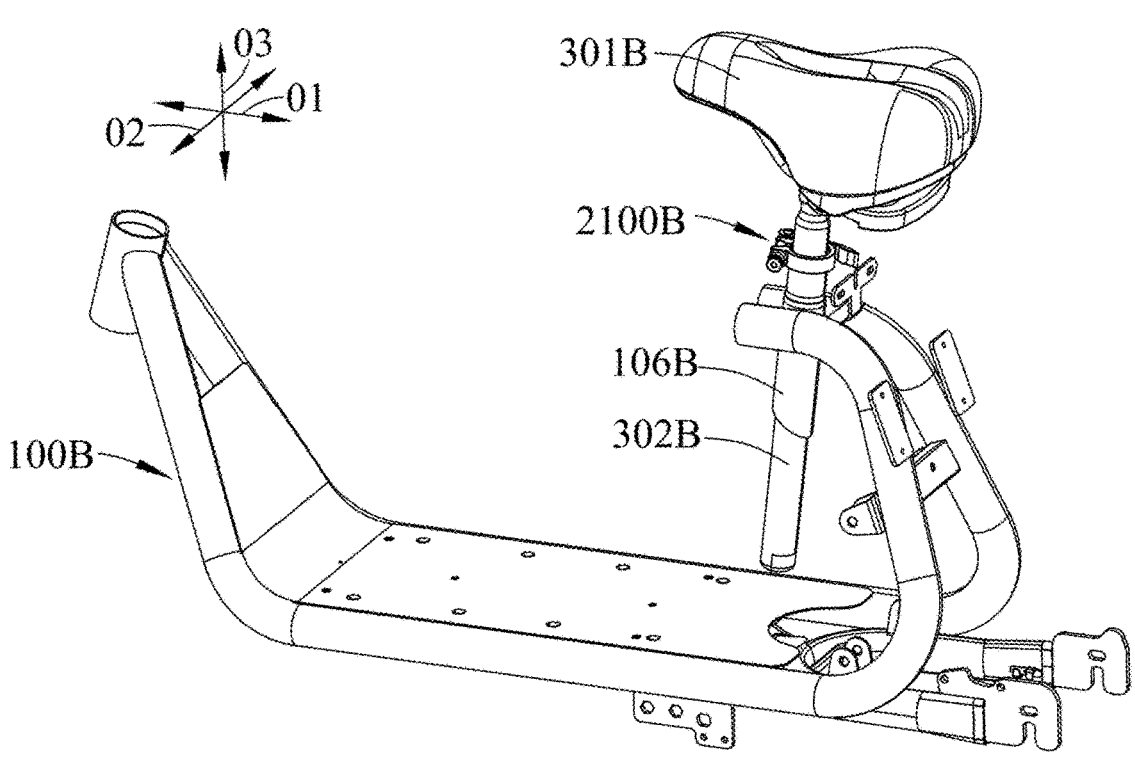
FIGS. 60A-60E are a set of schematic structural views of the first securing assembly.
Figure 60B:
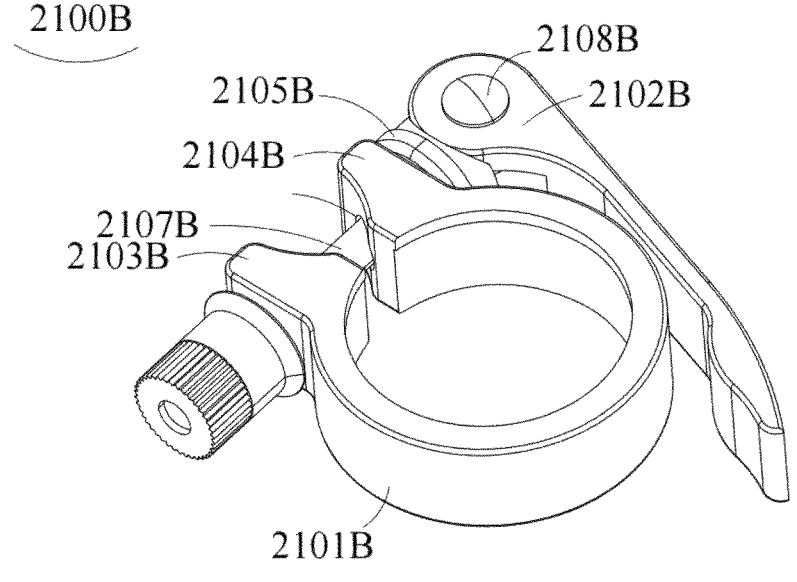
Figure 60C:
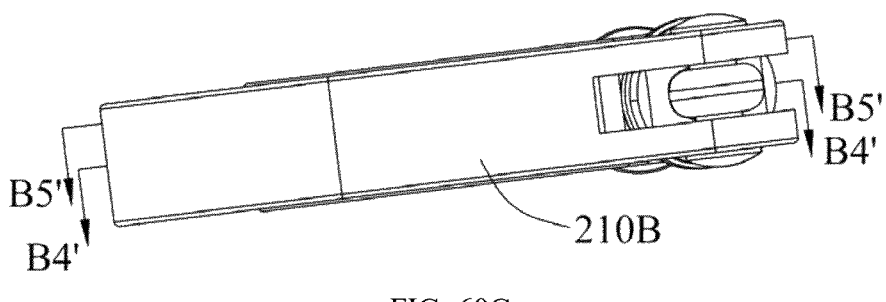
Figure 60D:
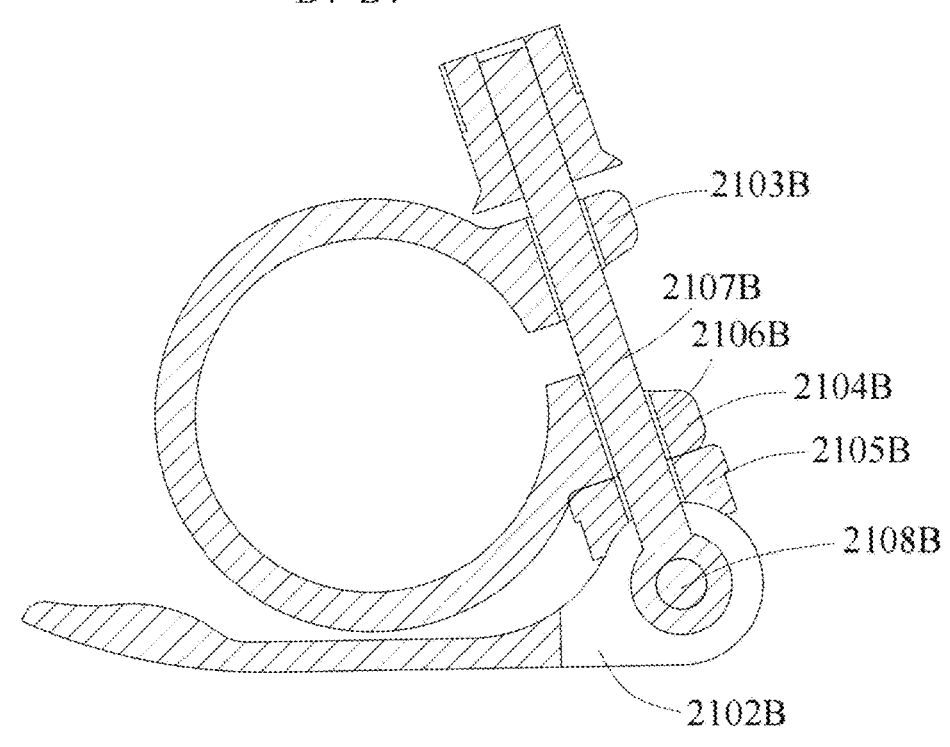
Figure 60E:
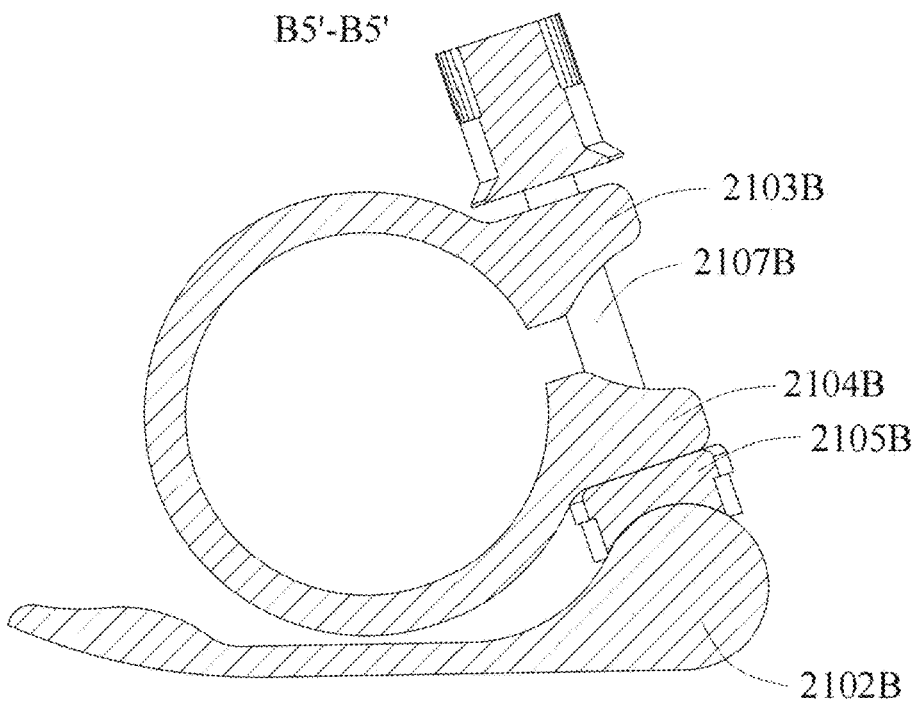

FIGS. 60A-60E are a set of schematic structural views of the first securing assembly 2100B. Wherein, FIG. 60D is a cross-sectional view along B4'-B4' in FIG. 60C, and FIG. 60E is a cross-sectional view along B5'-B5' in FIG. 60C.

Referring to FIG. 60A, in some embodiments, the middle tube 106B may be tubular and may match the seat tube 302B, that is, the seat tube 302B may be inserted into the middle tube 106B. The vehicle 2B may include a first securing assembly 2100B. After the seat tube 302B is inserted into the middle tube 106B, it is secured by the first securing assembly 2100B to achieve a fixed connection between the seat 301B and the frame 100B.

In some embodiments, referring to FIG. 60A, the first securing assembly 2100B may be sleeved on the middle tube 106B. Through the clamping of the first securing assembly 2100B, the fixing of the seat tube 302B and the middle tube 106B may be achieved, that is, achieving the fixed connection between the seat 301B and the frame 100B.

More specifically, in conjunction with FIGS. 60A and 60B, in some embodiments, the first securing assembly 2100B may include a clamping member 2101B with an opening on one side and a first locking member 2102B. In some embodiments, the clamping member 2101B may be sleeved on the middle tube 106B. The first locking member 2102B may be configured to adjust a size of the opening of the clamping member 2101B, so as to switch the clamping member 2101B between a clamping state and a release state. It may be understood that when a clamping force exerted on the middle tube 106B causes the opening of the clamping member 2101B to be smaller and the middle tube 106B and the seat tube 302B are relatively locked, the clamping member 2101B is in the clamping state; when the opening of the clamping member 2101B is larger and the clamping force exerted on the middle tube 106B is smaller, such that the seat tube 302B may move axially relative to the middle tube 106B, the clamping member 2101B is in the release state.

Referring to FIG. 60B, in some embodiments, two sides of the opening of the clamping member 2101B are provided with a first mounting portion 2103B and a second mounting portion 2104B arranged opposite to each other. The first locking member 2102B may be rotatably provided on the first mounting portion 2103B. The first locking member 2102B may be rotated so that the second mounting portion 2104B may move toward or away from the first mounting portion 2103B, so as to switch the clamping member 2101B between the clamping state and the release state.

In some embodiments, referring to FIG. 60B, in some embodiments, the first securing assembly 2100B may include a pressing portion 2105B located between the first locking member 2102B and the second mounting portion 2104B. When the first locking member 2102B is rotated until the pressing portion 2105B is pressed against the second mounting portion 2104B, the clamping member 2101B is in the clamping state; when the first locking member 2102B is rotated until the pressing portion 2105B avoids abutting against the second mounting portion 2104B, the clamping member 2101B is in the release state.

Referring to FIG. 60B, in some embodiments, the second mounting portion 2104B may be provided with a first guide hole 2106B passing therethrough; an axis of the first guide hole 2106B may be approximately the same as an arrangement direction of the first mounting portion 2103B and the second mounting portion 2104B. The first locking member 2102B may include a first guide member 2107B that matches the first guide hole 2106B; an end of the first guide member 2107B away from the first mounting portion 2103B may be provided with a pivot shaft 2108B; the first locking member 2102B may be sleeved on the pivot shaft 2108B. In some embodiments, in conjunction with FIGS. 60A and 60B, in some embodiments, the pivot shaft 2108B may be perpendicular to a guiding direction of the first guide member 2107B and may be coaxial with an axis of the middle tube 106B.

In addition, in some embodiments, when the first locking member 2102B is rotated to a position where the clamping member 2101B is in the clamping state, the first locking member 2102B abuts against the middle tube 106B. In other words, the middle tube 106B may be used to limit the continued rotation of the first locking member 2102B, so as to make it clear to an operator that the clamping member 2101B is already in the clamping state.

Referring to FIG. 60B, in some embodiments, a surface of the pressing portion 2105B that is pressed against and abuts the second mounting portion 2104B may be a flat surface, and a surface of the second mounting portion 2104B for being pressed against and abutting the pressing portion 2105B may be a flat surface, to limit the rotation of the first locking member 2102B, such that the clamping member 2101B is maintained in the clamping state. Of course, it may be understood that the clamping member 2101B may have a elasticity, therefore, under the action of an external force, the first locking member 2102B may be rotated to drive the second mounting portion 2104B to move toward the first mounting portion 2103B; the first locking member 2102B may also be rotated in the reverse direction, such that the pressing portion 2105B disengages from abutting the second mounting portion 2104B, and the second mounting portion 2104B moves away from the first mounting portion 2103BB under the action of the elastic force of the clamping member 2101B, so as to put the clamping member 2101B in the release state.

Referring to FIG. 60A, the seat tube 30B may move axially relative to the middle tube 106B. Therefore, the height of the seat 301B may be adjusted by moving the seat tube 302B. It may be understood that, after adjusting the seat tube 302B to a suitable position as needed, the relative fixation of the seat 301B and the frame 100B may be maintained through the fixing of the first securing assembly 2100B. When the position of the seat 301B needs to be adjusted, the seat tube 302B and the frame 100B are not fixed by the first securing assembly 2100B. In some embodiments, when the position of the seat 301B needs to be adjusted, the clamping member 2101B is in the release state.

Figures 61A, 61B:
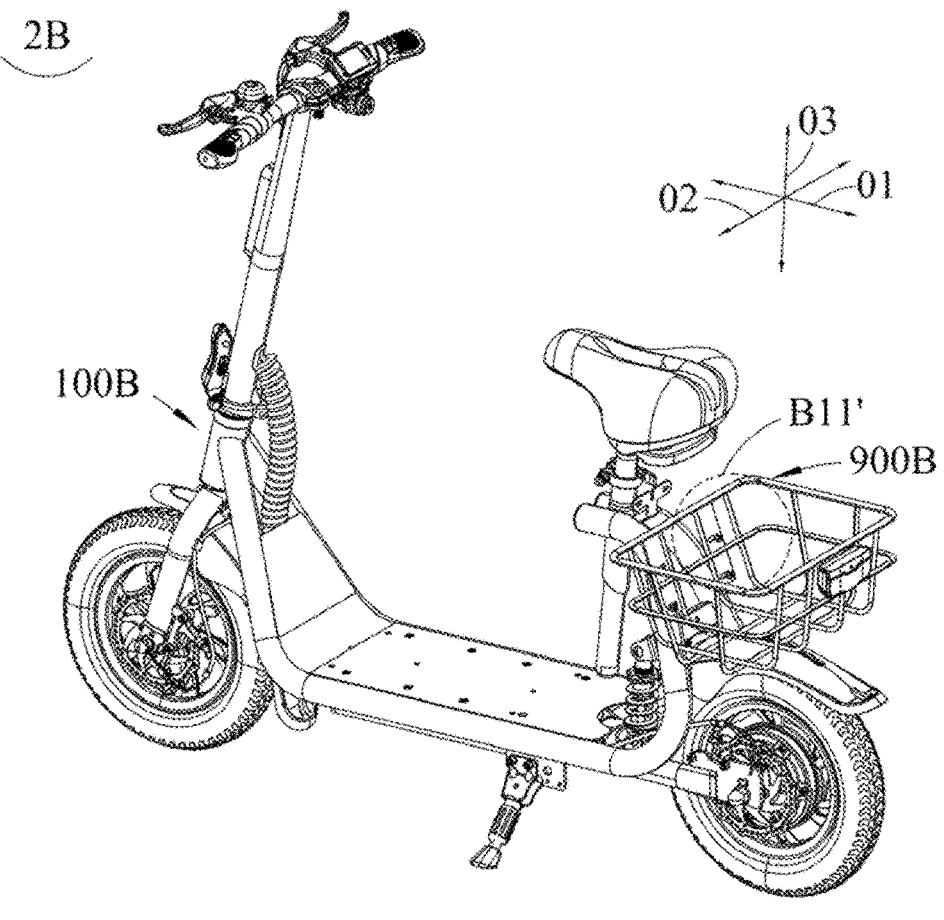
FIGS. 61A-61C are a set of schematic views illustrating the installation of the first bolt connection assembly.
Figure 61C:
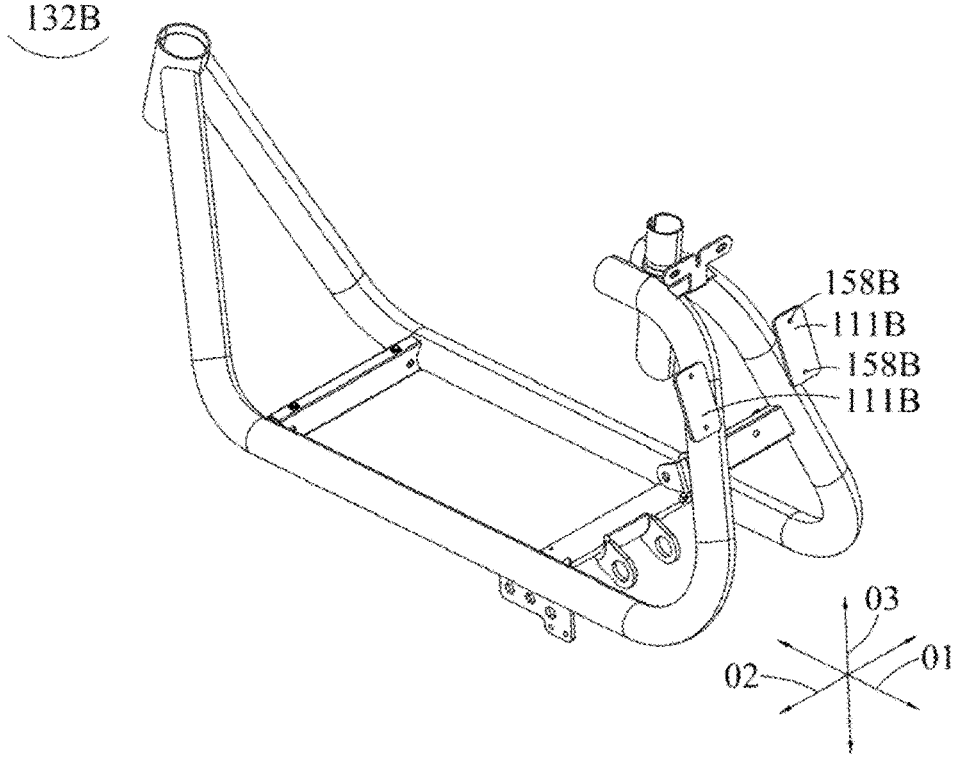

FIGS. 61A-61C are a set of schematic views illustrating the installation of the first bolt connection assembly 901B. Wherein, FIG. 61B is an enlarged schematic view at B11' in FIG. 61A.

Referring to FIGS. 61A and 61B, in some embodiments, the rear basket 900B and the frame 100B may be fixedly connected by the first bolt connection assembly 901B. In some embodiments, referring to FIG. 61C, the second weld tab 111B may be provided with a first fixing hole 158B, and the first fixing hole 158B may be a threaded hole. The rear basket 900B may be provided with a second fixing hole 90B, and the second fixing hole 902B may be a threaded hole or a clear hole. The first fixing hole 158B and the second fixing hole 902B may match the first bolt connection assembly 901B.

Referring to FIG. 61B, in some embodiments, a first bolt of the first bolt connection assembly 901B may be a socket head cap screw. A flat screw head is expected to reduce the risk of scratching items in the rear basket 900B or reduce interference with other components. In addition, a hex wrench may be inserted into the socket head cap screw from a vertical direction, which is expected to require a smaller disassembly or installation space and reduce installation difficulty.

In some embodiments, a specification of the first bolt of the first bolt connection assembly 901B may be M6, which provides good load capacity while being relatively small.

In other examples, the first bolt of the first bolt connection assembly 901B may also have other specifications, such as M8, M10, or M14.

Figure 62A:
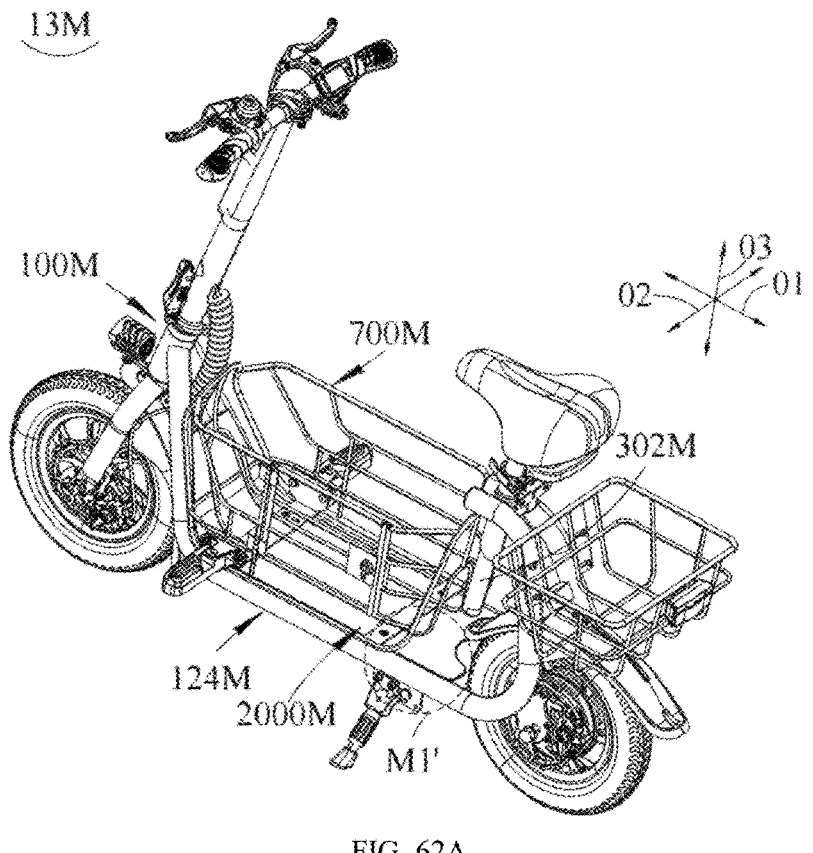
FIGS. 62A-62C are a set of schematic structural views of the storage mechanism according to an embodiment of the present application.
Figure 62B:
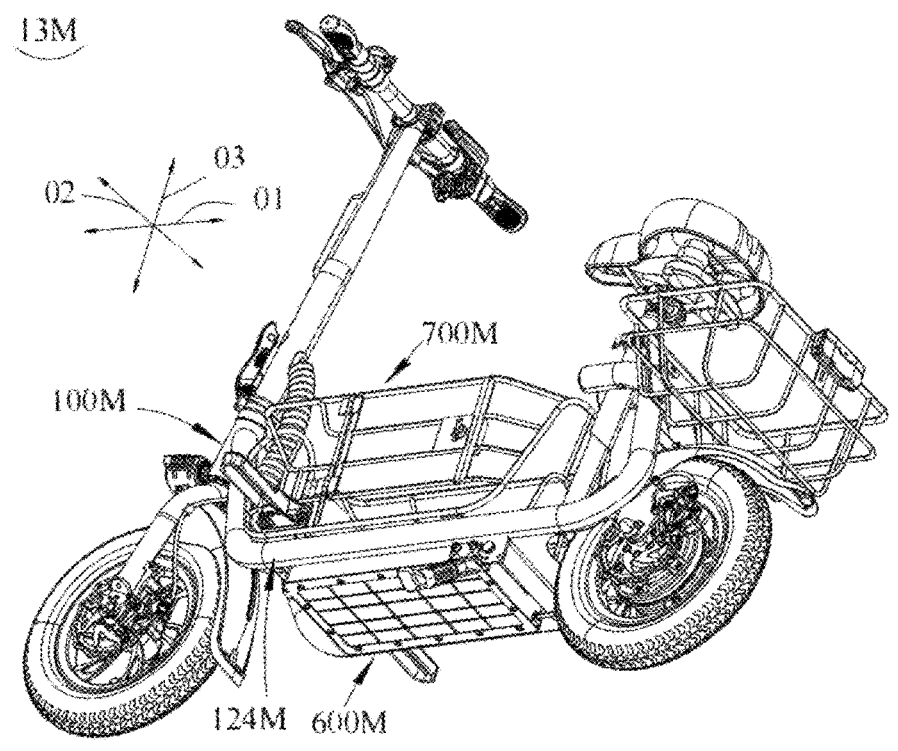
Figure 62C:
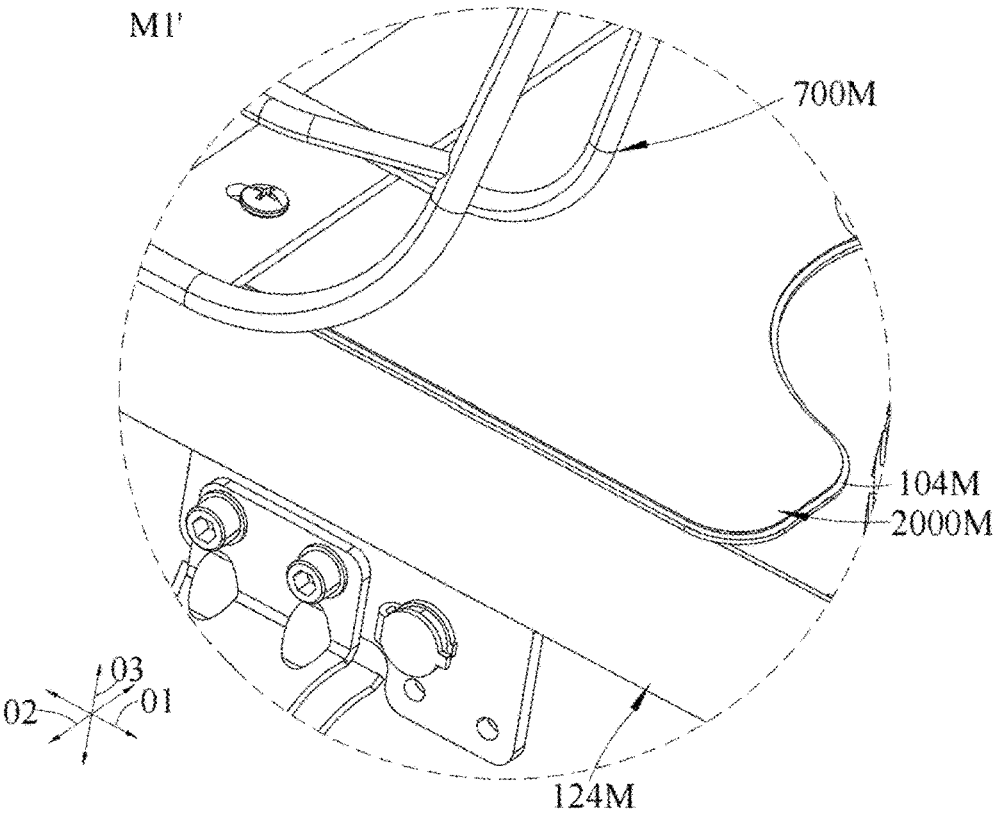

FIGS. 62A-62C are a set of schematic structural views of the storage mechanism 700M. Wherein, FIG. 62C is an enlarged schematic view at M1' in FIG. 62A.

Referring to FIGS. 62A-62B, a difference between the vehicle 13M and the vehicle 2B may include that the vehicle 13M may include a storage mechanism 700M. A difference between the vehicle 13M and the vehicle 1A may include that the storage mechanism 700M is openable at a side. The storage mechanism 700M may be located at a top end of the second section 124M of the frame 100M. The provision of the storage mechanism 700M may be used to place items or animals.

Referring to FIGS. 62A-62B, the storage mechanism 700M may be placed on the second section 124M of the frame 100M, having a lower center of gravity, which improves the stability of the storage mechanism 700M and may also improve the stability of the items or animals placed within the storage mechanism 700M. In addition, the storage mechanism 700M has a lower center of gravity. After items or animals are placed in the storage mechanism 700M, the center of gravity of the items or animals is also lower, which in turn lowers the center of gravity of the vehicle 13M, and is expected to improve the stability of the vehicle 13M and improve riding safety.

In addition, referring to FIGS. 62A-62B, the second section 124M of the frame 100M may be located near a middle position of the vehicle 13M along the first direction 01. The storage mechanism 700M may be placed on the second section 124M of the frame 100M. Therefore, when items or animals are placed in the storage mechanism 700M, the center of gravity of the items or animals is also closer to the middle position of the vehicle 13M, causing the center of gravity of the vehicle 13M to also be closer to the middle position, which is expected to improve the stability of the vehicle 13M and improve riding safety.

In addition, referring to FIGS. 62A-62B, when placing items or animals into the storage mechanism 700M, the storage mechanism 700M may provide a shielding or protective effect for the items or animals, that is, reducing the risk of the items or animals falling out, which is expected to improve the safety of placing items or animals.

In addition, because the storage mechanism 700M provides a shielding or protective effect for the items or animals, a user may not need to deliberately squeeze their legs together or keep their legs close to shield or protect the items or animals. That is, the user may keep their legs naturally open, with a more relaxed body posture and better comfort. Correspondingly, with the user's legs open, it is expected to weaken the sense of confinement felt by an animal in the storage mechanism 700M, providing better comfort.

In addition, the improved stability of the vehicle 13M may also allow for placing items with higher stability requirements in the storage mechanism 700M, increasing the variety of items that may be carried and increasing travel convenience.

In addition, referring to FIGS. 62A-62B, the storage mechanism 700M may be placed on the second section 124M of the frame 100M, which is at a low height, facilitating the placement and retrieval of items/animals.

In addition, referring to FIGS. 62A-62B, the storage mechanism 700M may be placed on the second section 124M of the frame 100M, allowing a user to more conveniently observe the condition of the storage mechanism 700M during riding. When items are placed in the storage mechanism 700M, if there is a risk of an item falling, it may be discovered more promptly. When an animal is placed in the storage mechanism 700M, the animal's state may be observed in a timely manner. If the animal feels discomfort, or if there is a risk of falling or being injured due to activity or falling out of the storage mechanism 700M, it may be discovered more promptly.

In some embodiments, referring to FIG. 62A, the frame 100M may include a support plate 104M. Placing the storage mechanism 700M on the support plate 104M provides higher placement stability for the storage mechanism 700M.

In some embodiments, referring to FIG. 62A, a bottom wall of the storage mechanism 700M may be hollow. On the one hand, this reduces the weight of the storage mechanism 700M, facilitating a lightweight design of the vehicle 13M. On the other hand, referring to FIGS. 62A and 62C, in some embodiments, a top surface of the support plate 104M may be provided with a first anti-slip mechanism 2000M. The hollow bottom wall may allow the first anti-slip mechanism 2000M on the top surface of the support plate 104M to be exposed within an inner cavity of the storage mechanism 700M, so that when items are placed in the storage mechanism 700M, a bottom of the items contacts the first anti-slip mechanism 2000M, reducing the risk of the items sliding and reducing the risk of collision or damage caused by sliding; when an animal is placed in the storage mechanism 700M, the animal's feet may contact the first anti-slip mechanism 2000M, which is expected to keep the animal in a more stable state when standing or sitting.

Referring to FIG. 62A, in some embodiments, the seat tube 302M is located outside the storage mechanism 700M.

Figure 62D:
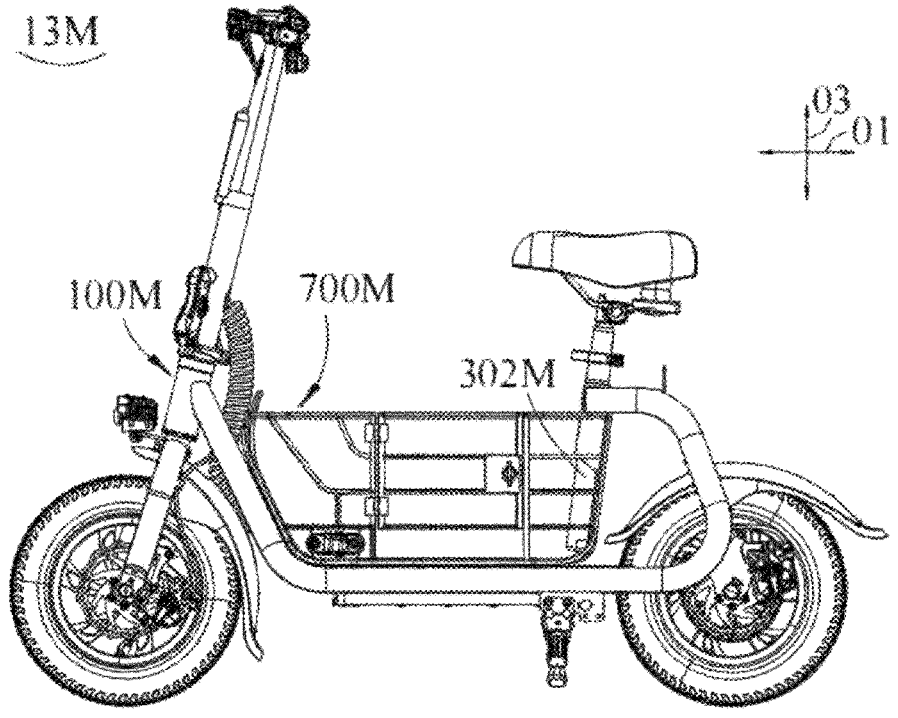
FIGS. 62D-62E are a set of schematic views illustrating other implementations of the seat tube.
Figure 62E:
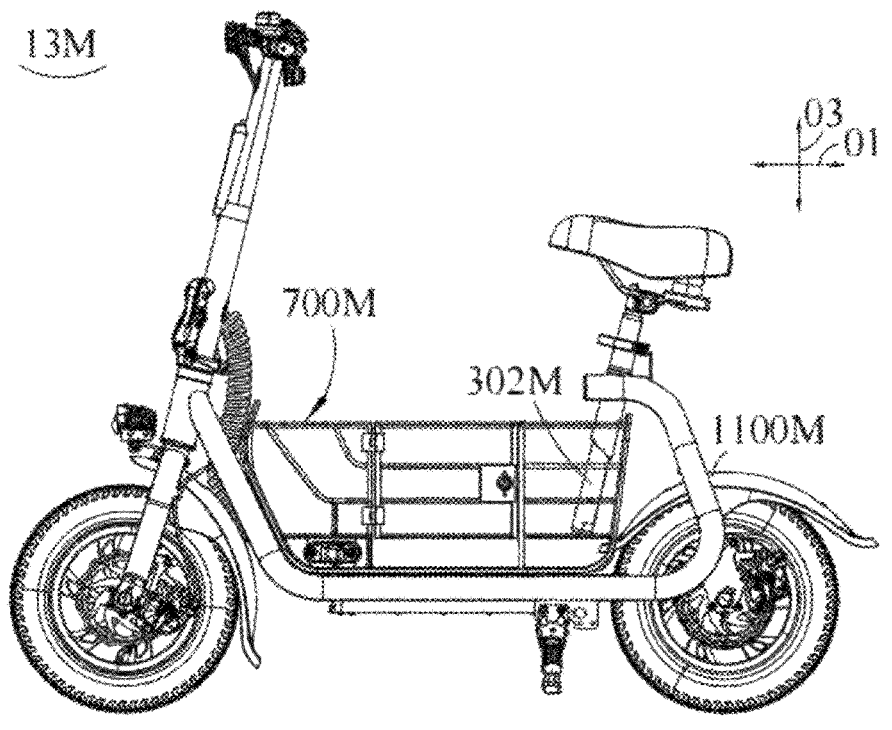

FIGS. 62D and 62E are schematic views of other implementations of the seat tube 302M.

Referring to FIG. 62D, in some other embodiments, the seat tube 302M extends into a rear side of the storage mechanism 700M, such that the seat tube 302M and the storage mechanism 700M may share some space.

Referring to FIG. 62E, in some other embodiments, a bottom end of the seat tube 302M and a front end of the rear fender 1100M extend into the rear side of the storage mechanism 700M, such that the seat tube 302M, the rear fender 1100M, and the storage mechanism 700M may share some space.

Figure 63A:
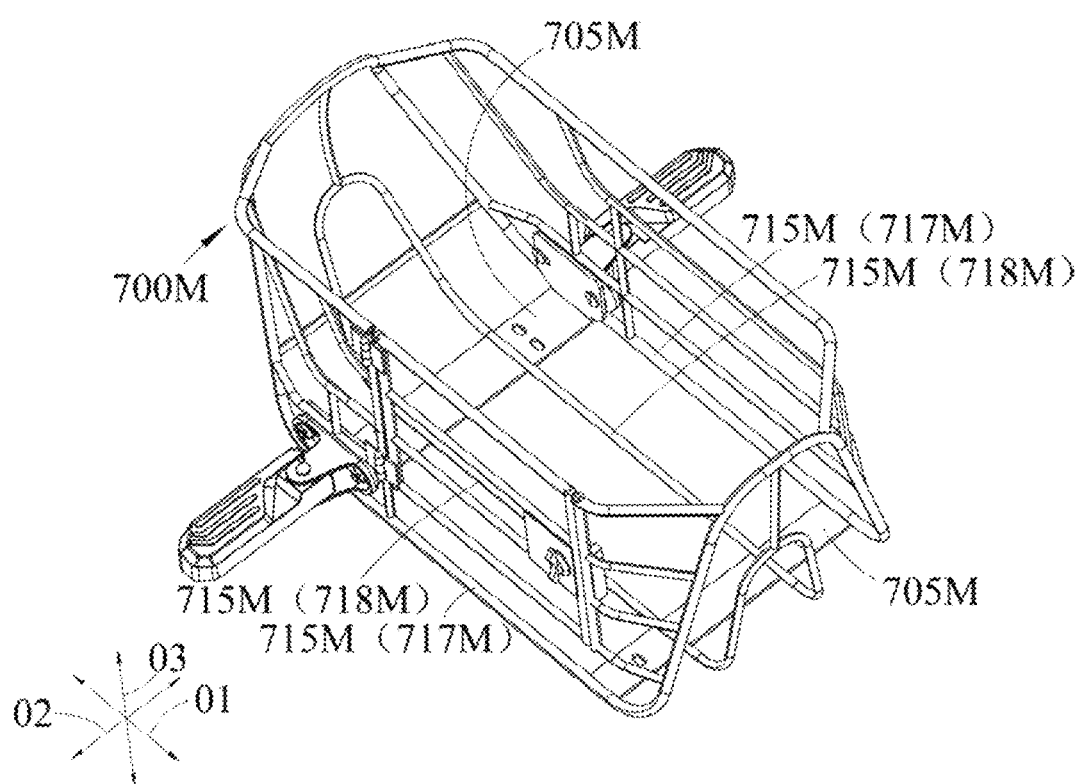
FIGS. 63A-63G are another set of schematic structural views of the storage mechanism.
Figure 63B:
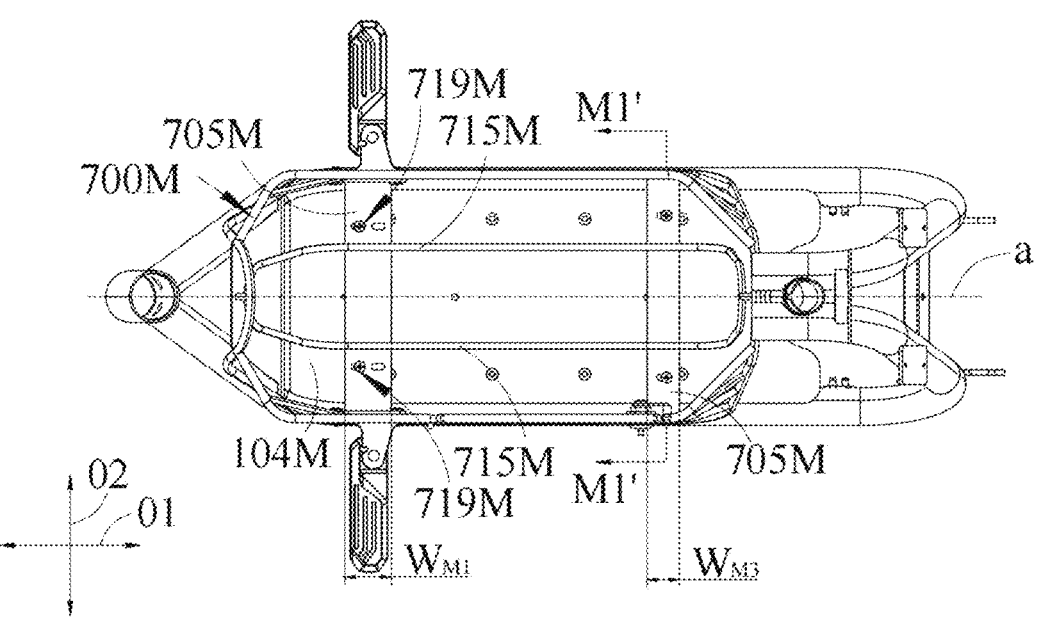
Figure 63C:
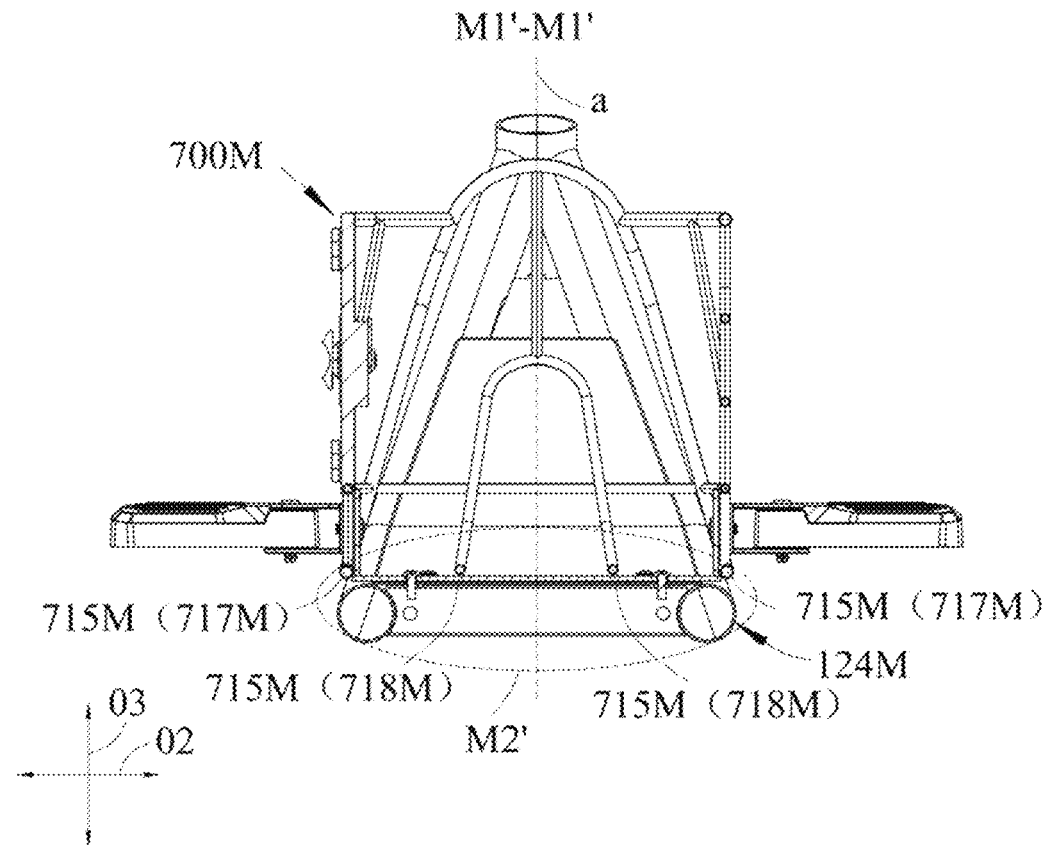
Figure 63D:
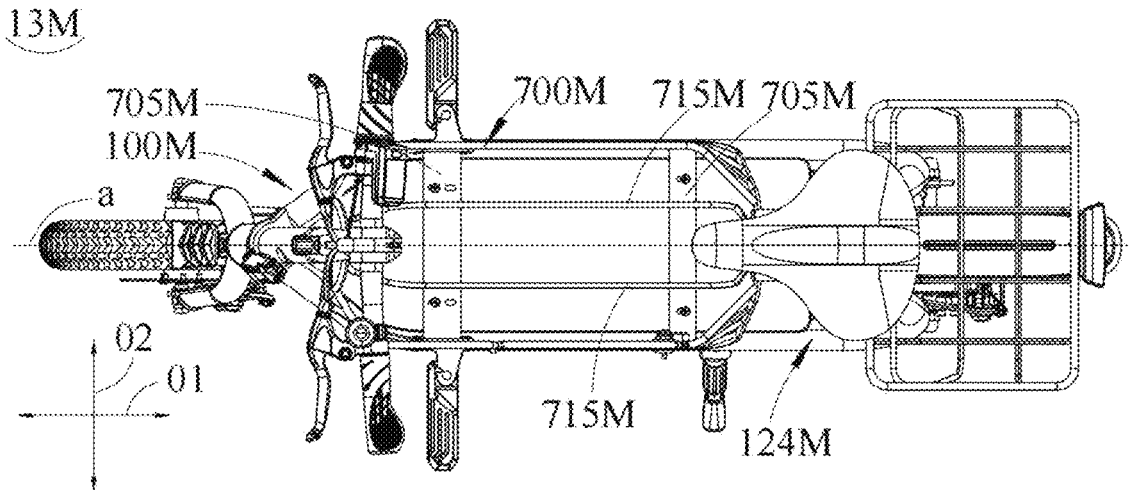
Figure 63E:
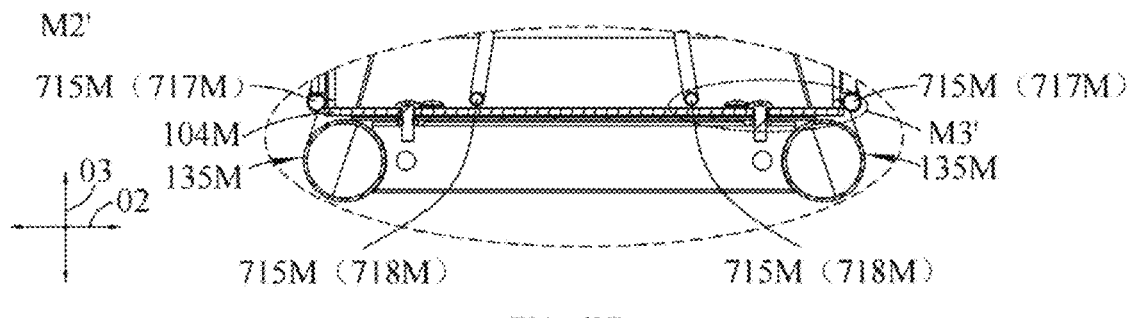
Figure 63F:
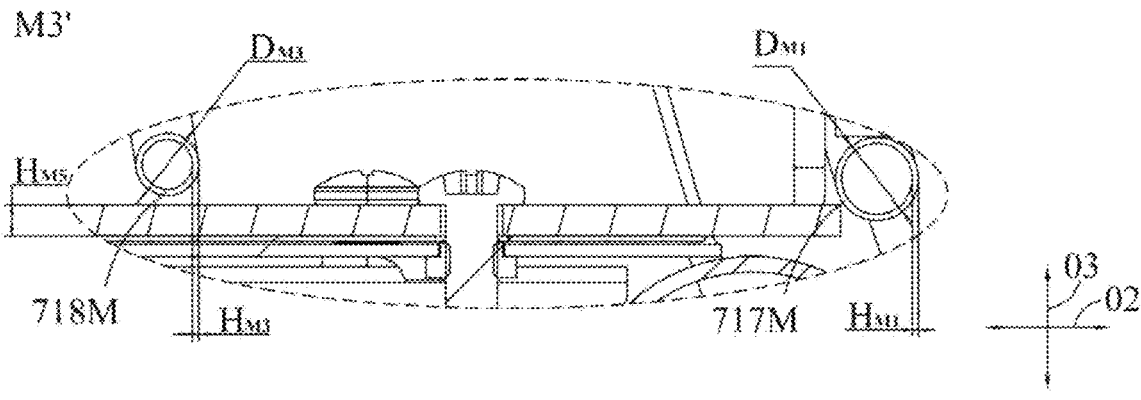

FIGS. 63A-63G are a set of schematic structural views of the storage mechanism 700M. Wherein, FIG. 63C is a cross-sectional view along M1'-M1' in FIG. 63B, FIG. 63E is an enlarged schematic view at M2' in FIG. 63C, and FIG. 63F is an enlarged schematic view at M3' in FIG. 63E.

In some embodiments, referring to FIG. 63A, in some embodiments, a bottom wall of the storage mechanism 700M may include a plurality of fifth horizontal bars 715M, which is simple in structure and is expected to form more hollow structures.

More specifically, referring to FIG. 63A, in some embodiments, the plurality of fifth horizontal bars 715M may be arranged approximately parallel.

More specifically, referring to FIG. 63A, an arrangement direction of the plurality of fifth horizontal bars 715M is along the second direction 02. It may be understood that, in some other embodiments, the arrangement direction of the plurality of fifth horizontal bars 715M may also be along other directions, such as the first direction 01, or any other direction at an angle greater than or equal to 90° with the first direction 01.

It may be understood that, in some other embodiments, the plurality of fifth horizontal bars 715M are not limited to being arranged in parallel, and at least some of the fifth horizontal bars 715M may intersect, or extension lines of at least some of the fifth horizontal bars 715M may intersect.

In some embodiments, referring to FIG. 63A, the number of the fifth horizontal bars 715M may be four, which better meets the demand for support strength.

It may be understood that, in some other embodiments, the number of the fifth horizontal bars 715M is not limited to four, and may also be less than or more than four.

Referring to FIGS. 63A and 63B, in some embodiments, with respect to the symmetry plane a, the four fifth horizontal bars 715M may be arranged symmetrically, improving the aesthetic effect and being expected to improve the balance performance of the support.

Referring to FIG. 63C, in some embodiments, along the second direction 02, a width of the bottom wall of the storage mechanism 700M may be less than or equal to a width of the second section 124M, preventing the bottom wall of the storage mechanism 700M from extending beyond a side edge of the second section 124M along the second direction 02, and reducing interference from the storage mechanism 700M with the placement of a user's legs. In conjunction with FIG. 63D, this is also beneficial for the miniaturized design of the vehicle 13M and is expected to enhance the aesthetic appeal of the vehicle 13M.

Referring to FIGS. 63A and 63C, in some embodiments, along the second direction 02, an edge of the bottom wall of the storage mechanism 700M may be an outer edge of the fifth horizontal bar 715M on a corresponding side. For ease of description, this fifth horizontal bar 715M may be referred to as an edge-crossbar 717M. In some embodiments, the number of the edge fifth horizontal bars 717M may be two.

In some embodiments, the material of the fifth horizontal bar 715M may be metal, for example, carbon structural steel, which is easy to form and has strong rigidity and strength, improving the stability of the storage mechanism 700M.

In some other embodiments, the material of the fifth horizontal bar 715M may also be other metal materials, plastic, or woven rattan materials. Other metal materials include but are not limited to stainless steel and aluminum alloy. Plastics include but are not limited to polypropylene (PP), polyethylene (PE), and ABS plastic. Woven rattan materials include but are not limited to natural rattan (such as white rattan, red rattan) and PVC imitation rattan (polyvinyl chloride), where PVC imitation rattan (polyvinyl chloride) refers to a material made from polyvinyl chloride that simulates the appearance of woven rattan. It may be noted that the materials of different fifth horizontal bars 715M may be the same or different.

In some embodiments, referring to FIG. 63C, in some embodiments, the fifth horizontal bar 715M may be tubular. While satisfying the support strength, this reduces the weight of the storage mechanism 700M, facilitating a lightweight design of the vehicle 13M.

Referring to FIGS. 63A and 63C, in some embodiments, the plurality of fifth horizontal bars 715M may include a middle-crossbar 718M provided between the two edge fifth horizontal bars 717M. In some embodiments, the number of the middle fifth horizontal bars 718M may be two. It may be understood that the number of the middle fifth horizontal bars 718M is not limited to two, and may also be one or more than two, or there may even be no middle-crossbar 718M.

Referring to FIGS. 63C and 63E, in some embodiments, along the third direction 03, a top end height of the edge-crossbar 717M may be equal to a top end height of the middle-crossbar 718M to improve the flatness of an inner surface of the bottom wall of the storage mechanism 700M. When the storage mechanism 700M is used to place items, it is expected to improve the placement stability of the items. When the storage mechanism 700M is used to place an animal, it is expected to improve the stability and comfort of the placed animal.

Referring to FIGS. 63A and 63B, in some embodiments, the bottom wall of the storage mechanism 700M may also be fixedly provided with a mounting member 705M located at a front side and a mounting member 705M located at a rear side. The storage mechanism 700M may be fixedly connected to the support plate 104M through the mounting member 705M at the front side and the mounting member 705M at the rear side. On the one hand, both the mounting member 705M at the front side and the mounting member 705M at the rear side may be plate-shaped, which is simple in structure and is expected to simplify the structure of the storage mechanism 700M. On the other hand, through the mounting member 705M at the front side and the mounting member 705M at the rear side, a fixed connection with the support plate 104M may be achieved, which facilitates realizing the relative fixation of the mounting member 705M at the front side and the mounting member 705M at the rear side with the support plate 104M respectively, improving the fixing stability of the storage mechanism 700M.

Referring to FIGS. 63A and 63B, in some embodiments, both the mounting member 705M at the front side and the mounting member 705M at the rear side may be located on a bottom side of the storage mechanism 700M, which facilitates the fixing of the mounting member 705M at the front side and the mounting member 705M at the rear side to the support plate 104M, further improving the stability of the storage mechanism 700M.

Referring to FIG. 63A, in some embodiments, the mounting member 705M at the front side may be fixedly connected to the plurality of fifth horizontal bars 715M, which helps to maintain the spacing between adjacent fifth horizontal bars 715M and improve the structural stability of the storage mechanism 700M.

Referring to FIG. 63A, in addition, in some embodiments, the mounting member 705M at the front side may be perpendicular to the plurality of parallel fifth horizontal bars 715M, reducing a length of a connection position between the fifth horizontal bars 715M and the mounting member 705M at the front side, and reducing an area of the mounting member 705M at the front side, which is expected to increase a hollow area of the bottom wall of the storage mechanism 700M while reducing material costs. In some embodiments, the plurality of parallel fifth horizontal bars 715M may extend along the first direction 01, and the mounting member 705M at the front side may extend along the second direction 02.

Referring to FIG. 63A, in some embodiments, the mounting member 705M at the rear side may be fixedly connected to the plurality of fifth horizontal bars 715M, which helps to maintain the spacing between adjacent fifth horizontal bars 715M and improve the structural stability of the storage mechanism 700M.

Referring to FIG. 63A, in addition, in some embodiments, the mounting member 705M at the rear side may be perpendicular to the plurality of parallel fifth horizontal bars 715M, reducing a length of the connection between the fifth horizontal bars 715M and the mounting member 705M at the rear side, and reducing an area of the mounting member 705M at the rear side, which is expected to increase the hollow area of the bottom wall of the storage mechanism 700M. In some embodiments, the plurality of parallel fifth horizontal bars 715M may extend along the first direction 01, and the mounting member 705M at the rear side may extend along the second direction 02.

Referring to FIGS. 63A and 63B, in some embodiments, the mounting member 705M at the front side and the mounting member 705M at the rear side are arranged in parallel. It may be understood that, in some other embodiments, an angle between an extension direction of the mounting member 705M at the front side and an extension direction of the mounting member 705M at the rear side may also be greater than 0°, that is, the mounting member 705M at the front side and the mounting member 705M at the rear side may intersect, or an extension line of the mounting member 705M at the front side and an extension line of the mounting member 705M at the rear side may also intersect.

Referring to FIGS. 63A and 63B, in some embodiments, a material of the mounting member 705M at the front side may be carbon structural steel. Carbon structural steel is easy to form. The mounting member 705M at the front side may be fixedly connected to the fifth horizontal bars 715M by welding, without needing to provide additional fixing structures on the mounting member 705M at the front side and the fifth horizontal bars 715M. The structures of the mounting member 705M at the front side and the fifth horizontal bars 715M are simple and easy to process, which is expected to reduce processing costs. In addition, the mounting member 705M at the front side may be fixedly connected to the fifth horizontal bars 715M by welding, which reduces the occupation of extra space caused by the fixed connection and is expected to achieve a miniaturized design of the storage mechanism 700M. In addition, a top surface of the mounting member 705M at the front side is lower than a top surface of the fifth horizontal bars 715M. When the mounting member 705M at the front side is fixedly connected to the fifth horizontal bars 715M by welding, a bottom surface of the fifth horizontal bars 715M is fixed to the top surface of the mounting member 705M at the front side, which does not affect the flatness of a bottom surface of the mounting member 705M at the front side. This facilitates a more stable fit between the mounting member 705M at the front side and the support plate 104M, improving the fixing stability of the storage mechanism 700M. In addition, fixing the mounting member 705M at the front side to the fifth horizontal bars 715M by welding does not affect the smoothness of the top surface of the fifth horizontal bars 715M, which is expected to reduce the impact on the smooth performance of the fifth horizontal bars 715M, thereby reducing damage to items or animals placed in the storage mechanism 700M and being beneficial for improving the riding comfort for animals.

In some other embodiments, the material of the mounting member 705M may also be other metal materials or plastic. Other metal materials include but are not limited to stainless steel and aluminum alloy. Plastics include but are not limited to polypropylene (PP), polyethylene (PE), and ABS plastic.

It may be noted that the materials of different mounting members 705M may be the same or different.

Referring to FIG. 63A, in some embodiments, a thickness of the mounting member 705M at the front side may fall within a range of 2 mm-5 mm. While satisfying the stability of the fixed connection with the fifth horizontal bars 715M and the stability of the fixed connection with the support plate 104M, it has a lower thickness, which facilitates the miniaturized and lightweight design of the storage mechanism 700M. It may be understood that the thickness of the mounting member 705M at the front side refers to the thickness of the mounting member 705M at the front side along the third direction 03.

Specifically, the thickness of the mounting member 705M at the front side may be any value within the range of 2 mm-5 mm, for example, 2 mm, 2.4 mm, 2.8 mm, 3.2 mm, 3.6 mm, 4 mm, 4.4 mm, or 5 mm.

Referring to FIG. 63A, in some embodiments, the mounting member 705M at the front side may be in the shape of a rectangular plate, which is simple in structure and easy to process. It may be understood that, in some other embodiments, the mounting member 705M at the front side is not limited to being in the shape of a rectangular plate and may also have any other regular or irregular shape.

Referring to FIG. 63B, in some embodiments, a width $W_{M1}$ of the mounting member 705M at the front side along the first direction 01 may fall within a range of 33 mm-53 mm. When $W_{M1} \geq 33$ mm, it has high support strength and a large contact area with the support plate 104M, giving the storage mechanism 700M high stability when placing items. When $W_{M1} \leq 53$ mm, it allows the bottom wall of the storage mechanism 700M to have a larger hollow area, which is expected to improve the riding comfort for animals and is also beneficial for a lightweight design.

Specifically, $W_{M1}$ may be any value within the range of 33 mm-53 mm, for example, 33 mm, 37 mm, 41 mm, 42 mm, 43 mm, 45 mm, 49 mm, or 53 mm.

Referring to FIG. 63B, in some embodiments, a width $W_{M3}$ of the mounting member 705M at the rear side along the first direction 01 may fall within a range of 20 mm-40 mm. When $W_{M3} \geq 20$ mm, it has high support strength and a large contact area with the support plate 104M, giving the storage mechanism 700M high stability. When $W_{M3} \leq 40$ mm, it allows the bottom wall of the storage mechanism 700M to have a larger hollow area.

Specifically, $W_{M3}$ may be any value within the range of 20 mm-40 mm, for example, 20 mm, 24 mm, 28 mm, 32 mm, 36 mm, or 40 mm.

Referring to FIGS. 63A and 63B, in some embodiments, along the third direction 03, the mounting member 705M at the front side may be located on a bottom side of the middle-crossbar 718M, which is beneficial for improving the connection stability of the mounting member 705M at the front side with the support plate 104M. In some embodiments, when the mounting member 705M at the front side is fastened by the second bolt connection assembly 719M, the mounting member 705M at the front side is not obstructed by the middle-crossbar 718M and may fit more closely with the support plate 104M. This is also expected to reduce the risk of one side of the mounting member 705M at the front side bending or deforming under force, which is beneficial for ensuring the service life of the mounting member 705M at the front side.

Referring to FIG. 63A, in some embodiments, along the second direction 02, two ends of the mounting member 705M at the front side may be adjacent to the fifth horizontal bars 715M at the two edges, preventing the two end edges of the mounting member 705M at the front side from being exposed. This reduces the risk of people, items, or animals around the vehicle 13M being scraped by the mounting member 705M at the front side, and at the same time is expected to make the storage mechanism 700M more aesthetically pleasing.

Referring to FIGS. 63E and 63A, in some embodiments, along the third direction 03, a bottom end of the edge-crossbar 717M may be lower than a bottom end of the middle-crossbar 718M. Along the second direction 02, an edge of the mounting member 705M at the front side may be adjacent to an inner side of the edge-crossbar 717M, so as to better hide the two ends of the mounting member 705M at the front side, making the storage mechanism 700M more aesthetically pleasing.

Referring to FIGS. 63E and 63A, in some embodiments, a bottom surface height of the mounting member 705M at the front side may be lower than or equal to a height of the bottom end of the edge-crossbar 717M, so that the mounting member 705M at the front side may better fit with the support plate 104M, improving the stability of the storage mechanism 700M.

In addition, referring to FIG. 63E, a height of the edge-crossbar 717M may be greater than a height of the middle-crossbar 718M, which is expected to improve the support strength of the bottom wall of the storage mechanism 700M. In some embodiments, an outer diameter of the edge-crossbar 717M may be greater than an outer diameter of the middle-crossbar 718M, so that the height of the edge-crossbar 717M may be greater than the height of the middle-crossbar 718M.

Referring to FIGS. 63D and 63E, in some embodiments, along the second direction 02, an edge of the mounting member 705M at the front side may be located on an outer side of an axis of the bracket 135M on the corresponding side, and an edge of the mounting member 705M at the rear side may be located on an outer side of an axis of the bracket 135M on the corresponding side. This is so that when the support plate 104M deforms, the bracket 135M supports the mounting member 705M at the front side, ensuring the support stability of the storage mechanism 700M. It may also prevent the storage mechanism 700M from applying pressure to the power mechanism 600M by moving downward, reducing the risk of the power mechanism 600M being subjected to pressure, and is expected to reduce the risk of the power mechanism 600M being damaged or exploding due to pressure, improving the service life of the power mechanism 600M.

Referring to FIG. 63F, in some embodiments, an outer diameter $D_{M1}$ of the edge-crossbar 717M may fall within a range of 4 mm-12 mm, and a wall thickness $H_{M1}$ may fall within a range of 0.4 mm-1 mm. This is so that while satisfying the support strength, the outer diameter is smaller and the bottom wall of the storage mechanism 700M is thinner, facilitating the miniaturized design of the storage mechanism 700M.

Specifically, $D_{M1}$ may be any value within the range of 4 mm-12 mm, for example, 4 mm, 5 mm, 6 mm, 7 mm, 8 mm, 9 mm, 10 mm, 11 mm, or 12 mm. The wall thickness of $H_{M1}$ may be any value within the range of 0.4 mm-1 mm, for example, 0.4 mm, 0.5 mm, 0.6 mm, 0.7 mm, 0.8 mm, 0.9 mm, or 1 mm.

Referring to FIG. 63F, in some embodiments, an outer diameter $D_{M3}$ of the middle-crossbar 718M may fall within a range of 2 mm-10 mm, and a wall thickness $H_{M3}$ may fall within a range of 0.4 mm-1 mm. This is so that while satisfying the support strength, the outer diameter is smaller and the bottom wall of the storage mechanism 700M is thinner, facilitating the miniaturized design of the storage mechanism 700M.

Specifically, $D_{M3}$ may be any value within the range of 2 mm-10 mm, for example, 2 mm, 3 mm, 4 mm, 5 mm, 6 mm, 7 mm, 8 mm, 9 mm, or 10 mm. $H_{M3}$ may be any value within the range of 0.4 mm-1 mm, for example, 0.4 mm, 0.5 mm, 0.6 mm, 0.7 mm, 0.8 mm, 0.9 mm, or 1 mm.

Figure 63G:
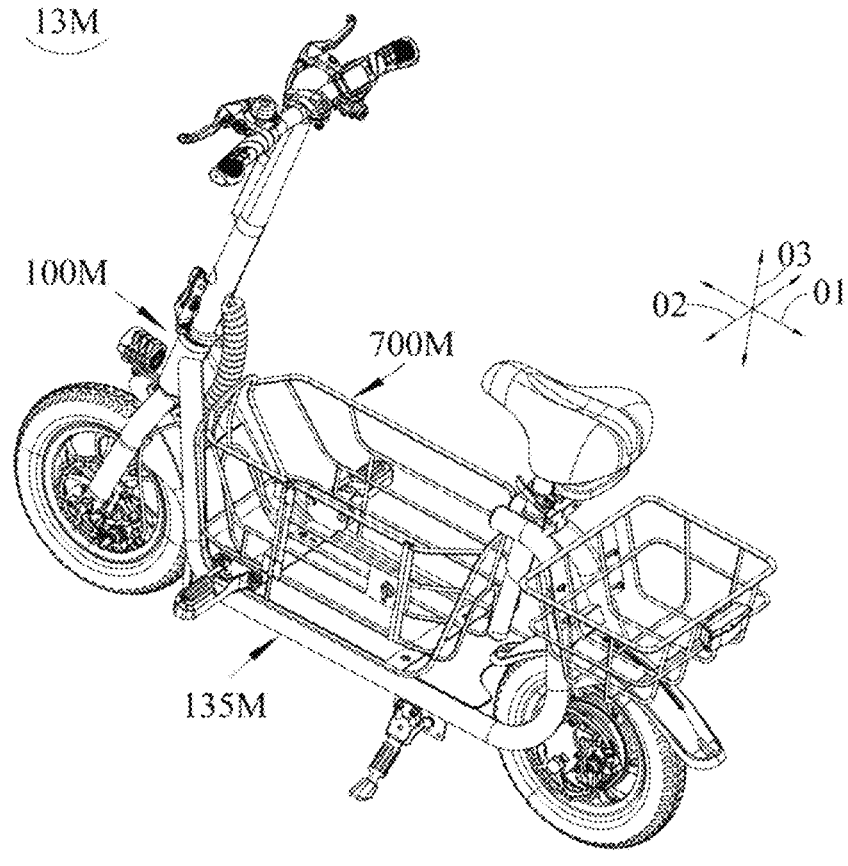

Referring to FIGS. 63F and 63G, in some embodiments, a ratio KM of an outer diameter of the bracket 135M to an outer diameter of the edge-crossbar 717M may fall within a range of 4-4.8. When $K_{M1} \geq 4$, it allows the edge-crossbar 717M to have a suitable outer diameter, which is expected to reduce the weight of the edge-crossbar 717M and contribute to the lightweight design of the storage mechanism 700Q. In addition, the appearance of the edge-crossbar 717M and the bracket 135Q has a better visual effect when paired. When $K_{M1} \leq 4.8$, it allows the edge-crossbar 717M to have a suitable outer diameter to have the structural strength to match load-bearing requirements. In addition, the appearance of the edge-crossbar 717M and the bracket 135Q has a better look and feel when paired.

Specifically, KM may be any value within the range of 4-4.8, for example, 4, 4.1, 4.2, 4.3, 4.4, 4.5, 4.6, 4.7, or 4.8.

Referring to FIGS. 63A and 63B, in some embodiments, the material of the mounting member 705M located at the rear side may be carbon structural steel, which is convenient for forming. The mounting member 705M located at the rear side may be fixedly connected with the fifth horizontal bar 715M by welding, without needing to additionally provide a fixing structure on the mounting member 705M located at the rear side and the fifth horizontal bar 715M; the structure of the mounting member 705M located at the rear side and the fifth horizontal bar 715M is simple and convenient for processing, which is expected to reduce the processing cost. In addition, the mounting member 705M located at the rear side is fixedly connected with the fifth horizontal bar 715M by welding, which reduces the occupation of extra space caused by the fixed connection and facilitates the miniaturized design of the storage mechanism 700M. In addition, a top surface of the mounting member 705M located at the rear side may be lower than a top surface of the fifth horizontal bar 715M; when the mounting member 705M located at the rear side is fixedly connected with the fifth horizontal bar 715M by welding, a bottom surface of the fifth horizontal bar 715M may be fixed to the top surface of the mounting member 705M located at the rear side, without affecting the flatness of a bottom surface of the mounting member 705M located at the rear side, which is convenient for a more stable fit between the mounting member 705M located at the rear side and the support plate 104M, and improves the fixing stability of the storage mechanism 700M. In addition, the mounting member 705M located at the rear side is fixedly connected to the fifth horizontal bar 715M by welding, which does not affect the smoothness of the top surface of the fifth horizontal bar 715M, reduces the impact on the smoothness performance of the fifth horizontal bar 715M, and is expected to reduce damage to items or animals placed in the storage mechanism 700M, which is beneficial to improving the comfort of animal riding.

Referring to FIG. 63F, in some embodiments, a thickness $H_{M5}$ of the mounting member 705M located at the rear side may fall within a range of 2 mm-5 mm; while satisfying the stability of the fixed connection with the fifth horizontal bar 715M and the stability of the fixed connection with the support plate 104M, it has a smaller thickness, which facilitates the miniaturized and lightweight design of the storage mechanism 700M. It may be understood that the thickness of the mounting member 705M located at the rear side refers to the thickness of the mounting member 705M located at the rear side along the third direction 03.

Specifically, Hus may be any value within the range of 2 mm-5 mm, for example, 2 mm, 2.4 mm, 2.8 mm, 3.2 mm, 3.6 mm, 4 mm, 4.4 mm, 5 mm.

Referring to FIG. 63A, in some embodiments, the mounting member 705M located at the rear side may be in the shape of a rectangular plate, which has a simple structure and is convenient for processing. It may be understood that, in some other embodiments, the mounting member 705M located at the rear side is not limited to being in the shape of a rectangular plate, and may also be in any other regular or irregular shape.

Referring to FIGS. 63A and 63B, in some embodiments, along the third direction 03, the mounting member 705M located at the rear side may be located on a bottom side of the middle-crossbar 718M, which is beneficial to improving the connection stability between the mounting member 705M located at the rear side and the support plate 104M. In some embodiments, when the mounting member 705M located at the rear side is fastened by the third bolt connection assembly 720M, the mounting member 705M located at the rear side will not be blocked by the middle-crossbar 718M and may be more closely fitted with the support plate 104M, reducing the risk of bending or deformation of one side of the mounting member 705M located at the rear side under force, which is beneficial to ensuring the service life of the mounting member 705M located at the rear side.

Referring to FIG. 63A, in some embodiments, along the third direction 03, a bottom end of the edge-crossbar 717M may be lower than a bottom end of the middle-crossbar 718M; along the second direction 02, an edge of the mounting member 705M located at the rear side may be adjacent to an inner side of the edge-crossbar 717M, so as to better hide both ends of the mounting member 705M located at the rear side, which is expected to make the storage mechanism 700M more beautiful.

Referring to FIG. 63A, in some embodiments, a bottom wall of the storage mechanism 700M may be provided with a total of two fixing plates, namely a mounting member 705M located at a front side and a mounting member 705M located at a rear side. It may be understood that, in some other embodiments, the number of the fixing plates on the bottom wall of the storage mechanism 700M is not limited to two, and may also be one or more than two.

FIGS. 64A-64F are a set of schematic views illustrating the installation of the storage mechanism 700M.

Figure 64A:
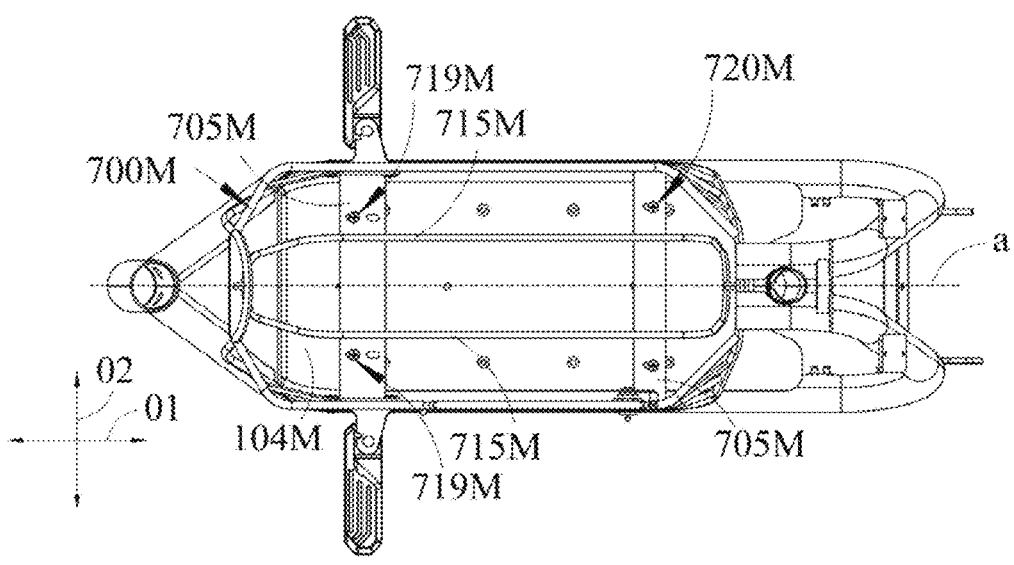
FIGS. 64A-64F are a set of schematic views illustrating the installation of the storage mechanism.
Figure 64B:
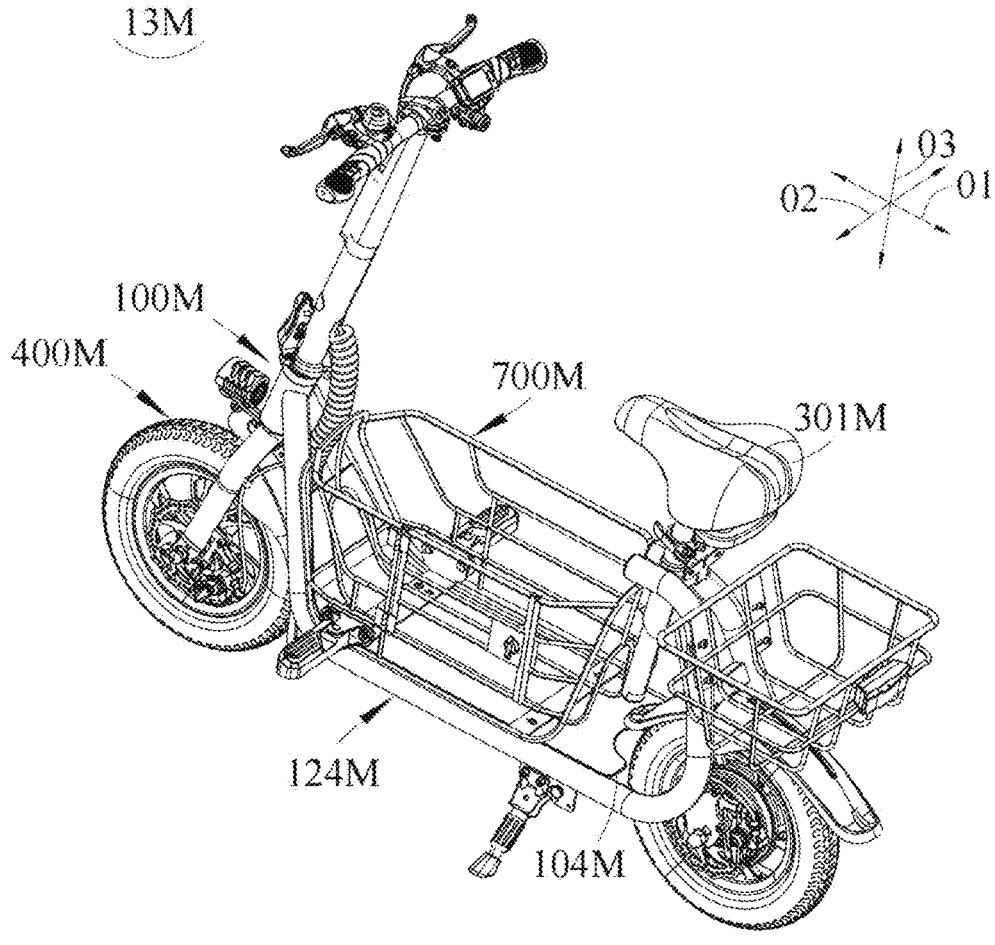

Referring to FIGS. 64A and 64B, in some embodiments, the mounting member 705M located on the front side and the support plate 104M may be fixedly connected by a second bolt connection assembly 719M, so as to facilitate detachment and installation of the mounting member 705M and the support plate 104M located on the front side, and to facilitate detachment and installation of the storage mechanism 700M. Therefore, the storage mechanism 700M may be installed when the storage mechanism 700M is needed, so as to facilitate carrying articles or animals; and the storage mechanism 700M may be detached when the storage mechanism 700M is not needed, so as to facilitate a user to step on the second section 124M of the frame 100M during riding, thereby improving riding comfort and safety. In addition, facilitating the disassembly and installation of the storage mechanism 700M makes it possible to improve the utilization rate of storage or transportation space by disassembling the storage mechanism 700M during storage or transportation.

Referring to FIG. 64B, the frame 100M and/or the seat tube 302M may be configured to provide a connection location for the storage mechanism 700M, that is, after the storage mechanism 700M is connected to the frame 100M and/or the seat tube 302M, it may be positioned on the support plate 104M for the user to place articles or animals. It may be noted that the positioning herein only describes a relative positional relationship, and does not mean that the storage mechanism 700M is necessarily connected to the support plate 104M.

The connection mode of the storage mechanism 700M with the frame 100M and/or the seat tube 302M may include, but is not limited to, magnetic attraction, mechanical connection, friction, pressure, adhesion, snapping or nesting. The foregoing connection modes may be used alone or in combination. When the foregoing connection modes are used, a plurality of connection locations may be provided, or a single connection location may be provided.

The connection location provided by the frame 100M and the seat tube 302M may be in the form of a hole or a groove, or may be in the form of an arc surface or a plane.

In some embodiments, connecting the storage mechanism 700M with the frame 100M and/or the seat tube 302M is expected to enable the storage mechanism 700M to still remain substantially stable and not to affect the manipulation of the vehicle 13M when the vehicle 13M travels at a safe driving speed (for example, 20 km/h-50 km/h) and carries a load of not more than 40 kg. It may also be understood that it is expected that, in conventional use, the storage mechanism 700M remains fixed in position relative to the frame 100M and/or the seat tube 302M and does not affect the operation of the vehicle 13M. For example, in a city commuting scenario, when the vehicle 13M shuttles between a sidewalk and a non-motorized lane and is faced with road conditions such as joints of floor tiles and slight depressions, the connection is helpful for enhancing the overall stability of the storage mechanism 700M. The frame 100M and the seat tube 302M, as load-bearing parts, have high rigidity and stability. After being connected with the frame 100M and the seat tube 302M, the storage mechanism 700M may effectively disperse vibration and impact force generated in a traveling process, reduce its own shaking amplitude, and reduce the risk that internal articles are damaged due to collision caused by shaking. If a pet is carried, the stable position may reduce the risk that the pet is frightened due to shaking, and provide a safer riding environment for the pet.

When the connection location is in the form of a hole or a groove, the shape may be regular or irregular. The total number of connection locations may be only one, or may be multiple.

In some embodiments, when there are a plurality of connection locations, the connection locations may be distributed up and down along the third direction 03, or distributed front and rear along the first direction 01, or distributed left and right along the second direction 02. It may be noted that the three distribution modes, namely, up-and-down distribution, front-and-rear distribution, and left-and-right distribution, may appear alone or in combination.

In some embodiments, when there are a plurality of connection locations, the connection locations may be symmetrically distributed or asymmetrically distributed.

Figure 64C:
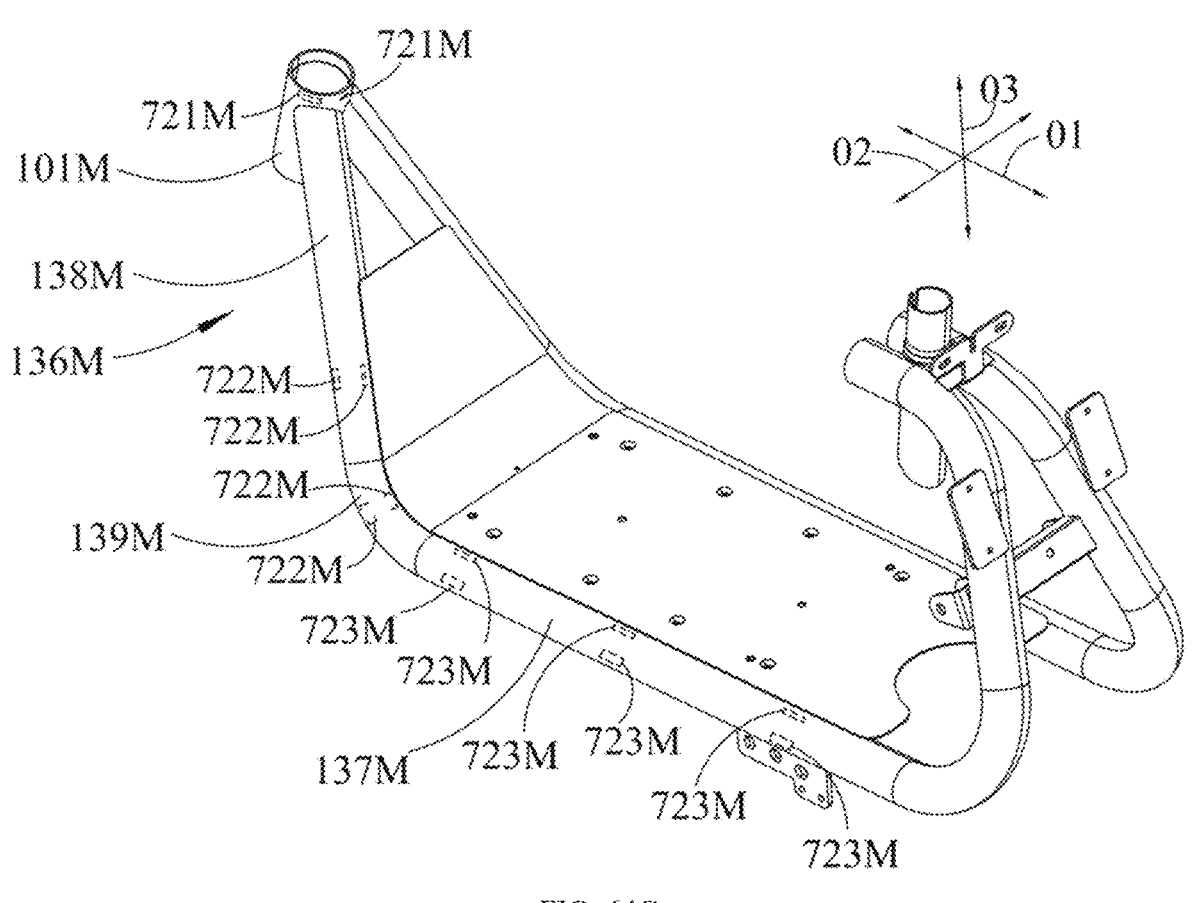

Referring to FIG. 64C, for convenience of description, the connection location located at the head tube 101M may be referred to as a first connection location 721M, the connection location located at the second upwardly extending portion 136M may be referred to as a second connection location 722M, the connection location located at the first flat portion 137M may be referred to as a third connection location 723M, the connection location located at the third upwardly extending portion 140M may be referred to as a fourth connection location 724M, the connection location located at the support plate 104M may be referred to as a fifth connection location 725M, the connection location located at the reinforcement plate 105M may be referred to as a sixth connection location 726M, the connection location located at the middle tube 106M may be referred to as a seventh connection location 727M, and the connection location located at the seat tube 302M may be referred to as an eighth connection location 728M.

Hereinafter, when the connection location is described, the dotted line portion is only for indicating the position, and does not form other limitations on the connection location, for example, the shape and the size.

Referring to FIG. 64C, in some embodiments, the first connection location 721M may be disposed on the head tube 101M along the first direction 01, on a rear side of the head tube 101M, or along the second direction 02, on at least one side of the head tube 101M. For the convenience of distinction and description, a shorter dashed box indicates a distribution condition on the rear side along the first direction 01, and a longer dashed box indicates a distribution condition on one side along the second direction 02. Along the second direction 02, the first connection location 721M may extend from the left side to the right side of the head tube 101M.

Referring to FIG. 64C, in some embodiments, the second connection location 722M may be disposed on the second upwardly extending portion 136B on the first inclined portion 138M. For convenience of differentiation and description, a narrower dashed box indicates a case of being located at a top end of the first inclined portion 138M in this case, and a wider dashed box indicates a case of being located at an outer side of the first inclined portion 138M in this case. Along the third direction 03, the second connection location 722M may be located at the top end of the first inclined portion 138M, or at the bottom end of the first inclined portion 138M, or between the top end and the bottom end. The second connection location 722M may also extend from the top end to the middle of the first inclined portion 138M, or from the top end to the bottom end.

Referring to FIG. 64C, in some embodiments, the distribution of the second connection location 722M on the second upwardly extending portion 136B may be on the first arc-shaped portion 139M. For ease of distinction and description, a narrower dashed box indicates a situation in this case at a top end of the first arc-shaped portion 139M, and a wider dashed box indicates a situation in this case at an outer side of the first arc-shaped portion 139M. Along the third direction 03, the second connection location 722M may be at the top end of the first arc-shaped portion 139M, or at the bottom end of the first arc-shaped portion 139M, or between the top end and the bottom end. The second connection location 722M may also extend from the top end to the bottom end of the first arc-shaped portion 139M.

Referring to FIG. 64C, in some embodiments, the third connection location 723M is disposed on the first flat portion 137M. For convenience of distinction and description, a narrower dashed box indicates that the third connection location 723M is located at the top end of the first flat portion 137M in this case, and a wider dashed box indicates that the third connection location 723M is located at the outer side of the first flat portion 137M in this case.

Along the first direction 01, the third connection location 723M may be located at a front end of the first flat portion 137M, or at a rear end of the first flat portion 137M, or between the front end and the rear end. The third connection location 723M may also extend from the front end of the first flat portion 137M to the middle thereof, or from the front end to the rear end thereof.

Figure 64D:
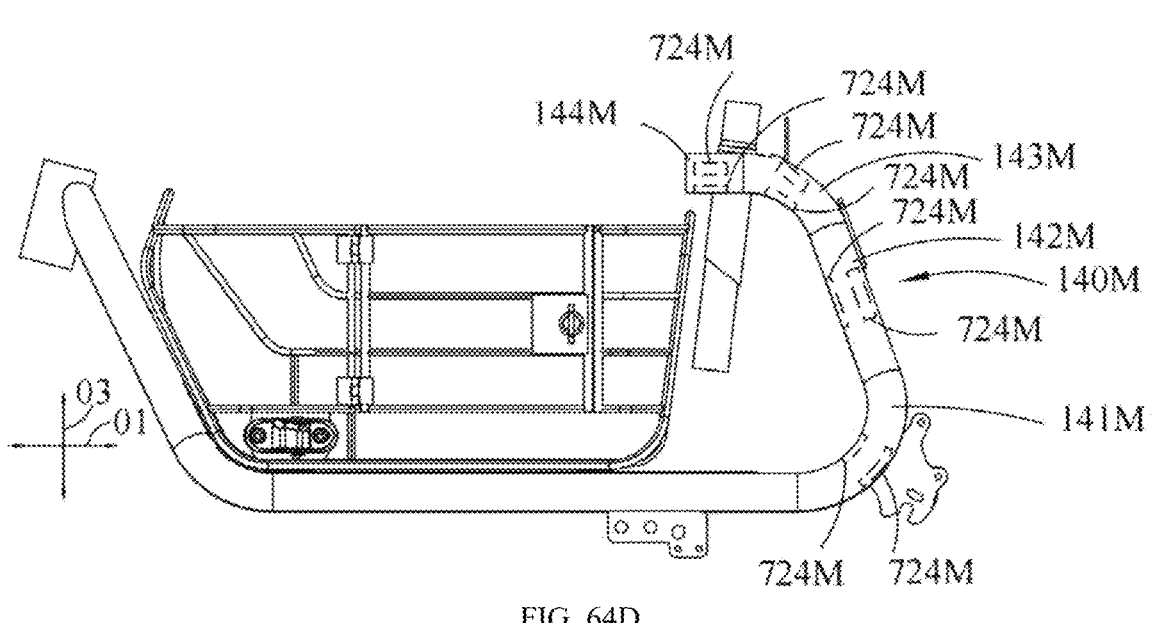

Referring to FIG. 64D, in some embodiments, the fourth connection location 724M may be disposed on the third upwardly extending portion 140M on the second arc-shaped portion 141M. For convenience of distinction and description, a narrower dashed box indicates the case where the fourth connection location 724M is located on an inner side of the second arc-shaped portion 141M, and a wider dashed box indicates the case where the fourth connection location 724M is located on an outer side of the second arc-shaped portion 141M. Along the third direction 03, the fourth connection location 724M may be at a top end of the second arc-shaped portion 141M, or at a bottom end of the second arc-shaped portion 141M, or between the top end and the bottom end. The fourth connection location 724M may also extend from the top end to the middle of the second arc-shaped portion 141M, or from the top end to the bottom end.

Referring to FIG. 64D, in some embodiments, the fourth connection location 724M may be disposed on the third upwardly extending portion 140M on the second inclined portion 142M. For convenience of distinction and description, a narrower dashed box indicates that the fourth connection location 724M is located on an inner side of the second inclined portion 142M in this case, and a wider dashed box indicates that the fourth connection location 724M is located on an outer side of the second inclined portion 142M in this case. Along the third direction 03, the fourth connection location 724M may be located at a top end of the second inclined portion 142M, or at a bottom end of the second inclined portion 142M, or between the top end and the bottom end. The fourth connection location 724M may also extend from the top end of the second inclined portion 142M to the middle part thereof, or from the top end to the bottom end thereof.

Referring to FIG. 64D, in some embodiments, the fourth connection location 724M is disposed on the third upwardly extending portion 140M on the third arc-shaped portion 143M. For convenience of distinction and description, a narrower dashed box indicates the case where the fourth connection location 724M is located on an inner side of the third arc-shaped portion 143M, and a wider dashed box indicates the case where the fourth connection location 724M is located on an outer side of the third arc-shaped portion 143M. Along the third direction 03, the fourth connection location 724M may be at a top end of the third arc-shaped portion 143M, or at a bottom end of the third arc-shaped portion 143M, or between the top end and the bottom end. The fourth connection location 724M may also extend from the top end of the third arc-shaped portion 143M to the middle thereof, or from the top end to the bottom end thereof.

Referring to FIG. 64D, in some embodiments, the fourth connection location 724M is disposed on the third upwardly extending portion 140M on the horizontal section 144M. For convenience of distinction and description, a narrower dashed box indicates that the fourth connection location 724M is disposed on an inner side of the horizontal section 144M in this case, and a wider dashed box indicates that the fourth connection location 724M is disposed on an outer side of the horizontal section 144M in this case. Along the third direction 03, the fourth connection location 724M may be at a top end of the horizontal section 144M, or at a bottom end of the horizontal section 144M, or between the top end and the bottom end. The fourth connection location 724M may also extend from the top end to the bottom end of the horizontal section 144M.

Figures 64E, 64F:
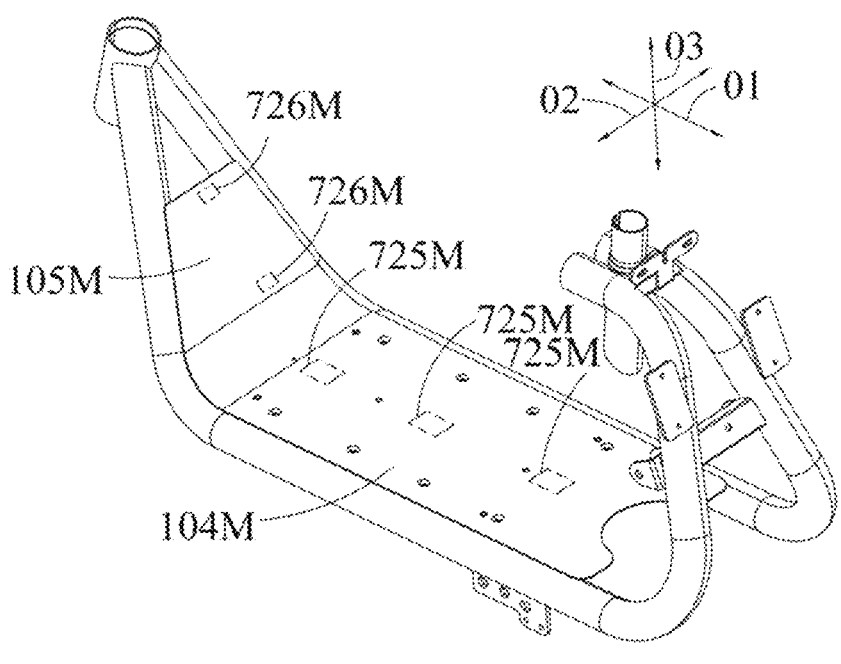

Referring to FIG. 64E, in some embodiments, for the distribution of the fifth connection location 725M on the support plate 104M, for the convenience of description, a dashed box indicates the position of the fifth connection location 725M. Along the first direction 01, the fifth connection location 725M may be located at a front end of the support plate 104M, a rear end of the support plate 104M, or between the front end and the rear end. The fifth connection location 725M may also extend from the front end to the middle of the support plate 104M, or from the front end to the rear end. Along the second direction 02, the fifth connection location 725M may be on a left side of the support plate 104M, on a right side of the support plate 104M, or between the left side and the right side. The fifth connection location 725M may also extend from the left side to the middle of the support plate 104M, or from the left side to the right side.

Referring to FIG. 64E, in some embodiments, for the distribution of the sixth connection location 726M on the reinforcement plate 105M, for the convenience of description, a dashed box indicates the position of the sixth connection location 726M. Along the third direction 03, the sixth connection location 726M may be located at a top end of the reinforcement plate 105M, or at a bottom end of the reinforcement plate 105M, or between the top end and the bottom end. The sixth connection location 726M may also extend from the top end to the middle of the reinforcement plate 105M, or from the top end to the bottom end of the reinforcement plate 105M. Along the second direction 02, the sixth connection location 726M may be located on a left side of the reinforcement plate 105M, or on a right side of the reinforcement plate 105M, or between the left side and the right side. The sixth connection location 726M may also extend from the left side to the middle of the reinforcement plate 105M, or from the left side to the right side.

Referring to FIG. 64F, in some embodiments, for the distribution of the seventh connection location 727M on the middle tube 106M, for convenience of distinction and description, a narrower dashed box indicates that the seventh connection location 727M is located on an inner side of the middle tube 106M in this case, and a wider dashed box indicates that the seventh connection location 727M is located on an outer side of the middle tube 106M in this case, and the seventh connection location 727M may also extend from the inner side to the outer side of the middle tube 106M. Along the third direction 03, the seventh connection location 727M may be at a top end of the middle tube 106M, or at a bottom end of the middle tube 106M, or between the top end and the bottom end.

Referring to FIG. 64F, in some embodiments, for the distribution of the eighth connection location 728M on the seat tube 302M, for convenience of distinction and description, a narrower dashed box indicates that the eighth connection location 728M is located at an inner side of the seat tube 302M in this case, and a wider dashed box indicates that the eighth connection location 728M is located at an outer side of the seat tube 302M in this case. The eighth connection location 728M may also extend from the inner side to the outer side of the seat tube 302M. Along the third direction 03, the eighth connection location 728M may be at a top end of the seat tube 302M, or at a bottom end of the seat tube 302M, or between the top end and the bottom end.

Referring to FIG. 64C, when the connection mode is nesting, taking the first connection location 721M as an example, along the first direction 01, a rear side of the head tube 101M may be provided with the first connection location 721M, and the first connection location 721M may be in a form of a groove. A corresponding plug-in pin may be fixed to a front side of the storage mechanism 700M, thereby implementing one connection.

Referring to FIG. 64C, when the connection mode is a snap-fit, taking the second connection location 722M as an example, along the second direction 02, both sides of the storage mechanism 700M may be fixed with snap-fit buckles, and the second connection location 722M may be in the form of an arc surface adapted to the snap-fit buckles. When the snap-fit buckles are pressed toward the second connection location 722M, the snap-fit buckles are opened, so that one connection is achieved.

Referring to FIG. 64C, when the connection mode is friction, taking the third connection location 723M as an example, along the second direction 02, both sides of the first flat portion 137M may be provided with the third connection location 723M. The third connection location 723M may be in the form of a groove. Both sides of a bottom of the storage mechanism 700M may be fixed with plug-in pins, and the plug-in pins may be in interference fit with the third connection location 723M, so as to achieve two connections. In some other embodiments, a clearance fit or an interference fit may be adopted.

Referring to FIG. 64E, when the connection mode is nesting, taking a fifth connection location 725M as an example, a middle portion of the support plate 104M may be provided with the wide and shallow fifth connection location 725M. The fifth connection location 725M may be in a shape of a groove. A bottom side of the storage mechanism 700M may be adapted to the fifth connection location 725M. The connection is realized by putting the storage mechanism 700M into the fifth connection location 725M.

Referring to FIG. 64E, when the connection mode is adhesion, taking the fifth connection location 725M as an example, the support plate 104M and the storage mechanism 700M may be fixed through an adhesive member, where the adhesive member may include, but is not limited to, double-sided tape and a hook-and-loop fastener. The fifth connection location 725M may be in the form of a plane. The storage mechanism 700M is bonded to the support plate 104M, so as to realize connection.

Referring to FIG. 64E, when the connection mode is pressure, taking a fifth connection location 725M as an example, the support plate 104M and the storage mechanism 700M may be wound and fixed by a rope. The fifth connection location 725M may be an arc surface. The support plate 104M and the storage mechanism 700M are wound by the rope, so as to realize connection.

Referring to FIGS. 64B and 64E, when the connection mode is magnetic attraction, taking a sixth connection location 726M as an example, along the first direction 01, a side of the reinforcement plate 105M facing the front wheel 400M may be mounted with a magnet, that is, the back of the reinforcement plate 105M is mounted with the magnet. At this time, the sixth connection location 726M may be located on a side of the reinforcement plate 105M facing the storage mechanism 700M, and the sixth connection location 726M may be in the form of a plane. A front side of the storage mechanism 700M is attracted by the magnet and is attached to the sixth connection location 726M, thereby realizing one connection.

Referring to FIGS. 64B and 64E, when the connection mode is snap-fitting, taking a sixth connection location 726M as an example, along the first direction 01, a front end of the storage mechanism 700M may be fixed with a hook. The sixth connection location 726M may be in the form of a plane. The hook may be hooked on a top end of the support plate 104M, thereby implementing one connection.

Figure 65A:
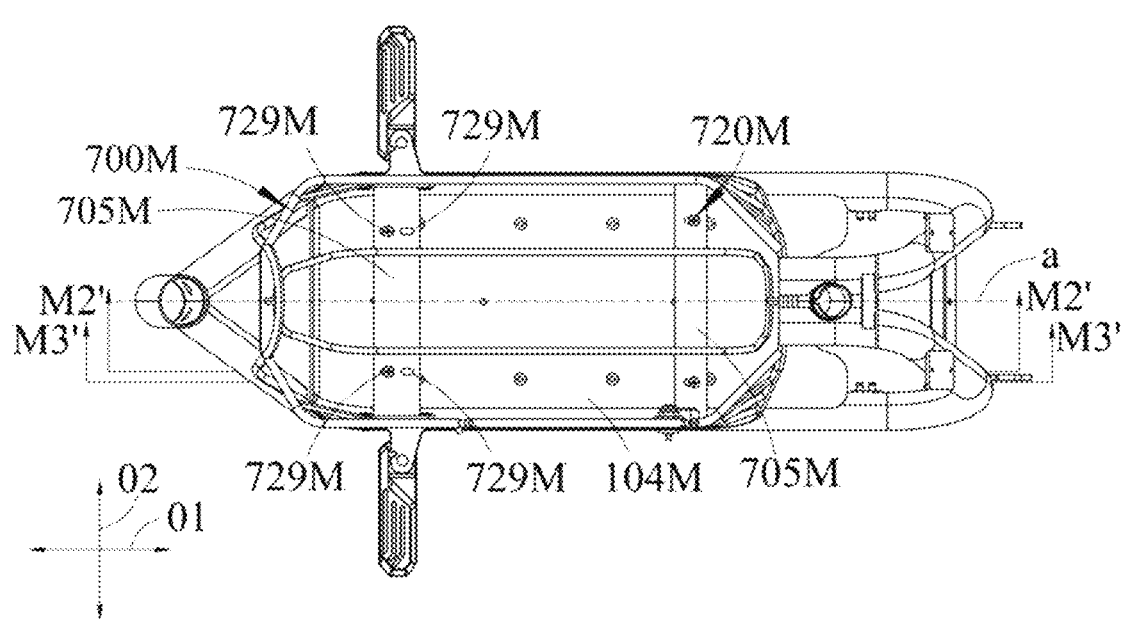
FIGS. 65A-65F are another set of schematic views illustrating the installation of the storage mechanism.
Figure 65B:
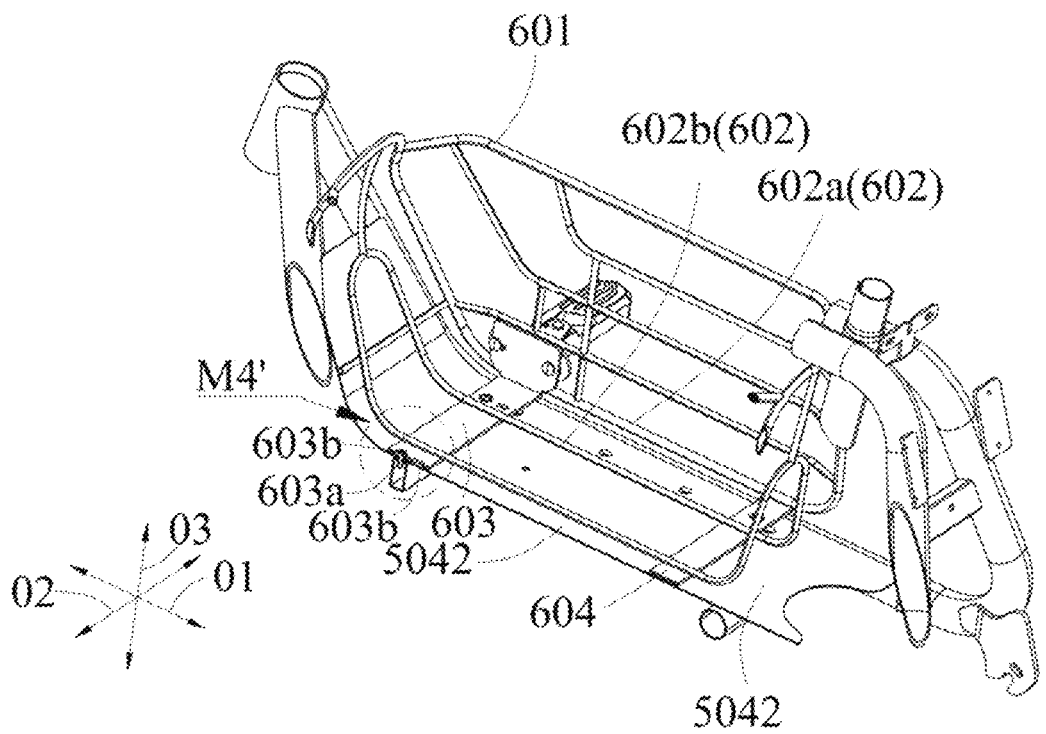
Figure 65C:
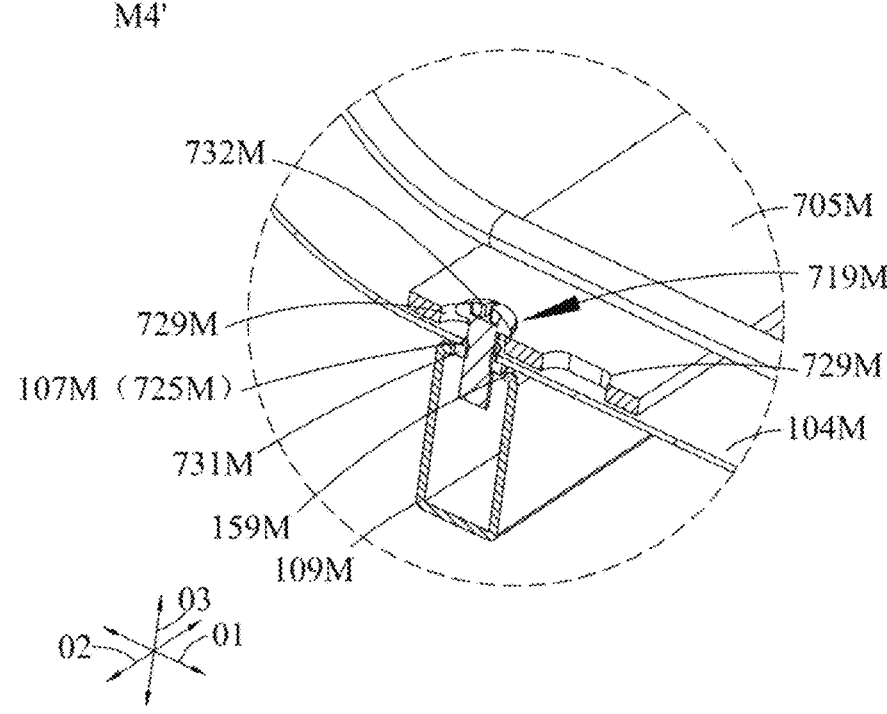
Figure 65D:
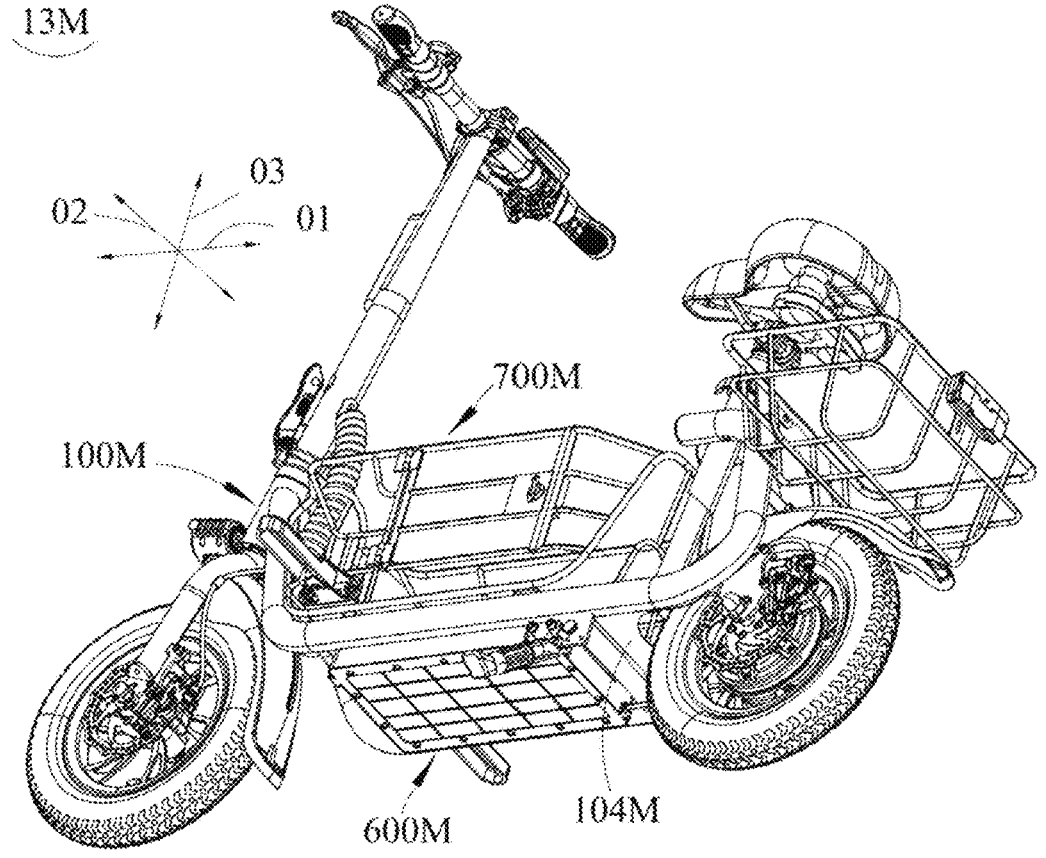
Figure 65E:
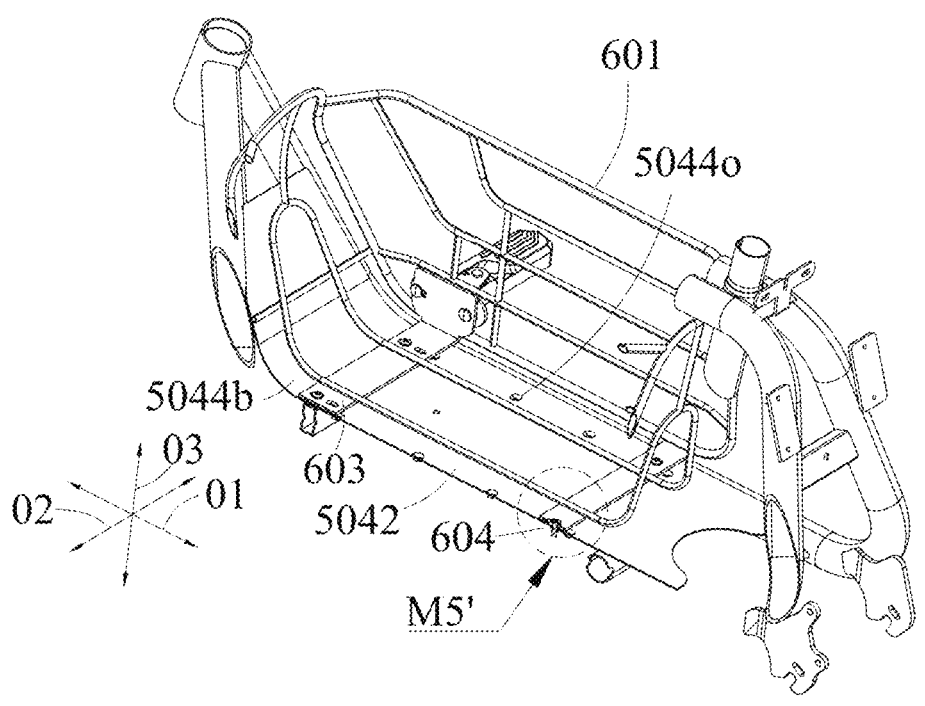
Figure 65F:
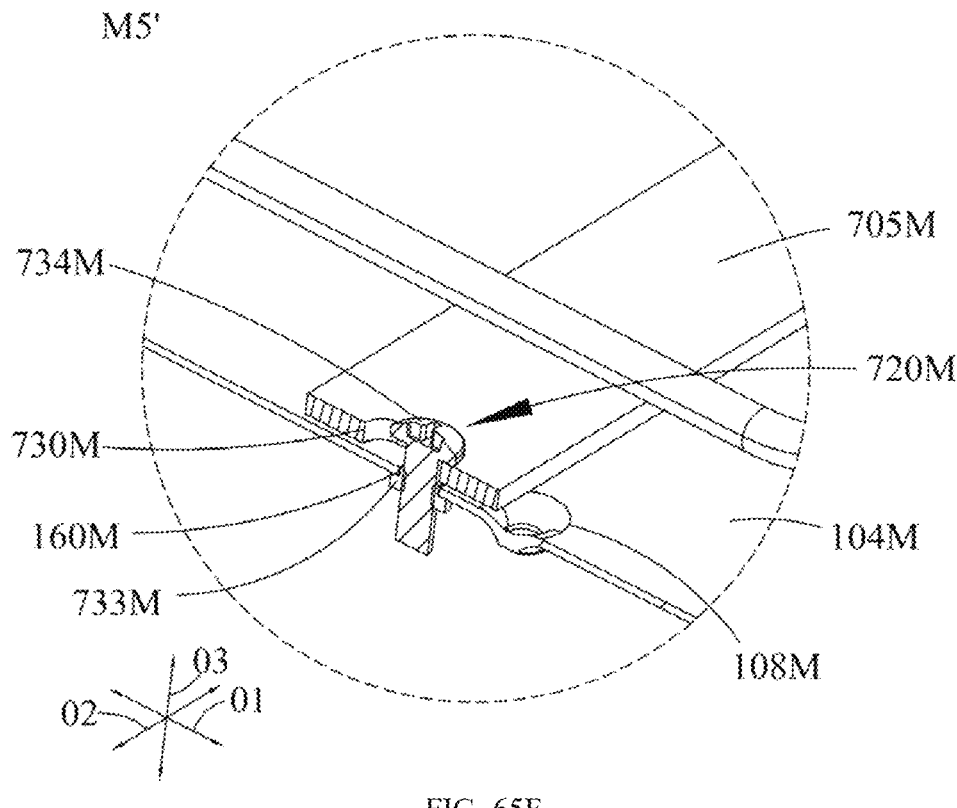

FIGS. 65A-65F are another set of installation schematic views of the storage mechanism 700M. FIG. 65B is a cross-sectional view taken along line M2'-M2' in FIG. 65A, FIG. 65C is an enlarged schematic view of M4' in FIG. 65B, FIG. 65E is a cross-sectional view taken along line M3'-M3' in FIG. 65A, and FIG. 65F is an enlarged schematic view of M5' in FIG. 65E.

When the connection mode is a mechanical connection, taking the fifth connection location 725M as an example, referring to FIGS. 65B and 65C, the connection location may be in the form of a hole and may be connected through a bolt connection assembly. In some embodiments, the mounting member 705M on the front side may be provided with a third fixing hole 729M, and the support plate 104M may be provided with a first threaded hole 107M (also as the fifth connection location 725M). The third fixing hole 729M and the first threaded hole 107M may both match the second bolt connection assembly 719M.

Referring to FIG. 65C, in some embodiments, the third fixing hole 729M may be a slotted hole, and the position of the second bolt connection assembly 719M relative to the mounting member 705M on the front side is adjustable along the extension direction of the slotted hole, which is expected to reduce the precision requirement for the positions of the third fixing hole 729M and the first threaded hole 107M in this direction. In addition, the applicability of the storage mechanism 700M may also be improved.

Referring to FIG. 65C, in some embodiments, the first nut 731M of the second bolt connection assembly 719M may be fixedly provided on the bottom side of the support plate 104M, so the risk of the first nut 731M of the second bolt connection assembly 719M being lost due to inconvenient storage is reduced when disassembling the mounting member 705M on the front side and the support plate 104M. In addition, the first nut 731M of the second bolt connection assembly 719M is fixedly provided on the bottom side of the support plate 104M, which is expected to reduce the alignment operation of the first nut 731M when tightening and fixing the first nut 731M and the second bolt 732M of the second bolt connection assembly 719M, thereby reducing the operational difficulty and improving the operational efficiency.

Referring to FIG. 65C, in some embodiments, the bolt specification of the second bolt 732M may be a round head bolt, and the rounded bolt head is expected to reduce scratching of articles or animals in the storage mechanism 700M, for example, it may reduce scratching of a pet's paws.

In some embodiments, the bolt specification of the second bolt 732M may be M5, which ensures a stable connection and is relatively small, contributing to the miniaturized design of the vehicle 13M.

In other examples, the bolt specification of the second bolt 732M may also be other specifications, such as M8, M10, M14.

Referring to FIGS. 65C and 65D, in addition, in some embodiments, the bottom side of the support plate 104M may also be provided with a power mechanism 600M; fixing the first nut 731M of the second bolt connection assembly 719M to the bottom side of the support plate 104M eliminates the need to disassemble the power mechanism 600M when installing and disassembling the mounting member 705M on the front side and the support plate 104M, which is expected to reduce operational difficulty. In addition, fixing the first nut 731M of the second bolt connection assembly 719M to the bottom side of the support plate 104M may eliminate the need to reserve operating space for installing and disassembling the mounting member 705M on the front side and the support plate 104M, thus the space on the bottom side of the support plate 104M may be better utilized to arrange the power mechanism 600M, reducing restrictions on the power mechanism 600M to better ensure the cruising range of the vehicle 13M; it may also avoid the need to provide structures such as notches on the power mechanism 600M to reserve operating space, which is expected to make the structure of the power mechanism 600M simpler, easier to process, and lower in processing cost.

Referring to FIG. 65C, in some embodiments, the position of the third fixing hole 729M is set corresponding to the position of the reinforcing rib 109M on the front side, that is, the reinforcing rib 109M on the front side may be located on the bottom side of the third fixing hole 729M. The first nut 731M of the second bolt connection assembly 719M is fixed on the reinforcing rib 109M on the front side, so that the reinforcing rib 109M on the front side may share the stress generated by the fixed connection between the mounting member 705M on the front side and the support plate 104M, which is expected to increase the strength of the fixed connection between the mounting member 705M on the front side and the support plate 104M and improve the stability of the storage mechanism 700M. In addition, the position of the third fixing hole 729M is set corresponding to the position of the reinforcing rib 109M on the front side, so the reinforcing rib 109M on the front side may share part of the pressure acting on the support plate 104M, reduce the pressure on the support plate 104M, lower the risk of deformation of the support plate 104M, and is expected to improve the service life of the support plate 104M.

Referring to FIG. 65C, further, in some embodiments, the reinforcing rib 109B on the front side may also be provided with a fourth fixing hole 159M, and the side wall of the fourth fixing hole 159M matches the first nut 731M of the second bolt connection assembly 719M. When the second bolt 732M and the first nut 731M of the second bolt connection assembly 719M are tightened, the stud of the second bolt 732M may partially extend into the reinforcing rib 109M on the front side, allowing the reinforcing rib 109M on the front side to share the stress generated by the fixed connection between the mounting member 705M on the front side and the support plate 104M to a greater extent. In some embodiments, the reinforcing rib 109M on the front side may be tubular, and the fourth fixing hole 159M penetrates the top wall of the reinforcing rib 109M on the front side, which reduces the processing difficulty of the fourth fixing hole 159M and reduces the restriction on the bolt length of the second bolt connection assembly 719M.

Referring to FIG. 65C, in some embodiments, the number of third fixing holes 729M may be greater than the number of first threaded holes 107M, so that a third fixing hole 729M at a suitable position may be selected according to the number of first threaded holes 107M in the vehicle 13M, which is expected to improve the applicability of the storage mechanism 700M.

Referring to FIGS. 65A and 65C, in some embodiments, the number of third fixing holes 729M may be four, and the number of first threaded holes 107M may be two. It may be understood that, in other embodiments, the number of third fixing holes 729M and the number of first threaded holes 107M may be set as required, and the specific number is not limited.

Referring to FIG. 65A, in some embodiments, the mounting member 705M on the rear side and the support plate 104M may be fixedly connected through a third bolt connection assembly 720M. The mounting member 705M on the rear side is fixedly connected to the support plate 104M through the third bolt connection assembly 720M, which facilitates the disassembly and installation of the mounting member 705M on the rear side and the support plate 104M, and is expected to facilitate the disassembly and installation of the storage mechanism 700M. Thus, when the storage mechanism 700M is needed, the storage mechanism 700M may be installed to facilitate carrying articles or animals; when the storage mechanism 700M is not needed, the storage mechanism 700M may be disassembled to facilitate a user to step on the second section 124M of the frame 100M during riding, which is expected to improve riding comfort and safety. In addition, facilitating the disassembly and installation of the storage mechanism 700M allows for improving the utilization of storage or transportation space by disassembling the storage mechanism 700M during storage or transportation.

Referring to FIGS. 65E and 65F, in some embodiments, the mounting member 705M on the rear side may be provided with a fifth fixing hole 730M, and the support plate 104M may be provided with a sixth fixing hole 160M. The fifth fixing hole 730M and the sixth fixing hole 160M may both match the third bolt connection assembly 720M.

Referring to FIG. 65F, in some embodiments, the fifth fixing hole 730M may be a slotted hole, and the position of the third bolt connection assembly 720M relative to the mounting member 705M on the rear side is adjustable along the extension direction of the slotted hole, which is expected to reduce the precision requirement for the positions of the fifth fixing hole 730M and the sixth fixing hole 160M in this direction. In addition, the applicability of the storage mechanism 700M may also be improved.

Referring to FIG. 65F, in some embodiments, the second nut 733M of the third bolt connection assembly 720M may be fixedly provided on the bottom side of the support plate 104M, thus reducing the risk of the second nut 733M being lost due to inconvenient storage of the second nut 733M of the third bolt connection assembly 720M when disassembling the mounting member 705M on the rear side and the support plate 104M. In addition, the second nut 733M of the third bolt connection assembly 720M may be fixedly provided on the bottom side of the support plate 104M, which is expected to reduce the alignment operation of the second nut 733M when tightening and fixing the second nut 733M and the third bolt 734M of the third bolt connection assembly 720M, thereby reducing the operational difficulty and improving the operational efficiency.

In addition, referring to FIGS. 65D and 65F, in some embodiments, the bottom side of the support plate 104M may also be provided with a power mechanism 600M; fixing the second nut 733M of the third bolt connection assembly 720M to the bottom side of the support plate 104M eliminates the need to disassemble the power mechanism 600M when installing and disassembling the mounting member 705M on the rear side and the support plate 104M, which is expected to reduce operational difficulty. In addition, fixing the second nut 733M of the third bolt connection assembly 720M to the bottom side of the support plate 104M also eliminates the need to reserve operating space for installing and disassembling the mounting member 705M on the rear side and the support plate 104M, so the space on the bottom side of the support plate 104M may be better utilized to arrange the power mechanism 600M, reducing restrictions on the power mechanism 600M to better ensure the cruising range of the vehicle 13M; it may also avoid the need to provide structures such as notches on the power mechanism 600M to reserve operating space, which is expected to make the structure of the power mechanism 600M simple, easy to process, and lower in processing cost.

Referring to FIG. 65F, in some embodiments, the second nut 733M of the third bolt connection assembly 720M may be fixedly provided on the bottom surface of the support plate 104M.

Referring to FIG. 65F, in some embodiments, the bolt specification of the third bolt 734M may be a round head bolt, and the rounded bolt head may reduce scratching of articles or animals in the storage mechanism 700M, for example, it may reduce scratching of a pet's paws.

In some embodiments, the bolt specification of the third bolt 734M may be M5, ensuring a stable connection and being relatively small.

In other examples, the bolt specification of the third bolt 734M may also be other specifications, such as M8, M10, M14.

Referring to FIGS. 65C and 65F, in some embodiments, both the mounting member 705M on the front side and the mounting member 705M on the rear side may be fixedly connected to the support plate 104M by means of bolt connection.

It may be understood that, in other embodiments, the manner in which the mounting member 705M on the front side is fixedly connected to the support plate 104M, and the manner in which the mounting member 705M on the rear side is fixedly connected to the support plate 104M, may both be by fixed connection through adhesion, snap-fitting, or the like. Correspondingly, the manner in which the mounting member 705M on the front side is fixedly connected to the support plate 104M and the manner in which the mounting member 705M on the rear side is fixedly connected to the support plate 104M may be the same or different.

In some other embodiments, the storage mechanism and the frame may be fixed through a bracket. For example, the bracket may be fixed on the storage mechanism, and when the storage mechanism needs to be disassembled, the bracket and the storage mechanism may be removed together. For another example, the bracket may be fixed on the frame, and when the storage mechanism needs to be disassembled, only the storage mechanism is removed, meaning the bracket is still attached to the frame.

Figure 66A:
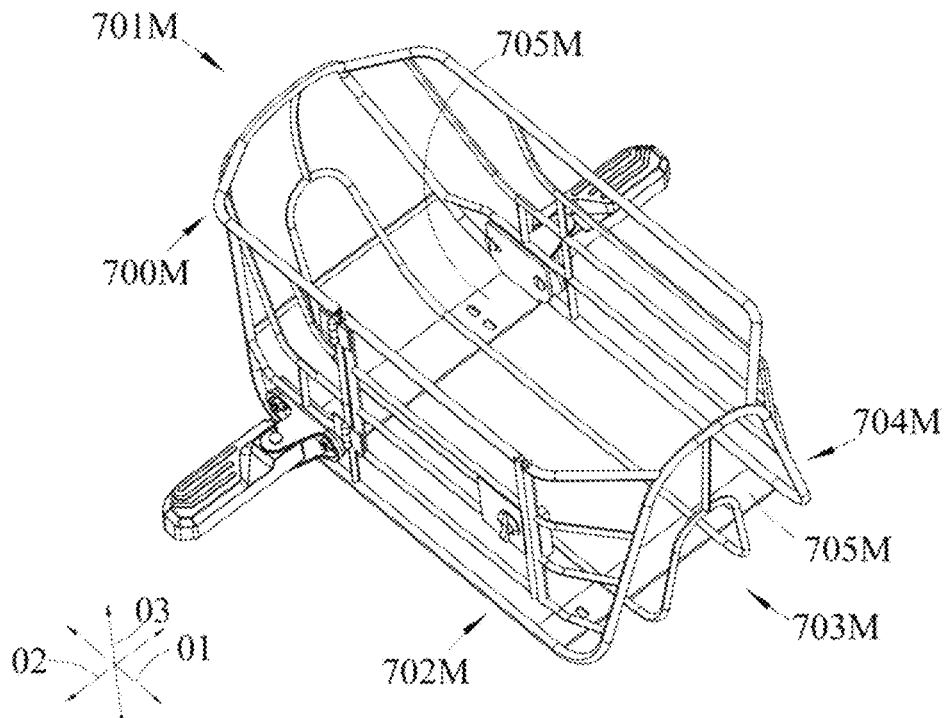
FIGS. 66A-66C are a set of schematic parameter views of the storage mechanism.
Figure 66B:
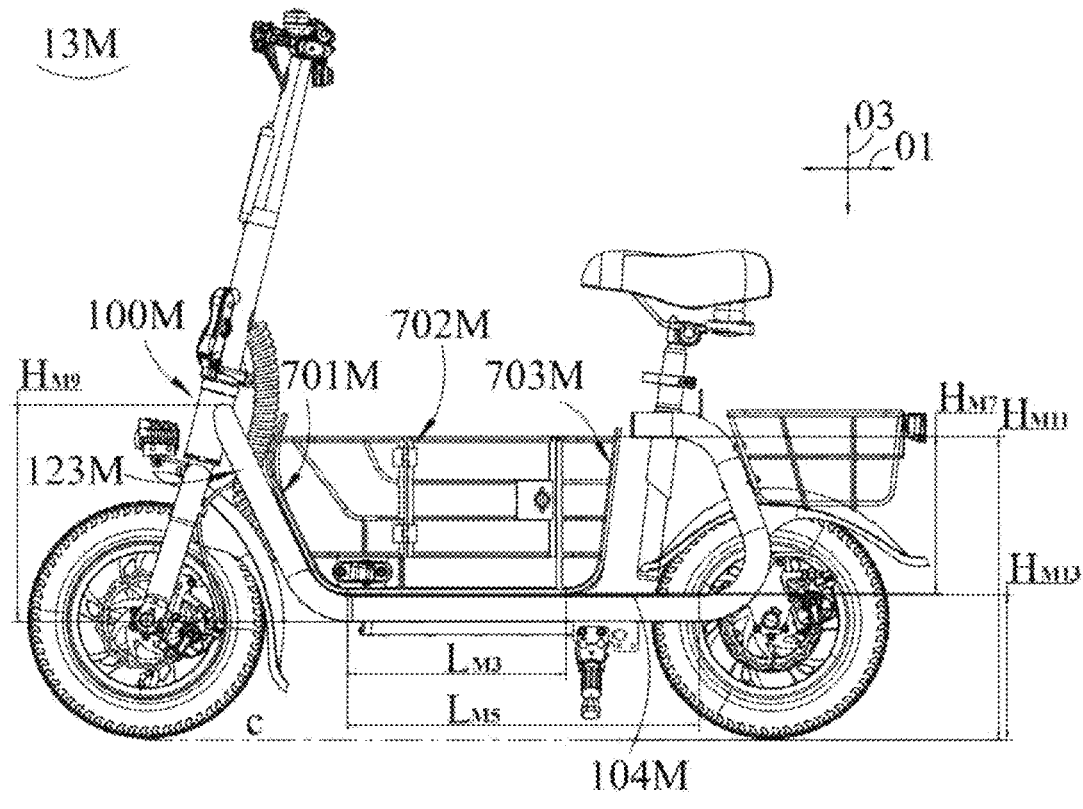
Figure 66C:
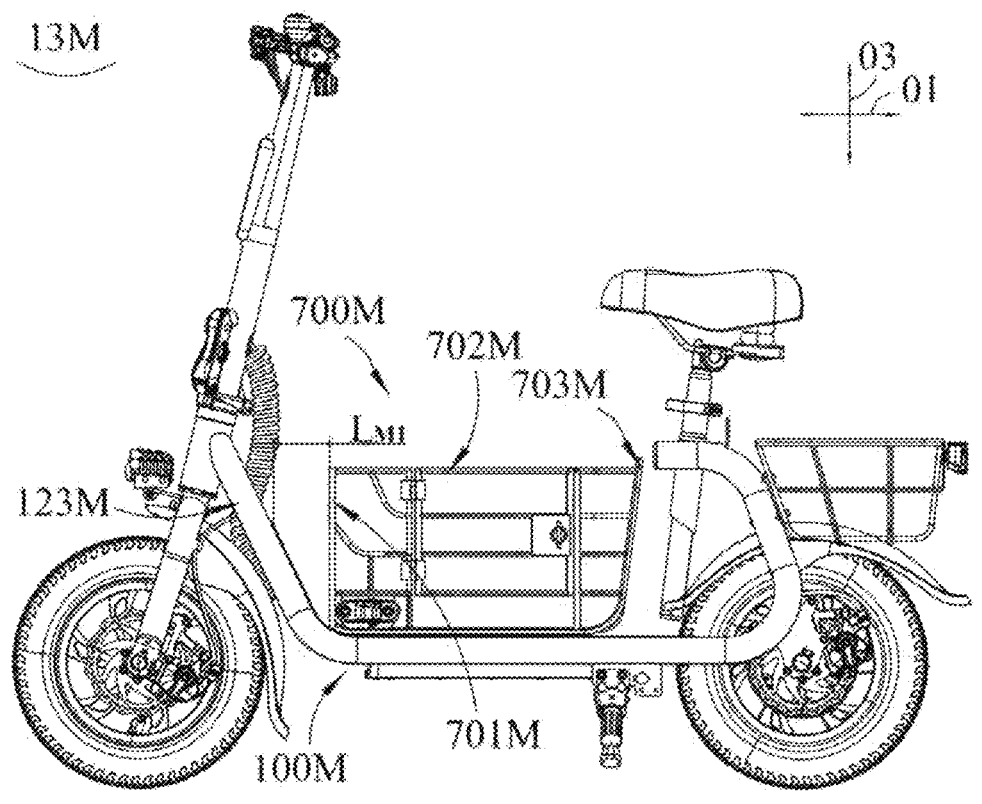

FIGS. 66A-66C are a set of parameter views of the storage mechanism 700M.

Referring to FIG. 66A, in some embodiments, the side walls of the storage mechanism 700M may all be provided with a hollowed-out structure to improve the air permeability in the storage mechanism 700M, so as to facilitate the volatilization of moisture when there is moisture in the storage mechanism 700M. In addition, the provision of the hollowed-out structure may enhance the exchange between the air in the storage mechanism 700M and the external air, and reduce the residue of peculiar smell in the storage mechanism 700M. In addition, the hollowed-out setting also effectively reduces the weight of the storage mechanism 700M, which is convenient for the lightweight design of the vehicle 13M. In addition, the hollowed-out setting is convenient for observing the situation in the storage mechanism 700M, so as to deal with it more timely when there is a situation with the articles or animals in the storage mechanism 700M.

Referring to FIG. 66A, in some embodiments, the storage mechanism 700M may be approximately in the shape of a rectangular parallelepiped. It may be understood that in some other embodiments, the storage mechanism 700M is not limited to a rectangular parallelepiped shape, and may also be in a regular or irregular shape such as a cylinder.

Referring to FIG. 66A, in some embodiments, the storage mechanism 700M may include a first limiting member 701M and a third limiting member 703M arranged opposite to each other along the first direction 01, wIn some embodiments the first limiting member 701M may be located at the front side of the third limiting member 703M.

Referring to FIG. 66A, in some embodiments, the storage mechanism 700M may include a second limiting member 702M and a fourth limiting member 704M arranged in sequence along the second direction 02.

Referring to FIG. 66B, in some embodiments, the height of the second limiting member 702M along the third direction 03 is $H_{M7}$, which may fall within the range of 120 mm-300 mm. When $H_{M7} \geq 120$ mm, after placing an article or an animal, the second limiting member 702M may play a good role of shielding or protection, for example, reducing the risk of the article or animal from tipping over or even falling out when the road is rough or the animal is large.

When $H_{M7} \leq 300$ mm, the second limiting member 702M has a suitable height, which reduces the risk of the top end of the second limiting member 702M bumping against the inner side of the user's leg, and is expected to ensure comfort and facilitate the miniaturization design of the vehicle 13M.

Specifically, $H_{M7}$ may be any value in the range of 120 mm-300 mm, for example, 120 mm, 130 mm, 140 mm, 150 mm, 160 mm, 170 mm, 180 mm, 190 mm, 200 mm, 210 mm, 220 mm, 230 mm, 240 mm, 250 mm, 260 mm, 270 mm, 280 mm, 290 mm, 300 mm.

Referring to FIG. 66B, in some embodiments, $H_{M9}$ is the height of the second upwardly extending portion 136M along the third direction 03. The ratio $K_{M2}$ of $H_{M7}$ to $H_{M9}$ may fall within the range of 0.5-1. When $K_{M2} \leq 0.5$, after placing an article or animal, the second limiting member 702M may play a better role in shielding or protecting, for example, reducing the risk of the article or animal from tipping over or even falling out when the road condition is rough or the animal's body size is large. When $K_{M2} \leq 1$, the occupation of the space formed by the frame 100M is reduced, which is expected to reduce the installation interference to other parts or components of the vehicle, and is conducive to simplifying the design of the vehicle and the miniaturized design.

Specifically, $K_{M2}$ may be any value in the range of 0.5-1, for example, 0.5, 0.6, 0.7, 0.8, 0.9, 1.0.

Referring to FIG. 66B, in some embodiments, the height of the second limiting member 702M from the ground is $H_{M11}$, the height of the support plate 104M from the ground is $H_{M13}$, and the ratio $K_{M3}$ of $H_{M11}$n to $H_{M13}$ may fall within the range of 1.8-2.6. When $K_{M3} \geq 1.8$, after an article or animal is placed, the second limiting member 702M may play a better role in shielding or protecting, for example, reducing the risk of the article or animal from tipping over or even falling out when the road is rough or the animal's body size is large. When $K_{M3} \leq 2.6$, after an article or an animal is put in, the instability brought to the vehicle 13M when the article or animal collides with the second limiting member 702M is reduced, for example, when it collides with the top of the second limiting member 702M.

Specifically, $K_{M3}$ may be any value in the range of 1.8-2.6, for example, 1.8, 1.9, 2.0, 2.1, 2.2, 2.3, 2.4, 2.5, 2.6.

In some embodiments, along the first direction 01, the distance $L_{M1}$ between the front side of the second limiting member 702M and the rear side of the first section 123M may fall within the range of 0 mm-12 mm.

Referring to FIGS. 66A and 66B, when $L_{M1}$ is 0, if the storage mechanism 700M may include the first limiting member 701M and the third limiting member 703M, the front side of the first limiting member 701M may fit with the rear side of the first section 123M, so that the second limiting member 702M is maximized, thereby facilitating the maximized design of the storage mechanism 700M. In addition, when the storage mechanism 700M does not include the first limiting member 701M and the third limiting member 703M, $L_{M1}$ is 0, which may reduce the risk of items or animals extending or falling out.

Referring to FIG. 66C, when there is a gap between the front side of the second limiting member 702M and the rear side of the first section 123M, for example, $L_{M1}$ is 5 mm, and the storage mechanism 700M may include the first limiting member 701M and the third limiting member 703M, it is convenient for the user to take out the entire storage mechanism 700M from the front end thereof.

In addition, when the storage mechanism 700M does not include the first limiting member 701M and the third limiting member 703M, it is convenient for the user to pick and place items from the front end of the second limiting member 702M, which makes the pick and place of items more flexible.

When $L_{M1} \leq 12$ mm, and the storage mechanism 700M may include the first limiting member 701M and the third limiting member 703M, the space of the frame 100M is more fully utilized, and the volume of the storage mechanism 700M is expected to be larger. In addition, when the storage mechanism 700M does not include the first limiting member 701M and the third limiting member 703M, the distance between the front side of the second limiting member 702M and the rear side of the first section 123M is appropriate, and the second limiting member 702M may play a good shielding or protective role, for example, reducing the risk of items falling out when the road is rough.

Specifically, $L_{M1}$ may be any value in the range of 0 mm-12 mm, such as 0 mm, 1 mm, 2 mm, 3 mm, 4 mm, 5 mm, 6 mm, 7 mm, 8 mm, 9 mm, 10 mm, 11 mm, 12 mm.

Referring to FIG. 66B, in some embodiments, along the first direction 01, the length of the bottom side of the second limiting member 702M is $L_{M3}$, $L_{M5}$ is the length of the support plate 104M along the first direction 01, and the ratio of $L_{M3}$ to $L_{M5}$ is $K_{M5}$. $K_{M5}$ may fall within the range of 0.5-1. When $K_{M5} \geq 0.5$, the support plate 104M is more fully utilized, and the volume of the storage mechanism 700M is expected to be larger. When $K_{M5} \leq 1$, the storage mechanism 700M may get more and fuller support from the support plate 104M, which is expected to improve the stability of carrying goods. In addition, the bottom side length of the second limiting member 702M is appropriate, which may reduce the occupied space and is expected to realize the miniaturized design of the vehicle 13M.

Specifically, $K_{M5}$ may be any value within the range of 0.5-1, for example, 0.5, 0.6, 0.7, 0.8, 0.9, 1.0.

Referring to FIG. 66A, in some embodiments, the size of the fourth limiting member 704M may be the same as that of the second limiting member 702M, for example, with reference to $H_{M7}$, $H_{M11}$, $K_{M2}$, $K_{M3}$, $L_{M3}$, KMS related to the second limiting member 702M, which will not be repeated here.

Referring to FIG. 66B, in some embodiments, the first limiting member 701M may be inclined forward. The first section 123M of the frame 100M may be inclined forward and may be located at the front end of the first limiting member 701M, so that the first limiting member 701M is inclined forward, which is expected to make fuller use of the space on the rear side of the first section 123M of the frame 100M, so that the storage mechanism 700M has a larger volume.

Referring to FIG. 66B, in some embodiments, the top end of the first limiting member 701M may be bent backward, which is expected to reduce the risk of the articles in the storage mechanism 700M from sliding out from the front side of the storage mechanism 700M under the action of inertia when the vehicle 13M decelerates.

Figure 67A:
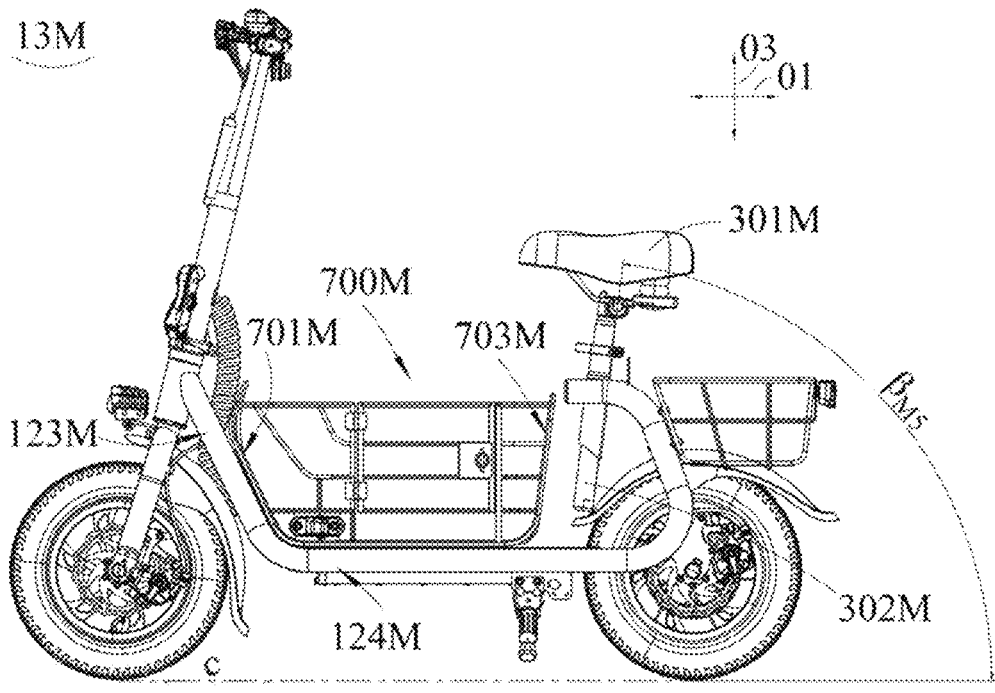
FIGS. 67A-67C are another set of schematic parameter views of the storage mechanism.
Figure 67B:
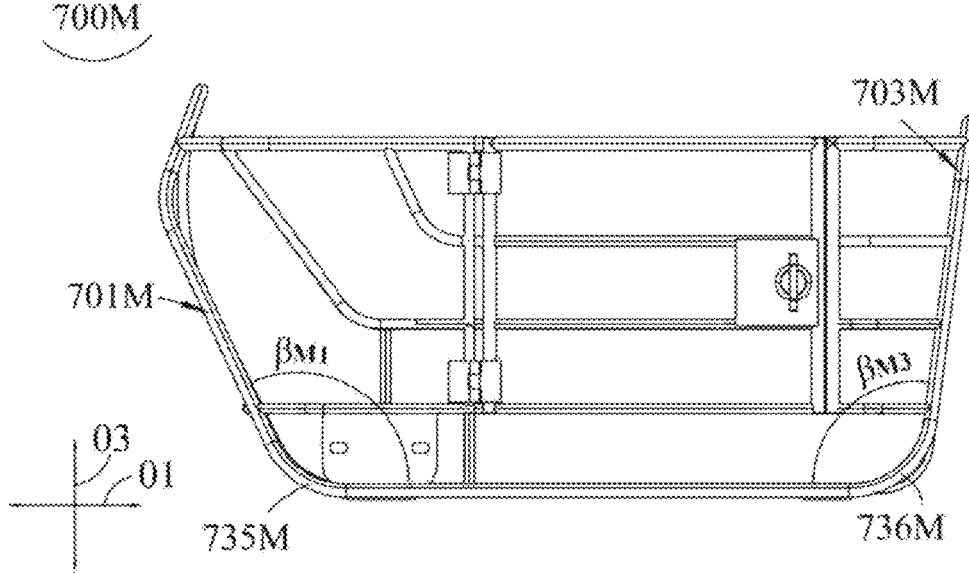
Figure 67C:
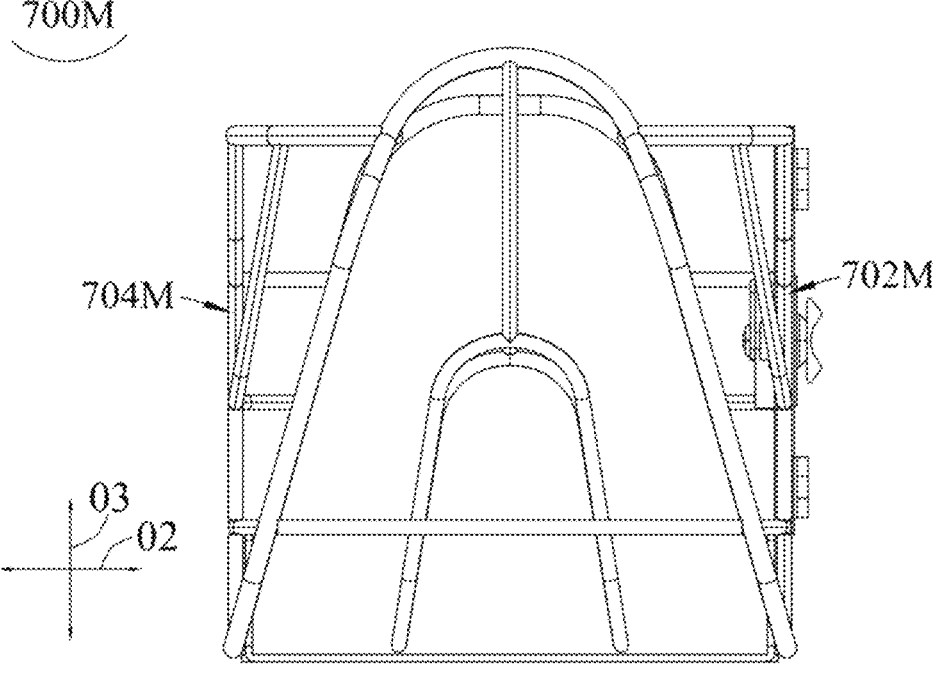

FIGS. 67A-67C are another set of parameter views of the storage mechanism 700M.

Referring to FIGS. 67A and 67B, in some embodiments, the difference between the included angle βM1 between the first limiting member 701M and the bottom wall of the storage mechanism 700M and the included angle between the first section 123M and the second section 124M may fall within the range of 0°-5°. The difference between the two included angles is small, so the first limiting member 701M may be arranged closer to the first section 123M, which is expected to make fuller use of the space on the rear side of the first section 123M, so that the storage mechanism 700M has a larger volume.

Specifically, the difference between the two included angles may be any value in the range of 0°-5°, for example, 0°, 1°, 2°, 3°, 4°, 5°.

Referring to FIG. 67A, in some embodiments, the third limiting member 703M may be tilted backward. The seat tube 302M may be tilted backward and may be located on the rear side of the third limiting member 703M. The third limiting member 703M is tilted backward to make fuller use of the space on the front side of the seat tube 302M, which is expected to make the storage mechanism 700M have a larger volume.

Referring to FIGS. 67A and 67B, in some embodiments, the included angle between the third limiting member 703M and the bottom wall of the storage mechanism 700M is $\beta_{M3}$, the included angle between the seat tube 302M and the first direction 01 is $\beta_{M5}$, and the difference between the supplementary angle of $\beta_{M3}$ and $\beta_{M5}$ may be in the range of 0°-5°. The difference between the supplementary angle of $\beta_{M3}$ and $\beta_{M5}$ is small, so the third limiting member 703M may be arranged closer to the seat tube 302M, which is expected to make fuller use of the space on the front side of the seat tube 302M, so that the storage mechanism 700M has a larger volume.

Specifically, the difference between the supplementary angle of $\beta_{M3}$ and $\beta_{M5}$ may be any value in the range of 0°-5°, for example, 0°, 1°, 2°, 3°, 4°, 5°.

Referring to FIG. 67B, in some embodiments, a fourth transition section 735M may be provided between the bottom wall of the storage mechanism 700M and the first limiting member 701M. The provision of the fourth transition section 735M may make the transition between the bottom wall of the storage mechanism 700M and the first limiting member 701M more stable. On the one hand, the provision of the fourth transition section 735M reduces the risk of the user or people around the vehicle 13M being injured by sharp corners; on the other hand, the provision of the fourth transition section 735M alleviates the stress concentration phenomenon between the bottom wall of the storage mechanism 700M and the first limiting member 701M, which is expected to improve the support strength of the storage mechanism 700M and improve the reliability and service life of the storage mechanism 700M.

Referring to FIG. 67B, in some embodiments, from the front end of the bottom wall of the storage mechanism 700M to the bottom end of the first limiting member 701M, the extension line of the fourth transition section 735M may be a curve, so that the transition between the bottom wall of the storage mechanism 700M and the first limiting member 701M is more stable and smooth, and the appearance is also expected to be more beautiful.

Referring to FIG. 67B, in some embodiments, from the front end of the bottom wall of the storage mechanism 700M to the bottom end of the first limiting member 701M, the extension line of the fourth transition section 735M may be in an arc shape, so that the shape of the fourth transition section 735M is simpler and more regular, which is convenient for processing.

Referring to FIG. 67B, in some embodiments, a fifth transition section 736M may be provided between the bottom wall of the storage mechanism 700M and the third limiting member 703M. The provision of the fifth transition section 736M may make the transition between the bottom wall of the storage mechanism 700M and the third limiting member 703M smoother. On the one hand, the provision of the fifth transition section 736M reduces the risk of users or people around the vehicle 13M being injured by sharp corners. On the other hand, the provision of the fifth transition section 736M alleviates the stress concentration phenomenon between the bottom wall of the storage mechanism 700M and the third limiting member 703M, which is expected to improve the support strength of the storage mechanism 700M and improve the reliability and service life of the storage mechanism 700M.

Referring to FIG. 67B, in some embodiments, from the rear end of the bottom wall of the storage mechanism 700M to the bottom end of the third limiting member 703M, the extension line of the fifth transition section 736M may be a curve, so that the transition between the bottom wall of the storage mechanism 700M and the third limiting member 703M is smoother and more stable, and the appearance may also be more beautiful.

Referring to FIG. 67B, in some embodiments, from the rear end of the bottom wall of the storage mechanism 700M to the bottom end of the third limiting member 703M, the extension line of the fifth transition section 736M may be in an arc shape, so that the shape of the fifth transition section 736M is simpler and more regular, and it is expected to be convenient for processing.

Referring to FIGS. 67A and 67C, in some embodiments, the second limiting member 702M and the fourth limiting member 704M of the storage mechanism 700M may both be approximately perpendicular to the bottom wall of the storage mechanism 700M, reducing the influence of the arrangement of the storage mechanism 700M on the width of the front side of the seat 301M, which is expected to ensure the user's riding comfort and riding safety.

Figures 68, 69:
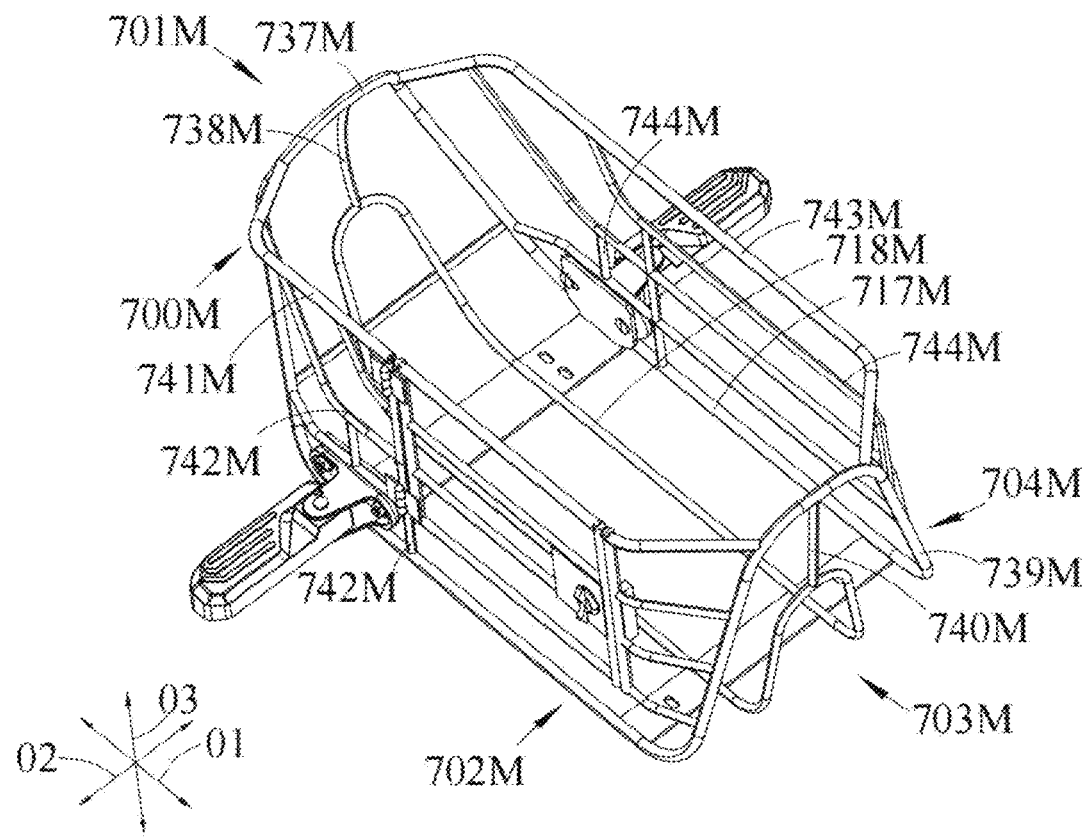
FIG. 68 is a schematic structural view of the storage mechanism.
FIG. 69 is a schematic view illustrating the installation of the storage mechanism.

FIG. 68 is a schematic structural view of the storage mechanism 700M.

Referring to FIG. 68, in some embodiments, the first limiting member 701M, the third limiting member 703M, the second limiting member 702M and the fourth limiting member 704M each may include a plurality of relatively fixed side rods, which has a simple structure and is easy to process.

In some other embodiments, the bottom wall of the storage mechanism 700M, the first limiting member 701M, the third limiting member 703M, the second limiting member 702M and the fourth limiting member 704M may be separate components, and then assembled to form a whole. For example, the bottoms of the first limiting member 701M, the third limiting member 703M, the second limiting member 702M and the fourth limiting member 704M are all fixed to the bottom wall of the storage mechanism 700M by buckles (not shown in the figure), the front sides of the third limiting member 703M and the second limiting member 702M are respectively fixed to the two sides of the first limiting member 701M by buckles, and the rear sides of the third limiting member 703M and the second limiting member 702M are respectively fixed to the two sides of the third limiting member 703M by buckles.

In some other embodiments, among the bottom wall of the storage mechanism 700M, the first limiting member 701M, the third limiting member 703M, the second limiting member 702M and the fourth limiting member 704M, multiple parts may be combined to form one component. For example, the first limiting member 701M and the second limiting member 702M are integrated, and combined to form a first component, the third limiting member 703M and the fourth limiting member 704M are integrated, and combined to form a second component, the bottom wall of the storage mechanism 700M is a third component, and the three components are fixed by buckles.

Referring to FIG. 68, in some embodiments, some of the plurality of side rods on the first limiting member 701M may be arranged crosswise, so that the hollowed-out parts on the first limiting member 701M are smaller, reducing the risk of items in the storage mechanism 700M falling out through the hollowed-out parts of the first limiting member 701M. Similarly, in some embodiments, the side rods on the third limiting member 703M, the second limiting member 702M and the fourth limiting member 704M may also be arranged crosswise, which may also reduce the risk of items in the storage mechanism 700M falling out through the hollowed-out parts of the corresponding side walls.

Referring to FIG. 68, in some embodiments, the ratio of the total area of the hollowed-out parts on the first limiting member 701M to the total area of the first limiting member 701M may be in the range of 0.5-0.98, which is expected to have a higher hollowed-out area while meeting the shielding requirements.

Specifically, the ratio of the total area of the hollowed-out parts on the first limiting member 701M to the total area of the first limiting member 701M may be any value in the range of 0.5-0.98, for example, 0.5, 0.58, 0.66, 0.74, 0.82, 0.90, and 0.98.

In some embodiments, the side rods on the first limiting member 701M may be tubular. While fulfilling the function of side support and shielding, it has a small weight, which is expected to realize a lightweight design of the storage mechanism 700M, facilitating the lightweight design of the vehicle 13M.

Referring to FIG. 68, in some embodiments, the plurality of side rods on the first limiting member 701M may include a first side rod 737M disposed at an edge position of the first limiting member 701M and a second side rod 738M disposed at a middle position of the first limiting member 701M. The outer diameter of the first side rod 737M is larger than the outer diameter of the second side rod 738M. The larger outer diameter of the first side rod 737M provides higher support strength, which is expected to better maintain the size of the first limiting member 701M while providing side limiting. The smaller outer diameter of the second side rod 738M results in a smaller weight while satisfying the side limiting, which facilitates the lightweight design of the storage mechanism 700M and the lightweight design of the vehicle 13M.

In some embodiments, the material of the first side rod 737M may be carbon structural steel, which has good support performance and is easy to mold, facilitating the preparation of the first side rod 737M.

In some other embodiments, the material of the first side rod 737M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

In some embodiments, the outer diameter of the first side rod 737M may be in the range of 2 mm-10 mm, and the wall thickness of the first side rod 737M may be in the range of 0.4 mm-1 mm, so that the outer diameter is smaller while satisfying the support strength, and the first limiting member 701M is thinner, facilitating the miniaturized design of the storage mechanism 700M.

Specifically, the outer diameter of the first side rod 737M may be any value in the range of 2 mm-8 mm, for example, 2 mm, 3 mm, 4 mm, 5 mm, 6 mm, 7 mm, 8 mm, 9 mm, and 10 mm. The wall thickness of the first side rod 737M may be any value in the range of 0.4 mm-1 mm, for example, 0.4 mm, 0.5 mm, 0.6 mm, 0.7 mm, 0.8 mm, 0.9 mm, and 1 mm.

Referring to FIG. 68, in some embodiments, the material of the second side rod 738M may be carbon structural steel, which has good support performance and is easy to mold, facilitating the preparation of the second side rod 738M.

In some other embodiments, the material of the second side rod 738M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material. It may be noted that the materials of different second side rods 738M may be the same or different.

In some embodiments, the outer diameter of the second side rod 738M may be in the range of 2 mm-8 mm, and the wall thickness of the second side rod 738M may be in the range of 0.4 mm-1 mm, so that the outer diameter is smaller while satisfying the support strength, and the first limiting member 701M is thinner, facilitating the miniaturized design of the storage mechanism 700M.

Specifically, the outer diameter of the second side rod 738M may be any value in the range of 2 mm-8 mm, for example, 2 mm, 3 mm, 4 mm, 5 mm, 6 mm, 7 mm, and 8 mm. The wall thickness of the second side rod 738M may be any value in the range of 0.4 mm-1 mm, for example, 0.4 mm, 0.5 mm, 0.6 mm, 0.7 mm, 0.8 mm, 0.9 mm, and 1 mm.

Referring to FIG. 68, in some embodiments, the first side rod 737M and the edge-crossbar 717M may be integrally formed. It may be understood that, in some other embodiments, the first side rod 737M may also be separately provided from the edge-crossbar 717M, and then fixedly connected by welding, clamping, or the like.

Referring to FIG. 68, in some embodiments, some second side rods 738M and the middle-crossbar 718M may be integrally formed. It may be understood that, in some other embodiments, the second side rod 738M may also be separately provided from the middle-crossbar 718M, and then fixedly connected by welding, clamping, or the like.

Referring to FIG. 68, in some embodiments, some second side rods 738M and the first side rod 737M may be arranged crosswise to reduce the size of a single hollowed-out part on the first limiting member 701M, which is expected to reduce the risk of items in the storage mechanism 700M falling out through the hollowed-out parts on the first limiting member 701M.

Referring to FIG. 68, in some embodiments, the ratio of the total area of the hollowed-out parts on the third limiting member 703M to the total area of the first limiting member 701M may be in the range of 0.5-0.95, which has a higher hollowed-out area while meeting the shielding requirements.

Specifically, the ratio of the total area of the hollowed-out parts on the third limiting member 703M to the total area of the first limiting member 701M may be any value in the range of 0.5-0.95, for example, 0.5, 0.58, 0.66, 0.74, 0.82, 0.90, and 0.95.

In some embodiments, the side rods on the third limiting member 703M may be tubular. While fulfilling the function of side support and shielding, it has a small weight, which is expected to realize a lightweight design of the storage mechanism 700M, facilitating the lightweight design of the vehicle 13M.

Referring to FIG. 68, in some embodiments, the plurality of side rods on the third limiting member 703M may include a third side rod 739M disposed at an edge position of the third limiting member 703M and a fourth side rod 740M disposed at a middle position of the third limiting member 703M. The outer diameter of the third side rod 739M is larger than the outer diameter of the fourth side rod 740M. The larger outer diameter of the third side rod 739M provides higher support strength, which is expected to better maintain the size of the third limiting member 703M while satisfying the side limiting requirements. The smaller outer diameter of the fourth side rod 740M results in a smaller weight while satisfying the side limiting, which facilitates the lightweight design of the storage mechanism 700M and the lightweight design of the vehicle 13M.

In some embodiments, the material of the third side rod 739M may be carbon structural steel, which has good support performance and is easy to mold, facilitating the preparation of the third side rod 739M.

In some other embodiments, the material of the third side rod 739M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

In some embodiments, the outer diameter of the third side rod 739M may be in the range of 4 mm-12 mm, and the wall thickness of the third side rod 739M may be in the range of 0.4 mm-1 mm, so that the outer diameter is smaller while satisfying the support strength, and the third limiting member 703M is thinner, facilitating the miniaturized design of the storage mechanism 700M.

Specifically, the outer diameter of the third side rod 739M may be any value in the range of 4 mm-12 mm, for example, 4 mm, 5 mm, 6 mm, 7 mm, 8 mm, 9 mm, 10 mm, 11 mm, and 12 mm. The wall thickness of the third side rod 739M may be any value in the range of 0.4 mm-1 mm, for example, 0.4 mm, 0.5 mm, 0.6 mm, 0.7 mm, 0.8 mm, 0.9 mm, and 1 mm.

In some embodiments, the material of the fourth side rod 740M may be carbon structural steel, which has good support performance and is easy to mold, facilitating the preparation of the fourth side rod 740M.

In some other embodiments, the material of the fourth side rod 740M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

In some embodiments, the outer diameter of the fourth side rod 740M may be in the range of 2 mm-10 mm, and the wall thickness of the fourth side rod 740M may be in the range of 0.4 mm-1 mm, so that the outer diameter is smaller while satisfying the support strength, and the third limiting member 703M is thinner, facilitating the miniaturized design of the storage mechanism 700M.

Specifically, the outer diameter of the fourth side rod 740M may be any value in the range of 2 mm-10 mm, for example, 2 mm, 3 mm, 4 mm, 5 mm, 6 mm, 7 mm, 8 mm, 9 mm, and 10 mm. The wall thickness of the fourth side rod 740M may be any value in the range of 0.4 mm-1 mm, for example, 0.4 mm, 0.5 mm, 0.6 mm, 0.7 mm, 0.8 mm, 0.9 mm, and 1 mm.

Referring to FIG. 68, in some embodiments, the third side rod 739M and the edge-crossbar 717M may be integrally formed. It may be understood that, in some other embodiments, the third side rod 739M may also be separately provided from the edge-crossbar 717M, and then fixedly connected by welding, clamping, or the like.

In some embodiments, some fourth side rods 740M and the middle-crossbar 718M may be integrally formed. It may be understood that, in some other embodiments, the fourth side rod 740M may also be separately provided from the middle-crossbar 718M, and then fixedly connected by welding, clamping, or the like.

In some embodiments, some fourth side rods 740M and the third side rod 739M may be arranged crosswise to reduce the size of a single hollowed-out part on the third limiting member 703M, which is expected to reduce the risk of items in the storage mechanism 700M falling out through the hollowed-out parts on the third limiting member 703M.

In some embodiments, the ratio of the total area of the hollowed-out parts on the second limiting member 702M to the total area of the first limiting member 701M may be in the range of 0.5-0.95, which has a higher hollowed-out area while meeting the shielding requirements.

Specifically, the ratio of the total area of the hollowed-out parts on the second limiting member 702M to the total area of the first limiting member 701M may be any value in the range of 0.5-0.95, for example, 0.5, 0.58, 0.66, 0.74, 0.82, 0.90, and 0.95.

In some embodiments, the side rods on the second limiting member 702M may be tubular. While fulfilling the function of side support and shielding, it has a small weight, which facilitates the lightweight design of the storage mechanism 700M and the lightweight design of the vehicle 13M.

Referring to FIG. 68, in some embodiments, the plurality of side rods on the second limiting member 702M may include a fifth side rod 741M disposed at the top of the second limiting member 702M (which may also be referred to as a second crossbar in other embodiments) and a sixth side rod 742M disposed between the fifth side rods 741M (which may also be referred to as a second crossbar in other embodiments). Both ends of the fifth side rod 741M may be fixedly connected to the first side rod 737M and the third side rod 739M, respectively. The outer diameter of the fifth side rod 741M may be larger than the outer diameter of the sixth side rod 742M. The larger outer diameter of the fifth side rod 741M provides higher support strength, which is expected to better maintain the size of the second limiting member 702M while satisfying the side limiting requirements. The smaller outer diameter of the sixth side rod 742M results in a smaller weight while satisfying the side limiting, which facilitates the lightweight design of the storage mechanism 700M and the lightweight design of the vehicle 13M.

In addition, in some embodiments, the edge-crossbar 717M located on one side of the second limiting member 702M may also serve as the bottom edge of the second limiting member 702M to provide support for the second limiting member 702M.

In some embodiments, the material of the fifth side rod 741M may be carbon structural steel, which has good support performance and is easy to mold, facilitating the preparation of the fifth side rod 741M.

In some other embodiments, the material of the fifth side rod 741M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

In some embodiments, the outer diameter of the fifth side rod 741M may be in the range of 4 mm-12 mm, and the wall thickness of the fifth side rod 741M may be in the range of 0.4 mm-1 mm, so that the outer diameter is smaller while satisfying the support strength, and the second limiting member 702M is thinner, facilitating the miniaturized design of the storage mechanism 700M.

In some embodiments, the outer diameter of the fifth side rod 741M may be any value in the range of 4 mm-12 mm, for example, 4 mm, 5 mm, 6 mm, 7 mm, 8 mm, 9 mm, 10 mm, 11 mm, and 12 mm. The wall thickness of the fifth side rod 741M may be any value in the range of 0.4 mm-1 mm, for example, 0.4 mm, 0.5 mm, 0.6 mm, 0.7 mm, 0.8 mm, 0.9 mm, and 1 mm.

In some embodiments, the material of the sixth side rod 742M may be carbon structural steel, which has good support performance and is easy to mold, facilitating the preparation of the sixth side rod 742M.

In some other embodiments, the material of the sixth side rod 742M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material. It may be noted that the materials of different sixth side rods 742M may be the same or different.

In some embodiments, the outer diameter of the sixth side rod 742M may be in the range of 2 mm-10 mm, and the wall thickness of the sixth side rod 742M may be in the range of 0.4 mm-1 mm, so that the outer diameter is smaller while satisfying the support strength, and the second limiting member 702M is thinner, facilitating the miniaturized design of the storage mechanism 700M.

In some embodiments, the outer diameter of the sixth side rod 742M may be any value in the range of 2 mm-10 mm, for example, 2 mm, 3 mm, 4 mm, 5 mm, 6 mm, 7 mm, 8 mm, 9 mm, and 10 mm. The wall thickness of the sixth side rod 742M may be any value in the range of 0.4 mm-1 mm, for example, 0.4 mm, 0.5 mm, 0.6 mm, 0.7 mm, 0.8 mm, 0.9 mm, and 1 mm.

Referring to FIG. 68, in some embodiments, some sixth side rods 742M and the fifth side rod 741M may be arranged crosswise to reduce the size of a single hollowed-out part on the second limiting member 702M, which is expected to reduce the risk of items in the storage mechanism 700M falling out through the hollowed-out parts on the second limiting member 702M.

In some embodiments, the ratio of the total area of the hollowed-out parts on the fourth limiting member 704M to the total area of the first limiting member 701M may be in the range of 0.5-0.95, which has a higher hollowed-out area while meeting the shielding requirements.

In some embodiments, the ratio of the total area of the hollowed-out parts on the fourth limiting member 704M to the total area of the first limiting member 701M may be any value in the range of 0.5-0.95, for example, 0.5, 0.58, 0.66, 0.74, 0.82, 0.90, and 0.95.

Referring to FIG. 68, in some embodiments, the side rods on the fourth limiting member 704M may be tubular. While fulfilling the function of side support and shielding, it has a small weight, which facilitates the lightweight design of the storage mechanism 700M and the lightweight design of the vehicle 13M.

In some embodiments, the plurality of side rods on the fourth limiting member 704M may include a seventh side rod 743M disposed at the top and bottom ends of the fourth limiting member 704M, and an eighth side rod 744M disposed between the seventh side rods 743M. Both ends of the seventh side rod 743M may be fixedly connected to the first side rod 737M and the third side rod 739M, respectively. The outer diameter of the seventh side rod 743M is larger than the outer diameter of the eighth side rod 744M. The larger outer diameter of the seventh side rod 743M provides higher support strength, and in addition to meeting the side limiting requirements, it may also better maintain the size of the fourth limiting member 704M. The smaller outer diameter of the eighth side rod 744M results in a smaller weight while satisfying the side limiting, which facilitates the lightweight design of the storage mechanism 700M and the lightweight design of the vehicle 13M.

In addition, in some embodiments, the edge-crossbar 717M located on one side of the fourth limiting member 704M may also serve as the bottom edge of the fourth limiting member 704M to provide support for the fourth limiting member 704M.

In some embodiments, the material of the seventh side rod 743M may be carbon structural steel, which has good support performance and is easy to mold, facilitating the preparation of the seventh side rod 743M.

In some other embodiments, the material of the seventh side rod 743M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

In some embodiments, the outer diameter of the seventh side rod 743M may be in the range of 4 mm-12 mm, and the wall thickness of the seventh side rod 743M may be in the range of 0.4 mm-1 mm, so that the outer diameter is smaller while satisfying the support strength, and the fourth limiting member 704M is thinner, facilitating the miniaturized design of the storage mechanism 700M.

In some embodiments, the outer diameter of the seventh side rod 743M may be any value in the range of 4 mm-12 mm, for example, 4 mm, 5 mm, 6 mm, 7 mm, 8 mm, 9 mm, 10 mm, 11 mm, and 12 mm. The wall thickness of the seventh side rod 743M may be any value in the range of 0.4 mm-1 mm, for example, 0.4 mm, 0.5 mm, 0.6 mm, 0.7 mm, 0.8 mm, 0.9 mm, and 1 mm.

In some embodiments, the material of the eighth side rod 744M may be carbon structural steel, which has good support performance and is easy to mold, facilitating the preparation of the eighth side rod 744M.

In some other embodiments, the material of the eighth side rod 744M may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material. It may be noted that the materials of different eighth side rods 744M may be the same or different.

In some embodiments, the outer diameter of the eighth side rod 744M may be in the range of 2 mm-10 mm, and the wall thickness of the eighth side rod 744M may be in the range of 0.4 mm-1 mm, so that the outer diameter is smaller while satisfying the support strength, and the fourth limiting member 704M is thinner, facilitating the miniaturized design of the storage mechanism 700M.

In some embodiments, the outer diameter of the eighth side rod 744M may be any value in the range of 2 mm-10 mm, for example, 2 mm, 3 mm, 4 mm, 5 mm, 6 mm, 7 mm, 8 mm, 9 mm, and 10 mm. The wall thickness of the eighth side rod 744M may be any value in the range of 0.4 mm-1 mm, for example, 0.4 mm, 0.5 mm, 0.6 mm, 0.7 mm, 0.8 mm, 0.9 mm, and 1 mm.

Referring to FIG. 68, in some embodiments, some eighth side rods 744M and the seventh side rod 743M may be arranged crosswise to reduce the size of a single hollowed-out part on the fourth limiting member 704M, which is expected to reduce the risk of items in the storage mechanism 700M falling out through the hollowed-out parts on the fourth limiting member 704M.

Referring to FIG. 68, in some embodiments, the outer diameters and wall thicknesses of the first side rod 737M, the third side rod 739M, the fifth side rod 741M, and the seventh side rod 743M may be the same, so that the support strengths of the first limiting member 701M, the third limiting member 703M, the second limiting member 702M, and the fourth limiting member 704M of the storage mechanism 700M may be consistent, and an aesthetic effect is expected to be achieved. In some embodiments, the outer diameters and wall thicknesses of the second side rod 738M, the fourth side rod 740M, the sixth side rod 742M, and the eighth side rod 744M may be the same, so that the support strengths of the first limiting member 701M, the third limiting member 703M, the second limiting member 702M, and the fourth limiting member 704M of the storage mechanism 700M may be consistent, and an aesthetic effect is expected to be achieved.

Referring to FIG. 68, in some embodiments, by providing the storage mechanism 700M with a specific composition, for example, including a plurality of limiting members and a plurality of side rods, and having specific dimensions, for example, outer diameter and wall thickness, it is expected that when the vehicle 13M is traveling at a safe driving speed (for example, 20 km/h-50 km/h) and carrying a load not exceeding 40 kg, the storage mechanism 700M remains approximately stable and does not affect the handling of the vehicle 13M. It may also be understood that the storage mechanism 700M is expected to have vibration resistance and sufficient strength under normal use. For example, in urban commuting scenarios, the vehicle 13M often needs to travel on various road surfaces such as sidewalks and non-motorized vehicle lanes, facing common road conditions such as pavement tile joints and slight depressions. At this time, the storage mechanism 700M may still maintain a stable form under frequent vibration and is not easily deformed, which is expected to improve the protective effect on the items in the storage mechanism 700M. If a pet is carried in the storage mechanism 700M, the stable structure may reduce the possibility of the pet being frightened or injured due to shaking.

Referring to FIG. 68, in some embodiments, the volume of the storage mechanism 700M may be in the range of 15 L-30 L. A volume greater than or equal to 15 L is beneficial for providing users with more loading space and more flexible loading, for example, when the pet is large. A volume less than or equal to 30 L reduces space occupation and contributes to the miniaturized design of the vehicle.

In some embodiments, the volume of the storage mechanism 700M may be any value in the range of 15 L-30 L, for example, 15 L, 18 L, 21 L, 24 L, 27 L, and 30 L.

FIG. 69 is a schematic installation view of the storage mechanism 700M.

Referring to FIG. 69, in some embodiments, the volume of the storage mechanism 700M may be larger than the volume of the rear basket 900M, for example, 1-5 times larger. In this way, it is expected to encourage users to choose to place large-capacity or heavier items in the storage mechanism 700M, and small-capacity or lighter items in the rear basket 900M. This weight distribution may also improve the driving stability of the vehicle 13M and make it convenient for users to pick up and place items.

Referring to FIG. 69, in some embodiments, the height of the storage mechanism 700M may be lower than the height of the frame 100M, resulting in a lower center of gravity, which is expected to improve the stability of the vehicle 13M.

Referring to FIG. 69, in some embodiments, along the third direction 03, the difference between the minimum height $H_{M15}$ min of the seat 301M and the height $H_{M7}$ of the storage mechanism 700M may be in the range of 80 mm-200 mm. It is expected to reduce the discomfort for the user while riding, while having a large loading space.

In some embodiments, the difference between $H_{M15}$ min and $H_{M7}$ may be any value in the range of 80 mm-200 mm, for example, 80 mm, 88 mm, 96 mm, 104 mm, 112 mm, 120 mm, 128 mm, 136 mm, 144 mm, 152 mm, 160 mm, 168 mm, 176 mm, 184 mm, 192 mm, and 200 mm.

Referring to FIGS. 68 and 69, in some embodiments, the ratio of the outer diameter of the bracket 135M to the outer diameter of the sixth side rod 742M is $K_{M6}$, and $K_{M6}$ may be in the range of 5-6.5. $K_{M6} \geq 5$ allows the sixth side rod 742M to have a suitable outer diameter, which is expected to reduce the weight of the sixth side rod 742M and contribute to the lightweight design of the storage mechanism 700Q. In addition, the appearance of the sixth side rod 742M and the bracket 135Q has a better visual effect.

$K_{M6} \leq 6.5$ allows the sixth side rod 742M to have a suitable outer diameter to have the structural strength that matches the loading requirements. In addition, the appearance of the sixth side rod 742M and the bracket 135Q has a better look and feel.

In some embodiments, $K_{M6}$ may be any value in the range of 5-6.5, for example, 5, 5.1, 5.2, 5.3, 5.4, 5.5, 5.6, 5.7, 5.8, 5.9, 6, 6.1, 6.2, 6.3, 6.4, and 6.5.

Referring to FIGS. 68 and 69, in some embodiments, the ratio of the outer diameter of the bracket 135M to the outer diameter of the fifth side rod 741M is $K_{M7}$, and $K_{M7}$ may be in the range of 4-4.8. $K_{M7} \geq 4$ allows the fifth side rod 741M to have a suitable outer diameter, which is expected to reduce the weight of the fifth side rod 741M and contribute to the lightweight design of the storage mechanism 700Q. In addition, the appearance of the fifth side rod 741M and the bracket 135Q has a better visual effect. $K_{M7} \leq 4.8$ allows the fifth side rod 741M to have a suitable outer diameter to have the structural strength that matches the loading requirements. In addition, the appearance of the fifth side rod 741M and the bracket 135Q has a better look and feel.

In some embodiments, $K_{M7}$ may be any value in the range of 4-4.8, for example, 4, 4.1, 4.2, 4.3, 4.4, 4.5, 4.6, 4.7, and 4.8.

In some other embodiments, along the third direction, the heights of the second limiting member and the fourth limiting member of the storage mechanism are adjustable, so that when the height requirement for the storage mechanism is small, the heights of the second limiting member and the fourth limiting member may be reduced, which is expected to reduce the impact of the storage mechanism on user comfort. In addition, by adjusting and reducing the heights of the second limiting member and the fourth limiting member, the space occupied by the storage mechanism may be reduced, which is convenient for carrying, transporting and storing the storage mechanism. In addition, reducing the heights of the second limiting member and the fourth limiting member is expected to lower the center of gravity of the storage mechanism, so as to further lower the center of gravity of the vehicle, improve the stability of the vehicle, and improve riding safety.

In some other embodiments, along the third direction, the heights of the first limiting member and the third limiting member of the storage mechanism are adjustable, so that when the height requirement for the storage mechanism is small, the heights of the first limiting member and the third limiting member may be reduced, which is expected to reduce the resistance caused by the storage mechanism during riding and reduce the energy consumption of the vehicle. In addition, by adjusting and reducing the heights of the first limiting member and the third limiting member, the space occupied by the storage mechanism may be reduced, which is convenient for carrying, transporting and storing the storage mechanism. In addition, reducing the heights of the first limiting member and the third limiting member is expected to lower the center of gravity of the storage mechanism, so as to further lower the center of gravity of the vehicle, improve the stability of the vehicle, and improve riding safety.

In some other embodiments, along the third direction, the heights of the first limiting member, the third limiting member, the second limiting member, and the fourth limiting member of the storage mechanism are all adjustable.

Further, in some other embodiments, the height adjustment of the first limiting member, the third limiting member, the second limiting member, and the fourth limiting member of the storage mechanism may be performed together, which is convenient for operation. In other words, adjusting the height of one of the first limiting member, the third limiting member, the second limiting member, and the fourth limiting member is expected to simultaneously drive the heights of the other three to be adjusted synchronously. For example, if the height of the first limiting member is adjusted to be lower, the third limiting member, the second limiting member, and the fourth limiting member are also synchronously lowered under the drive of the first limiting member.

In some embodiments, along the third direction, the first limiting member is retractable along the third direction to realize the adjustable height of the first limiting member. In some embodiments, the first limiting member is foldable to realize the adjustable height of the first limiting member.

In some embodiments, along the third direction, the third limiting member is retractable along the third direction to realize the adjustable height of the third limiting member. In some embodiments, the third limiting member is foldable to realize the adjustable height of the third limiting member.

In some embodiments, along the third direction, the second limiting member is retractable along the third direction to realize the adjustable height of the second limiting member. In some embodiments, the second limiting member is foldable to realize the adjustable height of the second limiting member.

In some embodiments, along the third direction, the fourth limiting member is retractable along the third direction to realize the adjustable height of the fourth limiting member. In some embodiments, the fourth limiting member is foldable to realize the adjustable height of the fourth limiting member.

In some other embodiments, the length of the storage mechanism along the first direction is adjustable, so that when the length requirement for the storage mechanism along the first direction is small, the length of the storage mechanism along the first direction is adjusted to be smaller, which reduces the occupied space of the storage mechanism and is expected to ensure riding comfort. In addition, reducing the length of the storage mechanism along the first direction also facilitates the carrying, transportation and storage of the storage mechanism.

In some other embodiments, the width of the storage mechanism along the second direction is adjustable, so that when the length requirement for the storage mechanism along the second direction is small, the length of the storage mechanism along the second direction is adjusted to be smaller, which reduces the occupied space of the storage mechanism and is expected to ensure riding comfort. In addition, reducing the length of the storage mechanism along the second direction also facilitates the carrying, transportation and storage of the storage mechanism.

Figure 70A:
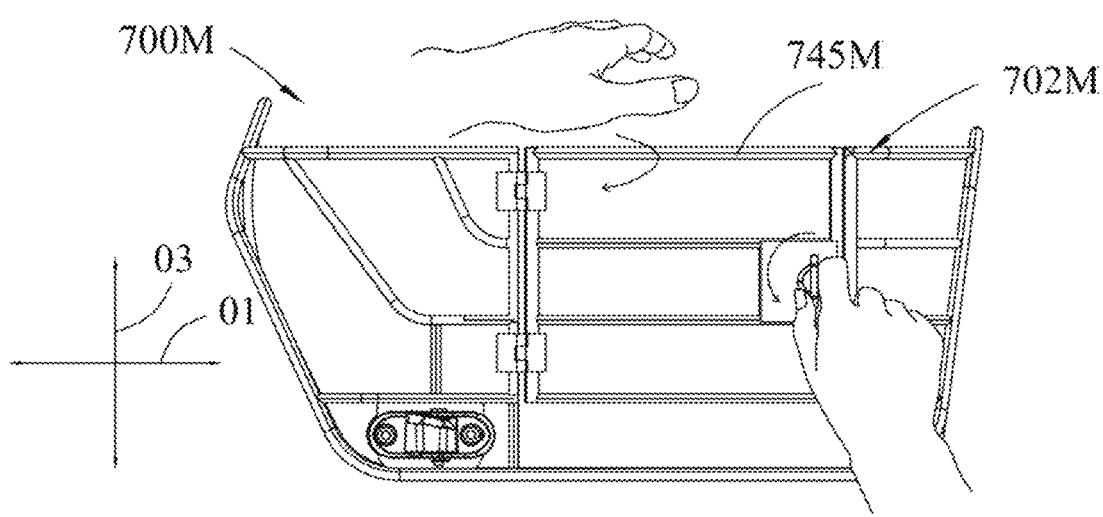
FIGS. 70A-70B are a set of schematic views illustrating the use of the side door.
Figure 70B:
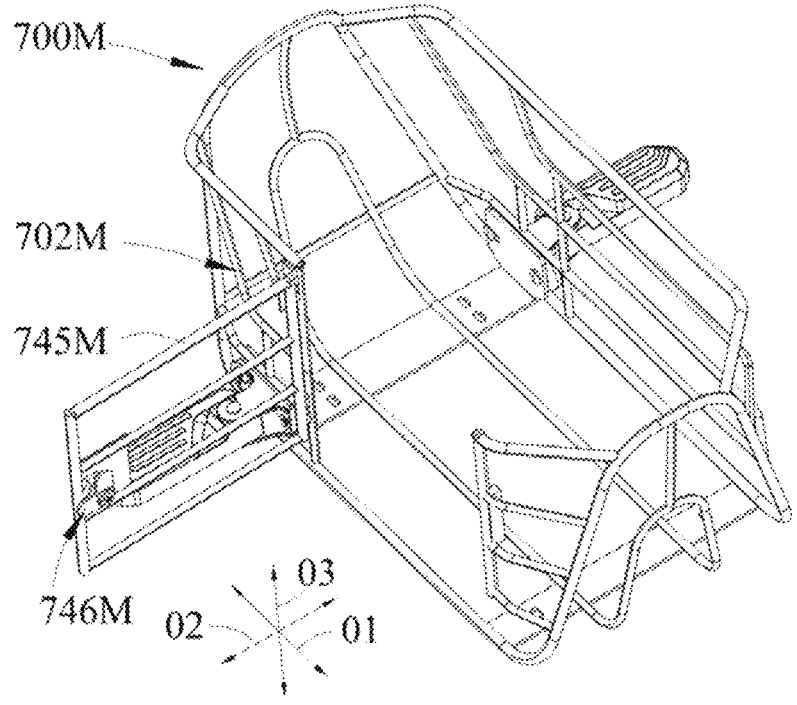

FIGS. 70A-70B are a set of schematic views of use of the side door 745M.

Referring to FIG. 70A, in some embodiments, the second limiting member 702M may be provided with a side door 745M. When it is necessary to place an item from a low place into the storage mechanism 700M, if the item is placed in the storage mechanism 700M through the position of the side door 745M, it is expected to reduce the height to which the item is lifted, which may save labor. When it is necessary to place an animal in the storage mechanism 700M, opening the side door 745M may facilitate some animals to enter the storage mechanism 700M by themselves, reducing the burden on the user.

Referring to FIG. 70A, in some embodiments, the side door 745M is rotatably provided on the second limiting member 702M. The side door 745M rotates to switch between an open state and a closed state. Referring to FIG. 69, the side door 745M may be in the closed state; referring to FIG. 70B, the side door 745M may be in the open state.

Referring to FIG. 70B, in some embodiments, along the third direction 03, the side door 745M may extend to the top end of the second limiting member 702M. After the side door 745M is opened, the top end of the notch corresponding to the side door 745M on the second limiting member 702M may be unobstructed, which facilitates placing items in the storage mechanism 700M, and is also expected to reduce the risk of animals being bumped when entering the storage mechanism 700M through the position of the side door 745M.

Referring to FIG. 70B, in some embodiments, along the third direction 03, the side door 745M may extend to the bottom end of the second limiting member 702M. After the side door 745M is opened, the height of the bottom end of the notch corresponding to the side door 745M on the second limiting member 702M is lower. When an item from a low place is placed into the storage mechanism 700M through this position, it is expected to further reduce the height to which the item is lifted, saving labor.

Referring to FIG. 70B, in some embodiments, the front end of the side door 745M is rotatably provided on the second limiting member 702M. It may be understood that, in some other embodiments, the rear end, bottom end or top end of the side door may also be rotatably provided on the second limiting member.

Referring to FIG. 70A, in some embodiments, the opening direction of the side door 745M may be outward. In other words, when the side door 745M is in the open state, the side door 745M may be located on the outer side of the storage mechanism 700M, reducing the risk of collision with items or animals in the storage mechanism 700M when the side door 745M is opened or closed; in addition, it also reduces the interference of items or animals in the storage mechanism 700M with the rotation of the side door 745M.

In some other embodiments, the side door may also be a retractable structure. The side door retracts to open the side door. This avoids the side door occupying space outside the storage mechanism when it is opened, and reduces the risk of people, items or animals around the storage mechanism being hit by the side door. In some embodiments, the end of the retractable side door that is fixed to the second limiting member may be the front end, rear end, top end or bottom end of the side door.

In some other embodiments, the side door may also be a roller shutter door structure or a sliding door structure, etc., as long as the opening or closing of the side door may be realized.

Referring to FIG. 70B, in some embodiments, the storage mechanism 700M may be provided with a door lock 746M, so that after the side door 745M is closed, the side door 745M may be kept in the closed state. Of course, it may be understood that when the door lock 746M is opened, the side door 745M may be moved from the closed state to the open state.

FIGS. 70C-70F are a set of schematic structural views of the door lock 746M.

Figure 70C:
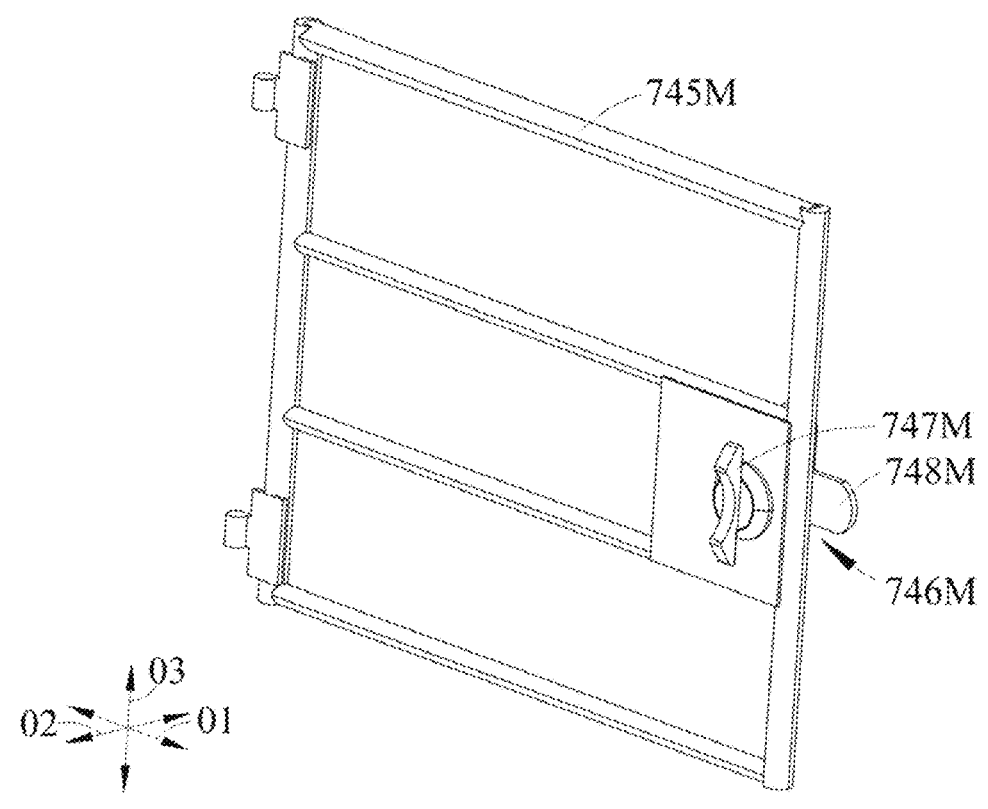
FIGS. 70C-70F are a set of schematic structural views of the door lock.
Figure 70D:
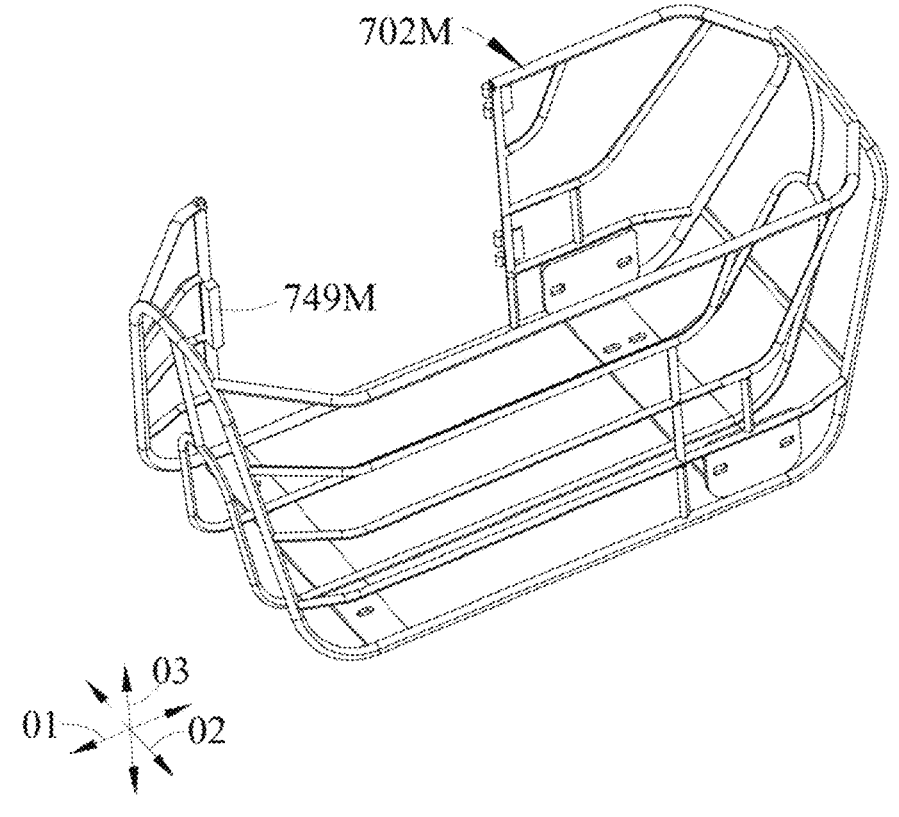
Figure 70E:
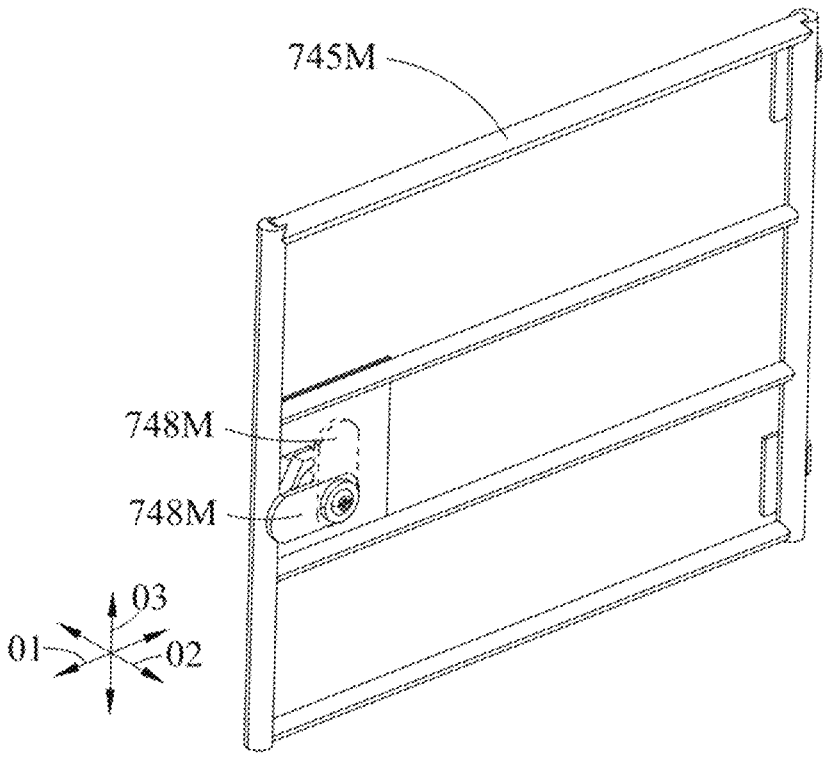
Figure 70F:
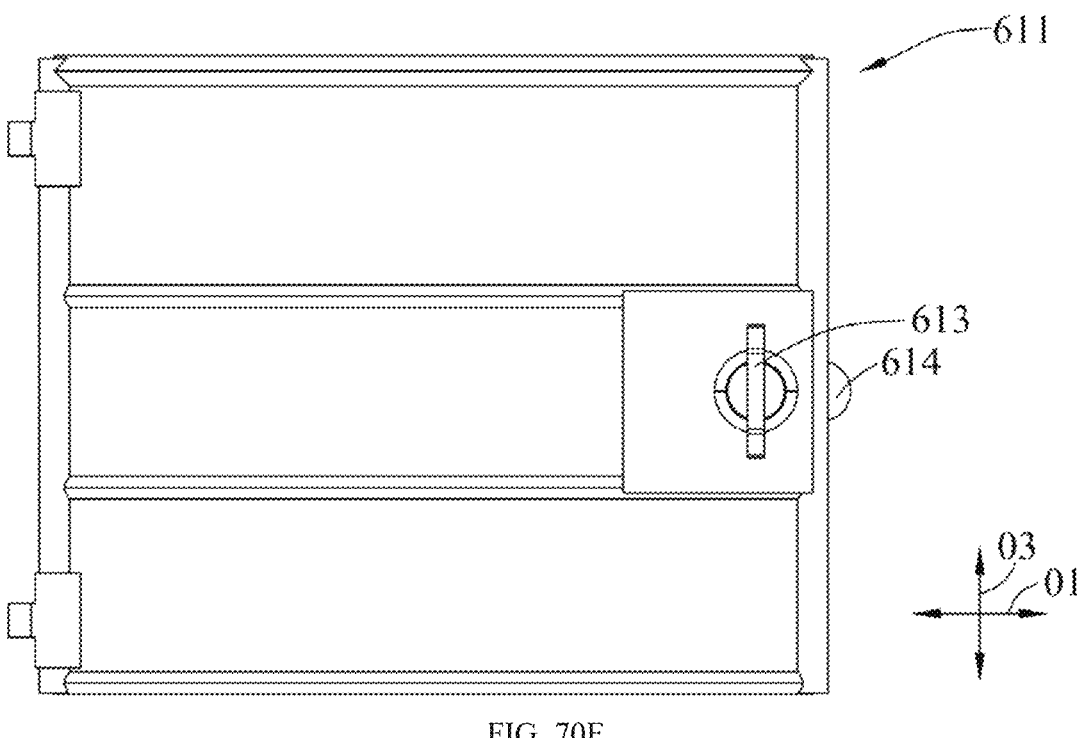

Referring to FIGS. 70C and 70D, in some embodiments, the door lock 746M may include an operation portion 747M, a latch portion 748M, and a first limiting portion 749M.

The operation portion 747M and the latch portion 748M are movably provided on the side door 745M. The operation portion 747M may rotate together with the latch portion 748M, so that the movement of the latch portion 748M may be driven by the movement of the operation portion 747M.

The first limiting portion 749M may be provided on the second limiting member 702M. The latch portion 748M is movable to switch between a first state and a second state. When the side door 745M may be closed and the latch portion 748M is in the first state, the first limiting portion 749M may be located on the outer side of the latch portion 748M to limit the position of the latch portion 748M in the second direction 02, so that the side door 745M may be kept in the closed state. When the latch portion 748M may be in the second state, the latch portion 748M is set to avoid the first limiting portion 749M, so that the side door 745M may be rotated open. In some embodiments, referring to FIG. 70E, the solid line and the dashed line represent two states of the latch portion 748M, wherein the solid line represents the latch portion 748M in the first state, and the dashed line represents the latch portion 748M in the second state.

In some other embodiments, the door lock may include a second limiting portion provided on the second limiting member, so that after the latch portion moves to the first state, the latch portion may be restricted from continuing to move, so that the latch portion may be kept in the first state and the side door remains in the closed state. In some embodiments, the second limiting portion may be provided on the side door, or may be provided on the second limiting member.

Figure 71A:
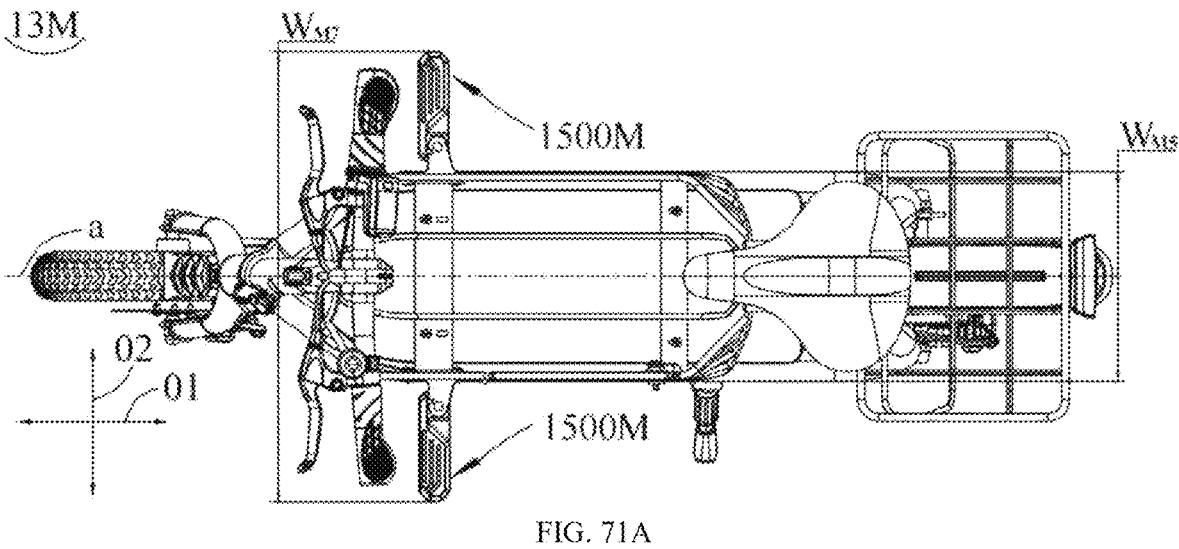
FIGS. 71A-71B are a set of schematic parameter views of the pedal assembly.
Figure 71B:
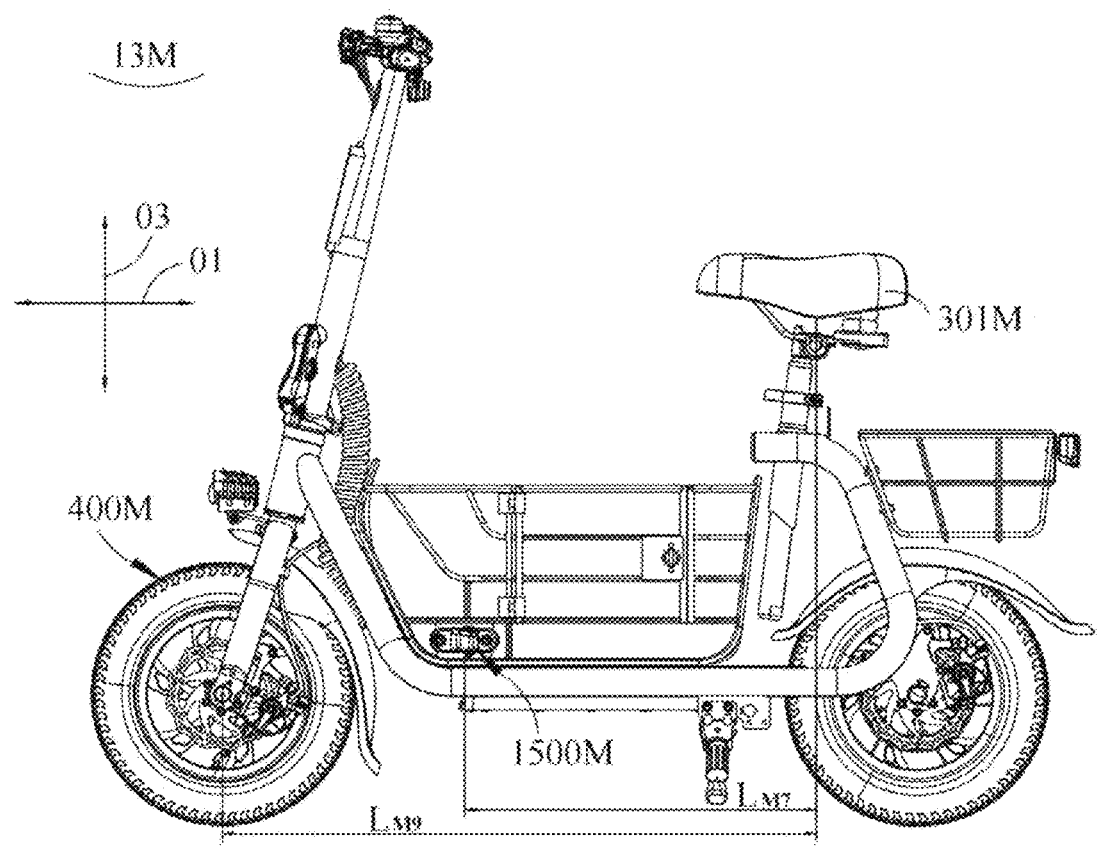

FIGS. 71A-71B are a set of schematic views of parameters of the pedal assembly 1500M.

Referring to FIG. 71A, in some embodiments, the vehicle 13M may include two pedal assemblies 1500M respectively disposed on two sides of the vehicle 13M along the second direction 02. The pedal assembly 1500M may be stepped on by a user, which is expected to allow the user to maintain a stable sitting posture during riding, improving the comfort and safety during riding.

Referring to FIG. 71A, in some embodiments, the two pedal assemblies 1500M are symmetrically disposed on the two sides of the vehicle 13M along the second direction 02, which improves the aesthetic effect and is expected to improve the user's stepping comfort and riding safety. In other words, the two pedal assemblies 1500M may be symmetrically disposed relative to the symmetrical plane a.

Referring to FIG. 71A, along the second direction 02, the width of the frame 100M is $W_{M5}$, the width of the two pedal assemblies 1500M in the use state is $W_{M7}$, the ratio of $W_{M7}$ to $W_{M5}$ is $K_{M8}$, and $K_{M8}$ may be in the range of 1.8-2.5. $K_{M8} \geq 1.8$ allows the frame 100M to have a suitable width, which is expected to realize the miniaturized and lightweight design of the frame 100M. In addition, the degree of outward extension of the pedal assembly 1500M is more appropriate, which is expected to provide a good stepping experience for the user. $K_{M8} \leq 2.5$ allows the frame 100M to have a suitable width, which is expected to provide sufficient stepping or loading space. In addition, it allows the degree of outward extension of the pedal assembly 1500M from the frame 100M to be more appropriate, and the combination of the pedal assembly 1500M and the frame 100M is more aesthetic. In some embodiments, $K_{M8}$ may be any value in the range of 1.8-2.5, such as 1.8, 1.9, 2, 2.1, 2.2, 2.3, 2.4, 2.5.

Referring to FIG. 71B, in some embodiments, along the first direction 01, the distance $L_{M7}$ between the pedal assembly 1500M and the seat 301M may be in the range of 210 mm-310 mm. $L_{M7} \geq 210$ mm allows a suitable distance between the pedal assembly 1500M and the seat 301M, which is expected to allow the user to comfortably extend their feet forward, improving riding safety. $L_{M7} \leq 310$ mm allows a suitable distance between the pedal assembly 1500M and the seat 301M, which reduces the risk of the user's feet contacting the front fork or the front wheel when controlling the steering due to forward extension, and in addition, it may also help to improve the user's stepping comfort.

In some embodiments, $L_{M7}$ may be any value in the range of 210 mm-310 mm, for example, 210 mm, 220 mm, 230 mm, 240 mm, 250 mm, 260 mm, 270 mm, 280 mm, 290 mm, 300 mm, and 310 mm.

Referring to FIG. 71B, in some embodiments, along the first direction 01, the distance between the seat 301M and the front wheel 400M is $L_{M9}$, the ratio of $L_{M9}$ to $L_{M7}$ is $K_{M9}$, and $K_{M9}$ may be in the range of 0.5-0.65. $K_{M9} \geq 0.5$ allows a suitable distance between the pedal assembly 1500M and the seat 301M, the legroom provided for the user is relatively sufficient, which reduces the possibility that the user needs to extend the legs backward due to limited space, and is expected to improve riding comfort. $K_{M9} \leq 0.65$ allows a suitable distance between the pedal assembly 1500M and the seat 301M, which reduces the possibility that the user needs to extend the legs forward significantly due to a long distance, and is expected to ensure the stability of the user's feet placed on the pedal assembly 1500M.

In some embodiments, $K_{M9}$ may be any value in the range of 0.5-0.65, for example, 0.5, 0.51, 0.52, 0.53, 0.54, 0.55, 0.56, 0.57, 0.58, 0.59, 0.6, 0.61, 0.62, 0.63, 0.64, and 0.65.

Figure 72A:
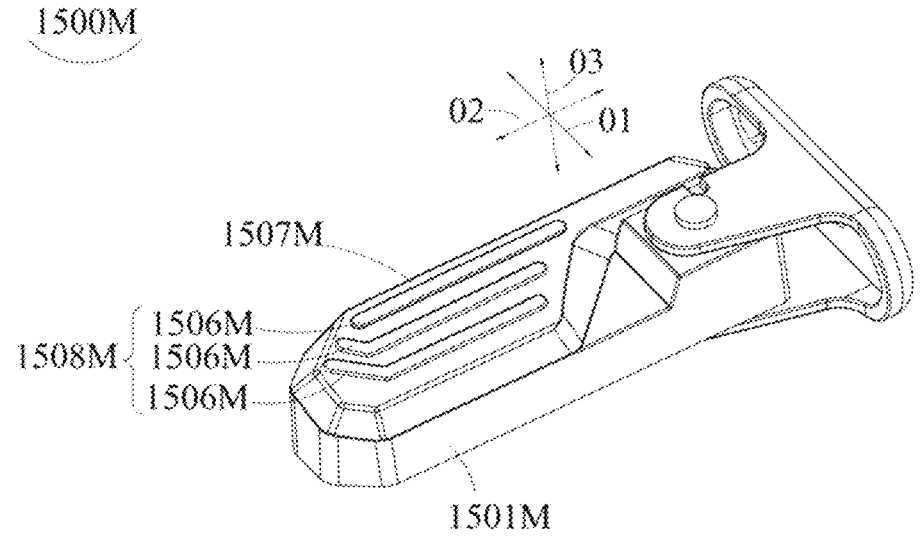
FIGS. 72A-72D are a set of schematic structural views of the pedal assembly.

FIGS. 72A-72D are a set of schematic structural views of the pedal assembly 1500M. Referring to FIG. 72A, in some embodiments, the pedal assembly 1500M may include a pedal 1501M. The pedal 1501M may have a tread surface 1507M for the user to step on. The user's foot may have surface contact with the pedal assembly 1500M, improving the user's stepping stability, which is expected to allow the user to maintain a stable sitting posture during riding, improving comfort and safety during riding.

Referring to FIG. 72A, in some embodiments, the tread surface 1507M may be provided with a second anti-slip structure 1508M to improve the user's stepping stability.

Referring to FIG. 72A, in some embodiments, the second anti-slip structure 1508M may include a plurality of anti-slip strips 1506M fixedly provided on the tread surface 1507M.

In some embodiments, the anti-slip strip 1506M may be in the shape of a long strip, which has a simple structure and may be easy to process. It may be understood that, in some other embodiments, the anti-slip strip 1506M is not limited to a long strip shape, and may also be in regular or irregular shapes such as dots, rhombuses, etc.

In some embodiments, the extension direction of the anti-slip strip 1506M is approximately along the second direction 02, to provide the user with a resistance parallel to the tread surface 1507M and perpendicular to the second direction 02, which is expected to reduce the risk of the user slipping off the tread surface 1507M in a direction perpendicular to the second direction 02, improving the stability of stepping.

Referring to FIG. 72A, in some embodiments, the number of the anti-slip strips 1506M may be three. It may be understood that, in some other embodiments, the number of the anti-slip strips 1506M is not limited to three, and may also be one, two, or more than three.

In some embodiments, the plurality of anti-slip strips 1506M may be arranged in a direction perpendicular to the second direction 02 and parallel to the tread surface 1507M. It may be understood that, in some other embodiments, the arrangement direction of the plurality of anti-slip strips 1506M is not limited to this, and may also be along other directions, for example, they may be arranged in a regular or irregular manner such as an array.

Referring to FIG. 72A, in some embodiments, the outer ends of some anti-slip strips 1506M may be inclined forward along the tread surface 1507M to provide resistance to the user's foot along the second direction 02, reducing the risk of the user's foot slipping outward along the second direction 02.

In some embodiments, the anti-slip strip 1506M may be integrally formed with the pedal 1501M. It may be understood that, in some other embodiments, the anti-slip strip 1506M and the pedal 1501M may also be separately provided, and then fixedly connected by welding, adhesion, or the like.

It may be understood that, in some other embodiments, the second anti-slip structure 1508M is not limited to this, and may also be a roughened surface, a scored surface, an anti-slip coating, or an anti-slip pad fixed on the tread surface 1507M, etc.

In some embodiments, the material of the pedal 1501M may be carbon structural steel, which has strong support strength.

In other embodiments, the material of the pedal 1501M may also be other metal materials. Other metal materials include but are not limited to stainless steel and aluminum alloy. Plastics include but are not limited to polypropylene (PP), polyethylene (PE), and ABS plastic.

Figure 72B:
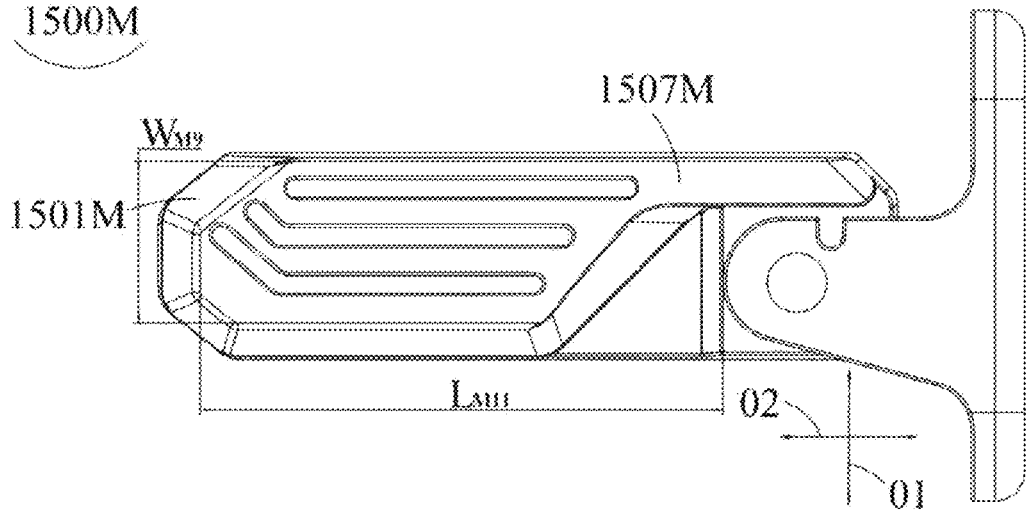

Referring to FIG. 72B, in some embodiments, the width $W_{M9}$ of the tread surface 1507M may be in the range of 15 mm-32 mm. $W_{M9} \geq 15$ mm allows the pedal 1501M to have a suitable width, so that the user has high stepping comfort. $W_{M9} \leq 32$ mm is expected to realize the miniaturized and lightweight design of the pedal 1501M. It may be noted that, in this embodiment, the width direction of the tread surface 1507M is parallel to the tread surface 1507M and perpendicular to the second direction 02.

In some embodiments, $W_{M9}$ may be any value in the range of 15 mm-32 mm, for example, 15 mm, 17 mm, 19 mm, 21 mm, 23 mm, 25 mm, 27 mm, 29 mm, and 31 mm.

Referring to FIG. 72B, in some embodiments, the length $L_{M1}$ of the tread surface 1507M may be in the range of 70 mm-110 mm. $L_{M11} \geq 70$ mm allows more of the user's foot to step on the tread surface 1507M, which is expected to meet the stepping needs of more users. $L_{M11} \leq 110$ mm makes the length of the pedal 1501M smaller, which is convenient for the miniaturized and lightweight design of the pedal 1501M, and is expected to realize the miniaturized and lightweight design of the vehicle 13M. It may be noted that, in this embodiment, the length direction of the tread surface 1507M is along the second direction 02.

In some embodiments, $L_{M1}$ may be any value in the range of 70 mm-110 mm, for example, 70 mm, 75 mm, 80 mm, 85 mm, 90 mm, 95 mm, 100 mm, 105 mm, and 110 mm.

Figure 72C:
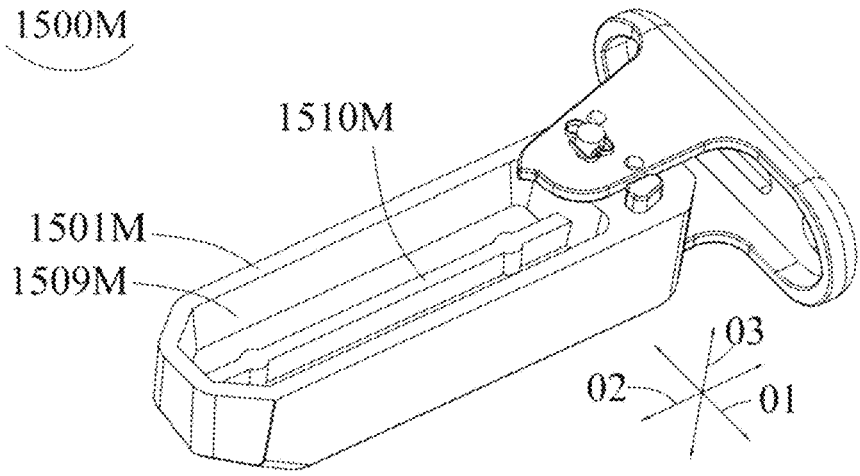

Referring to FIG. 72C, in some embodiments, the back of the pedal 1501M may be provided with a second weight-reducing groove 1509M to reduce the weight of the pedal 1501M, which is convenient for the lightweight design of the pedal 1501M and is expected to realize the lightweight design of the vehicle 13M.

Referring to FIG. 72C, in some embodiments, a first reinforcing rib 1510M may be provided in the second weight-reducing groove 1509M to strengthen the support strength of the pedal 1501M. In some embodiments, the first reinforcing rib 1510M may extend along the second direction 02 to strengthen the bending resistance of the pedal 1501M.

Referring to FIG. 72C, in some embodiments, both ends of the first reinforcing rib 1510M along the second direction 02 may be fixedly connected to the two side walls of the second weight-reducing groove 1509M along the second direction 02, respectively, to better strengthen the bending resistance of the pedal 1501M, which is expected to improve the support strength of the pedal 1501M.

Figure 72D:
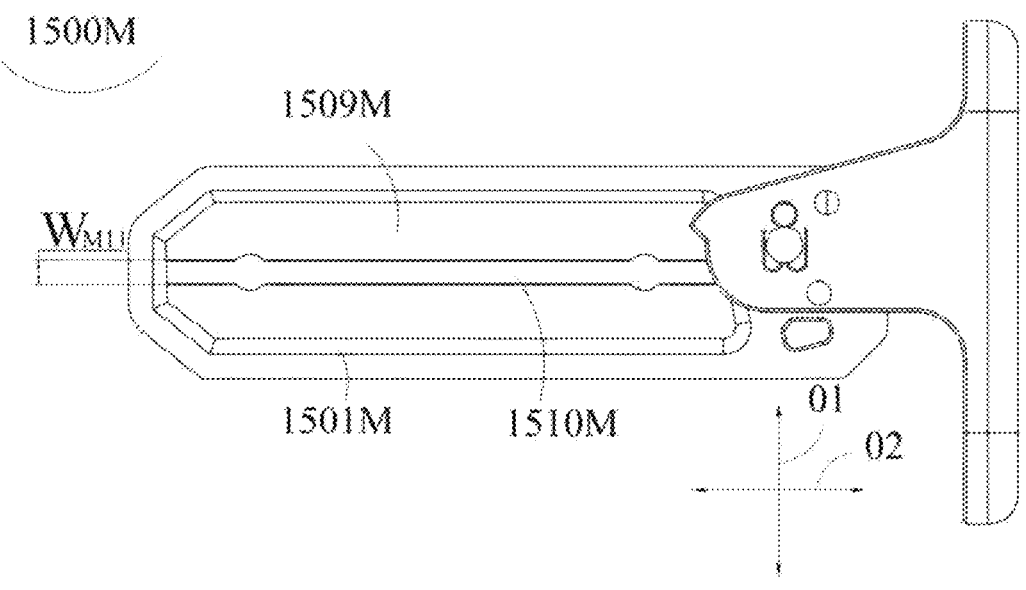

Referring to FIG. 72D, in some embodiments, the thickness $W_{M11}$ of the first reinforcing rib 1510M along the first direction 01 may be in the range of 2 mm-5 mm, so that the pedal 1501M has strong bending resistance without excessively increasing the weight of the pedal 1501M.

In some embodiments, $W_{M11}$ may be any value in the range of 2 mm-5 mm, for example, 2 mm, 2.5 mm, 3 mm, 3.5 mm, 4 mm, 4.5 mm, and 5 mm.

Referring to FIG. 72C, in some embodiments, the height of the first reinforcing rib 1510M along the third direction 03 is less than the depth of the second weight-reducing groove 1509M, so that the pedal 1501M has strong bending resistance without excessively increasing the weight of the pedal 1501M.

In some embodiments, the number of the first reinforcing ribs 1510M may be one. It may be understood that, in some other embodiments, the number of the first reinforcing ribs 1510M is not limited to one, and may also be two or more. In addition, in some other embodiments, the extension direction of the first reinforcing rib 1510M is not limited to the second direction 02, and may also be along other directions such as the first direction 01.

Referring to FIG. 72C, in some other embodiments, the number of the second weight-reducing grooves 1509M may not be limited to one, and may also be multiple. It may be understood that when the number of the second weight-reducing grooves 1509M is multiple, the sizes and shapes of the multiple second weight-reducing grooves 1509M may be the same or different; the arrangement of the multiple second weight-reducing grooves 1509M may be in regular or irregular shapes such as along a straight line or in an array.

Figure 73A:
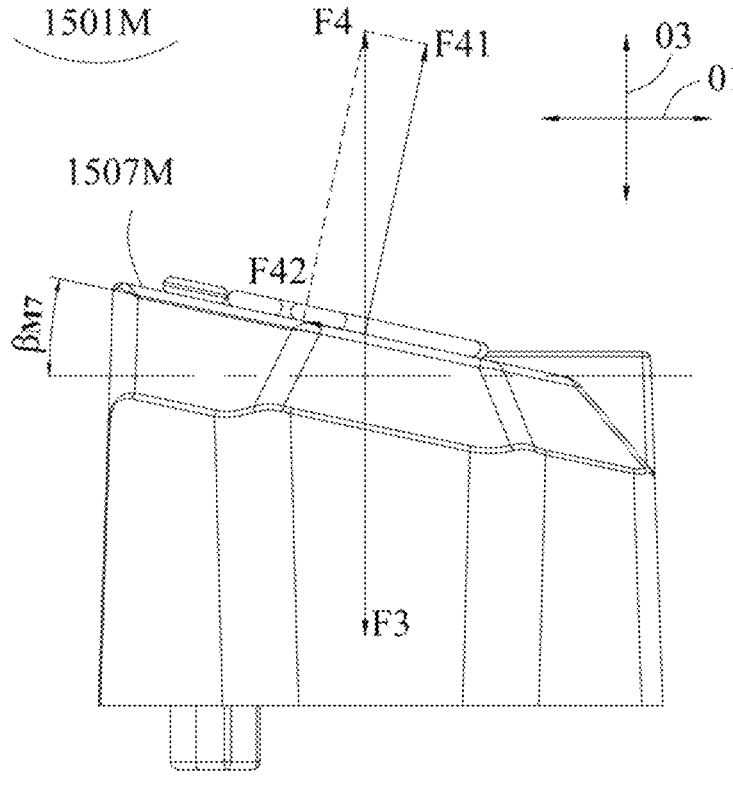
FIGS. 73A-73C are a set of schematic structural views of the tread surface.
Figure 73B:
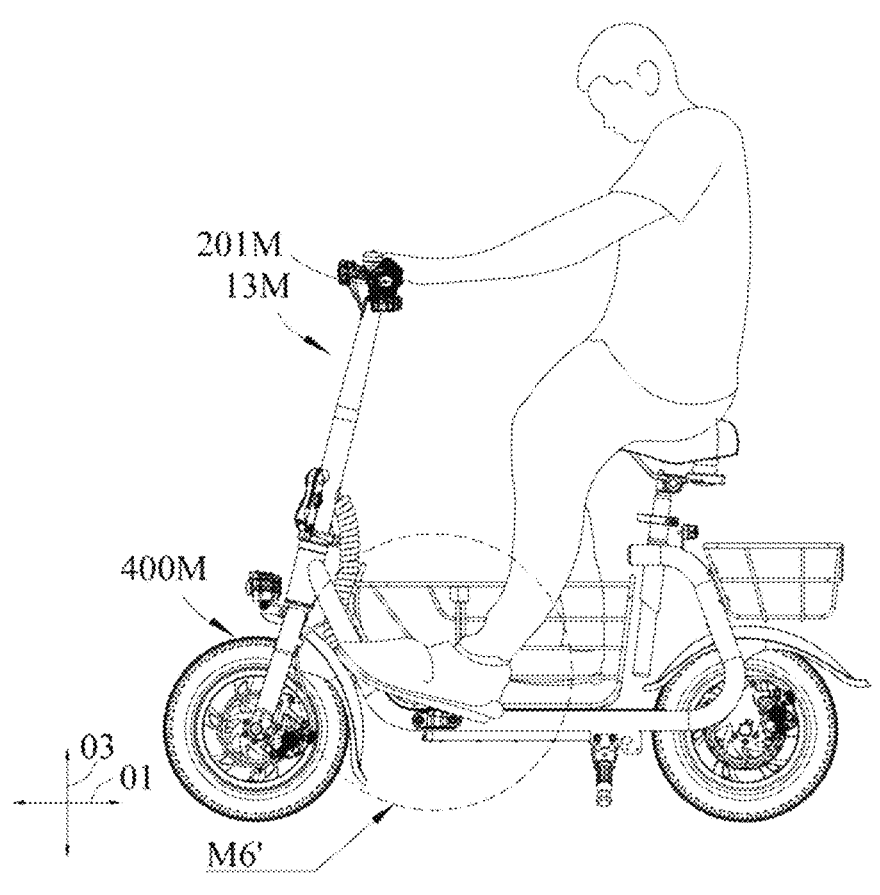
Figure 73C:
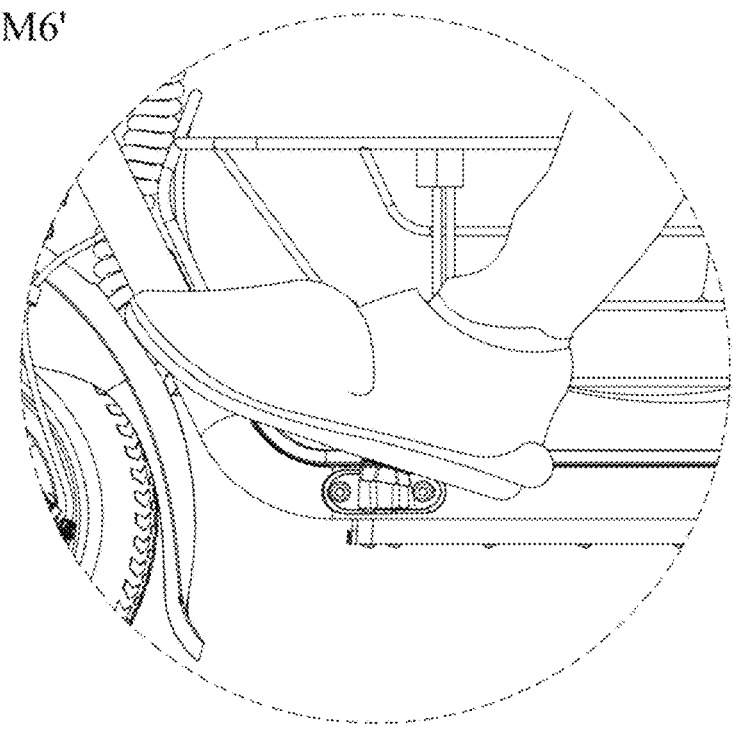

FIGS. 73A-73C are a set of schematic structural views of the tread surface 1507M. Among them, FIG. 73C is an enlarged schematic view at M6' in FIG. 73B.

Referring to FIGS. 73A-73C, in some embodiments, the tread surface 1507M may be inclined relative to the first plane. In some embodiments, the rear end of the tread surface 1507M may be inclined downward, reducing the angle between the user's foot and lower leg, improving the user's riding comfort.

In addition, in some embodiments, when the user drives the pedal 1501M to rotate until the pedal assembly 1500M is in the open state, the tread surface 1507M is inclined relative to the first plane, which is convenient for the user to apply a force pointing to the front side on the pedal 1501M, facilitating operation.

Referring to FIG. 73A, in some embodiments, the angle $\beta_{M7}$ between the tread surface 1507M and the first plane may be in the range of 8°–15°.

Let the force applied by the user's foot on the pedal 1501M be F3, and F3 is downward along the third direction 03. The corresponding force exerted by the pedal 1501M on the user's foot is F4. It may be understood that F4 and F3 are equal in magnitude and opposite in direction. According to the parallelogram rule, F4 is decomposed into a component force F41 perpendicular to the tread surface 1507M and a component force F42 parallel to the tread surface 1507M. It may be understood that F41 is the support force provided by the pedal 1501M to the user. F42 is the friction force provided by the pedal 1501M to the user. It may be understood that to reduce the situation of the foot slipping from the tread surface 1507M, it needs to satisfy $F42 \leq F41*\mu$, where $\mu$ is the static friction coefficient of the tread surface 1507M. In some embodiments, according to the parallelogram rule, $F41=F4*\cos \beta_{M7}$; $F42=F4*\sin \beta_{M7}$. Since $F42\leq F41*\mu$, then $\mu\geq\tan \beta_{M7}$. It may be understood that $B_{M7}$ is an acute angle.

When F4 is the same, the larger the $\beta_{M7}$, the smaller the F41, and the larger the F42. When F4 is the same, the larger the $\beta_{M7}$, the smaller the F41, the smaller the torque generated by the pressure of the foot, and the lower the requirement for the support strength of the pedal 1501M. In addition, $\mu\geq\tan \beta M7$. Therefore, the larger the $\beta_{M7}$, the higher the static friction coefficient of the tread surface 1507M needs to be. When F4 is the same, the smaller the $\beta_{M7}$, the larger the F41, and the smaller the F42. When F4 is the same, the smaller the $\beta_{M7}$, the larger the F41, and the higher the requirement for the support strength of the pedal 1501M. In addition, $\mu\geq\tan \beta_{M7}$, therefore, the smaller the $\beta_{M7}$, the lower the static friction coefficient of the tread surface 1507M needs to be.

It may be understood that the smaller the static friction coefficient of the tread surface 1507M, the lower the roughness or shape complexity of the tread surface 1507M, which is convenient for processing. In addition, the smaller the static friction coefficient of the tread surface 1507M, the more choices there are for the material of the pedal 1501M, that is, the more types of applicable materials, and the more choices there are.

Similarly, the smaller the support strength of the pedal 1501M, the lower the structural requirements for the pedal 1501M, and the more choices there are for the material of the pedal 1501M, that is, the more types of applicable materials, and the more choices there are.

Referring to FIG. 73A, $\beta_{M7}$ may be in the range of 8°–15° to achieve a balance between the demand for the support strength of the pedal 1501M and the demand for the static friction coefficient of the tread surface 1507M, avoiding excessive requirements for the support strength of the pedal 1501M and also avoiding excessive requirements for the static friction coefficient of the tread surface 1507M, increasing the diversity of material choices for the pedal 1501M, reducing the complexity of the shape of the pedal 1501M, and reducing the processing difficulty of the pedal 1501M.

Referring to FIGS. 73A-73C, in addition, from the user's perspective, if $\beta_{M7}$ is in the range of 8°–15°, the angle between the foot and the lower leg is reduced, the additional force the user needs to apply is reduced, the tension in the ankle and knee during riding is relieved, riding comfort is improved, and the fatigue caused by long-term riding may also be reduced. In other words, the user does not need to apply a large additional force to give a large pressure to the pedal 1501M.

From an ergonomic point of view, when the human body stands naturally, the feet usually tilt forward, and when the tilt angle is in the range of 5°-15°, it has higher comfort. When riding, the user's lower leg tilts backward. If the inclination angle $\beta_{M7}$ of the tread surface 1507M is in the range of 8°-15°, the feet may also be tilted in approximately the same direction, so that the user's feet are kept in a comfortable position, reducing the pressure on the user's ankles and knees, and improving riding comfort.

In addition, referring to FIG. 73B, when riding, there are usually situations such as acceleration, deceleration, uphill, and downhill. During acceleration, deceleration, uphill, and downhill, the operation is relatively complex, and the mental concentration needs to be higher. For example, during acceleration, the user needs to increase the grip on the handlebar 201M to keep the handlebar 201M stable, thereby maintaining riding stability; and the user also needs to allocate more attention to observe the state ahead to anticipate road conditions and obstacles in advance. For another example, during deceleration, the user also needs to increase the grip on the handlebar 201M to keep the handlebar 201M stable, thereby maintaining riding stability; and needs to control the magnitude of acceleration by controlling the braking force, so that the vehicle 13M decelerates stably with a suitable acceleration, and also needs to control the cooperation of the front and rear brakes to avoid the front wheel 400M from locking up. For another example, when going uphill, the user needs to increase the grip on the handlebar 201M to reduce the risk of the vehicle 13M swaying from side to side along the second direction 02, so that the vehicle 13M may better move forward along the predetermined route and maintain riding stability; and needs to control the magnitude of acceleration according to the slope, so that the vehicle 13M moves forward more smoothly. For another example, when going downhill, the user needs to increase the grip on the handlebar 201M to reduce the risk of the vehicle 13M swaying from side to side along the second direction 02, so that the vehicle 13M may move more stably along the predetermined route; and during the downhill process, the vehicle 13M will accelerate under the action of gravity, and the user needs to control the magnitude of acceleration by controlling the braking force, so that the vehicle 13M stably accelerates, moves at a uniform speed, or even decelerates with a suitable acceleration, and also needs to control the cooperation of the front and rear brakes to avoid the front wheel 400M from locking up.

It may be understood that, in situations such as acceleration, deceleration, uphill, and downhill that require more complex operations and higher mental concentration, referring to FIG. 73A, if the inclination angle $\beta_{M7}$ of the tread surface 1507M is in the range of 8°-15°, the user needs to apply less or even no additional stepping force to maintain body stability, relieving the tension in the ankles and knees during riding, thereby reducing the complexity of operation, and not excessively increasing the degree of mental concentration, improving riding comfort, and also reducing the fatigue brought to the user by long-term riding, so that the vehicle 13M may be suitable for different road conditions and meet the riding needs of more users.

In addition, if the inclination angle $\beta_{M7}$ of the tread surface 1507M is in the range of 8°-15°, the user needs to apply less or even no additional stepping force to maintain body stability, which avoids the influence of the user's force application position on the foot being uncertain due to non-standard stepping position or force application action during riding, thereby reducing the phenomenon of foot or joint fatigue caused by uncertain force application position.

In addition, if the inclination angle $\beta_{M7}$ of the tread surface 1507M is in the range of 8°-15°, it avoids causing the angle between the user's foot and lower leg to be too small, thereby reducing the muscle burden on the ankle and lower leg, improving riding comfort, reducing the fatigue brought to the user by long-term riding, and reducing the resulting muscle soreness and muscle damage. In some embodiments, $\beta_{M7}$ may be any value in the range of 8°-15°, such as 8°, 9°, 10°, 11°, 12°, 13°, 14°, 15°.

Figure 74A:
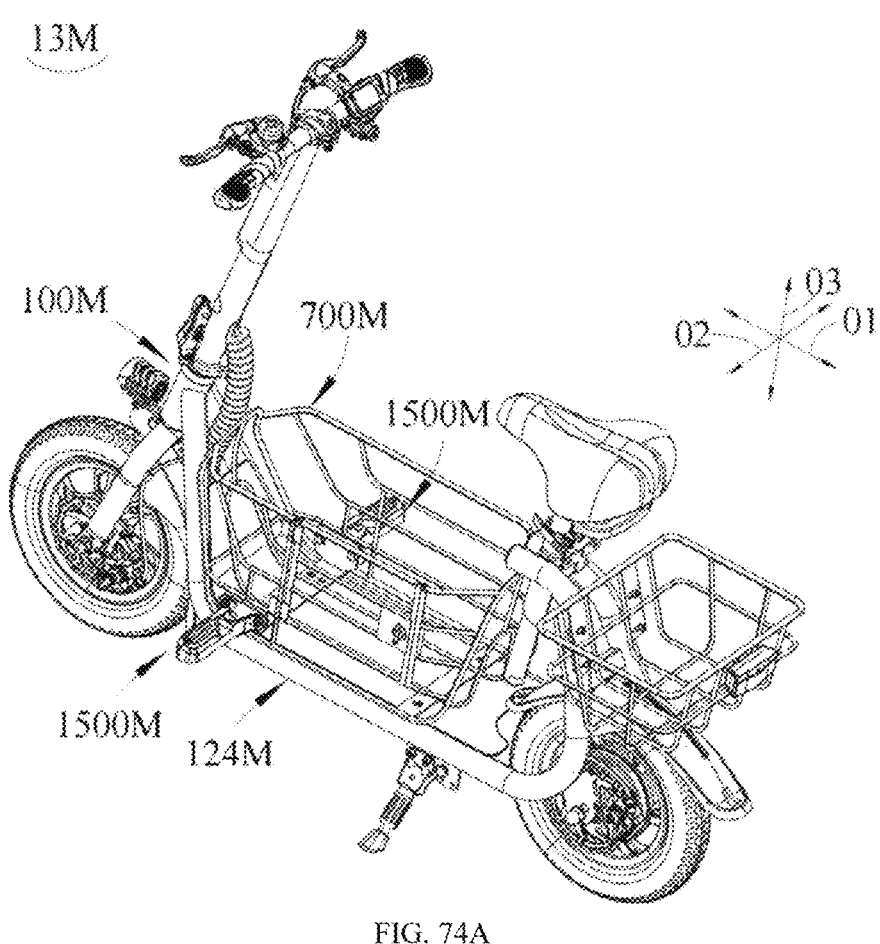
FIGS. 74A-74F are a set of schematic structural views illustrating the installation of the pedal assembly and the storage mechanism.
Figure 74B:
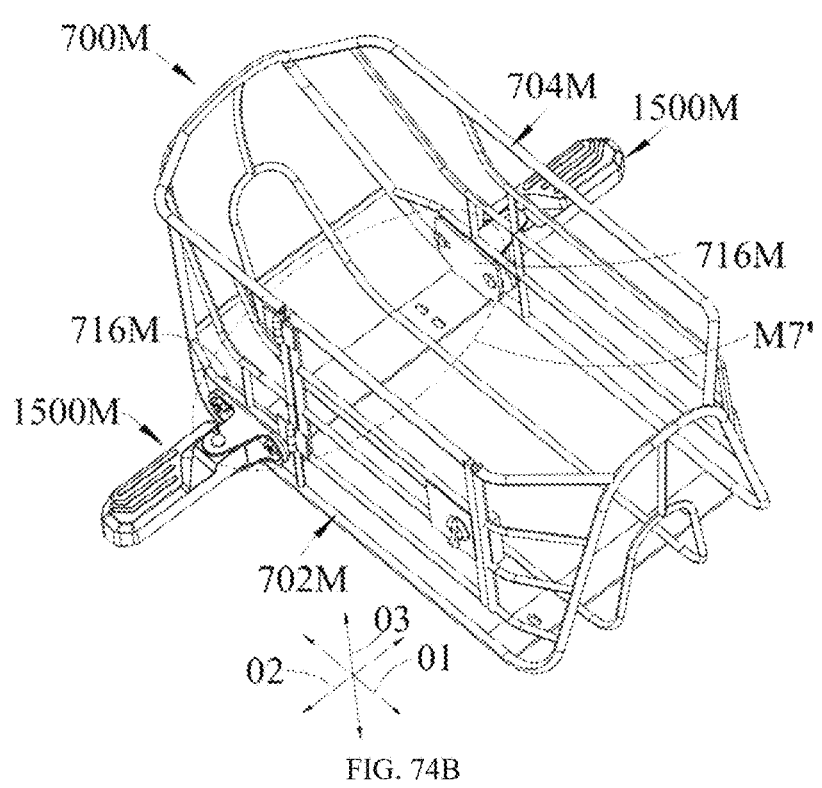
Figure 74C:
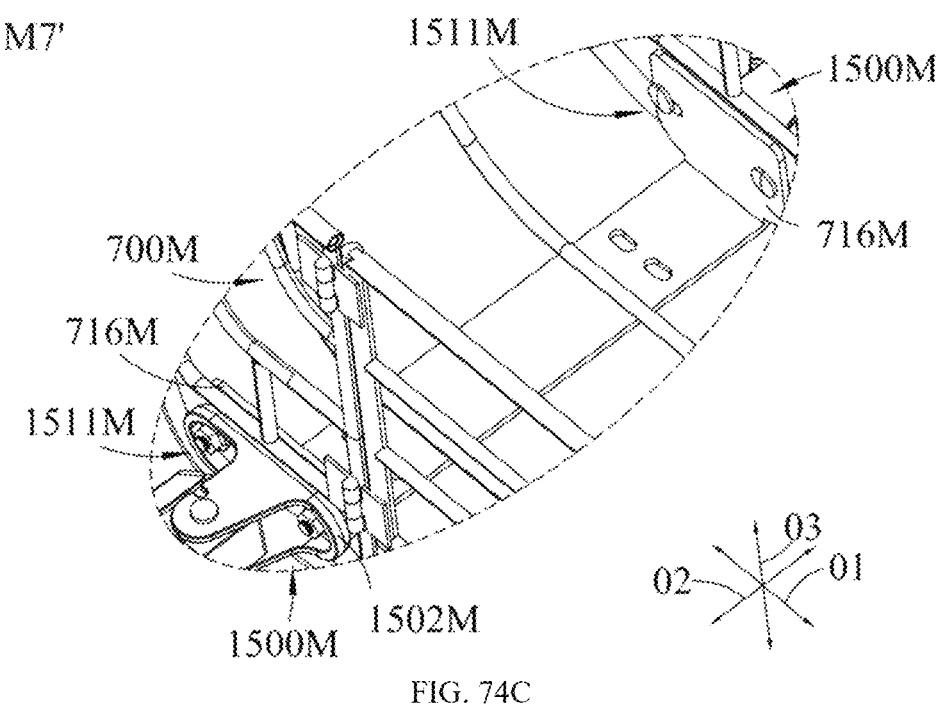
Figure 74D:
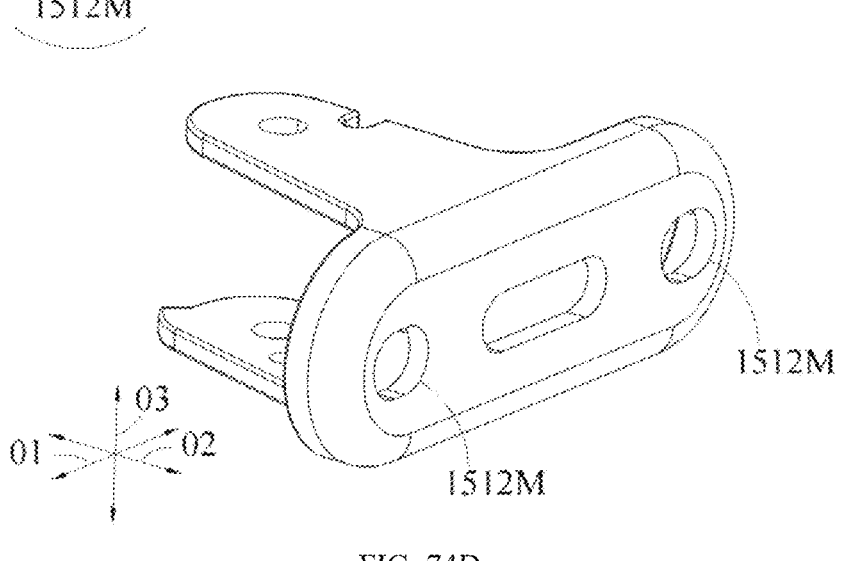
Figure 74E:
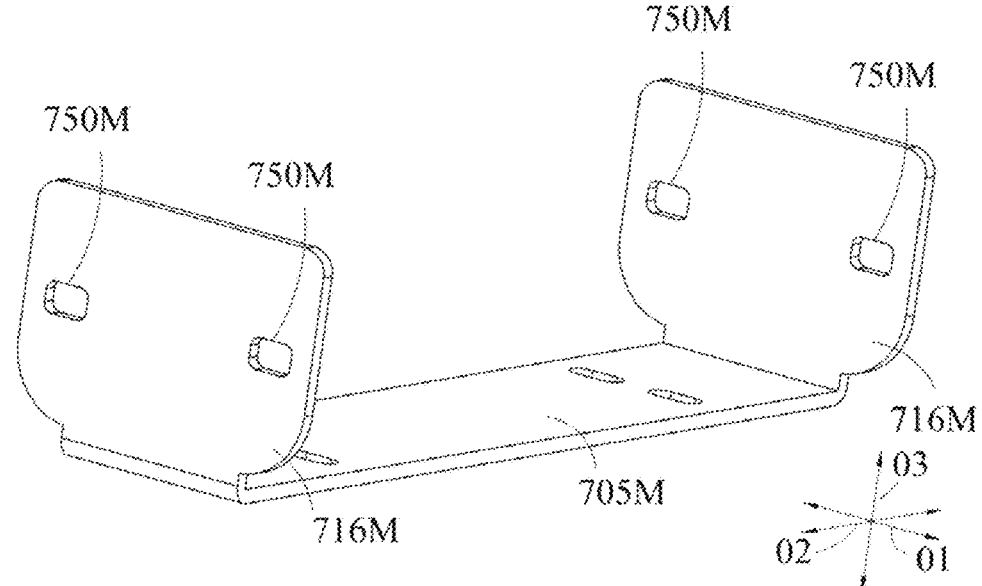
Figure 74F:
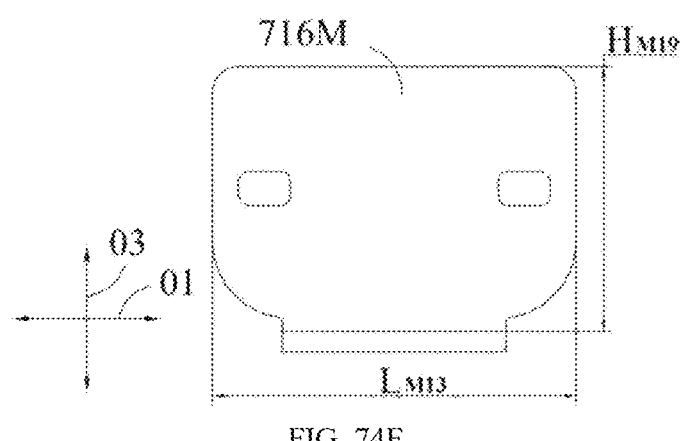

FIGS. 74A-74F are a set of schematic views of the mounting structure of the pedal assembly 1500M and the storage mechanism 700M. Among them, FIG. 74C is an enlarged schematic view at M7' in FIG. 74B, and FIG. 74F is a schematic view of parameters of the mounting plate 716M.

Referring to FIGS. 74A and 74B, in some embodiments, the pedal assembly 1500M may be fixedly provided on the storage mechanism 700M, and the storage mechanism 700M is easy to disassemble. After disassembling the storage mechanism 700M, the pedal assembly 1500M may be removed from the vehicle 13M together, which reduces the weight of the vehicle 13M and is expected to realize the lightweight design of the vehicle 13M. In addition, it may be understood that when the storage mechanism 700M is removed, the user's feet may be placed at the position of the second section 124M of the frame 100M, so even without the pedal assembly 1500M, the rider may maintain a stable sitting posture well, improving riding safety.

In some embodiments, referring to FIG. 74C, in some embodiments, the pedal assembly 1500M and the storage mechanism 700M may be fixedly connected by a fourth bolt connection assembly 1511M, which is convenient for disassembly between the pedal assembly 1500M and the storage mechanism 700M. During storage or transportation, the pedal assembly 1500M and the storage mechanism 700M may be disassembled to arrange their layout more reasonably, make rational use of space, so as to reduce the space occupation, and facilitate storage and transportation. When needed, the pedal assembly 1500M and the storage mechanism 700M may be fixedly connected again by the fourth bolt connection assembly 1511M to facilitate user stepping. In addition, when it is necessary to carry the disassembled pedal assembly 1500M and storage mechanism 700M, the pedal assembly 1500M and the storage mechanism 700M may be fixedly connected by the fourth bolt connection assembly 1511M, which reduces the number of structures to be carried and reduces the risk of losing the pedal assembly 1500M and the fourth bolt connection assembly 1511M.

Referring to FIG. 74C, in some embodiments, the bolt specification of the fourth bolt connection assembly 1511M may be a button head bolt. The rounded bolt head may reduce the risk of scratching items or animals in the storage mechanism 700M, for example, avoiding scratching a pet's foot.

In some embodiments, the bolt specification of the fourth bolt connection assembly 1511M may be M6, which ensures a firm connection and is also relatively small.

In other examples, the bolt specification of the fourth bolt connection assembly 1511M may also be other specifications, such as M8, M10, M14.

In some embodiments, referring to FIGS. 74D and 74E, in some embodiments, the pedal assembly 1500M may be provided with a seventh fixing hole 1512M, and the storage mechanism 700M may be provided with an eighth fixing hole 750M. Both the seventh fixing hole 1512M and the eighth fixing hole 750M may be matched with the fourth bolt connection assembly 1511M.

Referring to FIGS. 74D and 74E, in some embodiments, the number of both the seventh fixing holes 1512M and the eighth fixing holes 750M may be two, and the two seventh fixing holes 1512M may correspond to the two eighth fixing holes 750M one by one, to improve the stability of the fixed connection between the pedal assembly 1500M and the storage mechanism 700M, and reduce the risk of accidental rotation of the pedal assembly 1500M.

It may be understood that, in some other embodiments, the number of the seventh fixing holes 1512M is not limited to two, and may also be one or more than two. Correspondingly, the number of the eighth fixing holes 750M is also not limited to two, and may also be one or more than two.

In some other embodiments, along the second direction, the two pedal assemblies distributed on both sides of the storage mechanism may be two components of the same whole. For example, the two pedal assemblies are connected by a plate or a rod extending along the second direction. One pedal assembly on the left side connects to one end of the plate or rod, and one pedal assembly on the right side connects to the other end of the plate or rod. The plate or rod and the two pedal assemblies combine to form an approximately long strip-shaped whole along the second direction 02, and the pedal assemblies serve as the ends of the whole for the user to step on.

In some embodiments, the two pedal assemblies and the plate or rod may be integrally formed, or may be fixed into a whole by assembly.

In some embodiments, the plate or rod may be located inside the storage mechanism and extend through the storage mechanism along the second direction. Alternatively, the plate or rod may be located outside the storage mechanism.

In some embodiments, the plate or rod may be located above the support plate, or may be located below the support plate.

In some other embodiments, the pedal assembly may be integrally formed with one or more components of the storage mechanism 700M. For example, the pedal assembly may be integrally formed with the second limiting member 702M. For another example, the pedal assembly may be integrally formed with the bottom wall of the storage mechanism 700M. For another example, the pedal assembly may be integrally formed with the first limiting member 701M. For another example, the pedal assembly may be integrally formed with the first limiting member 701M and the second limiting member 702M.

Referring to FIGS. 74C and 74D, in some embodiments, the pedal assembly 1500M may include an adapter 1502M, and the seventh fixing hole 1512M may be provided on the adapter 1502M. In some embodiments, the adapter 1502M may be located on the inner side of the pedal assembly 1500M, that is, the adapter 1502M may be located on the side of the pedal 1501M closer to the other pedal assembly 1500M.

Referring to FIGS. 74C and 74E, in some embodiments, a mounting plate 716M may be fixedly provided on the storage mechanism 700M, and the eighth fixing hole 750M may be provided on the mounting plate 716M. In some embodiments, the mounting plate 716M may be located on the side wall of the storage mechanism 700M.

Further, referring to FIG. 74B, in some embodiments, the mounting plate 716M may be fixedly provided on the inner side of the corresponding side wall of the storage mechanism 700M. The limiting of the corresponding side wall of the storage mechanism 700M reduces the risk of the mounting plate 716M disconnecting from the storage mechanism 700M under the action of the pedal assembly 1500M. In addition, the mounting plate 716M may be located on the inner side of the corresponding side wall of the storage mechanism 700M. Even if the mounting plate 716M disconnects from the storage mechanism 700M under an external force, the bottom wall of the storage mechanism 700M may receive the mounting plate 716M, reducing the risk of the mounting plate 716M being lost. In addition, the mounting plate 716M may be located on the inner side of the corresponding side wall of the storage mechanism 700M, reducing the situation where the arrangement of the mounting plate 716M increases the space occupied by the storage mechanism 700M. In addition, the mounting plate 716M may be located on the inner side of the corresponding side wall of the storage mechanism 700M, reducing the risk of the user accidentally touching the mounting plate 716M during the process of stepping on the pedal assembly 1500M, and reducing the risk of the user being accidentally injured by the mounting plate 716M.

Referring to FIG. 74C, in some embodiments, the mounting plate 716M may be in a plate shape. On the one hand, it is convenient for matching with the fourth bolt connection assembly 1511M, improving the stability of the fixed connection between the pedal assembly 1500M and the storage mechanism 700M; on the other hand, it reduces the influence of the arrangement of the mounting plate 716M on the shape of the inner cavity of the storage mechanism 700M, reducing the risk of items or animals placed in the storage mechanism 700M being accidentally injured by the mounting plate 716M; on another hand, the mounting plate 716M has a simple structure and is convenient to prepare; on yet another hand, the weight of the mounting plate 716M is small, which is expected to realize the lightweight design of the storage mechanism 700M and is convenient for the lightweight design of the vehicle 13M.

Referring to FIG. 74B, in some embodiments, the two mounting plates 716M fixedly connected to the two pedal assemblies 1500M respectively, may be symmetrically provided on the storage mechanism 700M, so that the force on the storage mechanism 700M is more balanced, reducing the phenomenon of local stress concentration in the storage mechanism 700M.

Referring to FIG. 74B, in some embodiments, the two mounting plates 716M may be fixedly provided on the second limiting member 702M and the fourth limiting member 704M, respectively.

In some embodiments, the material of the mounting plate 716M may be carbon structural steel. On the one hand, the mounting plate 716M made of carbon structural steel has high rigidity and strength, so that the pedal assembly 1500M is expected to be stably fixed on the storage mechanism 700M; on the other hand, carbon structural steel is easy to shape, which is convenient for the preparation of the mounting plate 716M.

In some other embodiments, the material of the mounting plate 716M may also be other metal materials or plastics. Other metal materials include but are not limited to stainless steel and aluminum alloy. Plastics include but are not limited to polypropylene (PP), polyethylene (PE), and ABS plastic.

It may be noted that the materials of different mounting plates 716M may be the same or different.

Referring to FIG. 74B, the thickness of the mounting plate 716M along the second direction 02 may be in the range of 1 mm-6 mm, which may not only realize the stable connection of the pedal assembly 1500M, but also avoid occupying too much space in the inner cavity of the storage mechanism 700M, reducing the possibility of excessively increasing the weight of the storage mechanism 700M.

In some embodiments, the thickness of the mounting plate 716M along the second direction 02 may be any value in the range of 1 mm-6 mm, for example, 1 mm, 1.4 mm, 1.8 mm, 2.2 mm, 2.6 mm, 3 mm, 3.4 mm, 3.8 mm, 4.2 mm, 4.6 mm, 5 mm, 5.4 mm, 5.8 mm, and 6 mm.

Referring to FIG. 74C, in some embodiments, the mounting plate 716M may be in a rectangular plate shape, which has a simple structure and is convenient for processing.

Referring to FIG. 74F, in some embodiments, the length $L_{M13}$ of the mounting plate 716M along the first direction 01 may be in the range of 30 mm-60 mm, and the height $H_{M19}$ along the third direction 03 may be in the range of 35 mm-75 mm, so as to have a smaller volume while meeting the stable connection of the pedal assembly 1500M, which is convenient for the lightweight design of the pedal assembly 1500M.

In some embodiments, $L_{M13}$ may be any value in the range of 30 mm-60 mm, for example, 30 mm, 35 mm, 40 mm, 45 mm, 50 mm, 55 mm, and 60 mm. $H_{M19}$ may be any value in the range of 35 mm-75 mm, for example, 35 mm, 41 mm, 47 mm, 53 mm, 59 mm, 65 mm, 71 mm, and 75 mm.

Referring to FIGS. 74C and 74E, in some embodiments, the mounting plate 716M may be fixedly connected to the side wall of the corresponding side of the storage mechanism 700M, and may be fixedly connected to the mounting member 705M located on the front side, so that the mounting plate 716M is more firmly installed on the storage mechanism 700M. In addition, the mounting plate 716M may be fixedly connected to the mounting member 705M located on the front side, and the mounting member 705M located on the front side may also share the stress exerted by the pedal assembly 1500M on the mounting plate 716M, reducing the risk of deformation of the mounting plate 716M.

Referring to FIG. 74E, in some embodiments, the mounting plate 716M may be integrally formed with the mounting member 705M located on the front side, simplifying the assembly steps of the storage mechanism 700M.

Referring to FIG. 74C, in some embodiments, the nut of the fourth bolt connection assembly 1511M may be located on the side of the adapter 1502M away from the mounting plate 716M, and the head of the bolt of the fourth bolt connection assembly 1511M may be located on the side of the mounting plate 716M away from the adapter 1502M, to avoid the threaded rod of the bolt of the fourth bolt connection assembly 1511M being exposed in the storage mechanism 700M, thereby reducing the risk of items or animals in the storage mechanism 700M being accidentally injured by the threaded rod of the fourth bolt connection assembly 1511M.

In some other embodiments, the position of the pedal assembly along the first direction is adjustable to better meet the needs of users with different leg lengths and improve riding comfort. In other words, the user may adjust the position of the pedal assembly along the first direction according to their needs to improve the comfort of stepping. For example, in some other embodiments, two mounting plates may be provided on both the second limiting member and the fourth limiting member of the storage mechanism. The two mounting plates on the second limiting member may be arranged along the first direction, and the two mounting plates on the fourth limiting member may be arranged along the first direction. Thus, the rider may fix the pedal assembly to a suitable mounting plate according to their needs to improve user comfort. For another example, in some other embodiments, the number of eighth fixing holes on the mounting plate may be more than the number of seventh fixing holes on the adapter. By selecting different eighth fixing holes to match with the seventh fixing holes, the position of the pedal assembly along the first direction may be adjusted.

Figure 75A:
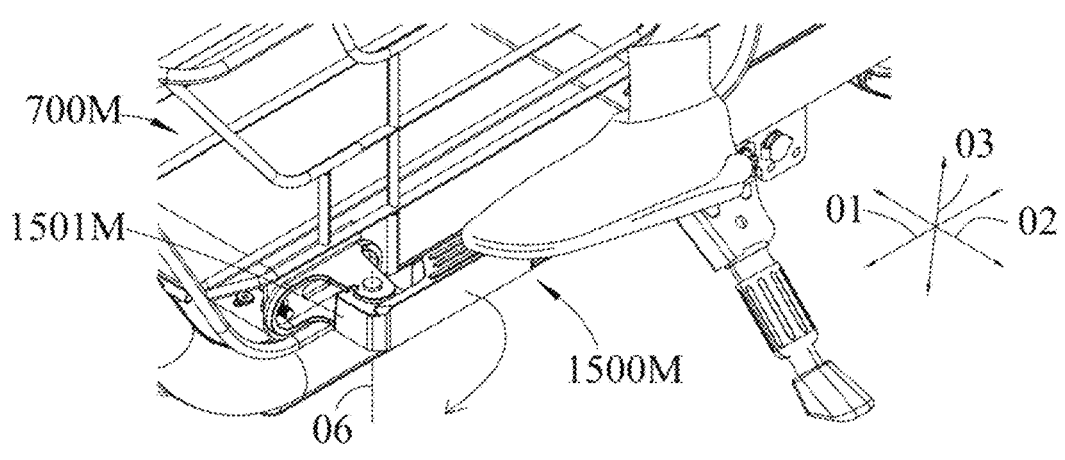
FIGS. 75A-75B are a set of schematic views illustrating the use of the pedal.
Figure 75B:
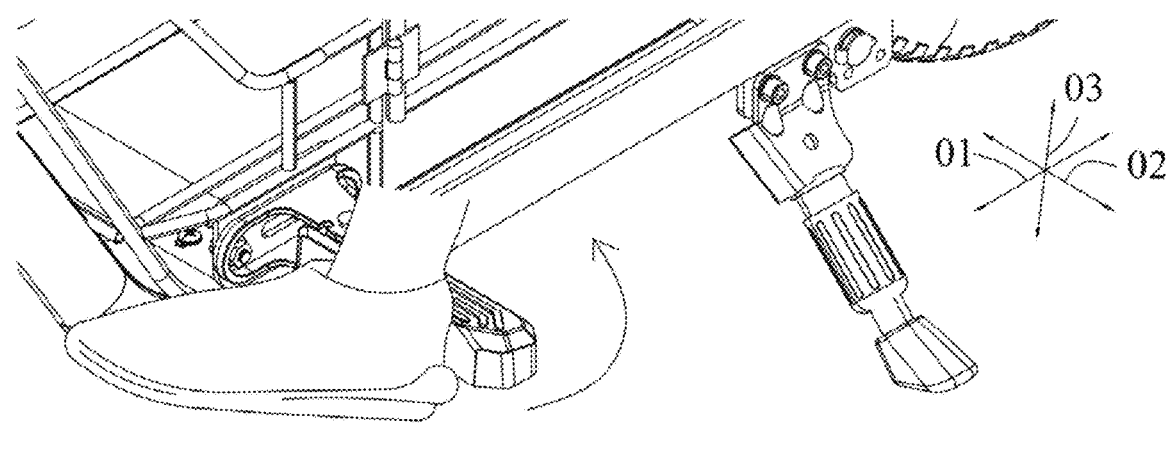

FIGS. 75A-75B are a set of schematic views of use of the pedal 1501M.

Referring to FIGS. 75A and 75B, in some embodiments, the pedal 1501M of the pedal assembly 1500M may be folded toward the storage mechanism 700M. In some embodiments, when not riding, by folding the pedal 1501M, the risk of people or animals around the vehicle 13M accidentally bumping into the pedal 1501M and being injured is reduced. In addition, by folding the pedal 1501M, the space it occupies along the second direction 02 may be reduced, which is convenient for storing or transporting the storage mechanism 700M equipped with the pedal assembly 1500M. In addition, by folding the pedal 1501M, the risk of the pedal 1501M being collided with is also reduced, and the risk of damage to the pedal 1501M is reduced, which is expected to improve the service life of the pedal 1501M.

Referring to FIG. 75A, in some embodiments, the rotation axis of the pedal 1501M of the pedal assembly 1500M is along the third direction 03. The pedal 1501M may be folded backward along the axis 06.

The user may realize the storage or unfolding of the pedal 1501M mainly by moving the foot back and forth along the first direction 01.

For example, when the vehicle 13M is in a parked state (that is, the user is not sitting on the vehicle 13M), the user may apply a force to the pedal 1501M with their foot to make it rotate forward, so that the pedal 1501M changes to the unfolded state. Conversely, the user may also apply a force to the pedal 1501M with their foot to make it rotate backward, so that the pedal 1501M changes to the stored state.

For another example, when the vehicle 13M is in a ready-to-start state (that is, the user is sitting on the vehicle 13M), the user may apply a force to the pedal 1501M with their foot to make it rotate forward, so that the pedal 1501M changes to the unfolded state. Conversely, the user may also apply a force to the pedal 1501M with their foot to make it rotate backward, so that the pedal 1501M changes to the stored state.

For another example, when the vehicle 13M is in a driving state, the user may apply a force to the pedal 1501M with their foot to make it rotate forward, so that the pedal 1501M changes to the unfolded state. Conversely, the user may also apply a force to the pedal 1501M with their foot to make it rotate backward, so that the pedal 1501M changes to the stored state. The pedal 1501M may be operated or adjusted by the user during driving without slowing down or stopping, which is expected to make the design convenient. For example, when the user encounters a narrow road (for example, passing through the space formed by two anti-collision bollards), they may retract the pedal 1501M with their foot without slowing down or getting off the vehicle to reduce the width of the vehicle 13M; after passing, they may quickly unfold the pedal 1501M to support their feet again, providing flexibility and safety. For another example, when the user encounters a rough road (for example, one side of the road is high and the other side is low), the user may retract the pedal 1501M closer to the lower side of the ground to reduce the risk of it scraping or colliding with the ground, which is expected to improve riding safety.

It may be noted that the user may store both side pedals 1501M, or may store only one of them.

Referring to FIGS. 75A and 75B, in some embodiments, the rotation angle of the pedal 1501M may not exceed 90°, which may reduce the pedal 1501M from intruding into the internal functional space of other components in the folded state, for example, with the storage mechanism 700M. The storage mechanism 700M may be used to load items. The pedal 1501M is located on the outer side of the storage mechanism 700M in the folded state, which is conducive to maintaining the integrity of the volume of the storage mechanism 700M and is expected to optimize the user's experience. In addition, the rotation angle of the pedal 1501M not exceeding 90° may reduce the risk of the pedal 1501M interfering or colliding with other components in the folded state, for example, with the frame 100M. The frame

100M may serve as a load-bearing skeleton to provide support for other components of the vehicle 13M. The pedal 1501M is located on the outer side of the frame 100M in the folded state, which is conducive to reducing the risk of the frame 100M being collided with or deformed, and is expected to ensure the service life of the frame 100M.

Referring to FIGS. 75A and 75B, in some embodiments, the rotation angle of the pedal 1501M may be 90° or approximately a right angle. When the pedal 1501M is rotated 90° from the folded state to the use state, the pedal 1501M is approximately perpendicular to the frame 100M, which helps to provide more effective support area, so that the user's foot may be almost completely flat on the surface of the pedal 1501M, reducing the risk caused by stepping on the edge. In addition, having both feet supported approximately horizontally is conducive to the user maintaining body balance during riding, especially during acceleration, deceleration, or steering operations. When the pedal 1501M is folded back to the edge of the frame 100M, the pedal 1501M is approximately parallel to the frame 100M, reducing the cases of eversion or inversion, so that the lateral occupied space is minimized. In addition, the user may visually judge whether the operation is in place, which is expected to allow the user to visually judge more quickly whether the pedal 1501M is in place.

Referring to FIGS. 75A and 75B, in some embodiments, the axis 06 is the rotation axis of the pedal 1501M, and the rotation plane in which the pedal 1501M is located is approximately parallel to the placement plane of the storage mechanism 700M, which may reduce the pedal 1501M from intruding into the internal functional space of other components in the folded state, for example, with the storage mechanism 700M. The storage mechanism 700M may be used to load items. The rotation plane in which the pedal 1501M is located is approximately parallel to the placement plane of the storage mechanism 700M. After being folded, the pedal 1501M is expected to be closer to the side wall of the basket, which is convenient for storage. In addition, it may also reduce the obstruction to the storage mechanism 700M.

Referring to FIGS. 75A and 75B, in some embodiments, the axis 06 is the rotation axis of the pedal 1501M, and the axis 06 is approximately perpendicular to the placement plane of the storage mechanism 700M, which may reduce the pedal 1501M from intruding into the internal functional space of other components in the folded state, for example, with the storage mechanism 700M. The storage mechanism 700M may be used to load items. The rotation plane in which the pedal 1501M is located is approximately parallel to the placement plane of the storage mechanism 700M. After being folded, the pedal 1501M is expected to be closer to the side wall of the basket, which is convenient for storage. In addition, it may also reduce the obstruction to the storage mechanism 700M. The placement plane of the storage mechanism 700M may be a plane parallel to the support plate 104M.

Figure 76A:
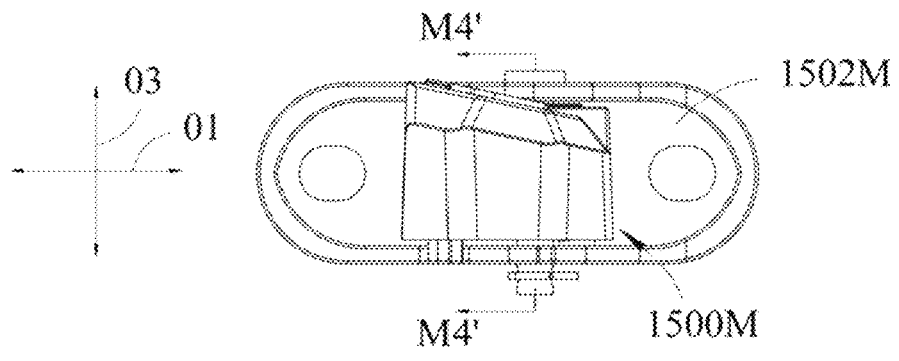
FIGS. 76A-76E are another set of schematic structural views of the pedal assembly.
Figure 76B:
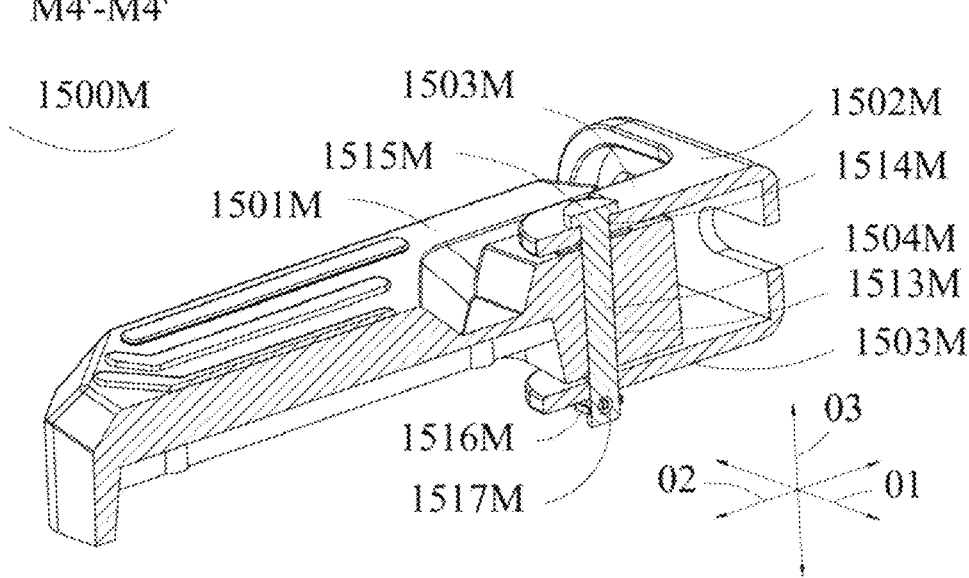
Figure 76C:
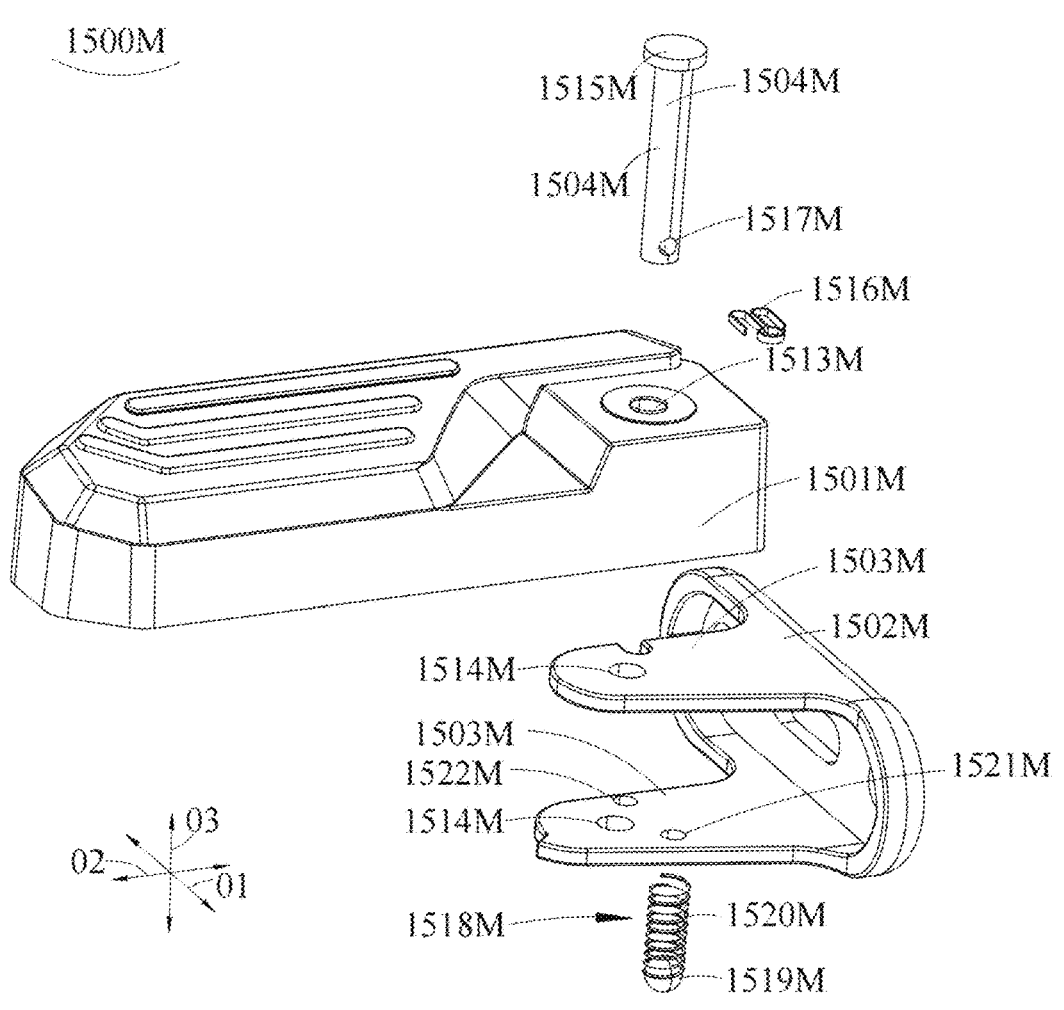

FIGS. 76A-76E are a set of schematic structural views of the pedal assembly 1500M. Among them, FIG. 76B is a cross-sectional view along M4'-M4' in FIG. 76A, and FIG. 76C is an exploded view.

Referring to FIG. 76A, in some embodiments, the pedal 1501M may be rotatably connected to the adapter 1502M.

Referring to FIGS. 76B and 76C, in some embodiments, the pedal assembly 1500M may include a connecting post 1504M. One end of the pedal 1501M close to the adapter 1502M may be provided with a first pivot hole 1513M, and the adapter 1502M may be provided with a second pivot hole 1514M. Both the first pivot hole 1513M and the second pivot hole 1514M may be matched with the connecting post 1504M. In other words, the connecting post 1504M may be inserted into the first pivot hole 1513M and the second pivot hole 1514M, so that the pedal 1501M may rotate relative to the adapter 1502M. It may be understood that the first pivot hole 1513M and the second pivot hole 1514M may extend along the third direction 03. Referring to FIGS. 76B and 76C, in some embodiments, one end of the connecting post 1504M along the third direction 03 may be fixedly provided with a first stopper 1515M, and the other end may be fixedly provided with a second stopper 1516M, so that the connecting post 1504M may remain inserted in the first pivot hole 1513M and the second pivot hole 1514M.

Referring to FIG. 76B, in some embodiments, the first stopper 1515M may be integrally formed with the connecting post 1504M, which reduces assembly processes and improves the assembly efficiency of the pedal assembly 1500M.

Referring to FIGS. 76B and 76C, in some embodiments, the end of the connecting post 1504M provided with the second stopper 1516M may be provided with a third through hole 1517M. The angle between the third through hole 1517M and the third direction 03 may be greater than zero. The second stopper 1516M is a bendable structure and may be passed through the third through hole 1517M. Therefore, after passing the second stopper 1516M through the third through hole 1517M, the risk of the second stopper 1516M passing out of the third through hole 1517M may be reduced by bending. Of course, it is also possible to pull the second stopper 1516M out of the third through hole 1517M after bending the second stopper 1516M to realize the disassembly of the connecting post 1504M, which is convenient for the maintenance of the pedal assembly 1500M.

Figure 76D:
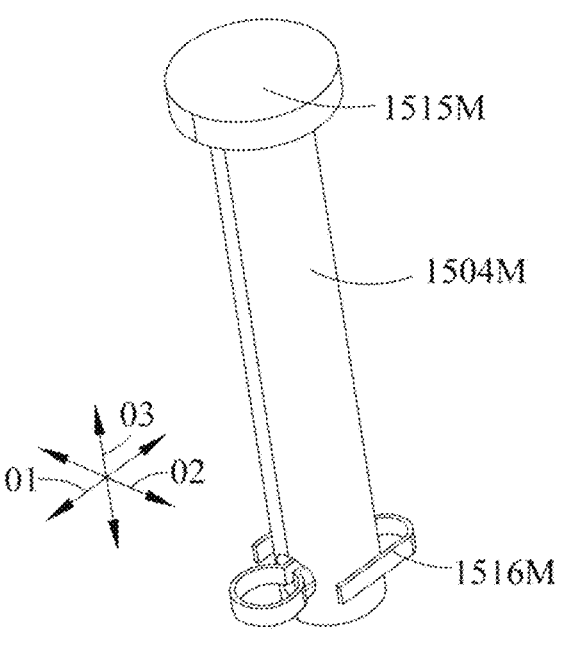
Figure 76E:
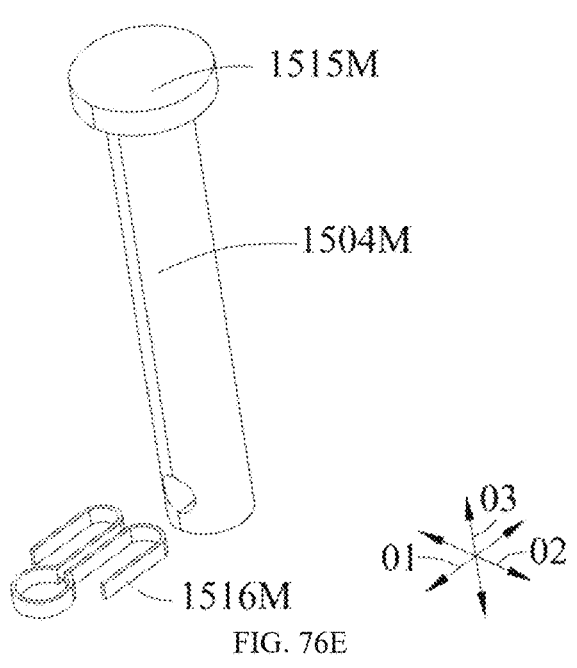

Referring to FIGS. 76D and 76E, in some embodiments, the material of the second stopper 1516M may be low-carbon steel. The user may bend the second stopper 1516M with bare hands, and it may maintain its bent shape well, so as to reduce the risk of the second stopper 1516M being accidentally pulled out from the third through hole 1517M.

Referring to FIGS. 76B and 76C, in some embodiments, the adapter 1502M may be provided with a connecting plate 1503M. The second pivot hole 1514M is provided on the connecting plate 1503M. It may be understood that the connecting plate 1503M may be located on the outer side of the adapter 1502M, that is, the connecting plate 1503M may be located on the side of the adapter 1502M closer to the pedal 1501M. By providing the connecting plate 1503M, the second pivot hole 1514M may be provided on the connecting plate 1503M, which may not only realize the rotational connection between the pedal 1501M and the adapter 1502M, but also reduce the size of the adapter 1502M, which is convenient for the miniaturized and lightweight design of the pedal assembly 1500M.

Referring to FIG. 76B, in some embodiments, the number of the connecting plates 1503M may be two, and they are arranged along the third direction 03; the position of the pedal 1501M provided with the first pivot hole 1513M may be located between the two connecting plates 1503M. The provision of the two connecting plates 1503M may share the force exerted by the pedal assembly 1500M on the adapter 1502M, which is expected to reduce the phenomenon of local stress concentration in the pedal 1501M and the adapter 1502M.

In addition, referring to FIG. 76B, the pedal 1501M may be located between the two connecting plates 1503M. The pedal 1501M may also be limited by the two connecting plates 1503M to reduce the risk of the pedal 1501M tilting downward under the stepping action, so as to better maintain the user's stepping comfort.

Referring to FIG. 76C, it may be understood that the pedal 1501M may rotate under the action of an external force, so the pedal assembly 1500M may switch between an open state and a folded state. In some embodiments, the pedal assembly 1500M may be provided with a pedal retaining mechanism 1518M, so that when the pedal 1501M is rotated until the pedal assembly 1500M is in the open state, it may be kept in the open state; and when the pedal 1501M is rotated until the pedal assembly 1500M is in the folded state, it may be kept in the folded state. Keeping the pedal assembly 1500M in the open state is conducive to improving the stability of the user's stepping and ensuring riding safety. Keeping the pedal assembly 1500M in the folded state reduces the risk of the pedal 1501M being accidentally collided or damaged due to deviation from the folded state under external force, and also reduces the risk of people or animals around the pedal 1501M being injured by the pedal 1501M.

Figure 77A:
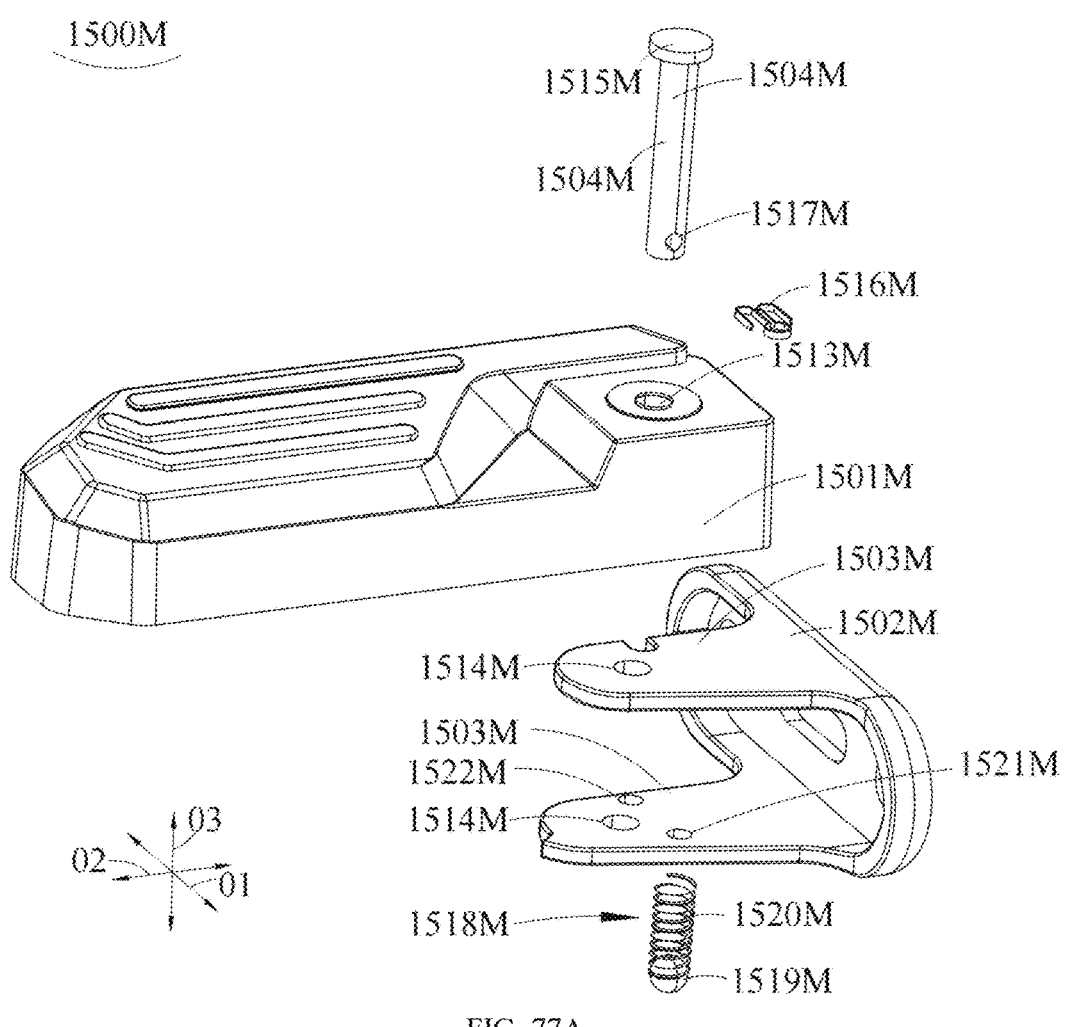
FIGS. 77A-77E are another set of schematic structural views of the pedal assembly.
Figure 77B:
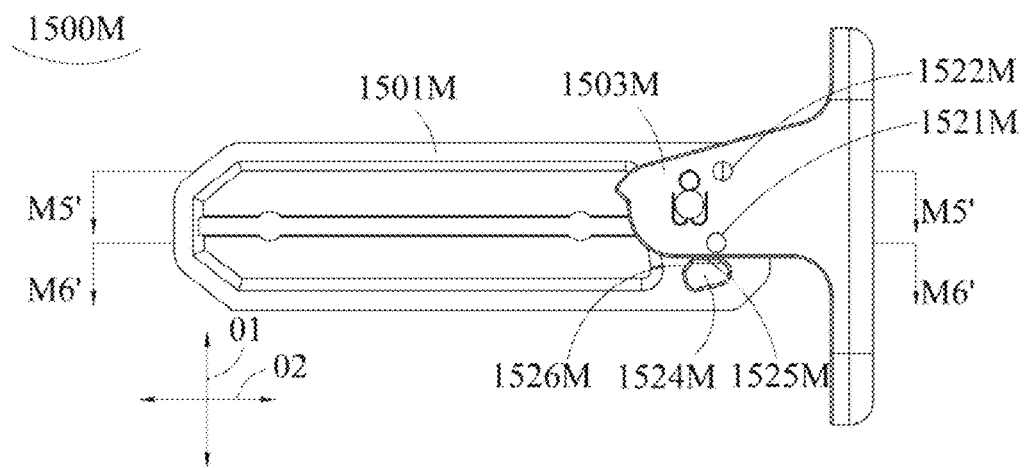
Figure 77C:
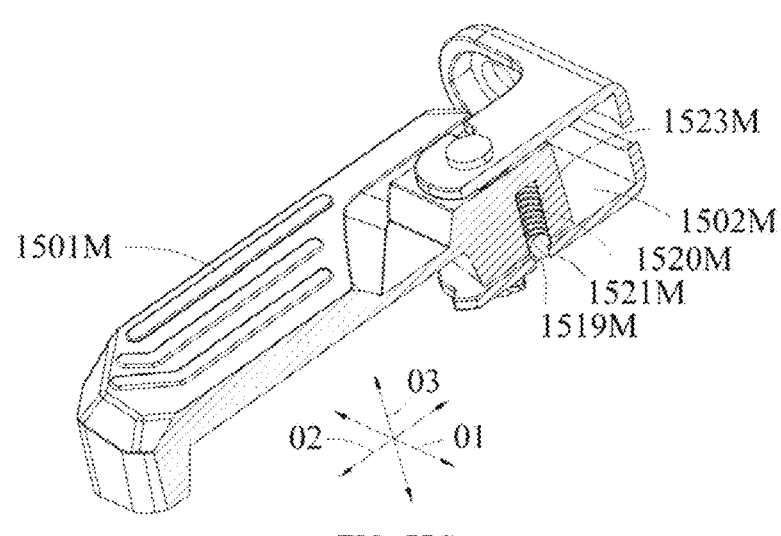
Figure 77D:
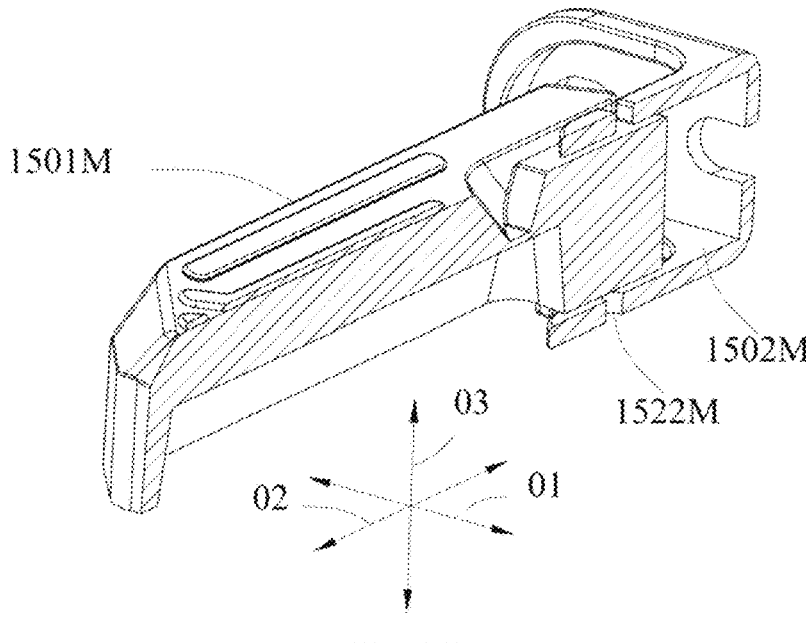

FIGS. 77A-77E are another set of schematic structural views of the pedal assembly 1500M. Among them, FIG. 77A is an exploded view, FIG. 77C is a cross-sectional view along M5'-M5' in FIG. 77B, and FIG. 77D is a cross-sectional view along M6'-M6' in FIG. 77B.

Referring to FIGS. 77A, 77C and 77D, in some embodiments, the pedal retaining mechanism 1518M may include a first limiting member 1519M, a first return member 1520M, a first limiting groove 1521M, and a second limiting groove 1522M. The first limiting member 1519M is movably provided on the pedal 1501M along the third direction 03. Both the first limiting groove 1521M and the second limiting groove 1522M may be provided on the adapter 1502M. When the pedal 1501M is rotated to the open state, the first limiting member 1519M moves with the pedal 1501M to the position of the first limiting groove 1521M, and moves under the action of the first return member 1520M to be partially inserted into the first limiting groove 1521M, so that the pedal 1501M is kept in the open state. When the pedal 1501M is rotated from the open state to the folded state under the action of an external force, the first limiting member 1519M, under the action of the external force, overcomes the action of the first return member 1520M and slides out of the first limiting groove 1521M, moves with the pedal 1501M to the position of the second limiting groove 1522M, and moves under the action of the first return member 1520M to be partially inserted into the second limiting groove 1522M, so that the pedal 1501M is kept in the folded state. When the pedal 1501M is rotated from the folded state to the open state under the action of an external force, the first limiting member 1519M, under the action of the external force, overcomes the action of the first return member 1520M and slides out of the second limiting groove 1522M, moves with the pedal 1501M to the position of the first limiting groove 1521M, and moves under the action of the first return member 1520M to be partially inserted into the first limiting groove 1521M, so that the pedal 1501M is kept in the folded state.

Referring to FIGS. 77C and 77D, when the pedal 1501M is rotated until the pedal assembly 1500M is in the open state, when the first limiting member 1519M is partially inserted into the first limiting groove 1521M under the action of the first return member 1520M, there will be an impact sound when the first limiting member 1519M abuts against the groove wall of the first limiting groove 1521M, which is expected to allow the operator to clearly judge that the pedal assembly 1500M is in the open state. When the pedal 1501M is rotated until the pedal assembly 1500M is in the folded state, when the first limiting member 1519M is partially inserted into the second limiting groove 1522M under the action of the first return member 1520M, there will be an impact sound when the first limiting member 1519M abuts against the groove wall of the second limiting groove 1522M, which is expected to allow the operator to clearly judge that the pedal assembly 1500M may be in the folded state.

Referring to FIG. 77A, in some embodiments, the first limiting member 1519M may be spherical, and its outer surface is smoothly transitioned, which is convenient for the first limiting member 1519M to slide into or out of the first limiting groove 1521M and the second limiting groove 1522M.

Referring to FIG. 77A, in some embodiments, the first return member 1520M may be a spring.

Referring to FIG. 77C, further, in some embodiments, the bottom surface of the pedal 1501M may be provided with a retaining groove 1523M. The first return member 1520M may be provided in the retaining groove 1523M. One end of the first limiting member 1519M may abut against the bottom wall of the retaining groove 1523M, and the other end may abut against the first limiting groove 1521M.

Referring to FIGS. 77A and 77B, the first limiting groove 1521M and the second limiting groove 1522M may be located on the top surface of the connecting plate 1503M. Therefore, the first limiting member 1519M may, under the action of the first return member 1520M, move to be partially inserted into the first limiting groove 1521M or the second limiting groove 1522M.

In some embodiments, the material of the first limiting member 1519M may be carbon structural steel. When the first limiting member 1519M abuts against the groove wall of the first limiting groove 1521M, the sound is louder and may be better perceived by the operator; similarly, when the first limiting member 1519M abuts against the groove wall of the second limiting groove 1522M, the sound is also louder and may be better perceived by the operator.

In some other embodiments, the material of the first limiting member 1519M may also be other metal materials, and other metal materials include but are not limited to stainless steel and aluminum alloy.

Figure 77E:
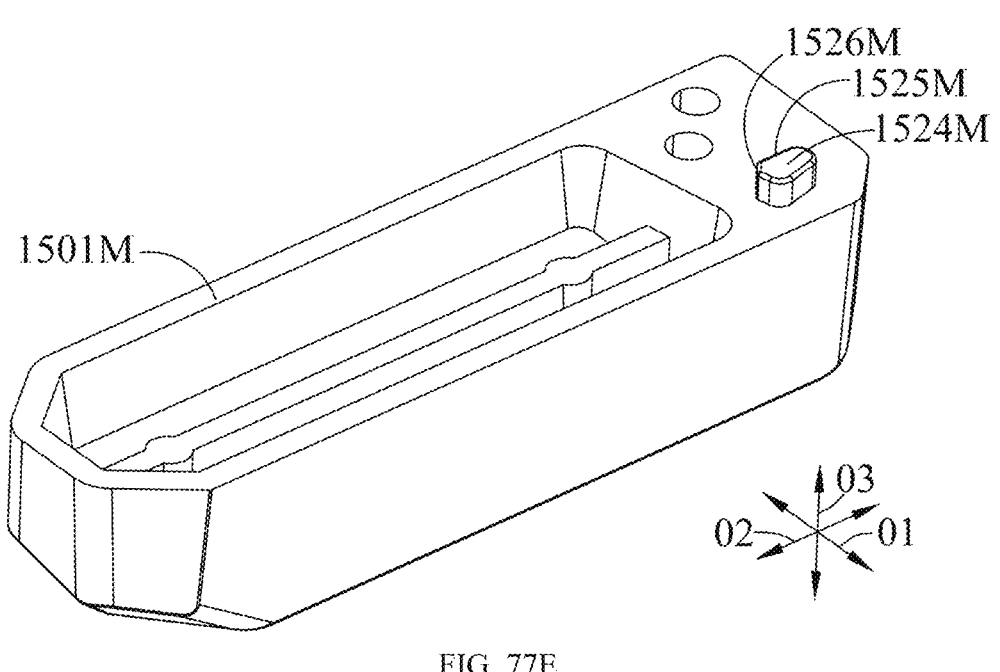

Referring to FIGS. 77B and 77E, in some embodiments, the pedal 1501M may also be provided with a second limiting member 1524M. The second limiting member 1524M may have a first limiting surface 1525M and a second limiting surface 1526M. When the pedal 1501M is rotated until the pedal assembly 1500M is in the open state, the first limiting surface 1525M of the second limiting member 1524M may abut against the connecting plate 1503M to limit the continued rotation of the pedal 1501M. When the pedal 1501M is rotated until the pedal assembly 1500M is in the folded state, the second limiting surface 1526M of the second limiting member 1524M may abut against the connecting plate 1503M to limit the continued rotation of the pedal 1501M.

When the pedal assembly 1500M is in the open state, the rotation of the pedal 1501M may be limited by the first limiting surface 1525M of the second limiting member 1524M, which is expected to reduce the possibility of the pedal 1501M continuing to rotate under the user's stepping action, so that the pedal assembly 1500M is better kept in the open state, improving stepping stability.

When the pedal assembly 1500M is in the folded state, the rotation of the pedal 1501M may be limited by the second limiting surface 1526M of the second limiting member 1524M, which is expected to reduce the impact of the pedal 1501M with the storage mechanism 700M, improving the service life of the storage mechanism 700M and the pedal 1501M.

Figure 78A:
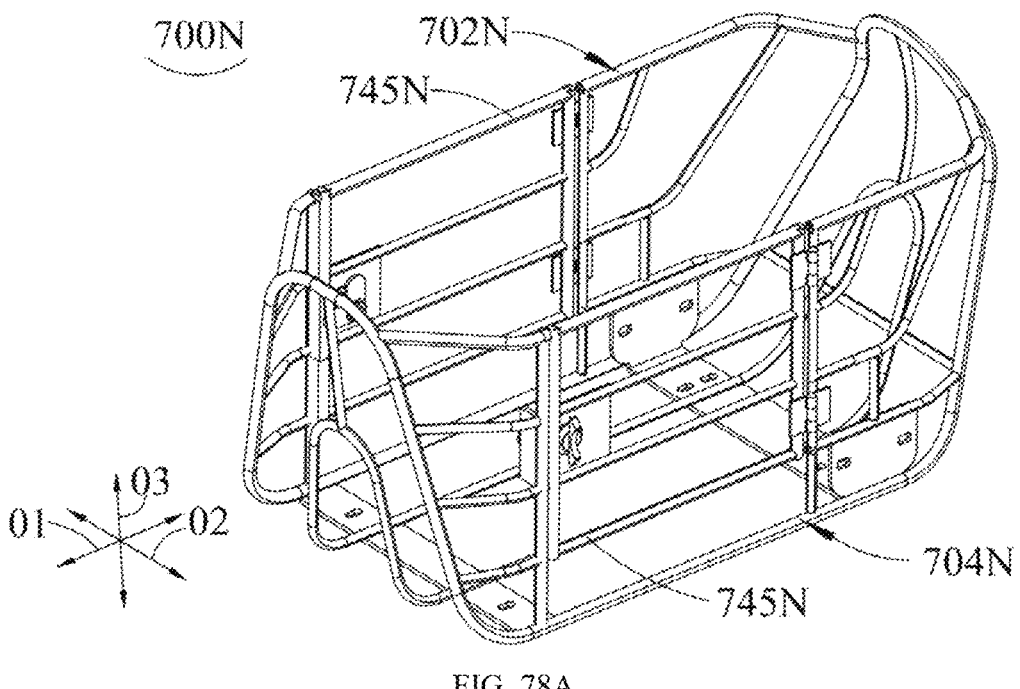
FIGS. 78A-78B are a set of schematic structural views of another implementation of the storage mechanism.
Figure 78B:
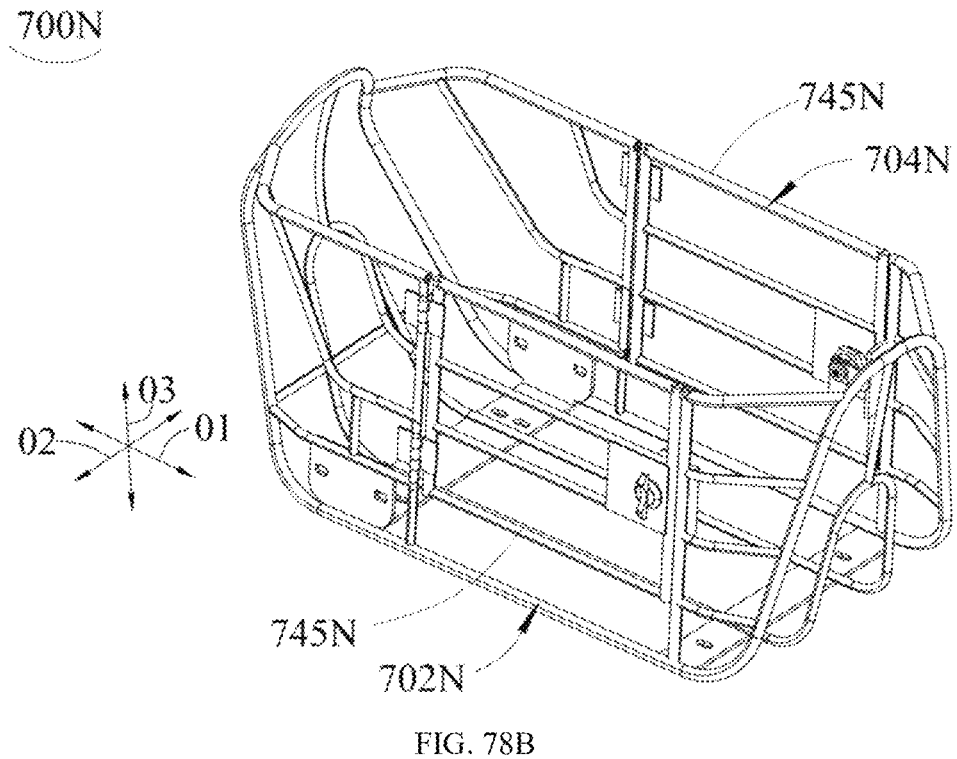

FIGS. 78A-78B are a set of schematic structural views of some other implementations of the storage mechanism, for example, the storage mechanism 700N.

Referring to FIG. 78A, the difference between the vehicle 14N and the vehicle 13M may include that the storage mechanism 700N may be provided with two side doors 745N. According to the position of the item or animal, the side door 745N that is closer in position is selected to be opened, improving convenience.

The storage mechanism 700N may be provided with side doors 745N on both the second limiting member 702N and the fourth limiting member 704N. According to the position of the item or animal, the side door 745N on the second limiting member 702N or the fourth limiting member 704N may be selected to be opened, which is helpful to provide convenience for the user.

In some embodiments, the two side doors 745N may be respectively provided on both sides of the storage mechanism 700N along the second direction 02. After the storage mechanism 700N is installed on the vehicle 14N, the two side doors 745N may be respectively located on both sides of the vehicle 14N along the second direction 02. Therefore, when the item or animal is located on any side of the vehicle 14N along the second direction 02, the item or animal may be placed in the storage mechanism 700N by opening the side door 745N on the corresponding side.

Figure 79A:
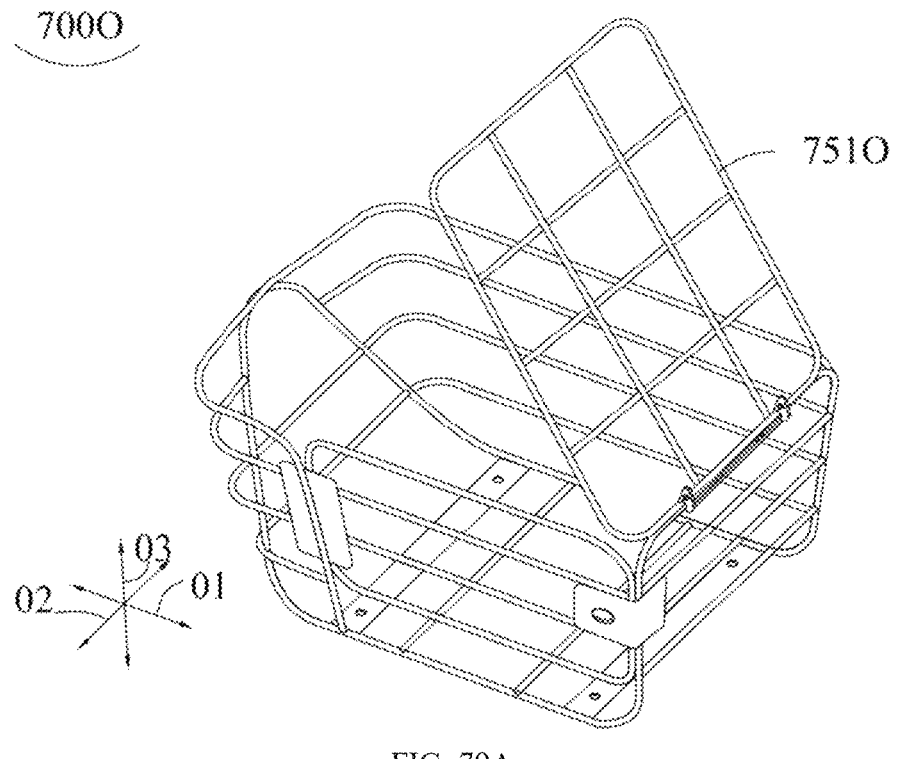
FIGS. 79A-79B are a set of schematic structural views of another implementation of the storage mechanism.
Figure 79B:
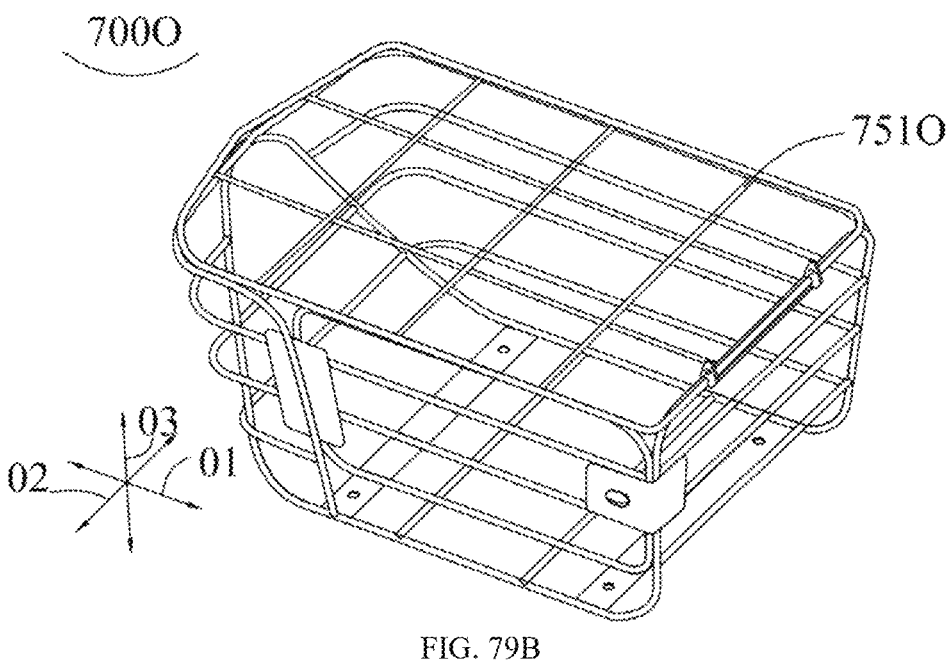

FIGS. 79A-79B are a set of schematic structural views of some other implementations of the storage mechanism, for example, the storage mechanism 700O.

Referring to FIGS. 79A and 79B, the storage mechanism 700O may include a basket lid 751O. The provision of the basket lid 751O, on the one hand, may reduce the risk of items or animals in the storage mechanism 700O falling out, for example, when the vehicle is in a bumpy state; on the other hand, while the volume of the storage mechanism 700O remains unchanged, in some cases, more items may be placed. For example, when the volume of the items to be placed is small, because the presence of the basket lid 751O is expected to reduce the risk of items falling out, more items may be placed in the storage mechanism 700O. In some cases, the basket lid 751O may reduce the risk of animals escaping unexpectedly.

In some embodiments, the basket lid 751O is detachable, so that the basket lid 751O may be installed or detached as needed to provide more convenience for the user.

In some embodiments, the basket lid 751O and the side wall of the storage mechanism 700O may be fixedly connected by means of snap-fitting or threaded connection.

Figure 80:
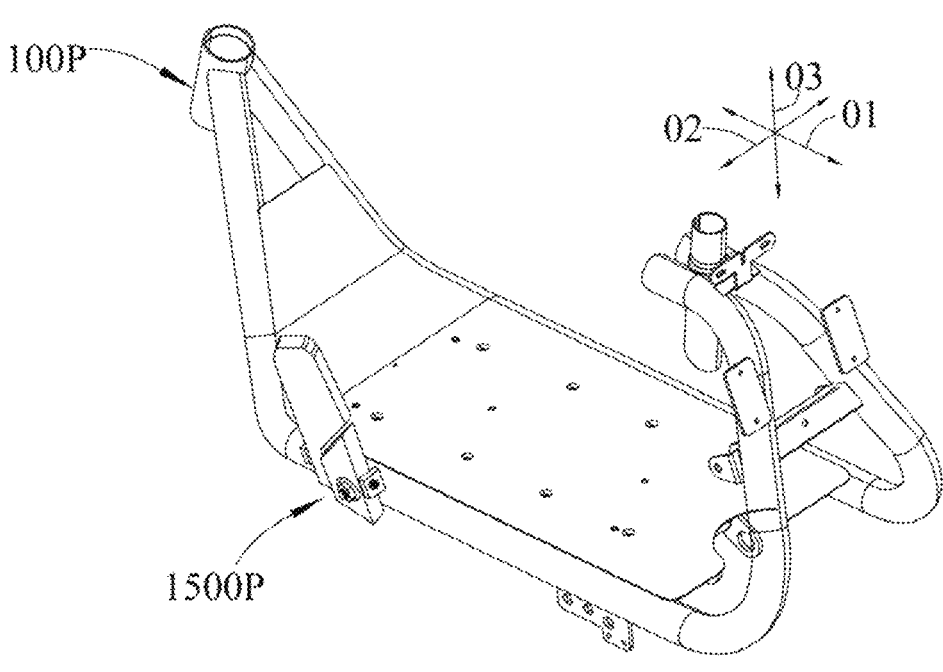
FIG. 80 is a schematic structural view of another implementation of the pedal assembly.

FIG. 80 is a schematic structural view of some other implementations of the pedal assembly, for example, the pedal assembly 1500P.

Referring to FIG. 80, in the vehicle provided in this embodiment, the pedal assembly 1500P may be fixedly provided on the frame 100P.

In some embodiments, the folding direction of the pedal assembly 1500P may be upward. In other words, the rotation axis of the pedal assembly 1500P may be approximately parallel to the first direction, that is, the angle between the rotation axis of the pedal assembly 1500P and the first direction may be in the range of 0-5°.

The user may realize the storage or unfolding of the pedal assembly 1500P mainly by moving the foot up and down along the third direction 03.

For example, when the vehicle is in a parked state (that is, the user is not sitting on the vehicle), the user may apply a force to the pedal assembly 1500P with their foot to make it flip downward, so that the pedal assembly 1500P changes to the unfolded state, which may be for the user to place their foot. Conversely, the user may also apply a force to the pedal assembly 1500P with their foot to make it flip upward, so that the pedal assembly 1500P changes to the stored state.

For another example, when the vehicle is in a ready-to-start state (that is, the user is sitting on the vehicle), the user may apply a force to the pedal assembly 1500P with their foot to make it flip downward, so that the pedal assembly 1500P changes to the unfolded state, which may be for the user to place their foot. Conversely, the user may also apply a force to the pedal assembly 1500P with their foot to make it flip upward, so that the pedal assembly 1500P changes to the stored state.

For another example, when the vehicle is in a driving state, the user may apply a force to the pedal assembly 1500P with their foot to make it flip downward, so that the pedal assembly 1500P changes to the unfolded state. Conversely, the user may also apply a force to the pedal assembly 1500P with their foot to make it flip upward, so that the pedal assembly 1500P changes to the stored state. The pedal assembly 1500P may be operated or adjusted by the user during driving without slowing down or stopping, which is expected to make the design convenient. For example, when the user encounters a narrow road (for example, passing through the space formed by two anti-collision bollards), they may retract the pedal assembly 1500P with their foot without slowing down or getting off the vehicle to reduce the vehicle's width; after passing, they may quickly unfold the pedal assembly 1500P to support their feet again, providing flexibility and safety. For another example, when the user encounters a rough road (for example, one side of the road is high and the other side is low), the user may retract the pedal assembly 1500P closer to the lower side of the ground to reduce the risk of it scraping or colliding with the ground, which is expected to improve riding safety.

It may be noted that the user may store both side pedal assemblies 1500P, or may store only one of them.

In some other embodiments, the pedal is retractable along the second direction to switch between an expanded state and a retracted state. Thus, when stepping is needed, the pedal may be extended to the expanded state; when not needed, the pedal may be shortened to the retracted state to avoid the pedal occupying space, and also to reduce the risk of collision with people or animals around.

In some other embodiments, the length of the pedal in the expanded state along the second direction is adjustable to adapt to the needs of different users. When the user's foot is wider, the length of the pedal is adjusted to be longer to improve the comfort of stepping; when the user's foot is narrower, the length of the pedal is adjusted to be shorter, so that the length is smaller while meeting the stepping needs, reducing the risk of collision with people or animals around.

In some other embodiments, the width of the pedal along the first direction is adjustable to adapt to the needs of different users. When the user's foot is longer, the width of the pedal is adjusted to be wider to improve the comfort of stepping; when the user's foot is shorter, the width of the pedal is adjusted to be narrower, so that the width is smaller while meeting the stepping needs, reducing the risk of collision with people or animals around. Alternatively, either of the two may be moved forward or backward relative to the other.

Figures 81A, 81B:
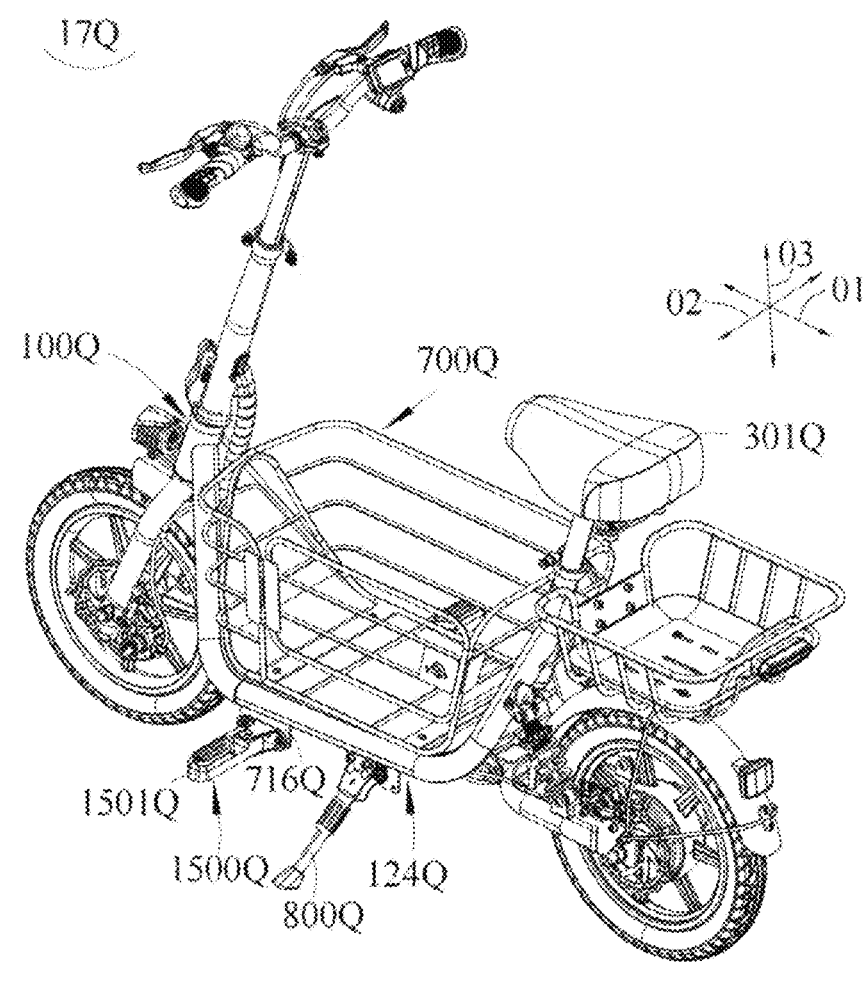
FIGS. 81A-81C are a set of schematic structural views of another implementation of the vehicle.
Figure 81C:
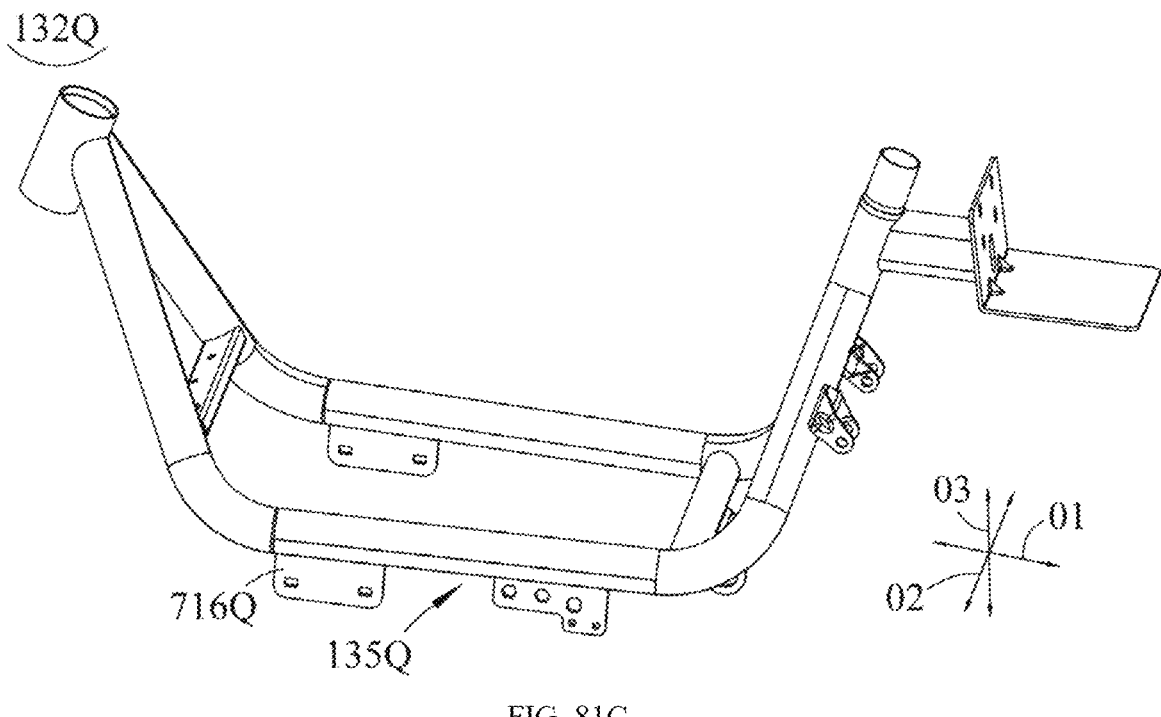

FIGS. 81A-81C are a set of schematic structural views of the vehicle 17Q.

Referring to FIG. 81A, the difference between the vehicle 17Q and the vehicle 13M may include that the mounting plate 716Q may be fixedly provided on the frame 100Q. When the user places their foot on the pedal assembly 1500Q, the user's stepping force may act on the frame 100Q through the pedal assembly 1500Q. Since the stability of the frame 100Q is high, the stability of the user's stepping is also high, which is expected to improve riding safety.

In some embodiments, referring to FIG. 81A, in some embodiments, along the third direction 03, the pedal assembly 1500Q may be located on the bottom side of the frame 100Q. When assembling and disassembling the storage mechanism 700Q, the interference of the pedal assembly 1500Q on this operation may be reduced to a extent. In addition, along the second direction 02 and the third direction 03, the distances between the pedal assembly 1500Q and the seat 301Q are both increased, increasing the placement space for the user's legs, which is expected to improve the user's riding comfort.

Referring to FIG. 81A, in some embodiments, the structure of the pedal assembly 1500Q is consistent with the structure of the pedal assembly 1500M in the vehicle 13M, which will not be repeated here. It may be understood that, in some other embodiments, the pedal assembly 1500Q installed on the frame 100Q may also be any other embodiment provided in this application.

In addition, referring to FIG. 81A, in some embodiments, as described above, the pedal 1501Q in the pedal assembly 1500Q may be folded backward. The pedal assembly 1500Q may be set closer to the frame 100Q, so that the folded pedal 1501Q is also closer to the frame 100Q, reducing the impact of the folded pedal 1501Q on objects, people or animals around the storage mechanism 700Q, and improving riding safety.

Referring to FIG. 81A, in some embodiments, the mounting plate 716Q may be located on the bottom side of the frame 100Q to reduce the impact of the mounting plate 716Q on the assembly and disassembly of the storage mechanism 700Q. In addition, the mounting plate 716Q may be located on the bottom side of the frame 100Q, so that the pedal assembly 1500Q is set closer to the frame 100Q, and the stepping position is also set closer to the frame 100Q, improving the user's stepping comfort. In addition, after the pedal assembly 1500Q is detached from the mounting plate 716Q, the mounting plate 716Q may be located on the bottom side of the frame 100Q, reducing the risk of people or animals around the vehicle 17Q accidentally bumping into the mounting plate 716Q. In some embodiments, the mounting plate 716Q may be fixedly provided on the second section 124Q of the frame 100Q. Along the third direction 03, the height of the second section 124Q of the frame 100Q is lower, so that the height of the mounting plate 716Q is lower, and the center of gravity of the mounting plate 716Q and the pedal assembly 1500Q is lower, which is expected to improve the stability of the vehicle 17Q and improve riding safety.

Referring to FIG. 81A, further, in some embodiments, the mounting plate 716Q may be set near the front end of the second section 124Q, so that the distance between the pedal assembly 1500Q and the seat 301Q is larger, to improve the riding comfort of the user's legs. In addition, the mounting plate 716Q may be set near the front end of the second section 124Q, reducing the risk of interference between the pedal 1501Q and the kickstand 800Q during folding, or reducing the probability of interference between the pedal assembly 1500Q and the kickstand 800Q. In some embodiments, the kickstand 800Q and one of the pedal assemblies 1500Q may be located on the same side of the vehicle 17Q. The pedal 1501Q in the pedal assembly 1500Q may be folded backward. If the distance between the pedal assembly 1500Q and the kickstand 800Q is small, the pedal 1501Q in the pedal assembly 1500Q may be blocked by the kickstand 800Q during the folding process, which affects the smooth folding of the pedal assembly 1500Q, and may also cause damage to the pedal 1501Q and the kickstand 800Q, affecting the service life of the pedal 1501Q and the kickstand 800Q. In addition, when the kickstand 800Q is in the support state shown in FIG. 81A, after the kickstand 800Q collides with the pedal 1501Q, it may cause the kickstand 800Q to rotate, that is, affecting the support stability of the kickstand 800Q, which in turn leads to a decrease in the support stability of the vehicle 17Q, and even has the risk of tipping over. In some embodiments, the mounting plate 716Q may be set near the front end of the second section 124Q, which reduces the risk of interference between the pedal assembly 1500Q and the kickstand 800Q, or reduces the probability of interference between the pedal assembly 1500Q and the kickstand 800Q, thereby reducing or avoiding the risk of mutual interference between the pedal assembly 1500Q and the kickstand 800Q, improving the service life of the pedal 1501Q and the kickstand 800Q, and improving the support stability of the vehicle 17Q.

Referring to FIG. 81B, in some embodiments, the distance $L_{Q1}$ between the mounting plate 716Q and the front end of the second section 124Q of the frame 100Q may be in the range of 1 mm-10 mm. On the one hand, $L_{Q1} \geq 1$ mm allows the mounting plate 716Q to be better fixed to the second section 124Q of the frame 100Q, improving the stability of the fixation of the mounting plate 716Q, which is expected to improve the stability of the pedal assembly 1500Q and the stability of stepping. On the other hand, the position where the mounting plate 716Q is fixedly connected to the second section 124Q of the frame 100Q deviates from the front end of the second section 124Q, reducing the risk of the front end of the second section 124Q being subjected to a large force due to the setting of the mounting plate 716Q, which helps to reduce the risk of stress concentration at the front end of the second section 124Q. On another hand, $L_{Q1} \leq 10$ mm makes the distance between the pedal assembly 1500Q and the seat 301Q larger, which is expected to improve the user's riding comfort.

In some embodiments, $L_{Q1}$ may be any value in the range of 1 mm-10 mm, for example, 1 mm, 2 mm, 3 mm, 4 mm, 5 mm, 6 mm, 7 mm, 8 mm, 9 mm, and 10 mm.

Referring to FIG. 81C, in some embodiments, the mounting plate 716Q may be fixedly provided on the bracket 135Q of the mounting frame 132Q. The strength of the bracket 135Q in the mounting frame 132Q may be high, so that the stability of the mounting plate 716Q is also high, which is expected to make the stability of the pedal assembly 1500Q also high, so as to improve the stability of the user's stepping.

In some embodiments, the mounting plate 716Q and the frame 100Q may be fixedly connected by welding. It may be understood that, in some other embodiments, the way of fixedly connecting the mounting plate 716Q and the frame 100Q is not limited to this, and may also be fixedly connected by threaded connection, riveting, snap-fit connection, etc., which is not specifically limited here.

Figure 82A:
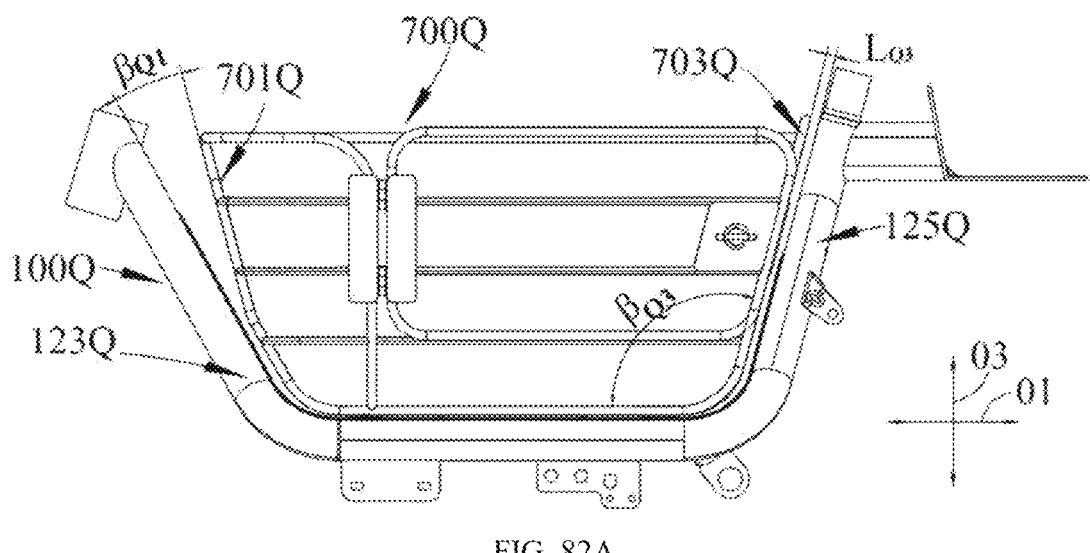
FIGS. 82A-82G are a set of schematic structural views of the storage mechanism.
Figure 82B:
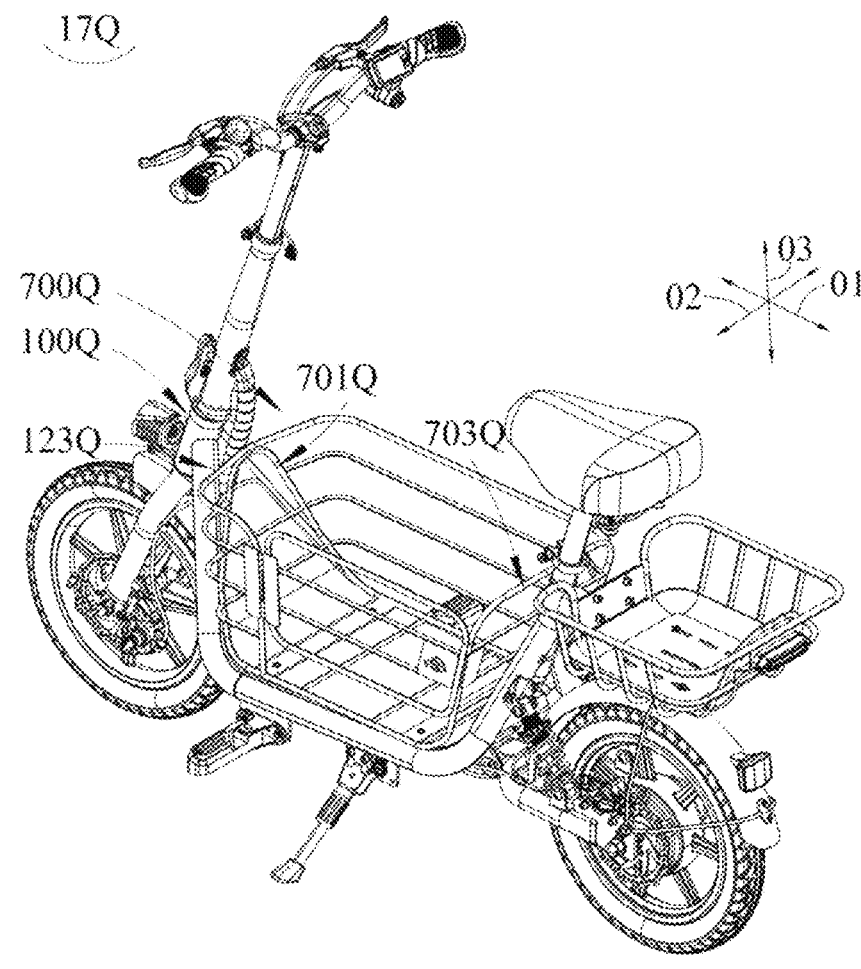
Figure 82C:
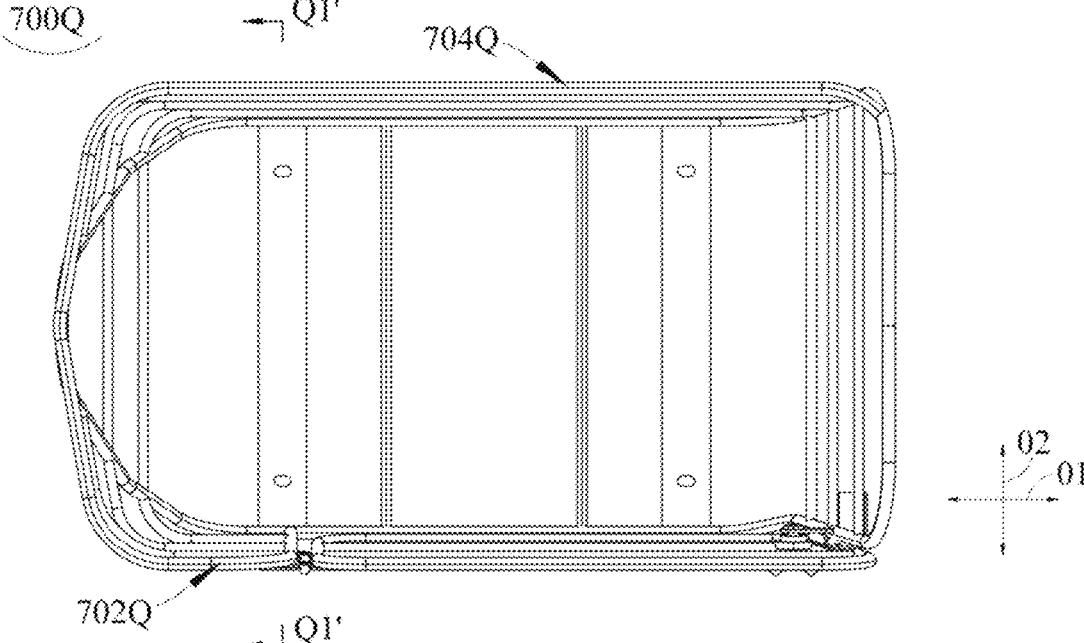
Figure 82D:
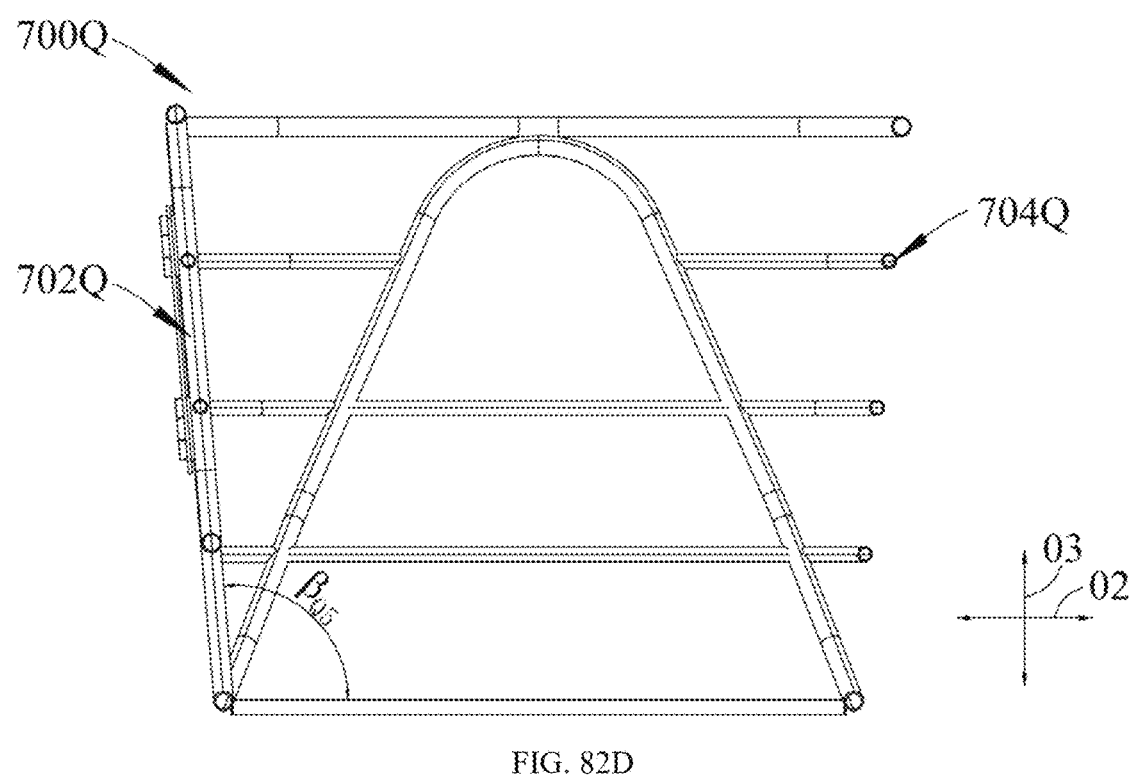

FIGS. 82A-82G are a set of schematic structural views of the storage mechanism 700Q. Among them, FIG. 82D is a cross-sectional view along Q1'-Q1' in FIG. 82C.

Referring to FIG. 82A, in some embodiments, the first limiting member 701Q of the storage mechanism 700Q may be inclined backward relative to the first section 123Q of the frame 100Q, to reduce the collision risk between the storage mechanism 700Q and the first section 123Q, which is expected to improve the service life of the storage mechanism 700Q and the frame 100Q. For example, when the vehicle 17Q is moving, both the storage mechanism 700Q and the frame 100Q may vibrate. The first limiting member 701Q is inclined backward relative to the first section 123Q of the frame 100Q, so that there is a gap between the first limiting member 701Q and the first section 123Q. Even if the storage mechanism 700Q and the frame 100Q vibrate, the collision risk between the storage mechanism 700Q and the first section 123Q is expected to be reduced.

Referring to FIG. 82B, in addition, the first limiting member 701Q of the storage mechanism 700Q may be hollowed out. Items or animal hair placed in the storage mechanism 700Q may extend out through the hollowed-out part of the first limiting member 701Q. The first limiting member 701Q of the storage mechanism 700Q may be inclined backward relative to the first section 123Q of the frame 100Q, so that there is a gap between the first limiting member 701Q and the first section 123Q, to reduce the risk of items or animal hair extending out through the hollowed-out part of the first limiting member 701Q being pinched by the first limiting member 701Q and the first section 123Q.

Referring to FIG. 82A, in some embodiments, the angle $\beta_{Q1}$ between the first limiting member 701Q and the first section 123Q may be in the range of 8°-20°. $B_{Q1} \geq 8°$ reduces the collision risk between the storage mechanism 700Q and the first section 123Q of the frame 100Q, and is expected to reduce the risk of items or animal hair extending out through the hollowed-out part of the first limiting member 701Q being pinched. $B_{Q1} \leq 20°$ is expected to allow the storage mechanism 700Q to have a larger storage space.

In some embodiments, Boi may be any value in the range of 8°–20°, for example, 8°, 10°, 12°, 14°, 16°, 18°, and 20°.

Referring to FIG. 82A, in some embodiments, the third limiting member 703Q of the storage mechanism 700Q may be inclined backward to increase the storage space of the storage mechanism 700Q.

Referring to FIG. 82A, in some embodiments, the angle $\beta_{Q3}$ between the third limiting member 703Q and the bottom wall of the storage mechanism 700Q may be in the range of 91°-120°. $B_{Q3} \geq 91°$ is expected to increase the storage space of the storage mechanism 700Q. $B_{Q3} \leq 120°$ is expected to reduce the risk of items or animals in the storage mechanism 700Q sliding out through the third limiting member 703Q.

In some embodiments, $B_{Q3}$ may be any value in the range of 91°-120°, for example, 91°, 95°, 99°, 103°, 107°, 111°, 115°, 119°, and 120°.

Referring to FIG. 82A, in some embodiments, the third section 125Q of the frame 100Q may be inclined backward. The inclination angles of the third limiting member 703Q of the storage mechanism 700Q and the third section 125Q of the frame 100Q may be approximately the same, so that the third limiting member 703Q of the storage mechanism 700Q may be set closer to the third section 125Q of the frame 100Q, so that the storage mechanism 700Q has a larger accommodation space. It may be noted that the inclination angles of the third limiting member 703Q of the storage mechanism 700Q and the third section 125Q of the frame 100Q being approximately the same means that the angle between the third limiting member 703Q of the storage mechanism 700Q and the third section 125Q of the frame 100Q may be in the range of 0-5°.

Referring to FIG. 82A, in some embodiments, the distance Los between the third limiting member 703Q of the storage mechanism 700Q and the third section 125Q of the frame 100Q may be in the range of 75 mm-100 mm. In some embodiments, LQ3≤100 mm is expected to allow the storage mechanism 700Q to have a larger accommodation space. $L_{Q3} \geq 75$ mm is expected to reduce the risk of friction or collision between the third limiting member 703Q and the third section 125Q, and improve the service life of the storage mechanism 700Q and the frame 100Q. In some embodiments, when the vehicle 17Q is moving, both the storage mechanism 700Q and the frame 100Q may vibrate, causing relative movement between the third limiting member 703Q of the storage mechanism 700Q and the third section 125Q of the frame 100Q. $L_{Q3} \geq 75$ mm, even if relative movement occurs between the third limiting member 703Q of the storage mechanism 700Q and the third section 125Q of the frame 100Q, the risk of friction or collision between the third limiting member 703Q and the third section 125Q may also be reduced, improving the service life of the storage mechanism 700Q and the frame 100Q.

In some embodiments, $L_{Q3}$ may be any value in the range of 75 mm-100 mm, for example, 75 mm, 78 mm, 81 mm, 84 mm, 87 mm, 90 mm, 93 mm, 96 mm, 99 mm, and 100 mm.

Referring to FIG. 82A, in some embodiments, the inclination angles of the third limiting member 703Q of the storage mechanism 700Q and the third section 125Q of the frame 100Q may be approximately the same, and the third limiting member 703Q of the storage mechanism 700Q may be adjacent to the third section 125Q of the frame 100Q. Therefore, the third section 125Q of the frame 100Q may also block local parts of items and animals in the storage mechanism 700Q from being squeezed out from the hollowed-out part of the third limiting member 703Q, reducing the risk of falling.

Referring to FIG. 82C, in some embodiments, the second limiting member 702Q and the fourth limiting member 704Q of the storage mechanism 700Q may both be inclined outward, so that the storage mechanism 700Q has a larger accommodation space.

Referring to FIG. 82D, in some embodiments, the angle $\beta_{Q5}$ between the second limiting member 702Q and the bottom wall of the storage mechanism 700Q may be in the range of 91°-110°. $B_{Q5} \geq 91°$ allows the storage mechanism 700Q to have a larger accommodation space. $B_{Q5} \leq 110°$ makes the opening of the storage mechanism 700Q along the second direction 02 suitable, reducing the risk of items in the storage mechanism 700Q sliding out of the storage mechanism 700Q. In addition, $B_{Q5} \leq 110°$ makes the opening of the storage mechanism 700Q along the second direction 02 suitable, which is expected to improve the user's riding comfort.

In some embodiments, Bos may be any value in the range of 91°-110°, for example, 91°, 94°, 97°, 100°, 103°, 106°, 109°, and 110°.

Referring to FIGS. 82C and 82D, in some embodiments, the inclination degrees of the second limiting member 702Q and the fourth limiting member 704Q of the storage mechanism 700Q may be approximately the same. On the one hand, it is expected to improve the aesthetic effect of the storage mechanism 700Q; on the other hand, it reduces the risk of the storage mechanism 700Q being heavier on one side along the second direction 02, which is convenient for maintaining the balance performance of the vehicle 17Q, and improves riding safety and riding stability. It may be noted that the inclination degrees of the second limiting member 702Q and the fourth limiting member 704Q of the storage mechanism 700Q being approximately the same means that the difference between the angle between the second limiting member 702Q and the third direction 03, and the angle between the fourth limiting member 704Q and the third direction 03 may be in the range of −5° to +5°.

Figure 82E:
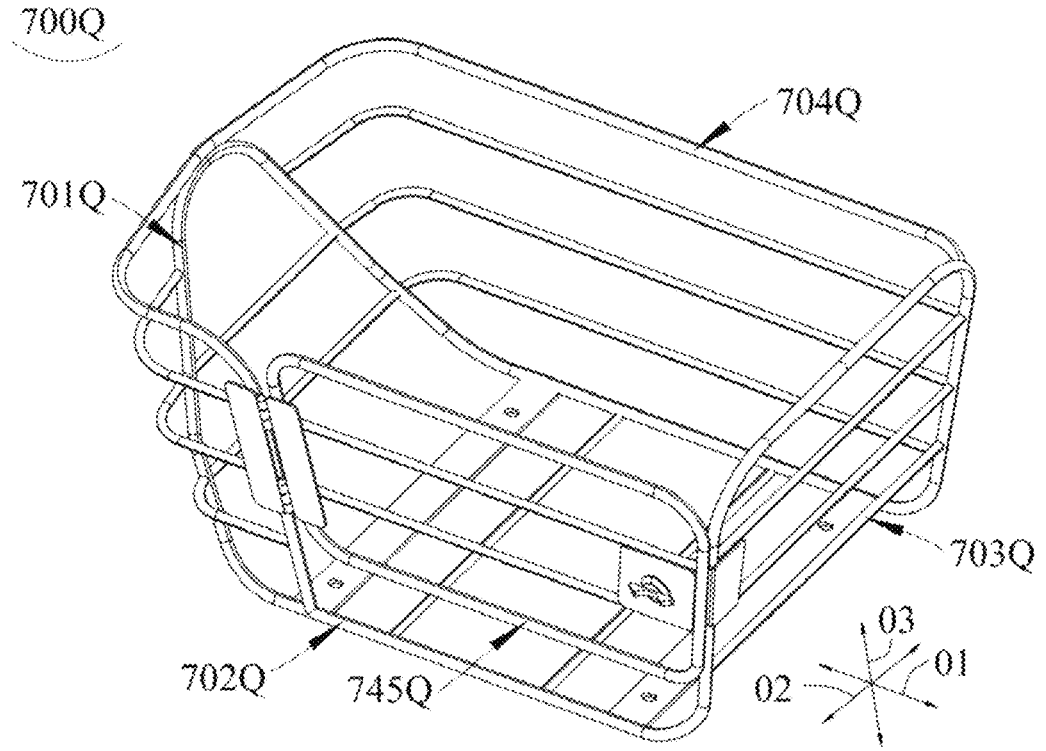

Referring to FIG. 82E, in some embodiments, the side door 745Q may extend backward to the position where the second limiting member 702Q and the third limiting member 703Q of the storage mechanism 700Q are connected, and the length of the side door 745Q along the first direction 01 is large. Correspondingly, the opening of the storage mechanism 700Q corresponding to the side door 745Q is also large, which is convenient for items or animals to get in and out, and reduces the risk of items or animals being hit by the side wall of the storage mechanism 700Q.

In addition, referring to FIG. 82E, in some embodiments, the rear end of the side door 745Q may be directly connected to the third limiting member 703Q of the storage mechanism 700Q, which makes the structure of the second limiting member 702Q of the storage mechanism 700Q simpler. The rear end of the side door 745Q being directly connected to the third limiting member 703Q of the storage mechanism 700Q means that when the side door 745Q is in the closed state, the side door 745Q may be locked with the third limiting member 703Q of the storage mechanism 700Q, so that the third limiting member 703Q is kept in the closed state.

Referring to FIG. 82E, in some embodiments, the first limiting member 701Q, the third limiting member 703Q, the second limiting member 702Q, and the fourth limiting member 704Q may each include a plurality of relatively fixed side rods, which has a simple structure, is easy to process, and is suitable for the lightweight design of the storage mechanism 700Q.

Referring to FIG. 82E, in some embodiments, the ratio of the total area of the hollowed-out parts on the first limiting member 701Q to the total area of the first limiting member 701Q may be in the range of 0.5-0.98, which has a higher hollowed-out area while meeting the shielding requirements.

In some embodiments, the ratio of the total area of the hollowed-out parts on the first limiting member 701Q to the total area of the first limiting member 701Q may be any value in the range of 0.5-0.98, for example, 0.5, 0.58, 0.66, 0.74, 0.82, 0.90, and 0.98.

Referring to FIG. 82E, in some embodiments, the ratio of the total area of the hollowed-out parts on the third limiting member 703Q to the total area of the third limiting member 703Q may be in the range of 0.5-0.98, which has a higher hollowed-out area while meeting the shielding requirements.

In some embodiments, the ratio of the total area of the hollowed-out parts on the third limiting member 703Q to the total area of the third limiting member 703Q may be any value in the range of 0.5-0.98, for example, 0.5, 0.58, 0.66, 0.74, 0.82, 0.90, and 0.98.

Referring to FIG. 82E, in some embodiments, the ratio of the total area of the hollowed-out parts on the second limiting member 702Q to the total area of the second limiting member 702Q may be in the range of 0.5-0.98, which has a higher hollowed-out area while meeting the shielding requirements.

Specifically, the ratio of the total area of the hollowed-out parts on the second limiting member 702Q to the total area of the second limiting member 702Q may be any value in the range of 0.5-0.98, for example, 0.5, 0.58, 0.66, 0.74, 0.82, 0.90, and 0.98.

Referring to FIG. 82E, in some embodiments, the ratio of the total area of the hollowed-out parts on the fourth limiting member 704Q to the total area of the fourth limiting member 704Q may be in the range of 0.5-0.98, which has a higher hollowed-out area while meeting the shielding requirements.

In some embodiments, the ratio of the total area of the hollowed-out parts on the fourth limiting member 704Q to the total area of the fourth limiting member 704Q may be any value in the range of 0.5-0.98, for example, 0.5, 0.58, 0.66, 0.74, 0.82, 0.90, and 0.98.

Figure 82F:
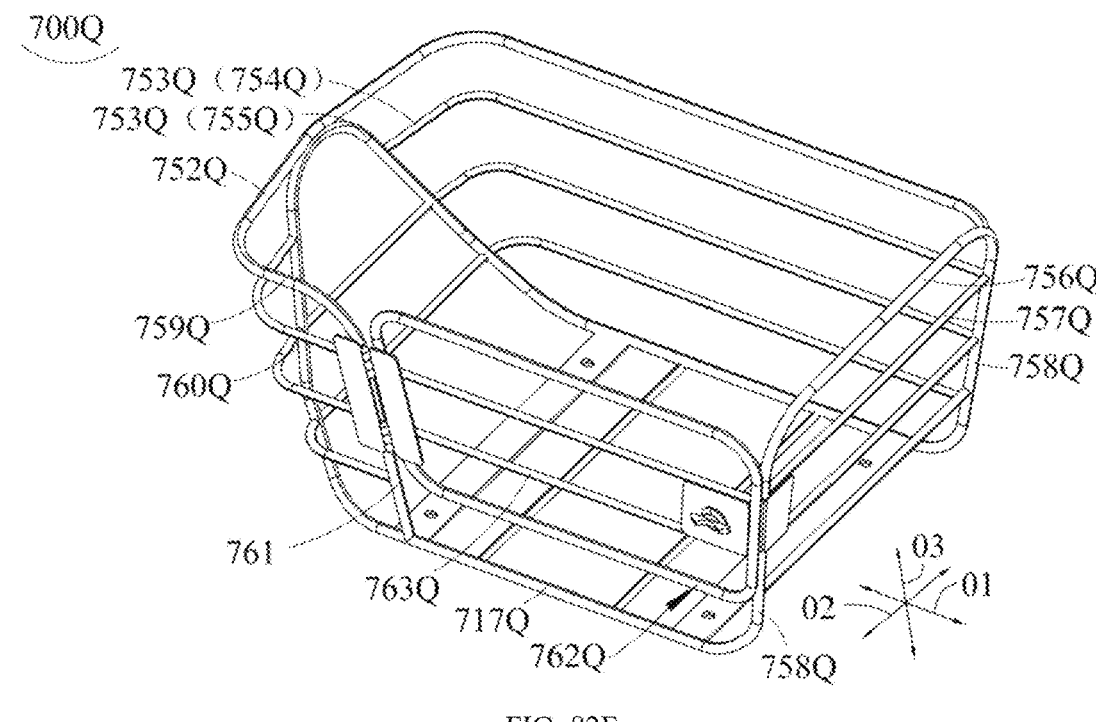

Referring to FIGS. 82E and 82F, in some embodiments, the first limiting member 701Q may include a first upper side rod 752Q and a plurality of first middle side rods 753Q. The provision of the plurality of first middle side rods 753Q helps to reduce the size of a single hollowed-out part on the first limiting member 701Q, reducing the risk of items in the storage mechanism 700Q falling out through the hollowed-out parts on the first limiting member 701Q.

In some embodiments, among the plurality of first middle side rods 753Q, some may extend along the second direction 02, and the extension direction of some may be arranged to cross the second direction 02. For convenience of description, the first middle side rods 753Q that may extend along the second direction 02 are referred to as horizontal side rods 754Q, and the first middle side rods 753Q whose extension direction may be arranged to cross the second direction 02 are referred to as diagonal side rods 755Q. The cross arrangement of the horizontal side rods 754Q and the diagonal side rods 755Q further reduces the size of a single hollowed-out part on the first limiting member 701Q, and is expected to reduce the risk of items in the storage mechanism 700Q falling out through the hollowed-out parts on the first limiting member 701Q.

It may be understood that, in some other embodiments, the extension direction of the first middle side rod 753Q may also be other directions. The extension directions of different first middle side rods 753Q may be the same or different.

Referring to FIG. 82F, in some embodiments, the first upper side rod 752Q may also extend along the second direction 02, parallel to the first middle horizontal side rod 754Q. It may be understood that, in some other embodiments, the first upper side rod 752Q is not limited to extending along the second direction 02, and may also extend in other directions. Correspondingly, the first upper side rod 752Q is also not limited to being parallel to the first middle horizontal side rod 754Q.

Referring to FIG. 82F, in some embodiments, in the direction perpendicular to the second direction 02 and parallel to the first limiting member 701Q, the distance between adjacent horizontal side rods 754Q may be in the range of 3 mm-9 mm. A distance between adjacent horizontal side rods 754Q of less than or equal to 3 mm is suitable for the lightweight design of the storage mechanism 700Q. A distance between adjacent horizontal side rods 754Q of greater than or equal to 9 mm avoids the hollowed-out part from being too large.

Specifically, in the direction perpendicular to the second direction 02 and parallel to the first limiting member 701Q, the distance between adjacent horizontal side rods 754Q may be any value in the range of 3 mm-9 mm, such as 3 mm, 4 mm, 5 mm, 6 mm, 7 mm, 8 mm, and 9 mm.

Referring to FIG. 82F, in some embodiments, the number of the diagonal side rods 755Q may be two, and they may be arranged in a V-shape, which is expected to improve the support strength of the first limiting member 701Q. Further, in some embodiments, the two diagonal side rods 755Q may converge and connect at the top end, and the two diagonal side rods 755Q may support each other, further improving the support strength of the first limiting member 701Q. Still further, in some embodiments, the top ends of the two diagonal side rods 755Q may be fixedly connected to the first upper side rod 752Q at the same time, to better maintain the height of the first upper side rod 752Q along the third direction 03, and improve the support effect of the first limiting member 701Q. It may be understood that, in some other embodiments, different diagonal side rods 755Q may also not converge and connect; the top end of the first middle diagonal side rod 755Q may also be lower than the first upper side rod 752Q.

Referring to FIG. 82F, in some embodiments, the position where the two diagonal side rods 755Q connect may be located at the middle position of the first upper side rod 752Q. The bottom end of the first middle diagonal side rod 755Q may be located at the bottom corner position of the corresponding side of the first limiting member 701Q, so that the overall support strength of the first limiting member 701Q is strong. It may be understood that, in some other embodiments, the starting positions of the diagonal side rods 755Q may all be changed.

Referring to FIG. 82F, along the third direction 03, the first middle horizontal side rod 754Q located on the top side may be interrupted by the first middle diagonal side rod 755Q, which is convenient for the lightweight design of the storage mechanism 700Q. The two diagonal side rods 755Q may be arranged in a V-shape, and the closer to the top end, the closer the distance between the two diagonal side rods 755Q. Even if the first middle horizontal side rod 754Q located on the top side is interrupted, it will not cause the hollowed-out part of the position to be large.

Referring to FIGS. 82E and 82F, in some embodiments, the third limiting member 703Q may include a second upper side rod 756Q, a plurality of second middle side rods 757Q, and a outer side rod 758Q provided on both sides of the third limiting member 703Q along the second direction 02. The provision of the plurality of second middle side rods 757Q and the outer side rod 758Q reduces the size of a single hollowed-out part on the third limiting member 703Q, reducing the risk of items in the storage mechanism 700Q falling out through the hollowed-out parts on the third limiting member 703Q.

Referring to FIG. 82F, in some embodiments, the second middle side rod 757Q may extend along the second direction 02. It may be understood that the plurality of second middle side rods 757Q are arranged in parallel. It may be understood that, in some other embodiments, the extension direction of the plurality of second middle side rods 757Q is not limited to the second direction 02, and the plurality of second middle side rods 757Q are not limited to being all arranged in parallel.

In some embodiments, in the direction perpendicular to the second direction 02 and parallel to the third limiting member 703Q, the distance between adjacent second middle side rods 757Q may be in the range of 40 mm-70 mm. A distance between adjacent second middle side rods 757Q of greater than or equal to 40 mm is suitable for the lightweight design of the storage mechanism 700Q. A distance between adjacent second middle side rods 757Q of less than or equal to 70 mm avoids the hollowed-out part from being too large.

In some embodiments, in the direction perpendicular to the second direction 02 and parallel to the third limiting member 703Q, the distance between adjacent second middle side rods 757Q may be any value in the range of 40 mm-70 mm, such as 40 mm, 45 mm, 50 mm, 55 mm, 60 mm, 65 mm, and 70 mm.

In some embodiments, in the direction perpendicular to the second direction 02 and parallel to the third limiting member 703Q, the distance between the second upper side rod 756Q and the adjacent second middle side rod 757Q may be in the range of 50 mm-80 mm. A distance between the second upper side rod 756Q and the adjacent second middle side rod 757Q of greater than or equal to 50 mm is suitable for the lightweight design of the storage mechanism 700Q. A distance between the second upper side rod 756Q and the adjacent second middle side rod 757Q of less than or equal to 80 mm avoids the hollowed-out part from being too large.

In some embodiments, in the direction perpendicular to the second direction 02 and parallel to the third limiting member 703Q, the distance between the second upper side rod 756Q and the adjacent second middle side rod 757Q may be any value in the range of 50 mm-80 mm, for example, 50 mm, 55 mm, 60 mm, 65 mm, 70 mm, 75 mm, and 80 mm.

Referring to FIGS. 82E and 82F, in some embodiments, the second limiting member 702Q may include a third upper side rod 759Q, a plurality of third middle side rods 760Q, and a mounting rail 761Q. The provision of the plurality of third middle side rods 760Q reduces the size of a single hollowed-out part on the second limiting member 702Q, reducing the risk of items in the storage mechanism 700Q falling out through the hollowed-out parts on the second limiting member 702Q. The provision of the mounting rail 761Q may be used to install the side door 745Q. In addition, the provision of the mounting rail 761Q may also reduce the size of a single hollowed-out part on the second limiting member 702Q, reducing the risk of items in the storage mechanism 700Q falling out through the hollowed-out parts on the second limiting member 702Q.

Referring to FIG. 82F, in some embodiments, the third middle side rod 760Q may extend along the first direction 01. It may be understood that the plurality of third middle side rods 760Q are arranged in parallel. It may be understood that, in some other embodiments, the extension direction of the plurality of third middle side rods 760Q is not limited to the first direction 01, and the plurality of third middle side rods 760Q are not limited to being all arranged in parallel.

In some embodiments, in the direction perpendicular to the first direction 01 and parallel to the second limiting member 702Q, the distance between adjacent third middle side rods 760Q may be in the range of 35 mm-65 mm. A distance between adjacent third middle side rods 760Q of greater than or equal to 35 mm is suitable for the lightweight design of the storage mechanism 700Q. A distance between adjacent third middle side rods 760Q of less than or equal to 65 mm avoids the hollowed-out part from being too large.

In some embodiments, in the direction perpendicular to the first direction 01 and parallel to the second limiting member 607, the distance between adjacent third middle side rods 760Q may be any value in the range of 35 mm-65 mm, such as 35 mm, 40 mm, 45 mm, 50 mm, 55 mm, 60 mm, and 65 mm.

In some embodiments, in the direction perpendicular to the first direction 01 and parallel to the second limiting member 702Q, the distance between the third upper side rod 759Q and the adjacent third middle side rod 760Q may be in the range of 35 mm-70 mm. A distance between the third upper side rod 759Q and the adjacent third middle side rod 760Q of greater than or equal to 35 mm is suitable for the lightweight design of the storage mechanism 700Q. A distance between the third upper side rod 759Q and the adjacent third middle side rod 760Q of less than or equal to 70 mm avoids the hollowed-out part from being too large.

In some embodiments, in the direction perpendicular to the first direction 01 and parallel to the second limiting member 702Q, the distance between the third upper side rod 759Q and the adjacent third middle side rod 760Q may be any value in the range of 35 mm-70 mm, for example, 35 mm, 41 mm, 47 mm, 53 mm, 59 mm, 65 mm, and 70 mm.

Referring to FIG. 82E, in some embodiments, the side door 745Q may be hollowed out, and may include a plurality of relatively fixed side rods, which has a simple structure, is easy to process, and is suitable for the lightweight design of the storage mechanism 700Q.

Figure 82G:
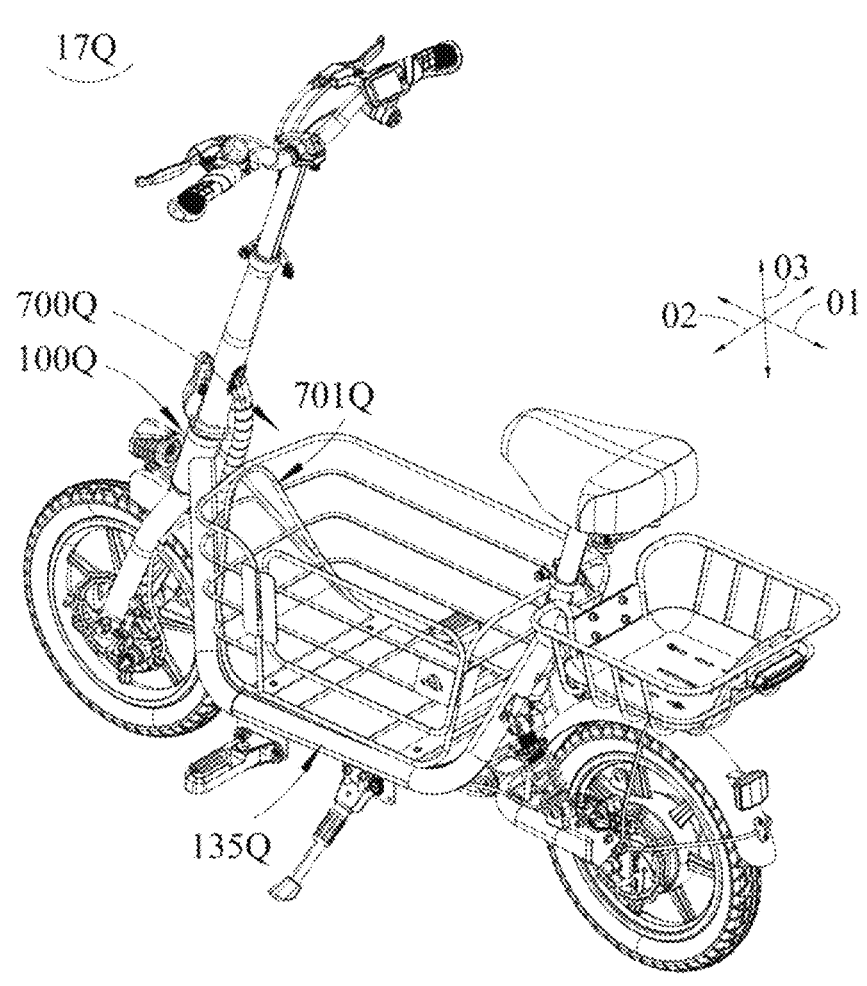

Referring to FIGS. 82F and 82G, in some embodiments, the ratio of the outer diameter of the bracket 135Q to the outer diameter of the third upper side rod 759Q is $K_{Q1}$, and $K_{Q1}$ may be in the range of 4-4.8. $K_{Q1} \geq 4$ allows the third upper side rod 759Q to have a suitable outer diameter, which is expected to reduce the weight of the third upper side rod 759Q and contribute to the lightweight design of the storage mechanism 700Q. In addition, the appearance of the third upper side rod 759Q and the bracket 135Q has a better visual effect. $K_{Q1} \leq 4.8$ allows the third upper side rod 759Q to have a suitable outer diameter to have the structural strength that matches the loading requirements. In addition, the appearance of the third upper side rod 759Q and the bracket 135Q has a better look and feel.

Specifically, $K_{Q1}$ may be any value in the range of 4-4.8, for example, 4, 4.1, 4.2, 4.3, 4.4, 4.5, 4.6, 4.7, and 4.8.

Referring to FIGS. 82F and 82G, in some embodiments, the ratio of the outer diameter of the bracket 135Q to the outer diameter of the third middle side rod 760Q is $K_{Q3}$, and $K_{Q1}$ may be in the range of 5-6.5. $K_{Q3} \geq 5$ allows the third middle side rod 760Q to have a suitable outer diameter, which is expected to reduce the weight of the third middle side rod 760Q and contribute to the lightweight design of the storage mechanism 700Q. In addition, the appearance of the third middle side rod 760Q and the bracket 135Q has a better visual effect. $K_{Q3} \leq 6.5$ allows the third middle side rod 760Q to have a suitable outer diameter to have the structural strength that matches the loading requirements. In addition, the appearance of the third middle side rod 760Q and the bracket 135Q has a better look and feel.

Specifically, $K_{Q3}$ may be any value in the range of 5-6.5, for example, 5, 5.1, 5.2, 5.3, 5.4, 5.5, 5.6, 5.7, 5.8, 5.9, 6, 6.1, 6.2, 6.3, 6.4, and 6.5.

Referring to FIGS. 82F and 82G, in some embodiments, the ratio of the outer diameter of the bracket 135Q to the outer diameter of the outer frame 762Q is Kos, and Kos may be in the range of 4-4.8. $K_{Q5} \geq 4$ allows the outer frame 762Q to have a suitable outer diameter, which is expected to reduce the weight of the outer frame 762Q and contribute to the lightweight design of the storage mechanism 700Q. In addition, the appearance of the outer frame 762Q and the bracket 135Q has a better visual effect. $K_{Q5} \leq 4.8$ allows the outer frame 762Q to have a suitable outer diameter to have the structural strength that matches the loading requirements. In addition, the appearance of the outer frame 762Q and the bracket 135Q has a better look and feel.

Specifically, Kos may be any value in the range of 4-4.8, for example, 4, 4.1, 4.2, 4.3, 4.4, 4.5, 4.6, 4.7, and 4.8.

Referring to FIGS. 82F and 82G, in some embodiments, the ratio of the outer diameter of the bracket 135Q to the outer diameter of the fourth middle side rod 763Q of the door is $K_{Q7}$, and $K_{Q7}$ may be in the range of 5-6.5. $K_{Q7} \geq 5$ allows the fourth middle side rod 763Q of the door to have a suitable outer diameter, which is expected to reduce the weight of the fourth middle side rod 763Q of the door and contribute to the lightweight design of the storage mechanism 700Q. In addition, the appearance of the fourth middle side rod 763Q of the door and the bracket 135Q has a better visual effect. $K_{Q7} \leq 6.5$ allows the fourth middle side rod 763Q of the door to have a suitable outer diameter to have the structural strength that matches the loading requirements. In addition, the appearance of the fourth middle side rod 763Q of the door and the bracket 135Q has a better look and feel.

Specifically, $K_{Q7}$ may be any value in the range of 5-6.5, for example, 5, 5.1, 5.2, 5.3, 5.4, 5.5, 5.6, 5.7, 5.8, 5.9, 6, 6.1, 6.2, 6.3, 6.4, and 6.5.

Referring to FIGS. 82E and 82F, in some embodiments, the side door 745Q may include an annular outer frame 762Q and a fourth middle side rod 763Q of the door provided in the outer frame 762Q. The provision of the plurality of fourth middle side rods 763Q of the door may reduce the size of a single hollowed-out part on the side door 745Q, reducing the risk of items in the storage mechanism 700Q falling out through the hollowed-out parts on the side door 745Q.

In some embodiments, the fourth middle side rod 763Q of the door may extend along the first direction 01. It may be understood that, in some other embodiments, the extension direction of the plurality of fourth middle side rods 763Q of the door is not limited to the first direction 01.

Referring to FIG. 82F, in some embodiments, the number of the fourth middle side rods 763Q of the door may be multiple, and the multiple fourth middle side rods 763Q of the door are arranged in parallel. It may be understood that, in some other embodiments, the multiple fourth middle side rods 763Q of the door are not limited to being all arranged in parallel, and may also be arranged crosswise.

In some embodiments, in the direction perpendicular to the first direction 01 and parallel to the side door 745Q, the distance between adjacent fourth middle side rods 763Q of the door may be in the range of 35 mm-70 mm. A distance between adjacent fourth middle side rods 763Q of the door of greater than or equal to 35 mm is suitable for the lightweight design of the storage mechanism 700Q. A distance between adjacent fourth middle side rods 763Q of the door of less than or equal to 70 mm avoids the hollowed-out part from being too large.

Specifically, in the direction perpendicular to the first direction 01 and parallel to the side door 745Q, the distance between adjacent fourth middle side rods 763Q of the door may be any value in the range of 35 mm-70 mm, such as 35 mm, 41 mm, 47 mm, 53 mm, 59 mm, 65 mm, and 70 mm.

Referring to FIG. 82F, in some embodiments, along the third direction 03, there may be a gap between the side door 745Q and the edge-crossbar 717Q. This reduces the overall size of the side door 745Q, facilitating the lightweight design of the storage mechanism 700Q.

In addition, along the third direction 03, having a gap between the side door 745Q and the edge-crossbar 717Q is expected to reduce friction between the side door 745Q and the edge-crossbar 717Q, improving the service life of the side door 745Q and the edge-crossbar 717Q.

Referring to FIG. 82F, in some embodiments, along the third direction 03, the height of the bottom wall of the outer frame 762Q may be approximately the same as the height of the third middle side rod 760Q located on the bottom side of the second limiting member 702Q, to improve the structural consistency of the second limiting member 702Q and the outer frame 762Q, which is expected to improve the aesthetic effect.

Referring to FIG. 82F, in some embodiments, the number of the fourth middle side rods 763Q of the door may be two. Along the third direction 03, the heights of the two fourth middle side rods 763Q of the door may be the same as the heights of the third middle side rods 760Q located in the middle and on the top side, respectively, to improve the structural consistency of the second limiting member 702Q and the outer frame 762Q, which is expected to improve the aesthetic effect. Of course, it may be understood that, in some other embodiments, the number of the fourth middle side rods 763Q of the door is not limited to two, and may also be one or more. In addition, in some other embodiments, the height of at least some of the fourth middle side rods 763Q of the door in the third direction 03 may be different from the height of any third middle side rod 760Q in the third direction 03, which is expected to increase the recognizability of the side door 745Q.

In some embodiments, the material of the outer frame 762Q may be carbon structural steel, which has both good support strength and is easy to shape.

In other embodiments, the material of the outer frame 762Q may also be other metal materials or plastics. Other metal materials include but are not limited to stainless steel and aluminum alloy. Plastics include but are not limited to polypropylene (PP), polyethylene (PE), and ABS plastic.

In some embodiments, the material of the fourth middle side rod 763Q of the door may be carbon structural steel, which has both good support strength and is easy to shape.

In other embodiments, the material of the fourth middle side rod 763Q of the door may also be other metal materials or plastics. Other metal materials include but are not limited to stainless steel and aluminum alloy. Plastics include but are not limited to polypropylene (PP), polyethylene (PE), and ABS plastic.

It may be noted that the materials of different fourth middle side rods 763Q of the door may be the same or different.

In some embodiments, the support strength of the outer frame 762Q is greater than the support strength of the fourth middle side rod 763Q of the door. The outer frame 762Q has a larger outer diameter and higher support strength, which is expected to better maintain the size of the side door 745Q while meeting the item shielding requirements. The fourth middle side rod 763Q of the door has a smaller outer diameter, and while satisfying the side limiting, it has a smaller weight, which facilitates the lightweight design of the storage mechanism 700Q.

Referring to FIG. 82F, in some embodiments, both the outer frame 762Q and the fourth middle side rod 763Q of the door may be tubular, which facilitates the lightweight design of the storage mechanism 700Q while meeting the structural strength requirements.

Further, in some embodiments, both the outer frame 762Q and the fourth middle side rod 763Q of the door may be circular tubes, which have a simple structure, are easy to produce, and have high production efficiency and low production cost.

In some embodiments, the material of the outer frame 762Q may be the same as the material of the fourth middle side rod 763Q of the door, and the outer diameter of the outer frame 762Q is greater than the outer diameter of the fourth middle side rod 763Q of the door, so that the support strength of the outer frame 762Q is greater than the support strength of the fourth middle side rod 763Q of the door.

In some embodiments, the corners between adjacent sides of the outer frame 762Q may be provided with rounded corners to reduce the risk of the storage mechanism 700Q scratching or bruising surrounding items, people, or animals.

In some embodiments, the outer frame 762Q may have multiple corners, and the radius of the rounded corner at each corner may be approximately the same, which is easy to process and has a consistent appearance, and is expected to improve the aesthetic effect of the storage mechanism 700Q. It may be noted that the radius of the rounded corner at each corner of the outer frame 762Q may be approximately the same.

FIGS. 83A-83D are a set of schematic structural views of the side door 745Q.

Figure 83A:
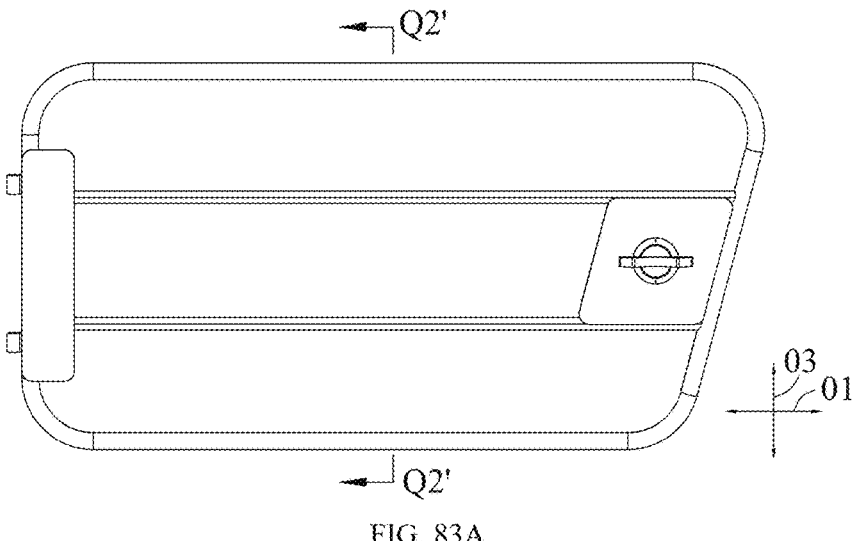
FIGS. 83A-83D are a set of schematic structural views of the side door.
Figure 83B:
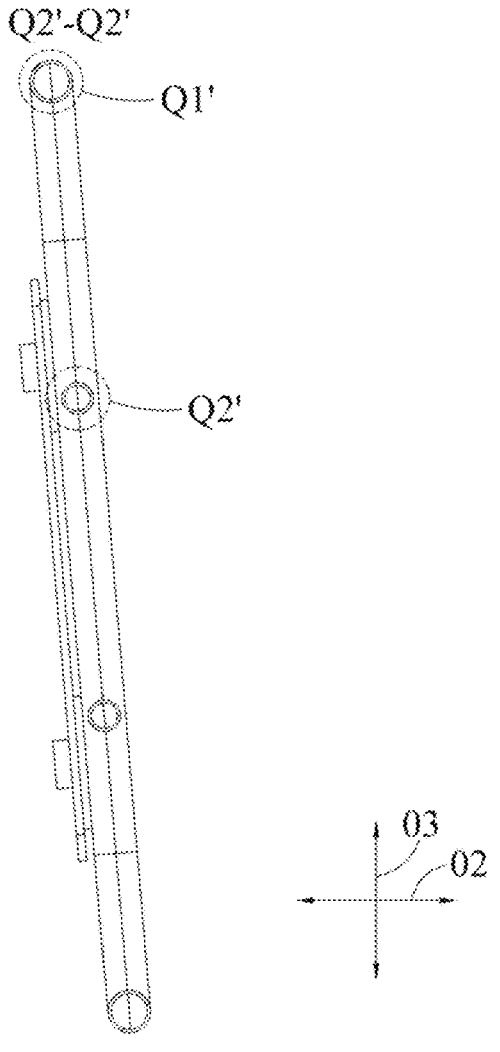
Figure 83C:
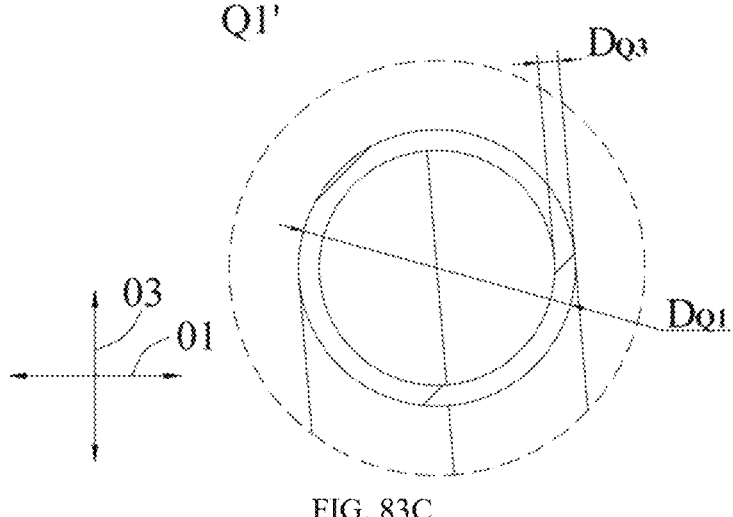
Figure 83D:
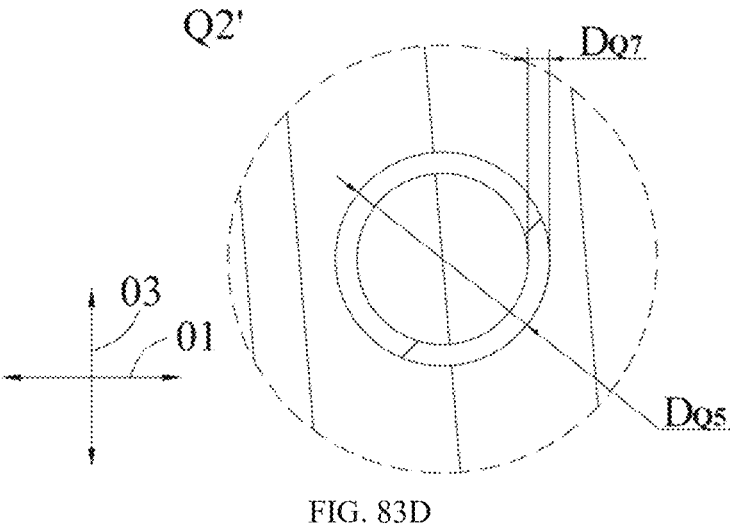

Among them, FIG. 83B is a cross-sectional view along Q2'-Q2' in FIG. 83A, FIG. 83C is an enlarged view at Q1' in FIG. 83B, and FIG. 83D is an enlarged view at Q2' in FIG. 83B.

Referring to FIG. 83C, in some embodiments, the outer diameter of the outer frame 762Q is $D_{Q1}$, and $D_{Q1}$ may be in the range of 2 mm-10 mm, and the wall thickness is $D_{Q3}$, and $D_{Q3}$ may be in the range of 0.2 mm-1 mm, so as to have a lower weight while meeting the support strength requirements, and be easy to produce.

Specifically, $D_{Q3}$ may be any value in the range of 0.2 mm-1 mm, for example, 0.2 mm, 0.3 mm, 0.4 mm, 0.5 mm, 0.6 mm, 0.7 mm, 0.8 mm, 0.9 mm, and 1 mm. $D_{Q1}$ may be any value in the range of 2 mm-10 mm, for example, 2 mm, 3 mm, 4 mm, 5 mm, 6 mm, 7 mm, 8 mm, 9 mm, and 10 mm.

Referring to FIG. 83D, in some embodiments, the outer diameter of the fourth middle side rod 763Q of the door is Dos, and $D_{Q5}$ may be in the range of 2 mm-8 mm, and the wall thickness is $D_{Q7}$, and $D_{Q7}$ may be in the range of 0.2 mm-1 mm, so as to have a lower weight while meeting the support strength requirements, and be easy to produce. Specifically, $D_{Q7}$ may be any value in the range of 0.2 mm-1 mm, for example, 0.2 mm, 0.3 mm, 0.4 mm, 0.5 mm, 0.6 mm, 0.7 mm, 0.8 mm, 0.9 mm, and 1 mm. $D_{Q5}$ may be any value in the range of 2 mm-8 mm, for example, 2 mm, 3 mm, 4 mm, 5 mm, 6 mm, 7 mm, and 8 mm.

Figures 83E, 83F:
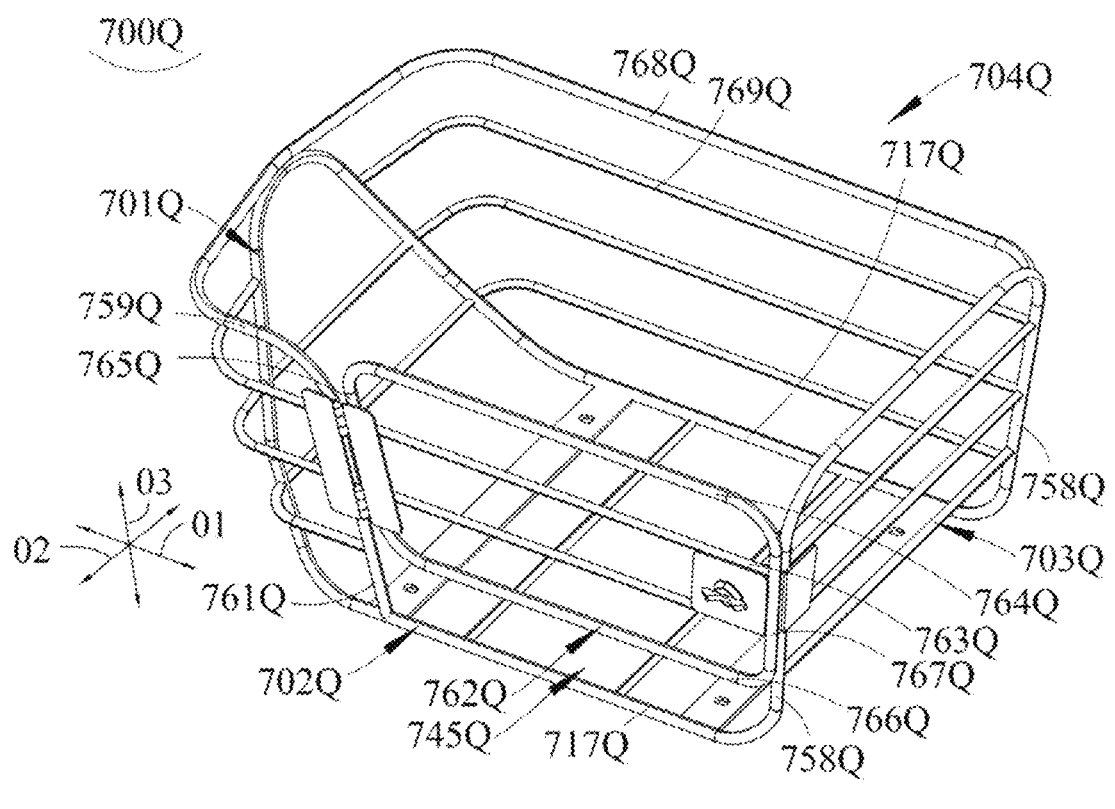
FIGS. 83E-83G are another set of schematic structural views of the storage mechanism.
Figure 83G:
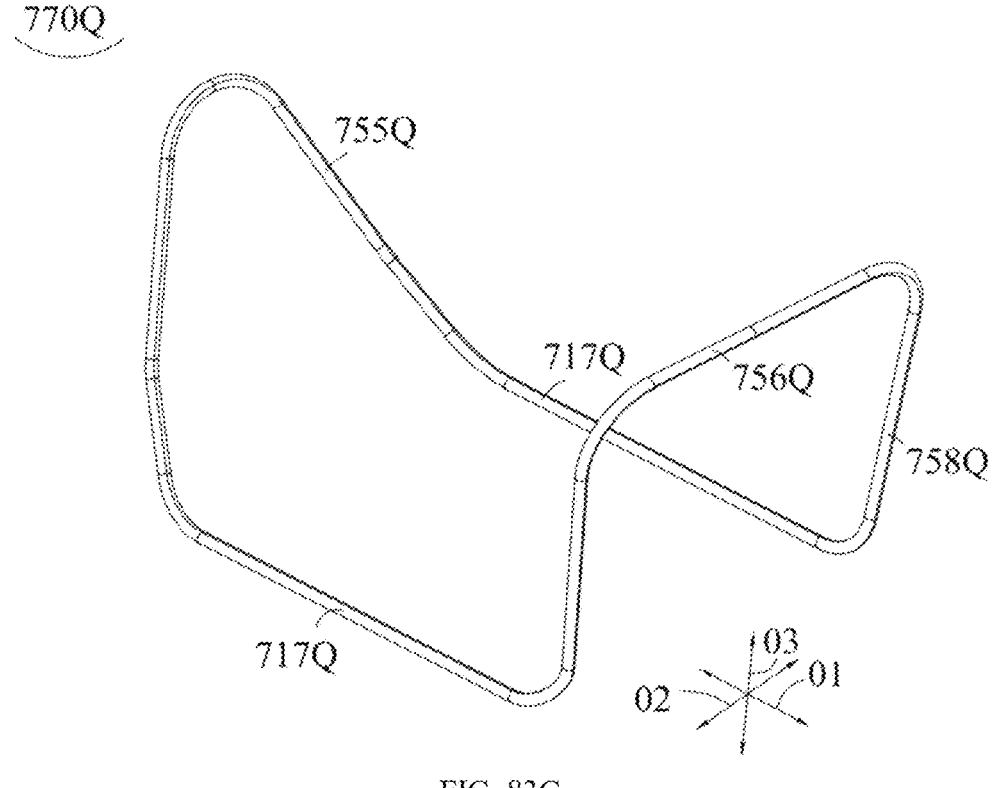

FIGS. 83E-83G are another set of schematic structural views of the storage mechanism 700Q.

Referring to FIGS. 83E and 83F, in some embodiments, along the second direction 02, the side door 745Q may be located on the outer side of the outer side rod 758Q close to the second limiting member 702Q. When looking at the storage mechanism 700Q along the second direction 02 from the side of the second limiting member 702Q away from the fourth limiting member 704Q, some structures of the second limiting member 702Q and the first limiting portion 749Q provided on the second limiting member 702Q may all be blocked by the side door 745Q, making the storage mechanism 700Q look more concise, which is expected to improve the visual effect.

The bottom end of the outer side rod 758Q close to the second limiting member 702Q is inclined outward along the second direction 02, so as to connect with the edge-crossbar 717Q on the corresponding side.

Referring to FIG. 83E, in some embodiments, the outer frame 762Q may include a first frame edge 764Q, a second frame edge 765Q, a third frame edge 766Q, and a fourth frame edge 767Q connected in sequence.

Referring to FIG. 83E, in some embodiments, the first frame edge 764Q and the third frame edge 766Q may extend along the first direction 01. The second frame edge 765Q may extend in a direction perpendicular to the first direction 01 and parallel to the second limiting member 702Q. The fourth frame edge 767Q may extend in a direction parallel to both the second limiting member 702Q and the fourth limiting member 704Q. In this way, the outer frame 762Q is parallel to the second limiting member 702Q, making the structure of the outer frame 762Q simpler and the structure of the storage mechanism 700Q simpler. In addition, the fourth frame edge 767Q may extend in a direction parallel to both the second limiting member 702Q and the fourth limiting member 704Q, which is convenient for the connection of the fourth frame edge 767Q and the second limiting member 702Q; the first frame edge 764Q may extend along the first direction 01, the first frame edge 764Q may be located on the top side of the third frame edge 766Q, and the height of the first frame edge 764Q along the third direction 03 may not be lower than the height of the third upper side rod 759Q, so as to avoid affecting the volume of the storage mechanism 700Q. The second frame edge 765Q may extend in a direction perpendicular to the first direction 01 and parallel to the second limiting member 702Q, so that the side door 745Q has high support strength.

Referring to FIG. 83E, in some embodiments, the second frame edge 765Q may be rotatably connected to the mounting rail 761Q. The second frame edge 765Q may extend in a direction perpendicular to the first direction 01 and parallel to the second limiting member 702Q. The rotation axis of the side door 745Q may be parallel to the second frame edge 765Q, preventing the top side of the side door 745Q from being higher than the top side of the storage mechanism 700Q in the open state, and preventing the bottom side of the side door 745Q from being lower than the bottom side of the storage mechanism 700Q in the open state, so as to reduce the risk of the side door 745Q colliding with people, items, or animals around during the opening or closing process.

Referring to FIG. 83E, in some embodiments, in the direction perpendicular to the first direction 01 and parallel to the side door 745Q, the distance between the first frame edge 764Q of the outer frame 762Q and the adjacent fourth middle side rod 763Q of the door may be in the range of 35 mm-70 mm. A distance between the first frame edge 764Q of the outer frame 762Q and the adjacent fourth middle side rod 763Q of the door of greater than or equal to 35 mm is suitable for the lightweight design of the storage mechanism 700Q. A distance between the first frame edge 764Q of the outer frame 762Q and the adjacent fourth middle side rod 763Q of the door of less than or equal to 70 mm avoids the hollowed-out part from being too large.

Specifically, in the direction perpendicular to the first direction 01 and parallel to the side door 745Q, the distance between the first frame edge 764Q of the outer frame 762Q and the adjacent fourth middle side rod 763Q of the door may be any value in the range of 35 mm-70 mm, for example, 35 mm, 41 mm, 47 mm, 53 mm, 59 mm, 65 mm, and 70 mm.

Referring to FIG. 83E, in some embodiments, the fourth limiting member 704Q may include a fourth upper side rod 768Q and a plurality of fifth middle side rods 769Q. The provision of the plurality of fifth middle side rods 769Q reduces the size of a single hollowed-out part on the fourth limiting member 704Q, reducing the risk of items in the storage mechanism 700Q falling out through the hollowed-out parts on the fourth limiting member 704Q.

In some embodiments, the fifth middle side rod 769Q may extend along the first direction 01. It may be understood that the plurality of fifth middle side rods 769Q are arranged in parallel. It may be understood that, in some other embodiments, the extension direction of the plurality of fifth middle side rods 769Q is not limited to the first direction 01, and the plurality of fifth middle side rods 769Q are not limited to being all arranged in parallel.

Referring to FIGS. 82G and 83E, in some embodiments, the ratio of the outer diameter of the bracket 135Q to the outer diameter of the fourth upper side rod 768Q is $K_{Q9}$, and $K_{Q9}$ may be in the range of 4-4.8. $K_{Q9} \geq 4$ allows the fourth upper side rod 768Q to have a suitable outer diameter, which is expected to reduce the weight of the fourth upper side rod 768Q and contribute to the lightweight design of the storage mechanism 700Q. In addition, the appearance of the fourth upper side rod 768Q and the bracket 135Q has a better visual effect. $K_{Q9} \leq 4.8$ allows the fourth upper side rod 768Q to have a suitable outer diameter to have the structural strength that matches the loading requirements. In addition, the appearance of the fourth upper side rod 768Q and the bracket 135Q has a better look and feel.

Specifically, $K_{Q9}$ may be any value in the range of 4-4.8, for example, 4, 4.1, 4.2, 4.3, 4.4, 4.5, 4.6, 4.7, and 4.8.

Referring to FIGS. 82G and 83E, in some embodiments, the ratio of the outer diameter of the bracket 135Q to the outer diameter of the fifth middle side rod 769Q is Kon, and $K_{11}$ may be in the range of 5-6.5. $K_{11} \geq 5$ allows the fifth middle side rod 769Q to have a suitable outer diameter, which is expected to reduce the weight of the fifth middle side rod 769Q and contribute to the lightweight design of the storage mechanism 700Q. In addition, the appearance of the fifth middle side rod 769Q and the bracket 135Q has a better visual effect. $K_{Q11} \leq 6.5$ allows the fifth middle side rod 769Q to have a suitable outer diameter to have the structural strength that matches the loading requirements. In addition, the appearance of the fifth middle side rod 769Q and the bracket 135Q has a better look and feel.

Specifically, $K_{11}$ may be any value in the range of 5-6.5, for example, 5, 5.1, 5.2, 5.3, 5.4, 5.5, 5.6, 5.7, 5.8, 5.9, 6, 6.1, 6.2, 6.3, 6.4, and 6.5.

Referring to FIG. 83E, in some embodiments, in the direction perpendicular to the first direction 01 and parallel to the fourth limiting member 704Q, the distance between adjacent fifth middle side rods 769Q may be in the range of 35 mm-70 mm. A distance between adjacent fifth middle side rods 769Q of greater than or equal to 35 mm is suitable for the lightweight design of the storage mechanism 700Q. A distance between adjacent fifth middle side rods 769Q of less than or equal to 70 mm avoids the hollowed-out part from being too large.

Specifically, in the direction perpendicular to the first direction 01 and parallel to the fourth limiting member 704Q, the distance between adjacent fifth middle side rods 769Q may be any value in the range of 35 mm-70 mm, for example, 35 mm, 41 mm, 47 mm, 53 mm, 59 mm, 65 mm, and 70 mm.

Referring to FIGS. 83A and 83G, in some embodiments, the fifth crossbar 715Q may include edge-crossbars 717Q provided on both sides of the bottom wall of the storage mechanism 700Q along the second direction 02. It may be understood that the number of the edge-crossbars 717Q in the main basket frame 770Q may be two. The edge-crossbar 717Q located near the second limiting member 702Q may constitute the bottom edge of the second limiting member 702Q, and the edge-crossbar 717Q located near the fourth limiting member 704Q may constitute the bottom edge of the fourth limiting member 704Q.

Referring to FIG. 83E, in some embodiments, in the direction perpendicular to the first direction 01 and parallel to the fourth limiting member 704Q, the distance between the fourth upper side rod 768Q and the adjacent fifth middle side rod 769Q may be in the range of 35 mm-70 mm. A distance between the fourth upper side rod 768Q and the adjacent fifth middle side rod 769Q of greater than or equal to 35 mm is suitable for the lightweight design of the storage mechanism 700Q. A distance between the fourth upper side rod 768Q and the adjacent fifth middle side rod 769Q of less than or equal to 70 mm avoids the hollowed-out part from being too large.

Specifically, in the direction perpendicular to the first direction 01 and parallel to the fourth limiting member 704Q, the distance between the fourth upper side rod 768Q and the adjacent fifth middle side rod 769Q may be any value in the range of 35 mm-70 mm, for example, 5 mm, 41 mm, 47 mm, 53 mm, 59 mm, 65 mm, and 70 mm.

Referring to FIG. 83G, in some embodiments, the first middle diagonal side rod 755Q, the edge-crossbar 717Q, the outer side rod 758Q, and the second upper side rod 756Q may be integrally formed, reducing the structures for fixedly connecting the first middle diagonal side rod 755Q, the edge-crossbar 717Q, the outer side rod 758Q, and the second upper side rod 756Q. Consequently, on the one hand, it reduces the phenomenon of local stress concentration caused by fixed connections, and is expected to improve the structural strength, rigidity, and fatigue resistance of the storage mechanism 700Q; on the other hand, it avoids the weight increase caused by the provision of fixed connection structures, facilitating the lightweight design of the storage mechanism 700Q; on another hand, it reduces the processes for fixedly connecting the first middle diagonal side rod 755Q, the edge-crossbar 717Q, the outer side rod 758Q, and the second upper side rod 756Q, simplifying the assembly process of the storage mechanism 700Q and improving production efficiency.

Referring to FIG. 83G, in some embodiments, the first middle diagonal side rod 755Q, the edge-crossbar 717Q, the outer side rod 758Q, and the second upper side rod 756Q may all be tubular, which facilitates the lightweight design of the storage mechanism 700Q while meeting the structural strength requirements.

The inner diameters of the first middle diagonal side rod 755Q, the edge-crossbar 717Q, the outer side rod 758Q, and the second upper side rod 756Q may all be the same, and the outer diameters may also all be the same, which is convenient for processing and improves processing efficiency.

In some embodiments, the material of the first middle diagonal side rod 755Q, the edge-crossbar 717Q, the outer side rod 758Q, and the second upper side rod 756Q may be carbon structural steel, which has both good support strength and is easy to shape.

In other embodiments, the material of the first middle diagonal side rod 755Q, the edge-crossbar 717Q, the outer side rod 758Q, and the second upper side rod 756Q may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

It may be noted that the materials of the first middle diagonal side rod 755Q, the edge-crossbar 717Q, the outer side rod 758Q, and the second upper side rod 756Q may be the same or different.

Referring to FIG. 83G, in some embodiments, the wall thickness of the first middle diagonal side rod 755Q, the edge-crossbar 717Q, the outer side rod 758Q, and the second upper side rod 756Q may be in the range of 0.4-1.2 mm, and the outer diameter may be in the range of 4 mm-12 mm.

Specifically, the wall thickness of the first middle diagonal side rod 755Q, the edge-crossbar 717Q, the outer side rod 758Q, and the second upper side rod 756Q may be any value in the range of 0.4-1.2 mm, for example, 0.4 mm, 0.5 mm, 0.6 mm, 0.7 mm, 0.8 mm, 0.9 mm, 1.0 mm, 1.1 mm, and 1.2 mm; the outer diameter of the first middle diagonal side rod 755Q, the edge-crossbar 717Q, the outer side rod 758Q, and the second upper side rod 756Q may be any value in the range of 4 mm-12 mm, for example, 4 mm, 5 mm, 6 mm, 7 mm, 8 mm, 9 mm, 10 mm, 11 mm, and 12 mm.

Figure 84A:
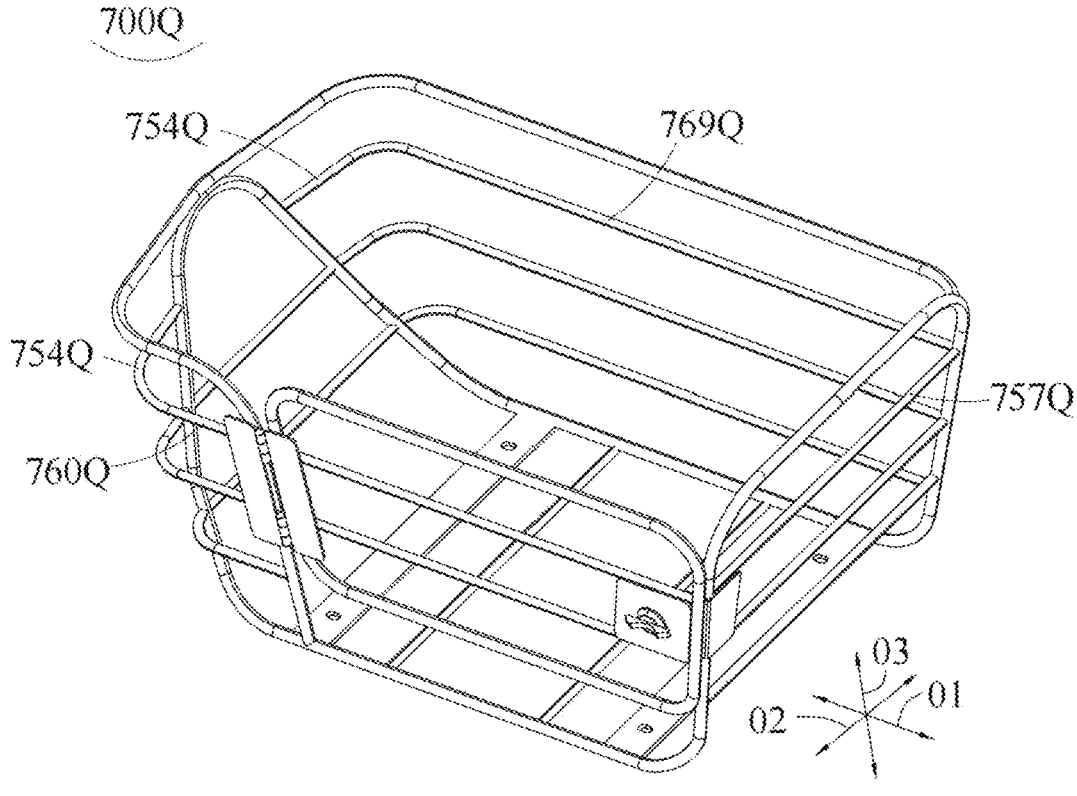
FIGS. 84A-84E are another set of schematic structural views of the storage mechanism.
Figure 84B:
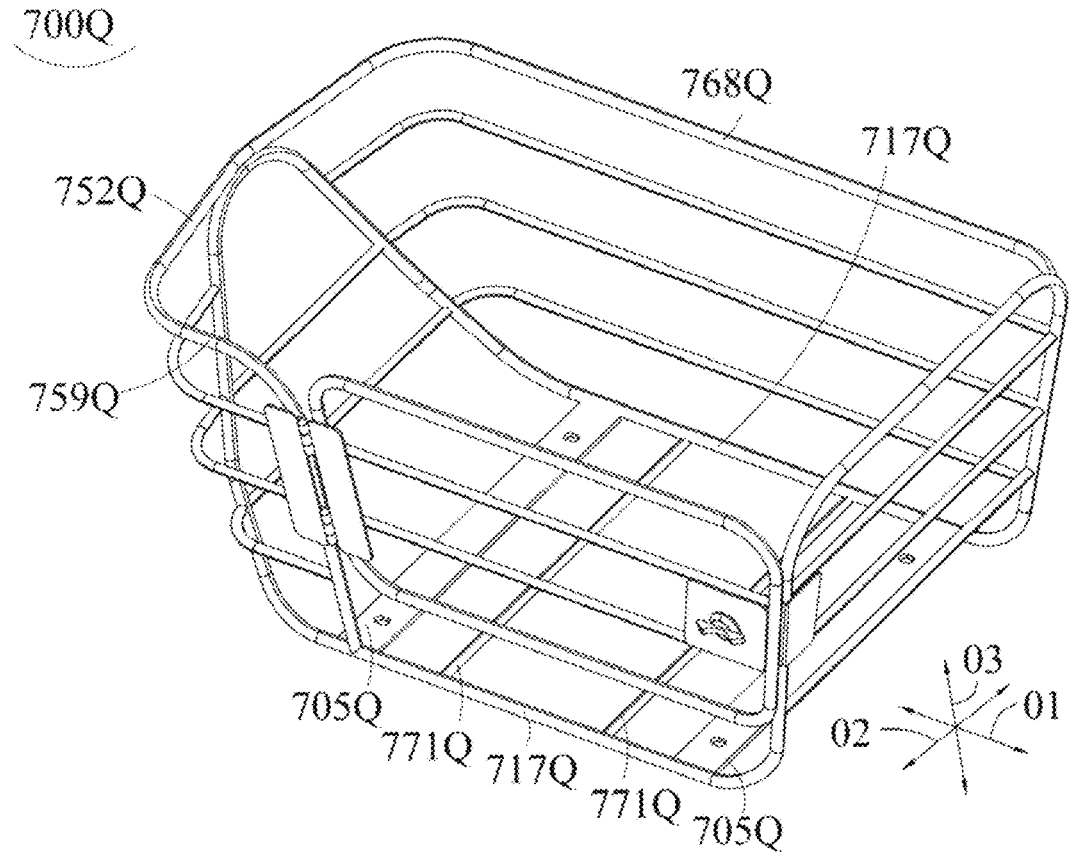
Figure 84C:
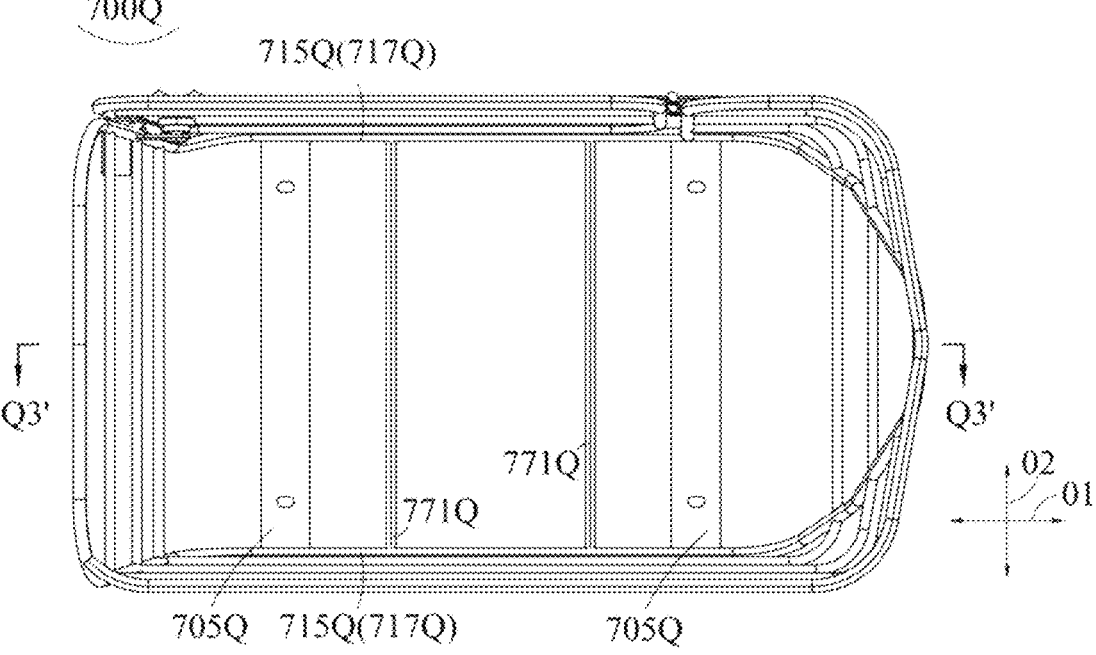
Figure 84D:
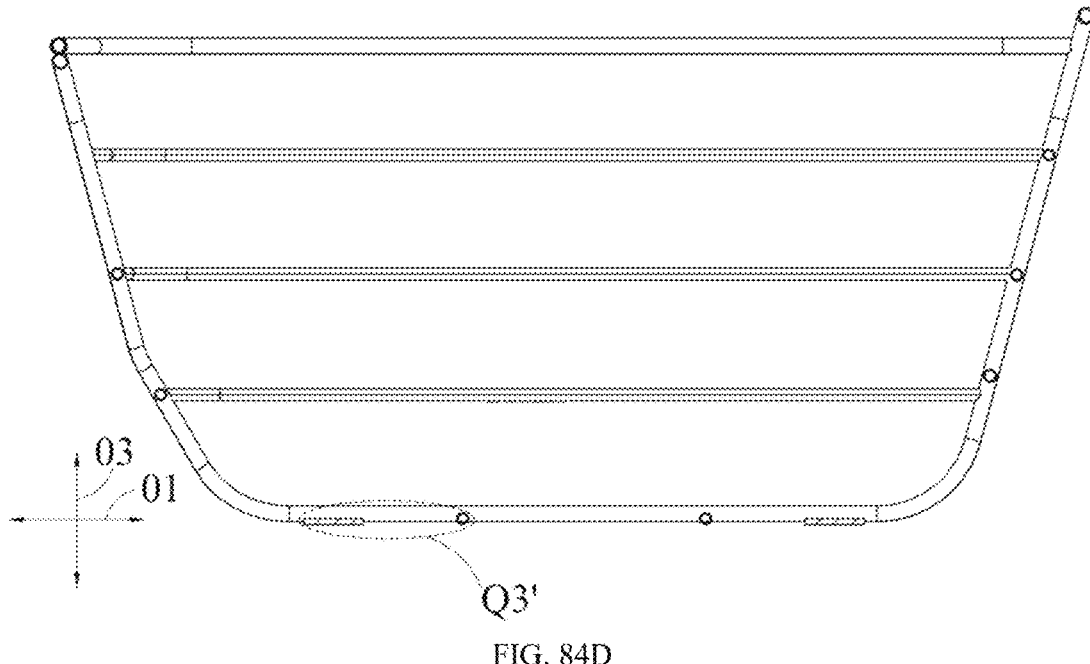
Figure 84E:
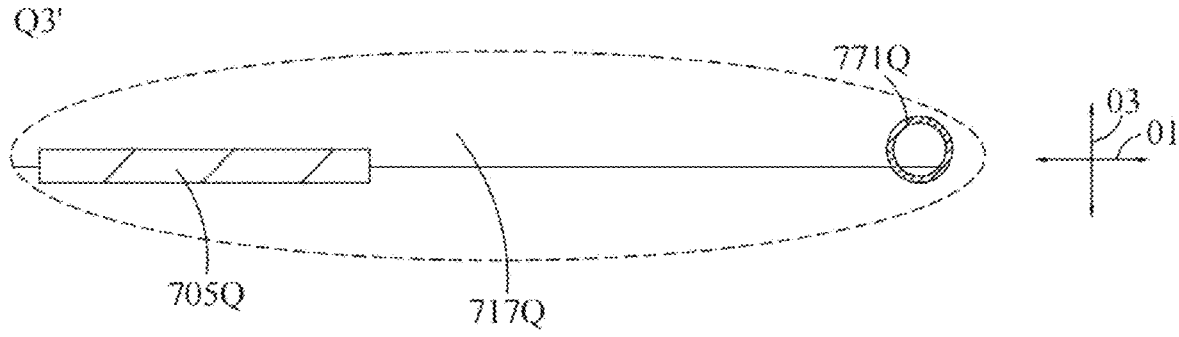

FIGS. 84A-84E are another set of schematic structural views of the storage mechanism 700Q. Among them, FIG. 84D is a cross-sectional view along Q3'-Q3' in FIG. 84C, and FIG. 84E is an enlarged view at Q3' in FIG. 84D.

Referring to FIG. 84A, in some embodiments, the plurality of horizontal side rods 754Q and the plurality of fifth middle side rods 769Q may be provided one-to-one corresponding to each other, and the heights of the correspondingly provided horizontal side rods 754Q and fifth middle side rods 769Q along the third direction 03 may be the same. The plurality of horizontal side rods 754Q and the plurality of third middle side rods 760Q may be provided one-to-one corresponding to each other, and the heights of the correspondingly provided horizontal side rods 754Q and third middle side rods 760Q along the third direction 03 may be the same. The plurality of third middle side rods 760Q and the plurality of second middle side rods 757Q may be provided one-to-one corresponding to each other, and the heights of the correspondingly provided third middle side rods 760Q and second middle side rods 757Q along the third direction 03 may be the same. The plurality of fifth middle side rods 769Q and the plurality of second middle side rods 757Q may be provided one-to-one corresponding to each other, and the heights of the correspondingly provided fifth middle side rods 769Q and second middle side rods 757Q along the third direction 03 may be the same. In this way, on the one hand, it is expected to make the storage mechanism 700Q more concise in visual effect and improve the aesthetic effect of the storage mechanism 700Q; on the other hand, the size of the hollowed-out parts on each side wall of the storage mechanism 700Q along the third direction 03 may be approximately the same, so as to form a good balance between reducing the phenomenon of items or animals in the storage mechanism 700Q being squeezed out through the hollowed-out parts and the lightweight design of the storage mechanism 700Q; on another hand, the support strengths of the side walls of the storage mechanism 700Q provided opposite to each other are close, which is expected to reduce the risk of stress concentration on one side of the storage mechanism 700Q and improve the torsional strength of the storage mechanism 700Q; on yet another hand, the structure is simple and easy to process.

Referring to FIG. 84A, in some embodiments, the correspondingly provided first middle horizontal side rod 754Q and fifth middle side rod 769Q may be integrally formed. The correspondingly provided first middle horizontal side rod 754Q and third middle side rod 760Q may be integrally formed. This avoids the provision of fixed connection structures, improves the structural strength and rigidity of the storage mechanism 700Q, and has good fatigue resistance; it avoids the weight increase caused by fixed connection structures, which is suitable for the lightweight design of the storage mechanism 700Q; it simplifies the assembly process and improves production efficiency.

Referring to FIG. 84A, in some embodiments, the first middle horizontal side rod 754Q, the second middle side rod 757Q, the third middle side rod 760Q, and the fifth middle side rod 769Q may all be tubular, which facilitates the lightweight design of the storage mechanism 700Q while meeting the structural strength requirements.

In some embodiments, the inner diameters of the first middle horizontal side rod 754Q, the second middle side rod 757Q, the third middle side rod 760Q, and the fifth middle side rod 769Q may all be the same, and the outer diameters may also all be the same, which is convenient for processing and improves processing efficiency.

In some embodiments, the material of the first middle horizontal side rod 754Q, the second middle side rod 757Q, the third middle side rod 760Q, and the fifth middle side rod 769Q may be carbon structural steel, which has both good support strength and is easy to shape.

In other embodiments, the material of the first middle horizontal side rod 754Q, the second middle side rod 757Q, the third middle side rod 760Q, and the fifth middle side rod 769Q may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

It may be noted that the materials of the first middle horizontal side rod 754Q, the second middle side rod 757Q, the third middle side rod 760Q, and the fifth middle side rod 769Q may be the same or different.

In some embodiments, the wall thickness of the first middle horizontal side rod 754Q, the second middle side rod 757Q, the third middle side rod 760Q, and the fifth middle side rod 769Q may be in the range of 0.2 mm-1 mm, and the outer diameter may be in the range of 2 mm-10 mm.

Specifically, the wall thickness of the first middle horizontal side rod 754Q, the second middle side rod 757Q, the third middle side rod 760Q, and the fifth middle side rod 769Q may be any value in the range of 0.2 mm-1 mm, for example, 0.2 mm, 0.3 mm, 0.4 mm, 0.5 mm, 0.6 mm, 0.7 mm, 0.8 mm, 0.9 mm, and 1 mm. The outer diameter of the first middle horizontal side rod 754Q, the second middle side rod 757Q, the third middle side rod 760Q, and the fifth middle side rod 769Q may be any value in the range of 2 mm-10 mm, for example, 2 mm, 3 mm, 4 mm, 5 mm, 6 mm, 7 mm, 8 mm, 9 mm, and 10 mm.

Referring to FIG. 84B, in some embodiments, the first upper side rod 752Q, the third upper side rod 759Q, and the fourth upper side rod 768Q may be integrally formed. This avoids additionally providing fixed connection structures, and is expected to improve the structural strength and rigidity of the storage mechanism 700Q, having good fatigue resistance; it avoids the weight increase caused by additionally providing fixed connection structures, which is suitable for the lightweight design of the storage mechanism 700Q; it simplifies the assembly process and improves production efficiency.

In some embodiments, the first upper side rod 752Q, the third upper side rod 759Q, and the fourth upper side rod 768Q may all be tubular, which facilitates the lightweight design of the storage mechanism 700Q while meeting the structural strength requirements.

In some embodiments, the inner diameters of the first upper side rod 752Q, the third upper side rod 759Q, and the fourth upper side rod 768Q may all be the same, and the outer diameters may also all be the same, which is convenient for processing and improves processing efficiency.

In some embodiments, the material of the first upper side rod 752Q, the third upper side rod 759Q, and the fourth upper side rod 768Q may be carbon structural steel, which has both good support strength and is easy to shape.

In other embodiments, the material of the first upper side rod 752Q, the third upper side rod 759Q, and the fourth upper side rod 768Q may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material.

It may be noted that the materials of the first upper side rod 752Q, the third upper side rod 759Q, and the fourth upper side rod 768Q may be the same or different.

In some embodiments, the wall thickness of the first upper side rod 752Q, the third upper side rod 759Q, and the fourth upper side rod 768Q may be in the range of 0.2 mm-1 mm, and the outer diameter may be in the range of 4 mm-12 mm.

Specifically, the wall thickness of the first upper side rod 752Q, the third upper side rod 759Q, and the fourth upper side rod 768Q may be any value in the range of 0.2 mm-1 mm, for example, 0.2 mm, 0.3 mm, 0.4 mm, 0.5 mm, 0.6 mm, 0.7 mm, 0.8 mm, 0.9 mm, and 1 mm. The outer diameter of the first upper side rod 752Q, the third upper side rod 759Q, and the fourth upper side rod 768Q may be any value in the range of 4 mm-12 mm, for example, 4 mm, 5 mm, 6 mm, 7 mm, 8 mm, 9 mm, 10 mm, 11 mm, and 12 mm.

Referring to FIG. 84B, in some embodiments, the middle crossbar 771Q and the edge-crossbar 717Q may be arranged crosswise to increase the anti-torsion performance of the bottom wall of the storage mechanism 700Q.

In some embodiments, the middle crossbar 771Q may extend along the second direction 02, that is, the middle crossbar 771Q may be perpendicular to the edge-crossbar 717Q, and the length of the hollowed-out part of the bottom wall of the storage mechanism 700Q along the second direction 02 is long. When an animal stands in the storage mechanism 700Q, the position where the animal's feet are placed along the second direction 02 is not restricted, increasing the animal's comfort.

Referring to FIG. 84B, in some embodiments, the middle crossbar 771Q may be clamped between the mounting member 705Q on the front side and the mounting member 705Q on the rear side, to space the area between the mounting member 705Q on the front side and the mounting member 705Q on the rear side, forming a plurality of hollow structures.

Referring to FIG. 84B, in some embodiments, the number of the middle crossbars 771Q may be two. It may be understood that, in some other embodiments, the number of the middle crossbars 771Q is not limited to two, and may also be one or more.

Specifically, along the first direction 01, the distance between the two middle crossbars 771Q may be in the range of 90 mm-140 mm. In some embodiments, the distance between the two middle crossbars 771Q may be any value in the range of 90 mm-140 mm, for example, 90 mm, 95 mm, 100 mm, 105 mm, 110 mm, 115 mm, 120 mm, 125 mm, 130 mm, 135 mm, and 140 mm.

Referring to FIG. 84B, the distance between the mounting member 705Q located on the front side and the adjacent middle crossbar 771Q may be equal to the distance between the mounting member 705Q located on the rear side and the adjacent middle crossbar 771Q, which is expected to improve the structural symmetry of the bottom wall of the storage mechanism 700Q, having an aesthetic effect, and improving the balanced force of the bottom wall of the storage mechanism 700Q along the first direction 01, reducing the phenomenon of unilateral stress concentration.

Referring to FIG. 84B, in some embodiments, the middle crossbars 771Q may all be tubular. The structure is simple and easy to process.

Further, in some embodiments, the middle crossbar 771Q may be a circular tube. The structure is simpler and the processing is more convenient. In addition, the structure of the circular tube has no sharp corners on the surface, which reduces the risk of items or animals in the storage mechanism 700Q being scratched by sharp corners, and reduces the risk of items or animals in the storage mechanism 700Q being abraded by sharp corners.

It may be understood that, in some other embodiments, the middle crossbar 771Q is not limited to a circular tube, and may also be an elliptical tube or other regular or irregular shapes.

In some embodiments, the material of the middle crossbar 771Q may be carbon structural steel, which has both good support strength and is easy to shape.

In other embodiments, the material of the middle crossbar 771Q may also be other metal materials, plastics, or rattan-woven materials. Other metal materials include but are not limited to stainless steel and aluminum alloy. Plastics include but are not limited to polypropylene (PP), polyethylene (PE), and ABS plastic. Rattan-woven materials include but are not limited to natural rattan (such as white rattan and red rattan) and PVC imitation rattan (polyvinyl chloride). PVC imitation rattan (polyvinyl chloride) refers to simulating the appearance of rattan weaving with polyvinyl chloride as raw material. It may be noted that the materials of different middle crossbars 771Q may be the same or different.

In some embodiments, the wall thickness of the middle crossbar 771Q may be in the range of 0.2 mm-1 mm, and the outer diameter may be in the range of 2 mm-10 mm, so as to have a lower weight while meeting the support strength requirements, and be easy to produce.

Specifically, the wall thickness of the middle crossbar 771Q may be any value in the range of 0.2 mm-1 mm, for example, 0.2 mm, 0.3 mm, 0.4 mm, 0.5 mm, 0.6 mm, 0.7 mm, 0.8 mm, 0.9 mm, and 1 mm. The outer diameter of the middle crossbar 771Q may be any value in the range of 2 mm-10 mm, for example, 2 mm, 3 mm, 4 mm, 5 mm, 6 mm, 7 mm, 8 mm, 9 mm, and 10 mm.

Referring to FIGS. 84C and 84E, in some embodiments, along the third direction 03, the height of the bottom end of the middle crossbar 771Q may be the same as the height of the bottom end of the mounting member 705Q located on the front side, which is convenient for the frame 100Q to provide support for the middle crossbar 771Q. It may be understood that the middle crossbar 771Q may be located between the two edge-crossbars 717Q, and may be located on the bottom side of the accommodation space of the storage mechanism 700Q. When items or animals are placed in the storage mechanism 700Q, it is easy for the items or animals to press against the middle crossbar 771Q. At this time, since the frame 100Q provides support for the middle crossbar 771Q, it is expected to reduce the deformation risk of the middle crossbar 771Q, improve the service life of the storage mechanism 700Q, and improve the stability of the items or animals. In addition, the middle crossbar 771Q may also share the support force exerted by the frame 100Q on the storage mechanism 700Q, reducing the risk of stress concentration on the mounting member 705Q on the front side and the mounting member 705Q that may be on the rear side, improving the service life of the mounting member 705Q on the front side and the mounting member 705Q on the rear side, and reducing the strength requirement for the mounting member 705Q on the front side and the mounting member 705Q on the rear side.

Figure 85A:
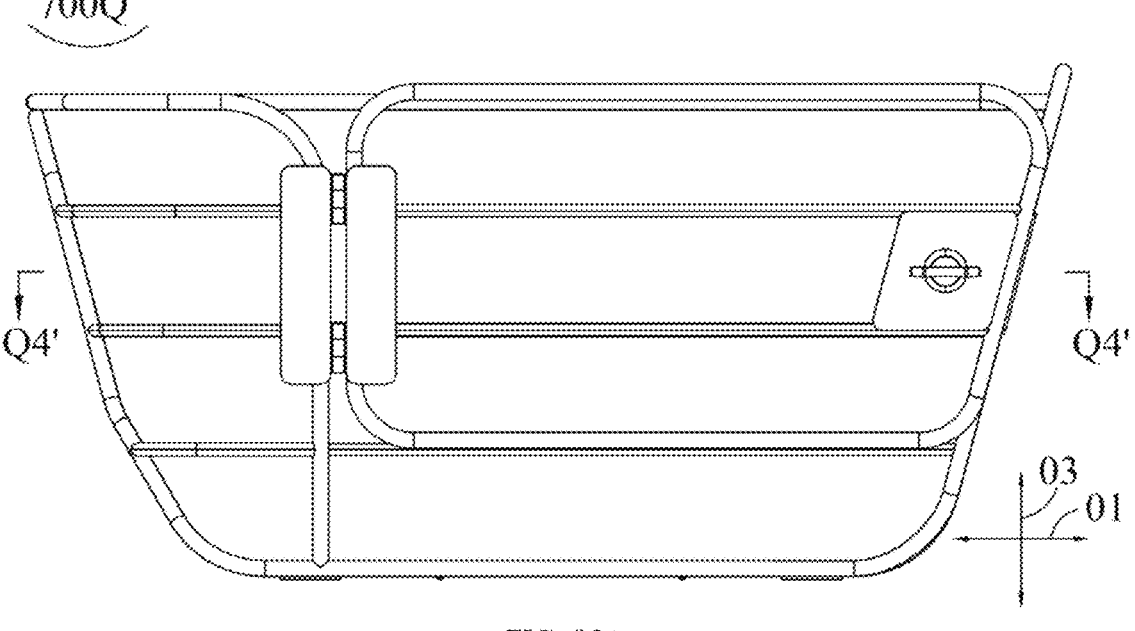
Figure 85B:
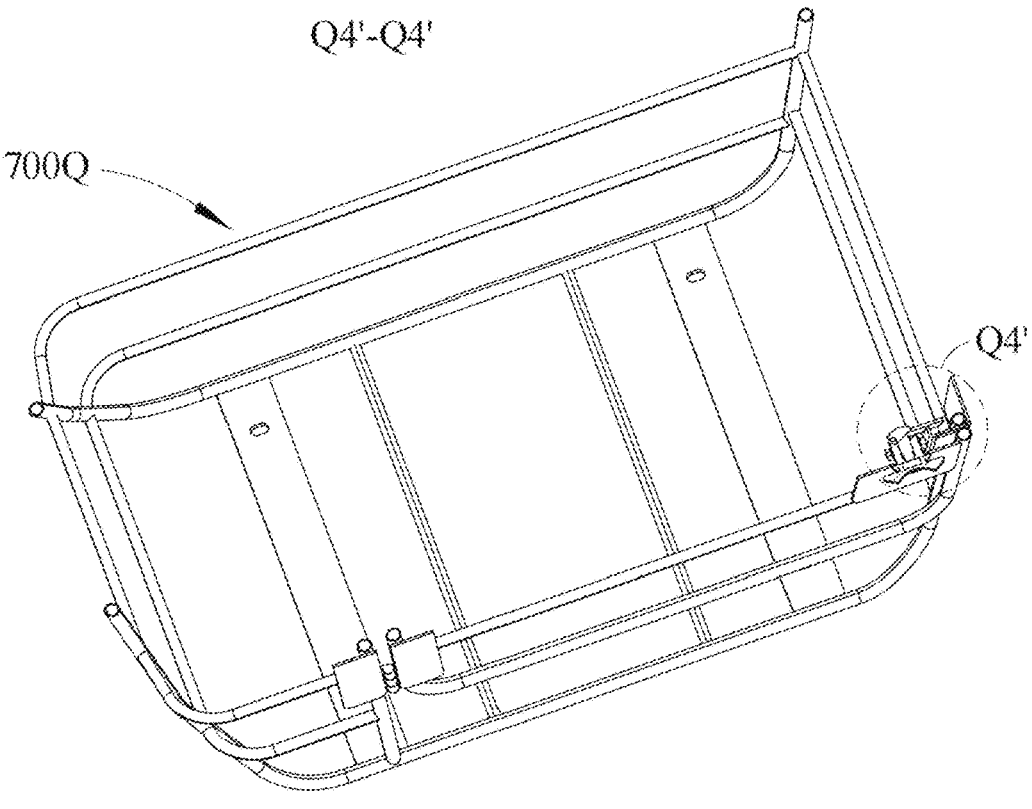
Figure 85C:
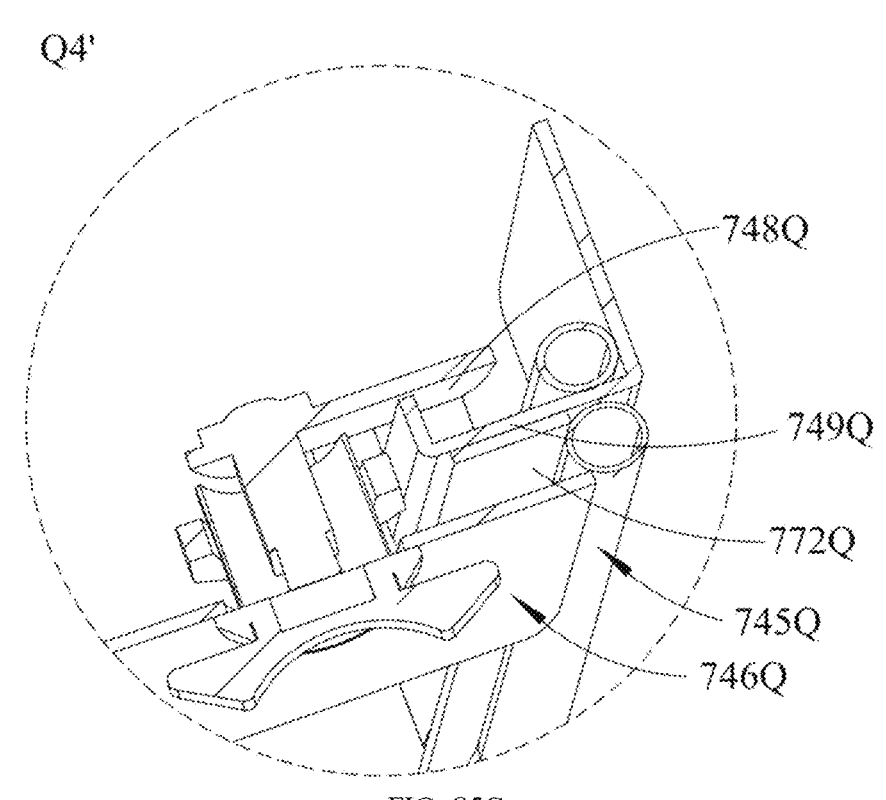
Figures 85D, 85E:
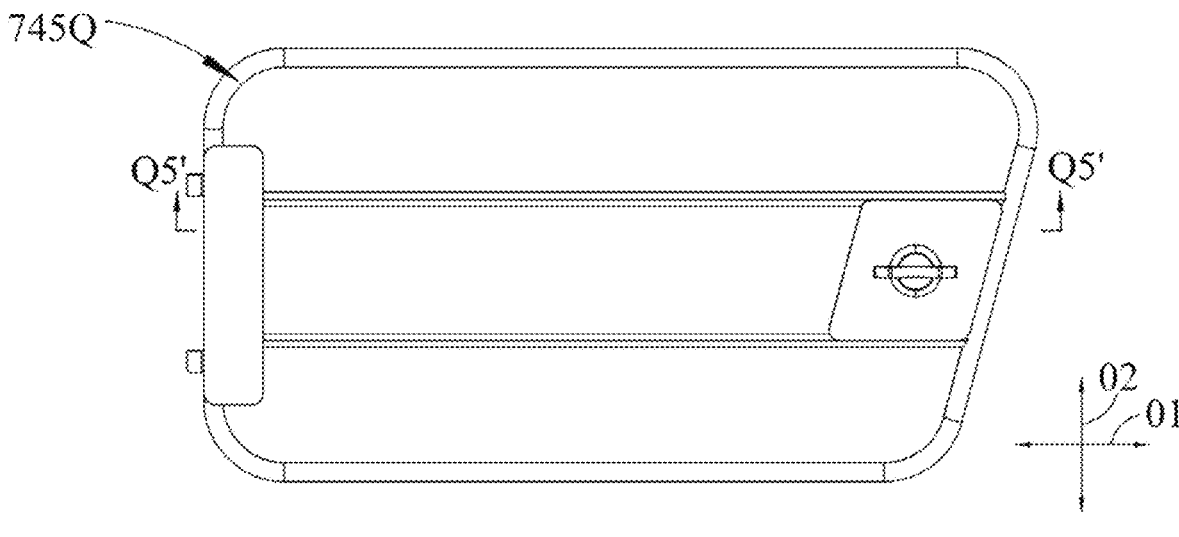

FIGS. 85A-85E are a set of schematic structural views of the side door 745Q, wherein FIG. 85B is a cross-sectional view along Q4'-Q4' in FIG. 85A, FIG. 85C is an enlarged view at Q4' in FIG. 85B, and FIG. 85E is a cross-sectional view along Q5'-Q5' in FIG. 85D.

Referring to FIG. 85C, in some embodiments, the door lock 746Q may include a third limiting portion 772Q. The third limiting portion 772Q may be fixedly provided on the side door 745Q. When the side door 745Q is in the closed state, the third limiting portion 772Q may be located on the outer side of the first limiting portion 749Q and abut against the first limiting portion 749Q. In other words, when the side door 745Q is in the closed state, the latch portion 748Q and the third limiting portion 772Q may be respectively provided on both sides of the first limiting portion 749Q. The pressures exerted by the latch portion 748Q and the third limiting portion 772Q on the first limiting portion 749Q are in opposite directions and at least partially cancel each other out, reducing the deformation risk of the first limiting portion 749Q. In addition, the cooperation of the third limiting portion 772Q and the first limiting portion 749Q may also reduce the risk of the side door 745Q rotating into the storage mechanism 700Q, and reduce the risk of friction or collision between the side door 745Q and the items or animals in the storage mechanism 700Q.

Referring to FIG. 85C, in some embodiments, when the third limiting portion 772Q abuts against the first limiting portion 749Q, the third limiting portion 772Q may be in surface contact with the first limiting portion 749Q. The pressure on the contact surfaces where the third limiting portion 772Q and the first limiting portion 749Q contact each other is small, reducing the risk of local stress concentration in the third limiting portion 772Q and the first limiting portion 749Q.

Referring to FIGS. 85C-85E, in some embodiments, the surface of the third limiting portion 772Q that abuts against the first limiting portion 749Q may be an abutment surface 773Q. The abutment surface 773Q may be in full contact with the first limiting portion 749Q, so that the pressure on the abutment surface 773Q of the third limiting portion 772Q is minimized, reducing the risk of local stress concentration.

It may be understood that, in some other embodiments, each side wall of the storage mechanism is not limited to having a hollowed-out side wall. For example, in some embodiments, the first limiting member of the storage mechanism is a closed side wall. In other words, the first limiting member of the storage mechanism may have no hollowed-out parts. When the vehicle is moving, the air in the front will move relatively to form an airflow that flows toward the storage mechanism. A closed first limiting member may block the airflow from blowing into the storage mechanism from the side where the first limiting member is located, reducing the erosion of the airflow on the items or animals in the storage mechanism. In some embodiments, when items are placed in the storage mechanism, it may reduce the erosion of the airflow on the items and reduce the risk of the items sliding under the action of the airflow; when the surface moisture of the items placed in the storage mechanism is easy to evaporate, the closed first limiting member may also reduce the risk of the items being air-dried; when animals are placed in the storage mechanism, it may reduce the discomfort brought by the airflow to the animals.

For another example, in some embodiments, the second limiting member and the fourth limiting member of the storage mechanism are closed side walls. In other words, the second limiting member and the fourth limiting member of the storage mechanism may have no hollowed-out parts. The closed second limiting member and fourth limiting member may block the line of sight on both sides of the storage mechanism along the second direction, so that people who may be on both sides of the storage mechanism along the second direction may only see the second limiting member and the fourth limiting member, and will not observe the items and their arrangement in the storage mechanism. Visually, it gives a more regular feeling, improves the aesthetic degree, and also has better privacy. In addition, the closed second limiting member and fourth limiting member may also reduce the probability of debris such as leaves and dust outside the storage mechanism from entering the storage mechanism, increase the cleaning and maintenance time in the storage mechanism, and reduce the cleaning frequency of the storage mechanism. In addition, on rainy days or when passing through waterlogged roads, the closed second limiting member and fourth limiting member may also block some of the water splashed by the vehicle, reducing the risk of items in the storage mechanism getting damp, and reducing the risk of animals in the storage mechanism getting wet. In addition, when some sharp items are placed in the storage mechanism, the closed second limiting member and fourth limiting member may also block the items from sliding out from both sides along the second direction, reducing the risk of sharp items scratching people or animals around the vehicle.

For another example, in some embodiments, the third limiting member of the storage mechanism is a closed side wall. In other words, the third limiting member of the storage mechanism may have no hollowed-out parts. During the acceleration process of the vehicle, the items or animals in the storage mechanism have a tendency to move backward relative to the storage mechanism under the action of inertia. The closed third limiting member may avoid the risk of items or animals being partially squeezed out through the hollowed-out parts, thereby avoiding the compression damage to the items or animals by the side wall of the hollowed-out structure. In addition, when the vehicle is moving, the air will form airflow disturbance on the rear side of the storage mechanism. The closed third limiting member may block the disturbed airflow from entering the storage mechanism, reducing the erosion of the airflow on the items or animals in the storage mechanism. In some embodiments, when items are placed in the storage mechanism, it may reduce the erosion of the airflow on the items and reduce the risk of the items sliding under the action of the airflow; when the surface moisture of the items placed in the storage mechanism is easy to evaporate, the closed first limiting member may also reduce the risk of the items being air-dried; when animals are placed in the storage mechanism, it may reduce the discomfort brought by the airflow to the animals.

For another example, in some embodiments, the bottom wall of the storage mechanism is closed. In other words, the bottom wall of the storage mechanism may have no hollowed-out parts. The inner surface of the bottom wall of the storage mechanism may be made relatively flat by setting the structure of the bottom wall of the storage mechanism. When items are placed in the storage mechanism, it reduces the risk of the items in the storage mechanism being damaged by scratching and bumping; when there are animals in the storage mechanism, it improves the comfort of the animals' stepping. Further, in some embodiments, the stability of items and animals may be increased by making the inner surface of the bottom wall of the storage mechanism a rough surface, adding a first anti-slip mechanism, adding anti-slip pads, etc.

Figure 86A:
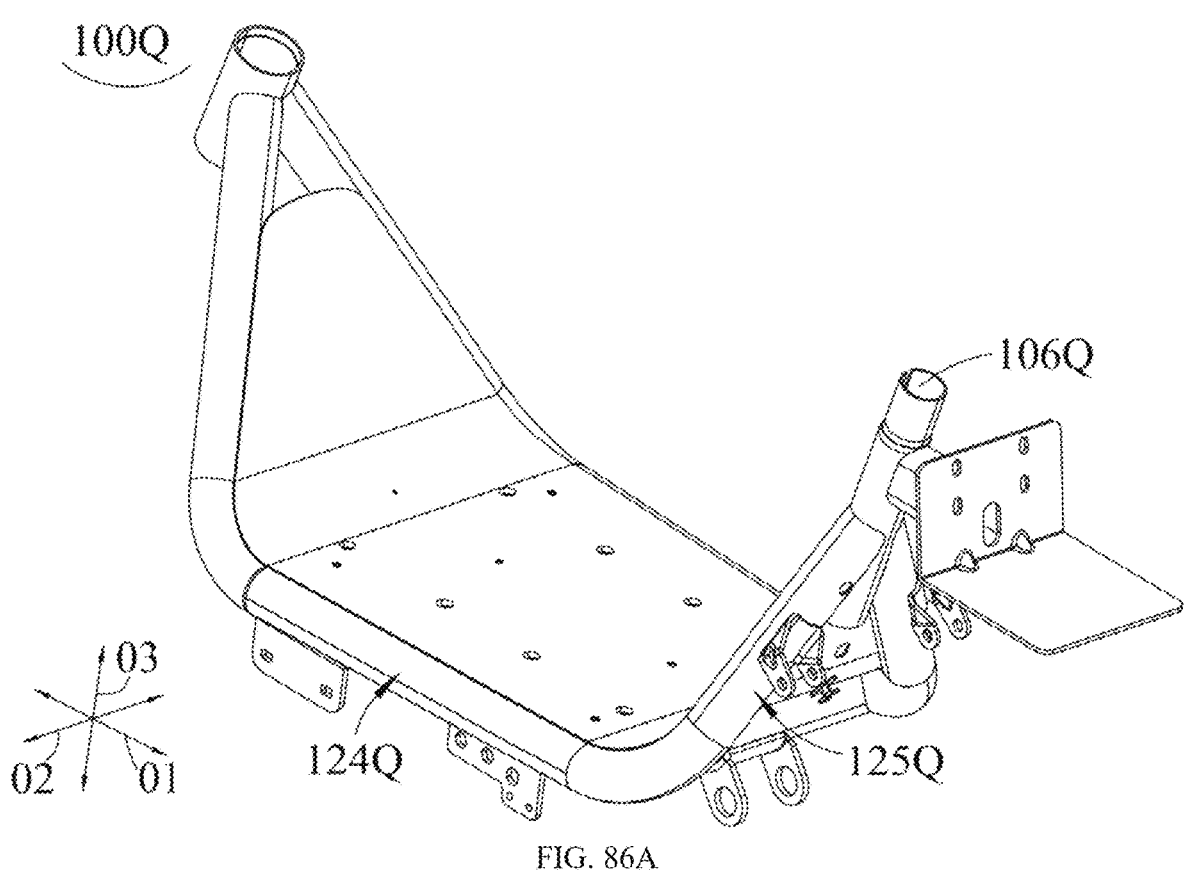
Figure 86B:
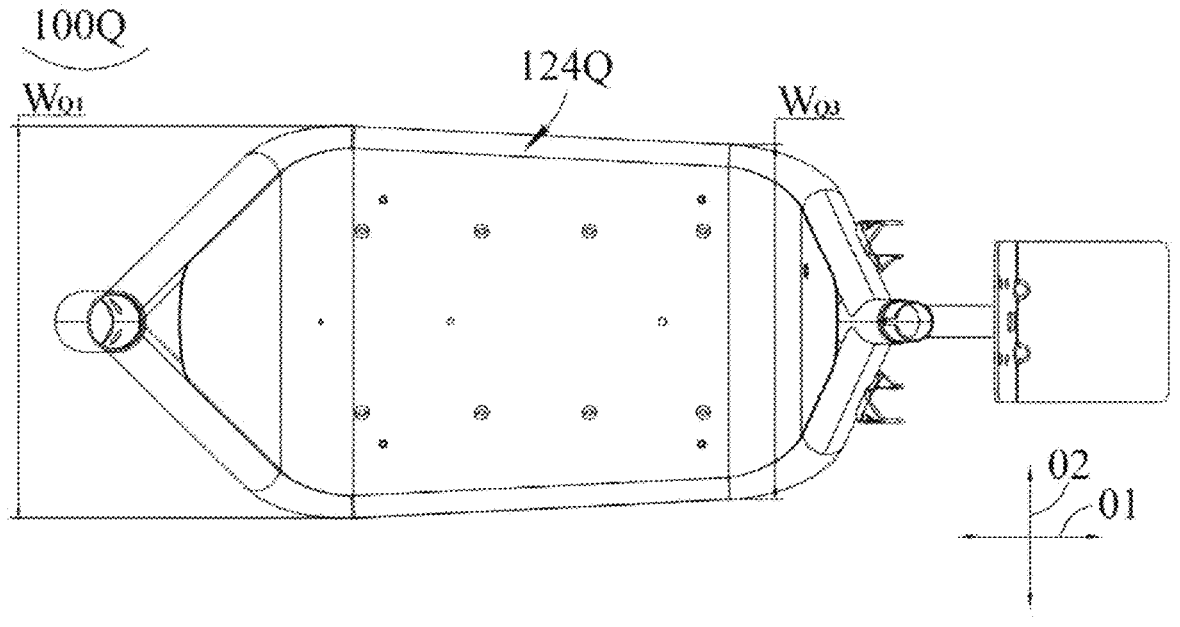
Figure 86C:
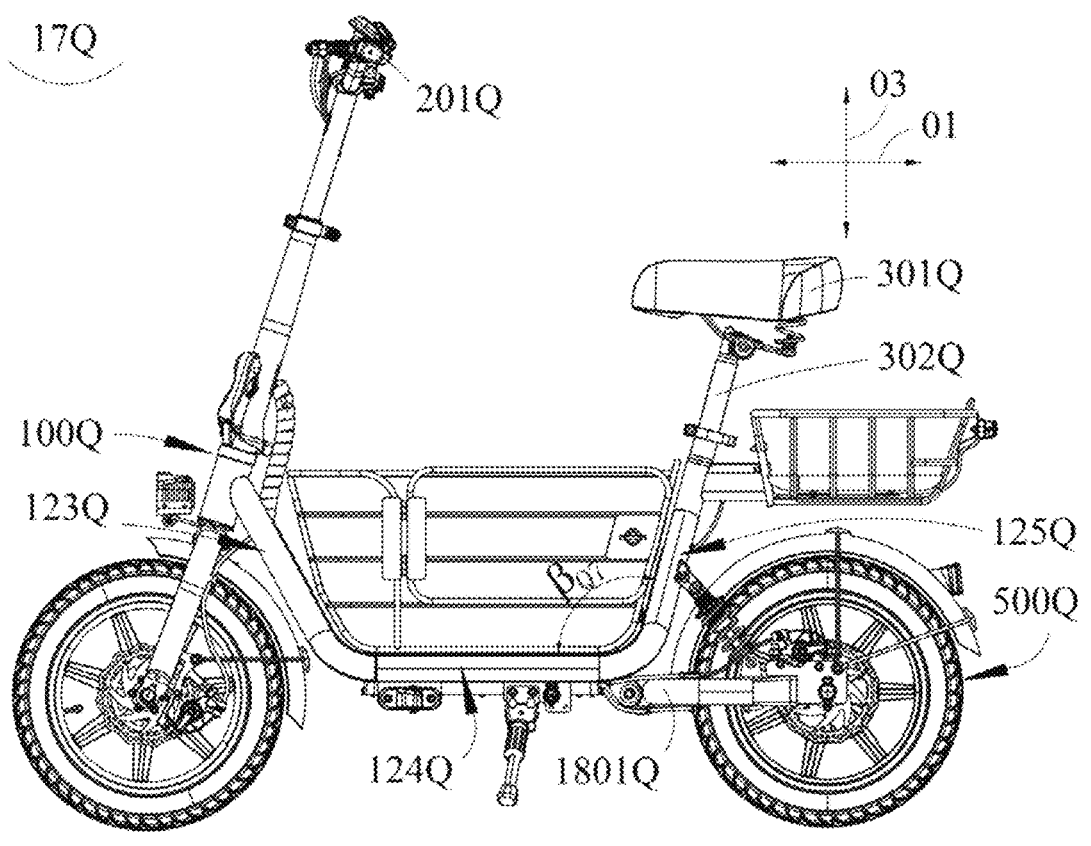
Figure 86D:
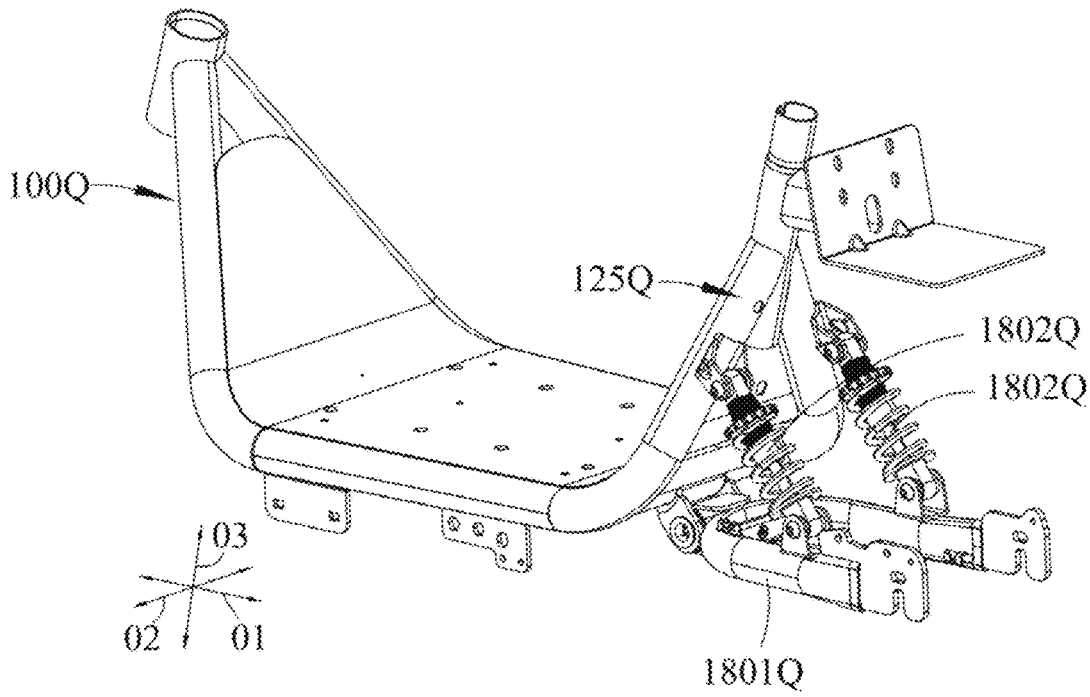
Figure 86E:
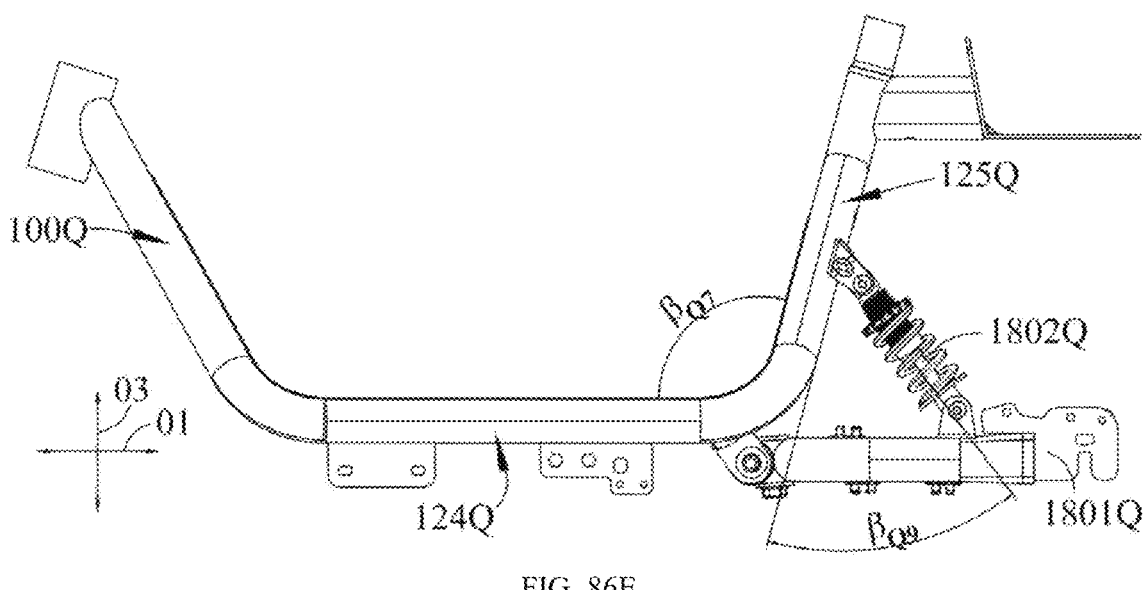
Figure 86F:
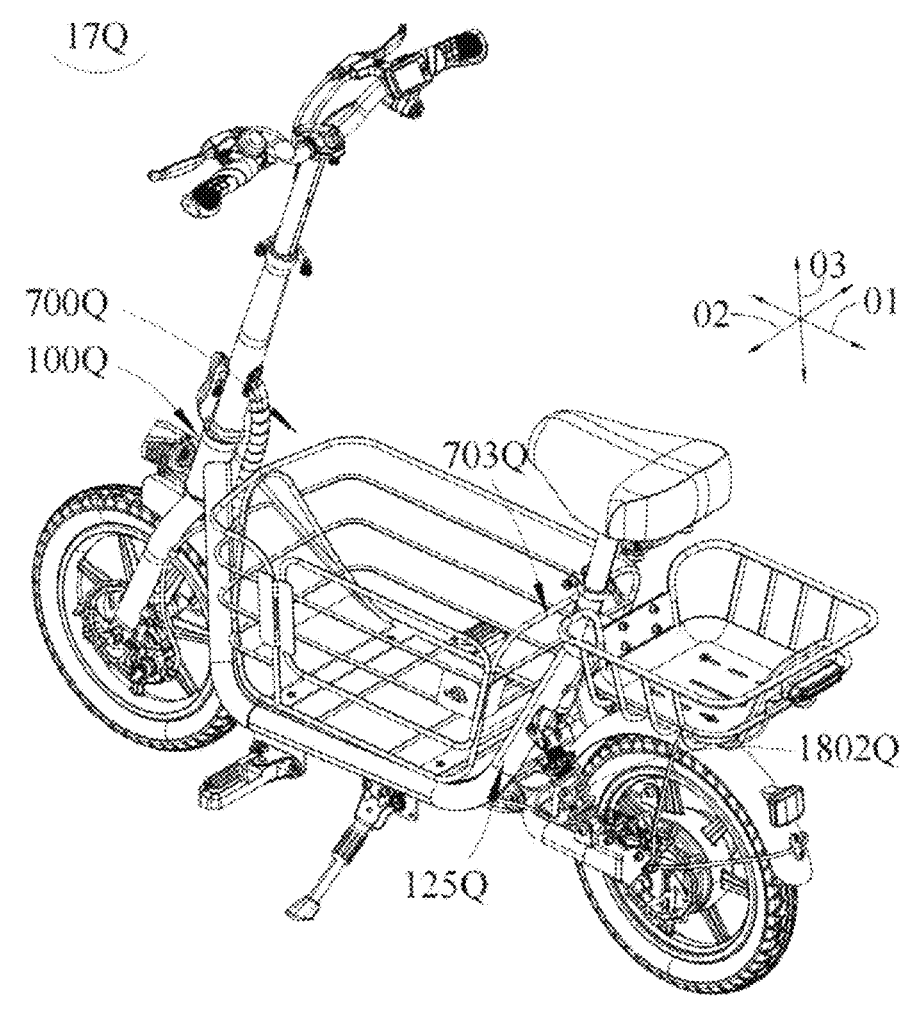

FIGS. 86A-86C are a set of schematic structural views of the frame 100Q, and FIGS. 86D-86F are a set of schematic installation views of the spring shock absorber 1802Q.

Referring to FIGS. 86A and 86B, in some embodiments, from the front end to the rear end, the width of the second section 124Q of the frame 100Q along the second direction 02 may gradually decrease. The width of the area of the second section 124Q near the front end along the second direction 02 may be larger, providing a larger stepping area for the user, and having higher stepping comfort. The width of the area of the second section 124Q near the rear end along the second direction 02 may be smaller, which is expected to reduce the space occupation of this area, facilitating the miniaturized design of the vehicle 17Q. In addition, the reduced width of the area of the second section 124Q near the rear end along the second direction 02 may correspondingly reduce the weight of the frame 100Q, facilitating the lightweight design of the vehicle 17Q. In addition, the reduced width of the area of the second section 124Q near the rear end along the second direction 02 is expected to reduce the space occupation of this area, reducing the risk of people or animals around the vehicle 17Q colliding with the area of the second section 124Q near the rear end, and improving riding safety. In addition, the gradual decrease in the width of the second section 124Q of the frame 100Q along the second direction 02 from the front end to the rear end is expected to bring an aesthetic effect.

Referring to FIG. 86B, in some embodiments, from the front end to the rear end, the width of the second section 124Q of the frame 100Q along the second direction 02 may change linearly.

Referring to FIG. 86B, in some embodiments, the top surface of the second section 124Q of the frame 100Q may be trapezoidal, so that the two opposite sides of the second section 124Q along the second direction 02 transition smoothly, reducing the risk of people around the vehicle 17Q bumping into the second section 124Q; the trapezoidal structure is simple and easy to process.

In some embodiments, the top surface of the second section 124Q of the frame 100Q may be an isosceles trapezoid, so that the weight distribution of the second section 124Q along the second direction 02 is uniform, reducing the risk of unilateral weight bias, improving the stability of the vehicle, and improving riding safety. The top surface of the second section 124Q of the frame 100Q being an isosceles trapezoid may also increase the aesthetic effect of the second section 124Q.

Referring to FIG. 86B, in some embodiments, the width $W_{Q1}$ of the front end of the second section 124M of the frame 100M along the second direction 02 may be in the range of 200 mm-300 mm. $W_{Q1}$ being greater than or equal to 200 mm provides a wider stepping area, with higher stepping comfort and support strength. $W_{Q1}$ being less than or equal to 300 mm is convenient for the lightweight and miniaturized design of the vehicle 17Q.

Specifically, $W_{Q1}$ may be any value in the range of 200 mm-300 mm, for example, 200 mm, 210 mm, 220 mm, 230 mm, 240 mm, 250 mm, 260 mm, 270 mm, 280 mm, 290 mm, and 300 mm.

Referring to FIG. 86B, in some embodiments, the width $W_{Q3}$ of the rear end of the second section 124Q of the frame 100Q along the second direction 02 may be in the range of 200 mm-280 mm. The width of the rear end of the second section 124Q of the frame 100Q along the second direction 02 being greater than or equal to 200 mm provides strong support strength. The width of the rear end of the second section 124Q of the frame 100Q along the second direction 02 being less than or equal to 280 mm is convenient for the lightweight and miniaturized design of the vehicle 17Q.

Specifically, $W_{Q3}$ may be any value in the range of 200 mm-280 mm, for example, 200 mm, 210 mm, 220 mm, 230 mm, 240 mm, 250 mm, 260 mm, 270 mm, and 280 mm.

Referring to FIG. 86C, in some embodiments, the third section 125Q of the frame 100Q may be inclined backward. The seat 301Q may be fixedly provided on the third section 125Q of the frame 100Q. approximately, from an ergonomic point of view, the distance between the seat 301Q and the handlebar 201Q along the first direction 01 should be suitable for the user's body size and riding posture. In some embodiments, if the distance is too short, the user will feel that their body is too curled up, and the arm and back muscles will be excessively tense, making it easy to get tired and injured during long-term riding; if the distance is too long, the user needs to excessively extend their arms to the position of the handlebar 201Q when riding, which will increase the burden on the shoulders and arms, and also affect the control sensitivity of the handlebar 201Q, affecting riding safety. Therefore, when the distance between the seat 301Q and the handlebar 201Q is within a range, the third section 125Q of the frame 100Q is inclined backward, so that the lengths of the frame 100Q and the second section 124Q of the frame 100Q along the first direction 01 are both reduced, the weight of the frame 100Q is reduced, which is convenient for the lightweight design of the vehicle 17Q.

In addition, referring to FIG. 86C, in some embodiments, the third section 125Q of the frame 100Q may be inclined backward, and the seat tube 302Q of the seat 301Q may also be inclined backward, thereby reducing the torque exerted by the seat tube 302Q on the third section 125Q of the frame 100Q, and reducing the risk of bending deformation of the third section 125Q of the frame 100Q.

Referring to FIG. 86C, in some embodiments, the angle $\beta_{Q7}$ between the third section 125Q and the second section 124Q may be in the range of 95°–115°. $B_{Q7} \geq 95°$ makes the lengths of the frame 100Q and the second section 124Q of the frame 100Q along the first direction 01 smaller, which is convenient for the lightweight design of the vehicle 17Q. $B_{Q7 \leq 115°}$ avoids excessive tension between the third section 125Q and the second section 124Q, reduces the risk of local stress concentration at the junction of the third section 125Q and the second section 124Q, reduces the risk of deformation at the junction of the third section 125Q and the second section 124Q, and improves the service life of the frame 100Q.

Specifically, $B_{Q7}$ may be any value in the range of 95°-115°, for example, 95°, 97°, 99°, 101°, 103°, 105°, 107°, 109°, 111°, and 115°.

Referring to FIG. 86A, in some embodiments, the middle tube 106Q may be directly and fixedly connected to the third section 125Q, which may help to simplify the structure of the frame 100Q, reduce the weight of the frame 100Q, reduce production costs, and improve production efficiency.

Referring to FIG. 86C, in some embodiments, the backward inclination angles of the third section 125Q of the frame 100Q and the seat tube 302B may be the same, which, from the perspective of the second direction 02, may help to make the visual effect of the structure of the vehicle 17Q more concise; and it is expected to further reduce the risk of bending deformation of the third section 125Q.

Of course, it may be understood that, in some other embodiments, the backward inclination angles of the third section 125Q of the frame 100Q and the seat tube 302B may also be different.

Referring to FIGS. 86C and 86D, in some embodiments, the vehicle 17Q may include a rear fork 1801Q. The rear fork 1801Q may be used to connect the frame 100Q and the rear wheel 500Q. One end of the spring shock absorber 1802Q may be hinged to the third section 125Q, and the other end may be hinged to the rear fork 1801Q. One end of the rear fork 1801Q may be connected to the rear wheel 500Q, which is expected to reduce the connection structure between the spring shock absorber 1802Q and the rear wheel 500Q and improve the shock absorption effect of the spring shock absorber 1802Q.

It may be understood that the third section 125Q of the frame 100Q may be inclined backward, and under the action of external force, the third section 125Q of the frame 100Q has a tendency to incline backward. Along the third direction 03, the rear fork 1801Q may be located on the bottom side of the third section 125Q to support the third section 125Q of the frame 100Q, which helps to block the third section 125Q of the frame 100Q from continuing to incline backward.

Referring to FIG. 86E, in some embodiments, the angle $\beta_{Q9}$ between the spring shock absorber 1802Q and the third section 125Q of the frame 100Q may be in the range of 45°-60°, which may help to increase the proportion of the composite force at the connection point that is resolved into axial load, and is expected to avoid excessive bending moments at the hinge point, making the stress distribution more uniform and reducing the phenomenon of local stress concentration.

Specifically, $B_{Q9}$ may be any value in the range of 45°-60°, for example, 45°, 48°, 51°, 54°, 57°, and 60°.

In addition, referring to FIG. 86E, in some embodiments, the angle $\beta_{Q9}$ between the third section 125Q and the second section 124Q may be in the range of 95°-115°, and the angle $\beta_{Q9}$ between the spring shock absorber 1802Q and the third section 125Q of the frame 100Q may be in the range of 45°-60°, making the structure enclosed by the third section 125Q, the rear fork 1801Q, and the spring shock absorber 1802Q closer to an equilateral triangle shape, which may help to improve stability, thereby improving the riding stability of the vehicle 17Q.

In addition, referring to FIG. 86F, as mentioned before, the third limiting member 703Q of the storage mechanism 700Q may have hollows, and items in the storage mechanism 700Q may extend outward through the hollows of the third limiting member 703Q. During riding, bumps or gear changes may cause the items to vibrate, which in turn may cause the items to collide with the third section 125Q of the frame 100Q. The provision of the spring shock absorber 1802Q is expected to reduce the vibration of the third section 125Q of the frame 100Q, thereby reducing the vibration of the items in the storage mechanism 700Q.

FIGS. 86G-86H are a set of schematic views of the use state of the vehicle 17Q.

Referring to FIG. 86G, in some embodiments, the center of gravity of the animal may be approximately in a triangular distribution with the center of the front wheel 400Q and the center of the rear wheel 500Q, and the center of gravity of the user may be approximately in a triangular distribution with the center of the front wheel 400Q and the center of the rear wheel 500Q, which is conducive to ensuring the stability of the riding load. In addition, the animal is placed in the area in front of and below the user, so that during the process of riding and looking forward, the user may conveniently observe the animal's condition while ensuring riding safety.

Referring to FIG. 86G, in some embodiments, along the first direction 01, the center of gravity of the animal is located between the position of the pedal 1501Q that the user may step on and the position of the seat 301Q that the user may sit on. Along the third direction 03, the position of the pedal 1501Q that the user may step on, the center of gravity of the animal, and the position of the seat 301Q that the user may sit on may have a clear height difference relationship and may be arranged in order in the third direction 03. The user's legs are in a bent state and may provide a barrier around the animal, which helps to guide the animal to stay in the storage mechanism 700Q and reduces the risk of the animal running around or even jumping out of the storage mechanism 700Q. Along the second direction 02, the user's legs are placed on both sides of the animal, which helps to guide the animal to stay stably in the storage mechanism 700Q.

Referring to FIG. 86H, in some embodiments, when riding with an animal, the storage mechanism 700Q may guide the animal to be in a squatting posture. The handlebar 201Q is set in a horizontal state above the storage mechanism 700Q, which is conducive to guiding the animal in the storage mechanism 700Q to maintain a squatting state, reducing the risk of mutual collision with the handlebar 201Q due to standing or raising the upper body, especially on bumpy roads or when the vehicle is turning, which is expected to improve the stability and safety of the animal's ride. For example, when carrying a large animal, the large animal is taller, and the head of the large animal is close to the handlebar 201Q. The distance between the animal's head and the bottom of the storage mechanism 700Q is $H_{Q1}$, the distance between the handlebar 201Q and the bottom of the storage mechanism 700Q is $H_{Q3}$, the ratio of $H_{Q1}$ to $H_{Q3}$ is $K_{Q13}$. The handlebar 201Q may guide the user to observe the distance between the animal's head and the handlebar 201Q, and $K_{Q13}$ may be in the range of 0.2-0.9. This is conducive to improving the diversity of animals that may be carried, for example, small pets and large pets, and is expected to improve the safety and stability of the animal's ride, especially on bumpy roads or when the vehicle 17Q is turning. Specifically, $K_{Q13}$ may be any value in the range of 0.2-0.9, such as 0.2, 0.3, 0.4, 0.5, 0.6, 0.7, 0.8, 0.9.

Figure 87A:
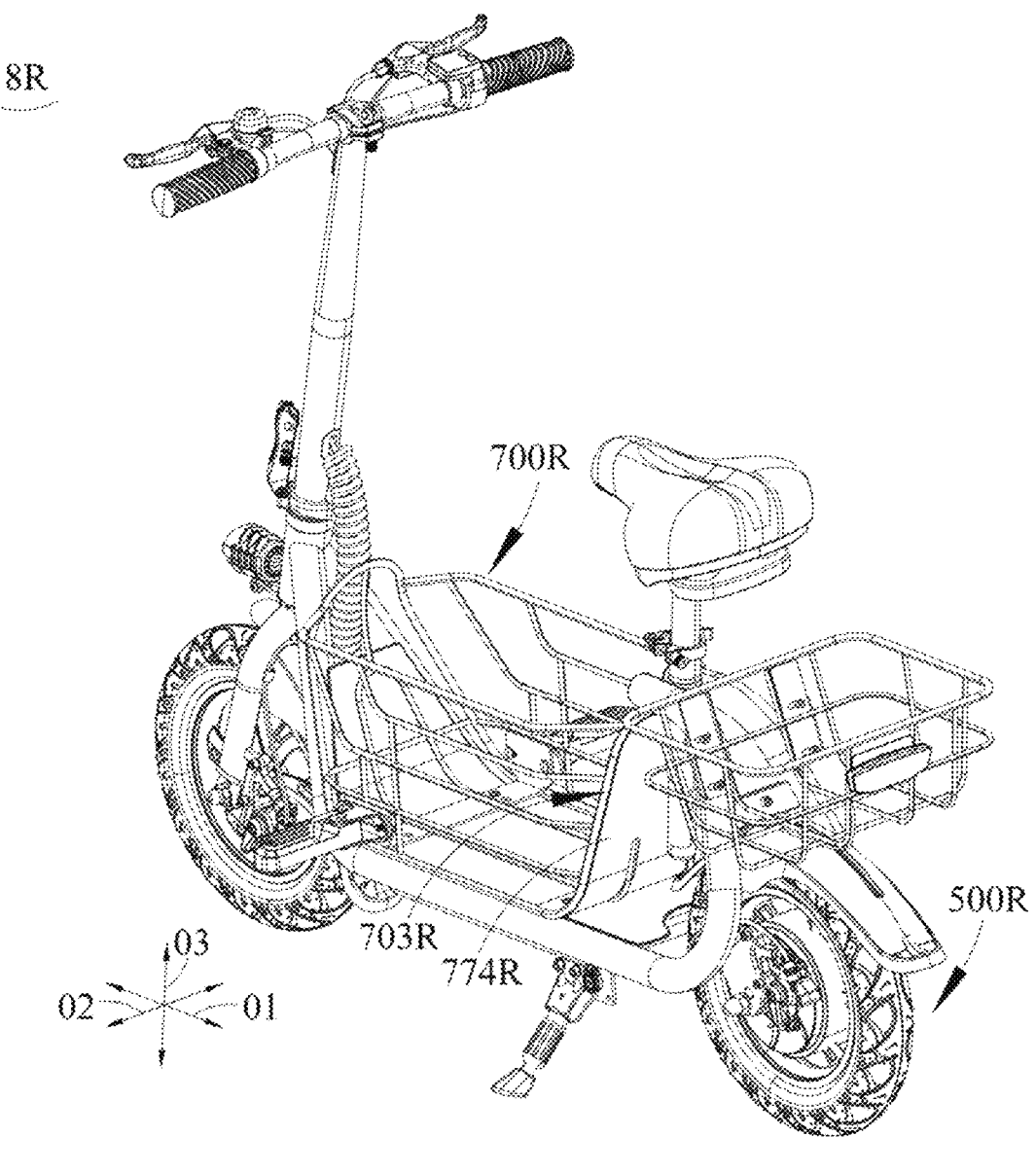
Figure 87B:
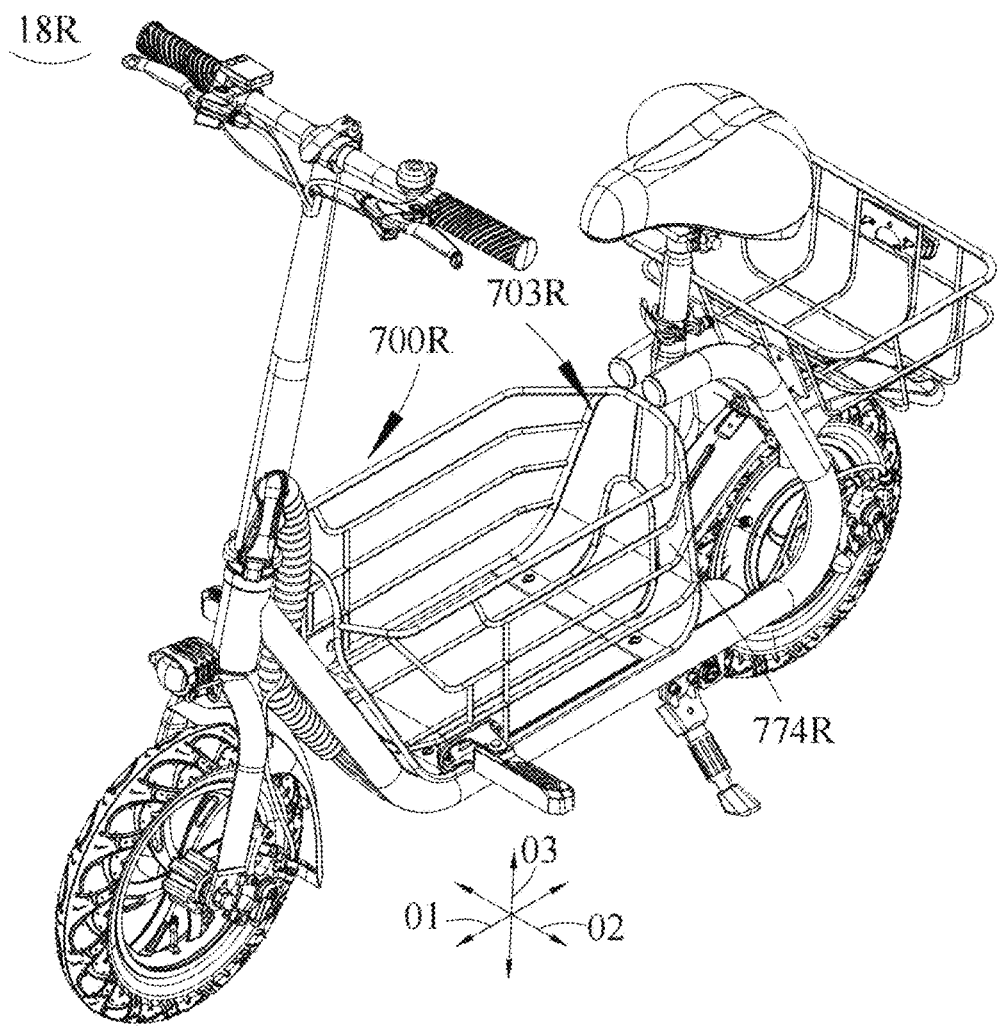

FIGS. 87A-87B are a set of overall schematic structural views of some other implementations of the vehicle, for example, the vehicle 18R.

Referring to FIGS. 87A-787B, in some embodiments, the vehicle 18R may include a storage mechanism 700R. The third limiting member 703R of the storage mechanism 700R may be provided with a baffle 774R, which may help to reduce the situation of items or animals (for example, an animal's tail) in the storage mechanism 700R darting out backward along the first direction 01, reducing the risk of being entangled or drawn into the rotating rear wheel 500R.

In some embodiments, along the third direction 03, the baffle 774R may extend upward from the bottom of the third limiting member 703R. Regarding the height setting of the baffle 774R, it is sufficient to block specific parts of items or animals from darting out backward. Therefore, the baffle 774R may only cover the bottom of the third limiting member 703R, or it may extend from the bottom of the third limiting member 703R to the middle area, or it may extend from the bottom of the third limiting member 703R to the top area.

In some embodiments, the fixing method of the baffle 774R and the third limiting member 703R may be various, and may include but is not limited to welding and snap-fitting.

Figure 88A:
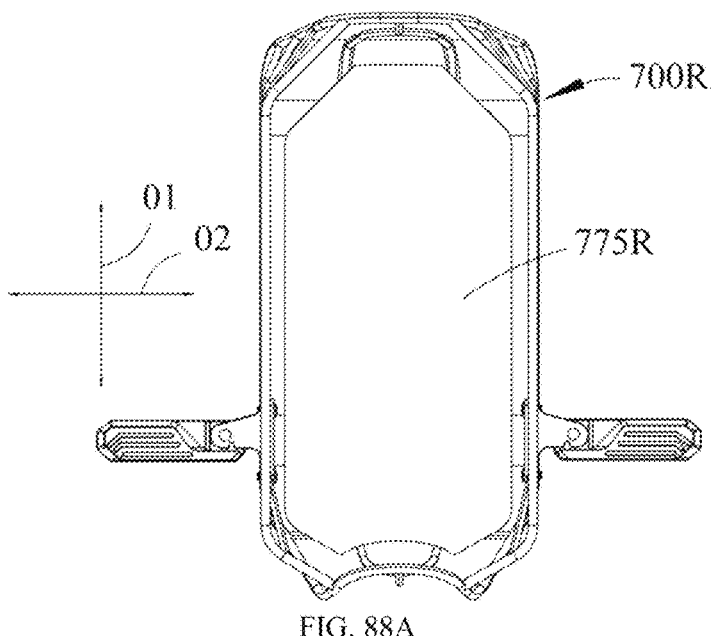
Figure 88B:
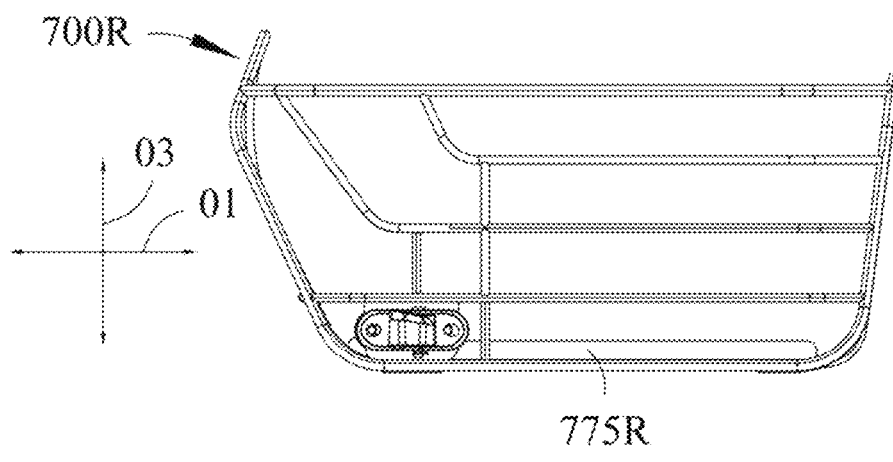
Figure 88C:
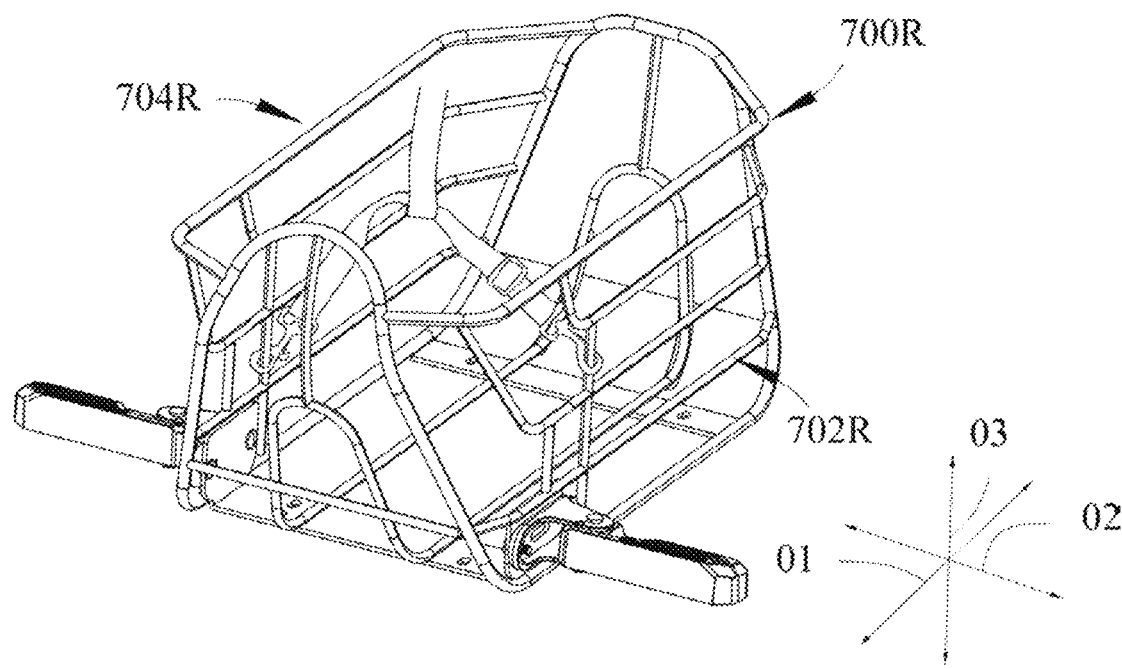

FIGS. 88A-88C are a set of schematic views of use of the storage mechanism 700R.

Referring to FIGS. 88A-88B, in some embodiments, the vehicle 18R may include a cushion 775R provided in the storage mechanism 700R. The cushion 775R at least covers or shields the bottom area of the storage mechanism 700R, and may also cover or shield one or more sides of the storage mechanism 700R. After adding the cushion 775R, when placing items in the storage mechanism 700R, it may help to reduce collisions. When driving, the items in the storage mechanism 700R may collide with each other due to bumps and shaking. Through the cushion 775R, it is expected to buffer the impact force generated by the collision, reducing the risk of item damage. When placing animals, it is expected to improve comfort and reduce the risk of animals being in long-term contact with hard objects (for example, the bottom of the storage mechanism or the support plate).

In some embodiments, the cushion 775R may contain a soft and elastic filling material. For example, low-density slow-rebound polyurethane foam (such as the common 15-20D) has a soft touch and moderate resilience, suitable for small pets weighing 5 kg or less (such as teacup dogs, small cats). For another example, medium-density support-ive polyurethane foam (20-30D) has moderate support and may be adapted to medium-sized pets weighing 5-10 kg (such as Corgi puppies, British Shorthair cats). For another example, high-resilience memory foam (30-40D) rebounds quickly and has strong tear resistance, and may withstand repeated stepping and scratching by pets weighing 10-20 kg; high-density strong support foam (40-50D) has higher hard-ness and may effectively disperse the lumbar spine pressure of large pets weighing more than 20 kg (such as Golden Retrievers, Alaskan Malamutes).

In some embodiments, the cushion may have a wrap-around design, and the edge may have a slight protrusion (such as a 3-5 cm high soft edge) to simulate a "nest feeling", which is expected to enhance the animal's sense of security in the space formed by the storage mechanism. In addition, it is expected that the protrusion at the edge will form a natural guide, prompting the pet to actively move to the central area of the cushion, so that the pet naturally sits upright in the center of the cushion during the process of autonomously adjusting its posture, which is expected to improve the safety and stability of the vehicle.

In some embodiments, the cushion may have an outer bag. The bag and the inner filling are separable, which is convenient for cleaning the bag. In addition, the opening of the bag may be set on the side, and the parts or components that control the opening or closing of the opening (for example, a zipper) are also on the side, which may keep the parts or components that control the opening or closing of the opening away from the animal's main squatting surface, reducing the risk of causing injury or discomfort to the pet.

In some embodiments, along the first direction, the length of the frame and the installation position of the storage mechanism are both adjustable. The adjustable frame length helps to adjust the center of gravity of the vehicle. When the weight of the load in the storage mechanism is large, the frame may be lengthened, so that the installation position of the storage mechanism may be moved backward, reducing the risk of imbalance caused by heavy objects concentrating on the front of the vehicle. This adjustment may be applied to complex road conditions. For example, when encounter-ing a steep slope, shortening the frame and moving the storage mechanism forward may increase the grip of the front wheels and prevent the rear of the vehicle from lifting up when climbing; the reverse operation is performed when going downhill, and the stability of the rear wheel braking is enhanced by moving the center of gravity backward.

In some embodiments, along the first direction, the length of the frame and the length of the storage mechanism are both adjustable. The dual-adjustment design of the length of the frame and the storage mechanism may be applied to animals of different sizes. For large animals such as Golden Retrievers, Samoyeds, etc., the frame may be lengthened, and in coordination with the lengthening of the storage mechanism, large animals may ride more comfortably, and it also helps to move the center of gravity of large animals backward, reducing the risk of imbalance caused by heavy objects concentrating on the front of the vehicle. For small animals such as Ragdoll cats, Teddy dogs, and Lop-eared rabbits, shortening the length of the frame and the storage mechanism makes the carrying space more matched with the animal's body size, reducing the risk of collision caused by shaking due to a large space. At the same time, it also helps to make the entire vehicle more compact and compact.

Referring to FIG. 88C, in some embodiments, along the second direction 02, the storage mechanism 700R may also provide a connection position for an animal safety rope. For example, the two buckles of the animal safety rope may be buckled on the second limiting member 702R and the fourth limiting member 704R, respectively.

In some embodiments, the storage mechanism 700R may also provide a connection position for animal toys. For example, a ball with a connecting rope, a doll with a buckle.

Figure 89A:
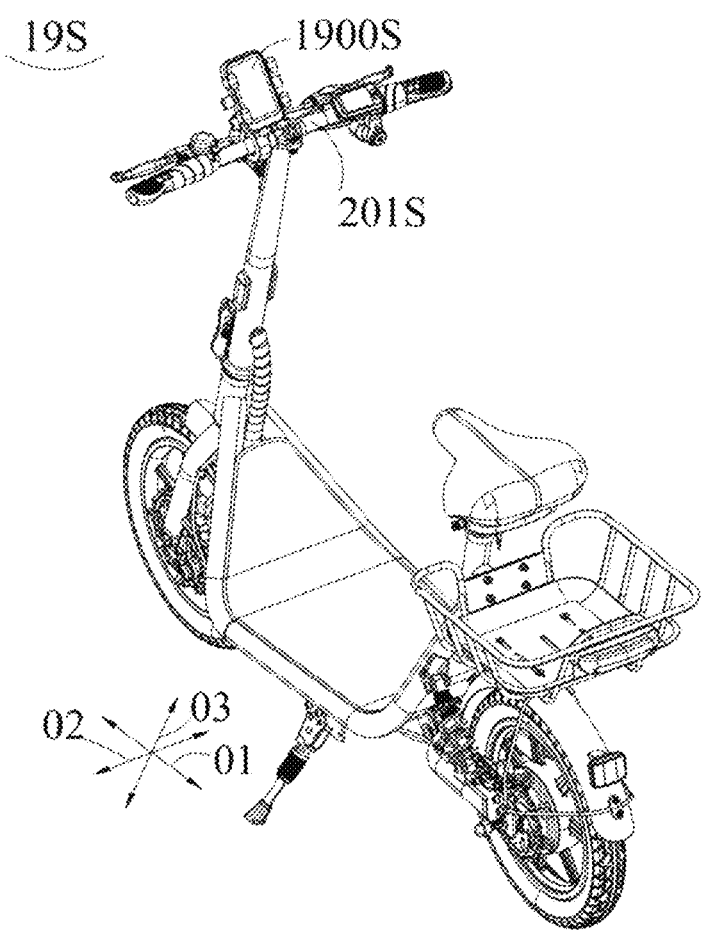
Figure 89B:
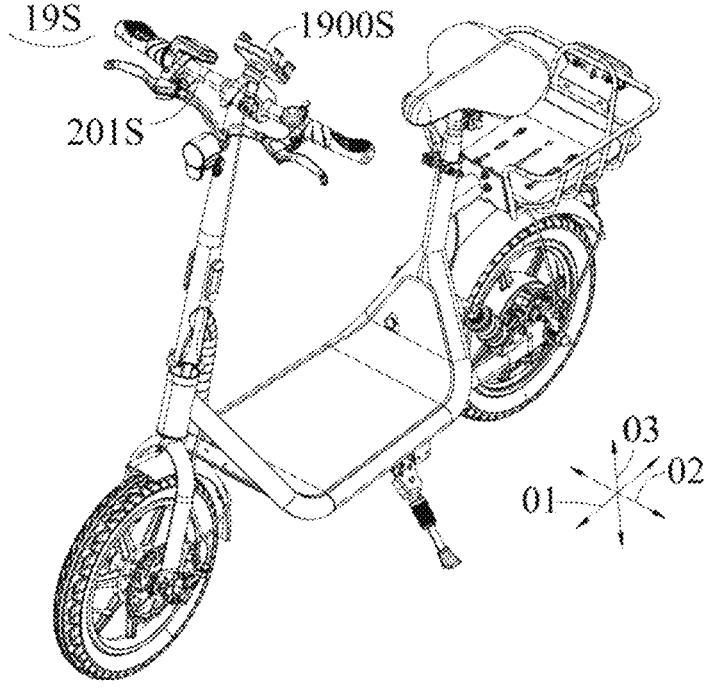

FIGS. 89A to 89B are a set of overall schematic structural views of some other implementations of the vehicle, for example, the vehicle 19S.

Referring to FIGS. 89A and 89B, the differences between the vehicle 19S and the vehicle 17Q include that the handle-bar 201S is also provided with a phone holder 1900S. When riding, the user is expected to be able to fix their mobile phone with the phone holder 1900S and use the mobile phone for navigation, improving travel convenience. In addition, the phone holder 1900S is also expected to provide a place for the user to place their mobile phone, improving portability.

It may be understood that in the various embodiments of the present application, the magnitude of the serial numbers of the various processes does not imply the order of execu-tion. The execution order of the various processes should be determined by their functions and internal logic, and should not constitute any limitation on the implementation process of the embodiments of the present application.

It may be understood that the various embodiments described in the present application may be implemented either individually or in combination, and the embodiments of the present application are not limited thereto.

A person skilled in the art may clearly understand that for the convenience and brevity of description, the specific working processes of the systems, apparatuses, and units described above may refer to the corresponding processes in the foregoing method embodiments, and details are not described herein again.

The foregoing descriptions are only specific embodiments of the present application, but the protection scope of the present application is not limited to this. Any person skilled in the art may easily think of changes or replacements within the technical scope disclosed by the present application, which should be covered by the protection scope of the present application. Therefore, the protection scope of the present application shall be subject to the protection scope of the claims.

Although various inventive aspects have been disclosed herein in connection with certain preferred embodiments, implementations, and examples, it should be understood by those skilled in the art that the invention is not intended to be limited to the specific embodiments disclosed, but covers other alternative embodiments and/or uses of the invention, as well as obvious modifications and equivalent arrangements thereof. In addition, while a number of variations of the inventive aspects have been shown and described in detail, other modifications, which are within its scope, will be readily apparent to those of skill in the art based upon this disclosure. It is also to be understood that the scope of this disclosure includes various combinations or sub-combinations of the specific features and aspects of the embodiments disclosed herein, such that the various features, characteristics, advantages, implementations, and aspects of the disclosed subject matter may be combined with or substituted for one another. Thus, the scope of the invention disclosed herein should not be limited by the particular disclosed embodiments or implementations set forth above, but should be determined only by a reasonable interpretation of the claims. Furthermore, all claim terms in some embodiments should be interpreted in their broadest form to provide the applicant with the widest possible coverage permitted by law. Although embodiments have been described with reference to the drawings and specific examples, it should be understood by those skilled in the art that various modifications and adjustments can be made to the processes, methods, and apparatuses described herein without departing from the spirit and scope of the embodiments claimed herein. This description is intended as an example only and does not limit the scope of the claimed embodiments. It should be understood that two or more separate (or different) components in the embodiments of the present application can be integrated into one or fewer independent components. Consequently, multiple separate and/or different components in the claims can also be interpreted as two different parts of a single component (for example, a single component can be equally divided into a left half and a right half) to achieve certain specific functions, technical effects, or results defined in this technical specification. In addition, within the understanding of a person of ordinary skill in the art, "A is connected to B" may include the case where A and B are integrally formed.

It should be understood that, in this specification, references to phrases such as "features," "advantages," etc., are for the purpose of illustrating specific aspects of the invention, but this does not imply that any single embodiment includes or must include all mentioned features and advantages. The true meaning of these phrases is that the described specific feature or advantage may be present in one of the embodiments of the invention.

It should be understood that various features (including dimensional, proportional, angular, and other parametric features), advantages, and characteristics of any one embodiment herein can be combined into one or more other embodiments in any reasonable manner. A person skilled in the art will understand that one or more specific features in a particular embodiment may be omitted in practice. In some cases, individual embodiments may also possess additional features and advantages not included in other embodiments.

For the purposes of this specification and the appended claims, terms such as "about," "substantially," "approximately," "nearly," "actually," or similar qualifiers, should be understood to mean an acceptable numerical deviation or range that a person of ordinary skill in the art would reasonably expect, based on the specific context of the invention, the measurement methods used, and/or the inherent properties of the feature being described. This range is intended to include any minor variations or equivalent variants that result from measurement errors, manufacturing tolerances, or the functionality of the technical feature, and that are capable of achieving the intended function of said technical feature. Unless otherwise specified, and on the premise that the intended function of the technical feature can be achieved, terms such as "about," "substantially," "approximately," "nearly," "actually," or similar qualifiers should be understood to include reasonable engineering tolerances, for example, typically ±25% for linear dimensions, angles, alignment features, or directly measurable physical quantities; and up to 30% for dimensionless ratios/proportions or parameters that are dominated by manufacturing tolerances and are not functionally sensitive.

Furthermore, the method of interpretation or definition of meaning for a certain term in some embodiments can be applied by analogy to the corresponding interpretation of other similar terms herein, as long as there is no logical conflict.

The invention claimed is:

1. An electric riding device, comprising:
   a frame body;
   a front wheel coupled to a front portion of the frame body, and a rear wheel coupled to a rear portion of the frame body;
   a handlebar assembly coupled to the front portion of the frame body and configured to be contacted by a user's hands;
   a seat coupled to the frame body; and
   a power device coupled to the frame body and configured to supply power to the electric riding device;
   wherein the frame body includes a substantially flat base portion having a longitudinal dimension and a lateral dimension, a front raised portion extending upwardly from a front end of the base portion, and a rear raised portion extending upwardly from a rear end of the base portion;
   wherein the front raised portion is configured to support a head tube at an end thereof distal to the base portion, the head tube being for coupling the handlebar assembly to the frame body, and at least a part of the rear raised portion is configured to support the seat;
   wherein the electric riding device further comprises a storage basket configured to be removably mounted on the frame body, at least a portion of the storage basket being configured to be mounted in a substantially horizontal orientation on an upper surface of the base portion, the storage basket having a longitudinal dimension, a lateral dimension, and a height dimension, wherein a ratio of the longitudinal dimension of the storage basket to the lateral dimension of the storage basket is greater than 1.15, and a ratio of the longitudinal dimension of the storage basket to the height dimension of the storage basket is greater than 1.15;

wherein a bottom of the storage basket is configured with an openwork structure;

wherein the storage basket comprises a left sidewall and a right sidewall that are laterally spaced apart and substantially mirror-symmetrical, and wherein, when the storage basket is mounted on the frame body, the left sidewall of the storage basket is positioned at a left end of the base portion and extends substantially vertically upward therefrom, and the right sidewall of the storage basket is positioned at a right end of the base portion and extends substantially vertically upward therefrom;

wherein four top corners of the storage basket are each provided with an outwardly convex arcuate section;

wherein a shape of at least a portion of the storage basket is configured to conform to a shape of the frame body;

wherein the storage basket defines a contact surface configured to engage the upper surface of the base portion and permit the storage basket to be stably placed thereon, such that when the storage basket is placed on the upper surface of the base portion, the contact surface and the upper surface of the base portion are in substantially horizontal contact;

wherein the electric riding device further comprises a left footrest and a right footrest, disposed on opposite sides in the lateral direction, each being rotatable, wherein an installation position of the left footrest is longitudinally nearer a left front end of the base portion rather than at or adjacent to a left rear end of the base portion, and an installation position of the right footrest is longitudinally nearer a right front end of the base portion rather than at or adjacent to a right rear end of the base portion;

wherein the left footrest is configured to rotate about a first axis extending in a height direction, the right footrest is configured to rotate about a second axis extending in the height direction, and a lateral distance between the first axis and the second axis is greater than the lateral dimension of the storage basket;

wherein the power device is mounted beneath the base portion;

wherein each of the left and right sidewalls comprises:

at least two first bars extending along a first direction and spaced apart along a second direction; and at least one second bar extending along the second direction;

wherein the at least one second bar intersects with the at least two first bars substantially perpendicularly;

wherein the storage basket has an open top.

2. The electric riding device of claim 1, wherein the storage basket is removably mounted on the frame body via a threaded mounting mechanism.

3. The electric riding device of claim 1, wherein the storage basket comprises two mounting plates that are longitudinally spaced apart, wherein a bottom surface of each of the two mounting plates is configured to engage in surface-to-surface contact with the upper surface of the base portion to mount the storage basket in the substantially horizontal orientation thereon.

4. The electric riding device of claim 1, wherein the shape of the at least a portion of the storage basket is configured as a bent shape to conform to the shape of the frame body.

5. The electric riding device of claim 1, wherein the storage basket comprises plate-like walls.

6. An electric riding device, comprising:

a frame body defining a substantially flat support plate;

a front wheel coupled to a front portion of the frame body, and a rear wheel coupled to a rear portion of the frame body;

a handlebar assembly coupled to the frame body and configured to be handled by a user's hands;

a seat coupled to the frame body;

a power device coupled to the frame body and configured to supply power to the electric riding device; and a storage basket defining a storage cavity, wherein at least a portion of the storage basket is configured to be removably coupled to an upper surface of the support plate;

wherein the storage basket comprises a left sidewall and a right sidewall, the left sidewall and the right sidewall are opposed to each other, and wherein, when the storage basket is mounted on the frame body, the left sidewall is positioned proximate a left edge of the support plate and extends substantially vertically upward therefrom, and the right sidewall is positioned proximate a right edge of the support plate and extends substantially vertically upward therefrom;

wherein the electric riding device further comprises a left footrest and a right footrest, the left footrest and the right footrest are opposed to each other, wherein an installation position of the left footrest is located proximate a left front side of the support plate, and an installation position of the right footrest is located proximate a right front side of the support plate;

wherein the storage basket has an open top.

7. The electric riding device of claim 6, wherein the storage basket is configured to be removably mounted on the frame body via a threaded mounting mechanism.

8. The electric riding device of claim 6, wherein the storage basket comprises two longitudinally spaced apart mounting plates, a bottom surface of each of the two mounting plates being configured to engage in surface-to-surface contact with the upper surface of the support plate to mount the storage basket in a substantially horizontal orientation thereon.

9. The electric riding device of claim 6, wherein the shape of the at least a portion of the storage basket is configured as a bent shape to conform to the shape of the frame body.

10. The electric riding device of claim 6, wherein the storage basket has a mesh structure.

11. An electric riding device, comprising:

a frame body including a substantially flat support plate;

a front wheel coupled to a front portion of the frame body, and a rear wheel coupled to a rear portion of the frame body;

a handlebar assembly coupled to the frame body and configured to be contacted by a user's hands;

a seat coupled to the frame body;

a power device coupled to the frame body and configured to supply power to the electric riding device; and a removable storage basket defining a storage cavity, a bottom of the storage basket being configured to contact at least a portion of an upper surface of the support plate in a substantially horizontal orientation to stably mount the storage basket to the frame body;

wherein the storage basket comprises a first sidewall and a second sidewall spaced apart from each other in a left-right direction, the first sidewall defining a first plane and the second sidewall defining a second plane, the first plane and the second plane being substantially parallel;

wherein the upper surface of the support plate defines a third plane, the first plane is substantially orthogonal to the third plane proximate a left end of the support plate, and the second plane is substantially orthogonal to the third plane proximate a right end of the support plate;

wherein the electric riding device further comprises a left footrest and a right footrest, the left footrest and the right footrest are opposed to each other, wherein an installation position of the left footrest is located proximate a left front end of the support plate, and an installation position of the right footrest is located proximate a right front end of the support plate; and wherein the power device is mounted beneath the support plate;

wherein the storage basket has an open top.

12. The electric riding device of claim 11, wherein the storage basket is configured to be removably mounted on the frame body via a threaded mounting mechanism.

13. The electric riding device of claim 11, wherein the storage basket comprises two longitudinally spaced apart mounting plates, a bottom surface of each of the two mounting plates being configured to engage in surface-to-surface contact with the upper surface of the support plate to mount the storage basket in a substantially horizontal orientation thereon.

14. The electric riding device of claim 11, wherein a shape of at least a portion of the storage basket is configured as a bent shape to conform to a shape of the frame body.

15. An electric riding device, comprising:

a frame body defining a substantially flat support plate located between front and rear ends of the frame body, the support plate having a longitudinal dimension and a lateral dimension;

a front wheel and a rear wheel coupled to front and rear portions of the frame body, respectively;

a handlebar assembly coupled to the frame body and configured to be grasped by a user's hands;

a seat coupled to the frame body; and a power device coupled to the frame body and configured to supply power to the electric riding device;

wherein the frame body comprises a storage cavity having a longitudinal dimension, a lateral dimension, and a height dimension, wherein the longitudinal dimension of the storage cavity is greater than both the lateral dimension and the height dimension thereof;

wherein the storage cavity is at least partially defined by a left sidewall and a right sidewall disposed on the frame body, the left and right sidewalls are opposed to each other, a lower end of the left sidewall being positioned proximate a left edge of the support plate and extending substantially vertically upward therefrom, and a lower end of the right sidewall being positioned proximate a right edge of the support plate and extending substantially vertically upward therefrom;

wherein the electric riding device further comprises a left footrest and a right footrest disposed on opposite sides in the lateral direction, wherein an installation position of the left footrest is longitudinally nearer a left front end of the support plate rather than at or adjacent to a left rear end of the support plate, and an installation position of the right footrest is longitudinally nearer a right front end of the support plate rather than at or adjacent to the right rear end of the support plate;

wherein each of the left sidewall and right sidewall is removably disposed on the frame body; and wherein the storage cavity has an open top.

* * * * *